US010374803B2

(12) United States Patent
Clark et al.

(10) Patent No.: US 10,374,803 B2
(45) Date of Patent: Aug. 6, 2019

(54) METHODS FOR INTERNET COMMUNICATION SECURITY

(71) Applicant: Stealthpath, Inc., Reston, VA (US)

(72) Inventors: Mike Clark, Sterling, VA (US); Andrew Gordon, Alexandria, VA (US); Matt Clark, Sterling, VA (US)

(73) Assignee: Stealthpath, Inc., Reston, VA (US)

( * ) Notice: Subject to any disclaimer, the term of this patent is extended or adjusted under 35 U.S.C. 154(b) by 0 days.

(21) Appl. No.: 16/153,409

(22) Filed: Oct. 5, 2018

(65) Prior Publication Data

US 2019/0109714 A1 Apr. 11, 2019

Related U.S. Application Data

(63) Continuation-in-part of application No. 15/949,749, filed on Apr. 10, 2018.

(60) Provisional application No. 62/731,529, filed on Sep. 14, 2018, provisional application No. 62/655,633, filed on Apr. 10, 2018, provisional application No. 62/609,252, filed on Dec. 21, 2017, provisional
(Continued)

(51) Int. Cl.

| | |
|---|---|
| ***G06F 21/00*** | (2013.01) |
| ***H04L 9/32*** | (2006.01) |
| ***H04L 29/06*** | (2006.01) |
| ***G06F 9/455*** | (2018.01) |
| ***H04L 12/741*** | (2013.01) |

(52) U.S. Cl.
CPC ........ *H04L 9/3226* (2013.01); *G06F 9/45558* (2013.01); *H04L 45/745* (2013.01); *H04L 63/0227* (2013.01); *H04L 63/0428* (2013.01); *H04L 63/0876* (2013.01); *H04L 63/105* (2013.01); *H04L 63/205* (2013.01); *H04L 69/08* (2013.01)

(58) Field of Classification Search
None
See application file for complete search history.

(56) References Cited

U.S. PATENT DOCUMENTS

| | | | |
|---|---|---|---|
| 5,657,390 | A | 8/1997 | Elgamalet et al. |
| 6,131,163 | A | 10/2000 | Wiegel |

(Continued)

FOREIGN PATENT DOCUMENTS

| | | |
|---|---|---|
| AU | 2017100426 | 6/2017 |
| EP | 1954005 | 8/2008 |

(Continued)

OTHER PUBLICATIONS

Non-Final Rejection in U.S. Appl. No. 15/949,749 dated Sep. 20, 2018.

(Continued)

*Primary Examiner* — William J. Goodchild
(74) *Attorney, Agent, or Firm* — Jones Day

(57) ABSTRACT

The present disclosure relates to network security software cooperatively configured on plural nodes to authenticate and authorize devices, applications, users, and data protocol in network communications by exchanging nonpublic identification codes, application identifiers, and data type identifiers via pre-established communication pathways and comparing against pre-established values to provide authorized communication and prevent compromised nodes from spreading malware to other nodes.

24 Claims, 44 Drawing Sheets

Related U.S. Application Data application No. 62/609,152, filed on Dec. 21, 2017, provisional application No. 62/569,300, filed on Oct. 6, 2017.

(56) References Cited

U.S. PATENT DOCUMENTS

| | | | |
|---|---|---|---|
| 6,154,839 | A | 11/2000 | Arrow et al. |
| 6,718,533 | B1 | 4/2004 | Schneider et al. |
| 6,782,474 | B1 | 8/2004 | Ylonen |
| 6,795,917 | B1 | 9/2004 | Ylonen |
| 6,823,453 | B1 | 11/2004 | Hagerman |
| 6,973,496 | B2 | 12/2005 | Hayes |
| 6,981,278 | B1 | 12/2005 | Minnig et al. |
| 7,069,438 | B2 | 6/2006 | Balabine et al. |
| 7,197,762 | B2 | 3/2007 | Tarquini |
| 7,533,128 | B1 | 5/2009 | Sanchez et al. |
| 7,602,731 | B2 | 10/2009 | Jain |
| 7,783,853 | B1 | 8/2010 | Rhee et al. |
| 7,827,559 | B1 | 11/2010 | Rhee et al. |
| 7,958,237 | B2 | 6/2011 | Fertell et al. |
| 8,001,605 | B2 | 8/2011 | Padmanabhan et al. |
| 8,209,704 | B1 | 6/2012 | McCann et al. |
| 8,256,003 | B2 | 8/2012 | Dadhia et al. |
| 8,281,127 | B2 | 10/2012 | Hayes |
| 8,316,237 | B1 | 11/2012 | Felsher et al. |
| 8,335,916 | B2 | 12/2012 | Brabson et al. |
| 8,352,576 | B2 | 1/2013 | Sparks |
| 8,356,169 | B2 | 1/2013 | Ishikawa et al. |
| 8,402,540 | B2 | 3/2013 | Kapoor et al. |
| 8,423,663 | B2 | 4/2013 | Archer et al. |
| 8,457,034 | B2 | 6/2013 | Kuehl et al. |
| 8,522,314 | B1 | 8/2013 | Vasquez et al. |
| 8,572,697 | B2 | 10/2013 | Hayes et al. |
| 8,671,135 | B1 | 3/2014 | Joshi et al. |
| 8,763,094 | B1 | 6/2014 | Hsieh et al. |
| 8,806,011 | B1 | 8/2014 | Graham-Cumming |
| 8,812,466 | B2 | 8/2014 | Wilson |
| 8,908,700 | B2 | 12/2014 | Chadda et al. |
| 8,910,272 | B2 | 12/2014 | Brandstatter |
| 8,984,504 | B2 * | 3/2015 | Becker ................ G06F 9/45533 718/1 |
| 9,037,719 | B2 | 5/2015 | Shen et al. |
| 9,148,443 | B2 | 9/2015 | Chizeck et al. |
| 9,191,203 | B2 | 11/2015 | Rooyakkers et al. |
| 9,219,710 | B2 | 12/2015 | Loewenthal et al. |
| 9,256,552 | B2 | 2/2016 | Epstein |
| 9,355,420 | B2 | 5/2016 | Anderson et al. |
| 9,386,081 | B2 | 7/2016 | Sanchez et al. |
| 9,405,283 | B1 | 8/2016 | Damico |
| 9,436,923 | B1 | 9/2016 | Sriram et al. |
| 9,467,297 | B2 | 10/2016 | Clish et al. |
| 9,552,216 | B2 | 1/2017 | Zheng et al. |
| 9,560,038 | B2 | 1/2017 | Gupta |
| 9,565,180 | B2 | 2/2017 | Yerra et al. |
| 9,621,461 | B2 | 4/2017 | Sun |
| 9,973,499 | B2 | 5/2018 | Hayes et al. |
| 9,973,577 | B2 | 5/2018 | Barc et al. |
| 2002/0007345 | A1 | 1/2002 | Harris |
| 2002/0049719 | A1 | 4/2002 | Shiomi et al. |
| 2002/0174334 | A1 | 11/2002 | Meadow et al. |
| 2002/0178273 | A1 | 11/2002 | Pardo-Castellote et al. |
| 2003/0084329 | A1 | 5/2003 | Tarquini |
| 2003/0105957 | A1 | 6/2003 | Brabson et al. |
| 2004/0027373 | A1 | 2/2004 | Jacquot et al. |
| 2004/0123142 | A1 | 6/2004 | Dubal et al. |
| 2004/0143735 | A1 | 7/2004 | Ferguson |
| 2004/0168062 | A1 | 8/2004 | Isozaki et al. |
| 2005/0204132 | A1 | 9/2005 | Diehl et al. |
| 2005/0238012 | A1 | 10/2005 | Panigrahy et al. |
| 2006/0023709 | A1 | 2/2006 | Hall et al. |
| 2006/0080545 | A1 | 4/2006 | Bagley |
| 2006/0155984 | A1 | 7/2006 | Tsuchida et al. |
| 2006/0214006 | A1 | 9/2006 | Mori et al. |
| 2006/0230200 | A1 | 10/2006 | Bellows et al. |
| 2007/0021123 | A1 | 1/2007 | A'Rafat et al. |
| 2007/0100999 | A1 | 5/2007 | Haider |
| 2007/0136801 | A1 | 6/2007 | Le et al. |
| 2007/0186115 | A1 | 8/2007 | Gao et al. |
| 2007/0198656 | A1 | 8/2007 | Mazzaferri et al. |
| 2007/0198837 | A1 | 8/2007 | Koodli et al. |
| 2007/0300219 | A1 | 12/2007 | Devaux |
| 2008/0134327 | A1 | 6/2008 | Bharrat et al. |
| 2008/0175239 | A1 | 7/2008 | Sistanizadeh et al. |
| 2009/0113202 | A1 | 4/2009 | Hidle |
| 2009/0144541 | A1 | 6/2009 | Kim et al. |
| 2009/0282460 | A1 | 11/2009 | Brooks |
| 2010/0011410 | A1 | 1/2010 | Liu |
| 2010/0070677 | A1 | 3/2010 | Thakkar |
| 2010/0205427 | A1 | 8/2010 | Bauer et al. |
| 2010/0316219 | A1 | 12/2010 | Boubion et al. |
| 2011/0051606 | A1 | 3/2011 | Cutlip et al. |
| 2011/0208965 | A1 | 8/2011 | Machani |
| 2011/0246359 | A1 | 8/2011 | O'brien et al. |
| 2011/0214157 | A1 | 9/2011 | Korsunsky et al. |
| 2011/0231924 | A1 | 9/2011 | Devdhar et al. |
| 2011/0295923 | A1 | 12/2011 | de Campos Ruiz et al. |
| 2012/0079476 | A1 | 3/2012 | Anderson |
| 2012/0099425 | A1 | 4/2012 | Wang et al. |
| 2012/0185692 | A1 | 7/2012 | Hamlin |
| 2013/0133026 | A1 | 5/2013 | Burgess |
| 2013/0204988 | A1 | 8/2013 | Grewal et al. |
| 2013/0332724 | A1 | 12/2013 | Walters |
| 2014/0122678 | A1 | 5/2014 | Miner et al. |
| 2014/0150083 | A1 | 5/2014 | Dinha et al. |
| 2014/0172633 | A1 | 6/2014 | Dogin et al. |
| 2014/0177839 | A1 | 6/2014 | Wagner et al. |
| 2015/0012964 | A1 | 1/2015 | Xie et al. |
| 2015/0012999 | A1 | 1/2015 | McGee |
| 2015/0055467 | A1 | 2/2015 | Agarwal et al. |
| 2015/0067059 | A1 | 3/2015 | Sanchez et al. |
| 2015/0067796 | A1 | 3/2015 | Hayes et al. |
| 2015/0113615 | A1 | 4/2015 | Foster et al. |
| 2015/0128152 | A1 | 5/2015 | Lachaume |
| 2015/0188823 | A1 | 7/2015 | Williams et al. |
| 2015/0220625 | A1 | 8/2015 | Cartmell et al. |
| 2015/0220927 | A1 | 8/2015 | Smith et al. |
| 2015/0256431 | A1 | 9/2015 | Buchanan et al. |
| 2015/0281278 | A1 | 10/2015 | Gooding et al. |
| 2015/0332395 | A1 | 11/2015 | Walker et al. |
| 2015/0363782 | A1 | 12/2015 | Ronca et al. |
| 2015/0365389 | A1 | 12/2015 | Zhang et al. |
| 2016/0027229 | A1 | 1/2016 | Spanos et al. |
| 2016/0072787 | A1 | 3/2016 | Balabine et al. |
| 2016/0072800 | A1 | 3/2016 | Soon-Shiong |
| 2016/0078212 | A1 * | 3/2016 | Bish .................... G06F 9/45558 713/189 |
| 2016/0119208 | A1 | 4/2016 | Castro et al. |
| 2016/0164884 | A1 | 6/2016 | Sriram et al. |
| 2016/0191551 | A1 | 6/2016 | Beauchesne et al. |
| 2016/0211940 | A1 | 7/2016 | Carrascosa et al. |
| 2016/0219024 | A1 | 7/2016 | Verzun et al. |
| 2016/0226916 | A1 | 8/2016 | Buruganahalli et al. |
| 2016/0269421 | A1 | 9/2016 | Hayes |
| 2016/0300234 | A1 | 10/2016 | Moss-Pultz |
| 2016/0301695 | A1 | 10/2016 | Trivelpiece et al. |
| 2016/0330209 | A1 | 11/2016 | Iacob et al. |
| 2016/0352683 | A1 | 12/2016 | Cooper et al. |
| 2016/0373262 | A1 | 12/2016 | Shearer et al. |
| 2016/0373433 | A1 | 12/2016 | Rivers et al. |
| 2017/0019426 | A1 | 1/2017 | Hayes |
| 2017/0034216 | A1 | 2/2017 | Santhiveeran et al. |
| 2017/0039146 | A1 | 2/2017 | Lanigan et al. |
| 2017/0046664 | A1 | 2/2017 | Haldenby et al. |
| 2017/0076106 | A1 | 3/2017 | Keidar |
| 2017/0116693 | A1 | 4/2017 | Rae et al. |
| 2017/0132615 | A1 | 5/2017 | Castinado et al. |
| 2017/0140408 | A1 | 5/2017 | Wuehler |
| 2017/0147807 | A1 | 5/2017 | Rooyakkers |
| 2017/0180250 | A1 | 6/2017 | Shin et al. |
| 2017/0187590 | A1 | 6/2017 | Cook et al. |
| 2017/0200000 | A1 * | 7/2017 | Bish .................... G06F 9/45558 |
| 2017/0201385 | A1 | 7/2017 | Kravitz et al. |
| 2017/0214694 | A1 | 7/2017 | Yan |
| 2017/0220815 | A1 | 8/2017 | Ansari et al. |

(56) References Cited

U.S. PATENT DOCUMENTS

| | | | |
|---|---|---|---|
| 2017/0251065 | A1 | 8/2017 | Furr et al. |
| 2017/0257347 | A1 | 9/2017 | Yan et al. |
| 2017/0262862 | A1 | 9/2017 | Aljawhari |
| 2017/0279783 | A1 | 9/2017 | Milazzo et al. |
| 2017/0310579 | A1 | 10/2017 | Hayes |
| 2017/0374029 | A1 | 12/2017 | Cianfrocca |
| 2018/0109538 | A1 | 4/2018 | Kumar et al. |
| 2018/0294973 | A1* | 10/2018 | Miller .................. H04L 9/3247 |
| 2019/0109713 | A1 | 4/2019 | Clark et al. |
| 2019/0109820 | A1 | 4/2019 | Clark et al. |
| 2019/0109821 | A1 | 4/2019 | Clark et al. |
| 2019/0109822 | A1 | 4/2019 | Clark et al. |
| 2019/0109848 | A1 | 4/2019 | Clark et al. |

FOREIGN PATENT DOCUMENTS

| | | |
|---|---|---|
| WO | WO 2014/027266 | 2/2014 |
| WO | WO2014153176 | 9/2014 |
| WO | WO2017004527 | 1/2017 |
| WO | WO 2017/051069 | 3/2017 |
| WO | WO2017054985 | 4/2017 |
| WO | WO 2018/051305 | 3/2018 |

OTHER PUBLICATIONS

Notice of Allowance in U.S. Appl. No. 15/949,749 dated Nov. 21, 2018.

International Search Report dated Dec. 3, 2018 for PCT/US2018/054609.

Written Opinion of the International Search Authority dated Dec. 3, 2018 for PCT/US2018/054609.

Wong et al., "RTI Q&A on Building the DDS Security Standard." (Aug. 11, 2014), at http://www.electronicdesign.com/dev-tools/rti-qa-building-dds-security-standard (downloaded May 10, 2017).

Pardo-Castellote G. et al., "Securing access to Distributed Pub-Sub Information in a System-of-Systems and GIG Environment." Real-Time Innovations, Inc. (May 2010).

Department of Homeland Security, "Security Tenets for Life Critical Embedded Systems." (Nov. 20, 2015), at https://www.dhs.gov/publication/security-tenets-lces (downloaded Dec. 18, 2017).

Arxan, "Securing DRM and Multimedia Applications through Guard Technology." (Jul. 22, 2011), at https://www.sysbus.eu/wp-content/uploads/2016/08/Securing_DRM_and_Multimedia_App.indd_.pdf (downloaded Dec. 18, 2017).

Arxan, "Securing Cryptographic Keys." (Sep. 4, 2017), at https://www.arxan.com/wp-content/uploads/2016/07/Securing-Cryptographic-Keys.pdf (downloaded Dec. 18, 2017).

Bakker, "Enforcing a network-wide security policy using SDN." School of Engineering and Computer Science Te Kura Matai Pukaha, Purorohiko (2015).

"Implementation of an SSL Proxy in a Software Defined Network Aboard a Naval Ship to Monitor Internet Traffic." (2015) at https://events.static.linuxfound.org/sites/events/files/slides/SDN%20SSL%20Proxy%20Pat%20Dyroff.pdf (downloaded Dec. 18, 2017).

Ahmad et al., "Security in Software Defined Networks: A Survey." *IEEE Communication Surveys & Tutorials*, 17(4) (2015) 2317-2346.

Mukherjee et al., "Design and build secure IoT solutions, Part 2: Securing IoT data over the network." IBM (Apr. 28, 2017).

Park et al., "Mutual Authentication Scheme in Secure Internet of Things Technology for Comfortable Lifestyle." *Sensors* 16 (2016) 20.

Youssef et al., "Data Distribution Service-Based Interoperability Framework for Smart Grid Testbed Infrastructure." *Energies* 9 (2016) 150.

Object Management Group, "The Real-time Publish-Subscribe Protocol (RTPS) DDS Interoperability Wire Protocol Specification, Version 2.2." (Sep. 2014).

Object Management Group, "DDS Security, Version 1.0." (Sep. 2016).

Gervais, "Security Analysis of Industrial Control Systems." Master's Thesis, KTH Stockholm and Aalto University (Jun. 29, 2012).

Lin et al., "IoT Privacy and Security Challenges for Smart Home Environments." *Information* 7 (2016) 44.

Bedrock Automation, "White Paper Series—Chapter One." (Dec. 1, 2014).

Bedrock Automation, "White Paper Series—Chapter Two." (Mar. 23, 2015).

Bedrock Automation, "White Paper Series—Chapter Three." (Apr. 19, 2016).

Real-Time Innovations, Security Solutions. (2012).

Soroush et al., "Next-generation Cybersecurity for Advanced Real-time Distributed Systems." NSWCDD/PN-15/143 (Mar. 2015).

RTI News Releases, "RTI and Tresys Join Forces With Wind River to Announce Innovative CADRE Architecture for Building Flexible, Cost-Effective Secure Cross-Domain Solutions." at http://news.rti.com/pr/tresys-cds-framework (May 2, 2011) (downloaded Apr. 23, 2017).

OneM2M, "Security Solutions Doc. No. TS-0003-V3.3.1." (2017).

Mocana, "White Paper: Hardening the IoT Stack" (Aug. 22, 2017). Available at https://www.mocana.com/hardening-the-iot-stack-lp.

Centrify, "Zero Trust Security: A New Paradigm for a Changing World" (May 21, 2018). Available at https://www.centrify.com/resources/zero-trust-security-a-new-paradigm-for-a-changing-world/.

Xage, "Decentralized and Adaptive Security for the new Industrial Edge" (Dec. 2017). http://info.xage.com/hubfs/whitepapers/xage_whitepaper_decentralized-adaptive-security.pdf.

U.S. Appl. No. 16/228,331, filed Dec. 20, 2018, Currently Pending.

Office Action in U.S. Appl. No. 16/153,448 dated Dec. 26, 2018.

Office Action in U.S. Appl. No. 16/153,491 dated Jan. 8, 2019.

International Search Report dated Dec. 27, 2018 for PCT/US2018/054602.

Written Opinion of the International Search Authority dated Dec. 27, 2018 for PCT/US2018/054602.

International Search Report dated Jan. 7, 2019 for PCT/US2018/054619.

Written Opinion of the International Search Authority dated Jan. 7, 2019 for PCT/US2018/054619.

International Search Report dated Jan. 2, 2019 for PCT/US2018/054622.

Written Opinion of the International Search Authority dated Jan. 2, 2019 for PCT/US2018/054622.

Notice of Allowance in U.S. Appl. No. 16/153,366 dated Jan. 11, 2019.

Lu R. et al., "Secure Provenance: The Essential of Bread and Butter of Data Forensics in Cloud Computing," Proceedings of the 5th ACM Symposium on Information, Computer and Communications Security (Apr. 13, 2010).

International Search Report dated Jan. 15, 2019 for PCT/US2018/054587.

Written Opinion of the International Search Authority dated Jan. 15, 2019 for PCT/US2018/054587.

Notice of Allowance in U.S. Appl. No. 15/949,749 dated Jan. 15, 2019.

International Search Report dated Nov. 7, 2018 for PCT/US2018/054593.

Written Opinion of the International Search Authority dated Nov. 7, 2018 for PCT/US2018/054593.

Office Action in U.S. Appl. No. 16/153,522 dated Feb. 1, 2019.

Office Action in U.S. Appl. No. 16/228,331 dated Mar. 19, 2019.

* cited by examiner

2400

SID1 2402

2404

| | 2408 | 2410 | 2412 | 2414 | 2416 | 2418 | 2420 | 2422 | 2424 | 2426 | 2428 | | |
|---|---|---|---|---|---|---|---|---|---|---|---|---|---|
| 2430 | NIC 001 | USER A | APP 1 | SID2 | USER D | APP 4 | 7001 | 12001 | 8001 | 13001 | 0001 | | |
| 2432 | NIC 001 | USER A | APP 2 | SID2 | USER D | APP 4 | – | – | 9002 | 14002 | 0001 | | |
| 2434 | – | USER B | APP 2 | SID3 | USER F | APP 5 | 7003 | 12003 | 9003 | 14003 | 0001 | | |
| | | | | | | | | | | | | | |
| | | | | | | | | | | | | | |
| | | | | | | | | | | | | | |
| | | | | | | | | | | | | | |

| | 2808 | 2810 | 2812 | 2814 | 2816 | 2818 | 2820 | 2822 | 2824 | |
|---|---|---|---|---|---|---|---|---|---|---|
| 2826 | SID(1) | NIC(1,1) | APP(A,T) | SID(2) | NIC(2,1) | APP(B,U) | 7001 | 12001 | 0001 | |
| 2828 | SID(3) | NIC(3,2) | APP(C,V) | SID(1) | NIC(1,2) | APP(D,T) | 8001 | 13001 | 0002 | |
| 2830 | SID(1) | NIC(1,1) | APP(A,T) | SID(2) | NIC(2,1) | APP(B,U) | 7002 | 12002 | 0003 | |
| | | | | | | | | | | |
| | | | | | | | | | | |
| | | | | | | | | | | |
| | | | | | | | | | | |

| | 3008 | 3010 | 3012 | 3014 | 3016 | 3018 | 3020 |
|---|---|---|---|---|---|---|---|
| 3022 | USER A | APP 1 | W | 6001 | 10001 | 7001 | 12001 |
| 3024 | USER B | APP 1 | W | 6002 | 10002 | 7002 | 12002 |
| 3026 | USER A | APP 2 | X | 6003 | 10003 | 7003 | 12003 |
| 3028 | USER A | APP 2 | Y | 6004 | 10004 | 7004 | 12004 |
| | USER C | APP 3 | Z | 6005 | 10005 | 7005 | 12005 |

SID2 — 3602

3604

| | 3608 | 3610 | 3612 | 3614 | 3616 | 3618 | 3620 | 3622 | 3624 | 3626 |
|---|---|---|---|---|---|---|---|---|---|---|
| 3628 | 6001 | C | 10001 | NIC 002 | SID 1 | W | – | – | LAID 1 | RAID 1 |
| 3630 | 6009 | C | 10009 | NIC 003 | SID 4 | R | – | – | LAID 9 | RAID 9 |
| 3632 | 6003 | C | 10003 | NIC 002 | SID 1 | R/W | 7003 | 12003 | LAID 3 | RAID 3 |

METHODS FOR INTERNET COMMUNICATION SECURITY

CROSS REFERENCE TO RELATED APPLICATION

This application is a continuation-in-part of U.S. application Ser. No. 15/949,749, filed Apr. 10, 2018, and this application further claims the benefit of priority from U.S. Provisional Application No. 62/731,529, filed Sep. 14, 2018, U.S. Provisional Application No. 62/655,633, filed Apr. 10, 2018, U.S. Provisional Application No. 62/609,252, filed Dec. 21, 2017, U.S. Provisional Application No. 62/609,152, filed Dec. 21, 2017, and U.S. Provisional Application No. 62/569,300, filed Oct. 6, 2017. All of the foregoing related applications (hereinafter referred to as the "REFERENCE APPLICATIONS"), in their entirety, are incorporated herein by reference.

FIELD OF THE INVENTION

The present disclosure relates to systems, methods, and apparatuses to secure computer networks against network-borne security threats.

BACKGROUND OF THE INVENTION

Considerable advances are being made in technologies for protected, trusted, Ethernet-based communications in the presence of malware attack vectors. See, for example, the REFERENCE APPLICATIONS. While such technologies have been applied to bare metal clients and servers, there remains a further need to address security threats that can arise during hypervisor-mediated communications. In such an environment, malware may target applications in virtual machines either directly or through the hypervisor. Malware configured to exploit security shortcomings in hypervisors, for example through holes in memory management, have the potential to compromise a series of virtual machines. Given the critical role virtualization plays in modern computing and communications, there is a pressing need for approaches to immunize, or to at least limit the risks attendant to, communications between virtual machines and remote computing infrastructure.

The present disclosure relates, in certain embodiments, to methods, systems, products, communication management operations, software, middleware, computing infrastructure and/or apparatus applicable for protecting virtual machines and hypervisors through a network security layer resident in the hypervisor that authenticates and authorizes incoming communications before transmission to virtualized components.

BRIEF SUMMARY OF THE INVENTION

Certain embodiments may provide, for example, a product for authorizing network communications in a hypervisor, the product comprising a non-transitory computer-readable storage medium having computer-readable program code embodied therein, the computer-readable program code executable in a hypervisor to perform communication management operations, the communication management operations comprising: i) intercepting a first network packet in the hypervisor, the first network packet comprising a first higher-than-OSI layer three portion; ii) decrypting, with a single-use cryptographic key, at least a portion of the first higher-than-OSI layer three portion to obtain one or more first packet parameters; iii) authorizing the first network packet in the hypervisor, comprising: comparing the one or more first packet parameters with one or more first expected values; and iv) passing the authorized first network packet to a virtual device.

A. In certain embodiments, for example, the communication management operations may further comprise: i) detecting negotiation of a secure communication pathway between a first remote node and the virtual device, the negotiation comprising a series of network packet communications between the first remote node and the virtual device; ii) aligning a series of cryptographic keys utilized in the hypervisor with a series of cryptographic keys utilized in the virtual device; iii) monitoring the series of network packet communications; and iv) confirming success of the negotiation prior to the passing the authorized first network packet. In certain embodiments, for example, the monitoring may comprise: a) detecting a nonpublic first identification code sent from the virtual device to a software port on the first remote node via a pre-established communication pathway; followed by b) further detecting a nonpublic second identification code sent from the remote node; and c) comparing the nonpublic second identification code with a pre-established value for the first remote node. In certain embodiments, for example, the pre-established value for the first remote node may be determined from a software port number assigned to the software port. In certain embodiments, for example, the monitoring may comprise: a) detecting a first application identification code for a first user-application sent from the virtual device to the first remote node via the pre-established communication pathway; followed by b) detecting a second application identification code for a second user-application sent from the first remote node; and c) comparing the second application identification code with a pre-established value for the second user-application. In certain embodiments, for example, the communication management operations may comprise: determining the pre-established value for the first remote node from the software port number. In certain embodiments, for example, the communication management operations may comprise: determining the one or more first expected values from a one-to-one correspondence with an n-tuple (as referred to herein, an n-tuple may be, for example, an at least a 2-tuple, an at least a 3-tuple, an at least a 5-tuple, an at least a 6-tuple, an at least an 8-tuple, an at least a 10-tuple, or an at least a 12-tuple) comprising the one or more first expected values, a destination port number of the first network packet, and a destination network address of the first network packet. In certain embodiments, for example, the one or more first packet parameters may comprise a source application identification code, the source application identification code referencing a source application program for the first network packet. In certain embodiments, for example, the one or more first packet parameters may comprise a data model identification code. In certain embodiments, for example, the communication management operations may comprise: confirming at least a portion of a payload of the first network packet conforms to a data range, the data range determined from the data model identification code. In certain embodiments, for example, the communication management operations may comprise: confirming at least a portion of the payload of the first network packet conforms to a command type restriction, the command type restriction determined from the data model identification code. In certain embodiments, for example, the communication management operations may comprise: translating a first payload of the first network packet from a first pre-established format to a second pre-established format, the first pre-established format and the second pre-established format determined from the data model identification code and/or the destination port number. In certain embodiments, for example, the communication management operations may comprise: obtaining the one-to-one correspondence from an encrypted file loaded into memory of the hypervisor. In certain embodiments, for example, the communication management operations may comprise: obtaining the one-to-one correspondence from the virtual device via at least one encrypted communication pathway.

B. In certain embodiments, for example, the communication management operations may comprise: i) intercepting a second network packet in the hypervisor, the second network packet ingressed from the virtual device, the second network packet comprising a second higher-than-OSI layer three portion; ii) decrypting, with a single-use cryptographic key, at least a portion of the second higher-than-OSI layer three portion to obtain at least one packet parameter; iii) authorizing the second network packet in the hypervisor, comprising: comparing the one or more second packet parameters with one or more second expected values; and iv) passing the authorized second network packet to a remote second node.

C. In certain embodiments, for example, the virtual device may be a virtual machine. In certain embodiments, for example, the virtual device may be a container.

D. In certain embodiments, for example, the communication management operations may comprise: obtaining the at least one packet parameter from a payload of the first network packet.

E. In certain embodiments, for example, the first remote node may be a bare metal device. In certain embodiments, for example, the first remote node may be a further virtual device.

F. In certain embodiments, for example, the hypervisor may provide at least one virtual interface to the virtual device.

G. In certain embodiments, for example, the communication management operations may be configured for a Type 1 hypervisor. In certain embodiments, for example, the communication management operations may be configured for a Type 2 hypervisor.

H. In certain embodiments, for example, the communication management operations may be transparent to the virtual device and all computer programs running on the virtual device.

Certain embodiments may provide, for example, adaptations of methods, systems, products, communication management operations, software, middleware, computing infrastructure and/or apparatus disclosed herein and/or in one of the REFERENCE APPLICATIONS, or portions thereof, for use in a hypervisor (for example a Type 1 or Type 2 hypervisor), either alone or in cooperative configuration with one or more virtual machines in communication with the hypervisor (for example one or more virtual machines instantiated by the hypervisor). In certain embodiments, for example, certain methods, systems, products, communication management operations, software, middleware, computing infrastructure and/or apparatus disclosed herein and/or in one of the REFERENCE APPLICATIONS, or portions thereof, may be incorporated in a hypervisor to prevent malware present in the hypervisor (for example malware configured to exploit bugs, holes, or flaws in hypervisor software) from compromising the security of virtual and/or physical machines in communication with the hypervisor. In certain embodiments, for example, the methods, systems, products, communication management operations, software, middleware, computing infrastructure and/or apparatus disclosed herein and/or in one of the REFERENCE APPLICATIONS may be adapted to thwart malware or network-based attacks on virtual machines. In certain embodiments, for example, network security software disclosed herein and/or in one of the REFERENCE APPLICATIONS may be adapted for use in the hypervisor. In certain further embodiments, for example, the adapted network security software may be cooperatively configured with network security software disclosed herein and/or in one of the REFERENCE APPLICATIONS that is running in a virtual machine in communication with the hypervisor (for example in communication via one or more virtual interfaces). In certain embodiments, for example, the adapted network security software may perform a portion or all of the network security functions performed by the network security software. In certain embodiments, for example, network security functions may be split between the adapted network security software and the network security software. In certain embodiments, for example, the adapted network security software may perform and/or replicate a portion or all of the network security functions performed by the network security software. In certain embodiments, for example, the network security software may provide network connection data to the adapted network security software to enable the adapted network security software to perform its functions. In certain embodiments, for example, the adapted network security software may utilize resources of the network security software to perform its functions.

Certain embodiments may provide, for example, a method for network packet payload authorization. In certain embodiments, for example, the method may comprise authorizing the network packet in a hypervisor, comprising: comparing a predetermined portion of the network packet with at least one expected value, the predetermined portion a higher-than-OSI layer three portion of the network packet. In certain embodiments, for example, the method may comprise passing the authorized network packet to a virtual machine.

A. In certain embodiments, for example, the network packet may traverse a Physical Network Interface Controller (PNIC) prior to the authorizing. In certain embodiments, for example, the PNIC may be controlled by a hypervisor driver. In certain embodiments, for example, the network packet may be an inbound network packet received by the PNIC from a network.

B. In certain embodiments, for example, the network packet may not traverse a PNIC prior to the authorizing. In certain embodiments, for example, the network packet may be an outbound network packet transmitted from a further virtual machine, the further virtual machine different from the virtual machine.

C. In certain embodiments, for example, the network packet may traverse a Virtual Network Interface Controller (VNIC) prior to the authorizing. In certain embodiments, for example, at least a portion of the network packet payload may have been translated prior to traversing the VNIC. In certain embodiments, for example, at least a portion of the network packet payload may have been shredded prior to traversing the VNIC. In certain embodiments, for example, the network packet may traverse a PNIC after the authorizing. In certain embodiments, for example, the VNIC may provide a network communication interface to a further virtual machine, the further virtual machine different from the virtual machine.

D. In certain embodiments, for example, the network packet may traverse a passthrough driver prior to the authorizing. In certain embodiments, for example, the network packet may traverse a virtual switch. In certain embodiments, for example, the network packet may be a communication between the virtual machine and a further virtual machine. In certain embodiments, for example, the virtual machine and the further virtual machine may be connected via a virtual switch. In certain embodiments, for example, the network packet may traverse one or more of a physical network, public network (for example the public Internet, enterprise network, and a virtual network.

E. In certain embodiments, for example, the virtual machine may utilizes a VNIC provided by the hypervisor. In certain embodiments, for example, the virtual machine may be instantiated by the hypervisor. In certain embodiments, for example, the hypervisor may provide a virtual hardware platform to an Operating System (OS) running on the virtual machine. In certain embodiments, for example, the authorized network packet may be passed from the hypervisor to the virtual machine via a VNIC or a passthrough NIC. In certain embodiments, for example, the virtual machine may utilize a passthrough driver provided by the hypervisor. In certain embodiments, for example, at least a portion of a payload of the network packet may not be encrypted. In certain embodiments, for example, the predetermined portion of the network packet may be encrypted. In certain embodiments, for example, the predetermined portion of the network packet may be encrypted and at least a portion of a payload of the network packet may not be encrypted.

F. In certain embodiments, for example, the authorizing may comprise verifying that the network packet is received on an authorized communication pathway. In certain embodiments, for example, the authorized communication pathway may be an encrypted communication pathway. In certain embodiments, for example, the authorized communication pathway may provide encryption for at least a portion of a payload of the network packet. In certain embodiments, for example, the authorized communication pathway may provide encryption for at least a portion of a payload of the network packet. In certain embodiments, for example, the authorized communication pathway may provide encryption for the predetermined portion of the network packet. In certain embodiments, for example, the authorized communication pathway may provide encryption for the predetermined portion of the network packet and may not provide encryption for at least a portion of a payload of the network packet. In certain embodiments, for example, the authorized communication pathway may be an encrypted network tunnel. In certain embodiments, for example, the authorized communication pathway may comprise at least a portion of a data pathway, the data pathway exclusively transporting data having a predetermined data type between a source process running on a remote node and a destination process running on the virtual machine. In certain embodiments, for example, the data pathway may exclusively transport data to and/or from a predetermined first application having a predetermined first user from and/or to a predetermined second application having a predetermined second user. In certain embodiments, for example, the data pathway may exclusively transport data to a predetermined first application having a predetermined first user from a predetermined second application having a predetermined second user. In certain embodiments, for example, the data pathway may exclusively transport data from a predetermined first application having a predetermined first user to a predetermined second application having a predetermined second user.

G. In certain embodiments, for example, the hypervisor may be a Type 1 hypervisor. In certain embodiments, for example, the hypervisor may be a Type 2 hypervisor.

H. In certain embodiments, for example, the predetermined portion may comprise one or more of the metadata, application process and data protocol metadata, identification codes, application identifiers, process identifiers, application process identifiers, user identifiers and/or codes, owner codes, user-application identifiers, process owner identifiers, application process identifiers, user-application process identifiers, data protocol identifiers and/or descriptors, payload data type descriptors and/or identifiers, payload data descriptors, file identification codes, policy identification codes, node identifiers and/or identification codes, device identifiers and/or codes, n-tuples and the like disclosed herein or in one or more of the REFERENCE APPLICATIONS. In certain embodiments, for example, the predetermined portion of the network packet may comprise a payload of the network packet. In certain embodiments, for example, the predetermined portion of the network packet may comprise a higher-than-OSI layer four portion of the network packet. In certain embodiments, for example, the predetermined portion of the network packet may be a portion or all of a protocol header present in the network packet. In certain embodiments, for example, the protocol header may be a network security protocol header. In certain embodiments, for example, the network security protocol header may be embedded in a TCP segment of the network packet. In certain embodiments, for example, the network security protocol header may be embedded in a UDP segment of the network packet. In certain embodiments, for example, the network security protocol header may be embedded in a payload of the network packet.

I. In certain embodiments, for example, the at least one expected value may comprise a packet type identifier.

J. In certain embodiments, for example, the packet type identifier may identify (for example identify to the hypervisor) a connection request network packet and/or a connection request response (or acknowledgement) network packet. In certain embodiments, for example, the packet type identifier may identify a type of network packet expected (for example expected by the hypervisor) when a connection between the virtual machine and a remote node has been established but is not authorized to receive data from and/or to transmit data to an application port of an application running on the virtual machine.

K. In certain embodiments, for example, the packet type identifier may identify a type of network packet expected when a connection between the virtual machine and a remote node has been established, but the remote node has not been authorized for exchanging data with the virtual machine and a remote process responsible for sending the network packet (and optionally the type of data being transmitted) has not been authorized to receive data from and/or to transmit data to an application port for an application running on the virtual machine.

L. In certain embodiments, for example, the expected network packet may be a remote node identification packet. In certain embodiments, for example, the remote node identification packet may comprise a remote node identification code (and/or one or more of the metadata, file identification codes, policy identification codes, node identifiers and/or identification codes, device identifiers and/or codes, n-tuples and the like or in one or more of the REFERENCE APPLICATIONS). In certain embodiments, for example, the remote node identification code may be encrypted. In certain embodiments, for example, the remote node identification code may comprise a nonpublic portion or may be entirely nonpublic. In certain embodiments, for example, the remote node identification code may comprise a shared secret between the virtual machine and the remote node.

M. In certain embodiments, for example, the expected network packet may be a remote process identification packet. In certain embodiments, for example, the remote process identification packet may comprise an application identification code (and/or one or more of the metadata, application process and data protocol metadata, identification codes, application identifiers, process identifiers, application process identifiers, n-tuples and the like or in one or more of the REFERENCE APPLICATIONS). In certain embodiments, for example, the application identification code may be encrypted. In certain embodiments, for example, the application identification code may comprise a nonpublic portion or may be entirely nonpublic. In certain embodiments, for example, the application identification code may comprise a shared secret between the virtual machine and the remote node. In certain embodiments, for example, the remote process identification packet may comprise an application user code (and/or one or more of the metadata, user identifiers and/or codes, owner codes, user-application identifiers, process owner identifiers, identifiers, application process identifiers, user-application process identifiers, n-tuples and the like or in one or more of the REFERENCE APPLICATIONS). In certain embodiments, for example, the application user code may be encrypted. In certain embodiments, for example, the application user code may comprise a nonpublic portion or may be entirely nonpublic. In certain embodiments, for example, the application user code may comprise a shared secret between the virtual machine and the remote node. In certain embodiments, for example, the remote process identification packet may comprise a data type identifier (and/or one or more of the metadata, identifiers, data protocol identifiers and/or descriptors, payload data type descriptors and/or identifiers, payload data descriptors, file identification codes, policy identification codes, node identifiers and/or identification codes, device identifiers and/or codes, n-tuples and the like or in one or more of the REFERENCE APPLICATIONS). In certain embodiments, for example, the data type identifier may be encrypted. In certain embodiments, for example, the data type identifier may comprise a nonpublic portion or may be entirely nonpublic. In certain embodiments, for example, the data type identifier may comprise a shared secret between the virtual machine and the remote node.

N. In certain embodiments, for example, the packet type identifier may identify a type of network packet expected when a connection between the virtual machine and a remote node has been established and a remote process responsible for sending the network packet (and optionally the type of data being transmitted) has been authorized to receive data from and/or to transmit data to an application port for an application running on the virtual machine, but the remote node has not been authorized for exchanging data with the virtual machine. In certain embodiments, for example, the expected network packet may be a remote node identification packet (for example one of the remote node identifications packets described herein).

O. In certain embodiments, for example, the packet type identifier may identify a type of network packet expected when a connection between the virtual machine and a remote node has been established, the remote node has been authorized for exchanging data with the virtual machine, but a remote process responsible for sending the network packet (and optionally the type of data being transmitted) has not been authorized to receive data from and/or to transmit data to an application port for an application running on the virtual machine. In certain embodiments, for example, the expected network packet may be a remote process identification packet (for example one of the remote process identification packets or in one or more of the REFERENCE APPLICATIONS).

P. In certain embodiments, for example, the packet type identifier may identify a type of network packet expected when a connection between the virtual machine and a remote node has been established, the remote node has been authorized for exchanging data with the virtual machine, and a remote process responsible for sending the network packet (and optionally the type of data being transmitted) has been authorized to receive data from and/or to transmit data to an application port for an application running on the virtual machine.

Q. In certain embodiments, for example, the at least one expected value may comprise a remote node identification code (for example one of the remote node identification codes or in one or more of the REFERENCE APPLICATIONS). In certain embodiments, for example, the at least one expected value may comprise an application identification code, an application user code, a data type identifier, or two or more of the foregoing.

R. In certain embodiments, for example, the method may further comprise transmitting the at least one expected value from the virtual machine to the hypervisor. In certain further embodiments, for example, the at least one expected value may be encrypted during the transmitting.

S. In certain embodiments, for example, the method may further comprise the hypervisor loading the at least one expected value from a pre-provisioned configuration file.

T. In certain embodiments, for example, the expected value may depend on an application port for an application, the application running on the virtual machine.

U. In certain embodiments, for example, the comparing may further comprise decrypting the predetermined portion. In certain further embodiments, for example, the decrypting may further comprise decrypting the predetermined portion with a single-use cryptographic key.

Certain embodiments may provide, for example, a method for network packet payload authorization, comprising: i) authorizing the network packet in a hypervisor, comprising: comparing a predetermined portion of the network packet with at least one expected value, the predetermined portion a higher-than-OSI layer three portion of the network packet; and ii) passing the authorized network packet to a virtual machine.

Certain embodiments may provide, for example, a method for network packet payload authorization. In certain embodiments, for example, the method may comprise receiving a network packet at a hypervisor via a port-to-port communication pathway, the network packet comprising at least one packet parameter. In certain embodiments, for example, the method may comprise obtaining at least one higher-than-OSI layer three connection status parameter for the port-to-port communication pathway from a virtual machine. In certain embodiments, for example, the method may comprise authorizing the network packet in the hypervisor, comprising: comparing the at least one packet parameter with the at least one higher-than-OSI layer three connection status parameter. In certain embodiments, for example, the method may comprise passing the authorized network packet to a virtual machine.

A. In certain embodiments, for example, the port-to-port communication pathway may extend from a software port on a remote node to a software port on the virtual machine.

B. In certain embodiments, for example, the at least one packet parameter may be encrypted.

C. In certain embodiments, for example, the at least one packet parameter may be present in a higher-than-OSI layer three header, the header detected and processed by network security software running in the hypervisor, the at least one packet parameter identifying the network packet as a remote node identification packet. In certain embodiments, for example, the network packet may further comprise a remote node identification code. In certain embodiments, for example, the remote node identification code may be encrypted with the at least one packet parameter. In certain embodiments, for example, the remote node identification code may be present in a payload of the network packet.

D. In certain embodiments, for example, the at least one packet parameter may be present in a higher-than-OSI layer three header, the header detected and processed by network security software running in the hypervisor, the at least one packet parameter identifying the network packet as a remote process identification packet. In certain embodiments, for example, the remote process identification packet may further comprise one or more of an application identification code, an application user code, and a data type identifier. In certain embodiments, for example, the one or more of an application identification code, an application user code, and a data type identifier may be encrypted with the at least one packet parameter. In certain embodiments, for example, the one or more of an application identification code, an application user code, and a data type identifier is present in a payload of the network packet.

E. In certain embodiments, for example, the at least one packet parameter may be present in a higher-than-OSI layer three header, the header detected and processed by network security software running in the hypervisor, the at least one packet parameter identifying the network packet as an application data packet. In certain embodiments, for example, the at least one packet parameter may comprise one or more of an application identification code, an application user code, and a data type identifier. In certain embodiments, for example, the one or more of an application identification code, an application user code, and a data type identifier may be encrypted. In certain embodiments, for example, the at least one packet parameter may be present in a payload of the network packet.

F. In certain embodiments, for example, the at least one connection status parameter may identify a type of network packet expected at an application port of an application running in the virtual machine from a software port of a remote process running in a remote node. In certain embodiments, for example, the at least one connection status parameter may comprise a first value and the type of network packet expected may be a remote node identification packet. In certain embodiments, for example, the at least one connection status parameter may comprise a second value and the type of network packet expected may be a remote process identification packet. In certain embodiments, for example, the at least one connection status parameter may comprise a third value and the type of network packet expected is an open connection data packet. In certain embodiments, for example, the at least one connection status parameter may specify that the port-to-port communication pathway is closed to network packet traffic.

Certain embodiments may provide, for example, a method for network packet payload authorization, comprising: i) receiving a network packet at a hypervisor via a port-to-port communication pathway, the network packet comprising at least one packet parameter; ii) obtaining at least one higher-than-OSI layer three connection status parameter for the port-to-port communication pathway from a virtual machine; iii) authorizing the network packet in the hypervisor, comprising: comparing the at least one packet parameter with the at least one higher-than-OSI layer three connection status parameter; and iv) passing the authorized network packet to a virtual machine.

Certain embodiments may provide, for example, a method for network packet payload authorization. In certain embodiments, for example, the method may comprise intercepting a network packet in a hypervisor, the network packet comprising a higher-than-OSI layer three packet. In certain embodiments, for example, the method may comprise decrypting, with a single-use cryptographic key (for example according to one of the cryptographic methods or in one or more of the REFERENCE APPLICATIONS), at least a portion of the higher-than-OSI layer three packet to obtain at least one packet parameter. In certain embodiments, for example, the method may comprise authorizing the network packet in the hypervisor, comprising: comparing the at least one packet parameter with at least one expected value. In certain embodiments, for example, the method may comprise passing the authorized network packet to a virtual machine.

A. In certain embodiments, for example, the single-use cryptographic key may be rotated (for example rotated once, twice, or more than two times) for use in decrypting a subsequent network packet. In certain embodiments, for example, the single-use cryptographic key may be synchronized with a further single-use cryptographic key in the virtual machine. In certain embodiments, for example, the single-use cryptographic key and the further single-use cryptographic key may be derived from common cryptographic primitives (including for example, nonpublic or secret cryptographic primitives). In certain embodiments, for example, the further single-use cryptographic key may be derived from one or more rotations of the single-use cryptographic key or vice versa.

Certain embodiments may provide, for example, a method for network packet payload authorization, comprising: i) intercepting a network packet in a hypervisor, the network packet comprising a higher-than-OSI layer three packet; ii) decrypting, with a single-use cryptographic key, at least a portion of the higher-than-OSI layer three packet to obtain at least one packet parameter; iii) authorizing the network packet in the hypervisor, comprising: comparing the at least one packet parameter with at least one expected value; and iv) passing the authorized network packet to a virtual machine.

Certain embodiments may provide, for example, a method for network packet payload authorization. In certain embodiments, for example, the method may comprise receiving a network packet at a hypervisor via a communication pathway. In certain embodiments, for example, the method may comprise obtaining a connection status indicator of the communication pathway from a virtual machine. In certain embodiments, for example, the method may comprise authorizing the network packet in the hypervisor, comprising: comparing at least one parameter obtained from the network packet with at least one expected value, the at least one expected value determined from the obtained connection status indicator. In certain embodiments, for example, the method may comprise transmitting the authorized network packet to the virtual machine.

A. In certain embodiments, for example, the at least one parameter may be a product of a hash function. In certain embodiments, for example, the at least one parameter may be a salted hash.

B. In certain embodiments, for example, the communication pathway may be an encrypted communication pathway. In certain embodiments, for example, the encrypted communication pathway may be encrypted relative to only a portion of a packet (for example encrypted relative to only a payload of the network packet, or encrypted relative to only a portion of a payload of a network packet. In certain embodiments, for example, the method may further comprise: decrypting a predetermined at least a portion of the payload to obtain the at least one parameter. In certain embodiments, for example, the predetermined at least a portion of the payload may be decrypted with at least one single-use cryptographic key. In certain embodiments, for example, the predetermined at least a portion of the payload may comprise at least a first encrypted portion and a second encrypted portion. In certain embodiments, for example, the first encrypted portion and the second encrypted portion may be decrypted with a common single-use cryptographic key. In certain embodiments, for example, the first encrypted portion may be decrypted using a first single-use cryptographic key and the second encrypted portion may be decrypted using a second single-use cryptographic key. In certain embodiments, for example, the second single-use cryptographic key may be obtained from one or more rotations of the first single-use cryptographic key.

C. In certain embodiments, for example, the method may further comprise: receiving an updated connection status indicator following the transmitting (or passing).

D. In certain embodiments, for example, the obtained (and/or updated) connection status indicator may be added to a list maintained by the hypervisor, the authorizing comprising the hypervisor consulting the list. In certain embodiments, for example, the list may be maintained in hypervisor memory. In certain embodiments, for example, the list may be maintained in hypervisor random access memory. In certain embodiments, for example, the list may be dynamic. In certain embodiments, for example, the list may comprise (a) virtual machine identification codes, (b) authorized destination port numbers, (c) remote application codes, and/or (d) connection status indicators. In certain embodiments, for example, at least a portion or all of the virtual machine identification codes, at least a portion of the authorized destination port numbers, and/or at least a portion of the remote application codes may be passed from one or more virtual machines to the hypervisor.

E. In certain embodiments, for example, at least a portion or all of the virtual machine identification codes, at least a portion of the authorized destination port numbers, and at least a portion of the remote application codes may be passed from one or more network security software resident on the one or more virtual machines to the hypervisor. In certain embodiments, for example, the one or more network security software may run in kernel space of the one or more virtual machines. In certain embodiments, for example, the hypervisor may not have access to nonvolatile storage media of the one or more virtual machines.

F. In certain embodiments, for example, at least a portion or all of the virtual machine identification codes, at least a portion of the authorized destination port numbers, and/or at least a portion of the remote application codes may be stored on nonvolatile storage media accessible by the hypervisor. In certain embodiments, for example, at least a portion or all of the virtual machine identification codes, at least a portion of the authorized destination port numbers, and/or at least a portion of the remote application codes may not be passed from may be passed from the one or more virtual machines to the hypervisor. In certain embodiments, for example, the authorized destination port numbers may be an exclusive list. In certain embodiments, for example, the list may comprise a series of records (or n-tuples), each record (or n-tuple) of the series of records (or n-tuples) comprising: (a) a virtual machine identification code, (b) an authorized destination port number, (c) a remote application code, and (d) a connection status indicator. In certain embodiments, for example, the remote application code may comprise an application identification code, an application user code, and/or a data type identifier.

G. In certain embodiments, for example, the connection status indicator may be interpretable by network security software to determine whether the virtual machine is open or closed to receiving a network packet containing data for an application running on the virtual machine. In certain embodiments, for example, the connection status indicator may be interpretable by network security software to determine whether the virtual machine is open or closed to receiving a remote node identification packet. In certain embodiments, for example, the virtual machine may transmit an updated connection status indicator to the hypervisor in response to the virtual machine receiving the remote node identification packet, the updated connection status indicator interpretable by network security software to determine whether the virtual machine is open or closed to receiving a remote application identification packet. In certain embodiments, for example, the connection status indicator may be interpretable by network security software to determine whether the virtual machine is open or closed to receiving a remote application identification packet. In certain embodiments, for example, the at least one parameter obtained from the network packet may be at least two parameters, the at least two parameters comprising a network address and at least one further parameter.

H. In certain embodiments, for example, the virtual machine may transmit an updated connection status indicator to the hypervisor in response to the virtual machine receiving the remote node identification packet, the updated connection status indicator interpretable by network security software to determine whether the virtual machine is open or closed to receiving a remote application identification packet. In certain embodiments, for example, the connection status indicator may be interpretable by network security software to determine whether the virtual machine is open or closed to receiving a remote application identification packet.

I. In certain embodiments, for example, the at least one parameter obtained from the network packet may be at least two parameters, the at least two parameters comprising a network address and at least one further parameter. In certain embodiments, for example, the network address may be a VNIC address (for example an IP address of a VNIC). In certain embodiments, for example, the network address may be a PNIC address (for example an IP address of a PNIC). In certain embodiments, for example, the at least one further parameter may comprise a user identifier, an application identifier, a data type identifier, or a combination of two or more of the foregoing identifiers. In certain embodiments, for example, the at least one further parameter may comprise a packet type identifier. In certain embodiments, for example, the at least one further parameter may comprise a packet type identifier, a nonpublic node identifier, or a combination the foregoing identifiers. In certain embodiments, for example, the at least one further parameter may comprise a packet type identifier, a user identifier, an application identifier, a data type identifier, or a combination of two or more of the foregoing identifiers.

J. In certain embodiments, for example, the authorizing may be performed by the hypervisor. In certain embodiments, for example, at least a portion of the authorizing may be performed by the virtual machine prior to passing the authorized network packet to the virtual machine. In certain embodiments, for example, the authorizing may comprise: passing at least a portion of the at least one obtained parameter to the virtual machine, followed by the hypervisor receiving a response from the virtual machine.

Certain embodiments may provide, for example, a method for network packet payload authorization, comprising: i) receiving a network packet at a hypervisor via a communication pathway; ii) obtaining a connection status indicator of the communication pathway from a virtual machine; iii) authorizing the network packet in the hypervisor, comprising: comparing at least one parameter obtained from the network packet with at least one expected value, the at least one expected value determined from the obtained connection status indicator; and iv) transmitting the authorized network packet to the virtual machine.

Certain embodiments may provide, for example, a method for managing network communication with a virtual machine, comprising: performing, in a hypervisor, at least one aspect of a packet payload authorization protocol, the at least one aspect performed on all network packets directed to software ports on at least one virtual machine.

A. In certain embodiments, for example, the at least one aspect may be performed on a network packet of the all network packets prior to passing the network packet to a VNIC. In certain embodiments, for example, the at least one aspect may replicate at least one aspect of the packet payload authorization protocol that is performed in the at least one virtual machine. In certain embodiments, for example, the at least one virtual machine may perform each aspect of the packet payload authorization protocol. In certain embodiments, for example, the at least one virtual machine may not perform each aspect of the packet payload authorization protocol. In certain embodiments, for example, the hypervisor and the at least one virtual machine may perform different aspects of the packet payload authorization protocol. In certain embodiments, for example, the hypervisor and the at least one virtual machine together may perform the packet payload authorization protocol. In certain embodiments, for example, the hypervisor and the at least one virtual machine together may perform the packet payload authorization protocol without duplicating any aspects of the packet payload authorization protocol.

B. In certain embodiments, for example, the hypervisor may use a resource of the at least one virtual machine in performing the at least one aspect.

C. In certain embodiments, for example, the at least one aspect may comprise: comparing a destination port numbers obtained from the network packets with at least one member of a list of authorized destination port numbers. In certain embodiments, for example, the list of authorized destination port numbers may correspond to software ports for the application on the at least one virtual machine. In certain embodiments, for example, the list of authorized destination port numbers may be an exclusive list of allowed destination port numbers for the at least one virtual machine.

D. In certain embodiments, for example, the at least one aspect may comprise: inspecting packet type identifiers present in higher-than-OSI level three portions of the network packets. In certain embodiments, for example, the at least one aspect may comprise: inspecting packet type identifiers present in payload portions of the network packets. In certain embodiments, for example, the at least one aspect may comprise: comparing packet type identifiers with expected values.

E. In certain embodiments, for example, the at least one aspect may comprise: inspecting remote node identification codes present in higher-than-OSI level three portions of the network packets. In certain embodiments, for example, the at least one aspect may comprise: inspecting remote node identification codes present in payload portions of the network packets. In certain embodiments, for example, the at least one aspect may comprise: comparing remote node identification codes with expected values.

F. In certain embodiments, for example, the at least one aspect may comprise: inspecting application identification codes present in higher-than-OSI level three portions of the network packets. In certain embodiments, for example, the at least one aspect may comprise: inspecting application identification codes present in payload portions of the network packets. In certain embodiments, for example, the at least one aspect may comprise: comparing application identification codes with expected values. In certain embodiments, for example, the at least one aspect may comprise inspecting application user codes present in higher-than-OSI level three portions of the network packets. In certain embodiments, for example, the at least one aspect may comprise inspecting application user codes present in payload portions of the network packets. In certain embodiments, for example, the at least one aspect may comprise comparing application user codes with expected values. In certain embodiments, for example, the at least one aspect may comprise inspecting data type identifiers present in higher-than-OSI level three portions of the network packets. In certain embodiments, for example, the at least one aspect may comprise inspecting data type identifiers present in payload portions of the network packets. In certain embodiments, for example, the at least one aspect may comprise comparing data type identifiers with expected values.

G. In certain embodiments, for example, the at least one virtual machine may execute in at least one host computer. In certain embodiments, for example, the all network packets may be received by at least one PNIC of the at least one host computer. In certain embodiments, for example, the hypervisor may be installed on at least one of the at least one host computer.

Certain embodiments may provide, for example, a method for managing network communication with a virtual machine, comprising: i) performing, in a hypervisor, at least one aspect of a packet payload authorization protocol, the at least one aspect comprising: a) obtaining at least one parameter from a higher-than-OSI layer three portion of a network packet; and b) authorizing the network packet, comprising: comparing the at least one parameter with an application identifier, an application user identifier, and a payload datatype identifier; and ii) transmitting the authorized network packet to the virtual machine.

A. In certain embodiments, for example, the at least one aspect may replicate at least one aspect performed in the virtual machine. In certain embodiments, for example, the virtual machine may perform each aspect of the packet payload authorization protocol. In certain embodiments, for example, the virtual machine may not perform each aspect of the packet payload authorization protocol. In certain embodiments, for example, the hypervisor and the virtual machine may perform different aspects of the packet payload authorization protocol. In certain embodiments, for example, the hypervisor and the virtual machine may together perform the packet payload authorization protocol. In certain embodiments, for example, the hypervisor and the virtual machine may together perform the packet payload authorization protocol without duplicating any aspects of the packet payload authorization protocol. In certain embodiments, for example, the hypervisor may use virtual machine resources to perform the at least one aspect.

B. In certain embodiments, for example, the transmitting may comprise passing the network packet to a VNIC. In certain embodiments, for example, the transmitting may comprise passing the network packet to a passthrough NIC.

Certain embodiments may provide, for example, a method for managing network communication with a virtual machine, comprising: i) performing, in a hypervisor, at least one aspect of a packet payload authorization protocol, the at least one aspect comprising: a) obtaining at least one parameter from a higher-than-OSI layer three portion of a network packet; and b) authorizing the network packet, comprising: comparing the at least one parameter with an application identifier, an application user identifier, and a payload datatype identifier; and ii) transmitting the authorized network packet to the virtual machine.

Certain embodiments may provide, for example, a method for managing network communication with a virtual machine. In certain embodiments, for example, the method may comprise obtaining, in a hypervisor, at least one authorization code. In certain embodiments, for example, the method may comprise performing, in the hypervisor, at least one aspect of a packet payload authorization protocol (for example replicating at least one aspect that is also performed in the virtual machine). In certain embodiments, for example, the at least one aspect may comprise obtaining at least one parameter from a higher-than-OSI layer three portion of a network packet. In certain embodiments, for example, the at least one aspect may comprise authorizing the network packet: comparing the at least one parameter with the at least one authorization code.

A. In certain embodiments, for example, the network packet may be received at a PNIC of a host computer in communication with the hypervisor. In certain embodiments, for example, the at least one authorization code may be obtained from the virtual machine. In certain embodiments, for example, the at least one authorization code may be obtained from a pre-provisioned configuration file directly accessed by the hypervisor. In certain embodiments, for example, the at least one authorization code may comprise access control information, the access control information limiting access to the virtual machine.

Certain embodiments may provide, for example, a method for managing network communication with a virtual machine, comprising: i) obtaining, in a hypervisor, at least one authorization code; and ii) performing, in the hypervisor, at least one aspect of a packet payload authorization protocol, the at least one aspect comprising: a) obtaining at least one parameter from a higher-than-OSI layer three portion of a network packet; and b) authorizing the network packet: comparing the at least one parameter with the at least one authorization code.

Certain embodiments may provide, for example, a method for managing network communication with a virtual machine. In certain embodiments, for example, the method may comprise pre-provisioning a first configuration file, the first configuration file accessible by the virtual machine, the first configuration file having a unique identification code. In certain embodiments, for example, the method may comprise searching, in a hypervisor, a list for a record containing the unique identification code, the record comprising at least one authorization code. In certain embodiments, for example, the method may comprise authorizing a network packet for transmission from the hypervisor to the virtual machine, comprising: comparing at least a portion of the network packet with the at least one authorization code.

A. In certain embodiments, for example, the hypervisor may receive information for populating the list from the first configuration file. In certain embodiments, for example, the first configuration file may be accessible by the hypervisor. In certain embodiments, for example, the first configuration file may be distributed across the virtual machine the hypervisor. In certain embodiments, for example, the hypervisor may receive information for populating the list from the virtual machine, the first configuration file comprising at least a portion of the information or a copy thereof. In certain embodiments, for example, the information may comprise a VNIC identifier (for example an IP address for the VNIC). In certain embodiments, for example, the information may comprise authorized software destination ports on the virtual machine. In certain embodiments, for example, the information may comprise remote application and/or data type identifiers.

B. In certain embodiments, for example, the method further may further comprise: pre-provisioning a second configuration file, the second configuration file comprising at least a portion of the list or a copy of the at least a portion of the list. In certain embodiments, for example, the authorizing may replicate at least one aspect of a packet payload authorization protocol performed by the virtual machine. In certain embodiments, for example, the first configuration file may comprise the at least one authorization code or a copy thereof. In certain embodiments, for example, the at least one authorization code may comprise an application identifier, an application user identifier, and/or a payload datatype identifier. In certain embodiments, for example, the method may further comprise: pre-provisioning a second configuration file accessible by the hypervisor. In certain embodiments, for example, the hypervisor may receive information for populating the list from the second configuration file.

Certain embodiments may provide, for example, a method for managing network communication with a virtual machine, comprising: i) pre-provisioning a first configuration file, the first configuration file accessible by the virtual machine, the first configuration file having a unique identification code; ii) searching, in a hypervisor, a list for a record containing the unique identification code, the record comprising at least one authorization code; and iii) authorizing a network packet for transmission from the hypervisor to the virtual machine, comprising: comparing at least a portion of the network packet with the at least one authorization code.

Certain embodiments may provide, for example, a product for managing communications in a host computer coupled to a network, the host computer having one or plural virtual machines and a hypervisor executing therein, the host computer including a physical network interface controller (NIC). In certain embodiments, for example, the product may comprise a non-transitory computer-readable storage medium having computer readable program code embodied therein executable (or compilable, linkable, and/or loadable to be executable) by a computing device executing an operating system (for example a Linux operating system, a Linux-based operating system, a real time operating system, a mini-operating system, an edge device operating system, and/or an open source operating system) to enable and/or cause the host computer to perform communication management operations. In certain embodiments, for example, the communication management operations may comprise: performing communication processing functions in the hypervisor on one or plural network-to-PNIC communications received by the host computer. In certain embodiments, for example, the performing communication processing functions may comprise obtaining a destination address, destination port number, and at least one further parameter from a network packet received by the physical NIC. In certain embodiments, for example, the performing communication processing functions may comprise: identifying at least one pre-provisioned authorization code associated with the destination network address and the destination port number, the at least one pre-provisioned authorization code comprising a pre-provisioned user-application identifier and a pre-provisioned payload data-type identifier. In certain embodiments, for example, the performing communication processing functions may comprise: authorizing transmission of the network packet to the destination address. In certain embodiments, for example, the authorizing may comprise comparing the at least one further parameter with the at least one pre-provisioned authorization code.

A. In certain embodiments, for example, the destination address may be associated with a virtual machine of the one or plural virtual machines. In certain embodiments, for example, the destination address may be a logical address of a VNIC. In certain embodiments, for example, the VNIC may reside on the host computer.

B. In certain embodiments, for example, the communication processing functions may further comprise receiving the at least one identified pre-provisioned authorization code from a physical or virtual machine associated with the destination address. In certain embodiments, for example, the at least one identified pre-provisioned authorization code may comprise a user identifier, an application identifier, a data type identifier, or a combination of two or more of the forgoing identifiers.

C. In certain embodiments, for example, the communication processing functions may further comprise receiving an update to the at least one identified pre-provisioned authorization code from a physical or virtual machine associated with the destination address. In certain embodiments, for example, the update to the at least one identified pre-provisioned authorization code may comprise a user identifier, an application identifier, a data type identifier, or a combination of two or more of the forgoing identifiers. In certain embodiments, for example, the authorizing may further comprise comparing the destination port number with an exclusive list of authorized port numbers for the destination address. In certain embodiments, for example, the communication processing functions may further comprise receiving an update to the exclusive list or an updated exclusive list from a physical or virtual machine associated with the destination address. In certain embodiments, for example, the communication processing functions may further comprise discarding and/or not transmitting the network packet from the hypervisor if the destination port number is not present on the exclusive list.

Certain embodiments may provide, for example, a product for managing communications in a host computer coupled to a network, the host computer having one or plural virtual machines and a hypervisor executing therein, the host computer including a physical network interface controller (NIC), the product comprising a non-transitory computer-readable storage medium having computer readable program code embodied therein executable (or compilable, linkable, and/or loadable to be executable) by a computing device executing an operating system (for example a Linux operating system, a Linux-based operating system, a real time operating system, a mini-operating system, an edge device operating system, and/or an open source operating system) to enable and/or cause the host computer to perform communication management operations, the communication management operations comprising: performing communication processing functions in the hypervisor on one or plural network-to-PNIC communications received by the host computer, the performing communication processing functions comprising: i) obtaining a destination address, destination port number, and at least one further parameter from a network packet received by the physical NIC; ii) identifying at least one pre-provisioned authorization code associated with the destination network address and the destination port number, the at least one pre-provisioned authorization code comprising a pre-provisioned user-application identifier and a pre-provisioned payload data-type identifier; and iii) authorizing transmission of the network packet to the destination address, comprising: comparing the at least one further parameter with the at least one pre-provisioned authorization code.

Certain embodiments may provide, for example, a method for network communication. In certain embodiments, for example, the method may comprise obtaining, in a hypervisor, a destination address, destination port number, and at least one further parameter from a network packet received by a physical NIC in communication with the hypervisor. In certain embodiments, for example, the method may comprise identifying at least one pre-provisioned authorization code associated with the destination network address and the destination port number, the at least one pre-provisioned authorization code comprising a pre-provisioned user-application identifier and a pre-provisioned payload data-type identifier. In certain embodiments, for example, the method may comprise authorizing transmission of the network packet to the destination address, comprising: comparing the at least one further parameter with the at least one pre-provisioned authorization code.

Certain embodiments may provide, for example, a method for network communication, comprising: i) obtaining, in a hypervisor, a destination address, destination port number, and at least one further parameter from a network packet received by a physical NIC in communication with the hypervisor; ii) identifying at least one pre-provisioned authorization code associated with the destination network address and the destination port number, the at least one pre-provisioned authorization code comprising a pre-provisioned user-application identifier and a pre-provisioned payload data-type identifier; and iii) authorizing transmission of the network packet to the destination address, comprising: comparing the at least one further parameter with the at least one pre-provisioned authorization code.

Certain embodiments may provide, for example, a method to secure network communications between a predefined node and a virtual machine via a hypervisor. In certain embodiments, for example, the method may comprise detecting, the hypervisor, establishment of a communication pathway between the node and the virtual machine. In certain embodiments, for example, the method may comprise confirming, prior to passing network packets to the virtual machine via the communication pathway, that the network packets are from a predefined authorized source process on the node and directed to predefined authorized destination processes on the virtual machine.

A. In certain embodiments, for example, the communication pathway may be an encrypted communication pathway. In certain embodiments, for example, the method may further comprise obtaining, in the hypervisor, at least one cryptographic key for decrypting network packets received via the encrypted communication pathway. In certain embodiments, for example, the at least one cryptographic key may be pre-provisioned to be accessible by the hypervisor. In certain embodiments, for example, the at least one pre-provisioned cryptographic key may be obtained from the virtual machine. In certain embodiments, for example, the at least one pre-provisioned cryptographic key may be derived from one or more cryptographic primitives provided by the virtual machine. In certain embodiments, for example, the at least one pre-provisioned cryptographic key may be obtained from or derived from the contents of a file, the file accessible by the hypervisor. In certain embodiments, for example, the detecting may be passive.

Certain embodiments may provide, for example, a method to secure network communications between a predefined node and a virtual machine via a hypervisor, comprising: i) the hypervisor detecting establishment of a communication pathway between the node and the virtual machine; and iii) confirming, prior to passing network packets to the virtual machine via the communication pathway, that the network packets are from a predefined authorized source process on the node and directed to predefined authorized destination processes on the virtual machine.

Certain embodiments may provide, for example, a method for a hypervisor to secure network communications, comprising: i) detecting establishment of network-to-port communication pathways traversing the hypervisor; and ii) verifying, prior to transmitting application data via the network-to-port communication pathways, that the network-to-port communication pathways have authorized destination port endpoints, comprising: verifying that destination port endpoints of received network packets are present on a pre-provisioned, exclusive list of authorized ports.

A. In certain embodiments, for example, the exclusive list may comprise parameters for an access control policy in the hypervisor for communications between source processes and destination processes. In certain embodiments, for example, the parameters may comprise port numbers for the authorized destination port endpoints. In certain embodiments, for example, the parameters may comprise identifiers for authorized virtual machines. In certain embodiments, for example, the parameters may comprise source process identifiers. In certain embodiments, for example, the parameters may comprise application data type identifiers. In certain embodiments, for example, the parameters may comprise connection status indicators for the network to port communication pathways. In certain embodiments, for example, the parameters may comprise cryptographic parameters for the network-to-port communication pathways.

B. In certain embodiments, for example, the port-to-port communication pathways may be encrypted. In certain embodiments, for example, the verifying may comprise successfully decrypting at least a portion of the data. In certain embodiments, for example, the data may be network packet payload data.

C. In certain embodiments, for example, a destination port endpoint of at least one of the network-to-port communication pathways may be a software port on a virtual machine. In certain embodiments, for example, the virtual machine may be instantiated by the hypervisor.

Certain embodiments may provide, for example, a method for a hypervisor to secure network communications, comprising: i) detecting establishment of network-to-port communication pathways traversing the hypervisor; and ii) verifying, prior to transmitting any application data via the network-to-port communication pathways, that the network-to-port communication pathways have authorized destination port endpoints, comprising: verifying that destination port endpoints of received network packets are present on a pre-provisioned, exclusive list of authorized ports.

Certain embodiments may provide, for example, a method for managing network communication with a virtual machine. In certain embodiments, for example, the method may comprise decrypting, in a hypervisor, a first encrypted portion of a network packet with a first decryption key, the network packet directed to a destination port of an application space process on the virtual machine. In certain embodiments, for example, the method may comprise comparing the decrypted first portion with an expected value, the expected value based on the destination port. In certain embodiments, for example, the method may comprise decrypting, in the virtual machine, a second encrypted portion of the network packet with a second decryption key, the second decryption key obtained by one or more rotations of the first decryption key.

A. In certain embodiments, for example, the first encrypted portion and the second encrypted portion may be the same portion of the network packet. In certain embodiments, for example, the first encrypted portion and the second encrypted portion may be different portions of the network packet.

B. In certain embodiments, for example, the hypervisor may instantiate the virtual machine.

C. In certain embodiments, for example, the comparing may be performed by the virtual machine. In certain embodiments, for example, a result of the comparing may be passed from the virtual machine to the hypervisor prior to the network packet being routed to the virtual machine. In certain embodiments, for example, the comparing may be performed by the hypervisor. In certain embodiments, for example, the virtual machine may replicate the comparing.

D. In certain embodiments, for example, the method may further comprise passing the network packet from the hypervisor to the virtual machine.

E. In certain embodiments, for example, the comparing may be performed before the passing.

Certain embodiments may provide, for example, a method for managing network communication with a virtual machine, comprising: i) decrypting, in a hypervisor, a first encrypted portion of a network packet with a first decryption key, the network packet directed to a destination port of an application space process on the virtual machine; ii) comparing the decrypted first portion with an expected value, the expected value based on the destination port; and iii) decrypting, in the virtual machine, a second encrypted portion of the network packet with a second decryption key, the second decryption key obtained by one or more rotations of the first decryption key.

Certain embodiments may provide, for example, a method for managing network communication with a virtual machine. In certain embodiments, for example, the method may comprise inspecting, in a hypervisor, a network packet to obtain a destination port number and an application identifier. In certain embodiments, for example, the method may comprise consulting a first authorization policy to verify that the application identifier is associated with an application authorized to send data to a port having the destination port number. In certain embodiments, for example, the method may comprise consulting, in the virtual machine, a second authorization policy prior to transmitting a payload of the network packet to the destination port.

A. In certain embodiments, for example, the consulting may be performed by the hypervisor.

B. In certain embodiments, for example, the application identifier may comprise a user identifier. In certain embodiments, for example, the application identifier may comprise a data type identifier. In certain embodiments, for example, the application identifier may be obtained from a payload of the network packet. In certain embodiments, for example, the application identifier may be encrypted with a single-use encryption key in the network packet.

C. In certain embodiments, for example, the second authorization policy may be the same as the second authorization policy. In certain embodiments, for example, the second authorization policy may be the different from the second authorization policy. In certain embodiments, for example, the second authorization policy may overlap with the second authorization policy. In certain embodiments, for example, the second authorization policy may be a subset of the second authorization policy. In certain embodiments, for example, the second authorization policy may define which nodes are authorized to send data to the virtual machine.

Certain embodiments may provide, for example, a method for managing network communication with a virtual machine, comprising: i) inspecting, in a hypervisor, a network packet to obtain a destination port number and an application identifier; ii) consulting a first authorization policy to verify that the application identifier is associated with an application authorized to send data to a port having the destination port number; and iii) consulting, in the virtual machine, a second authorization policy prior to transmitting a payload of the network packet to the destination port.

Certain embodiments may provide, for example, a method for managing network communication with a virtual machine. In certain embodiments, for example, the method may comprise checking, in a hypervisor, a connection status indicator for an encrypted communication pathway upon receiving a network packet via the encrypted communication pathway. In certain embodiments, for example, the method may comprise inspecting, the virtual machine, the payload of the network packet to verify that the payload is authorized to be transmitted to a port having the destination port number of the network packet. In certain embodiments, for example, the method may comprise transmitting an updated connection status indicator for the encrypted communication pathway from the virtual machine to the hypervisor. In certain embodiments, for example, the inspecting may follow the checking. In certain embodiments, for example, the transmitting may follow the inspecting. In certain embodiments, for example, the updated connection status indicator may be determined based at least in part on results of the inspecting.

A. In certain embodiments, for example, the inspecting may follow the checking. In certain embodiments, for example, the transmitting may follow the inspecting. In certain embodiments, for example, the inspecting may follow the checking, and the transmitting may follow the inspecting.

Certain embodiments may provide, for example, a method for managing network communication with a virtual machine, comprising: i) checking, in a hypervisor, a connection status indicator for an encrypted communication pathway upon receiving a network packet via the encrypted communication pathway; ii) inspecting, the virtual machine, the payload of the network packet to verify that the payload is authorized to be transmitted to a port having the destination port number of the network packet; and iii) transmitting an updated connection status indicator for the encrypted communication pathway from the virtual machine to the hypervisor.

Certain embodiments may provide, for example, a method for managing network communication with a virtual machine. In certain embodiments, for example, the method may comprise transmitting, from the virtual machine to a hypervisor, a connection status parameter for a port-to-port communication pathway. In certain embodiments, for example, the method may comprise receiving a network packet at the hypervisor via the port-to-port communication pathway. In certain embodiments, for example, the method may comprise obtaining a packet parameter from the network packet. In certain embodiments, for example, the method may comprise verifying the packet parameter matches an expected value based on the connection status parameter. In certain embodiments, for example, the method may comprise passing the network packet from the hypervisor to the virtual machine. In certain embodiments, for example, the method may comprise further passing, from the virtual machine, an updated connection status parameter for the port-to-port communication pathway to the hypervisor. In certain embodiments, for example, the passing may follow the verifying. In certain embodiments, for example, the further passing may follow the passing.

Certain embodiments may provide, for example, a method for managing network communication with a virtual machine. In certain embodiments, for example, the method may comprise: i) transmitting, from the virtual machine to a hypervisor, a connection status parameter for a port-to-port communication pathway; ii) receiving a network packet at the hypervisor via the port-to-port communication pathway; iii) obtaining a packet parameter from the network packet; iv) verifying the packet parameter matches an expected value based on the connection status parameter; and v) passing the network packet from the hypervisor to the virtual machine.

A. In certain embodiments, for example, the passing may follow the verifying. In certain embodiments, for example, the method may further comprise (for example the passing may be followed by: further passing, from the virtual machine, an updated connection status parameter for the port-to-port communication pathway to the hypervisor.

Certain embodiments of the presently disclosed methods, systems, products, communication management operations, software, middleware, computing infrastructure and/or apparatus may provide, for example, improvements to existing computing technology for hypervisor-mediated packet communications. Because a hypervisor may control the interface between one or more virtual machines and physical hardware as well as the routing of communications between several virtual machines, malware configured to exploit security shortcomings in hypervisors, for example through holes in memory management, have the potential to compromise a series of virtual machines. The improvements of the present disclosure include the following embodiments.

Certain embodiments, may provide, for example, a method for hypervisor-mediated communication of a network packet from an interface to a virtual machine comprising inspecting a network address of the network packet in a hypervisor and passing a network packet from the hypervisor to a virtual machine having the network address assigned thereto, the improvement comprising: i) authorizing the network packet in the hypervisor, comprising: comparing a predetermined portion of the network packet with at least one expected value, the predetermined portion a higher-than-OSI layer three portion of the network packet; and ii) passing the authorized network packet to the virtual machine.

Certain embodiments, may provide, for example, a method for hypervisor-mediated communication of a network packet from an interface to a virtual machine comprising inspecting a network address of the network packet in a hypervisor and passing a network packet from the hypervisor to a virtual machine having the network address assigned thereto, the improvement comprising: i) receiving a network packet at the hypervisor via a communication pathway; ii) obtaining a connection status indicator of the communication pathway from the virtual machine; iii) authorizing the network packet in the hypervisor, comprising: comparing at least one parameter obtained from the network packet with at least one expected value, the at least one expected value determined from the obtained connection status indicator; and iv) transmitting the authorized network packet to the virtual machine.

Certain embodiments, may provide, for example, a method for hypervisor-mediated communication of a network packet from an interface to a virtual machine comprising inspecting a network address of the network packet in a hypervisor and passing a network packet from the hypervisor to a virtual machine having the network address assigned thereto, the improvement comprising: i) obtaining, in the hypervisor, a destination address, destination port number, and at least one further parameter from a network packet received by a physical NIC in communication with the hypervisor; ii) identifying at least one pre-provisioned authorization code associated with the destination network address and the destination port number, the at least one pre-provisioned authorization code comprising a pre-provisioned user-application identifier and a pre-provisioned payload data-type identifier; and iii) authorizing transmission of the network packet to the destination address, comprising: comparing the at least one further parameter with the at least one pre-provisioned authorization code.

Certain embodiments, may provide, for example, a method for hypervisor-mediated communication of a network packet from an interface to a virtual machine comprising inspecting a network address of the network packet in a hypervisor and passing a network packet from the hypervisor to a virtual machine having the network address assigned thereto, the improvement comprising: i) detecting establishment of network-to-port communication pathways traversing the hypervisor; and i) verifying, prior to transmitting application data via the network-to-port communication pathways, that the network-to-port communication pathways have authorized destination port endpoints, comprising: verifying that destination port endpoints of received network packets are present on a pre-provisioned, exclusive list of authorized ports.

Certain embodiments, may provide, for example, a method for hypervisor-mediated communication of a network packet from an interface to a virtual machine comprising inspecting a network address of the network packet in a hypervisor and passing a network packet from the hypervisor to a virtual machine having the network address assigned thereto, the improvement comprising: i) transmitting, from the virtual machine to a hypervisor, a connection status parameter for a port-to-port communication pathway; ii) receiving a network packet at the hypervisor via the port-to-port communication pathway; iii) obtaining a packet parameter from the network packet; iv) verifying the packet parameter matches an expected value based on the connection status parameter; and v) passing the network packet from the hypervisor to the virtual machine.

Certain embodiments, may provide, for example, a method for hypervisor-mediated communication of a network packet from an interface to a virtual machine comprising inspecting a network address of the network packet in a hypervisor and passing a network packet from the hypervisor to a virtual machine having the network address assigned thereto, the improvement comprising: one or more of the methods, systems, products, communication management operations, software, middleware, computing infrastructure and/or apparatus of any of the embodiments disclosed herein.

Certain embodiments may provide, for example, a product for managing communications in a host computer coupled to a network, the host computer having one or plural virtual machines and a hypervisor executing therein, the host computer including a physical network interface controller (NIC), the product comprising a non-transitory computer-readable storage medium having computer readable program code embodied therein executable (or compilable, linkable, and/or loadable to be executable) by a computing device executing an operating system (for example a Linux operating system, a Linux-based operating system, a real time operating system, a mini-operating system, an edge device operating system, and/or an open source operating system) to enable and/or cause the host computer to perform one or more of the methods disclosed herein.

Certain embodiments may provide, for example, a computer program product comprising a computer readable storage medium having a computer readable program stored therein, wherein the computer readable program is at least partially executed in a hypervisor resident on the computing device to enable and/or cause the computing device to perform one or more of the methods disclosed herein.

Certain embodiments may provide, for example, a computer program product comprising a computer readable storage medium having a computer readable program stored therein, wherein the computer readable program is at least partially executed in a hypervisor resident on the computing device to further enable and/or cause the computing device to perform one or more of the methods disclosed herein.

Certain embodiments may provide, for example, an apparatus, comprising: a processor; and a hypervisor memory coupled to the processor, wherein the hypervisor memory comprises instructions which, when executed by the processor, enable and/or cause the processor to perform one or more of the methods disclosed herein.

Certain embodiments may provide, for example, a system, comprising: one or more processors; a hypervisor memory coupled to said one or more processors, said hypervisor memory including a computer useable medium tangibly embodying at least one program of instructions executable by at least one of said one or more processors to enable and/or cause the system to perform one or more of the methods disclosed herein.

Certain embodiments may provide, for example, a computer program product, comprising: one or more machine-useable storage media; and program instructions provided by said one or more media for programming a hypervisor data processing platform to enable and/or cause a computing device to perform one or more of the methods disclosed herein.

Certain embodiments may provide, for example, an apparatus comprising: a hypervisor comprising an active kernel and an active container; and a processor operable with said active kernel to instantiate instances for active Kernel Loadable Modules (KLMs) for servicing said active container, said active KLM's executable to enable and/or cause the apparatus to perform one or more of the methods disclosed herein.

Certain embodiments may provide, for example, a system, comprising: one or more processors; a hypervisor executing on said one or more processors; hypervisor memory coupled to said one or more processors, said hypervisor memory including a computer useable medium tangibly embodying at least one program of instructions executable by at least one of said one or more processors to perform operations to enable and/or cause the system to perform one or more of the methods disclosed herein.

Certain embodiments may provide, for example, logic encoded on one or more non-transitory computer readable media for execution by a hypervisor and when executed operable to enable and/or cause a computing device to perform one or more of the methods disclosed herein.

Certain embodiments may provide, for example, logic encoded on one or more non-transitory computer readable media for execution on one or more processors executing hypervisor commands, when executed operable to enable and/or cause the one or more processors perform one or more of the methods disclosed herein.

Certain embodiments may provide, for example, a readable storage medium having a computer readable program stored therein, wherein the computer readable program, when executed by a hypervisor on a computing device, enables and/or causes the computing device to perform one or more of the methods disclosed herein.

Certain embodiments may provide, for example, a computing device comprising: a hypervisor memory containing machine readable medium comprising machine executable code having stored thereon instructions operable to enable and/or cause the computing device to perform one or more of the methods disclosed herein.

Certain embodiments may provide, for example, a non-transitory machine-readable storage medium comprising instructions to provide enhanced communication security of a system comprising a processor operating with a hypervisor, the instructions executable by the hypervisor to enable and/or cause the system to perform one or more of the methods disclosed herein.

Certain embodiments may provide, for example, a product for securing communications of a plurality of networked computing devices, the product comprising a non-transitory computer-readable storage medium having computer-readable program code embodied therein, the computer-readable program code executable by a first computing device to perform communication management operations, the communication management operations comprising: i) sending a nonpublic first identification code for the first computing device to a software port on a second computing device via a pre-established communication pathway; ii) receiving, in response to the sending the nonpublic first identification code, a nonpublic second identification code for the second computing device; iii) comparing the nonpublic second identification code with a pre-established value for the second computing device; iv) further sending a first application identifier for a first user-application to the second computing device via the pre-established communication pathway; v) further receiving, in response to the sending the first application identifier, a second application identifier for a second user-application; vi) comparing the second application identifier with a pre-established value for the second user-application; vii) confirming application data received from the second user-application conforms to a data model assigned to a predetermined port number, a data range assigned to the predetermined port number, and a command type assigned to the predetermined port number, the predetermined port number assigned to the first user-application and/or the second user-application; followed by viii) passing the confirmed application data to the first user-application.

A. In certain embodiments, for example, the nonpublic second identification code may be obtained from a network packet. In certain embodiments, for example, the nonpublic second identification code may be obtained from a portion of the network packet that is higher-than-OSI layer three and lower-than-OSI layer seven. In certain embodiments, for example, the comparing may be initiated in a kernel space of the first computing device.

B. In certain embodiments, for example, the pre-established value may be preprovisioned on nonvolatile storage media of the first computing device. In certain embodiments, for example, the communication management operations may further comprise: decrypting the nonpublic second identification code with a single-use cryptographic key.

C. In certain embodiments, for example, the nonpublic first identification code and the nonpublic second identification code may be shared secrets between the first computing device and the second computing device.

D. In certain embodiments, for example, the communication management operations may further comprise translating, prior to the passing, the application data from a first pre-established format to a second pre-established format. In certain embodiments, for example, the communication management operations may further comprise: determining the first pre-established format and the second pre-established format from (a) a data model identification code assigned to the data model and/or (b) the predetermined port number.

E. In certain embodiments, for example, the communication management operations may further comprise: sending the first application identifier and a data model identifier assigned to the data model to the second computing device in a single network packet.

F. In certain embodiments, for example, the comparing the nonpublic second identification code and the comparing the second application identifier may be performed prior to any communication of application data between the first user-application and the second user-application.

G. In certain embodiments, for example, the communication management operations may further comprise: i) receiving a data packet from a first port assigned to the first user-application, the first port hosted on the first computing device, the data packet comprising a payload and a second port number; and ii) assembling a packet segment for the received data packet, the packet segment comprising the payload, the first application identifier, and a data model identifier assigned to the data model. In certain embodiments, for example, the pre-established communication pathway may have a one-to-one correspondence to an n-tuple (as referred to herein, an n-tuple may be, for example, an at least a 2-tuple, an at least a 3-tuple, an at least a 5-tuple, an at least a 6-tuple, an at least an 8-tuple, an at least a 10-tuple, or an at least a 12-tuple) comprising the first application identifier, the second application identifier, the second port number, and the data model identifier. In certain embodiments, for example, each of a series of network packet communications of user-application data between the first port and the second port may comprise: transmission of a network packet to a third port, the third port assigned to network security software resident on the second computing device, the third port having a one-to-one correspondence with the second port number, the second port number assigned to the second port, the second port assigned to the second user-application, the network packet comprising the first application identifier and the data model identifier. In certain embodiments, for example, the first application identifier and the data model identifier in the each of the series of network packet communications may be encrypted by one of a series of single-use encryption keys. In certain embodiments, for example, all communications of user-application data between the first port and the second port may comprise the series of network packet communications.

H. In certain embodiments, for example, the communication management operations may further comprise: i) intercepting a network connection request from a first port assigned to the first user-application, the first port hosted by the first computing device, the request comprising a second port number; and ii) verifying that the first user-application is specifically authorized to communicate with a second port, the second port number assigned to the second port. In certain embodiments, for example, the verifying may be performed prior to forming the pre-established communication pathway.

I. In certain embodiments, for example, the communication management operations may further comprise: i) intercepting a network connection request from a second port, the second port hosted by the second computing device, the request comprising a first port number; and ii) verifying that a first port is specifically authorized to receive packet data from the second port, the first port number assigned to the first port. In certain embodiments, for example, the communication management operations may further comprise: confirming that the second computing device has consulted a pre-specified local policy to specifically authorize network packet communication between the first port and the second port. In certain embodiments, for example, the communication management operations may further comprise: receiving an encrypted identifier for the pre-specified local policy from the second computing device. In certain embodiments, for example, the pre-specified local policy may comprise a record, the record comprising the first application identifier, the second application identifier, the data model identifier, and the first port number. In certain embodiments, for example, the pre-specified local policy may further comprise a flag, the flag specifying whether the communication pathway is unidirectional or bidirectional. In certain embodiments, for example, the intercepting may be initiated in a kernel space of the first computing device. In certain embodiments, for example, the communication management operations may further comprise: i) receiving a network packet via the communication pathway, the network packet comprising the first port number, data from the second user-application, the second application identifier, and the data model identifier; and ii) comparing the second application identifier and the data model identifier with pre-established values, the pre-established values identified based on the first port number. In certain embodiments, for example, the second application identifier and the data model identifier may be located in higher-than-OSI layer three portions of the network packet. In certain embodiments, for example, the comparing may be initiated in a kernel of the first computing device. In certain embodiments, for example, the communication management operations may further comprise: translating the data from the second user-application to a format expected by the first user-application.

J. In certain embodiments, for example, the communication management operations may further comprise: confirming that further application data received from the first user-application conforms to a further data model assigned to a further predetermined port number, a further data range assigned to the further predetermined port number, and a further command type assigned to the further predetermined port number, the further predetermined port number assigned to the first user-application and/or the second user-application; followed by passing the confirmed further application data to the second user-application.

K. In certain embodiments, for example, a portion of the communication management operations may be configured for execution in a kernel space of the first computing device, and a further portion of the communication management operations are configured for execution in an application space of the first computing device.

Certain embodiments may provide, for example, a product for securing communications of a plurality of networked computing devices (for example network packet-based communications among the network computing devices over a network), the product comprising a non-transitory computer-readable storage medium having computer-readable program code embodied therein, the computer-readable program code executable by a first computing device to perform communication management operations. In certain embodiments, for example, the communication management operations may comprise sending a nonpublic first identification code (for example sending an encrypted nonpublic first identification code) for the first computing device (for example the nonpublic first identification code may be assigned to the first computing device) to a software port on a second computing device via a pre-established communication pathway. In certain embodiments, for example, the communication management operations may comprise receiving, in response to the sending (or in response to receipt of the nonpublic first identification code by the second computing device), a nonpublic second identification code for the second computing device (for example the nonpublic second identification code may be assigned to the second computing device). In certain embodiments, for example, the communication management operations may comprise comparing the nonpublic second identification code with a pre-established (or preconfigured, predefined, or preprovisioned) value for the second computing device (for example the pre-established value may be assigned to the second computing device).

A. In certain embodiments, for example, the nonpublic second identification code may be obtained from a network packet. In certain embodiments, for example, the nonpublic second identification code may be obtained from a higher-than-Open Systems Interconnection (OSI) layer three portion (for example one or more of an OSI layer four portion, an OSI layer five portion, an OSI layer six portion, an OSI layer seven portion, or a layer between one or more of an OSI layer three portion, an OSI layer four portion, an OSI layer five portion, an OSI layer six portion, or an OSI layer seven portion) of the network packet. In certain embodiments, for example, the comparing may be initiated in a kernel space of the first computing device. In certain embodiments, for example, the comparing may be partially performed in an application space of the first computing device.

B. In certain embodiments, for example, the pre-established value may be preprovisioned on nonvolatile storage media of the first computing device. In certain embodiments, for example, the communication management operations may further comprise: decrypting the nonpublic second identification code with a single-use cryptographic key. In certain embodiments, for example, the single-use cryptographic key may be rotated to obtain a further cryptographic key for use in further decrypting.

C. In certain embodiments, for example, the nonpublic first identification code and nonpublic second identification code may be shared secrets between the first computing device and the second computing device.

D. In certain embodiments, for example, the communication management operations may further comprise sending a first application identifier for a first user-application (for example the first application identifier may be assigned to the first user-application) to the second computing device via the pre-established communication pathway. In certain embodiments, for example, the communication management operations may further comprise receiving, in response to the sending, a second application identifier for a second user-application (for example the second application identifier may be assigned to the second user-application). In certain embodiments, for example, the communication management operations may further comprise comparing the second application identifier with a pre-established value for the second user-application. In certain embodiments, for example, the communication management operations may further comprise sending a data type identifier for the pre-established communication pathway via the pre-established communication pathway. In certain embodiments, for example, the communication management operations may further comprise receiving, in response to the sending, the data type identifier from the second computing device. In certain embodiments, for example, the communication management operations may further comprise comparing the received data type identifier with a pre-established value for the pre-established communication pathway. In certain embodiments, for example, the first application identifier and the data type identifier may be sent to the second computing device in a single network packet. In certain embodiments, for example, the comparing the nonpublic second identification code, the comparing the second application identifier, and the comparing the received data type identifier may be performed prior to any communication of application data between the first user-application and the second user-application. In certain embodiments, for example, the communication management operations may further comprise receiving a data packet from a first port assigned to the first user-application, the first port hosted on the first computing device, the data packet comprising a payload and a second port number. In certain embodiments, for example, the communication management operations may further comprise assembling a packet segment for the received data packet, the packet segment comprising the payload, the first application identifier, and the data type identifier. In certain embodiments, for example, the pre-established communication pathway may have a one-to-one correspondence to an n-tuple comprising the first application identifier, the second application identifier, the second port number, and the data type identifier. In certain embodiments, for example, each of a series of network packet communications of user-application data between the first port and the second port may comprise: transmission of a network packet to a third port, the third port assigned to network security software resident on the second computing device, the third port having a one-to-one correspondence with the second port number, the second port number assigned to the second port, the second port assigned to the second user-application, the network packet comprising the first application identifier and the data type identifier. In certain embodiments, for example, the first application identifier and the data type identifier in the each of the series of network packet communications may be encrypted by one of a series of single-use encryption keys. In certain embodiments, for example, all communications of user-application data between the first port and the second port may comprise the series of network packet communications. In certain embodiments, for example, the communication management operations may further comprise intercepting a network connection request from a first port assigned to the first user-application, the first port hosted by the first computing device, the request comprising a second port number. In certain embodiments, for example, the communication management operations may further comprise verifying that the first user-application is specifically authorized to communicate with a second port, the second port number assigned to the second port. In certain embodiments, for example, the verifying may be performed prior to forming the pre-established communication pathway. In certain embodiments, for example, the communication management operations may further comprise intercepting a network connection request from a second port, the second port hosted by the second computing device, the request comprising a first port number. In certain embodiments, for example, the communication management operations may further comprise verifying that a first port is specifically authorized to receive packet data from the second port, the first port number assigned to the first port. In certain embodiments, for example, the communication management operations may further comprise confirming that the second computing device has consulted a pre-specified local policy to specifically authorize network packet communication between the first port and the second port. In certain embodiments, for example, the communication management operations may further comprise: receiving an encrypted identifier for the pre-specified local policy from the second computing device. In certain embodiments, for example, the pre-specified local policy may comprise a record, the record comprising the first application identifier, the second application identifier, the data type identifier, and the first port number. In certain embodiments, for example, the pre-specified local policy may further comprise a flag, the flag specifying whether the communication pathway is unidirectional or bidirectional. In certain embodiments, for example, the intercepting may be initiated in a kernel space of the first computing device. In certain embodiments, for example, the communication management operations may further comprise receiving a network packet via the communication pathway, the network packet comprising the first port number, data from the second user-application, the second application identifier, and the data type identifier. In certain embodiments, for example, the communication management operations may further comprise comparing the second application identifier and the data type identifier with pre-established values, the pre-established values identified based on the first port number. In certain embodiments, for example, the second application identifier and the data type identifier may be located in higher-than-OSI layer three portions (for example one or more of OSI layer four portions, OSI layer five portions, OSI layer six portions, OSI layer seven portions, or layers between one or more of the OSI layer three portions, OSI layer four portions, OSI layer five portions, OSI layer six portions, or OSI layer seven portions) of the network packet. In certain embodiments, for example, the comparing may be initiated in a kernel of the first computing device. In certain embodiments, for example, the communication management operations may further comprise: translating the data from the second user-application to a format expected by the first user-application. In certain embodiments, for example, the data from the second user-application may be translated from a pre-established format, the pre-established format determined from the data type identifier.

E. In certain embodiments, for example, the communication management operations may comprise, prior to assembling the packet segment (and prior to one or more translation steps if the data undergoes translation), using the data type identifier to obtain a data definition for the payload or a portion of the payload, and evaluating the payload to determine whether the payload (or the portion of the payload) complies with the data definition. In certain embodiments, for example, the data definition may comprise a required protocol header (for example a header for an MQTT payload), a list (for example a list of one) of allowed data types (for example integer, text, or floating point data types), a required value pair (for example a field description and a value having a specified data type), and/or required control characters (for example one or more required ASCII code characters at predetermined positions in the payload). In certain embodiments, for example, the communication management operations may comprise discarding (and taking no further steps to transmit) the payload if the payload does not comply with the data definition. In certain embodiments, for example, the communication management operations may comprise, prior to assembling the packet segment, comparing the payload or portions of the payload based on the data type identifier against one or more pre-authorized ranges (for example minimum and/or maximum values and/or discrete allowed values for numerical data, or for example a range or allowed values for text data) and evaluating the payload to determine whether the payload (or the portion of the payload) falls within the one or more pre-authorized ranges. In certain embodiments, for example, the communication management operations may comprise discarding (and taking no further steps to transmit) the payload if the payload (or the portion of the payload) does not fall within the one or more pre-authorized ranges. In certain embodiments, for example, the communication management operations may comprise, prior to assembling the packet segment, using the data type identifier to obtain a list of pre-authorized commands and/or a list of prohibited commands (for example database instruction commands such as SQLread and SQLwrite), and evaluating the payload to determine whether the payload (or the portion of the payload) contains one of the pre-authorized commands and/or does not contain one of the prohibited commands. In certain further embodiments, for example, the list of pre-authorized commands may be exclusive. In certain embodiments, for example, the communication management operations may comprise discarding (and taking no further steps to transmit) the payload if the payload (or the portion of the payload) does not contain one of the pre-authorized commands and/or contains one of the prohibited commands.

F. In certain embodiments, for example, the communication management operations may comprise, after receiving the network packet via the communication pathway, using the data type identifier to obtain a data definition for the data from the second user-application or a portion thereof, and evaluating said data to determine whether the data (or the portion thereof) complies with the data definition. In certain embodiments, for example, the data definition may comprise a required protocol header (for example a header for an MQTT payload), a list (for example a list of one) of allowed data types (for example integer, text, or floating point data types), a required value pair (for example a field description and a value having a specified data type), and/or required control characters (for example one or more required ASCII code characters at predetermined positions in the payload). In certain embodiments, for example, the communication management operations may comprise discarding (and taking no further steps to transmit) the received network packet (including the data) if the data does not comply with the data definition. In certain embodiments, for example, the communication management operations may comprise, after receiving the network packet via the communication pathway, using the data type identifier to obtain one or more allowed ranges (for example minimum and/or maximum values and/or discrete allowed values for numerical data, or for example a range or allowed values for text data) for the data or a portion thereof, and evaluating the data to determine whether the data (or the portion thereof) falls within the one or more allowed ranges. In certain embodiments, for example, the communication management operations may comprise discarding (and taking no further steps to transmit) the data if the data (or the portion of the data) does not fall within the one or more allowed ranges. In certain embodiments, for example, the communication management operations may comprise, after receiving the network packet via the communication pathway, using the data type identifier to obtain a list of allowed commands and/or a list of prohibited commands (for example database instruction commands such as SQLread and SQLwrite), and evaluating the data to determine whether the data (or the portion of the data) contains one of the allowed commands and/or does not contain one of the prohibited commands. In certain further embodiments, for example, the list of allowed commands may be exclusive. In certain embodiments, for example, the communication management operations may comprise discarding (and taking no further steps to consume) the data if the data (or the portion of the data) does not contain one of the allowed commands and/or contains one of the prohibited commands.

G. In certain embodiments, for example, the nonpublic first identification code may be preprovisioned on the first computing device as a static value (for example in an encrypted configuration file) that is used each time the first computing device executes the communication management operations (and the nonpublic second identification code may be similarly preprovisioned on the second computing device) as described herein. In certain other embodiments, for example, the nonpublic first identification code (and/or nonpublic second identification code) may be obtained by requesting a security token (or token pair) for the first port (for example during establishment of the port in a listening mode, prior to sending a connection request, or during or after establishment of the pre-established communication pathway). In certain embodiments, for example, the request may specify identifiers (for example public identifiers) for the first computing device and the second computing device, and the token (or token pair) returned in response to the request may be a function of the first computing device and the second computing device. In certain embodiments, for example, the second computing device may also obtain a token (or token pair) complimentary to the token (or token pair) received by the first computing device. In certain embodiments, for example, a new token (or pair of tokens) is generated each time a connection between the first computing device and the second computing device is established. In certain embodiments, for example, all communications between the first computing device and the third computing device and all communications between the second computing device and the third computing device, are secured by one of the methods, systems, products, communication management operations, software, middleware, computing infrastructure and/or apparatus disclosed herein.

H. In certain embodiments, for example, the application identifier for the first user-application may be preprovisioned on the first computing device as a static value (for example in an encrypted configuration file) that is used each time the first computing device executes the communication management operations (and the application identifier for the second user-application may be similarly preprovisioned on the second computing device) as described herein. In certain other embodiments, for example, the application identifier for the first user-application (and/or application identifier for the second user-application) may be obtained by requesting a security token (or token pair) for the first port (for example during establishment of the port in a listening mode, prior to sending a connection request, or during or after establishment of the pre-established communication pathway). In certain embodiments, for example, the request may specify identifiers for the first user-application and the second user-application (and optionally the data type), and the token (or token pair) returned in response to the request may be a function of the identifiers for the first user-application and the second user-application (and optionally the data type). In certain embodiments, for example, the second computing device may also obtain a token (or token pair) complimentary to the token (or token pair) received by the first computing device. In certain embodiments, for example, a new token (or pair of tokens) is generated each time a connection between the first computing device and the second computing device is established. In certain embodiments, for example, all communications between the first computing device and the third computing device and all communications between the second computing device and the third computing device, are secured by one of the methods, systems, products, communication management operations, software, middleware, computing infrastructure and/or apparatus disclosed herein.

I. In certain embodiments, for example, all authentication and authorization parameters required to perform the communication management operations may be obtained from a local encrypted configuration file installed on a first node (for example the first computing device). In certain embodiments, for example, the local encrypted configuration file may include only those authentication and authorization parameters required by the first node to conduct pre-authorized communications. In certain other embodiments, for example, at least a portion (for example all) authentication and authorization parameters required to perform the communication management operations (whether static parameters or dynamically generated tokens or token pairs) may be obtained from a third node (for example a credentialing server). In certain embodiments, for example, the communication management operations may comprise obtaining the nonpublic first identification code, the pre-established value for the second computing device, the first application identifier, the pre-established value for the second user-application, the data type identifier, the pre-established value for the received data type identifier, the first port number, the second port number, the third port number, the data definition, the protocol header, the list of allowed data types, the required value pair, the required control characters, the one or more allowed ranges, the list of allowed commands, and/or the list of prohibited commands from at least a third node (for example a credentialing server). In certain embodiments, for example, one or more (for example all) of the nonpublic first identification code, the pre-established value for the second computing device, the first application identifier, the pre-established value for the second user-application, the data type identifier, the pre-established value for the received data type identifier, the first port number, the second port number, the third port number, the data definition, the protocol header, the list of allowed data types, the required value pair, the required control characters, the one or more allowed ranges, the list of allowed commands, and the list of prohibited commands may be obtained upon request, periodically, on boot-up of the first node or the third node, or upon establishment of a communication pathway between the first node and the third node. In certain embodiments, for example, two or more (for example all) of the nonpublic first identification code, the pre-established value for the second computing device, the first application identifier, the pre-established value for the second user-application, the data type identifier, the pre-established value for the received data type identifier, the first port number, the second port number, the third port number, the data definition, the protocol header, the list of allowed data types, the required value pair, the required control characters, the one or more allowed ranges, the list of allowed commands, and the list of prohibited commands may be obtained simultaneously, essentially simultaneously, or sequentially. In certain embodiments, for example, a portion or all the obtaining may be performed during boot up of the first computing device (including for example, obtaining all necessary parameters for communicating with remote computing devices at boot up of the first computing devices). In certain embodiments, for example, a portion or all of the obtaining may be performed dynamically (for example in response to a confirmation that a communication pathway has been established (for example upon establishment of the pre-established communication pathway). In certain embodiments, for example, the third node may maintain a master configuration file of a portion or all necessary authentication and authorization parameters for port-to-port communications between a plurality of networked computing devices.

J. In certain embodiments, for example, a portion of the communication management operations may be configured for execution in a kernel space of the first computing device, and a further portion of the communication management operations may be configured for execution in an application space of the first computing device.

Certain embodiments may provide, for example, a product for securing communications of a plurality of networked computing devices, the product comprising a non-transitory computer-readable storage medium having computer-readable program code embodied therein, the computer-readable program code executable by a first computing device to perform communication management operations, the communication management operations comprising: i) sending a nonpublic first identification code for the first computing device to a software port on a second computing device via a pre-established communication pathway; ii) receiving, in response to the sending, a nonpublic second identification code for the second computing device; and iii) comparing the nonpublic second identification code with a pre-established value for the second computing device.

A. In certain embodiments, for example, the nonpublic second identification code may be obtained from a network packet. In certain embodiments, for example, the nonpublic second identification code may be obtained from a higher-than-OSI layer three portion (for example one or more of an OSI layer four portion, an OSI layer five portion, an OSI layer six portion, an OSI layer seven portion, or a layer between one or more of an OSI layer three portion, an OSI layer four portion, an OSI layer five portion, an OSI layer six portion, or an OSI layer seven portion) of the network packet. In certain embodiments, for example, the comparing may be initiated in a kernel space of the first computing device. In certain embodiments, for example, the comparing may be partially performed in an application space of the first computing device.

B. In certain embodiments, for example, the pre-established value may be preprovisioned on nonvolatile storage media of the first computing device. In certain embodiments, for example, the communication management operations may further comprise: decrypting the nonpublic second identification code with a single-use cryptographic key. In certain embodiments, for example, the single-use cryptographic key may be rotated to obtain a further cryptographic key for use in further decrypting.

C. In certain embodiments, for example, the nonpublic first identification code and nonpublic second identification code may be shared secrets between the first computing device and the second computing device.

D. In certain embodiments, for example, the communication management operations may further comprise: i) sending a first application identifier for a first user-application to the second computing device via the pre-established communication pathway; ii) receiving, in response to the sending, a second application identifier for a second user-application; and iii) comparing the second application identifier with a pre-established value for the second user-application. In certain embodiments, for example, the communication management operations may further comprise: i) sending a data type identifier for the pre-established communication pathway via the pre-established communication pathway; ii) receiving, in response to the sending, the data type identifier from the second computing device; and iii) comparing the received data type identifier with a pre-established value for the pre-established communication pathway. In certain embodiments, for example, the first application identifier and the data type identifier may be sent to the second computing device in a single network packet. In certain embodiments, for example, the comparing the nonpublic second identification code, the comparing the second application identifier, and the comparing the received data type identifier may be performed prior to any communication of application data between the first user-application and the second user-application. In certain embodiments, for example, the communication management operations may further comprise: i) receiving a data packet from a first port assigned to the first user-application, the first port hosted on the first computing device, the data packet comprising a payload and a second port number; and ii) assembling a packet segment for the received data packet, the packet segment comprising the payload, the first application identifier, and the data type identifier. In certain embodiments, for example, the pre-established communication pathway may have a one-to-one correspondence to an n-tuple comprising the first application identifier, the second application identifier, the second port number, and the data type identifier. In certain embodiments, for example, each of a series of network packet communications of user-application data between the first port and a second port may comprise: the first application identifier and the data type identifier, the second port assigned to the second user-application, the second port number assigned to the second port. In certain embodiments, for example, the first application identifier and the data type identifier in the each of the series of network packet communications may be encrypted by one of a series of single-use encryption keys. In certain embodiments, for example, the series of network packet communications may comprise all network packet communications of user-application data between the first port and the second port. In certain embodiments, for example, the communication management operations may further comprise: i) intercepting a network connection request from a first port assigned to the first user-application, the first port hosted by the first computing device, the request comprising a second port number; and ii) verifying that the first user-application is specifically authorized to communicate with a second port, the second port number assigned to the second port. In certain embodiments, for example, the verifying may be performed prior to forming the pre-established communication pathway. In certain embodiments, for example, the communication management operations may further comprise: i) intercepting a network connection request from a second port, the second port hosted by the second computing device, the request comprising a first port number; and ii) verifying that a first port is specifically authorized to receive packet data from the second port, the first port number assigned to the first port. In certain embodiments, for example, the communication management operations may further comprise confirming that the second computing device has consulted a pre-specified local policy to specifically authorize network packet communication between the first port and the second port. In certain embodiments, for example, the communication management operations may further comprise: receiving an encrypted identifier for the pre-specified local policy from the second computing device. In certain embodiments, for example, the pre-specified local policy may comprise a record, the record comprising the first application identifier, the second application identifier, the data type identifier, and the first port number. In certain embodiments, for example, the pre-specified local policy may further comprise a flag, the flag specifying whether the communication pathway is unidirectional or bidirectional. In certain embodiments, for example, the intercepting may be initiated in a kernel space of the first computing device. In certain embodiments, for example, the communication management operations may further comprise: i) receiving a network packet via the communication pathway, the network packet comprising the first port number, data from the second user-application, the second application identifier, and the data type identifier; and ii) comparing the second application identifier and the data type identifier with pre-established values, the pre-established values identified based on the first port number. In certain embodiments, for example, the second application identifier and the data type identifier may be located in higher-than-OSI layer three portions (for example one or more of OSI layer four portions, OSI layer five portions, OSI layer six portions, OSI layer seven portions, or layers between one or more of the OSI layer three portions, OSI layer four portions, OSI layer five portions, OSI layer six portions, or OSI layer seven portions) of the network packet. In certain embodiments, for example, the comparing may be initiated in a kernel of the first computing device. In certain embodiments, for example, the communication management operations may further comprise: translating the data from the second user-application to a format expected by the first user-application. In certain embodiments, for example, the data from the second user-application may be translated from a pre-established format, the pre-established format determined from the data type identifier.

E. In certain embodiments, for example, a portion of the communication management operations may be configured for execution in a kernel space of the first computing device, and a further portion of the communication management operations may be configured for execution in an application space of the first computing device.

Certain embodiments may provide, for example, a product for managing communications of a plurality of networked computing devices. In certain embodiments, for example, the product may comprise a non-transitory computer-readable storage medium having computer-readable program code embodied therein. In certain embodiments, for example, the computer-readable program code may be executable (or program code compilable, linkable, and/or loadable to be executable) by a computing device (for example a computing device executing an operating system (for example a Linux operating system, a Linux-based operating system, a real time operating system, a mini-operating system, an edge device operating system, and/or an open source operating system)) to enable and/or cause the computing device to perform communication management operations. In certain embodiments, for example, the communication management operations may comprise establishing authorized network tunnels (for example network tunnels based on protocol which involve encrypting a network packet and inserting the encrypted network packet inside a packet for transport (such as IPsec protocol), or network tunnels based on Socket Secured Layer protocol, or network tunnels which require encryption of part of all of a packet payload but do not involve additional headers (for example do not involve packaging an IP packet inside another IP packet) for network communication on all port-to-port network communications (for example unencrypted or encrypted payload communications) among the plurality of networked computing devices (inclusive, for example, of port-to-port communications according to User Datagram Protocol (UDP) or Transmission Control Protocol (TCP) between end-user application processes over a network)). In certain embodiments, for example, the port-to-port communications may be between user-application processes (inclusive of application processes having a process owner (or user)). In certain embodiments, for example, one or more of the user-application processes may reside in kernel and/or application space. In certain embodiments, for example, the establishing may comprise intercepting network connection requests (for example by network application programming interfaces) having associated destination port numbers. In certain embodiments, for example, the establishing may comprise identifying preconfigured, predefined, pre-established and/or preprovisioned tunnel port numbers (for example predefined tunnel port numbers associated with servers), comprising identifying at least one (for example, one) preconfigured, predefined, pre-established and/or preprovisioned tunnel port number for each associated destination port number of the associated destination port numbers. In certain embodiments, for example, the establishing may comprise requesting the negotiation of network tunnels, the requesting comprising sending connection request packets comprising the tunnel port numbers (and also, for example, cipher suite parameters), each one of the network tunnels having a one-to-one correspondence with one of the tunnel port numbers. In certain embodiments, for example, the establishing may comprise authorizing the network tunnels, comprising comparing computing device identifiers, user-application identifiers (for example user-application identifiers derived from application process identifiers and/or application process owners, together or in parts), and payload data-type identifiers received from the network tunnels with preconfigured, predefined, pre-established and/or preprovisioned authorization codes. In certain further embodiments, for example, the computing device identifiers, user-application identifiers, and/or payload data-type identifiers may be encrypted and require decryption before the comparing.

A. In certain embodiments, for example, the intercepting, identifying, requesting, and authorizing may be transparent to all user-application processes (for example all processes (except optionally for processes executing portions of the program code) executing in (non-kernel) application space and having process owners) on the plurality of networked computing devices. In certain embodiments, for example, the intercepting may be performed by a network application programming interface having standard syntax (for example using modified network application programming interface functions that retain standard syntax, for example: bind( ), connect( ), listen( ), UDP sendto( ), UDP bindto( ), and close( ) functions).

B. In certain embodiments, for example, the intercepting, identifying, requesting, and authorizing may be self-executing. In certain further embodiments, for example, the intercepting, identifying, requesting, and authorizing may be automatic. In certain further embodiments, for example, the identifying, requesting, and authorizing may be automatically invoked following the intercepting. In certain embodiments, for example, the intercepting, identifying, and authorizing may occur in the kernel spaces of the plurality of networked computing devices. In certain embodiments, for example, one or more of the intercepting, identifying, and authorizing may occur in application spaces of the plurality of networked computing devices. In certain further embodiments, for example, at least a portion (for example all) of the non-transitory computer-readable storage medium may be resident on a deployment server.

C. In certain further embodiments, for example, at least a portion (for example, all) of the non-transitory computer-readable storage medium may be resident on flash drive. In certain embodiments, for example, the communication management operations may further comprise: preventing all user-application process ports from binding to a portion or all physical interfaces of the plurality of networked computing devices.

D. In certain embodiments, for example, user-application process ports may transmit packets to network security software process ports by loopback interfaces. In certain embodiments, for example, user-application process ports may transmit packets to network security software process ports by TUN/TAP interfaces.

E. In certain embodiments, for example, the network tunnels may be encrypted. In certain embodiments, for example, the network tunnels may be interposed between network security processes (for example middleware) running on separate computing devices. In certain embodiments, for example, the network security processes may manage a segment of the data pathway that is interposed between user-application processes on separate computing devices of the plurality of networked computing devices. In certain embodiments, for example, the network security processes may be conducted on the plural computing devices with user-application processes, wherein the user-application processes may engage in port-to-port communications. In certain embodiments, for example, the network security processes may be resident on different computing devices from the user-application processes. In certain embodiments, for example, the product may be used to configure a software-defined perimeter.

F. In certain embodiments, for example, the tunnel port numbers, computing device identifiers, user-application identifiers, and/or payload data-type identifiers may be obtained from a plurality of configuration files. In certain embodiments, for example, the configuration files may contain private keys for negotiating encryption keys for the network tunnels. In certain embodiments, for example, the configuration files may be binary files. In certain embodiments, for example, the configuration files may be encrypted files. In certain embodiments, for example, the configuration files may be variable length files. In certain embodiments, for example, the configuration files may be read-only files.

G. In certain embodiments, for example, the communication management operations may further comprise: executing operating system commands to identify user-application processes making the connection requests, and verifying that the identified user-application processes are authorized to transmit data to the associated destination port numbers. In certain embodiments, for example, the communication management operations may further comprise thwarting attempts by malware to form network connections, the thwarting comprising: rejecting network connection requests in which identified user-application processes are not authorized to transmit data, for example by reference to a configuration file of authorized port-to-port connections. In certain embodiments, for example, the product may further comprise a configuration file, the configuration file comprising at least two of the following: tunnel port numbers, computing device identifiers, user-application identifiers, and payload data-type identifiers. In certain embodiments, for example, the communication management operations may comprise updating a connection state indicator based on the comparing computing device identifiers, the comparing user-application process identifiers, and/or the comparing payload data-type identifiers. In certain embodiments, for example, the updated connection state indicator may be a field in a list of port-to-port connections. In certain embodiments, for example, the connection state indicator may be changed from a value indicating that no connection has been established to a value indicating that an open connection state exists for a particular port-to-port connection. In certain embodiments, for example, the connection state indicator may be changed from a value indicating that no connection has been established to a value indicating that a connection is in the process of being formed and that one or more of the computing device identifiers, the user-application process identifiers, and/or the payload data-type identifiers has been successfully exchanged, authenticated and/or authorized. In certain embodiments, for example, the connection state indicator may be changed from a value indicating that an open connection exists, that no connection exists, or that a connection is in the process of being formed to a value indicating that the connection is being declined due to failure to successfully exchange, authenticate and/or authorize one or more of the computing device identifiers, the user-application process identifiers, and/or the payload data-type identifiers.

Certain embodiments may provide, for example, a product for managing communications of a plurality of networked computing devices, the product comprising a non-transitory computer-readable storage medium having computer-readable program code embodied therein, the computer-readable program code executable (or compilable, linkable, and/or loadable to be executable) by a computing device executing an operating system (for example a Linux operating system, a Linux-based operating system, a real time operating system, a mini-operating system, an edge device operating system, and/or an open source operating system) to enable and/or cause the computing device to perform communication management operations, the communication management operations comprising: establishing authorized network tunnels for all (or substantially all, or most or greater than 80% or greater than 90% of the connected or operational physical ports across all the devices within the software defined network) port-to-port network communications among the plurality of networked computing devices, comprising: i) intercepting network connection requests having associated destination port numbers; ii) identifying preconfigured, predefined, pre-established and/or preprovisioned tunnel port numbers, comprising identifying at least one tunnel port number for each associated destination port number of the associated destination port numbers; iii) requesting the negotiation of network tunnels, the requesting comprising sending connection request packets comprising the tunnel port numbers, each one of the network tunnels having a one-to-one correspondence with one of the tunnel port numbers; and iv) authorizing the network tunnels, comprising comparing computing device identifiers, user-application identifiers, and payload data-type identifiers received from the network tunnels with preconfigured, predefined, pre-established and/or preprovisioned authorization codes.

Certain embodiments may provide, for example, a product for managing communications of a plurality of networked computing devices. In certain embodiments, for example, the product may comprise a non-transitory computer-readable storage medium having computer-readable program code embodied therein. In certain embodiments, for example, the computer-readable program code may be executable (or program code compilable, linkable, and/or loadable to be executable) by a computing device (for example a computing device executing an operating system (for example a Linux operating system, a Linux-based operating system, a real time operating system, a mini-operating system, an edge device operating system, and/or an open source operating system)) to enable and/or cause the computing device to perform communication management operations. In certain embodiments, for example, the communication management operations may comprise establishing authorized network tunnels for all port-to-port network communications among the plurality of networked computing devices. In certain embodiments, for example, the establishing may comprise intercepting a network connection request having an associated destination port number. In certain embodiments, for example, the establishing may comprise identifying a preconfigured, predefined, pre-established and/or preprovisioned tunnel port number associated with the destination port number. In certain embodiments, for example, the establishing may comprise requesting the forming of a network tunnel, the forming comprising sending a connection request packet comprising the tunnel port number. In certain embodiments, for example, the establishing may comprise authorizing the network tunnel, comprising comparing a computing device identifier, a user-application identifier, and a payload data-type identifier received from the network tunnel with a preconfigured, predefined, pre-established and/or preprovisioned authorization code.

Certain embodiments may provide, for example, a product for managing communications of a plurality of networked computing devices, the product comprising a non-transitory computer-readable storage medium having computer-readable program code embodied therein, the computer-readable program code executable (or compilable, linkable, and/or loadable to be executable) by a computing device to enable and/or cause the computing device to perform communication management operations, the communication management operations comprising: establishing authorized network tunnels for all port-to-port network communications among the plurality of networked computing devices, comprising: i) intercepting a network connection request having an associated destination port number; ii) identifying a preconfigured, predefined, pre-established and/or preprovisioned tunnel port number associated with the destination port number; iii) requesting the forming of a network tunnel, the forming comprising sending a connection request packet comprising the tunnel port number; and iv) authorizing the network tunnel, comprising comparing a computing device identifier, a user-application identifier, and a payload data-type identifier received from the network tunnel with a preconfigured, predefined, pre-established and/or preprovisioned authorization code.

Certain embodiments may provide, for example, a product for managing communications of a plurality of networked computing devices. In certain embodiments, for example, the product may comprise a non-transitory computer-readable storage medium having computer-readable program code embodied therein. In certain embodiments, for example, the computer-readable program code may be executable (or program code compilable, linkable, and/or loadable to be executable) by a computing device (for example a computing device executing an operating system (for example a Linux operating system, a Linux-based operating system, a real time operating system, a mini-operating system, an edge device operating system, and/or an open source operating system)) to enable and/or cause the computing device to perform communication management operations. In certain embodiments, for example, the communication management operations may comprise establishing authorized network tunnels for at least one port-to-port network communication (including, for example, all port-to-port network communications (for example unencrypted or encrypted payload communications) among the plurality of networked computing devices (inclusive, for example, of port-to-port communications according to User Datagram Protocol (UDP) or Transmission Control Protocol (TCP) between end-user application processes over a network)). In certain embodiments, for example, the port-to-port communications may be between user-application processes (inclusive of application processes having a process owner (or user)). In certain embodiments, for example, one or more of the user-application processes may reside in kernel and/or application space. In certain embodiments, for example, the establishing may comprise intercepting network connection requests from source ports (for example the source ports may comprise ports associated with user-application processes), the requests having associated destination port numbers. In certain embodiments, for example, the establishing may comprise verifying that the source ports are authorized to communicate with ports having the associated destination port numbers. In certain embodiments, for example, the establishing may comprise requesting the negotiation of network tunnels, comprising sending connection request packets comprising the associated destination port numbers, each one of the network tunnels having a one-to-one correspondence with one of the associated destination port numbers. In certain embodiments, for example, the establishing may comprise authorizing the network tunnels, comprising comparing computing device identifiers, user-application identifiers, and/or payload data-type identifiers received from the network tunnels with preconfigured, predefined, pre-established and/or preprovisioned authorization codes. In certain further embodiments, for example, the computing device identifiers, user-application identifiers, and/or payload data-type identifiers may be encrypted and require decryption before the comparing.

Certain embodiments may provide, for example, a product for managing communications of a plurality of networked computing devices, the product comprising a non-transitory computer-readable storage medium having computer-readable program code embodied therein, the computer-readable program code executable (or compilable, linkable, and/or loadable to be executable) by a computing device to enable and/or cause the computing device to perform communication management operations, the communication management operations comprising: establishing authorized network tunnels for all port-to-port network communications among the plurality of networked computing devices, comprising: i) intercepting network connection requests from source ports, the requests having associated destination port numbers; ii) verifying that the source ports are authorized to communicate with ports having the associated destination port numbers; iii) requesting the negotiation of network tunnels, comprising sending connection request packets comprising the associated destination port numbers, each one of the network tunnels having a one-to-one correspondence with one of the associated destination port numbers; and iv) authorizing the network tunnels, comprising comparing computing device identifiers, user-application identifiers, and payload data-type identifiers received from the network tunnels with preconfigured, predefined, pre-established and/or preprovisioned authorization codes.

Certain embodiments may provide, for example, a product for managing communications of a plurality of networked computing devices. In certain embodiments, for example, the product may comprise a non-transitory computer-readable storage medium having computer-readable program code embodied therein. In certain embodiments, for example, the computer-readable program code may be executable (or program code compilable, linkable, and/or loadable to be executable) by a computing device (for example a computing device executing an operating system (for example a Linux operating system, a Linux-based operating system, a real time operating system, a mini-operating system, an edge device operating system, and/or an open source operating system)) to enable and/or cause the computing device to perform communication management operations. In certain embodiments, for example, the communication management operations may comprise establishing authorized encrypted communication pathways for at least one port-to-port network communication (for example all port-to-port communications) among the plurality of networked computing devices. In certain embodiments, for example, the establishing may comprise intercepting network connection requests having associated destination port numbers. In certain embodiments, for example, the establishing may comprise identifying preconfigured, predefined, pre-established and/or preprovisioned encrypted communication port numbers, comprising identifying at least one preconfigured, predefined, pre-established and/or preprovisioned encrypted communication port number for each associated destination port number of the associated destination port numbers. In certain embodiments, for example, the establishing may comprise requesting the negotiation of encrypted communication pathways, the requesting comprising sending connection request packets comprising the encrypted communication port numbers, each one of the encrypted communication pathways having a one-to-one correspondence with one of the encrypted communication port numbers. In certain embodiments, for example, the establishing may comprise authorizing the encrypted communication pathways, comprising comparing computing device identifiers, user-application identifiers, and/or payload data-type identifiers received from the encrypted communication pathways with preconfigured, predefined, pre-established and/or preprovisioned authorization codes.

Certain embodiments may provide, for example, a product for managing communications of a plurality of networked computing devices, the product comprising a non-transitory computer-readable storage medium having computer-readable program code embodied therein, the computer-readable program code executable (or compilable, linkable, and/or loadable to be executable) by a computing device to enable and/or cause the computing device to perform communication management operations, the communication management operations comprising: establishing authorized encrypted communication pathways for all port-to-port network communications among the plurality of networked computing devices, comprising: i) intercepting network connection requests having associated destination port numbers; ii) identifying preconfigured, predefined, pre-established and/or preprovisioned encrypted communication port numbers, comprising identifying at least one preconfigured, predefined, pre-established and/or preprovisioned encrypted communication port number for each associated destination port number of the associated destination port numbers; iii) requesting the negotiation of encrypted communication pathways, the requesting comprising sending connection request packets comprising the encrypted communication port numbers, each one of the encrypted communication pathways having a one-to-one correspondence with one of the encrypted communication port numbers; and iv) authorizing the encrypted communication pathways, comprising comparing computing device identifiers, user-application identifiers, and payload data-type identifiers received from the encrypted communication pathways with preconfigured, predefined, pre-established and/or preprovisioned authorization codes.

Certain embodiments may provide, for example, a product for managing communications of a plurality of networked computing devices. In certain embodiments, for example, the product may comprise a non-transitory computer-readable storage medium having computer-readable program code embodied therein. In certain embodiments, for example, the computer-readable program code may be executable (or program code compilable, linkable, and/or loadable to be executable) by a computing device (for example a computing device executing an operating system (for example a Linux operating system, a Linux-based operating system, a real time operating system, a mini-operating system, an edge device operating system, and/or an open source operating system)) to enable and/or cause the computing device to perform communication management operations. In certain embodiments, for example, the communication management operations may comprise establishing authorized encrypted communication pathways for at least one port-to-port network communication (including, for example, all port-to-port network communications) among the plurality of networked computing devices. In certain embodiments, for example, the establishing may comprise intercepting network connection requests from source ports (for example source ports that have been opened by and have a predetermined relationship with authorized applications), the requests having associated destination port numbers. In certain embodiments, for example, the establishing may comprise verifying that the source ports are authorized to communicate with ports having the associated destination port numbers. In certain embodiments, for example, the establishing may comprise requesting the negotiation of encrypted communication pathways, the requesting comprising sending connection request packets comprising the associated destination port numbers. In certain embodiments, for example, the establishing may comprise authorizing the encrypted communication pathways, comprising comparing computing device identifiers, user-application identifiers, and/or payload data-type identifiers received from the encrypted communication pathways with preconfigured, predefined, pre-established and/or preprovisioned authorization codes.

Certain embodiments may provide, for example, a product for managing communications of a plurality of networked computing devices, the product comprising a non-transitory computer-readable storage medium having computer-readable program code embodied therein, the computer-readable program code executable (or compilable, linkable, and/or loadable to be executable) by a computing device to enable and/or cause the computing device to perform communication management operations, the communication management operations comprising: establishing authorized encrypted communication pathways for all port-to-port network communications among the plurality of networked computing devices, comprising: i) intercepting network connection requests from source ports, the requests having associated destination port numbers; ii) verifying that the source ports are authorized to communicate with ports having the associated destination port numbers; iii) requesting the negotiation of encrypted communication pathways, the requesting comprising sending connection request packets comprising the associated destination port numbers; and iv) authorizing the encrypted communication pathways, comprising comparing computing device identifiers, user-application identifiers, and payload data-type identifiers received from the encrypted communication pathways with preconfigured, predefined, pre-established and/or preprovisioned authorization codes.

Certain embodiments may provide, for example, a product for managing communications of a plurality of networked computing devices. In certain embodiments, for example, the product may comprise a non-transitory computer-readable storage medium having computer-readable program code embodied therein. In certain embodiments, for example, the computer-readable program code may be executable (or program code compilable, linkable, and/or loadable to be executable) by a computing device (for example a computing device executing an operating system (for example a Linux operating system, a Linux-based operating system, a real time operating system, a mini-operating system, an edge device operating system, and/or an open source operating system)) to enable and/or cause the computing device to perform communication management operations. In certain embodiments, for example, the communication management operations may comprise establishing authorized network tunnels for all port-to-port network communications among the plurality of networked computing devices. In certain embodiments, for example, the establishing may comprise intercepting a network connection request from a source port, the request having an associated destination port number. In certain embodiments, for example, the establishing may comprise verifying that the source port is authorized to communicate with a port having the associated destination port number. In certain embodiments, for example, the establishing may comprise requesting the negotiation of a network tunnel, comprising sending a connection request packet comprising the associated destination port number. In certain embodiments, for example, the establishing may comprise authorizing the network tunnel, comprising comparing a computing device identifiers, a user-application identifier, and a payload data-type identifier received from the network tunnel with a preconfigured, predefined, pre-established and/or preprovisioned authorization code.

Certain embodiments may provide, for example, a product for managing communications of a plurality of networked computing devices, the product comprising a non-transitory computer-readable storage medium having computer-readable program code embodied therein, the computer-readable program code executable (or compilable, linkable, and/or loadable to be executable) by a computing device to enable and/or cause the computing device to perform communication management operations, the communication management operations comprising: establishing authorized network tunnels for all port-to-port network communications among the plurality of networked computing devices, comprising: i) intercepting a network connection request from a source port, the request having an associated destination port number; ii) verifying that the source port is authorized to communicate with a port having the associated destination port number; iii) requesting the negotiation of a network tunnel, comprising sending a connection request packet comprising the associated destination port number; and iv) authorizing the network tunnel, comprising comparing a computing device identifiers, a user-application identifier, and a payload data-type identifier received from the network tunnel with a preconfigured, predefined, pre-established and/or preprovisioned authorization code.

Certain embodiments may provide, for example, a product for managing communications of a plurality of networked computing devices. In certain embodiments, for example, the product may comprise a non-transitory computer-readable storage medium having computer-readable program code embodied therein. In certain embodiments, for example, the computer-readable program code may be executable (or program code compilable, linkable, and/or loadable to be executable) by a computing device (for example a computing device executing an operating system (for example a Linux operating system, a Linux-based operating system, a real time operating system, a mini-operating system, an edge device operating system, and/or an open source operating system)) to enable and/or cause the computing device to perform communication management operations. In certain embodiments, for example, the communication management operations may comprise establishing authorized encrypted communication pathways for all port-to-port network communications among the plurality of networked computing devices. In certain embodiments, for example, the establishing may comprise intercepting a network connection request having an associated destination port number. In certain embodiments, for example, the establishing may comprise identifying a preconfigured, predefined, pre-established and/or preprovisioned encrypted communication port number associated with the destination port number. In certain embodiments, for example, the establishing may comprise requesting the negotiation of an encrypted communication pathway, the requesting comprising sending a connection request packet comprising the encrypted communication port number. In certain embodiments, for example, the establishing may comprise authorizing the encrypted communication pathway, comprising comparing a computing device identifier, a user-application identifier, and a payload data-type identifier received from the encrypted communication pathway with a preconfigured, predefined, pre-established and/or preprovisioned authorization code.

Certain embodiments may provide, for example, a product for managing communications of a plurality of networked computing devices, the product comprising a non-transitory computer-readable storage medium having computer-readable program code embodied therein, the computer-readable program code executable (or compilable, linkable, and/or loadable to be executable) by a computing device to enable and/or cause the computing device to perform communication management operations, the communication management operations comprising: establishing authorized encrypted communication pathways for all port-to-port network communications among the plurality of networked computing devices, comprising: i) intercepting a network connection request having an associated destination port number; ii) identifying a preconfigured, predefined, pre-established and/or preprovisioned encrypted communication port number associated with the destination port number; iii) requesting the negotiation of an encrypted communication pathway, the requesting comprising sending a connection request packet comprising the encrypted communication port number; and iv) authorizing the encrypted communication pathway, comprising comparing a computing device identifier, a user-application identifier, and a payload data-type identifier received from the encrypted communication pathway with a preconfigured, predefined, pre-established and/or preprovisioned authorization code.

Certain embodiments may provide, for example, a product for managing communications of a plurality of networked computing devices. In certain embodiments, for example, the product may comprise a non-transitory computer-readable storage medium having computer-readable program code embodied therein. In certain embodiments, for example, the computer-readable program code may be executable (or program code compilable, linkable, and/or loadable to be executable) by a computing device (for example a computing device executing an operating system (for example a Linux operating system, a Linux-based operating system, a real time operating system, a mini-operating system, an edge device operating system, and/or an open source operating system)) to enable and/or cause the computing device to perform communication management operations. In certain embodiments, for example, the communication management operations may comprise establishing authorized encrypted communication pathways for all port-to-port network communications among the plurality of networked computing devices. In certain embodiments, for example, the establishing may comprise intercepting a network connection request from a source port, the request having an associated destination port number. In certain embodiments, for example, the establishing may comprise verifying that the source port is authorized to communicate with a port having the associated destination port number. In certain embodiments, for example, the establishing may comprise requesting the negotiation of an encrypted communication pathway, the requesting comprising sending a connection request packet comprising the associated destination port number. In certain embodiments, for example, the establishing may comprise authorizing the encrypted communication pathway, comprising comparing a computing device identifier, a user-application identifier, and a payload data-type identifier received from the encrypted communication pathway with a preconfigured, predefined, pre-established and/or preprovisioned authorization code.

Certain embodiments may provide, for example, a product for managing communications of a plurality of networked computing devices, the product comprising a non-transitory computer-readable storage medium having computer-readable program code embodied therein, the computer-readable program code executable (or compilable, linkable, and/or loadable to be executable) by a computing device to enable and/or cause the computing device to perform communication management operations, the communication management operations comprising: establishing authorized encrypted communication pathways for all port-to-port network communications among the plurality of networked computing devices, comprising: i) intercepting a network connection request from a source port, the request having an associated destination port number; ii) verifying that the source port is authorized to communicate with a port having the associated destination port number; iii) requesting the negotiation of an encrypted communication pathway, the requesting comprising sending a connection request packet comprising the associated destination port number; and iv) authorizing the encrypted communication pathway, comprising comparing a computing device identifier, a user-application identifier, and a payload data-type identifier received from the encrypted communication pathway with a preconfigured, predefined, pre-established and/or preprovisioned authorization code.

Certain embodiments may provide, for example, a product for managing communications of a plurality of networked computing devices. In certain embodiments, for example, the product may comprise a non-transitory computer-readable storage medium having computer-readable program code embodied therein. In certain embodiments, for example, the computer-readable program code may be executable (or program code compilable, linkable, and/or loadable to be executable) by a computing device (for example a computing device executing an operating system (for example a Linux operating system, a Linux-based operating system, a real time operating system, a mini-operating system, an edge device operating system, and/or an open source operating system)) to enable and/or cause the computing device to perform communication management operations. In certain embodiments, for example, the communication management operations may comprise: performing communication processing functions on at least a portion of port-to-network communications (including, for example, on all port-to-network communications) of the plurality of computing devices. In certain embodiments, for example, the performing communication processing functions may comprise: receiving data packets (for example from a user-application process via a loopback interface) having payloads and associated destination port numbers (the associated destination port numbers may include, for example, a destination port number associated with a destination port of a network security process). In certain embodiments, for example, the performing communication processing functions may comprise: identifying preconfigured, predefined, pre-established and/or preprovisioned tunnel port numbers, each one of the tunnel port numbers having a one-to-one correspondence with one of the associated destination port numbers. In certain embodiments, for example, the performing communication processing functions may comprise: assembling packet segments, each one of the packet segments comprising one of the payloads, an associated user-application process identifier, and a payload data type descriptor. In certain embodiments, for example, the associated user-application process identifier may comprise a process identifier and/or a process owner. In certain embodiments, for example, the associated user-application process identifier, and a payload data type descriptor may be combined (or concatenated) in a metadata portion of the packet segment. In certain embodiments, for example, the metadata may be encrypted, for example by a single-use cryptographic key. In certain embodiments, for example, the performing communication processing functions may comprise: requesting transmission of network packets through network tunnels (for example at least a different network tunnel for each application-to-application communication of a specified data protocol type), each one of the network packets comprising a tunnel port number of one of the tunnel port numbers and one of the assembled packet segments, each one of the network tunnels having a one-to-one correspondence with one of the tunnel port numbers.

A. In certain embodiments, for example, the receiving, identifying, assembling, and requesting may be transparent to all user-application processes on the plurality of networked computing devices. In certain embodiments, for example, the data packets may be received by loopback interfaces. In certain embodiments, for example, the data packets may be received by kernel read and/or write calls. In certain embodiments, for example, the data packets may be received by TAP/TUN interfaces. In certain embodiments, for example, the receiving may occur in kernel spaces of the plural computing devices. In certain embodiments, for example, the receiving may occur in application spaces of the plural computing devices. In certain embodiments, for example, the received data packet may be received from user-application processes executing in application spaces of the plural computing devices. In certain embodiments, for example, the user-application process identifiers may comprise process commands and process owners (for example process commands and process owners comparable to the output of operating system commands). In certain embodiments, for example, the communication processing functions may further comprise: setting connection status indicators to a non-operative state if more than a fixed number (for example a fixed number such as 10 or 20) of requests to transmit network packets are rejected. In certain embodiments, for example, the communication processing functions may further comprise: setting connection status indicators to a non-operative state if the difference between rejected and successful requests to transmit network packets exceeds a fixed number (for example a fixed number such as 10 or 20).

B. In certain embodiments, for example, the communication processing functions may further comprise: checking a connection status of the network tunnels (for example by checking lists maintained in kernel memory of the plural networked computing devices). In certain embodiments, for example, the communication processing functions may further comprise dropping network packets that are received via one or more network tunnels whose connection status indicators are set to a non-operative state.

C. In certain embodiments, for example, the payloads may be translated into a common format prior to the assembling.

Certain embodiments may provide, for example, a product for managing communications of a plurality of networked computing devices, the product comprising a non-transitory computer-readable storage medium having computer-readable program code embodied therein, the computer-readable program code executable (or compilable, linkable, and/or loadable to be executable) by a computing device to enable and/or cause the computing device to perform communication management operations, the communication management operations comprising: performing communication processing functions on all port-to-network communications of the plurality of computing devices, the performing communication processing functions comprising: i) receiving data packets having payloads and associated destination port numbers; ii) identifying preconfigured, predefined, pre-established and/or preprovisioned tunnel port numbers, each one of the tunnel port numbers having a one-to-one correspondence with one of the associated destination port numbers; iii) assembling packet segments, each one of the packet segments comprising one of the payloads, an associated user-application process identifier, and a payload data type descriptor; and iv) requesting transmission of network packets through network tunnels, each one of the network packets comprising a tunnel port number of one of the tunnel port numbers and one of the assembled packet segments, each one of the network tunnels having a one-to-one correspondence with one of the tunnel port numbers.

Certain embodiments may provide, for example, a product for managing communications of a plurality of networked computing devices. In certain embodiments, for example, the product may comprise a non-transitory computer-readable storage medium having computer-readable program code embodied therein. In certain embodiments, for example, the computer-readable program code may be executable (or program code compilable, linkable, and/or loadable to be executable) by a computing device (for example a computing device executing an operating system (for example a Linux operating system, a Linux-based operating system, a real time operating system, a mini-operating system, an edge device operating system, and/or an open source operating system)) to enable and/or cause the computing device to perform communication management operations. In certain embodiments, for example, the communication management operations may comprise performing communication processing functions on all port-to-network communications of the plurality of computing devices. In certain embodiments, for example, the performing communication processing functions may comprise receiving a data packet having a payload and an associated destination port number. In certain embodiments, for example, the performing communication processing functions may comprise identifying a preconfigured, predefined, pre-established and/or preprovisioned tunnel port number associated with the destination port number. In certain embodiments, for example, the performing communication processing functions may comprise assembling a packet segment, the packet segment comprising the payload, an associated user-application identifier, and a payload data type descriptor. In certain embodiments, for example, the performing communication processing functions may comprise requesting transmission of a network packet through a network tunnel, the network packet comprising the tunnel port number and the assembled packet segment, the network tunnel having a one-to-one correspondence with the tunnel port number.

Certain embodiments may provide, for example, a product for managing communications of a plurality of networked computing devices, the product comprising a non-transitory computer-readable storage medium having computer-readable program code embodied therein, the computer-readable program code executable (or compilable, linkable, and/or loadable to be executable) by a computing device to enable and/or cause the computing device to perform communication management operations, the communication management operations comprising: performing communication processing functions on all port-to-network communications of the plurality of computing devices, the performing communication processing functions comprising: i) receiving a data packet having a payload and an associated destination port number; ii) identifying a preconfigured, predefined, pre-established and/or preprovisioned tunnel port number associated with the destination port number; iii) assembling a packet segment, the packet segment comprising the payload, an associated user-application identifier, and a payload data type descriptor; and iv) requesting transmission of a network packet through a network tunnel, the network packet comprising the tunnel port number and the assembled packet segment, the network tunnel having a one-to-one correspondence with the tunnel port number.

Certain embodiments may provide, for example, a product for managing communications of a plurality of networked computing devices. In certain embodiments, for example, the product may comprise a non-transitory computer-readable storage medium having computer-readable program code embodied therein. In certain embodiments, for example, the computer-readable program code may be executable (or program code compilable, linkable, and/or loadable to be executable) by a computing device (for example a computing device executing an operating system (for example a Linux operating system, a Linux-based operating system, a real time operating system, a mini-operating system, an edge device operating system, and/or an open source operating system)) to enable and/or cause the computing device to perform communication management operations. In certain embodiments, for example, the communication management operations may comprise: performing communication processing functions on at least a portion of port-to-network communications (including, for example, on all port-to-network communications) of the plurality of computing devices. In certain embodiments, for example, the performing communication processing functions may comprise receiving data packets from source ports, the data packets having payloads and associated destination port numbers. In certain embodiments, for example, the performing communication processing functions may comprise verifying that the source ports are authorized to communicate with ports having the associated destination port numbers. In certain embodiments, for example, the performing communication processing functions may comprise assembling packet segments, each one of the packet segments comprising one of the payloads, an associated user-application identifier, and a payload data type descriptor. In certain embodiments, for example, the performing communication processing functions may comprise requesting transmission of network packets through network tunnels, each one of the network packets comprising a port number of one of the associated destination port numbers and one of the assembled packet segments, each one of the network tunnels having a one-to-one correspondence with one of the associated destination port numbers.

A. In certain embodiments, for example, the transmitted network packets may be exclusive of the destination port numbers associated with the received data packets. In certain embodiments, for example, the payloads in the transmitted network packets may be re-associated with the destination port numbers only after the transmitted network packets are received at one or more second computing devices of the plurality of networked computing devices, the second computing device different from the computing device. In certain embodiments, for example, the associated destination port numbers may not be transmitted from the computing device to one or more second computing devices of the plurality of networked computing devices. In certain embodiments, for example, the associated destination port numbers may not be transmitted across a network coupled to one or more computing devices of the plurality of networked computing devices. In certain embodiments, for example, the associated destination port numbers may not be transmitted from the computing device via the network tunnels.

Certain embodiments may provide, for example, a product for managing communications of a plurality of networked computing devices, the product comprising a non-transitory computer-readable storage medium having computer-readable program code embodied therein, the computer-readable program code executable (or compilable, linkable, and/or loadable to be executable) by a computing device to enable and/or cause the computing device to perform communication management operations, the communication management operations comprising: performing communication processing functions on all port-to-network communications of the plurality of computing devices, the performing communication processing functions comprising: i) receiving data packets from source ports, the data packets having payloads and associated destination port numbers; ii) verifying that the source ports are authorized to communicate with ports having the associated destination port numbers; iii) assembling packet segments, each one of the packet segments comprising one of the payloads, an associated user-application identifier, and a payload data type descriptor; and iv) requesting transmission of network packets through network tunnels, each one of the network packets comprising a port number of one of the associated destination port numbers and one of the assembled packet segments, each one of the network tunnels having a one-to-one correspondence with one of the associated destination port numbers.

Certain embodiments may provide, for example, a product for managing communications of a plurality of networked computing devices. In certain embodiments, for example, the product may comprise a non-transitory computer-readable storage medium having computer-readable program code embodied therein. In certain embodiments, for example, the computer-readable program code may be executable (or program code compilable, linkable, and/or loadable to be executable) by a computing device (for example a computing device executing an operating system (for example a Linux operating system, a Linux-based operating system, a real time operating system, a mini-operating system, an edge device operating system, and/or an open source operating system)) to enable and/or cause the computing device to perform communication management operations. In certain embodiments, for example, the communication management operations may comprise: performing communication processing functions on all port-to-network communications of the plurality of computing devices. In certain embodiments, for example, the performing communication processing functions may comprise receiving data packets having payloads and associated destination port numbers. In certain embodiments, for example, the performing communication processing functions may comprise identifying preconfigured, predefined, pre-established and/or preprovisioned port numbers, each one of the port numbers having a one-to-one correspondence with one of the associated destination port numbers. In certain embodiments, for example, the performing communication processing functions may comprise assembling packet segments, each one of the packet segments comprising one of the payloads, an associated user-application identifier, and a payload data type descriptor. In certain embodiments, for example, the performing communication processing functions may comprise requesting transmission of network packets through encrypted communication pathways, each one of the network packets comprising a port number of one of the port numbers and one of the assembled packet segments, each one of the encrypted communication pathways having a one-to-one correspondence with one of the port numbers.

Certain embodiments may provide, for example, a product for managing communications of a plurality of networked computing devices, the product comprising a non-transitory computer-readable storage medium having computer-readable program code embodied therein, the computer-readable program code executable (or compilable, linkable, and/or loadable to be executable) by a computing device to enable and/or cause the computing device to perform communication management operations, the communication management operations comprising: performing communication processing functions on all port-to-network communications of the plurality of computing devices, the performing communication processing functions comprising: i) receiving data packets having payloads and associated destination port numbers; ii) identifying preconfigured, predefined, pre-established and/or preprovisioned port numbers, each one of the port numbers having a one-to-one correspondence with one of the associated destination port numbers; iii) assembling packet segments, each one of the packet segments comprising one of the payloads, an associated user-application identifier, and a payload data type descriptor; and iv) requesting transmission of network packets through encrypted communication pathways, each one of the network packets comprising a port number of one of the port numbers and one of the assembled packet segments, each one of the encrypted communication pathways having a one-to-one correspondence with one of the port numbers.

Certain embodiments may provide, for example, a product for managing communications of a plurality of networked computing devices, the product comprising a non-transitory computer-readable storage medium having computer-readable program code embodied therein, the computer-readable program code executable (or compilable, linkable, and/or loadable to be executable) by a computing device to enable and/or cause the computing device to perform communication management operations. In certain embodiments, for example, the communication management operations may comprise performing communication processing functions on all port-to-network communications of the plurality of computing devices. In certain embodiments, for example, the performing communication processing functions may comprise receiving data packets, the data packets comprising messages and associated destination port numbers. In certain embodiments, for example, the performing communication processing functions may comprise identifying preconfigured, predefined, pre-established and/or preprovisioned port numbers, each one of the port numbers having a one-to-one correspondence with one of the associated destination port numbers. In certain embodiments, for example, the performing communication processing functions may comprise assembling packet segments, each one of the packet segments comprising at least a portion of one of the messages, an associated user-application identifier, and a payload data type descriptor. In certain embodiments, for example, the performing communication processing functions may comprise requesting transmission of network packets through encrypted communication pathways, each one of the network packets comprising a port number of one of the port numbers and one of the assembled packet segments, each one of the encrypted communication pathways having a one-to-one correspondence with one of the port numbers.

A. In certain embodiments, for example, one or more of the messages may have a size exceeding a maximum transfer unit.

B. In certain embodiments, for example, one of the packet segments may comprise a portion of one of the messages, the one of the messages having a size exceeding a maximum transfer unit and the one of the packet segments having a total payload, the total payload having a size not exceeding the maximum transfer unit or another maximum transfer unit.

Certain embodiments may provide, for example product for managing communications of a plurality of networked computing devices, the product comprising a non-transitory computer-readable storage medium having computer-readable program code embodied therein, the computer-readable program code executable (or compilable, linkable, and/or loadable to be executable) by a computing device to enable and/or cause the computing device to perform communication management operations, the communication management operations comprising: performing communication processing functions on all port-to-network communications of the plurality of computing devices, the performing communication processing functions comprising: i) receiving data packets, the data packets comprising messages and associated destination port numbers; ii) identifying preconfigured, predefined, pre-established and/or preprovisioned port numbers, each one of the port numbers having a one-to-one correspondence with one of the associated destination port numbers; iii) assembling packet segments, each one of the packet segments comprising at least a portion of one of the messages, an associated user-application identifier, and a payload data type descriptor; and iv) requesting transmission of network packets through encrypted communication pathways, each one of the network packets comprising a port number of one of the port numbers and one of the assembled packet segments, each one of the encrypted communication pathways having a one-to-one correspondence with one of the port numbers.

Certain embodiments may provide, for example, a product for managing communications of a plurality of networked computing devices. In certain embodiments, for example, the product may comprise a non-transitory computer-readable storage medium having computer-readable program code embodied therein, the computer-readable program code executable (or compilable, linkable, and/or loadable to be executable) by a computing device to enable and/or cause the computing device to perform communication management operations. In certain embodiments, for example, the communication management operations may comprise performing communication processing functions on all port-to-network communications of the plurality of computing devices. In certain embodiments, for example, the performing communication processing functions may comprise receiving data packets, the data packets comprising messages and associated destination port numbers, the messages comprising user-application identifiers and payload data type descriptors. In certain embodiments, for example, the performing communication processing functions may comprise identifying preconfigured, predefined, pre-established and/or preprovisioned port numbers, each one of the port numbers having a one-to-one correspondence with one of the associated destination port numbers. In certain embodiments, for example, the performing communication processing functions may comprise assembling packet segments, each one of the packet segments comprising at least a portion of one of the messages, the at least a portion of one of the messages comprising one of the user-application identifiers and one of the payload data type descriptors. In certain embodiments, for example, the performing communication processing functions may comprise requesting transmission of network packets through encrypted communication pathways, each one of the network packets comprising a port number of one of the port numbers and one of the assembled packet segments, each one of the encrypted communication pathways having a one-to-one correspondence with one of the port numbers.

A. In certain embodiments, for example, the user-application identifiers may be spaced apart from one another and the payload data type descriptors are spaced apart from one another.

Certain embodiments may provide, for example, a product for managing communications of a plurality of networked computing devices, the product comprising a non-transitory computer-readable storage medium having computer-readable program code embodied therein, the computer-readable program code executable (or compilable, linkable, and/or loadable to be executable) by a computing device to enable and/or cause the computing device to perform communication management operations, the communication management operations comprising: performing communication processing functions on all port-to-network communications of the plurality of computing devices, the performing communication processing functions comprising: i) receiving data packets, the data packets comprising messages and associated destination port numbers, the messages comprising user-application identifiers and payload data type descriptors; ii) identifying preconfigured, predefined, pre-established and/or preprovisioned port numbers, each one of the port numbers having a one-to-one correspondence with one of the associated destination port numbers; iii) assembling packet segments, each one of the packet segments comprising at least a portion of one of the messages, the at least a portion of one of the messages comprising one of the user-application identifiers and one of the payload data type descriptors; and iv) requesting transmission of network packets through encrypted communication pathways, each one of the network packets comprising a port number of one of the port numbers and one of the assembled packet segments, each one of the encrypted communication pathways having a one-to-one correspondence with one of the port numbers.

A. In certain embodiments, for example, any given message to be sent across a network may have a size exceeding a maximum transfer unit (for example a maximum transfer unit of 1500 bytes), requiring the message to be split into plural payloads for transport across the network, each of the plural payloads having a size of no greater than the maximum transfer unit, for insertion into plural network packets. In certain further embodiments, for example, the computing processing functions may comprise inserting plural metadata into the message, whereby each one of the plural payloads contains one of the plural metadata. In certain embodiments, for example, the plural metadata may be positioned at predetermined locations in the plural payloads. In certain embodiments, for example, two or more of the plural metadata may be spaced a pre-determined distance in the any given message. In certain embodiments, for example, each one of the plural meta data may comprise one of the user-application identifiers and one of the payload data type descriptors.

Certain embodiments may provide, for example, a product for managing communications of a plurality of networked computing devices. In certain embodiments, for example, the product may comprise a non-transitory computer-readable storage medium having computer-readable program code embodied therein. In certain embodiments, for example, the computer-readable program code may be executable (or program code compilable, linkable, and/or loadable to be executable) by a computing device (for example a computing device executing an operating system (for example a Linux operating system, a Linux-based operating system, a real time operating system, a mini-operating system, an edge device operating system, and/or an open source operating system)) to enable and/or cause the computing device to perform communication management operations. In certain embodiments, for example, the communication management operations may comprise performing communication processing functions on at least a portion of port-to-network communications (including, for example, on all port-to-network communications) of the plurality of computing devices. In certain embodiments, for example, the performing communication processing functions may comprise receiving data packets from source ports, the data packets having payloads and associated destination port numbers. In certain embodiments, for example, the performing communication processing functions may comprise verifying that the source ports are authorized to communicate with ports having the associated destination port numbers. In certain embodiments, for example, the performing communication processing functions may comprise assembling packet segments, each one of the packet segments comprising one of the payloads, an associated user-application identifier, and a payload data type descriptor. In certain embodiments, for example, the performing communication processing functions may comprise requesting transmission of network packets through encrypted communication pathways, each one of the network packets comprising a port number of one of the associated destination port numbers and one of the assembled packet segments, each one of the encrypted communication pathways having a one-to-one correspondence with one of the associated destination port numbers.

A. In certain embodiments, for example, the transmitted network packets may be exclusive of the destination port numbers associated with the received data packets. In certain embodiments, for example, the payloads in the transmitted network packets may be re-associated with the destination port numbers only after the transmitted network packets are received at one or more second computing devices of the plurality of networked computing devices, the second computing device different from the computing device. In certain embodiments, for example, the associated destination port numbers may not be transmitted from the computing device to one or more second computing devices of the plurality of networked computing devices. In certain embodiments, for example, the associated destination port numbers may not be transmitted across a network coupled to one or more computing devices of the plurality of networked computing devices. In certain embodiments, for example, the associated destination port numbers may not be transmitted from the computing device via the encrypted communication pathways.

Certain embodiments may provide, for example, a product for managing communications of a plurality of networked computing devices, the product comprising a non-transitory computer-readable storage medium having computer-readable program code embodied therein, the computer-readable program code executable (or compilable, linkable, and/or loadable to be executable) by a computing device to enable and/or cause the computing device to perform communication management operations, the communication management operations comprising: performing communication processing functions on all port-to-network communications of the plurality of computing devices, the performing communication processing functions comprising: i) receiving data packets from source ports, the data packets having payloads and associated destination port numbers; ii) verifying that the source ports are authorized to communicate with ports having the associated destination port numbers; iii) assembling packet segments, each one of the packet segments comprising one of the payloads, an associated user-application identifier, and a payload data type descriptor; and iv) requesting transmission of network packets through encrypted communication pathways, each one of the network packets comprising a port number of one of the associated destination port numbers and one of the assembled packet segments, each one of the encrypted communication pathways having a one-to-one correspondence with one of the associated destination port numbers.

Certain embodiments may provide, for example, a product for managing communications of a plurality of networked computing devices. In certain embodiments, for example, the product may comprise a non-transitory computer-readable storage medium having computer-readable program code embodied therein. In certain embodiments, for example, the computer-readable program code may be executable (or program code compilable, linkable, and/or loadable to be executable) by a computing device (for example a computing device executing an operating system (for example a Linux operating system, a Linux-based operating system, a real time operating system, a mini-operating system, an edge device operating system, and/or an open source operating system)) to enable and/or cause the computing device to perform communication management operations. In certain embodiments, for example, the communication management operations may comprise performing communication processing functions on all port-to-network communications of the plurality of computing devices, the performing communication processing functions comprising. In certain embodiments, for example, the communication processing functions may comprise receiving data packets from source ports, the data packets having payloads and associated destination port numbers. In certain embodiments, for example, the communication processing functions may comprise verifying that the source ports are authorized to communicate with ports having the associated destination port numbers. In certain embodiments, for example, the communication processing functions may comprise assembling packet segments, each one of the packet segments comprising one of the payloads, an associated user-application identifier, and a payload data type descriptor. In certain embodiments, for example, the communication processing functions may comprise requesting transmission of network packets through network tunnels, each one of the network packets comprising a port number of one of the associated destination port numbers and one of the assembled packet segments, each one of the network tunnels having a one-to-one correspondence with one of the associated destination port numbers.

A. In certain embodiments, for example, the transmitted network packets may be exclusive of the destination port numbers associated with the received data packets. In certain embodiments, for example, the payloads in the transmitted network packets may be re-associated with the destination port numbers only after the transmitted network packets are received at one or more second computing devices of the plurality of networked computing devices, the second computing device different from the computing device. In certain embodiments, for example, the associated destination port numbers may not be transmitted from the computing device to one or more second computing devices of the plurality of networked computing devices. In certain embodiments, for example, the associated destination port numbers may not be transmitted across a network coupled to one or more computing devices of the plurality of networked computing devices. In certain embodiments, for example, the associated destination port numbers may not be transmitted from the computing device via the network tunnels.

Certain embodiments may provide, for example, a product for managing communications of a plurality of networked computing devices, the product comprising a non-transitory computer-readable storage medium having computer-readable program code embodied therein, the computer-readable program code executable (or compilable, linkable, and/or loadable to be executable) by a computing device to enable and/or cause the computing device to perform communication management operations, the communication management operations comprising: performing communication processing functions on all port-to-network communications of the plurality of computing devices, the performing communication processing functions comprising: i) receiving data packets from source ports, the data packets having payloads and associated destination port numbers; ii) verifying that the source ports are authorized to communicate with ports having the associated destination port numbers; iii) assembling packet segments, each one of the packet segments comprising one of the payloads, an associated user-application identifier, and a payload data type descriptor; and iv) requesting transmission of network packets through network tunnels, each one of the network packets comprising a port number of one of the associated destination port numbers and one of the assembled packet segments, each one of the network tunnels having a one-to-one correspondence with one of the associated destination port numbers.

Certain embodiments may provide, for example, a product for managing communications of a plurality of networked computing devices. In certain embodiments, for example, the product may comprise a non-transitory computer-readable storage medium having computer-readable program code embodied therein. In certain embodiments, for example, the computer-readable program code may be executable (or program code compilable, linkable, and/or loadable to be executable) by a computing device (for example a computing device executing an operating system (for example a Linux operating system, a Linux-based operating system, a real time operating system, a mini-operating system, an edge device operating system, and/or an open source operating system)) to enable and/or cause the computing device to perform communication management operations, the communication management operations comprising: performing communication processing functions on all port-to-network communications of the plurality of computing devices. In certain embodiments, for example, the performing communication processing functions may comprise receiving a data packet from a source port, the data packet having a payload and an associated destination port number. In certain embodiments, for example, the performing communication processing functions may comprise verifying that the source port is authorized to communicate with a port having the associated destination port number. In certain embodiments, for example, the performing communication processing functions may comprise assembling a packet segment, the packet segment comprising the payload, an associated user-application identifier, and a payload data type descriptor. In certain embodiments, for example, the performing communication processing functions may comprise requesting transmission of a network packet through a network tunnel, the network packet comprising the associated destination port numbers and the assembled packet segment, the network tunnels having a one-to-one correspondence with the associated destination port number.

A. In certain embodiments, for example, the transmitted network packet may be exclusive of the destination port number associated with the received data packet. In certain embodiments, for example, the payload in the transmitted network packet may be re-associated with the destination port number only after the transmitted network packet is received at a second computing devices of the plurality of networked computing devices, the second computing device different from the computing device. In certain embodiments, for example, the associated destination port number may not be transmitted from the computing device to the second computing device of the plurality of networked computing devices. In certain embodiments, for example, the associated destination port number may not be transmitted across a network coupled to one or more computing devices of the plurality of networked computing devices. In certain embodiments, for example, the associated destination port number may not be transmitted from the computing device via the network tunnel.

Certain embodiments may provide, for example, a product for managing communications of a plurality of networked computing devices, the product comprising a non-transitory computer-readable storage medium having computer-readable program code embodied therein, the computer-readable program code executable (or compilable, linkable, and/or loadable to be executable) by a computing device to enable and/or cause the computing device to perform communication management operations, the communication management operations comprising: performing communication processing functions on all port-to-network communications of the plurality of computing devices, the performing communication processing functions comprising: i) receiving a data packet from a source port, the data packet having a payload and an associated destination port number; ii) verifying that the source port is authorized to communicate with a port having the associated destination port number; iii) assembling a packet segment, the packet segment comprising the payload, an associated user-application identifier, and a payload data type descriptor, and iv) requesting transmission of a network packet through a network tunnel, the network packet comprising the associated destination port numbers and the assembled packet segment, the network tunnels having a one-to-one correspondence with the associated destination port number.

Certain embodiments may provide, for example, a product for managing communications of a plurality of networked computing devices. In certain embodiments, for example, the product may comprise a non-transitory computer-readable storage medium having computer-readable program code embodied therein. In certain embodiments, for example, the computer-readable program code may be executable (or program code compilable, linkable, and/or loadable to be executable) by a computing device (for example a computing device executing an operating system (for example a Linux operating system, a Linux-based operating system, a real time operating system, a mini-operating system, an edge device operating system, and/or an open source operating system)) to enable and/or cause the computing device to perform communication management operations. In certain embodiments, for example, the communication management operations may comprise performing communication processing functions on all port-to-network communications of the plurality of computing devices. In certain embodiments, for example, the performing communication processing functions may comprise receiving data packets having payloads and associated destination port numbers. In certain embodiments, for example, the performing communication processing functions may comprise identifying preconfigured, predefined, pre-established and/or preprovisioned port numbers, each one of the port numbers having a one-to-one correspondence with one of the associated destination port numbers. In certain embodiments, for example, the performing communication processing functions may comprise assembling packet segments, each one of the packet segments comprising one of the payloads, an associated user-application identifier, and a payload data type descriptor. In certain embodiments, for example, the performing communication processing functions may comprise requesting transmission of network packets through encrypted communication pathways, each one of the network packets comprising a port number of one of the port numbers and one of the assembled packet segments, each one of the encrypted communication pathways having a one-to-one correspondence with one of the port numbers.

Certain embodiments may provide, for example, a product for managing communications of a plurality of networked computing devices, the product comprising a non-transitory computer-readable storage medium having computer-readable program code embodied therein, the computer-readable program code executable (or compilable, linkable, and/or loadable to be executable) by a computing device to enable and/or cause the computing device to perform communication management operations, the communication management operations comprising: performing communication processing functions on all port-to-network communications of the plurality of computing devices, the performing communication processing functions comprising: i) receiving data packets having payloads and associated destination port numbers; ii) identifying preconfigured, predefined, pre-established and/or preprovisioned port numbers, each one of the port numbers having a one-to-one correspondence with one of the associated destination port numbers; iii) assembling packet segments, each one of the packet segments comprising one of the payloads, an associated user-application identifier, and a payload data type descriptor; and iv) requesting transmission of network packets through encrypted communication pathways, each one of the network packets comprising a port number of one of the port numbers and one of the assembled packet segments, each one of the encrypted communication pathways having a one-to-one correspondence with one of the port numbers.

Certain embodiments may provide, for example, a product for managing communications of a plurality of networked computing devices. In certain embodiments, for example, the product may comprise a non-transitory computer-readable storage medium having computer-readable program code embodied therein. In certain embodiments, for example, the computer-readable program code may be executable (or program code compilable, linkable, and/or loadable to be executable) by a computing device (for example a computing device executing an operating system (for example a Linux operating system, a Linux-based operating system, a real time operating system, a mini-operating system, an edge device operating system, and/or an open source operating system)) to enable and/or cause the computing device to perform communication management operations. In certain embodiments, for example, the communication management operations may comprise performing communication processing functions on all port-to-network communications of the plurality of computing devices. In certain embodiments, for example, the performing communication processing functions may comprise receiving a data packet having a payload and an associated destination port number. In certain embodiments, for example, the performing communication processing functions may comprise identifying a preconfigured, predefined, pre-established and/or preprovisioned port number, the port number having a one-to-one correspondence with the associated destination port number. In certain embodiments, for example, the performing communication processing functions may comprise assembling a packet segment, the packet segment comprising the payload, an associated user-application identifier, and a payload data type descriptor. In certain embodiments, for example, the performing communication processing functions may comprise requesting encrypted communication over an encrypted communication pathway of a network packet, the network packets comprising the port number and the assembled packet segment, the encrypted communication pathway having a one-to-one correspondence with the port number.

Certain embodiments may provide, for example, a product for managing communications of a plurality of networked computing devices, the product comprising a non-transitory computer-readable storage medium having computer-readable program code embodied therein, the computer-readable program code executable (or compilable, linkable, and/or loadable to be executable) by a computing device to enable and/or cause the computing device to perform communication management operations, the communication management operations comprising: performing communication processing functions on all port-to-network communications of the plurality of computing devices, the performing communication processing functions comprising: i) receiving a data packet having a payload and an associated destination port number; ii) identifying a preconfigured, predefined, pre-established and/or preprovisioned port number, the port number having a one-to-one correspondence with the associated destination port number; iii) assembling a packet segment, the packet segment comprising the payload, an associated user-application identifier, and a payload data type descriptor; and iv) requesting encrypted communication over an encrypted communication pathway of a network packet, the network packets comprising the port number and the assembled packet segment, the encrypted communication pathway having a one-to-one correspondence with the port number.

Certain embodiments may provide, for example, a product for managing communications of a plurality of networked computing devices. In certain embodiments, for example, the product may comprise a non-transitory computer-readable storage medium having computer-readable program code embodied therein. In certain embodiments, for example, the computer-readable program code may be executable (or program code compilable, linkable, and/or loadable to be executable) by a computing device (for example a computing device executing an operating system (for example a Linux operating system, a Linux-based operating system, a real time operating system, a mini-operating system, an edge device operating system, and/or an open source operating system)) to enable and/or cause the computing device to perform communication management operations. In certain embodiments, for example, the communication management operations may comprise performing communication processing functions on all port-to-network communications of the plurality of computing devices. In certain embodiments, for example, the performing communication processing functions may comprise receiving data packets from source ports, the data packets having payloads and associated destination port numbers. In certain embodiments, for example, the performing communication processing functions may comprise verifying that the source ports are authorized to communicate with ports having the associated destination port numbers. In certain embodiments, for example, the performing communication processing functions may comprise assembling packet segments, each one of the packet segments comprising one of the payloads, an associated user-application identifier, and a payload data type descriptor. In certain embodiments, for example, the performing communication processing functions may comprise requesting transmission of network packets through encrypted communication pathways, each one of the network packets comprising a port number of one of the associated destination port numbers and one of the assembled packet segments, each one of the encrypted communication pathways having a one-to-one correspondence with one of the associated destination port numbers.

Certain embodiments may provide, for example, a product for managing communications of a plurality of networked computing devices, the product comprising a non-transitory computer-readable storage medium having computer-readable program code embodied therein, the computer-readable program code executable (or compilable, linkable, and/or loadable to be executable) by a computing device to enable and/or cause the computing device to perform communication management operations, the communication management operations comprising: performing communication processing functions on all port-to-network communications of the plurality of computing devices, the performing communication processing functions comprising: i) receiving data packets from source ports, the data packets having payloads and associated destination port numbers; ii) verifying that the source ports are authorized to communicate with ports having the associated destination port numbers; iii) assembling packet segments, each one of the packet segments comprising one of the payloads, an associated user-application identifier, and a payload data type descriptor; and iv) requesting transmission of network packets through encrypted communication pathways, each one of the network packets comprising a port number of one of the associated destination port numbers and one of the assembled packet segments, each one of the encrypted communication pathways having a one-to-one correspondence with one of the associated destination port numbers.

Certain embodiments may provide, for example, a product for managing communications of a plurality of networked computing devices. In certain embodiments, for example, the product may comprise a non-transitory computer-readable storage medium having computer-readable program code embodied therein. In certain embodiments, for example, the computer-readable program code may be executable (or program code compilable, linkable, and/or loadable to be executable) by a computing device (for example a computing device executing an operating system (for example a Linux operating system, a Linux-based operating system, a real time operating system, a mini-operating system, an edge device operating system, and/or an open source operating system)) to enable and/or cause the computing device to perform communication management operations. In certain embodiments, for example, the communication management operations may comprise performing communication processing functions on all port-to-network communications of the plurality of computing devices. In certain embodiments, for example, the performing communication processing functions may comprise receiving a data packet from a source port, the data packet having a payload and an associated destination port number. In certain embodiments, for example, the performing communication processing functions may comprise verifying that the source port is authorized to communicate with a port having the associated destination port number. In certain embodiments, for example, the performing communication processing functions may comprise assembling a packet segment, the packet segments comprising the payload, an associated user-application identifier, and a payload data type descriptor. In certain embodiments, for example, the performing communication processing functions may comprise requesting transmission of a network packet through an encrypted communication pathway, the network packets comprising the associated destination port number and the assembled packet segment, the encrypted communication pathway having a one-to-one correspondence with the associated destination port number.

A. In certain embodiments, for example, the transmitted network packet may be exclusive of the destination port number associated with the received data packet. In certain embodiments, for example, the payload in the transmitted network packet may be re-associated with the destination port number only after the transmitted network packet is received at a second computing devices of the plurality of networked computing devices, the second computing device different from the computing device. In certain embodiments, for example, the associated destination port number may not be transmitted from the computing device to the second computing device of the plurality of networked computing devices. In certain embodiments, for example, the associated destination port number may not be transmitted across a network coupled to one or more computing devices of the plurality of networked computing devices. In certain embodiments, for example, the associated destination port number may not be transmitted from the computing device via the network tunnel.

Certain embodiments may provide, for example, a product for managing communications of a plurality of networked computing devices, the product comprising a non-transitory computer-readable storage medium having computer-readable program code embodied therein, the computer-readable program code executable (or compilable, linkable, and/or loadable to be executable) by a computing device to enable and/or cause the computing device to perform communication management operations, the communication management operations comprising: performing communication processing functions on all port-to-network communications of the plurality of computing devices, the performing communication processing functions comprising: i) receiving a data packet from a source port, the data packet having a payload and an associated destination port number; ii) verifying that the source port is authorized to communicate with a port having the associated destination port number; iii) assembling a packet segment, the packet segments comprising the payload, an associated user-application identifier, and a payload data type descriptor; and iv) requesting transmission of a network packet through an encrypted communication pathway, the network packets comprising the associated destination port number and the assembled packet segment, the encrypted communication pathway having a one-to-one correspondence with the associated destination port number.

Certain embodiments may provide, for example, a product for managing communications of a plurality of networked computing devices. In certain embodiments, for example, the product may comprise a non-transitory computer-readable storage medium having computer-readable program code embodied therein. In certain embodiments, for example, the computer-readable program code may be executable (or program code compilable, linkable, and/or loadable to be executable) by a computing device (for example a computing device executing an operating system (for example a Linux operating system, a Linux-based operating system, a real time operating system, a mini-operating system, an edge device operating system, and/or an open source operating system)) to enable and/or cause the computing device to perform communication management operations. In certain embodiments, for example, the communication management operations may comprise: performing communication processing functions on at least a portion of network-to-port communications (including, for example, on all network-to-port communications) received by the plurality of computing devices. In certain embodiments, for example, the performing communication processing functions may comprise obtaining tunnel port numbers, metadata (for example metadata encrypted using a single-use cryptographic key), and payloads associated with network packets. In certain embodiments, for example, the performing communication processing functions may comprise identifying preconfigured, predefined, pre-established and/or preprovisioned destination port numbers and preconfigured, predefined, pre-established and/or preprovisioned authorization codes associated with the tunnel port numbers, each one of the authorization codes comprising a preconfigured, predefined, pre-established and/or preprovisioned user-application process identifier and a preconfigured, predefined, pre-established and/or preprovisioned payload data-type identifier associated with one of the obtained tunnel port numbers. In certain embodiments, for example, the performing communication processing functions may comprise authorizing the network packets, comprising: comparing (for example comparing in application spaces or kernel spaces of the plurality of computing devices) metadata with the authorization codes. In certain embodiments, for example, the performing communication processing functions may comprise requesting transmission (for example across loopback interfaces, by TUN/TAP interfaces, or by kernel read and/or write calls) of payloads from the authorized network packets to destinations referenced by the destination port numbers. In certain embodiments, for example, the payloads may be passed to the destination port numbers by one or more loopback interfaces.

A. In certain embodiments, for example, the obtaining, identifying, authorizing, and requesting may be transparent to all user-application processes on the plurality of networked computing devices (for example by employing modified network application programming interface functions (for example in a modified operating system) while maintaining standard syntax). In certain embodiments, for example, the obtaining, identifying, authorizing, and requesting may be self-executing and/or automatic (for example requiring no human intervention, no interruption in computer execution other than ordinary, temporary process scheduling).

B. In certain embodiments, for example, the communication processing functions may be performed at 95% of wire speed or greater and less than 10% of the processor load may be committed to network communications. In certain embodiments, for example, the destinations may comprise user-application processes. In certain embodiments, for example, the program code may be middleware positioned between the network and the destinations referenced by the destination port number. In certain embodiments, for example, the communication processing functions may further comprise: dropping network packets if they are not authorized following the comparing (for example dropping network packets for which the metadata does not match expected values based on the authorization codes).

C. In certain embodiments, for example, the communication processing functions may further comprise: setting connection status indicators to a non-operative state if more than a fixed number of network packets are not authorized following the comparing. In certain embodiments, for example, the communication processing functions may further comprise: checking, the checking at least partially performed in kernels of the plural networked computing devices, a connection status of the network. In certain embodiments, for example, the communication processing functions may further comprise: dropping network packets that are received via one or more network tunnels whose connection status indicators are set to a non-operative state.

Certain embodiments may comprise, for example, a product for managing communications of a plurality of networked computing devices, the product comprising a non-transitory computer-readable storage medium having computer-readable program code embodied therein, the computer-readable program code executable (or compilable, linkable, and/or loadable to be executable) by a computing device to enable and/or cause the computing device to perform communication management operations, the communication management operations comprising: performing communication processing functions on all network-to-port communications received by the plurality of computing devices, the performing communication processing functions comprising: i) obtaining tunnel port numbers, metadata, and payloads associated with network packets; ii) identifying preconfigured, predefined, pre-established and/or preprovisioned destination port numbers and preconfigured, predefined, pre-established and/or preprovisioned authorization codes associated with the tunnel port numbers, each one of the authorization codes comprising a preconfigured, predefined, pre-established and/or preprovisioned user-application identifier and a preconfigured, predefined, pre-established and/or preprovisioned payload data-type identifier associated with one of the obtained tunnel port numbers; iii) authorizing the network packets, comprising: comparing at least a portion of the metadata with the authorization codes; and iv) requesting transmission of payloads from the authorized network packets to destinations referenced by the destination port numbers.

Certain embodiments may provide, for example, a product for managing communications of a plurality of networked computing devices. In certain embodiments, for example, the product may comprise a non-transitory computer-readable storage medium having computer-readable program code embodied therein. In certain embodiments, for example, the computer-readable program code may be executable (or program code compilable, linkable, and/or loadable to be executable) by a computing device (for example a computing device executing an operating system (for example a Linux operating system, a Linux-based operating system, a real time operating system, a mini-operating system, an edge device operating system, and/or an open source operating system)) to enable and/or cause the computing device to perform communication management operations. In certain embodiments, for example, the communication management operations may comprise performing communication processing functions on all network-to-port communications received by the plurality of computing devices. In certain embodiments, for example, the performing communication processing functions may comprise obtaining a port number, metadata, and a payload associated with a network packet received by the networked computing device. In certain embodiments, for example, the performing communication processing functions may comprise identifying a preconfigured, predefined, pre-established and/or preprovisioned destination port number and a preconfigured, predefined, pre-established and/or preprovisioned authorization code associated with the obtained port number, the authorization code comprising a preconfigured, predefined, pre-established and/or preprovisioned user-application identifier and a preconfigured, predefined, pre-established and/or preprovisioned payload data-type identifier associated with the obtained port number. In certain embodiments, for example, the performing communication processing functions may comprise authorizing the network packet, comprising: comparing the metadata with the authorization code. In certain embodiments, for example, the performing communication processing functions may comprise requesting transmission of the payload to a destination referenced by the destination port number.

Certain embodiments may comprise, for example, a computer program product for managing communications of a plurality of networked computing devices, the product comprising a non-transitory computer-readable storage medium having computer-readable program code embodied therein, the computer-readable program code executable (or compilable, linkable, and/or loadable to be executable) by a computing device to enable and/or cause the computing device to perform communication management operations, the communication management operations comprising: performing communication processing functions on all network-to-port communications received by the plurality of computing devices, the performing communication processing functions comprising: i) obtaining a port number, metadata, and a payload associated with a network packet received by the networked computing device; ii) identifying a preconfigured, predefined, pre-established and/or preprovisioned destination port number and a preconfigured, predefined, pre-established and/or preprovisioned authorization code associated with the obtained port number, the authorization code comprising a preconfigured, predefined, pre-established and/or preprovisioned user-application identifier and a preconfigured, predefined, pre-established and/or preprovisioned payload data-type identifier associated with the obtained port number; iii) authorizing the network packet, comprising: comparing the metadata with the authorization code; and iv) requesting transmission of the payload to a destination referenced by the destination port number.

Certain embodiments may provide, for example, a product for managing communications of a plurality of networked computing devices. In certain embodiments, for example, the product may comprise a non-transitory computer-readable storage medium having computer-readable program code embodied therein. In certain embodiments, for example, the computer-readable program code may be executable (or program code compilable, linkable, and/or loadable to be executable) by a computing device (for example a computing device executing an operating system (for example a Linux operating system, a Linux-based operating system, a real time operating system, a mini-operating system, an edge device operating system, and/or an open source operating system)) to enable and/or cause the computing device to perform communication management operations. In certain embodiments, for example, the communication management operations may comprise: performing communication processing functions on at least a portion of network-to-port communications (including, for example, on all network-to-port communications) received by the plurality of computing devices. In certain embodiments, for example, the performing communication processing functions may comprise obtaining destination port numbers, metadata, and payloads associated with network packets. In certain embodiments, for example, the performing communication processing functions may comprise identifying preconfigured, predefined, pre-established and/or preprovisioned authorization codes associated with the destination port numbers, each one of the authorization codes comprising a preconfigured, predefined, pre-established and/or preprovisioned user-application identifier and a preconfigured, predefined, pre-established and/or preprovisioned payload data-type identifier associated with one of the destination port numbers. In certain embodiments, for example, the performing communication processing functions may comprise authorizing the network packets, comprising: comparing at least a portion of the metadata with the authorization codes. In certain embodiments, for example, the performing communication processing functions may comprise requesting transmission of payloads from the authorized network packets to destinations referenced by the destination port numbers.

Certain embodiments may provide, for example, a product for managing communications of a plurality of networked computing devices, the product comprising a non-transitory computer-readable storage medium having computer-readable program code embodied therein, the computer-readable program code executable by a computing device to enable and/or cause the computing device to perform communication management operations, the communication management operations comprising: performing communication processing functions on all network-to-port communications received by the plurality of computing devices, the performing communication processing functions comprising: i) obtaining destination port numbers, metadata, and payloads associated with network packets; ii) identifying preconfigured, predefined, pre-established and/or preprovisioned authorization codes associated with the destination port numbers, each one of the authorization codes comprising a preconfigured, predefined, pre-established and/or preprovisioned user-application identifier and a preconfigured, predefined, pre-established and/or preprovisioned payload data-type identifier associated with one of the destination port numbers; iii) authorizing the network packets, comprising: comparing at least a portion of the metadata with the authorization codes; and iv) requesting transmission of payloads from the authorized network packets to destinations referenced by the destination port numbers.

Certain embodiments may provide, for example, a product for managing communications of a plurality of networked computing devices. In certain embodiments, for example, the product may comprise a non-transitory computer-readable storage medium having computer-readable program code embodied therein. In certain embodiments, for example, the computer-readable program code may be executable (or program code compilable, linkable, and/or loadable to be executable) by a computing device (for example a computing device executing an operating system (for example a Linux operating system, a Linux-based operating system, a real time operating system, a mini-operating system, an edge device operating system, and/or an open source operating system)) to enable and/or cause the computing device to perform communication management operations. In certain embodiments, for example, the communication management operations may comprise performing communication processing functions on all network-to-port communications received by the plurality of computing devices. In certain embodiments, for example, the performing communication processing functions may comprise obtaining a port number, metadata, and a payload associated with a network packet received by the networked computing device. In certain embodiments, for example, the performing communication processing functions may comprise identifying a preconfigured, predefined, pre-established and/or preprovisioned destination port number and a preconfigured, predefined, pre-established and/or preprovisioned authorization code associated with the obtained port number, the authorization code comprising a preconfigured, predefined, pre-established and/or preprovisioned user-application identifier and a preconfigured, predefined, pre-established and/or preprovisioned payload data-type identifier associated with the obtained port number. In certain embodiments, for example, the performing communication processing functions may comprise authorizing the network packet, comprising: comparing the metadata with the authorization code. In certain embodiments, for example, the performing communication processing functions may comprise requesting transmission of the payload to a destination referenced by the preconfigured, predefined, pre-established and/or preprovisioned destination port number.

Certain embodiments may provide, for example, a product for managing communications of a plurality of networked computing devices, the product comprising a non-transitory computer-readable storage medium having computer-readable program code embodied therein, the computer-readable program code executable (or compilable, linkable, and/or loadable to be executable) by a computing device to enable and/or cause the computing device to perform communication management operations, the communication management operations comprising: performing communication processing functions on all network-to-port communications received by the plurality of computing devices, the performing communication processing functions comprising: i) obtaining a port number, metadata, and a payload associated with a network packet received by the networked computing device; ii) identifying a preconfigured, predefined, pre-established and/or preprovisioned destination port number and a preconfigured, predefined, pre-established and/or preprovisioned authorization code associated with the obtained port number, the authorization code comprising a preconfigured, predefined, pre-established and/or preprovisioned user-application identifier and a preconfigured, predefined, pre-established and/or preprovisioned payload data-type identifier associated with the obtained port number; iii) authorizing the network packet, comprising: comparing the metadata with the authorization code; and iv) requesting transmission of the payload to a destination referenced by the preconfigured, predefined, pre-established and/or preprovisioned destination port number.

Certain embodiments may provide, for example, a product for managing communications of a plurality of networked computing devices. In certain embodiments, for example, the product may comprise a non-transitory computer-readable storage medium having a plurality of computer-readable program code embodied therein, the plurality of computer-readable program code for distributed execution across the plurality of networked computing devices to cooperatively enable and/or cause the plurality of networked computing devices to perform communication management operations. In certain embodiments, for example, the communication management operations may comprise negotiating, on a first computing device, a first data pathway between a first user-application and a first network security program code of the plurality of computer-readable program code. In certain embodiments, for example, the communication management operations may comprise negotiating, on a second computing device, a second data pathway between a second network security program of the plurality of computer-readable program code and a second user-application. In certain embodiments, for example, the communication management operations may comprise negotiating a third data pathway between the first network security program and the second network security program, the third data pathway comprising an encrypted network tunnel, each of the first data pathway, second data pathway, and third data pathway participate to form at least a part of a dedicated data pathway for exclusively communicating data from a first port of the first user-application to a second port of the second user-application.

Certain embodiments may provide, for example, a product for managing communications of a plurality of networked computing devices, the product comprising a non-transitory computer-readable storage medium having a plurality of computer-readable program code embodied therein, the plurality of computer-readable program code for distributed execution across the plurality of networked computing devices to cooperatively enable and/or cause the plurality of networked computing devices to perform communication management operations, the communication management operations comprising: i) negotiating, on a first computing device, a first data pathway between a first user-application and a first network security program code of the plurality of computer-readable program code; ii) negotiating, on a second computing device, a second data pathway between a second network security program of the plurality of computer-readable program code and a second user-application; and iii) negotiating a third data pathway between the first network security program and the second network security program, the third data pathway comprising an encrypted network tunnel, each of the first data pathway, second data pathway, and third data pathway participate to form at least a part of a dedicated data pathway for exclusively communicating data from a first port of the first user-application to a second port of the second user-application.

Certain embodiments may provide, for example, a product for managing communications of a plurality of networked computing devices. In certain embodiments, for example, the product may comprise a non-transitory computer-readable storage medium having a plurality of computer-readable program code embodied therein, the plurality of computer-readable program code for distributed execution across the plurality of networked computing devices to cooperatively enable and/or cause the plurality of networked computing devices to perform communication management operations. In certain embodiments, for example, the communication management operations may comprise negotiating, on a first computing device, a first data pathway between a first user-application and a first network security program of the plural security programs. In certain embodiments, for example, the communication management operations may comprise negotiating, on a second computing device, a second data pathway between a second network security program of the plural security programs and a second user-application. In certain embodiments, for example, the communication management operations may comprise negotiating a third data pathway between the first network security program and the second network security program, the third data pathway comprising an encrypted communication pathway, each of the first data pathway, second data pathway, and third data pathway exclusive to a dedicated data pathway for communicating data from a first port of the first user-application to a second port of the second user-application.

Certain embodiments may provide, for example, a product for managing communications of a plurality of networked computing devices, the product comprising a non-transitory computer-readable storage medium having a plurality of computer-readable program code embodied therein, the plurality of computer-readable program code for distributed execution across the plurality of networked computing devices to cooperatively enable and/or cause the plurality of networked computing devices to perform communication management operations, the communication management operations comprising: i) negotiating, on a first computing device, a first data pathway between a first user-application and a first network security program of the plural security programs; ii) negotiating, on a second computing device, a second data pathway between a second network security program of the plural security programs and a second user-application; iii) negotiating a third data pathway between the first network security program and the second network security program, the third data pathway comprising an encrypted communication pathway, each of the first data pathway, second data pathway, and third data pathway exclusive to a dedicated data pathway for communicating data from a first port of the first user-application to a second port of the second user-application.

Certain embodiments may provide, for example, a secured system, comprising: i) a first node networked with a second node, the first node hosting a first application program, the second node hosting a second application program; and ii) plural network security programs cooperatively configured according to plural configuration files to negotiate one or plural dedicated data pathways for all communications between the first application program and the second application program, each of the one or plural data pathways comprising: an encrypted network tunnel extending from a first network security program of the plural network security programs to a second network security program of the plural network security programs, the first network security program and the second network security program interposed between the first application program and the second application program; each of the plural configuration files comprising: a) one or plural destination port numbers associated with the second application program; b) one or plural destination port numbers associated with the second network security program, comprising at least one port number for each one of the one or plural destination port numbers associated with the second application program; c) one or plural first user-application identifiers associated with the first application program; d) one or plural second user-application identifiers associated with the second application program; e) one or plural data type identifiers; and f) node identification codes for the first node and the second node, processor, or computing device.

Certain embodiments may provide, for example, a secured system, comprising: i) a first node networked with a second node, the first node hosting a first application program, the second node hosting a second application program; and ii) plural network security programs cooperatively configured according to plural configuration files to negotiate one or plural dedicated data pathways for all communications between the first application program and the second application program, each of the one or plural data pathways comprising: an encrypted communication pathway extending from a first network security program of the plural network security programs to a second network security program of the plural network security programs, the first network security program and the second network security program interposed between the first application program and the second application program; each of the plural configuration files comprising: a) one or plural destination port numbers associated with the second application program; b) one or plural first user-application identifiers associated with the first application program; c) one or plural second user-application identifiers associated with the second application program; d) one or plural data type identifiers; and e) node identification codes for the first node and the second node, processor, or computing device.

Certain embodiments may provide, for example, a secured system, comprising: i) a first node networked with a second node, a) the first node hosting a first application program, a first configuration file and a first network security program associated with the first configuration file; and b) the second node hosting a second application program, a second configuration file, and a second network security program associated with the second configuration file; and ii) the first and second network security programs cooperatively configured to negotiate one or plural dedicated data pathways for all communications between the first application program and the second application program, a) each of the one or plural data pathways comprising the first network security program and the second network security program interposed between the first application program and the second application program; and b) each of the one or plural data pathways comprising: an encrypted network tunnel between the first network security program and the second network security program, each of the plural configuration files comprising at least one of the following: a) one or plural destination port numbers associated with the second application program; b) one or plural destination port numbers associated with the second network security program, comprising at least one port number for each one of the one or plural destination port numbers associated with the second application program; c) one or plural first user-application identifiers associated with the first application program; d) one or plural second user-application identifiers associated with the second application program; e) one or plural data type identifiers; and f) node identification codes for the first node and the second node, processor, or computing device.

Certain embodiments may provide, for example, a secured system, comprising: i) a first node networked with a second node, a) the first node hosting a first application program, a first configuration file and a first network security program associated with the first configuration file; and b) the second node hosting a second application program, a second configuration file, and a second network security program associated with the second configuration file; and ii) the first and second network security programs cooperatively configured to negotiate one or plural dedicated data pathways for all communications between the first application program and the second application program, a) each of the one or plural data pathways comprising the first network security program and the second network security program interposed between the first application program and the second application program; and b) each of the one or plural data pathways comprising: an encrypted data pathway between the first network security program and the second network security program, each of the plural configuration files comprising at least one of the following: a) one or plural destination port numbers associated with the second application program; b) one or plural first user-application identifiers associated with the first application program; c) one or plural second user-application identifiers associated with the second application program; d) one or plural data type identifiers; and e) node identification codes for the first node and the second node, processor, or computing device.

Certain embodiments may provide, for example, a product for managing communications in a cloud, the product comprising a non-transitory computer-readable storage medium having computer-readable program code embodied therein, the computer-readable program code executable (or compilable, linkable, and/or loadable to be executable) by a computing device to enable and/or cause the computing device to perform communication management operations. In certain embodiments, for example, the communication management operations may comprise performing communication processing functions on all network-to-port communications received by a virtual machine. In certain embodiments, for example, the performing communication processing functions may comprise obtaining port numbers, metadata, and payloads associated with network packets. In certain embodiments, for example, the performing communication processing functions may comprise identifying predefined destination port numbers and predefined authorization codes associated with the obtained port numbers, each one of the predefined authorization codes comprising a predefined user-application identifier and a predefined payload data-type identifier associated with one of the obtained port numbers. In certain embodiments, for example, the performing communication processing functions may comprise authorizing the network packets, comprising: comparing at least a portion of the metadata with the predefined authorization codes. In certain embodiments, for example, the performing communication processing functions may comprise requesting transmission of payloads from the authorized network packets to cloud resources referenced by the predefined destination port numbers.

Certain embodiments may provide, for example, a product for managing communications in a cloud, the product comprising a non-transitory computer-readable storage medium having computer-readable program code embodied therein, the computer-readable program code executable (or compilable, linkable, and/or loadable to be executable) by a computing device to enable and/or cause the computing device to perform communication management operations, the communication management operations comprising: performing communication processing functions on all network-to-port communications received by a virtual machine, the performing communication processing functions comprising: i) obtaining port numbers, metadata, and payloads associated with network packets; ii) identifying predefined destination port numbers and predefined authorization codes associated with the obtained port numbers, each one of the predefined authorization codes comprising a predefined user-application identifier and a predefined payload data-type identifier associated with one of the obtained port numbers; iii) authorizing the network packets, comprising: comparing at least a portion of the metadata with the predefined authorization codes; and iv) requesting transmission of payloads from the authorized network packets to cloud resources referenced by the predefined destination port numbers.

Certain embodiments may provide, for example, a method for managing communications. In certain embodiments, for example, the method may comprise intercepting network connection requests (for example by network application programming interfaces) having associated destination port numbers. In certain embodiments, for example, the method may comprise identifying preconfigured, predefined, pre-established and/or preprovisioned tunnel port numbers (for example predefined tunnel port numbers associated with servers), comprising identifying at least one (for example, one) preconfigured, predefined, pre-established and/or preprovisioned tunnel port number for each associated destination port number of the associated destination port numbers. In certain embodiments, for example, the method may comprise requesting the negotiation of network tunnels, the requesting comprising sending connection request packets comprising the tunnel port numbers (and also, for example, cipher suite parameters), each one of the network tunnels having a one-to-one correspondence with one of the tunnel port numbers. In certain embodiments, for example, the method may comprise authorizing the network tunnels, comprising comparing computing device identifiers, user-application identifiers (for example user-application identifiers derived from application process identifiers and/or application process owners, together or in parts), and payload data-type identifiers received from the network tunnels with preconfigured, predefined, pre-established and/or preprovisioned authorization codes. In certain further embodiments, for example, the computing device identifiers, user-application identifiers, and/or payload data-type identifiers may be encrypted and require decryption before the comparing.

Certain embodiments may provide, for example, a method for managing communications, comprising: i) intercepting network connection requests having associated destination port numbers; ii) identifying preconfigured, predefined, pre-established and/or preprovisioned tunnel port numbers, comprising identifying at least one tunnel port number for each associated destination port number of the associated destination port numbers; iii) requesting the negotiation of network tunnels, the requesting comprising sending connection request packets comprising the tunnel port numbers, each one of the network tunnels having a one-to-one correspondence with one of the tunnel port numbers; and iv) authorizing the network tunnels, comprising comparing computing device identifiers, user-application identifiers, and payload data-type identifiers received from the network tunnels with preconfigured, predefined, pre-established and/or preprovisioned authorization codes.

Certain embodiments may provide, for example, a method for managing communications. In certain embodiments, for example, the method may comprise intercepting a network connection request having an associated destination port number. In certain embodiments, for example, the method may comprise identifying a preconfigured, predefined, pre-established and/or preprovisioned tunnel port number associated with the destination port number. In certain embodiments, for example, the method may comprise requesting the forming of a network tunnel, the forming comprising sending a connection request packet comprising the tunnel port number. In certain embodiments, for example, the method may comprise authorizing the network tunnel, comprising comparing a computing device identifier, a user-application identifier, and a payload data-type identifier received from the network tunnel with a preconfigured, predefined, pre-established and/or preprovisioned authorization code.

Certain embodiments may provide, for example, a method for managing communications, comprising: i) intercepting a network connection request having an associated destination port number; ii) identifying a preconfigured, predefined, pre-established and/or preprovisioned tunnel port number associated with the destination port number; iii) requesting the forming of a network tunnel, the forming comprising sending a connection request packet comprising the tunnel port number; and iv) authorizing the network tunnel, comprising comparing a computing device identifier, a user-application identifier, and a payload data-type identifier received from the network tunnel with a preconfigured, predefined, pre-established and/or preprovisioned authorization code.

Certain embodiments may provide, for example, a method for managing communications. In certain embodiments, for example, the method may comprise intercepting network connection requests from source ports (for example the source ports may comprise ports associated with user-application processes), the requests having associated destination port numbers. In certain embodiments, for example, the method may comprise verifying that the source ports are authorized to communicate with ports having the associated destination port numbers. In certain embodiments, for example, the method may comprise requesting the negotiation of network tunnels, comprising sending connection request packets comprising the associated destination port numbers, each one of the network tunnels having a one-to-one correspondence with one of the associated destination port numbers. In certain embodiments, for example, the method may comprise authorizing the network tunnels, comprising comparing computing device identifiers, user-application identifiers, and/or payload data-type identifiers received from the network tunnels with preconfigured, predefined, pre-established and/or preprovisioned authorization codes. In certain further embodiments, for example, the computing device identifiers, user-application identifiers, and/or payload data-type identifiers may be encrypted and require decryption before the comparing.

Certain embodiments may provide, for example, a method for managing communications, comprising: i) intercepting network connection requests from source ports, the requests having associated destination port numbers; ii) verifying that the source ports are authorized to communicate with ports having the associated destination port numbers; iii) requesting the negotiation of network tunnels, comprising sending connection request packets comprising the associated destination port numbers, each one of the network tunnels having a one-to-one correspondence with one of the associated destination port numbers; and iv) authorizing the network tunnels, comprising comparing computing device identifiers, user-application identifiers, and payload data-type identifiers received from the network tunnels with preconfigured, predefined, pre-established and/or preprovisioned authorization codes.

Certain embodiments may provide, for example, a method for managing communications. In certain embodiments, for example, the method may comprise intercepting network connection requests having associated destination port numbers. In certain embodiments, for example, the establishing may comprise identifying preconfigured, predefined, pre-established and/or preprovisioned encrypted communication port numbers, comprising identifying at least one preconfigured, predefined, pre-established and/or preprovisioned encrypted communication port number for each associated destination port number of the associated destination port numbers. In certain embodiments, for example, the establishing may comprise requesting the negotiation of encrypted communication pathways, the requesting comprising sending connection request packets comprising the encrypted communication port numbers, each one of the encrypted communication pathways having a one-to-one correspondence with one of the encrypted communication port numbers. In certain embodiments, for example, the establishing may comprise authorizing the encrypted communication pathways, comprising comparing computing device identifiers, user-application identifiers, and/or payload data-type identifiers received from the encrypted communication pathways with preconfigured, predefined, pre-established and/or preprovisioned authorization codes.

Certain embodiments may provide, for example, a method for managing communications, comprising: i) intercepting network connection requests having associated destination port numbers; ii) identifying preconfigured, predefined, pre-established and/or preprovisioned encrypted communication port numbers, comprising identifying at least one preconfigured, predefined, pre-established and/or preprovisioned encrypted communication port number for each associated destination port number of the associated destination port numbers; iii) requesting the negotiation of encrypted communication pathways, the requesting comprising sending connection request packets comprising the encrypted communication port numbers, each one of the encrypted communication pathways having a one-to-one correspondence with one of the encrypted communication port numbers; and iv) authorizing the encrypted communication pathways, comprising comparing computing device identifiers, user-application identifiers, and payload data-type identifiers received from the encrypted communication pathways with preconfigured, predefined, pre-established and/or preprovisioned authorization codes.

Certain embodiments may provide, for example, a product for managing communications of a plurality of networked computing devices. In certain embodiments, for example, the product may comprise a non-transitory computer-readable storage medium having computer-readable program code embodied therein. In certain embodiments, for example, the computer-readable program code may be executable (or program code compilable, linkable, and/or loadable to be executable) by a computing device (for example a computing device executing an operating system (for example a Linux operating system, a Linux-based operating system, a real time operating system, a mini-operating system, an edge device operating system, and/or an open source operating system)) to enable and/or cause the computing device to perform communication management operations. In certain embodiments, for example, the communication management operations may comprise establishing authorized encrypted communication pathways for at least one port-to-port network communication (including, for example, all port-to-port network communications) among the plurality of networked computing devices. In certain embodiments, for example, the establishing may comprise intercepting network connection requests from source ports (for example source ports that have been opened by and have a predetermined relationship with authorized applications), the requests having associated destination port numbers. In certain embodiments, for example, the method may comprise verifying that the source ports are authorized to communicate with ports having the associated destination port numbers. In certain embodiments, for example, the method may comprise requesting the negotiation of encrypted communication pathways, the requesting comprising sending connection request packets comprising the associated destination port numbers. In certain embodiments, for example, the method may comprise authorizing the encrypted communication pathways, comprising comparing computing device identifiers, user-application identifiers, and/or payload data-type identifiers received from the encrypted communication pathways with preconfigured, predefined, pre-established and/or preprovisioned authorization codes.

Certain embodiments may provide, for example, a method for managing communications, comprising: i) intercepting network connection requests from source ports, the requests having associated destination port numbers; ii) verifying that the source ports are authorized to communicate with ports having the associated destination port numbers; iii) requesting the negotiation of encrypted communication pathways, the requesting comprising sending connection request packets comprising the associated destination port numbers; and iv) authorizing the encrypted communication pathways, comprising comparing computing device identifiers, user-application identifiers, and payload data-type identifiers received from the encrypted communication pathways with preconfigured, predefined, pre-established and/or preprovisioned authorization codes.

Certain embodiments may provide, for example, a method for managing communications. In certain embodiments, for example, the method may comprise intercepting a network connection request from a source port, the request having an associated destination port number. In certain embodiments, for example, the method may comprise verifying that the source port is authorized to communicate with a port having the associated destination port number. In certain embodiments, for example, the method may comprise may comprise requesting the negotiation of a network tunnel, comprising sending a connection request packet comprising the associated destination port number. In certain embodiments, for example, the method may comprise authorizing the network tunnel, comprising comparing a computing device identifiers, a user-application identifier, and a payload data-type identifier received from the network tunnel with a preconfigured, predefined, pre-established and/or preprovisioned authorization code.

Certain embodiments may provide, for example, a method for managing communications, comprising: i) intercepting a network connection request from a source port, the request having an associated destination port number; ii) verifying that the source port is authorized to communicate with a port having the associated destination port number; iii) requesting the negotiation of a network tunnel, comprising sending a connection request packet comprising the associated destination port number; and iv) authorizing the network tunnel, comprising comparing a computing device identifiers, a user-application identifier, and a payload data-type identifier received from the network tunnel with a preconfigured, predefined, pre-established and/or preprovisioned authorization code.

Certain embodiments may provide, for example, a method for managing communications. In certain embodiments, for example, the method may comprise intercepting a network connection request having an associated destination port number. In certain embodiments, for example, the method may comprise identifying a preconfigured, predefined, pre-established and/or preprovisioned encrypted communication port number associated with the destination port number. In certain embodiments, for example, the method may comprise requesting the negotiation of an encrypted communication pathway, the requesting comprising sending a connection request packet comprising the encrypted communication port number. In certain embodiments, for example, the method may comprise authorizing the encrypted communication pathway, comprising comparing a computing device identifier, a user-application identifier, and a payload data-type identifier received from the encrypted communication pathway with a preconfigured, predefined, pre-established and/or preprovisioned authorization code.

Certain embodiments may provide, for example, a method for managing communications, comprising: i) intercepting a network connection request having an associated destination port number; ii) identifying a preconfigured, predefined, pre-established and/or preprovisioned encrypted communication port number associated with the destination port number; iii) requesting the negotiation of an encrypted communication pathway, the requesting comprising sending a connection request packet comprising the encrypted communication port number; and iv) authorizing the encrypted communication pathway, comprising comparing a computing device identifier, a user-application identifier, and a payload data-type identifier received from the encrypted communication pathway with a preconfigured, predefined, pre-established and/or preprovisioned authorization code.

Certain embodiments may provide, for example, a method for managing communications. In certain embodiments, for example, the method may comprise intercepting a network connection request from a source port, the request having an associated destination port number. In certain embodiments, for example, the method may comprise verifying that the source port is authorized to communicate with a port having the associated destination port number. In certain embodiments, for example, the method may comprise requesting the negotiation of an encrypted communication pathway, the requesting comprising sending a connection request packet comprising the associated destination port number. In certain embodiments, for example, the method may comprise authorizing the encrypted communication pathway, comprising comparing a computing device identifier, a user-application identifier, and a payload data-type identifier received from the encrypted communication pathway with a preconfigured, predefined, pre-established and/or preprovisioned authorization code.

Certain embodiments may provide, for example, a method for managing communications, comprising: i) intercepting a network connection request from a source port, the request having an associated destination port number; ii) verifying that the source port is authorized to communicate with a port having the associated destination port number; iii) requesting the negotiation of an encrypted communication pathway, the requesting comprising sending a connection request packet comprising the associated destination port number; and iv) authorizing the encrypted communication pathway, comprising comparing a computing device identifier, a user-application identifier, and a payload data-type identifier received from the encrypted communication pathway with a preconfigured, predefined, pre-established and/or preprovisioned authorization code.

Certain embodiments may provide, for example, a method for managing communications of a plurality of networked computing devices. In certain embodiments, for example, the method may comprise receiving data packets (for example from a user-application process via a loopback interface) having payloads and associated destination port numbers (the associated destination port numbers may include, for example, a destination port number associated with a destination port of a network security process). In certain embodiments, for example, the method may comprise identifying preconfigured, predefined, pre-established and/or preprovisioned tunnel port numbers, each one of the tunnel port numbers having a one-to-one correspondence with one of the associated destination port numbers. In certain embodiments, for example, the method may comprise assembling packet segments, each one of the packet segments comprising one of the payloads, an associated user-application process identifier, and a payload data type descriptor. In certain embodiments, for example, the associated user-application process identifier may comprise a process identifier and/or a process owner. In certain embodiments, for example, the associated user-application process identifier, and a payload data type descriptor may be combined (or concatenated) in a metadata portion of the packet segment. In certain embodiments, for example, the metadata may be encrypted, for example by a single-use cryptographic key. In certain embodiments, for example, the method may comprise requesting transmission of network packets through network tunnels (for example at least a different network tunnel for each application-to-application communication of a specified data protocol type), each one of the network packets comprising a tunnel port number of one of the tunnel port numbers and one of the assembled packet segments, each one of the network tunnels having a one-to-one correspondence with one of the tunnel port numbers.

Certain embodiments may provide, for example, a method for managing communications, comprising: i) receiving data packets having payloads and associated destination port numbers; ii) identifying preconfigured, predefined, pre-established and/or preprovisioned tunnel port numbers, each one of the tunnel port numbers having a one-to-one correspondence with one of the associated destination port numbers; iii) assembling packet segments, each one of the packet segments comprising one of the payloads, an associated user-application process identifier, and a payload data type descriptor; and iv) requesting transmission of network packets through network tunnels, each one of the network packets comprising a tunnel port number of one of the tunnel port numbers and one of the assembled packet segments, each one of the network tunnels having a one-to-one correspondence with one of the tunnel port numbers.

Certain embodiments may provide, for example, a method for managing communications of a plurality of networked computing devices. In certain embodiments, for example, the method may comprise receiving a data packet having a payload and an associated destination port number. In certain embodiments, for example, the method may comprise identifying a preconfigured, predefined, pre-established and/or preprovisioned tunnel port number associated with the destination port number. In certain embodiments, for example, the method may comprise assembling a packet segment, the packet segment comprising the payload, an associated user-application identifier, and a payload data type descriptor. In certain embodiments, for example, the method may comprise requesting transmission of a network packet through a network tunnel, the network packet comprising the tunnel port number and the assembled packet segment, the network tunnel having a one-to-one correspondence with the tunnel port number.

Certain embodiments may provide, for example, a method for managing communications, comprising: i) receiving a data packet having a payload and an associated destination port number; ii) identifying a preconfigured, predefined, pre-established and/or preprovisioned tunnel port number associated with the destination port number; iii) assembling a packet segment, the packet segment comprising the payload, an associated user-application identifier, and a payload data type descriptor; and iv) requesting transmission of a network packet through a network tunnel, the network packet comprising the tunnel port number and the assembled packet segment, the network tunnel having a one-to-one correspondence with the tunnel port number.

Certain embodiments may provide, for example, a method for managing communications. In certain embodiments, for example, the method may comprise receiving data packets from source ports, the data packets having payloads and associated destination port numbers. In certain embodiments, for example, the method may comprise verifying that the source ports are authorized to communicate with ports having the associated destination port numbers. In certain embodiments, for example, the method may comprise assembling packet segments, each one of the packet segments comprising one of the payloads, an associated user-application identifier, and a payload data type descriptor. In certain embodiments, for example, the method may comprise requesting transmission of network packets through network tunnels, each one of the network packets comprising a port number of one of the associated destination port numbers and one of the assembled packet segments, each one of the network tunnels having a one-to-one correspondence with one of the associated destination port numbers.

Certain embodiments may provide, for example, a method for managing communications, comprising: i) receiving data packets from source ports, the data packets having payloads and associated destination port numbers; ii) verifying that the source ports are authorized to communicate with ports having the associated destination port numbers; iii) assembling packet segments, each one of the packet segments comprising one of the payloads, an associated user-application identifier, and a payload data type descriptor; and iv) requesting transmission of network packets through network tunnels, each one of the network packets comprising a port number of one of the associated destination port numbers and one of the assembled packet segments, each one of the network tunnels having a one-to-one correspondence with one of the associated destination port numbers.

Certain embodiments may provide, for example, a method for managing communications. In certain embodiments, for example, the method may comprise receiving data packets having payloads and associated destination port numbers. In certain embodiments, for example, the method may comprise identifying preconfigured, predefined, pre-established and/or preprovisioned port numbers, each one of the port numbers having a one-to-one correspondence with one of the associated destination port numbers. In certain embodiments, for example, the method may comprise assembling packet segments, each one of the packet segments comprising one of the payloads, an associated user-application identifier, and a payload data type descriptor. In certain embodiments, for example, the method may comprise requesting transmission of network packets through encrypted communication pathways, each one of the network packets comprising a port number of one of the port numbers and one of the assembled packet segments, each one of the encrypted communication pathways having a one-to-one correspondence with one of the port numbers.

Certain embodiments may provide, for example, a method for managing communications, comprising: i) receiving data packets having payloads and associated destination port numbers; ii) identifying preconfigured, predefined, pre-established and/or preprovisioned port numbers, each one of the port numbers having a one-to-one correspondence with one of the associated destination port numbers; iii) assembling packet segments, each one of the packet segments comprising one of the payloads, an associated user-application identifier, and a payload data type descriptor; and iv) requesting transmission of network packets through encrypted communication pathways, each one of the network packets comprising a port number of one of the port numbers and one of the assembled packet segments, each one of the encrypted communication pathways having a one-to-one correspondence with one of the port numbers.

Certain embodiments may provide, for example, a method for managing communications. In certain embodiments, for example, the method may comprise receiving data packets, the data packets comprising messages and associated destination port numbers. In certain embodiments, for example, the method may comprise identifying preconfigured, predefined, pre-established and/or preprovisioned port numbers, each one of the port numbers having a one-to-one correspondence with one of the associated destination port numbers. In certain embodiments, for example, the method may comprise may comprise assembling packet segments, each one of the packet segments comprising at least a portion of one of the messages, an associated user-application identifier, and a payload data type descriptor. In certain embodiments, for example, the method may comprise requesting transmission of network packets through encrypted communication pathways, each one of the network packets comprising a port number of one of the port numbers and one of the assembled packet segments, each one of the encrypted communication pathways having a one-to-one correspondence with one of the port numbers.

Certain embodiments may provide, for example, a method for managing communications, comprising: i) receiving data packets, the data packets comprising messages and associated destination port numbers; ii) identifying preconfigured, predefined, pre-established and/or preprovisioned port numbers, each one of the port numbers having a one-to-one correspondence with one of the associated destination port numbers; iii) assembling packet segments, each one of the packet segments comprising at least a portion of one of the messages, an associated user-application identifier, and a payload data type descriptor; and iv) requesting transmission of network packets through encrypted communication pathways, each one of the network packets comprising a port number of one of the port numbers and one of the assembled packet segments, each one of the encrypted communication pathways having a one-to-one correspondence with one of the port numbers.

Certain embodiments may provide, for example, a method for managing communications. In certain embodiments, for example, the method may comprise receiving data packets, the data packets comprising messages and associated destination port numbers, the messages comprising user-application identifiers and payload data type descriptors. In certain embodiments, for example, the method may comprise identifying preconfigured, predefined, pre-established and/or preprovisioned port numbers, each one of the port numbers having a one-to-one correspondence with one of the associated destination port numbers. In certain embodiments, for example, the method may comprise assembling packet segments, each one of the packet segments comprising at least a portion of one of the messages, the at least a portion of one of the messages comprising one of the user-application identifiers and one of the payload data type descriptors. In certain embodiments, for example, the method may comprise requesting transmission of network packets through encrypted communication pathways, each one of the network packets comprising a port number of one of the port numbers and one of the assembled packet segments, each one of the encrypted communication pathways having a one-to-one correspondence with one of the port numbers.

Certain embodiments may provide, for example, a method for managing communications, comprising: i) receiving data packets, the data packets comprising messages and associated destination port numbers, the messages comprising user-application identifiers and payload data type descriptors; ii) identifying preconfigured, predefined, pre-established and/or preprovisioned port numbers, each one of the port numbers having a one-to-one correspondence with one of the associated destination port numbers; iii) assembling packet segments, each one of the packet segments comprising at least a portion of one of the messages, the at least a portion of one of the messages comprising one of the user-application identifiers and one of the payload data type descriptors; and iv) requesting transmission of network packets through encrypted communication pathways, each one of the network packets comprising a port number of one of the port numbers and one of the assembled packet segments, each one of the encrypted communication pathways having a one-to-one correspondence with one of the port numbers.

Certain embodiments may provide, for example, a method for managing communications. In certain embodiments, for example, the method may comprise receiving data packets from source ports, the data packets having payloads and associated destination port numbers. In certain embodiments, for example, the method may comprise verifying that the source ports are authorized to communicate with ports having the associated destination port numbers. In certain embodiments, for example, the method may comprise assembling packet segments, each one of the packet segments comprising one of the payloads, an associated user-application identifier, and a payload data type descriptor. In certain embodiments, for example, the method may comprise requesting transmission of network packets through encrypted communication pathways, each one of the network packets comprising a port number of one of the associated destination port numbers and one of the assembled packet segments, each one of the encrypted communication pathways having a one-to-one correspondence with one of the associated destination port numbers.

Certain embodiments may provide, for example, a method for managing communications, comprising: i) receiving data packets from source ports, the data packets having payloads and associated destination port numbers; ii) verifying that the source ports are authorized to communicate with ports having the associated destination port numbers; iii) assembling packet segments, each one of the packet segments comprising one of the payloads, an associated user-application identifier, and a payload data type descriptor; and iv) requesting transmission of network packets through encrypted communication pathways, each one of the network packets comprising a port number of one of the associated destination port numbers and one of the assembled packet segments, each one of the encrypted communication pathways having a one-to-one correspondence with one of the associated destination port numbers.

Certain embodiments may provide, for example, a method for managing communications. In certain embodiments, for example, the method may comprise receiving data packets from source ports, the data packets having payloads and associated destination port numbers. In certain embodiments, for example, the method may comprise verifying that the source ports are authorized to communicate with ports having the associated destination port numbers. In certain embodiments, for example, the method may comprise assembling packet segments, each one of the packet segments comprising one of the payloads, an associated user-application identifier, and a payload data type descriptor. In certain embodiments, for example, the method may comprise requesting transmission of network packets through network tunnels, each one of the network packets comprising a port number of one of the associated destination port numbers and one of the assembled packet segments, each one of the network tunnels having a one-to-one correspondence with one of the associated destination port numbers.

Certain embodiments may provide, for example, a method for managing communications, comprising: i) receiving data packets from source ports, the data packets having payloads and associated destination port numbers; ii) verifying that the source ports are authorized to communicate with ports having the associated destination port numbers; iii) assembling packet segments, each one of the packet segments comprising one of the payloads, an associated user-application identifier, and a payload data type descriptor; and iv) requesting transmission of network packets through network tunnels, each one of the network packets comprising a port number of one of the associated destination port numbers and one of the assembled packet segments, each one of the network tunnels having a one-to-one correspondence with one of the associated destination port numbers.

Certain embodiments may provide, for example, a method for managing communications. In certain embodiments, for example, the method may comprise receiving a data packet from a source port, the data packet having a payload and an associated destination port number. In certain embodiments, for example, the method may comprise verifying that the source port is authorized to communicate with a port having the associated destination port number. In certain embodiments, for example, the method may comprise assembling a packet segment, the packet segment comprising the payload, an associated user-application identifier, and a payload data type descriptor. In certain embodiments, for example, the method may comprise requesting transmission of a network packet through a network tunnel, the network packet comprising the associated destination port numbers and the assembled packet segment, the network tunnels having a one-to-one correspondence with the associated destination port number.

Certain embodiments may provide, for example, a method for managing communications, comprising: i) receiving a data packet from a source port, the data packet having a payload and an associated destination port number; ii) verifying that the source port is authorized to communicate with a port having the associated destination port number; iii) assembling a packet segment, the packet segment comprising the payload, an associated user-application identifier, and a payload data type descriptor, and iv) requesting transmission of a network packet through a network tunnel, the network packet comprising the associated destination port numbers and the assembled packet segment, the network tunnels having a one-to-one correspondence with the associated destination port number.

Certain embodiments may provide, for example, a method for managing communications. In certain embodiments, for example, the method may comprise receiving data packets having payloads and associated destination port numbers. In certain embodiments, for example, the method may comprise identifying preconfigured, predefined, pre-established and/or preprovisioned port numbers, each one of the port numbers having a one-to-one correspondence with one of the associated destination port numbers. In certain embodiments, for example, the method may comprise assembling packet segments, each one of the packet segments comprising one of the payloads, an associated user-application identifier, and a payload data type descriptor. In certain embodiments, for example, the method may comprise requesting transmission of network packets through encrypted communication pathways, each one of the network packets comprising a port number of one of the port numbers and one of the assembled packet segments, each one of the encrypted communication pathways having a one-to-one correspondence with one of the port numbers.

Certain embodiments may provide, for example, a method for managing communications, comprising: i) receiving data packets having payloads and associated destination port numbers; ii) identifying preconfigured, predefined, pre-established and/or preprovisioned port numbers, each one of the port numbers having a one-to-one correspondence with one of the associated destination port numbers; iii) assembling packet segments, each one of the packet segments comprising one of the payloads, an associated user-application identifier, and a payload data type descriptor; and iv) requesting transmission of network packets through encrypted communication pathways, each one of the network packets comprising a port number of one of the port numbers and one of the assembled packet segments, each one of the encrypted communication pathways having a one-to-one correspondence with one of the port numbers.

Certain embodiments may provide, for example, a method for managing communications of a plurality of networked computing devices. In certain embodiments, for example, the method may comprise receiving a data packet having a payload and an associated destination port number. In certain embodiments, for example, the method may comprise identifying a preconfigured, predefined, pre-established and/or preprovisioned port number, the port number having a one-to-one correspondence with the associated destination port number. In certain embodiments, for example, the method may comprise assembling a packet segment, the packet segment comprising the payload, an associated user-application identifier, and a payload data type descriptor. In certain embodiments, for example, the method may comprise requesting encrypted communication over an encrypted communication pathway of a network packet, the network packets comprising the port number and the assembled packet segment, the encrypted communication pathway having a one-to-one correspondence with the port number.

Certain embodiments may provide, for example, a method for managing communications, comprising: i) receiving a data packet having a payload and an associated destination port number; ii) identifying a preconfigured, predefined, pre-established and/or preprovisioned port number, the port number having a one-to-one correspondence with the associated destination port number; iii) assembling a packet segment, the packet segment comprising the payload, an associated user-application identifier, and a payload data type descriptor; and iv) requesting encrypted communication over an encrypted communication pathway of a network packet, the network packets comprising the port number and the assembled packet segment, the encrypted communication pathway having a one-to-one correspondence with the port number.

Certain embodiments may provide, for example, a method for managing communications of a plurality of networked computing devices. In certain embodiments, for example, the method may comprise receiving data packets from source ports, the data packets having payloads and associated destination port numbers. In certain embodiments, for example, the method may comprise verifying that the source ports are authorized to communicate with ports having the associated destination port numbers. In certain embodiments, for example, the method may comprise assembling packet segments, each one of the packet segments comprising one of the payloads, an associated user-application identifier, and a payload data type descriptor. In certain embodiments, for example, the method may comprise requesting transmission of network packets through encrypted communication pathways, each one of the network packets comprising a port number of one of the associated destination port numbers and one of the assembled packet segments, each one of the encrypted communication pathways having a one-to-one correspondence with one of the associated destination port numbers.

Certain embodiments may provide, for example, a method for managing communications, comprising: i) receiving data packets from source ports, the data packets having payloads and associated destination port numbers; ii) verifying that the source ports are authorized to communicate with ports having the associated destination port numbers; iii) assembling packet segments, each one of the packet segments comprising one of the payloads, an associated user-application identifier, and a payload data type descriptor; and iv) requesting transmission of network packets through encrypted communication pathways, each one of the network packets comprising a port number of one of the associated destination port numbers and one of the assembled packet segments, each one of the encrypted communication pathways having a one-to-one correspondence with one of the associated destination port numbers.

Certain embodiments may provide, for example, a method for managing communications of a plurality of networked computing devices. In certain embodiments, for example, the method may comprise receiving a data packet from a source port, the data packet having a payload and an associated destination port number. In certain embodiments, for example, the method may comprise verifying that the source port is authorized to communicate with a port having the associated destination port number. In certain embodiments, for example, the method may comprise assembling a packet segment, the packet segments comprising the payload, an associated user-application identifier, and a payload data type descriptor. In certain embodiments, for example, the method may comprise requesting transmission of a network packet through an encrypted communication pathway, the network packets comprising the associated destination port number and the assembled packet segment, the encrypted communication pathway having a one-to-one correspondence with the associated destination port number.

Certain embodiments may provide, for example, a method for managing communications, comprising: i) receiving a data packet from a source port, the data packet having a payload and an associated destination port number; ii) verifying that the source port is authorized to communicate with a port having the associated destination port number; iii) assembling a packet segment, the packet segments comprising the payload, an associated user-application identifier, and a payload data type descriptor; and iv) requesting transmission of a network packet through an encrypted communication pathway, the network packets comprising the associated destination port number and the assembled packet segment, the encrypted communication pathway having a one-to-one correspondence with the associated destination port number.

Certain embodiments may provide, for example, a method for managing communications. In certain embodiments, for example, the method may comprise obtaining port numbers, metadata (for example metadata encrypted using a single-use cryptographic key), and payloads associated with network packets. In certain embodiments, for example, the method may comprise identifying preconfigured, predefined, pre-established and/or preprovisioned destination port numbers and preconfigured, predefined, pre-established and/or preprovisioned authorization codes associated with the obtained port numbers, each one of the authorization codes comprising a preconfigured, predefined, pre-established and/or preprovisioned user-application process identifier and a preconfigured, predefined, pre-established and/or preprovisioned payload data-type identifier associated with one of the obtained port numbers. In certain embodiments, for example, the method may comprise authorizing the network packets, comprising: comparing (for example comparing in application spaces or kernel spaces of the plurality of computing devices) metadata with the authorization codes. In certain embodiments, for example, the method may comprise requesting transmission (for example across loopback interfaces, by TUN/TAP interfaces, or by kernel read and/or write calls) of payloads from the authorized network packets to destinations referenced by the destination port numbers. In certain embodiments, for example, the payloads may be passed to the destination port numbers by one or more loopback interfaces.

Certain embodiments may provide, for example, a method for managing communications, comprising: performing communication processing functions on all network-to-port communications received by the plurality of computing devices, the performing communication processing functions comprising: i) obtaining port numbers, metadata, and payloads associated with network packets; ii) identifying preconfigured, predefined, pre-established and/or preprovisioned destination port numbers and preconfigured, predefined, pre-established and/or preprovisioned authorization codes associated with the obtained port numbers, each one of the authorization codes comprising a preconfigured, predefined, pre-established and/or preprovisioned user-application identifier and a preconfigured, predefined, pre-established and/or preprovisioned payload data-type identifier associated with one of the obtained port numbers; iii) authorizing the network packets, comprising: comparing at least a portion of the metadata with the authorization codes; and iv) requesting transmission of payloads from the authorized network packets to destinations referenced by the destination port numbers.

Certain embodiments may provide, for example, a method for managing communications. In certain embodiments, for example, the method may comprise obtaining a port number, metadata, and a payload associated with a network packet received by the networked computing device. In certain embodiments, for example, the method may comprise identifying a preconfigured, predefined, pre-established and/or preprovisioned destination port number and a preconfigured, predefined, pre-established and/or preprovisioned authorization code associated with the obtained port number, the authorization code comprising a preconfigured, predefined, pre-established and/or preprovisioned user-application identifier and a preconfigured, predefined, pre-established and/or preprovisioned payload data-type identifier associated with the obtained port number. In certain embodiments, for example, the method may comprise authorizing the network packet, comprising: comparing the metadata with the authorization code. In certain embodiments, for example, the method may comprise requesting transmission of the payload to a destination referenced by the destination port number.

Certain embodiments may provide, for example, a method for managing communications, comprising: i) obtaining a port number, metadata, and a payload associated with a network packet received by the networked computing device; ii) identifying a preconfigured, predefined, pre-established and/or preprovisioned destination port number and a preconfigured, predefined, pre-established and/or preprovisioned authorization code associated with the obtained port number, the authorization code comprising a preconfigured, predefined, pre-established and/or preprovisioned user-application identifier and a preconfigured, predefined, pre-established and/or preprovisioned payload data-type identifier associated with the obtained port number; iii) authorizing the network packet, comprising: comparing the metadata with the authorization code; and iv) requesting transmission of the payload to a destination referenced by the destination port number.

Certain embodiments may provide, for example, a method for managing communications. In certain embodiments, for example, the method may comprise obtaining destination port numbers, metadata, and payloads associated with network packets. In certain embodiments, for example, the method may comprise identifying preconfigured, predefined, pre-established and/or preprovisioned authorization codes associated with the destination port numbers, each one of the authorization codes comprising a preconfigured, predefined, pre-established and/or preprovisioned user-application identifier and a preconfigured, predefined, pre-established and/or preprovisioned payload data-type identifier associated with one of the destination port numbers. In certain embodiments, for example, the method may comprise authorizing the network packets, comprising: comparing at least a portion of the metadata with the authorization codes. In certain embodiments, for example, the method may comprise requesting transmission of payloads from the authorized network packets to destinations referenced by the destination port numbers.

Certain embodiments may provide, for example, a method for managing communications, comprising: i) obtaining destination port numbers, metadata, and payloads associated with network packets; ii) identifying preconfigured, predefined, pre-established and/or preprovisioned authorization codes associated with the destination port numbers, each one of the authorization codes comprising a preconfigured, predefined, pre-established and/or preprovisioned user-application identifier and a preconfigured, predefined, pre-established and/or preprovisioned payload data-type identifier associated with one of the destination port numbers; iii) authorizing the network packets, comprising: comparing at least a portion of the metadata with the authorization codes; and iv) requesting transmission of payloads from the authorized network packets to destinations referenced by the destination port numbers.

Certain embodiments may provide, for example, a method for managing communications of a plurality of networked computing devices. In certain embodiments, for example, the method may comprise obtaining a port number, metadata, and a payload associated with a network packet received by the networked computing device. In certain embodiments, for example, the method may comprise identifying a preconfigured, predefined, pre-established and/or preprovisioned destination port number and a preconfigured, predefined, pre-established and/or preprovisioned authorization code associated with the obtained port number, the authorization code comprising a preconfigured, predefined, pre-established and/or preprovisioned user-application identifier and a preconfigured, predefined, pre-established and/or preprovisioned payload data-type identifier associated with the obtained port number. In certain embodiments, for example, the method may comprise authorizing the network packet, comprising: comparing the metadata with the authorization code. In certain embodiments, for example, the method may comprise requesting transmission of the payload to a destination referenced by the preconfigured, predefined, pre-established and/or preprovisioned destination port number.

Certain embodiments may provide, for example, a method for managing communications, comprising: i) obtaining a port number, metadata, and a payload associated with a network packet received by the networked computing device; ii) identifying a preconfigured, predefined, pre-established and/or preprovisioned destination port number and a preconfigured, predefined, pre-established and/or preprovisioned authorization code associated with the obtained port number, the authorization code comprising a preconfigured, predefined, pre-established and/or preprovisioned user-application identifier and a preconfigured, predefined, pre-established and/or preprovisioned payload data-type identifier associated with the obtained port number; iii) authorizing the network packet, comprising: comparing the metadata with the authorization code; and iv) requesting transmission of the payload to a destination referenced by the preconfigured, predefined, pre-established and/or preprovisioned destination port number.

Certain embodiments may provide, for example, a method for managing communications. In certain embodiments, for example, the method may comprise negotiating, on a first computing device, a first data pathway between a first user-application and a first network security program code of a plurality of computer-readable program code. In certain embodiments, for example, the method may comprise negotiating, on a second computing device, a second data pathway between a second network security program of the plurality of computer-readable program code and a second user-application. In certain embodiments, for example, the method may comprise negotiating a third data pathway between the first network security program and the second network security program, the third data pathway comprising an encrypted network tunnel, each of the first data pathway, second data pathway, and third data pathway participate to form at least a part of a dedicated data pathway for exclusively communicating data from a first port of the first user-application to a second port of the second user-application.

Certain embodiments may provide, for example, a method for managing communications, comprising: i) negotiating, on a first computing device, a first data pathway between a first user-application and a first network security program code of a plurality of computer-readable program code; ii) negotiating, on a second computing device, a second data pathway between a second network security program of the plurality of computer-readable program code and a second user-application; and iii) negotiating a third data pathway between the first network security program and the second network security program, the third data pathway comprising an encrypted network tunnel, each of the first data pathway, second data pathway, and third data pathway participate to form at least a part of a dedicated data pathway for exclusively communicating data from a first port of the first user-application to a second port of the second user-application.

Certain embodiments may provide, for example, a method for managing communications. In certain embodiments, for example, the method may comprise negotiating, on a first computing device, a first data pathway between a first user-application and a first network security program of plural security programs. In certain embodiments, for example, the method may comprise negotiating, on a second computing device, a second data pathway between a second network security program of the plural security programs and a second user-application. In certain embodiments, for example, the method may comprise negotiating a third data pathway between the first network security program and the second network security program, the third data pathway comprising an encrypted communication pathway, each of the first data pathway, second data pathway, and third data pathway exclusive to a dedicated data pathway for communicating data from a first port of the first user-application to a second port of the second user-application.

Certain embodiments may provide, for example, a method for managing communications, comprising: i) negotiating, on a first computing device, a first data pathway between a first user-application and a first network security program of plural security programs; ii) negotiating, on a second computing device, a second data pathway between a second network security program of the plural security programs and a second user-application; iii) negotiating a third data pathway between the first network security program and the second network security program, the third data pathway comprising an encrypted communication pathway, each of the first data pathway, second data pathway, and third data pathway exclusive to a dedicated data pathway for communicating data from a first port of the first user-application to a second port of the second user-application.

Certain embodiments may provide, for example, a method for managing communications in a cloud. In certain embodiments, for example, the method may comprise obtaining port numbers, metadata, and payloads associated with network packets. In certain embodiments, for example, the method may comprise identifying predefined destination port numbers and predefined authorization codes associated with the obtained port numbers, each one of the predefined authorization codes comprising a predefined user-application identifier and a predefined payload data-type identifier associated with one of the obtained port numbers. In certain embodiments, for example, the method may comprise authorizing the network packets, comprising: comparing at least a portion of the metadata with the predefined authorization codes. In certain embodiments, for example, the method may comprise requesting transmission of payloads from the authorized network packets to cloud resources referenced by the predefined destination port numbers.

Certain embodiments may provide, for example, a method for managing communications, comprising: i) obtaining port numbers, metadata, and payloads associated with network packets; ii) identifying predefined destination port numbers and predefined authorization codes associated with the obtained port numbers, each one of the predefined authorization codes comprising a predefined user-application identifier and a predefined payload data-type identifier associated with one of the obtained port numbers; iii) authorizing the network packets, comprising: comparing at least a portion of the metadata with the predefined authorization codes; and iv) requesting transmission of payloads from the authorized network packets to cloud resources referenced by the predefined destination port numbers.

Certain embodiments may provide, for example, a product for managing communications of a plurality of networked processor nodes. In certain embodiments, for example, the product may comprise a computer-readable storage medium (for example a non-transitory computer-readable storage medium) having computer-readable program code embodied therein, the computer-readable program code executable by a processor to perform communication management operations. In certain embodiments, for example, the communication management operations may comprise establishing authorized network tunnels (for example network tunnels based on protocol which involve encrypting a network packet and inserting the encrypted network packet inside a packet for transport (such as IPsec protocol), or network tunnels based on Socket Secured Layer protocol, or network tunnels which require encryption of part of all of a packet payload but do not involve additional headers (for example do not involve packaging an IP packet inside another IP packet) for network communication) on all port-to-port network communications (for example unencrypted or encrypted payload communications) among the plurality of networked processor nodes (inclusive, for example, of port-to-port communications according to User Datagram Protocol (UDP) or Transmission Control Protocol (TCP) between end-user application processes over a network)). In certain embodiments, for example, the port-to-port communications may be between user-application processes (inclusive of application processes having a process owner (or user)). In certain embodiments, for example, one or more of the user-application processes may reside in kernel and/or application space. In certain embodiments, for example, the establishing may comprise intercepting network connection requests (for example by network application programming interfaces) having associated destination port numbers. In certain embodiments, for example, the establishing may comprise identifying preconfigured, predefined, pre-established and/or preprovisioned tunnel port numbers (for example predefined tunnel port numbers associated with servers), comprising identifying at least one (for example, one) preconfigured, predefined, pre-established and/or preprovisioned tunnel port number for each associated destination port number of the associated destination port numbers. In certain embodiments, for example, the establishing may comprise requesting the negotiation of network tunnels, the requesting comprising sending connection request packets comprising the tunnel port numbers (and also, for example, cipher suite parameters), each one of the network tunnels having a one-to-one correspondence with one of the tunnel port numbers. In certain embodiments, for example, the establishing may comprise authorizing the network tunnels, comprising comparing node identifiers, user-application identifiers (for example user-application identifiers derived from application process identifiers and/or application process owners, together or in parts), and payload data-type identifiers received from the network tunnels with preconfigured, predefined, pre-established and/or preprovisioned authorization codes. In certain further embodiments, for example, the node identifiers, user-application identifiers, and/or payload data-type identifiers may be encrypted and require decryption before the comparing.

A. In certain embodiments, for example, the intercepting, identifying, requesting, and authorizing may be transparent to all user-application processes (for example all processes (except optionally for processes executing portions of the program code) executing in (non-kernel) application space and having process owners) on the plurality of networked nodes. In certain embodiments, for example, the intercepting may be performed by a network application programming interface having standard syntax (for example using modified network application programming interface functions that retain standard syntax, for example: bind( ), connect( ), listen( ), UDP sendto( ), UDP bindto( ), and close( ) functions).

B. In certain embodiments, for example, the intercepting, identifying, requesting, and authorizing may be self-executing. In certain further embodiments, for example, the intercepting, identifying, requesting, and authorizing may be automatic. In certain further embodiments, for example, the identifying, requesting, and authorizing may be automatically invoked following the intercepting. In certain embodiments, for example, the intercepting, identifying, and authorizing may occur in the kernel spaces of the plurality of networked nodes. In certain embodiments, for example, one or more of the intercepting, identifying, and authorizing occur in application spaces of the plurality of networked nodes. In certain further embodiments, for example, at least a portion (for example all) of the non-transitory computer-readable storage medium may be resident on a deployment server.

C. In certain further embodiments, for example, at least a portion (for example all) of the non-transitory computer-readable storage medium may be resident on flash drive. In certain embodiments, for example, the communication management operations may further comprise: preventing all user-application process ports from binding to a portion or all physical interfaces of the plurality of networked nodes.

D. In certain embodiments, for example, user-application process ports may transmit packets to network security software process ports by loopback interfaces. In certain embodiments, for example, user-application process ports may transmit packets to network security software process ports by TUN/TAP interfaces.

E. In certain embodiments, for example, the network tunnels may be encrypted. In certain embodiments, for example, the network tunnels may be interposed between network security processes (for example middleware) running on separate nodes. In certain embodiments, for example, the network security processes may manage a segment of the data pathway that is interposed between user-application processes on separate nodes of the plurality of networked processor nodes. In certain embodiments, for example, the network security processes may be conducted on the plural nodes with user-application processes, wherein the user-application processes may engage in port-to-port communications. In certain embodiments, for example, the network security processes may be resident on different nodes from the user-application processes. In certain embodiments, for example, the product may be used to configure a software-defined perimeter.

F. In certain embodiments, for example, the tunnel port numbers, node identifiers, user-application identifiers, and/or payload data-type identifiers may be obtained from a plurality of configuration files. In certain embodiments, for example, the configuration files may contain private keys for negotiating encryption keys for the network tunnels. In certain embodiments, for example, the configuration files may be binary files. In certain embodiments, for example, the configuration files may be encrypted files. In certain embodiments, for example, the configuration files may be variable length files. In certain embodiments, for example, the configuration files may be read-only files.

G. In certain embodiments, for example, the communication management operations may further comprise: executing operating system commands to identify user-application processes making the connection requests, and verifying that the identified user-application processes are authorized to transmit data to the associated destination port numbers. In certain embodiments, for example, the communication management operations may further comprise thwarting attempts by malware to form network connections, the thwarting comprising: rejecting network connection requests in which identified user-application processes are not authorized to transmit data, for example by reference to a configuration file of authorized port-to-port connections. In certain embodiments, for example, the product may further comprise a configuration file, the configuration file comprising at least two of the following: tunnel port numbers, node identifiers, user-application identifiers, and payload data-type identifiers. In certain embodiments, for example, the communication management operations may comprise updating a connection state indicator based on the comparing node identifiers, the comparing user-application process identifiers, and/or the comparing payload data-type identifiers. In certain embodiments, for example, the updated connection state indicator may be a field in a list of port-to-port connections. In certain embodiments, for example, the connection state indicator may be changed from a value indicating that no connection has been established to a value indicating that an open connection state exists for a particular port-to-port connection. In certain embodiments, for example, the connection state indicator may be changed from a value indicating that no connection has been established to a value indicating that a connection is in the process of being formed and that one or more of the node identifiers, the user-application process identifiers, and/or the payload data-type identifiers has been successfully exchanged, authenticated and/or authorized. In certain embodiments, for example, the connection state indicator may be changed from a value indicating that an open connection exists, that no connection exists, or that a connection is in the process of being formed to a value indicating that the connection is being declined due to failure to successfully exchange, authenticate and/or authorize one or more of the node identifiers, the user-application process identifiers, and/or the payload data-type identifiers.

Certain embodiments may provide, for example, a product for managing communications of a plurality of networked processor nodes, the product comprising a non-transitory computer-readable storage medium having computer-readable program code embodied therein, the computer-readable program code executable by a processor to perform communication management operations, the communication management operations comprising: establishing authorized network tunnels for at least one port-to-port network communication (inclusive, for example, of all port-to-port network communications) among the plurality of networked processor nodes, comprising: i) intercepting network connection requests having associated destination port numbers; ii) identifying preconfigured, predefined, pre-established and/or preprovisioned tunnel port numbers, comprising identifying at least one tunnel port number for each associated destination port number of the associated destination port numbers; iii) requesting the negotiation of network tunnels, the requesting comprising sending connection request packets comprising the tunnel port numbers, each one of the network tunnels having a one-to-one correspondence with one of the tunnel port numbers; and iv) authorizing the network tunnels, comprising comparing node identifiers, user-application identifiers, and payload data-type identifiers received from the network tunnels with preconfigured, predefined, pre-established and/or preprovisioned authorization codes.

Certain embodiments may provide, for example, a computer program product for managing communications of a networked node comprising a processor, the computer program product comprising a computer-readable storage medium (for example a non-transitory computer-readable storage medium) having computer-readable program code embodied therein, the computer-readable program code executable by the processor to perform communication management operations, the communication management operations comprising: establishing authorized network tunnels for all port-to-port network communications for the networked node, comprising: i) intercepting a network connection request having an associated destination port number; ii) identifying a preconfigured, predefined, pre-established and/or preprovisioned tunnel port number associated with the destination port number; iii) requesting the forming of a network tunnel, the forming comprising sending a connection request packet comprising the tunnel port number; and iv) authorizing the network tunnel, comprising comparing a node identifier, a user-application identifier, and a payload data-type identifier received from the network tunnel with a preconfigured, predefined, pre-established and/or preprovisioned authorization code.

Certain embodiments may provide, for example, a product for managing communications of a plurality of networked processor nodes. In certain embodiments, for example, the product may comprise a computer-readable storage medium (for example a non-transitory computer-readable storage medium) having computer-readable program code embodied therein, the computer-readable program code executable by a processor to perform communication management operations. In certain embodiments, for example, the communication management operations may comprise establishing authorized network tunnels for at least one port-to-port network communication (including, for example, all port-to-port network communications (for example unencrypted or encrypted payload communications) among the plurality of networked processor nodes (inclusive, for example, of port-to-port communications according to User Datagram Protocol (UDP) or Transmission Control Protocol (TCP) between end-user application processes over a network)). In certain embodiments, for example, the port-to-port communications may be between user-application processes (inclusive of application processes having a process owner (or user)). In certain embodiments, for example, one or more of the user-application processes may reside in kernel and/or application space. In certain embodiments, for example, the establishing may comprise intercepting network connection requests from source ports (for example the source ports may comprise ports associated with user-application processes), the requests having associated destination port numbers. In certain embodiments, for example, the establishing may comprise verifying that the source ports are authorized to communicate with ports having the associated destination port numbers. In certain embodiments, for example, the establishing may comprise requesting the negotiation of network tunnels, comprising sending connection request packets comprising the associated destination port numbers, each one of the network tunnels having a one-to-one correspondence with one of the associated destination port numbers. In certain embodiments, for example, the establishing may comprise authorizing the network tunnels, comprising comparing node identifiers, user-application identifiers, and/or payload data-type identifiers received from the network tunnels with preconfigured, predefined, pre-established and/or preprovisioned authorization codes. In certain further embodiments, for example, the node identifiers, user-application identifiers, and/or payload data-type identifiers may be encrypted and require decryption before the comparing.

Certain embodiments may provide, for example, a product for managing communications of a plurality of networked processor nodes, the product comprising a non-transitory computer-readable storage medium having computer-readable program code embodied therein, the computer-readable program code executable by a processor to perform communication management operations, the communication management operations comprising: establishing authorized network tunnels for all port-to-port network communications among the plurality of networked processor nodes, comprising: i) intercepting network connection requests from source ports, the requests having associated destination port numbers; ii) verifying that the source ports are authorized to communicate with ports having the associated destination port numbers; iii) requesting the negotiation of network tunnels, comprising sending connection request packets comprising the associated destination port numbers, each one of the network tunnels having a one-to-one correspondence with one of the associated destination port numbers; and iv) authorizing the network tunnels, comprising comparing node identifiers, user-application identifiers, and payload data-type identifiers received from the network tunnels with preconfigured, predefined, pre-established and/or preprovisioned authorization codes.

Certain embodiments may provide, for example, a product for managing communications of a plurality of networked processor nodes. In certain embodiments, for example, the product may comprise a non-transitory computer-readable storage medium having computer-readable program code embodied therein, the computer-readable program code executable by a processor to perform communication management operations. In certain embodiments, for example, the communication management operations may comprise establishing authorized encrypted communication pathways for at least one port-to-port network communication (for example all port-to-port communications) among the plurality of networked processor nodes. In certain embodiments, for example, the establishing may comprise intercepting network connection requests having associated destination port numbers. In certain embodiments, for example, the establishing may comprise identifying preconfigured, predefined, pre-established and/or preprovisioned encrypted communication port numbers, comprising identifying at least one preconfigured, predefined, pre-established and/or preprovisioned encrypted communication port number for each associated destination port number of the associated destination port numbers. In certain embodiments, for example, the establishing may comprise requesting the negotiation of encrypted communication pathways, the requesting comprising sending connection request packets comprising the encrypted communication port numbers, each one of the encrypted communication pathways having a one-to-one correspondence with one of the encrypted communication port numbers. In certain embodiments, for example, the establishing may comprise authorizing the encrypted communication pathways, comprising comparing node identifiers, user-application identifiers, and/or payload data-type identifiers received from the encrypted communication pathways with preconfigured, predefined, pre-established and/or preprovisioned authorization codes.

Certain embodiments may provide, for example, a product for managing communications of a plurality of networked processor nodes, the product comprising a non-transitory computer-readable storage medium having computer-readable program code embodied therein, the computer-readable program code executable by a processor to perform communication management operations, the communication management operations comprising: establishing authorized encrypted communication pathways for all port-to-port network communications among the plurality of networked processor nodes, comprising: i) intercepting network connection requests having associated destination port numbers; ii) identifying preconfigured, predefined, pre-established and/or preprovisioned encrypted communication port numbers, comprising identifying at least one preconfigured, predefined, pre-established and/or preprovisioned encrypted communication port number for each associated destination port number of the associated destination port numbers; iii) requesting the negotiation of encrypted communication pathways, the requesting comprising sending connection request packets comprising the encrypted communication port numbers, each one of the encrypted communication pathways having a one-to-one correspondence with one of the encrypted communication port numbers; and iv) authorizing the encrypted communication pathways, comprising comparing node identifiers, user-application identifiers, and payload data-type identifiers received from the encrypted communication pathways with preconfigured, predefined, pre-established and/or preprovisioned authorization codes.

Certain embodiments may provide, for example, a product for managing communications of a plurality of networked processor nodes. In certain embodiments, for example, the product may comprise a non-transitory computer-readable storage medium having computer-readable program code embodied therein, the computer-readable program code executable by a processor to perform communication management operations. In certain embodiments, for example, the communication management operations may comprise establishing authorized encrypted communication pathways for at least one port-to-port network communication (including, for example, all port-to-port network communications) among the plurality of networked processor nodes. In certain embodiments, for example, the establishing may comprise intercepting network connection requests from source ports (for example source ports that have been opened by and have a predetermined relationship with authorized applications), the requests having associated destination port numbers. In certain embodiments, for example, the establishing may comprise verifying that the source ports are authorized to communicate with ports having the associated destination port numbers. In certain embodiments, for example, the establishing may comprise requesting the negotiation of encrypted communication pathways, the requesting comprising sending connection request packets comprising the associated destination port numbers. In certain embodiments, for example, the establishing may comprise authorizing the encrypted communication pathways, comprising comparing node identifiers, user-application identifiers, and/or payload data-type identifiers received from the encrypted communication pathways with preconfigured, predefined, pre-established and/or preprovisioned authorization codes.

Certain embodiments may provide, for example, a product for managing communications of a plurality of networked processor nodes, the product comprising a non-transitory computer-readable storage medium having computer-readable program code embodied therein, the computer-readable program code executable by a processor to perform communication management operations, the communication management operations comprising: establishing authorized encrypted communication pathways for all port-to-port network communications among the plurality of networked processor nodes, comprising: i) intercepting network connection requests from source ports, the requests having associated destination port numbers; ii) verifying that the source ports are authorized to communicate with ports having the associated destination port numbers; iii) requesting the negotiation of encrypted communication pathways, the requesting comprising sending connection request packets comprising the associated destination port numbers; and iv) authorizing the encrypted communication pathways, comprising comparing node identifiers, user-application identifiers, and payload data-type identifiers received from the encrypted communication pathways with preconfigured, predefined, pre-established and/or preprovisioned authorization codes.

Certain embodiments may provide, for example, a product for managing communications of a plurality of networked processor nodes, the product comprising a non-transitory computer-readable storage medium having computer-readable program code embodied therein, the computer-readable program code executable by a processor to perform communication management operations, the communication management operations comprising: establishing authorized network tunnels for all port-to-port network communications among the plurality of networked processor nodes, comprising: i) intercepting a network connection request from a source port, the request having an associated destination port number; ii) verifying that the source port is authorized to communicate with a port having the associated destination port number; iii) requesting the negotiation of a network tunnel, comprising sending a connection request packet comprising the associated destination port number; and iv) authorizing the network tunnel, comprising comparing a node identifiers, a user-application identifier, and a payload data-type identifier received from the network tunnel with a preconfigured, predefined, pre-established and/or preprovisioned authorization code.

Certain embodiments may provide, for example, a product for managing communications of a plurality of networked processor nodes, the product comprising a non-transitory computer-readable storage medium having computer-readable program code embodied therein, the computer-readable program code executable by a processor to perform communication management operations, the communication management operations comprising: establishing authorized network tunnels for all port-to-port network communications among the plurality of networked processor nodes, comprising: i) intercepting a network connection request having an associated destination port number; ii) identifying a preconfigured, predefined, pre-established and/or preprovisioned encrypted communication port number associated with the destination port number; iii) requesting the negotiation of an encrypted communication pathway, the requesting comprising sending a connection request packet comprising the encrypted communication port number; and iv) authorizing the encrypted communication pathway, comprising comparing a node identifier, a user-application identifier, and a payload data-type identifier received from the encrypted communication pathway with a preconfigured, predefined, pre-established and/or preprovisioned authorization code.

Certain embodiments may provide, for example, a product for managing communications of a plurality of networked processor nodes, the product comprising a non-transitory computer-readable storage medium having computer-readable program code embodied therein, the computer-readable program code executable by a processor to perform communication management operations, the communication management operations comprising: establishing authorized network tunnels for all port-to-port network communications among the plurality of networked processor nodes, comprising: i) intercepting a network connection request from a source port, the request having an associated destination port number; ii) verifying that the source port is authorized to communicate with a port having the associated destination port number; iii) requesting the negotiation of an encrypted communication pathway, the requesting comprising sending a connection request packet comprising the associated destination port number; and iv) authorizing the encrypted communication pathway, comprising comparing a node identifier, a user-application identifier, and a payload data-type identifier received from the encrypted communication pathway with a preconfigured, predefined, pre-established and/or preprovisioned authorization code.

Certain embodiments may provide, for example, a product for managing communications of a plurality of networked processor nodes, the product comprising a non-transitory computer-readable storage medium having computer-readable program code embodied therein, the computer-readable program code executable by a processor to perform communication management operations, the communication management operations comprising: performing communication processing functions on at least a portion of port-to-network communications (including, for example, on all port-to-network communications) of the plurality of processor nodes. In certain embodiments, for example, the performing communication processing functions may comprise: receiving data packets (for example from a user-application process via a loopback interface) having payloads and associated destination port numbers (the associated destination port numbers may include, for example, a destination port number associated with a destination port of a network security process). In certain embodiments, for example, the performing communication processing functions may comprise: identifying preconfigured, predefined, pre-established and/or preprovisioned tunnel port numbers, each one of the tunnel port numbers having a one-to-one correspondence with one of the associated destination port numbers. In certain embodiments, for example, the performing communication processing functions may comprise: assembling packet segments, each one of the packet segments comprising one of the payloads, an associated user-application process identifier, and a payload data type descriptor. In certain embodiments, for example, the associated user-application process identifier may comprise a process identifier and/or a process owner. In certain embodiments, for example, the associated user-application process identifier, and a payload data type descriptor may be combined (or concatenated) in a metadata portion of the packet segment. In certain embodiments, for example, the metadata may be encrypted, for example by a single-use cryptographic key. In certain embodiments, for example, the performing communication processing functions may comprise: requesting transmission of network packets through network tunnels (for example at least a different network tunnel for each application-to-application communication of a specified data protocol type), each one of the network packets comprising a tunnel port number of one of the tunnel port numbers and one of the assembled packet segments, each one of the network tunnels having a one-to-one correspondence with one of the tunnel port numbers.

A. In certain embodiments, for example, the receiving, identifying, assembling, and requesting may be transparent to all user-application processes on the plurality of networked nodes. In certain embodiments, for example, the data packets may be received by loopback interfaces. In certain embodiments, for example, the data packets may be received by kernel read and/or write calls. In certain embodiments, for example, the data packets may be received by TAP/TUN interfaces. In certain embodiments, for example, the receiving may occur in kernel spaces of the plural nodes. In certain embodiments, for example, the receiving may occur in application spaces of the plural nodes. In certain embodiments, for example, the received data packet may be received from user-application processes executing in application spaces of the plural nodes. In certain embodiments, for example, the user-application process identifiers may comprise process commands and process owners (for example process commands and process owners comparable to the output of operating system commands). In certain embodiments, for example, the communication processing functions may further comprise: setting connection status indicators to a non-operative state if more than a fixed number (for example a fixed number such as 10 or 20) of requests to transmit network packets are rejected. In certain embodiments, for example, the communication processing functions may further comprise: setting connection status indicators to a non-operative state if the difference between rejected and successful requests to transmit network packets exceeds a fixed number (for example a fixed number such as 10 or 20).

B. In certain embodiments, for example, the communication processing functions may further comprise: checking a connection status of the network tunnels (for example by checking lists maintained in kernel memory of the plural networked nodes). In certain embodiments, for example, the communication processing functions may further comprise dropping network packets that are received via one or more network tunnels whose connection status indicators are set to a non-operative state.

C. In certain embodiments, for example, the payloads may be translated into a common format prior to the assembling.

Certain embodiments may provide, for example, a product for managing communications of a plurality of networked processor nodes, the product comprising a non-transitory computer-readable storage medium having computer-readable program code embodied therein, the computer-readable program code executable by a processor to perform communication management operations, the communication management operations comprising: performing communication processing functions on at least a portion of port-to-network communications (including, for example, on all port-to-network communications) of the plurality of processor nodes, the performing communication processing functions comprising: i) receiving data packets having payloads and associated destination port numbers; ii) identifying preconfigured, predefined, pre-established and/or preprovisioned tunnel port numbers, each one of the tunnel port numbers having a one-to-one correspondence with one of the associated destination port numbers; iii) assembling packet segments, each one of the packet segments comprising one of the payloads, an associated user-application process identifier, and a payload data type descriptor; and iv) requesting transmission of network packets through network tunnels, each one of the network packets comprising a tunnel port number of one of the tunnel port numbers and one of the assembled packet segments, each one of the network tunnels having a one-to-one correspondence with one of the tunnel port numbers.

Certain embodiments may provide, for example, a computer program product for managing communications of a networked node comprising a processor, the computer program product comprising a non-transitory computer-readable storage medium having computer-readable program code embodied therein, the computer-readable program code executable by the processor to perform communication management operations, the communication management operations comprising: performing communication processing functions on all port-to-network communications of the networked node, the performing communication processing functions comprising: i) receiving a data packet having a payload and an associated destination port number; ii) identifying a preconfigured, predefined, pre-established and/or preprovisioned tunnel port number associated with the destination port number; iii) assembling a packet segment, the packet segment comprising the payload, an associated user-application identifier, and a payload data type descriptor; and iv) requesting transmission of a network packet through a network tunnel, the network packet comprising the tunnel port number and the assembled packet segment, the network tunnel having a one-to-one correspondence with the tunnel port number.

Certain embodiments may provide, for example, a product for managing communications of a plurality of networked processor nodes, the product comprising a non-transitory computer-readable storage medium having computer-readable program code embodied therein, the computer-readable program code executable by a processor to perform communication management operations, the communication management operations comprising: performing communication processing functions on at least a portion of port-to-network communications (including, for example, on all port-to-network communications) of the plurality of processor nodes. In certain embodiments, for example, the performing communication processing functions may comprise receiving data packets from source ports, the data packets having payloads and associated destination port numbers. In certain embodiments, for example, the performing communication processing functions may comprise verifying that the source ports are authorized to communicate with ports having the associated destination port numbers. In certain embodiments, for example, the performing communication processing functions may comprise assembling packet segments, each one of the packet segments comprising one of the payloads, an associated user-application identifier, and a payload data type descriptor. In certain embodiments, for example, the performing communication processing functions may comprise requesting transmission of network packets through network tunnels, each one of the network packets comprising a port number of one of the associated destination port numbers and one of the assembled packet segments, each one of the network tunnels having a one-to-one correspondence with one of the associated destination port numbers.

Certain embodiments may provide, for example, a product for managing communications of a plurality of networked processor nodes, the product comprising a non-transitory computer-readable storage medium having computer-readable program code embodied therein, the computer-readable program code executable by a processor to perform communication management operations, the communication management operations comprising: performing communication processing functions on all port-to-network communications of the plurality of processor nodes. In certain embodiments, for example, the performing communication processing functions may comprise receiving data packets having payloads and associated destination port numbers. In certain embodiments, for example, the performing communication processing functions may comprise identifying preconfigured, predefined, pre-established and/or preprovisioned tunnel port numbers, each one of the tunnel port numbers having a one-to-one correspondence with one of the associated destination port numbers. In certain embodiments, for example, the performing communication processing functions may comprise assembling packet segments, each one of the packet segments comprising one of the payloads, an associated user-application identifier, and a payload data type descriptor. In certain embodiments, for example, the performing communication processing functions may comprise requesting transmission of network packets through encrypted communication pathways, each one of the network packets comprising a tunnel port number of one of the tunnel port numbers and one of the assembled packet segments, each one of the encrypted communication pathways having a one-to-one correspondence with one of the tunnel port numbers.

Certain embodiments may provide, for example, a product for managing communications of a plurality of networked processor nodes, the product comprising a non-transitory computer-readable storage medium having computer-readable program code embodied therein, the computer-readable program code executable by a processor to perform communication management operations, the communication management operations comprising: performing communication processing functions on at least a portion of port-to-network communications (including, for example, on all port-to-network communications) of the plurality of processor nodes. In certain embodiments, for example, the performing communication processing functions may comprise receiving data packets from source ports, the data packets having payloads and associated destination port numbers. In certain embodiments, for example, the performing communication processing functions may comprise verifying that the source ports are authorized to communicate with ports having the associated destination port numbers. In certain embodiments, for example, the performing communication processing functions may comprise assembling packet segments, each one of the packet segments comprising one of the payloads, an associated user-application identifier, and a payload data type descriptor. In certain embodiments, for example, the performing communication processing functions may comprise requesting transmission of network packets through encrypted communication pathways, each one of the network packets comprising a port number of one of the associated destination port numbers and one of the assembled packet segments, each one of the encrypted communication pathways having a one-to-one correspondence with one of the associated destination port numbers.

Certain embodiments may provide, for example, a product for managing communications of a plurality of networked processor nodes, the product comprising a non-transitory computer-readable storage medium having computer-readable program code embodied therein, the computer-readable program code executable by a processor to perform communication management operations, the communication management operations comprising: performing communication processing functions on all port-to-network communications of the plurality of processor nodes, the performing communication processing functions comprising: i) receiving data packets from source ports, the data packets having payloads and associated destination port numbers; ii) verifying that the source ports are authorized to communicate with ports having the associated destination port numbers; iii) assembling packet segments, each one of the packet segments comprising one of the payloads, an associated user-application identifier, and a payload data type descriptor; and iv) requesting transmission of network packets through network tunnels, each one of the network packets comprising a port number of one of the associated destination port numbers and one of the assembled packet segments, each one of the network tunnels having a one-to-one correspondence with one of the associated destination port numbers.

Certain embodiments may provide, for example, a product for managing communications of a plurality of networked processor nodes, the product comprising a non-transitory computer-readable storage medium having computer-readable program code embodied therein, the computer-readable program code executable by a processor to perform communication management operations, the communication management operations comprising: performing communication processing functions on all port-to-network communications of the plurality of processor nodes, the performing communication processing functions comprising: i) receiving a data packet from a source port, the data packet having a payload and an associated destination port number; ii) verifying that the source port is authorized to communicate with a port having the associated destination port number; iii) assembling a packet segment, the packet segment comprising the payload, an associated user-application identifier, and a payload data type descriptor, and iv) requesting transmission of a network packet through a network tunnel, the network packet comprising the associated destination port numbers and the assembled packet segment, the network tunnels having a one-to-one correspondence with the associated destination port number.

Certain embodiments may provide, for example, a product for managing communications of a plurality of networked processor nodes, the product comprising a non-transitory computer-readable storage medium having computer-readable program code embodied therein, the computer-readable program code executable by a processor to perform communication management operations, the communication management operations comprising: performing communication processing functions on all port-to-network communications of the plurality of processor nodes, the performing communication processing functions comprising: i) receiving data packets having payloads and associated destination port numbers; ii) identifying preconfigured, predefined, pre-established and/or preprovisioned tunnel port numbers, each one of the tunnel port numbers having a one-to-one correspondence with one of the associated destination port numbers; iii) assembling packet segments, each one of the packet segments comprising one of the payloads, an associated user-application identifier, and a payload data type descriptor; and iv) requesting transmission of network packets through encrypted communication pathways, each one of the network packets comprising a tunnel port number of one of the tunnel port numbers and one of the assembled packet segments, each one of the encrypted communication pathways having a one-to-one correspondence with one of the tunnel port numbers.

Certain embodiments may provide, for example, a product for managing communications of a plurality of networked processor nodes, the product comprising a non-transitory computer-readable storage medium having computer-readable program code embodied therein, the computer-readable program code executable by a processor to perform communication management operations, the communication management operations comprising: performing communication processing functions on all port-to-network communications of the plurality of processor nodes, the performing communication processing functions comprising: i) receiving a data packet having a payload and an associated destination port number; ii) identifying a preconfigured, predefined, pre-established and/or preprovisioned tunnel port number, the tunnel port number having a one-to-one correspondence with the associated destination port number; iii) assembling a packet segment, the packet segment comprising the payload, an associated user-application identifier, and a payload data type descriptor; and iv) requesting encrypted communication over an encrypted communication pathway of a network packet, the network packets comprising the tunnel port number and the assembled packet segment, the encrypted communication pathway having a one-to-one correspondence with the tunnel port number.

Certain embodiments may provide, for example, a product for managing communications of a plurality of networked processor nodes, the product comprising a non-transitory computer-readable storage medium having computer-readable program code embodied therein, the computer-readable program code executable by a processor to perform communication management operations, the communication management operations comprising: performing communication processing functions on all port-to-network communications of the plurality of processor nodes, the performing communication processing functions comprising: i) receiving data packets from source ports, the data packets having payloads and associated destination port numbers; ii) verifying that the source ports are authorized to communicate with ports having the associated destination port numbers; iii) assembling packet segments, each one of the packet segments comprising one of the payloads, an associated user-application identifier, and a payload data type descriptor; and iv) requesting transmission of network packets through encrypted communication pathways, each one of the network packets comprising a port number of one of the associated destination port numbers and one of the assembled packet segments, each one of the encrypted communication pathways having a one-to-one correspondence with one of the associated destination port numbers.

Certain embodiments may provide, for example, a product for managing communications of a plurality of networked processor nodes, the product comprising a non-transitory computer-readable storage medium having computer-readable program code embodied therein, the computer-readable program code executable by a processor to perform communication management operations, the communication management operations comprising: performing communication processing functions on all port-to-network communications of the plurality of processor nodes, the performing communication processing functions comprising: i) receiving a data packet from a source port, the data packet having a payload and an associated destination port number; ii) verifying that the source port is authorized to communicate with a port having the associated destination port number; iii) assembling a packet segment, the packet segments comprising the payload, an associated user-application identifier, and a payload data type descriptor; and iv) requesting transmission of a network packet through an encrypted communication pathway, the network packets comprising the associated destination port number and the assembled packet segment, the encrypted communication pathway having a one-to-one correspondence with the associated destination port number.

Certain embodiments may provide, for example, a product for managing communications of a plurality of networked processor nodes, the product comprising a computer-readable storage medium (for example a non-transitory computer-readable storage medium) having computer-readable program code embodied therein, the computer-readable program code executable by a processor to perform communication management operations, the communication management operations comprising: performing communication processing functions on at least a portion of network-to-port communications (including, for example, on all network-to-port communications) received by the plurality of processor nodes. In certain embodiments, for example, the performing communication processing functions may comprise obtaining tunnel port numbers, metadata (for example metadata encrypted using a single-use cryptographic key), and payloads associated with network packets. In certain embodiments, for example, the performing communication processing functions may comprise identifying preconfigured, predefined, pre-established and/or preprovisioned destination port numbers and preconfigured, predefined, pre-established and/or preprovisioned authorization codes associated with the tunnel port numbers, each one of the authorization codes comprising a preconfigured, predefined, pre-established and/or preprovisioned user-application process identifier and a preconfigured, predefined, pre-established and/or preprovisioned payload data-type identifier associated with one of the obtained tunnel port numbers. In certain embodiments, for example, the performing communication processing functions may comprise authorizing the network packets, comprising: comparing (for example comparing in application spaces or kernel spaces of the plurality of nodes) metadata with the authorization codes. In certain embodiments, for example, the performing communication processing functions may comprise requesting transmission (for example across loopback interfaces, by TUN/TAP interfaces, or by kernel read and/or write calls) of payloads from the authorized network packets to destinations referenced by the destination port numbers. In certain embodiments, for example, the payloads may be passed to the destination port numbers by one or more loopback interfaces.

A. In certain embodiments, for example, the obtaining, identifying, authorizing, and requesting may be transparent to all user-application processes on the plurality of networked nodes (for example by employing modified network application programming interface functions (for example in a modified operating system) while maintaining standard syntax). In certain embodiments, for example, the obtaining, identifying, authorizing, and requesting may be self-executing and/or automatic (for example requiring no human intervention, no interruption in computer execution other than ordinary, temporary process scheduling).

B. In certain embodiments, for example, the communication processing functions may be performed at 95% of wire speed or greater and less than 10% of the processor load may be committed to network communications. In certain embodiments, for example, the destinations may comprise user-application processes. In certain embodiments, for example, the program code may be middleware positioned between the network and the destinations referenced by the destination port number. In certain embodiments, for example, the communication processing functions may further comprise: dropping network packets if they are not authorized following the comparing (for example dropping network packets for which the metadata does not match expected values based on the authorization codes).

C. In certain embodiments, for example, the communication processing functions may further comprise: setting connection status indicators to a non-operative state if more than a fixed number of network packets are not authorized following the comparing. In certain embodiments, for example, the communication processing functions may further comprise: checking, the checking at least partially performed in kernels of the plural networked nodes, a connection status of the network. In certain embodiments, for example, the communication processing functions may further comprise: dropping network packets that are received via one or more network tunnels whose connection status indicators are set to a non-operative state.

Certain embodiments may comprise, for example, a product for managing communications of a plurality of networked processor nodes, the product comprising a non-transitory computer-readable storage medium having computer-readable program code embodied therein, the computer-readable program code executable by a processor to perform communication management operations, the communication management operations comprising: performing communication processing functions on at least a portion of network-to-port communications (including, for example, on all network-to-port communications) received by the plurality of processor nodes, the performing communication processing functions comprising: i) obtaining tunnel port numbers, metadata, and payloads associated with network packets; ii) identifying preconfigured, predefined, pre-established and/or preprovisioned destination port numbers and preconfigured, predefined, pre-established and/or preprovisioned authorization codes associated with the tunnel port numbers, each one of the authorization codes comprising a preconfigured, predefined, pre-established and/or preprovisioned user-application identifier and a preconfigured, predefined, pre-established and/or preprovisioned payload data-type identifier associated with one of the obtained tunnel port numbers; iii) authorizing the network packets, comprising: comparing at least a portion of the metadata with the authorization codes; and iv) requesting transmission of payloads from the authorized network packets to destinations referenced by the destination port numbers.

Certain embodiments may comprise, for example, a computer program product for managing communications of a networked nodes comprising a processor, the computer program product comprising a non-transitory computer-readable storage medium having computer-readable program code embodied therein, the computer-readable program code executable by the processor to perform communication management operations, the communication management operations comprising: performing communication processing functions on all network-to-port communications received by the networked node, the performing communication processing functions comprising: i) obtaining a tunnel port number, metadata, and a payload associated with a network packet received by the networked node; ii) identifying a preconfigured, predefined, pre-established and/or preprovisioned destination port number and a preconfigured, predefined, pre-established and/or preprovisioned authorization code associated with the tunnel port number, the authorization code comprising a preconfigured, predefined, pre-established and/or preprovisioned user-application identifier and a preconfigured, predefined, pre-established and/or preprovisioned payload data-type identifier associated with the obtained tunnel port number; iii) authorizing the network packet, comprising: comparing the metadata with the authorization code; and iv) requesting transmission of the payload to a destination referenced by the destination port number.

Certain embodiments may provide, for example, a product for managing communications of a plurality of networked processor nodes, the product comprising a computer-readable storage medium (for example a non-transitory computer-readable storage medium) having computer-readable program code embodied therein, the computer-readable program code executable by a processor to perform communication management operations, the communication management operations comprising: performing communication processing functions on at least a portion of network-to-port communications (including, for example, on all network-to-port communications) received by the plurality of processor nodes. In certain embodiments, for example, the performing communication processing functions may comprise obtaining destination port numbers, metadata, and payloads associated with network packets. In certain embodiments, for example, the performing communication processing functions may comprise identifying preconfigured, predefined, pre-established and/or preprovisioned authorization codes associated with the destination port numbers, each one of the authorization codes comprising a preconfigured, predefined, pre-established and/or preprovisioned user-application identifier and a preconfigured, predefined, pre-established and/or preprovisioned payload data-type identifier associated with one of the destination port numbers. In certain embodiments, for example, the performing communication processing functions may comprise authorizing the network packets, comprising: comparing at least a portion of the metadata with the authorization codes. In certain embodiments, for example, the performing communication processing functions may comprise requesting transmission of payloads from the authorized network packets to destinations referenced by the destination port numbers.

Certain embodiments may provide, for example, a product for managing communications of a plurality of networked processor nodes, the product comprising a non-transitory computer-readable storage medium having computer-readable program code embodied therein, the computer-readable program code executable by a processor to perform communication management operations, the communication management operations comprising: performing communication processing functions on all network-to-port communications received by the plurality of processor nodes, the performing communication processing functions comprising: i) obtaining destination port numbers, metadata, and payloads associated with network packets; ii) identifying preconfigured, predefined, pre-established and/or preprovisioned authorization codes associated with the destination port numbers, each one of the authorization codes comprising a preconfigured, predefined, pre-established and/or preprovisioned user-application identifier and a preconfigured, predefined, pre-established and/or preprovisioned payload data-type identifier associated with one of the destination port numbers; iii) authorizing the network packets, comprising: comparing at least a portion of the metadata with the authorization codes; and iv) requesting transmission of payloads from the authorized network packets to destinations referenced by the destination port numbers.

Certain embodiments may provide, for example, a product for managing communications of a plurality of networked processor nodes, the product comprising a non-transitory computer-readable storage medium having computer-readable program code embodied therein, the computer-readable program code executable by a processor to perform communication management operations, the communication management operations comprising: performing communication processing functions on all network-to-port communications received by the plurality of processor nodes, the performing communication processing functions comprising: i) obtaining a tunnel port number, metadata, and a payload associated with a network packet received by the networked node; ii) identifying a preconfigured, predefined, pre-established and/or preprovisioned destination port number and a preconfigured, predefined, pre-established and/or preprovisioned authorization code associated with the tunnel port number, the authorization code comprising a preconfigured, predefined, pre-established and/or preprovisioned user-application identifier and a preconfigured, predefined, pre-established and/or preprovisioned payload data-type identifier associated with the obtained tunnel port number; iii) authorizing the network packet, comprising: comparing the metadata with the authorization code; and iv) requesting transmission of the payload to a destination referenced by the preconfigured, predefined, pre-established and/or preprovisioned destination port number.

Certain embodiments may provide, for example, a method for authorized network communication, comprising: detecting a request by a first application present on a first node to transmit data to a destination port associated with a second application present on a second node, validating the authority of the first application to transmit the data to the destination port at least by checking a preconfigured list present on the first node, passing the data from the first application to a first middleware on the first node, and mutual authorization and authentication of the first node and the second node, the first application and the second application, and a data protocol of the data. In certain further embodiments, for example, the method may further comprise transmitting a network packet containing the data through a network tunnel (for example a network tunnel configured according to User Datagram Protocol (UDP), a "mid-weight" UDP comprising UDP plus additional connection acknowledgments devised to increase reliability of a UDP connection, or Transmission Control Protocol (TCP)), the network tunnel extending from the first middleware to a second middleware present on the second node, the network tunnel initialized based on the detected request, the initialization based at least on the mutual authentication and authorization.

A. In certain embodiments, for example, the first node may be a first computing device. In certain embodiments, for example, the first node may comprise a first processor, a first kernel, a first network stack, a first loopback interface, a first network application programming interface of the first network stack, and a first non-transitory computer-readable storage medium. In certain embodiments, for example, the second node may comprise a second processor, a second kernel, a second network stack, and a second non-transitory computer-readable storage medium. In certain embodiments, for example, the detecting may be performed by a first execution thread being executed by the first processor, and at least a portion of the validating may be performed by a second execution thread being executed by the first processor. In certain embodiments, for example, the detecting and the validating may be performed by a first execution thread being executed by the first processor, and at least a portion of the mutual authorization and authentication may be performed by a second execution thread being executed by the first processor. In certain embodiments, for example, the validating may be performed by the first middleware. In certain embodiments, for example, execution of the first middleware may be distributed at least between a first execution thread and a second execution thread being executed by the first processor. In certain embodiments, for example, the request from the first application may be passed through the first loopback interface to the first middleware. In certain embodiments, for example, the request from the first application may not be passed through the first loopback interface to the first middleware. In certain embodiments, for example, the request from the first application may be passed through a shim in the first network stack to the first middleware. In certain embodiments, for example, the request from the first application may be passed from the first network application programming interface directly to the first middleware. In certain embodiments, for example, the data may be passed through the loopback interface to the first middleware. In certain embodiments, for example, the data may not be passed through the first loopback interface to the first middleware. In certain embodiments, for example, the data may be passed through a shim in the first network stack to the first middleware. In certain embodiments, for example, the data may be passed from the first network application programming interface directly to the first middleware. In certain embodiments, for example, the detecting may comprise receiving (or intercepting), by the first middleware, the request. In certain embodiments, for example, the detecting may occur in the first network stack. In certain embodiments, for example, the detecting may occur in the first network application programming interface.

B. In certain embodiments, for example, at least a portion of the first middleware may comprise a kernel driver. In certain embodiments, for example, at least a portion of the first middleware may comprise a kernel module process.

C. In certain embodiments, for example, the method may further comprise: preventing the first application and the second application from associating with any socket comprising a physical interface. In certain embodiments, for example, the method may further comprise: preventing any port associated with the first application from binding with a physical interface. In certain embodiments, for example, the method may further comprise: preventing any port associated with the second application from binding with a physical interface. In certain embodiments, for example, the method may further comprise: preventing any port associated with the first application from binding with a physical interface, preventing any port associated with the second application from binding with a physical interface.

D. In certain embodiments, for example, the network tunnel may be encrypted. In certain further embodiments, for example, at least a portion of the network packet (for example the payload, a portion of the payload, or a metadata portion of the payload) may be encrypted using a symmetric key algorithm (for example a symmetric key algorithm such as an Advanced Encryption Standard (AES) algorithm (for example 256-bit AES). In certain further embodiments, for example, the symmetric key may be obtained by executing a key exchange algorithm (for example Elliptic-Curve Diffie-Hellman (ECDH) key exchange). In certain further embodiments, for example, the symmetric key may be a single-use key. In certain further embodiments, for example, the symmetric key may be obtained by rotating a key derived from ECDH key exchange.

E. In certain embodiments, for example, the data protocol may be obtained from metadata present in the network packet. In certain further embodiments, for example, the metadata may be encrypted.

F. In certain embodiments, for example, the metadata may comprise a connection state indicator for the network tunnel. In certain embodiments, for example, a connection state indicator for the network tunnel may be inserted into the metadata by the first middleware. In certain embodiments, for example, a second middleware present on the second node may determine a connection state of the network tunnel by inspecting the metadata (for example by decrypting encrypted metadata followed by parsing the metadata).

G. In certain embodiments, for example, at least a portion of the validating (for example all of the validating) may be performed by the first middleware. In certain further embodiments, for example, validating may comprise the first middleware inspecting a connection state of the network tunnel (for example checking a port state of an endpoint of the network tunnel such as a network tunnel endpoint present on the first node). In certain embodiments, for example, validating may comprise matching a 2-tuple comprising a destination port number of the destination port and a unique first application identifier of the first application with record present in the preconfigured list.

H. In certain embodiments, for example, the network tunnel may be encrypted based on executing an encryption algorithm (for example encrypted based on executing a key exchange algorithm) and the mutual authentication and authorization of the first node and the second node may be performed separately from the executing the encryption algorithm (for example may be performed after the executing the encryption algorithm). In certain embodiments, for example, the mutual authentication and authorization of the first node and the second node may comprise encrypting a first node identification code using a cryptographic key derived from the executing the key exchange algorithm. In certain further embodiments, for example, the cryptographic key may be nonpublic (for example the cryptographic key may be a shared secret between the first middleware and a second middleware executing on the second node). In certain embodiments, for example, the mutual authentication and authorization of the first node and the second node may comprise: (a) encrypting a first node identification code using a first cryptographic key derived from the executing the key exchange algorithm, and (b) encrypting a second node identification code using a second cryptographic key (for example a second cryptographic key that is different from the first cryptographic key) derived from the executing the key exchange algorithm. In certain further embodiments, for example, the cryptographic key may be nonpublic (for example the first cryptographic key and the second cryptographic key may each be a shared secret between the first middleware and a second middleware executing on the second node).

I. In certain embodiments, for example, the mutual authentication and authorization of the first node and the second node may be independent of mutual authentication and authorization of the first application and the second application and/or mutual authentication and authorization of the data protocol. In certain embodiments, for example, the mutual authentication and authorization of the first node and the second node may be independent of initializing the network tunnel. In certain embodiments, for example, the mutual authentication and authorization of the first node and the second node may occur after the network tunnel is initialized. In certain embodiments, for example, the exchange of the data protocol identifier between the first node and the second node may occur during initialization of the network tunnel to at least partially authorize the network tunnel.

J. In certain embodiments, for example, mutual authorization and authentication of the first application and the second application may comprise key exchange (for example by execution of a key exchange algorithm such as ECDH) during initialization of the network tunnel. In certain embodiments, for example, a first private key associated with the first application and a second private key associated with the second application may be used during the key exchange. In certain embodiments, for example, the first private key may be uniquely associated with the first application and the second private key may be uniquely associated with the second application. In certain embodiments, for example, the first private key may be uniquely associated with the first application and a user (for example a single-user) of the first application and the second private key may be uniquely associated with the second application and a user (for example a single-user) of the second application.

K. In certain embodiments, for example, mutual authorization and authentication of the first application and the second application may comprise encrypting a unique first application identifier and sending the encrypted unique first application identifier from the first node to the second node, followed by decrypting the unique first application identifier and comparing the unique first application identifier to a predetermined first identifier value that is specific to the network tunnel. In certain further embodiments, for example, mutual authorization and authentication of the first application and the second application may comprise encrypting a unique second application identifier and sending the encrypted unique second application identifier from the second node to the first node, followed by decrypting the unique second application identifier and comparing the unique second application identifier to a predetermined second identifier value that is specific to the network tunnel. In certain embodiments, for example, the unique first application identifier may comprise a first application identifier and an associated first user identifier. In certain embodiments, for example, the unique second application identifier may comprise a second application identifier and an associated second user identifier. In certain embodiments, for example, the unique first application identifier and the unique second application identifier may be exchanged during initialization of the network tunnel to at least partially authorize the network tunnel. In certain embodiments, for example, the network packet may contain the unique first application identifier. In certain embodiments, for example, mutual authentication and authorization of the data protocol may further comprise encrypting a data protocol identifier and sending the encrypted data protocol identifier from the first node to the second node, followed by decrypting the data protocol identifier and comparing the data protocol identifier to a predetermined data protocol identifier value that is specific to the network tunnel. In certain further embodiments, for example, mutual authorization and authentication of data protocol may comprise encrypting a data protocol identifier and sending the encrypted data protocol identifier from the second node to the first node, followed by decrypting the data protocol identifier and comparing the data protocol identifier to a predetermined data protocol identifier value that is specific to the network tunnel. In certain embodiments, for example, the above-described exchange of the data protocol identifier between the first node and the second may be performed during initialization of the network tunnel to at least partially authorize the network tunnel. In certain embodiments, for example, the network packet may contain the unique first application identifier. In certain embodiments, for example, mutual authentication and authorization of the first application and second application and mutual authentication and authorization of the data protocol may be combined. In certain further embodiments, for example, a first combined identifier comprising the unique first application identifier and the data protocol identifier may be encrypted and sent from the from the first node to the second node, followed by decrypting the first combined identifier and comparing the first combined identifier to a predetermined first combined identifier value that is specific to the network tunnel. In certain further embodiments, for example, a second combined identifier comprising the unique second application identifier and the data protocol identifier may be encrypted and sent from the from the second node to the first node, followed by decrypting the second combined identifier and comparing the second combined identifier to a predetermined second combined identifier value that is specific to the network tunnel. In certain embodiments, for example, the first combined identifier and the second combined identifier may be exchanged during initialization of the network tunnel to at least partially authorize the network tunnel. In certain embodiments, for example, the network packet may contain the unique first application identifier. In certain embodiments, for example, the first application identifier and the first user identifier may be obtained from a process status request (for example a "ps" command in Linux).

L. In certain embodiments, for example, the method may comprise detecting a request by the second application to open a port. In certain embodiments, for example, the method may comprise validating the authority of the second application to open the port at least by checking a further preconfigured list present on the second node, processor, or computing device. In certain embodiments, for example, the checking the further preconfigured list may comprise matching at least a portion of a member of the further preconfigured list with a 2-tuple comprising (a) a unique identifier for the second application and the user of the second application and (b) a port number associated with the port. In certain further embodiments, for example, the port may be the destination port.

M. In certain embodiments, for example, the method may further comprise: communicating the data from a second middleware present on the second node to the second application.

Certain embodiments may provide, for example, a method for authorized network communication. In certain embodiments, for example, the method may comprise: detecting (for example receiving or intercepting) a request by a first application present on a first node (for example a computing device such as an edge device in an Internet-of-Things) to transmit data to a second application present on a second node, validating the authority of the first application to transmit the data, passing the data from the first application to a first middleware on the first node, transmitting a network packet (for example an Internet Protocol (IP) packet) containing the data through a network tunnel (for example an encrypted network tunnel), and testing the authority of the second application to receive the data.

A. In certain further embodiments, for example, the validating may be based at least on a first port number (for example a transport layer port number according to the OSI model). In certain further embodiments, for example, the first application may comprise a computer program executing on the first node and the first port number may be associated with the first application. In certain embodiments, for example, the first middleware may comprise a computer program executing on the first node and the first port number may be associated with the first middleware (for example the port number may be associated with the second middleware and may be an endpoint of the network tunnel). In certain embodiments, for example, the first port number may be predetermined prior to the initialization of the network tunnel. In certain embodiments, for example, the first port number may be assigned dynamically during initialization of the network tunnel.

B. In certain embodiments, for example, the network tunnel may extend from the first middleware to a second middleware present on the second node (for example the network tunnel may extend from a port associated with the first middleware to a different port associated with the second middleware. In certain further embodiments, for example, the network tunnel may be initialized based on the detected request (for example, the initialization may be triggered by the detected request). In certain further embodiments, for example, the initialization may be based at least on mutual authentication and authorization of the first node and the second node (for example by exchange of encrypted node identification codes).

C. In certain embodiments, for example, the testing may be based at least on a second port number and a data protocol of the data. In certain further embodiments, for example, the second port number may be associated with a computer program executing on the second node, processor, or computing device. In certain further embodiments, for example, the second port number may be associated with the second application. In certain embodiments, for example, the second port number may be associated with a second middleware (for example the port number may be associated with the second middleware and may be an endpoint of the network tunnel). In certain embodiments, for example, the second port number may be predetermined prior to the initialization of the network tunnel. In certain embodiments, for example, the second port number may be assigned dynamically during initialization of the network tunnel.

D. In certain embodiments, for example, the first node may be a first computing device. In certain embodiments, for example, the first node may comprise a first processor, a first kernel, a first network stack, a first loopback interface, a first network application programming interface of the first network stack, and a first non-transitory computer-readable storage medium. In certain embodiments, for example, the second node may comprise a second processor, a second kernel, a second network stack, and a second non-transitory computer-readable storage medium. In certain embodiments, for example, the detecting may be performed by a first execution thread being executed by the first processor and at least a portion of the testing may be performed by a second execution thread being executed by the first processor. In certain embodiments, for example, the validating may be performed by the first middleware. In certain further embodiments, for example, the validating may be performed by the first execution thread. In certain further embodiments, for example, the validating may be performed by the second execution thread. In certain embodiments, for example, execution of the first middleware may be distributed at least between the first execution thread and the second execution thread. In certain embodiments, for example, the request from the first application may be passed through the first loopback interface to the first middleware. In certain embodiments, for example, the request from the first application may not be passed through the first loopback interface to the first middleware. In certain embodiments, for example, the request from the first application may be passed through a shim in the first network stack to the first middleware. In certain embodiments, for example, the request from the first application may be passed from the first network application programming interface directly to the first middleware. In certain embodiments, for example, the data may be passed through the loopback interface to the first middleware. In certain embodiments, for example, the data may not be passed through the first loopback interface to the first middleware. In certain embodiments, for example, the data may be passed through a shim in the first network stack to the first middleware. In certain embodiments, for example, the data may be passed from the first network application programming interface directly to the first middleware. In certain embodiments, for example, the detecting may comprise receiving or intercepting, by the first middleware, the request. In certain embodiments, for example, the detecting may occur in the first network stack. In certain embodiments, for example, the detecting may occur in the first network application programming interface.

E. In certain embodiments, for example, at least a portion of the first middleware may comprise a kernel driver. In certain embodiments, for example, at least a portion of the first middleware may comprise a kernel module process.

F. In certain embodiments, for example, the method may further comprise: preventing the first application and the second application from associating with any socket comprising a physical interface. In certain embodiments, for example, the method may further comprise: preventing any port associated with the first application from binding with a physical interface. In certain embodiments, for example, the method may further comprise: preventing any port associated with the second application from binding with a physical interface. In certain embodiments, for example, the method may further comprise: preventing any port associated with the first application from binding with a physical interface, preventing any port associated with the second application from binding with a physical interface.

G. In certain embodiments, for example, the network tunnel may be encrypted. In certain further embodiments, for example, at least a portion of the network packet (for example the payload, a portion of the payload, or a metadata portion of the payload) may be encrypted using a symmetric key algorithm (for example a symmetric key algorithm such as an Advanced Encryption Standard (AES) algorithm (for example 256-bit AES). In certain further embodiments, for example, the symmetric key may be obtained by Diffie-Hellman key exchange (for example Elliptic-Curve Diffie-Hellman (ECDH) key exchange). In certain further embodiments, for example, the symmetric key may be a single-use key. In certain further embodiments, for example, the symmetric key may be obtained by rotating a key derived from ECDH key exchange.

H. In certain embodiments, for example, the data protocol may be obtained from metadata present in the network packet. In certain further embodiments, for example, the metadata may be encrypted.

I. In certain embodiments, for example, the metadata may comprise a connection state indicator for the network tunnel. In certain embodiments, for example, a connection state indicator for the network tunnel may be inserted into the metadata by the first middleware. In certain embodiments, for example, a second middleware present on the second node may determine a connection state of the network tunnel by inspecting the metadata (for example by decrypting encrypted metadata followed by parsing the metadata).

J. In certain embodiments, for example, at least a portion of the validating (for example all of the validating) may be performed by the first middleware. In certain further embodiments, for example, validating may comprise the first middleware inspecting a connection state of the network tunnel (for example checking a port state of an endpoint of the network tunnel such as a network tunnel endpoint present on the first node). In certain embodiments, for example, validating may comprise matching a 2-tuple comprising the first port number and an application identifier with a predetermined, pre-authorized 2-tuple. In certain further embodiments, for example, the application identifier may comprise an application code and an application user code. In certain embodiments, for example, the application identifier and the application user code may be constructed based on a process status command (for example the "ps" command in Linux). In certain embodiments, for example, validating may comprise matching a 3-tuple comprising the first port number, an application identifier, and an application user with a predetermined, pre-authorized 3-tuple. In certain embodiments, for example, at least a portion of the validating (for example all of the validating) may be performed by a second middleware present on the second node, processor, or computing device. In certain embodiments, for example, a first portion of the validating may be performed by the first middleware and a second portion of the validating may be performed by the second middleware.

K. In certain embodiments, for example, validating may comprise the second middleware inspecting the metadata. In certain embodiments, for example, validating may comprise the second middleware inspecting the metadata to determine a connection state of the network tunnel. In certain embodiments, for example, validating may comprise the second middleware inspecting the metadata to verify the first application is authorized. In certain embodiments, for example, validating may comprise the second middleware inspecting the metadata to verify a user of the first application is an authorized user of the first application. In certain embodiments, for example, validating may comprise the second middleware inspecting the metadata to verify a data protocol of the data is an authorized data protocol. In certain embodiments, for example, validating may comprise the second middleware inspecting the metadata to verify a descriptor comprising at least a portion of the user of the first application, at least a portion of the first application, and at least a portion of the data protocol matches a pre-stored, pre-authorized value for the descriptor.

L. In certain further embodiments, for example, the pre-stored, pre-authorized value may be selected based on (for example the pre-stored, pre-authorized value may be indexed by) at least one port number associated with the first application. In certain further embodiments, for example, the pre-stored, pre-authorized value may be selected based on at least one port number associated with the second application. In certain further embodiments, for example, the pre-stored, pre-authorized value may be selected based on at least one port number associated with the first middleware. In certain further embodiments, for example, the pre-stored, pre-authorized value may be selected based on at least one port number associated with the second middleware (for example the port number may be associated with the second middleware and may be an endpoint of the network tunnel).

M. In certain embodiments, for example, the initializing the network tunnel may comprise obtaining the predetermined, pre-authorized 2-tuple. In certain embodiments, for example, the initializing the network tunnel may comprise obtaining the predetermined, pre-authorized 3-tuple.

N. In certain embodiments, for example, the validating may comprise the first middleware verifying (for example verifying in a kernel of the first node) that data sent from the first application is permitted to pass through a first port identified by a first port number (for example wherein the first port number is a port number associated with the first middleware). In certain further embodiments, for example, the validating may comprise a second middleware present on the second node parsing metadata present in the network packet to obtain a descriptor comprising a first application component, a first application user component, and a data protocol component. In certain further embodiments, for example, the validating may comprise the second middleware looking up a predetermined value based on a destination port number of the network packet. In certain further embodiments, for example, the validating may comprise comparing the obtained descriptor with the looked-up, predetermined value. In certain embodiments, for example, at least a portion of the testing (for example all of the testing) may be performed by a second middleware present on the second node, processor, or computing device. In certain embodiments, for example, a first portion of the testing may be performed by the first middleware and a second portion of the testing may be performed by the second middleware. In certain embodiments, for example, the testing may comprise the second middleware inspecting metadata of the network packet. In certain further embodiments, for example, the testing may comprise the second middleware parsing the metadata to obtain a connection state indicator of the network tunnel. In certain embodiments, for example, the testing may comprise the second middleware comparing a destination port number of the network packet with a predetermined, pre-authorized destination port number.

O. In certain embodiments, for example, the testing may comprise testing, by at least a portion of a second middleware present on the second node (for example at least a portion of a middleware executing in a kernel of the second node), whether a destination port of the network packet matches an open, pre-authenticated second port number. In certain embodiments, for example, the open, pre-authenticated second port number may be pre-authenticated during the initialization of the tunnel network based on (a) being associated with the second middleware; (b) appearing in a record present on the second node, the record comprising the second application, a user of the second application, and a port number associated with the second application and the user of the second application; and (c) an open connection comprising the port number associated with the second application and the user of the second application.

P. In certain embodiments, for example, the method may further comprise: communicating the data from a second middleware present on the second node to the second application.

Q. In certain embodiments, for example, the mutual authentication and authorization of the first node and the second node may be independent of initializing the network tunnel. In certain embodiments, for example, the mutual authentication and authorization of the first node and the second node may occur after the network tunnel is initialized. In certain embodiments, for example, the network tunnel may be encrypted based on executing an encryption algorithm (for example encrypted based on executing a key exchange algorithm) and the mutual authentication and authorization of the first node and the second node may be performed separately from the executing the encryption algorithm (for example may be performed after the executing the encryption algorithm). In certain embodiments, for example, the mutual authentication and authorization of the first node and the second node may comprise encrypting a first node identification code using a cryptographic key derived from the executing the key exchange algorithm. In certain further embodiments, for example, the cryptographic key may be nonpublic (for example the cryptographic key may be a shared secret between the first middleware and a second middleware executing on the second node). In certain embodiments, for example, the mutual authentication and authorization of the first node and the second node may comprise: (a) encrypting a first node identification code using a first cryptographic key derived from the executing the key exchange algorithm, and (b) encrypting a second node identification code using a second cryptographic key (for example a second cryptographic key that is different from the first cryptographic key) derived from the executing the key exchange algorithm. In certain further embodiments, for example, the cryptographic key may be nonpublic (for example the first cryptographic key and the second cryptographic key may each be a shared secret between the first middleware and a second middleware executing on the second node).

Certain embodiments may provide, for example, a method for authorized network communication, comprising: i) detecting a request by a first application present on a first node to transmit data to a second application present on a second node; ii) validating the authority of the first application to transmit the data, the validating based at least on a predetermined port number of the first application; iii) passing the data from the first application to a first middleware on the first node; iv) transmitting a network packet containing the data through a network tunnel, the network tunnel extending from the first middleware to a second middleware present on the second node, the network tunnel initialized based on the detected request, the initialization based at least on mutual authentication and authorization of the first node and the second node; and v) testing the authority of the second application to receive the data, the testing based at least on a predetermined port number of the second application and a data protocol of the data.

Certain embodiments may provide, for example, a method for authorized network communication. In certain embodiments, for example, the method may comprise detecting a request by a first application process on a first node to establish a connection for transmitting data having a data type to a second application process at a destination port number. In certain embodiments, for example, the method may comprise validating the authority of the first application process to transmit the data at least by checking a preconfigured list present on the first node for a combination of a first application process identifier and the destination port number. In certain embodiments, for example, the method may comprise passing the data from the first application process to a first middleware process on the first node, processor, or computing device. In certain embodiments, for example, the method may comprise establishing a dedicated encrypted communication pathway for transmitting data having the data type between the first application process and the second application process, the dedicated encrypted communication pathway extending from the first middleware process to a second middleware process on the second node, by mutual authentication and authorization of the first node and/or the second node, the first application process and/or the second application process, a first application process owner and/or a second application process owner, and/or a data protocol of the data.

A. In certain embodiments, for example, the data may be passed from the first application process to the first middleware process by a TCP connection. In certain embodiments, for example, the encrypted communication pathway may comprise a UDP connection. In certain embodiments, for example, the data may be passed from the first application process to the first middleware process by a TCP connection and the encrypted communication pathway may comprise a UDP connection. In certain embodiments, for example, the data may be passed from the second application process to the second middleware process by a further TCP connection. In certain embodiments, for example, the data may be passed from the first application process to the first middleware process by a TCP connection, the encrypted communication pathway may comprise a UDP connection, and the data may be passed from the second application process to the second middleware process by a further TCP connection.

Certain embodiments may provide, for example, a method for authorized network communication, comprising: i) detecting a request by a first application process on a first node to establish a connection for transmitting data having a data type to a second application process at a destination port number; ii) validating the authority of the first application process to transmit the data at least by checking a preconfigured list present on the first node for a combination of a first application process identifier and the destination port number; iii) passing the data from the first application process to a first middleware process on the first node; iv) establishing a dedicated encrypted communication pathway for transmitting data having the data type between the first application process and the second application process, the dedicated encrypted communication pathway extending from the first middleware process to a second middleware process on the second node, by mutual authentication and authorization of the first node and/or the second node, the first application process and/or the second application process, a first application process owner and/or a second application process owner, and/or a data protocol of the data.

Certain embodiments may provide, for example, plural nodes coupled to a network, wherein each data transfer between a first node of the plural nodes and a second node (for example each second node) of the plural nodes may be according to one of the foregoing methods for authorized communication. In certain further embodiments, for example, the plural nodes coupled to the network may define a software-defined network (for example plural virtual router switches cooperatively configured with one another).

Certain embodiments may provide, for example, a method to securely transport plural data packets (for example plural IP packets), comprising: configuring a data pathway from a first application (for example an application program) executing on a first node to a second application executing on a second node, and exchanging node identification codes over at least a portion of the data pathway to at least partially authorize the at least a portion of the data pathway. In certain further embodiments, for example, the method may comprise, for each one of the transported plural packets from the first application: executing operating system commands to verify that the at least partially authorized at least a portion of the data pathway remains unaltered; reading first application user and data protocol metadata to obtain at least one descriptor (for example at one 4-byte or 8-type descriptor); and comparing the at least one descriptor with members of a static list (for example a predetermined white list of authorized descriptors).

A. In certain embodiments, for example, the data pathway may transport packets exclusively between endpoints defined by the first application and the second application (for example a port associated with the first application and a port associated with the second application). In certain further embodiments, for example, the authorized at least a portion of the data pathway may transport packets exclusively on the data pathway.

B. In certain embodiments, for example, the at least a portion of the data pathway may be encrypted based on executing an encryption algorithm (for example encrypted based on executing a key exchange algorithm) and the exchanging node identification codes may be performed separately from the executing the encryption algorithm (for example may be performed after the executing the encryption algorithm). In certain embodiments, for example, the exchanging node identification codes may comprise encrypting a first node identification code using a cryptographic key derived from the executing the key exchange algorithm. In certain further embodiments, for example, the cryptographic key may be nonpublic (for example the cryptographic key may be a shared secret between the first middleware and a second middleware executing on the second node). In certain embodiments, for example, the exchanging node identification codes may comprise: (a) encrypting a first node identification code using a first cryptographic key derived from the executing the key exchange algorithm, and (b) encrypting a second node identification code using a second cryptographic key (for example a second cryptographic key that is different from the first cryptographic key) derived from the executing the key exchange algorithm. In certain further embodiments, for example, at least one of the node identification codes may be nonpublic (for example the first node identification code and the second node identification code may each be a shared secret between a network security software executing on the first node and a network security software executing on the second node).

C. In certain embodiments, for example, the method may comprise decrypting the first application user and data protocol metadata prior to the reading.

D. In certain embodiments, for example, the at least one descriptor may be an n-tuple, wherein n may be at least 2 (for example a 2-tuple). In certain embodiments, for example, the n-tuple may be an at least a 2-tuple, an at least a 3-tuple, an at least a 5-tuple, an at least a 6-tuple, an at least an 8-tuple, an at least a 10-tuple, or an at least a 12-tuple.

E. In certain embodiments, for example, the static list may be present on the second node, processor, or computing device. In certain embodiments, for example, the comparing may be performed on the second node, processor, or computing device.

F. In certain embodiments, for example, the executing operating system commands may verify that a packet originated from an authenticated, authorized process on the first node, processor, or computing device. In certain further embodiments, for example, the verifying may comprise inspecting packet metadata to confirm that a packet originated from an authorized user on the first node, processor, or computing device.

G. In certain embodiments, for example, the executing operating system commands may comprise checking a connection state of the at least partially authorized at least a portion of the data pathway. In certain further embodiments, for example, said checking may comprise parsing packet metadata. In certain further embodiments, for example, said checking may comprise comparing the parsed metadata to members of a list of connections. In certain further embodiments, for example, each member of the list of connections may comprise a connection status indicator. In certain embodiments, for example, one or more members of the list of connections may comprise a disallowed flag indicating, when the disallowed flag is set to a predetermined value, that the at least partially authorized at least a portion of the data pathway is disallowed. In certain further embodiments, for example, the method may comprise terminating the at least partially authorized at least a portion of the data pathway if the checking the connection status, based on detecting the disallowed flag, determines that the at least partially authorized at least a portion of the data pathway is disallowed. In certain embodiments, for example, the connection status of a member of the list of connections may be updated at least based on the parsed metadata. In certain further embodiments, for example, a disallowed flag of a member of the list of connections may be set at least based on the parsed metadata.

H. In certain embodiments, for example, the method may further comprise, for each one of the transported plural packets from the first application: comparing a destination port number with a white list of authorized destination port numbers.

Certain embodiments may provide, for example, a method to securely transport plural data packets, comprising: i) configuring a data pathway from a first application executing on a first node to a second application executing on a second node; ii) exchanging node identification codes over at least a portion of the data pathway to at least partially authorize the at least a portion of the data pathway; and iii) for each one of the transported plural packets from the first application: a) executing operating system commands to verify that the at least partially authorized at least a portion of the data pathway remains unaltered; b) reading first application user and data protocol metadata to obtain at least one descriptor; and c) comparing the at least one descriptor with a static list of authorized descriptors.

Certain embodiments may provide, for example, a multifactor method having overlapping security layers to securely transport plural data packets from a first application executing on a first node to a second application executing on a second node, processor, or computing device. In certain embodiments, for example, each one of the plural data packets may share a common data protocol with each other one of the plural data packets. In certain further embodiments, for example, the method may comprise: configuring a series of dedicated network tunnels, and exchanging and authorizing node identification codes over the encrypted second middleware tunnel using at least two single-use cryptographic keys to authorize the second network tunnel independently of the configuring. In certain further embodiments, for example, the series of network tunnels may comprise: a first network tunnel between a first application port associated with the first application and a first security middleware port associated with first security middleware on the first node, a second network tunnel between the first security middleware port and a second security middleware port associated with second security middleware on the second node, the second network tunnel encrypted based on shared secret cryptography, and a third network tunnel between the second security middleware port and a second application port associated with a second application on the second node, processor, or computing device. In certain further embodiments, for example, the method may comprise, for each one of the transported plural data packets arriving at the second security middleware port: executing operating system commands to verify that connection states of the series of dedicated network tunnels are unchanged, encrypting, inserting, decrypting, and reading first application user and data protocol metadata, the encrypting and decrypting each using a single-use cryptographic key, and comparing the first application user and data protocol metadata with members of a static list (for example a static list of authorized 2-tuples).

Certain embodiments may provide, for example, a multifactor method having overlapping security layers to securely transport plural data packets from a first application executing on a first node to a second application executing on a second node, each one of the plural data packets sharing a common data protocol with each other one of the plural data packets, comprising: i) configuring a series of dedicated network tunnels comprising: a) a first network tunnel between a first application port associated with the first application and a first security middleware port associated with first security middleware on the first node; b) a second network tunnel between the first security middleware port and a second security middleware port associated with second security middleware on the second node, the second network tunnel encrypted based on shared secret cryptography; and c) a third network tunnel between the second security middleware port and a second application port associated with a second application on the second node; ii) exchanging and authorizing node identification codes over the encrypted second middleware tunnel using at least two single-use cryptographic keys to authorize the second network tunnel independently of the configuring; and for each one of the transported plural data packets arriving at the second security middleware port: iii) executing operating system commands to verify that connection states of the series of dedicated network tunnels are unchanged; iv) encrypting, inserting, decrypting, and reading first application user and data protocol metadata, the encrypting and decrypting each using a single-use cryptographic key; and v) comparing the first application user and data protocol metadata with members of a static list.

Certain embodiments may provide, for example, a method to provision resources for authorized communication over a network, comprising: detecting an attempt by a first user of a first program to trigger a transmission of data from a first port on a first node to a second port on a second node, filtering the attempt to determine whether the attempt is permissible, and if the attempt is permissible, configuring a data pathway for transmitting the data, the data pathway comprising a third port and a fourth port each interposed between the first port and the second port. In certain further embodiments, for example, the filtering may be based at least on: identity of the first user, identity of the first program, and the second port.

A. In certain embodiments, for example, the attempt may comprise a connection request (for example a connection request initiated at a network application programming interface).

B. In certain embodiments, for example, the configuring may further comprise recording a connection state of at least a portion of the data pathway. In certain embodiments, for example, the configuring may further comprise recording a connection state of at least a portion of the data pathway having the third port and the fourth port as endpoints. In certain embodiments, for example, the configuring may further comprise recording a connection state of the data pathway.

C. In certain embodiments, for example, the determining may comprise comparing the attempt to a list of permissible attempts.

D. In certain embodiments, for example, at least a portion of the list of permissible attempts may be maintained on the first node solely in kernel random access memory. In certain further embodiments, for example, the at least a portion of the list of permissible attempts may comprise a list of data destination ports and, for each member of the list of destination ports, a user (for example a user of an application associated with the destination port). In certain further embodiments, for example, the at least a portion of the list of permissible attempts may comprise an application program. In certain embodiments, for example, the at least a portion of the list of permissible attempts may be accessible solely by a singular program executing in the kernel. In certain further embodiments, for example, the at least a portion of the list of permissible attempts may be loaded into the kernel random access memory of the first node from a file (for example a file resident on a non-transitory computer-readable storage medium (for example a nonvolatile memory) of the first node) solely by a different singular program.

E. In certain embodiments, for example, the file may be cryptographically signed. In certain embodiments, for example, the file may be encrypted. In certain embodiments, for example, the file may be read-only. In certain embodiments, for example, the file may be a kernel access-only file. In certain embodiments, for example, the file may be a kernel access-only file. In certain embodiments, for example, the file may not be a kernel access-only file. In certain embodiments, for example, the file may be a binary file. In certain embodiments, for example, the file may be accessible from the first node solely be a single program (for example a program executing in an OSI application layer of the first node) executing on a processor of the first node, processor, or computing device. In certain embodiments, for example, the file may be a read-only, encrypted file readable only by a single program executing on a processor of the first node, processor, or computing device.

F. In certain embodiments, for example, the first port, second port, third port, and fourth port may each be restricted to establishing no more than a single data communications session. In certain embodiments, for example, the data may pass through each port.

G. In certain embodiments, for example, the first port may be exclusively associated with a first user mode program. In certain embodiments, for example, the first port may be exclusively associated with a first application program. In certain embodiments, for example, the second port may be exclusively associated with a second user mode program. In certain embodiments, for example, the second port may be exclusively associated with a second application program. In certain embodiments, for example, the first port may be exclusively associated with a first user mode program and the second port may be exclusively associated with a second application program. In certain embodiments, for example, the first port may be exclusively associated with a first user mode program. In certain embodiments, for example, the first port may be exclusively associated with a first user mode program. In certain embodiments, for example, the second port may be exclusively associated with a second user mode program. In certain embodiments, for example, the second port may be exclusively associated with a second user mode program. In certain embodiments, for example, the first port may be exclusively associated with a first user mode program and the second port may be exclusively associated with a second user mode program.

H. In certain embodiments, for example, the data may be translated into a common format (for example a format based on MQ Telemetry Transport protocol) for transport between the third and fourth port.

Certain embodiments may provide, for example, a method of transmitting non-malicious packets of data over a network, comprising: loading data packet filters into random access memory on a first node coupled to the network, initializing a network tunnel (and/or an encrypted communication pathway) to transmit the data, assigning one of the loaded data packet filters to the network tunnel (and/or the encrypted communication pathway), passing packets of data from the transmitting application through the assigned data packet filter, encrypting at least a portion of the filtered packets, and transmitting through the network tunnel (and/or the encrypted communication pathway) only the filtered packets having at least a destination port number, a data source application, and a user of the data source application matching the assigned data packet filter.

A. In certain embodiments, for example, the data packet filter may further comprise a destination network address. In certain embodiments, for example, an encryption key used in the encrypting may be used only once. In certain embodiments, for example, initializing the network tunnel (and/or the encrypted communication pathway) may comprise shared secret cryptography. In certain embodiments, for example, the network tunnel (and/or the encrypted communication pathway) may be unidirectional. In certain embodiments, for example, the network tunnel (and/or the encrypted communication pathway) may be bidirectional. In certain embodiments, for example, each one of the data packet filters may comprise a sequential series of sub-filters.

Certain embodiments may provide, for example, a method of transmitting non-malicious packets of data over a network, comprising: loading data packet filters into random access memory on a first node coupled to the network, initializing a network tunnel (and/or an encrypted communication pathway) to receive the data, assigning one of the loaded data packet filters to the network tunnel (and/or the encrypted communication pathway), receiving packets of data from the network tunnel (and/or the encrypted communication pathway), passing the packets of data through the assigned data packet filter, and passing to an OSI application layer of the first node only the filtered packets having at least a destination port number, a data source application, a user of the data source application, and a data protocol descriptor matching the assigned data packet filter.

A. In certain embodiments, for example, filtered packets passed to the OSI application layer further may have a command type descriptor having a value and/or falling in a range specified by the assigned data packet filter. In certain embodiments, for example, filtered packets passed to the OSI application layer may further have a date and/or time falling in a range specified by the assigned data packet filter. In certain embodiments, for example, filtered packets passed to the OSI application layer further may have an expected elapse time falling in a range specified by the assigned data packet filter. In certain embodiments, for example, the data protocol descriptor may conform to an MQ Telemetry Transport protocol. In certain embodiments, for example, the data protocol descriptor may conform to a file transfer protocol. In certain embodiments, for example, the data protocol descriptor may conform to a domain name server protocol. In certain embodiments, for example, the data protocol descriptor may conform to an internet control message protocol. In certain embodiments, for example, the data protocol descriptor may conform to a structured query language protocol. In certain embodiments, for example, the data protocol descriptor may conform to a publish-subscribe messaging pattern protocol. In certain embodiments, for example, the data protocol descriptor may conform to a data distribution service protocol. In certain embodiments, for example, the data protocol descriptor may comprise a publish-subscribe topic identifier. In certain embodiments, for example, the data protocol descriptor may comprise a data structure identifier. In certain embodiments, for example, the data protocol descriptor may comprise a data type identifier. In certain embodiments, for example, the data protocol descriptor may comprise a data definition identifier.

Certain embodiments may comprise, for example, a method of transmitting non-malicious packets of data over a network. In certain embodiments, for example, the method may comprise: loading data packet filters into kernel random access memory (or in certain other embodiments, for example, loading the data packet filters in application space memory) on a first node coupled to the network, initializing a network tunnel (and/or an encrypted communication pathway) to transmit the data, assigning one of the loaded data packet filters to the network tunnel (and/or the encrypted communication pathway), passing packets of data from the transmitting application through the assigned data packet filter, encrypting at least a portion of the filtered packets, and transmitting through the network tunnel (and/or encrypted communication pathway) only the filtered packets having at least an application port number, an encrypted port number, a data protocol field, and a destination port number matching the assigned data packet filter.

A. In certain embodiments, for example, the data may be application program data. In certain embodiments, for example, the data may be a file or a portion thereof (for example an executable file). In certain embodiments, for example, an encryption key used in the encrypting may be a single-use key. In certain embodiments, for example, the encryption key may be used only once. In certain embodiments, for example, initializing the network tunnel (and/or the encrypted communication pathway) may comprise shared secret cryptography. In certain embodiments, for example, the network tunnel (and/or the encrypted communication pathway) may be unidirectional. In certain embodiments, for example, the network tunnel (and/or the encrypted communication pathway) may be bidirectional. In certain embodiments, for example, each one of the data packet filters may comprise a sequential series of sub-filters. In certain embodiments, for example, the method may further comprise: transmitting to the network only the filtered packets containing a parameter specifying a file size of a file, wherein the file size falls in a range specified by the assigned data packet filter. In certain embodiments, for example, the method may further comprise: transmitting to the network only the filtered packets containing a parameter specifying a command type, wherein the command type has a value and/or falls in a range specified by the assigned data packet filter. In certain embodiments, for example, the method may further comprise: transmitting to the network only the filtered packets containing a parameter specifying a date and/or time, wherein the specified data and/or time falls in a range specified by the assigned data packet filter. In certain embodiments, for example, the method may further comprise: transmitting to the network only the filtered packets containing a parameter specifying a an expected elapsed time, wherein the expected elapsed time falls in a range specified by the assigned data packet filter. In certain further embodiments, for example, the method may further comprise: transmitting to the network only the filtered packets having an actual and/or estimated transmission time falling in a range specified by the assigned data packet filter.

B. In certain embodiments, for example, the data protocol field may identify an MQTT protocol. In certain embodiments, for example, the data protocol field may conform to a publish-subscribe messaging pattern protocol (for example a data distribution service (DDS) protocol). In certain embodiments, for example, the data protocol field may identify a Constrained Application Protocol (CaOP). In certain embodiments, for example, the data protocol field may identify an OMA LightweightM2M (LWM2M) protocol. In certain embodiments, for example, the data protocol field may identify a JavaScript Object Notation (JSON) protocol. In certain embodiments, for example, the data protocol field may identify a Representational State Transfer (REST) protocol. In certain embodiments, for example, the data protocol field may identify an OPC Unified Architecture (OPC-UA) protocol. In certain embodiments, for example, the data protocol field may identify a file transfer protocol. In certain embodiments, for example, the data protocol field may identify a domain name server protocol. In certain embodiments, for example, the data protocol field may identify an internet control message protocol. In certain embodiments, for example, the data protocol field may identify a structured query language protocol. In certain embodiments, for example, the data protocol field may comprise a publish-subscribe topic identifier. In certain embodiments, for example, the data protocol field may comprise a data structure identifier. In certain embodiments, for example, the data protocol field may comprise a data type identifier. In certain embodiments, for example, the data protocol field may comprise a data definition identifier.

Certain embodiments may provide, for example, a network security product for managing all port-to-port communications of a networked processor node, processor, or computing device. In certain embodiments, for example, the product may comprise a non-transitory computer-readable storage medium having a configuration file embodied therein for processing in the networked processor node by network security software to define authorized port-to-port communications. In certain embodiments, for example, the configuration file may comprise a universal nonpublic identifier for the networked processor node, processor, or computing device. In certain further embodiments, for example, the configuration file may comprise a series of records comprising parameters for authorized port-to-port communications. In certain embodiments, for example, each of one or more of (for example each of) the series of records may comprise an identifier for an authorized application resident on the networked processor node, processor, or computing device. In certain embodiments, for example, each of one or more of (for example each of) the series of records may comprise an identifier for an authorized user associated with the authorized application resident on the networked processor node, processor, or computing device. In certain embodiments, for example, each of one or more of (for example each of) the series of records may comprise a universal nonpublic identifier for a remote networked processor node, processor, or computing device. In certain embodiments, for example, each of one or more of (for example each of) the series of records may comprise an identifier for an authorized application resident on the remote networked processor node, processor, or computing device. In certain embodiments, for example, each of one or more of (for example each of) the series of records may comprise an identifier for an authorized user associated with the authorized application resident on the remote networked processor node, processor, or computing device. In certain embodiments, for example, each of one or more of (for example each of) the series of records may comprise a port associated with the authorized application resident on the remote networked processor node, processor, or computing device. In certain embodiments, for example, each of one or more of (for example each of) the series of records may comprise a port associated with a network security software resident on the remote networked processor node, processor, or computing device. In certain embodiments, for example, each of one or more of (for example each of) the series of records may comprise a data protocol descriptor.

Certain embodiments may provide, for example, a network security product for managing all port-to-port communications of a networked processor node, processor, or computing device. In certain embodiments, for example, the product may comprise a non-transitory computer-readable storage medium having a configuration file embodied therein for processing in the networked processor node by network security software to define authorized port-to-port communications. In certain embodiments, for example, the configuration file may comprise a universal nonpublic identifier for the networked processor node, processor, or computing device. In certain further embodiments, for example, the configuration file may comprise a series of records comprising parameters for authorized port-to-port communications. In certain embodiments, for example, each of one or more of (for example each of) the series of records may comprise an identifier for an authorized application resident on the networked processor node, an identifier for an authorized user associated with the authorized application resident on the networked processor node, a universal nonpublic identifier for a remote networked processor node, an identifier for an authorized application resident on the remote networked processor node, an identifier for an authorized user associated with the authorized application resident on the remote networked processor node, and a data protocol descriptor. In certain further embodiments, for example, each of one or more of (for example each of) the series of records may comprise a port associated with the authorized application resident on the remote networked processor node, processor, or computing device. In certain embodiments, for example, each of one or more of (for example each of) the series of records may comprise a port associated with a network security software resident on the remote networked processor node, processor, or computing device.

Certain embodiments may provide, for example, a network security product for managing all port-to-port communications of a networked processor node, the product comprising a non-transitory computer-readable storage medium having a configuration file embodied therein for processing in the networked processor node by network security software to define authorized port-to-port communications, the configuration file comprising: i) a universal nonpublic identifier for the networked processor node; and ii) a series of records comprising parameters for authorized port-to-port communications, each of the series of records comprising at least two of the following: a) an identifier for an authorized application resident on the networked processor node; b) an identifier for an authorized user associated with the authorized application resident on the networked processor node; c) a universal nonpublic identifier for a remote networked processor node; d) an identifier for an authorized application resident on the remote networked processor node; e) an identifier for an authorized user associated with the authorized application resident on the remote networked processor node; f) optionally, a port associated with the authorized application resident on the remote networked processor node; g) optionally, a port associated with a network security software resident on the remote networked processor node; and h) optionally, a data protocol descriptor.

Certain embodiments may provide, for example, a distributed system. In certain embodiments, for example, the distributed system may comprise: plural security programs resident on computer-readable storage media of plural networked nodes, the plural security programs cooperatively configured to negotiate dedicated data pathways for port-to-port communications between the plural networked nodes. In certain embodiments, for example, the negotiating may comprise, on a first node, negotiating a first data pathway between a first user-application and a first network security program of the plural security programs. In certain embodiments, for example, the negotiating may comprise, on a second node, negotiating a second data pathway between a second network security program of the plural security programs and a second user-application. In certain embodiments, for example, the negotiating may comprise negotiating a third data pathway between the first network security program and the second network security program, the third data pathway comprising a network tunnel and/or an encrypted communication pathway. In certain embodiments, for example, each of the first data pathway, second data pathway, and third data pathway participate to form at least a part of a dedicated data pathway for exclusively communicating data from a first port of the first user-application to a second port of the second user-application.

A. In certain embodiments, for example, the first data pathway and/or the second data pathway may comprise a TCP connection. In certain embodiments, for example, the third data pathway may comprise a UDP connection. In certain embodiments, for example, the first data pathway and/or the second data pathway may comprise a TCP connection, and the third data pathway may comprise a UDP connection.

Certain embodiments may provide, for example, a distributed system comprising: plural security programs resident on computer-readable storage media of plural networked nodes, the plural security programs cooperatively configured to negotiate dedicated data pathways for port-to-port communications between the plural networked nodes, the negotiating comprising: i) on a first node, negotiating a first data pathway between a first user-application and a first network security program of the plural security programs; ii) on a second node, negotiating a second data pathway between a second network security program of the plural security programs and a second user-application; and iii) negotiating a third data pathway between the first network security program and the second network security program, the third data pathway comprising a network tunnel and/or an encrypted communication pathway, each of the first data pathway, second data pathway, and third data pathway participate to form at least a part of a dedicated data pathway for exclusively communicating data from a first port of the first user-application to a second port of the second user-application.

Certain embodiments may provide, for example, a method of securing a node connected to the internet, comprising: authorizing incoming packets by comparing metadata from the packets to a list of authorized packet sources, applications, and payload protocols, and allowing only payloads from authorized packets to pass to an OSI application layer of the node, processor, or computing device. In certain further embodiments, for example, the method may be performed at a rate of at least 95% of wire speed and at most 10% processor load.

Certain embodiments may provide, for example, a method of securing a node (for example a computing device) connected to the internet. In certain embodiments, for example, the method may comprise: authorizing incoming IP packets at wire speed, allowing only payloads from authorized incoming IP packets to pass to an OSI application layer of the node, authorizing outgoing packets, allowing only authorized outgoing packets to pass to the internet. In certain further embodiments, for example, the method may be performed at a rate of at least 95% of wire speed and at most 10% processor load. In certain further embodiments, for example, the authorizing the incoming packets may comprise comparing metadata from the incoming packets to a list of authorized packet sources, applications, and payload protocols. In certain embodiments, for example, the authorizing the outgoing packets may comprise processing a list of authorized sending applications, the list containing, for each sending application present on the list of authorized sending applications, a port associated with the sending application.

A. In certain embodiments, for example, one of the foregoing methods to secure may induce a processor load of less than 5% according to the Load Benchmark Test.

B. In certain embodiments, for example, one of the foregoing methods to secure may slow network packet processing by less than 2 ms according to the Speed Benchmark Test. In certain embodiments, for example, one of the foregoing methods to secure may process at least 50,000 packets per second according to the Packet Processing Benchmark Test. In certain embodiments, for example, one of the foregoing methods to secure may prevent the secure node from establishing data communications sessions if greater than 90% of random access memory is utilized. In certain embodiments, for example, one of the foregoing methods to secure may be further configured to terminate all secure node data communications sessions if greater than 99% of random access memory is utilized. In certain embodiments, for example, the metadata may be obtained from a predetermined portion of each packet. In certain embodiments, for example, the rate and processor load of one of the foregoing methods to secure may be measured based on an Ethernet port having at least a 1 Gigabit (Gb) bandwidth (for example a 10 Gb bandwidth) and having less than 10% overhead. In certain embodiments, for example, the processor load may be based on a 1 GHz ARM9 processor running Microlinux.

Certain embodiments may provide, for example, a method of securing a computing device connected to the internet, comprising: i) authorizing incoming packets, at wire speed, by comparing metadata from the incoming packets to a list of authorized packet sources, applications, and payload protocols; ii) allowing only payloads from authorized incoming packets to pass to the OSI application layer of the node; iii) authorizing outgoing packets, based on a list of authorized source ports and sending applications; and iv) allowing only authorized outgoing packets to pass to the internet, at a rate of at least 95% of wire speed and at most 10% processor load.

Certain embodiments may provide, for example, a secure node comprising a processor, random access memory, and network security software, the network security software configured to: match, in a kernel of the secure node (or, in certain other embodiments, for example, an application space of the secure node), a destination port number of each incoming network packet to a member of a list of authorized destination ports, decrypt metadata from each incoming network packet, and compare the decrypted metadata to a list of authorized n-tuples (for example at least 2-tuples, an at least 3-tuples, at least 5-tuples, at least 6-tuples, at least 8-tuples, at least 10-tuples, or at least 12-tuples), each n-tuples in the list of authorized n-tuples comprising descriptors for: a packet payload source application and a payload protocol. In certain further embodiments, for example, the matching, decrypting, and comparing may be performed at a rate of at least 95% of wire speed and at most 10% processor load based on a 1 Gb Ethernet port having less than 10% overhead.

A. In certain embodiments, for example, the network security software may induce a processor load of less than 5% according to the Load Benchmark Test. In certain embodiments, for example, the network security software may slow network packet processing by less than 2 ms according to the Speed Benchmark Test. In certain embodiments, for example, the node may process at least 50,000 packets per second according to the Packet Processing Benchmark Test. In certain embodiments, for example, the network security software may be further configured to prevent the secure node from establishing data communications sessions if greater than 90% of random access memory is utilized. In certain embodiments, for example, the network security software may be further configured to terminate all secure node data communications sessions if greater than 99% of random access memory is utilized. In certain embodiments, for example, packet payload source application descriptor may comprise an application identifier and a user identifier. In certain embodiments, for example, the metadata may be obtained from a predetermined portion of each packet.

B. In certain embodiments, for example, the processor load may be based on an Ethernet port having at least a 1 Gigabit (Gb) bandwidth (for example a 10 Gb bandwidth) and having less than 10% overhead. In certain embodiments, for example, the processor load may be based on a 1 GHz ARM9 processor running Microlinux. In certain embodiments, for example, the metadata may be decrypted using a symmetric decryption algorithm (for example 256-bit AES). In certain further embodiments, for example, the decrypting may comprise using a cryptographic key (for example a cryptographic key derived from Elliptic-Curve Diffie-Hellman (ECDH) key exchange. In certain further embodiments, for example, the key may be a single-use key. In certain embodiments, for example, the key may be a rotated key.

C. In certain embodiments, for example, the network security software may be configured to drop (or discard) an incoming network packet if a destination port number of the network packet is not present on the list of authorized destination ports.

D. In certain further embodiments, for example, the matching may further comprise checking a connection state associated with the destination port number. In certain embodiments, for example, the network security software may be configured to drop an incoming network packet based on a status of a connection state associated with a destination port of the network packet (for example if the connection state is not open).

E. In certain embodiments, for example, the decrypting and comparing may be performed in an OSI application layer of the secure node, processor, or computing device.

F. In certain embodiments, for example, the list of sending applications and authorized ports may comprise a security middleware application having a root user and a port associated with the security middleware application. In certain embodiments, for example, the list of sending applications and authorized ports may comprise an application program and a port associated with the application program.

Certain embodiments may provide, for example, a node preconfigured to constrain communication over a network, comprising: a file stored on non-transitory computer-readable storage medium, the file defining a list of authorized data communications sessions, each record of the file comprising. In certain further embodiments, for example, each record of the file may further comprise: a) a universal identifier for a data source, comprising an authorized source application identifier and an identifier for an authorized user of the source application; b) a universal identifier for a data destination, comprising an authorized destination application identifier and an identifier for an authorized user of the destination application; c) a port associated with the destination application; d) a different port associated with a middleware; and e) a data protocol field.

A. In certain embodiments, for example, the file may be a binary file. In certain embodiments, for example, the file may be a variable record length file. In certain embodiments, for example, the file may be encrypted on the non-transitory computer-readable storage medium. In certain embodiments, for example, the port associated with the destination application may communicate with the middleware by a loopback interface. In certain embodiments, for example, the different port associated with the middleware may be an endpoint of an encrypted tunnel-portion of an authorized data communications session of the authorized data communications sessions. In certain embodiments, for example, each record of the file may comprise a network interface controller code for a network interface controller present on the node, processor, or computing device. In certain further embodiments, for example, a network address of the network interface controller may be determined based at least in part on the network interface controller code. In certain embodiments, for example, each record of the file may further comprise a different network interface controller code for a network interface controller present on a remote node, processor, or computing device. In certain further embodiments, for example, a network address of the remote network interface controller may be determined based at least in part on the different network interface controller code. In certain embodiments, for example, each record of the file may comprise a nonpublic identification code for the node, processor, or computing device. In certain embodiments, for example, each record of the file may comprise a nonpublic identification code for a remote node, processor, or computing device.

B. In certain embodiments, for example, each record of the file may comprise a private key (or a cryptographic parameter or primitive). In certain further embodiments, for example, the private key may be used by a key exchange algorithm executing on a processor of the node to establish a shared key with a remote node, processor, or computing device. In certain embodiments, each record of the file has a different private key.

C. In certain embodiments, for example, a portion of the file may be read into kernel random access memory on boot-up of the node, processor, or computing device. In certain embodiments, for example, the file may be accessible only by a kernel of the node, processor, or computing device. In certain embodiments, for example, the file may be accessible only by a root user of the node, processor, or computing device. In certain embodiments, for example, the file may be accessible by an application program module executed by a root user.

Certain embodiments may provide, for example, a node preconfigured to constrain communication over a network, comprising: a file stored on non-transitory computer-readable storage medium, the file defining a list of authorized data communications sessions, each record of the file comprising: a) a universal identifier for a data source, comprising an authorized source application identifier and an identifier for an authorized user of the source application; b) a universal identifier for a data destination, comprising an authorized destination application identifier and an identifier for an authorized user of the destination application; c) a port associated with the destination application; d) a different port associated with a middleware; e) a data protocol field; f) a network interface controller code for a network interface controller present on the node; g) a different network interface controller code for a network interface controller present on a remote node; h) a nonpublic identification code for the node; i) a different nonpublic identification code for the remote node; and j) a private key provisioned for use by a key exchange algorithm executing on the node to establish a shared key with the remote node, processor, or computing device.

Certain embodiments may provide, for example, a node preconfigured to constrain communication over a network, comprising a file stored on non-transitory computer-readable storage medium, the file having a list of authorized data communications sessions. In certain further embodiments, for example, each member of the list may comprise: an index defined by an application authorized to be executed on the processor and an authorized user of the application, a unique 2-tuple consisting of a port number assigned to the application and a port number assigned to a network security middleware, a unique 2-tuple consisting of a port number assigned to a remote application and a port number assigned to a remote network security middleware, and a data protocol descriptor.

A. In certain embodiments, for example, the file may be read-only. In certain embodiments, for example, the file may be cryptographically signed. In certain embodiments, for example, the read-only file may be encrypted. In certain embodiments, for example, the read-only file may be a binary file. In certain embodiments, for example, one member of the list may have a different record length than another member of the list.

B. In certain embodiments, for example, the index of a member of the list may be derived from a concatenation of a user name (or a portion thereof) and an application name (or a portion thereof), or at least portions thereof.

C. In certain embodiments, for example, the port number assigned to the application may appear only once in the list. In certain embodiments, for example, the port number assigned to the network security middleware may appear only once in the list. In certain embodiments, for example, the port number assigned to a remote application appears only once in the list. In certain embodiments, for example, the port number assigned to the remote network security middleware appears only once in the list. In certain embodiments, for example, each of the port number assigned to the application, port number assigned to the network security middleware, port number assigned to a remote application, and the remote network security middleware may appear only once in the list. In certain embodiments, for example, the data protocol descriptor may appear in a plurality of members of the list.

Certain embodiments may provide, for example, a node preconfigured to constrain communication over a network, comprising: a processor, a non-transitory computer-readable storage medium, and a read-only file stored on the non-transitory computer-readable storage medium. In certain further embodiments, for example, the file may comprise plural n-tuples, the plural n-tuples defining an exclusive list of authorized data communications sessions. In certain further embodiments, for example, each one of the plural n-tuples may comprise: an index defined by an application authorized to be executed on the processor and an authorized user of the application, a unique 2-tuple consisting of a port number assigned to the application and a port number assigned to a network security middleware, a unique 2-tuple consisting of a port number assigned to a remote application and a port number assigned to a remote network security middleware, and a data protocol descriptor.

A. In certain embodiments, for example, the network security middleware may be stored on the non-transitory computer-readable storage medium.

B. In certain embodiments, for example, the remote application and the remote network security middleware may reside on a common remote node, processor, or computing device. In certain embodiments, for example, the remote application and the remote network security middleware may reside on separate remote nodes. In certain further embodiments, for example, the remote network security middleware may reside on a software-defined perimeter controller.

C. In certain embodiments, for example, the read-only file may be cryptographically signed. In certain embodiments, for example, the read-only file may be encrypted. In certain embodiments, for example, the read-only file may be a binary file. In certain embodiments, for example, one of the n-tuples may have a different record length than another one of the n-tuples.

D. In certain embodiments, for example, the node may further comprise: network security software stored on the non-transitory computer-readable storage medium different from the network security middleware, the different network security software having sole permission to read the file. In certain further embodiments, for example, the different network security software may be configured to be executed by the processor to load at least a portion of the file into the kernel random access memory. In certain embodiments, for example, the different network security software may be executed in an OSI application layer of the node, processor, or computing device. In certain embodiments, for example, the different network security software may be executed in a kernel of the node, processor, or computing device. In certain further embodiments, for example, the at least a portion of the file may be loaded solely upon boot-up of the node, processor, or computing device.

E. In certain embodiments, for example, the network security middleware may be configured to be executed by the processor to prevent initialization of any data communications session except for the list of authorized data communications sessions.

Certain embodiments may provide, for example, a node preconfigured to constrain communication over a network, comprising: i) a processor; ii) a non-transitory computer-readable storage medium; iii) a read-only file stored on the non-transitory computer-readable storage medium, the file comprising plural n-tuples, the plural n-tuples defining an exclusive list of authorized data communications sessions, each one of the plural n-tuples comprising: a) an index defined by an application authorized to be executed on the processor and an authorized user of the application; b) a unique 2-tuple consisting of a port number assigned to the application and a port number assigned to a network security middleware, the network security middleware stored on the non-transitory computer-readable storage medium; c) a unique 2-tuple consisting of a port number assigned to a remote application and a port number assigned to a remote network security middleware; and d) a data protocol descriptor.

Certain embodiments may provide, for example, a method to retrofit a computing device coupled to a network. In certain embodiments, for example, the method may comprise: storing an encrypted file on a non-transitory computer-readable storage medium of the computing device, installing network security software on the non-transitory computer-readable storage medium of the computing device, setting permissions of the file whereby the file is readable only by the network security software; and modifying a network stack resident on the computing device to receive or intercept each data packet incoming from or outgoing to the network. In certain further embodiments, for example, the file may comprise a list interpretable by the network security middleware to define authorized communication sessions and an authorized data protocol for each authorized communication session of the authorized communication sessions. In certain further embodiments, for example, the network security software may be configured to load at least a portion of the file into kernel random access memory upon boot-up of the computing device. In certain further embodiments, for example, the network stack may be modified to route each received or intercepted data packet through the network security middleware. In certain further embodiments, for example, the network security middleware may be configured to drop a received or an intercepted data packet unless the received or intercepted data packet is authorized to be transmitted using one of the authorized communication sessions.

A. In certain embodiments, for example, the method may be exclusive of any modification to a pre-existing application program. In certain embodiments, for example, the modifying a network stack may comprise modifying a network protocol application programming interface. In certain embodiments, for example, the method may further comprise: installing cryptographic primitives (for example cryptographic primitives provided by Secured Socket Layer (SSL) software) to enable a separate encrypted network tunnel to be established for each authorized communication session of the authorized communication sessions.

Certain embodiments may provide, for example, a method to retrofit a computing device coupled to a network, comprising: i) storing an encrypted file on a non-transitory computer-readable storage medium of the computing device, the file comprising a list interpretable by network security middleware executing on the computing device to define authorized communication sessions and an authorized data protocol for each authorized communication session of the authorized communication sessions; ii) installing the network security software on the non-transitory computer-readable storage medium of the computing device, the network security software configured to load at least a portion of the file into kernel random access memory (or, in certain other embodiments, for example, into application space memory) upon boot-up of the computing device; iii) setting permissions of the file whereby the file is readable only by the network security software; and iv) modifying a network stack resident on the computing device to: a) receive or intercept each data packet incoming from or outgoing to the network; and b) route each received or intercepted data packet through the executing network security middleware, the network security middleware configured to drop a received or an intercepted data packet unless it is authorized to be transmitted using one of the authorized communication sessions.

Certain embodiments may provide, for example, a secure system. In certain embodiments, for example, the secure system may comprise: a network configured to transmit data based on at least one network packet-based protocol, and plural nodes coupled to the network, each one of the plural nodes comprising a network stack, a network protocol application programming interface, and middleware. In certain further embodiments, for example, the network protocol application programming interface may be configured to pass each data packet received to the middleware. In certain further embodiments, for example, the middleware may be configured to verify, prior to sending data towards a destination port, that the data: has been generated by an authorized application, conforms to an authorized data protocol, has been received from an authorized node, contains at least one port number that is present on a predetermined list of port numbers.

A. In certain embodiments, for example, the middleware may obtain data from a data packet passing through the network stack. In certain embodiments, for example, the data packet may be encrypted. In certain embodiments, for example, the middleware may generate metadata, encrypt metadata, and insert metadata into a partially assembled network packet.

B. In certain embodiments, for example, the at least one network packet-based protocol may comprise Ethernet protocol. In certain embodiments, for example, the at least one network packet-based protocol may comprise Wi-Fi protocol. In certain embodiments, for example, the at least one network packet-based protocol may comprise Bluetooth protocol.

C. In certain embodiments, for example, the at least one port number may be associated with an application responsible for producing a data packet. In certain embodiments, for example, the at least one port number may be associated with source port (for example may be a source port) in a network packet header. In certain embodiments, for example, the at least one port number may be associated with a destination port (for example may be a destination port) in a network packet header.

Certain embodiments may provide, for example, a secure system, comprising: i) a network configured to transmit data based on at least one network packet-based protocol; and ii) plural nodes coupled to the network, each one of the plural nodes comprising a network stack, a network protocol application programming interface, and middleware, the network protocol application programming interface configured to pass each data packet received to the middleware, the middleware configured to verify, prior to sending data towards a destination port, that the data: a) has been generated by an authorized application; b) conforms to an authorized data protocol; c) has been received from an authorized node; and d) contains at least one port number that is present on a predetermined list of port numbers.

Certain embodiments may provide, for example, a secure system, comprising: i) a network configured to transmit data based on at least one network packet-based protocol; and ii) plural nodes coupled to the network, each one of the plural nodes comprising a network stack, a network protocol application programming interface, and a middleware, invocation of the middleware being triggered by each data packet crossing the network protocol application programming interface for the first time, the middleware configured to verify, prior to sending data towards a destination port, that the data: a) has been generated by an authorized application, as determined based at least on metadata obtained by the middleware; b) conforms to an authorized data protocol, as determined based at least on the metadata; c) has been received from an authorized node; and d) contains at least one port number that is present on a predetermined list of port numbers.

Certain embodiments may provide, for example, a distributed method to secure plural computing devices coupled to a network. In certain embodiments, for example, the distributed method may comprise: having preprovisioned (or predetermined) configuration files on the plural computing devices, defining authorized port-to-port connections based in part on information from the configuration files on at least two of the plural computing devices (for example a first configuration file on a first computing device and a second configuration file on a second computing device), and restricting network communications to and from the plural computing devices to the authorized port-to-port connections.

A. In certain embodiments, for example, the preprovisioned (or predetermined) configuration files may be read on boot-up. In certain embodiments, for example, the preprovisioned (or predetermined) configuration files may be read by one or more application space programs. In certain embodiments, for example, the preprovisioned (or predetermined) configuration files may be read by one or more kernel space programs. In certain embodiments, for example, the preprovisioned (or predetermined) configuration files may be read by a combination of application space programs and kernel space programs.

B. In certain embodiments, for example, each one of the authorized port-to-port connections may comprise: a first socket referenced by first network security software executing on a first computing device of the plural computing devices; and a second socket referenced by network security software. In certain further embodiments, for example, the network security software may execute on: a second computing device of the plural computing devices, a third computing device executing an authorized deployment server, the authorized deployment server exclusively responsible for managing the static, preconfigured list of authorized pathways, or a fourth computing device executing a gateway server, network communication of the gateway server restricted to the authorized pathways. In certain embodiments, for example, data may be passed to the gateway server and processed by network security software on the fourth computing device unless the data is received from one of the authorized pathways. In certain embodiments, for example, the fourth computing device may be constrained, by an operating system, to executing only a static, preconfigured list of computer programs. In certain embodiments, for example, one or more of the preprovisioned (or predetermined) configuration files may be distributed by the authorized deployment server to at least two of the plural computing devices.

C. In certain embodiments, for example, the plural computing devices may be physically located at a common facility (for example a hospital, factory, chemical processing facility, power station, or offshore platform).

D. In certain embodiments, for example, at least one (for example each one) of the authorized port-to-port connections may be stateful. In certain embodiments, for example, at least one (for example each one) of the authorized port-to-port connections may be stateless.

Certain embodiments may provide, for example, a secured system comprising: plural nodes coupled to a network, and plural security programs for management of all communication between the plural nodes over the network, the plural security programs cooperatively configured to form dedicated data pathways for inter-application communication between the plural nodes. In certain further embodiments, for example, at least one of the dedicated data pathways may comprise: a first security program to send data from a first one of the plural nodes and a second security program to receive data on a second one of the plural nodes, and a dedicated encrypted network tunnel between the first security program and a second security program.

A. In certain embodiments, for example, the network may be a packet-switched network. In certain embodiments, for example, the received data may comprise a series of data packets. In certain embodiments, for example, the first security program may verify that each data packet of the series of data packets was transmitted from an authorized application. In certain embodiments, for example, the first security program may verify that a data packet of the series of data packets was transmitted from a port associated with an application authorized to transmit the data packet, based at least on a port number associated with the transmitting application, an identifier for the transmitting application, a user of the transmitting application, and a data protocol descriptor for the data packet. In certain embodiments, for example, the second security program may verify that each data packet of the series of data packets was transmitted from an authorized application. In certain embodiments, for example, the second security program may verify that each data packet of the series of data packets is being transmitted to an authorized port associated with an authorized application. In certain embodiments, for example, the second security program may verify that a data packet of the series of data packets is being transmitted to a port associated with an application authorized to receive the data packet, based at least on an identifier for the receiving application, an identifier for an application associated with the transmission of the data packet, a user of the transmitting application, and a data protocol descriptor for the data packet.

Certain embodiments may provide, for example, a secured system comprising: plural nodes coupled to a network, a first application program executing on a first node and a second application program executing on a second node, plural security programs for management of all communication between the plural nodes over the network, and plural read-only configuration files accessible by the plural security programs. In certain embodiments, for example, the plural security programs may be cooperatively configured to form a dedicated data pathway for inter-application communication between the first application program and the second application program. In certain further embodiments, for example, the dedicated data pathway may pass through a first security program and a second security program of the plural security programs, the first security program and a second security program interposed between the first application program and the second application program, and the data pathway may comprise a dedicated encrypted network tunnel between the first security program and a second security program. In certain further embodiments, for example, each of the plural configuration files may define an exclusive list of authorized inter-application communications, may further define an exclusive data protocol for each authorized inter-application communication of the exclusive list of authorized inter-application communications, may assigning a fixed port number to the first security software, and may contain nonpublic node identification codes.

A. In certain embodiments, for example, the fixed port number may be unique to a 5-tuple consisting of: an identifier for the first application program, a user of the first application program, an identifier for the second application program, a user of the second application program, and the exclusive data protocol. In certain embodiments, for example, the fixed port number may be unique on the first node and the second node to a 5-tuple consisting of: an identifier for the first application program, a user of the first application program, an identifier for the second application program, a user of the second application program, and the exclusive data protocol.

B. In certain embodiments, for example, each of the plural configuration files may be a binary file. In certain embodiments, for example, each of the plural configuration files may be divided into records. In certain further embodiments, for example, the records may be indexed by the fixed port number.

C. In certain embodiments, for example, each of the records may have a variable length. In certain embodiments, for example, each of the records may comprise a private key (or a cryptographic parameter or primitive). In certain embodiments, for example, each private key may be unique to the secured system.

D. In certain embodiments, for example, the nonpublic node identification codes may comprise a first node identification code assigned to the first node and a second node identification code assigned to the second node, processor, or computing device.

Certain embodiments may provide, for example, a secured system comprising: i) plural nodes coupled to a network; ii) a first application program executing on a first node and a second application program executing on a second node; iii) plural security programs for management of all communication between the plural nodes over the network, the plural security programs cooperatively configured to form a dedicated data pathway for inter-application communication between the first application program and the second application program, wherein the dedicated data pathway—a) passes through a first security program and a second security program of the plural security programs, the first security program and a second security program interposed between the first application program and the second application program; and b) comprises a dedicated encrypted network tunnel between the first security program and a second security program; iv) plural read-only configuration files accessible by the plural security programs, each of the plural configuration files—a) defining an exclusive list of authorized inter-application communications; b) further defining an exclusive data protocol for each authorized inter-application communication of the exclusive list of authorized inter-application communications; c) assigning a fixed port number to the first security software; and d) containing nonpublic node identification codes.

Certain embodiments may provide, for example, a secure system comprising: plural nodes configured to communicate over a network exclusively by plural encrypted communication pathways (for example by plural encrypted network tunnels), each one of the plural encrypted communication pathways (for example each one of the network tunnels) restricted to transmitting data sent from a single transmitting application on a first node of the plural nodes and directed to a single receiving application on a second node of the plural nodes. In certain further embodiments, for example, each one of the plural encrypted communication pathways (for example the plural encrypted network tunnels) may be restricted to transmitting data having a single payload data type, and encrypted with a cryptographic key that may be used only once. In certain further embodiments, for example, each one of the plural encrypted communication pathways (for example each one of the plural encrypted network tunnels) may be established by mutual exchange and authentication of preconfigured application authentication identification codes and nonpublic node identification codes. In each of the foregoing embodiments, the transmitting application, first node, receiving application, and/or receiving node may be different for each different encrypted network communication (for example each different network tunnel) of the plural encrypted network communication pathways (for example of the plural encrypted network tunnels).

A. In certain embodiments, for example, the plural encrypted communication pathways (for example the plural encrypted network tunnels) may comprise one or plural unidirectional encrypted communication pathways (for example one or plural unidirectional encrypted network tunnels). In certain embodiments, for example, the plural encrypted communication pathways (for example the plural encrypted network tunnels) may comprise one or plural bidirectional encrypted communication pathways (for example one or plural bidirectional network tunnels).

B. In certain embodiments, for example, the plural encrypted communication pathways (for example the plural encrypted network tunnels) may comprise one or plural stateful data communications sessions. In certain embodiments, for example, the plural encrypted communication pathways (for example the plural encrypted network tunnels) may be at least partially managed by middleware present on the plural nodes. In certain embodiments, for example, the plural encrypted communication pathways (for example the plural encrypted network tunnels) may be at least partially managed by a broker software present on at least one node of the plural nodes.

Certain embodiments may provide, for example, a secure system comprising: plural nodes configured to communicate over a network exclusively by plural encrypted network tunnels, each one of the plural encrypted network tunnels—i) restricted to transmitting data—a) sent from a single transmitting application on a first node of the plural nodes; b) directed to a single receiving application on a second node of the plural nodes; c) having a single payload data type; and d) encrypted with a cryptographic key that is used only once; and ii) established by mutual exchange and authentication of preconfigured—a) application authentication identification codes; and b) nonpublic node identification codes.

Certain embodiments may provide, for example, a secure system, comprising: plural nodes coupled to a network, plural application software executing on at least a first node and a second node of the plural nodes, at least one encrypted network tunnel configured to perform at least a partial data pathway for transport of data from a first application software of the plural application software on the first node of the plural nodes to a second application software of the plural application software on the second node of the plural nodes, the data conforming to a preconfigured, predefined, pre-established and/or preprovisioned first data protocol, and at least one security software initiating the at least one encrypted network tunnel. In certain further embodiments, for example, the at least one security software may be configured to authorize the encrypted network tunnel, based at least on authorizing the first node, the second node, the first application software, and the second application software. In certain further embodiments, for example, the at least one security software may be configured to confirm that the first application software is authorized to transmit the first data protocol. In certain further embodiments, for example, the at least one security software may be positioned between the first application software and the second application software in a data pathway comprising the at least one encrypted network tunnel.

A. In certain embodiments, for example, the encrypted tunnel may have an endpoint at a port associated with one of the at least one security software.

B. In certain embodiments, for example, the at least one security software may be plural security software, and the encrypted tunnel may have a first endpoint at a first port associated with a first security software of the plural security software and a second endpoint at a second port associated with a second security software of the plural security software.

C. In certain embodiments, for example, authorizing the first application software may comprise authorizing a user of the first application software. In certain embodiments, for example, the at least one security software may be transparent to the first application software and the second application software. In certain embodiments, for example, the authorizing and the confirming may each comprise encrypted communication over the network. In certain embodiments, for example, the system may be configured as a software-defined perimeter. In certain embodiments, for example, an access controller of the software-defined perimeter may comprise one of the at least one security software.

Certain embodiments may provide, for example, a secure system, comprising: i) plural nodes coupled to a network; ii) plural application software executing on at least a first node and a second node of the plural nodes; iii) at least one encrypted network tunnel configured to perform at least a partial data pathway for transport of data from a first application software of the plural application software on the first node of the plural nodes to a second application software of the plural application software on the second node of the plural nodes, the data conforming to a preconfigured, predefined, pre-established and/or preprovisioned first data protocol; and iv) at least one middleware initiating the at least one encrypted network tunnel, the at least one middleware positioned between the first application software and the second application software in a data pathway comprising the at least one encrypted network tunnel, the at least one middleware configured to: a) authorize the encrypted network tunnel, based at least on authorizing the first node, the second node, the first application software, and the second application software; and b) confirm that the first application software is authorized to transmit the first data protocol.

Certain embodiments may provide, for example, a secure system comprising: plural nodes coupled to a network, plural application software executing on at least a first node and a second node of the plural nodes, at least one encrypted network tunnel established between a first application software of the plural application software on the first node of the plural nodes and a second application software of the plural application software on the second node of the plural nodes, the first application software configured to send data conforming to a preconfigured, predefined, pre-established and/or preprovisioned first data protocol, and at least one middleware initiating the at least one encrypted network tunnel. In certain further embodiments, for example, the at least one middleware may be positioned between the first application software and the second application software in a data pathway comprising the at least one encrypted network tunnel. In certain further embodiments, for example, the at least one middleware may be configured to authorize the encrypted network tunnel, based at least on authorizing at least one of the plural nodes, the first application software, and the second application software. In certain further embodiments, for example, the at least one middleware may be configured to confirm that the second application software is authorized to receive the first data protocol.

A. In certain embodiments, for example, the at least one middleware may be transparent to the first application software and the second application software. In certain embodiments, for example, the authorize and the confirm may each comprise encrypted communication over the network.

Certain embodiments may provide, for example, a secure system comprising: i) plural nodes coupled to a network; ii) plural application software executing on at least a first node and a second node of the plural nodes; iii) at least one encrypted network tunnel established between a first application software of the plural application software on the first node of the plural nodes and a second application software of the plural application software on the second node of the plural nodes, the first application software configured to send data conforming to a preconfigured, predefined, pre-established and/or preprovisioned first data protocol; and iv) at least one middleware initiating the at least one encrypted network tunnel, the at least one middleware positioned between the first application software and the second application software in a data pathway comprising the at least one encrypted network tunnel, the at least one middleware configured to: a) authorize the encrypted network tunnel, based at least on authorizing at least one of the plural nodes, the first application software, and the second application software; and b) confirm that the second application software is authorized to receive the first data protocol.

Certain embodiments may provide, for example, a secure system comprising plural nodes communicating over a network by machine-to-machine middleware, each node of the plural nodes comprising: a preconfigured list, and machine-to-machine middleware. In certain embodiments, for example, each member of the preconfigured list may comprise a 2-tuple, the 2-tuple comprising a port number. In certain further embodiments, for example, the machine-to-machine middleware may be configured to: interpret the preconfigured list to define authorized client-server connections, receive a network packet from the network, decrypt an encrypted metadata portion of the network packet using a single-use cryptographic key, extract an authorization parameter from the decrypted metadata portion of the network packet, and compare a 2-tuple consisting of the destination port number of the network packet and the authorization parameter with at least one member of the preconfigured list.

A. In certain embodiments, for example, the preconfigured file may be stored on a non-transitory computer-readable storage medium (for example a nonvolatile memory storage medium) exclusively as an encrypted binary file. In certain embodiments, for example, the authorization parameter may be a remote node identification code. In certain embodiments, for example, the remote node identification code may be nonpublic. In certain embodiments, for example, the remote node identification code may be a shared secret among a subset of the plural nodes.

B. In certain embodiments, for example, the authorization parameter may comprise a remote descriptor, the remote descriptor comprising a remote application identifier, an identifier for a user of the remote application, and a data protocol code. In certain embodiments, for example, the machine-to-machine middleware may be at least partially embedded in a kernel.

Certain embodiments may provide, for example, a secure system comprising plural nodes communicating over a network by machine-to-machine middleware, each node of the plural nodes comprising: i) a preconfigured list, each member of the preconfigured list comprising a 2-tuple, the 2-tuple comprising a port number; and ii) machine-to-machine middleware configured to: a) interpret the preconfigured list to define authorized client-server connections; b) receive a network packet from the network; c) decrypt an encrypted metadata portion of the network packet using a single-use cryptographic key; d) extract an authorization parameter from the decrypted metadata portion of the network packet; and e) compare a 2-tuple consisting of the destination port number of the network packet and the authorization parameter with at least one member of the preconfigured list.

A. In certain embodiments, for example, the machine-to-machine middleware may be transparent to the client application. In certain embodiments, for example, the network packet may comprise a segmented payload. In certain embodiments, for example, at least 25% (for example at least 50%, such as at least 75%) of the plural nodes may be dedicated computing devices.

Certain embodiments may provide, for example, a secure system comprising plural nodes communicating over a network by machine-to-machine middleware, each node of the plural nodes comprising: a client application, a preconfigured list, a security layer, a kernel, and machine-to-machine middleware at least partially embedded in the kernel. In certain further embodiments, for example, the machine-to-machine middleware may be configured to: interpret the preconfigured list to define authorized client-server connections, receive a network packet from the network, decrypt an encrypted metadata portion of the network packet using a single-use cryptographic key (for example a rotated key derived from ECDH key exchange), extract at least a 2-tuple consisting of a remote server code and a data protocol code from the decrypted metadata portion of the network packet, and compare the 2-tuple to at least one member of the preconfigured list. In certain further embodiments, for example, each member of the preconfigured list may consist of an n-tuple, the n-tuple comprising a 2-tuple consisting of a remote server code and a data protocol code.

A. In certain embodiments, for example, the machine-to-machine middleware may be transparent to the client application. In certain embodiments, for example, the network packet may comprise a segmented payload. In certain embodiments, for example, at least 25% (for example at least 50%, such as at least 75%) of the plural nodes may be dedicated computing devices.

Certain embodiments may provide, for example, a secure system comprising plural nodes communicating over a network by machine-to-machine middleware, each node of the plural nodes comprising: i) a client application; ii) a preconfigured list, each member of the preconfigured list consisting of an n-tuple, the n-tuple comprising a 2-tuple consisting of a remote server code and a data protocol code; iii) a security layer; iv) a kernel; and v) machine-to-machine middleware at least partially embedded in the kernel, the machine-to-machine middleware configured to: a) interpret the preconfigured list to define authorized client-server connections; b) receive a network packet from the network; c) decrypt an encrypted metadata portion of the network packet using a single-use cryptographic key; d) extract at least a 2-tuple consisting of a remote server code and a data protocol code from the decrypted metadata portion of the network packet; and e) compare the 2-tuple to at least one member of the preconfigured list.

Certain embodiments may provide, for example, a method to instantiate and manage a dedicated data pathway extending from a source port on a first node to a destination port on a second node, processor, or computing device. In certain embodiments, for example, the method may comprise selecting, from a predetermined, exclusive list of authorized data pathways, a security port number exclusively paired with a port number of the destination port. In certain embodiments, for example, the method may comprise forming an encrypted communication pathway extending from the first node to a security port present on the second node, the security port having the selected security port number (i.e., the selected security port number assigned to the security port). In certain embodiments, for example, the method may comprise, prior to transmitting any data from the source port to the destination port: verifying, at the first node, that a first n-tuple (for example the first n-tuple may be an at least a 2-tuple, an at least a 3-tuple, an at least a 5-tuple, an at least a 6-tuple, an at least an 8-tuple, an at least a 10-tuple, or an at least a 12-tuple) received from the encrypted communication pathway matches an expected value based on the security port number, the first n-tuple comprising: a nonpublic device code for the second node, a user associated with the destination port, an application associated with the destination port, and a data protocol descriptor. In certain embodiments, for example, the method may comprise, prior to passing a network packet to the destination port: verifying, at the second node, that an second n-tuple obtained from the network packet matches an expected value based on the security port number, the second n-tuple comprising: a user associated with the source port, an application associated with the source port, and the data protocol descriptor.

Certain embodiments may comprise, for example, a method to instantiate and manage a dedicated data pathway extending from a source port on a first node to a destination port on a second node, comprising: i) selecting, from a predetermined, exclusive list of authorized data pathways, a security port number exclusively paired with a port number of the destination port; ii) forming an encrypted communication pathway extending from the first node to a security port present on the second node, the security port having the selected security port number (i.e., the selected security port number assigned to the security port); iii) prior to transmitting any data from the source port to the destination port: verifying, at the first node, that a first n-tuple received from the encrypted communication pathway matches an expected value based on the security port number, the first n-tuple comprising: a nonpublic device code for the second node, a user associated with the destination port, an application associated with the destination port, and a data protocol descriptor; and iv) prior to passing a network packet to the destination port: verifying, at the second node, that an second n-tuple obtained from the network packet matches an expected value based on the security port number, the second n-tuple comprising: a user associated with the source port, an application associated with the source port, and the data protocol descriptor.

Certain embodiments may provide, for example, a method to instantiate and manage a dedicated data pathway extending from a source port on a first node to a destination port on a second node, comprising: selecting, from a predetermined, exclusive list of authorized data pathways, a tunnel port number exclusively paired with a port number of the destination port; forming a network tunnel extending from the first node to a tunnel port present on the second node, the tunnel port having the selected tunnel port number (i.e., the selected tunnel port number assigned to the tunnel port); iii) prior to transmitting any data from the source port to the destination port: verifying, at the first node, that a first n-tuple received from the network tunnel matches an expected value based on the tunnel port number, the first n-tuple comprising: a nonpublic device code for the second node, a user associated with the destination port, an application associated with the destination port, and a data protocol descriptor; and iv) prior to passing a network packet to the destination port: verifying, at the second node, that an second n-tuple obtained from the network packet matches an expected value based on the tunnel port number, the second n-tuple comprising: a user associated with the source port, an application associated with the source port, and the data protocol descriptor.

Certain embodiments may provide, for example, a system comprising: plural nodes communicating over a network according to a shared network protocol, wherein each one of the plural nodes may be preconfigured to initialize at least one encrypted network tunnel with at least another one of the plural nodes, and each one of the plural nodes having application and/or data transfer privileges may be limited to transferring data to another one of the plural nodes exclusively by an encrypted network tunnel of the at least one encrypted network tunnel.

A. In certain embodiments, for example, each one of the least 25% (for example at least 50%, such as at least 90%) of the plural nodes may be an edge computing device.

Certain embodiments may provide, for example, a method to retrofit a node interface to a network, comprising: inserting a computing device between a node and the network. In certain further embodiments, for example, the computing device may comprise: a file stored on non-transitory computer-readable storage medium, the file having a list of authorized data communications sessions, the file comprising: an index defined by an application authorized to be executed on a processor of the node and an authorized user of the application, a unique 2-tuple consisting of a port number assigned to the application and a port number assigned to a network security middleware, a unique 2-tuple consisting of a port number assigned to a remote application and a port number assigned to a remote network security middleware, and a data protocol descriptor.

Certain embodiments may provide, for example, a method to retrofit a node interface to a network, comprising: inserting a computing device between a node and the network, the computing device comprising: a file on a non-transitory computer-readable storage medium of the computing device, the file interpretable by network security middleware executing on the computing device to define authorized communication sessions and an authorized data protocol for each one of the authorized communication sessions. In certain further embodiments, for example, the computing device may further comprise a network stack configured to route each data packet through the network security middleware, the network security middleware configured to drop a data packet unless it is authorized to be transmitted using one of the authorized communication sessions.

Certain embodiments may provide, for example, a secure method for a first computing device to update resident software, comprising: receiving, from a predetermined, authenticated, authorized client executing on a second computing device, an encrypted non-executable payload noticing availability of updated software. In certain further embodiments, for example, the receiving may be followed by establishing a unidirectional encrypted network tunnel with a predetermined server executing on a third computing device. In certain further embodiments, for example, the establishing may comprise exchanging and authenticating encrypted device identifiers between the first computing device and the third computing device, and verifying that the second computing device and the third computing device are different devices. In certain further embodiments, for example, the method may further comprise downloading the updated software over the unidirectional encrypted network tunnel.

Certain embodiments may provide, for example, a secure computing device comprising a physical network interface, the physical network interface configured to: compare a destination port number of each incoming network packet to a list of authorized destination ports, execute remote procedure calls to first software program (or module or portion of code) executing on a central processing unit of the computing device, the first software configured to decrypt metadata from each incoming network packet, and execute remote procedure calls to second software executing on the central processing unit. In certain further embodiments, for example, the second software program may be configured to compare the decrypted metadata to a list of authorized n-tuples, each of the n-tuples in the list of authorized n-tuples comprising descriptors for: a source application for the incoming network packet, a user for the source application, and a payload protocol for the network packet.

A. In certain embodiments, for example, the physical network interface may be a field-programmable gate array.

B. In certain embodiments, for example, the physical network interface may be further configured (for example programmed) to execute remote procedure calls to a third software program executing on the central processing unit, the third software configured to translate a payload of the incoming network packet into native formatted data for consumption by the receiving application.

C. In certain embodiments, for example, at least one of the first software, second software, or third software execute in an OSI application layer of the computing device.

Certain embodiments may provide, for example, a method to filter a network packet in an edge computing device, comprising: parsing at least a portion of the network packet to obtain payload data in a network stack of the edge computing device; and invoking publish-subscribe pattern messaging software from a sub-session layer of the network stack to retrieve, based on at least a portion of the payload data, one or more network packet authentication and/or access control parameters.

A. In certain embodiments, for example, the publish-subscribe pattern messaging software may conform to the Data Distribution Service standard.

B. In certain embodiments, for example, the publish-subscribe pattern messaging software may conform to an MQ Telemetry Transport messaging protocol.

C. In certain embodiments, for example, the one or more network packet authentication and/or access control parameters may be retrieved from metadata encoded in the payload data. In certain embodiments, for example, the one or more network packet authentication and/or access control parameters may comprise a source application, a source application user, and a data protocol of the payload data. In certain embodiments, for example, the one or more network packet authentication and/or access control parameters may be encrypted. In certain embodiments, for example, the method may further comprise: comparing a port address number of the network packet to a list of pre-authorized port address numbers stored in kernel random access memory.

Certain embodiments may provide, for example, a method to filter a network packet (for example an IP packet containing an IP header and a TCP segment). In certain embodiments, for example, the method may comprise parsing the network packet to obtain network packet data; and invoking data distribution service software from a sub-session layer (for example a transport layer according to the Open Systems Interconnection model) of a network stack to retrieve, based on at least a portion of the network packet data (for example a metadata portion), one or more network packet authentication and/or access control parameters. In certain embodiments, for example, the network packet may be an incoming packet received from an Ethernet connection. In certain embodiments, for example, the network packet may be an outgoing packet being directed towards received from an Ethernet connection. In certain embodiments, for example, parsing the network packet may comprise parsing a header of the network packet (for example a network header such as an IP header, an IPsec header, or a TCP header of a TCP segment). In certain embodiments, for example, the one or more network packet authentication and/or access control parameters may comprise a destination port. In certain embodiments, for example, parsing the network packet may comprise parsing metadata (for example payload metadata). In certain further embodiments, for example, the metadata may comprise metadata useful for authenticating a computing device sending at least a portion of a payload present in the network packet. In certain embodiments, for example, the metadata may comprise metadata useful for authenticating an application and/or user sending at least a portion of a payload present in the network packet. In certain embodiments, for example, the metadata may comprise metadata useful for authorizing an application to have access to at least a portion of a payload present in the network packet.

A. In certain embodiments, for example, the network stack may be executing on a node in a data distribution service domain. In certain embodiments, for example, the node may be a subscriber in the data distribution service domain. In certain embodiments, for example, the node may be a publisher in the data distribution service domain. In certain embodiments, for example, the metadata may comprise metadata inserted by data distribution service middleware. In certain embodiments, for example, the metadata may comprise a publish-subscribe topic. In certain embodiments, for example, the network packet may comprise a payload having at least a portion that is strongly typed. In certain embodiments, for example, the metadata may comprise a publish-subscribe data type definition. In certain further embodiments, for example, the one or more network packet access control parameters may comprise the publish-subscribe data type definition. In certain embodiments, for example, the method may further comprise comparing the one or more network packet authentication and/or access control parameters with settings of a domain participant in a data distribution service domain. In certain embodiments, for example, the settings may define at least one data reader in the data distribution service domain. In certain embodiments, for example, the settings may define at least one data writer in the data distribution service domain. In certain embodiments, for example, the method may further comprise creating and maintaining an event log.

B. In certain further embodiments, for example, the data distribution service software may be invoked by operating system software, for example by operating system software operating at kernel priority. In certain embodiments, for example, the data distribution service software defines at least part of a software library, for example a pre-built library. In certain embodiments, for example, the data distribution service software defines at least one subroutine. In certain embodiments, for example, the data distribution service software defines at least one module. In certain embodiments, for example, the data distribution service software defines at least one function. In certain embodiments, for example, the data distribution service software defines at least a portion of an object.

C. In certain embodiments, for example, the network stack may be executing on a dedicated computing device. In certain embodiments, for example, the method may be performed at wire speed.

Certain embodiments may provide, for example, a kernel-based method for authorized network communication, comprising: detecting a network packet added to a network stack memory, moving the detected network packet from the network stack memory to a heap space; authorizing the network packet, and removing the authorized network packet from the heap space and replacing the network packet in network stack memory. In certain embodiments, for example, the authorizing may be based at least on: a) a universal identifier for a source of the network packet, comprising an authorized source application identifier and an identifier for an authorized user of the source application; b) a universal identifier for destination of the network packet, comprising an authorized destination application identifier and an identifier for an authorized user of the destination application; c) a port associated with the destination application; d) a different port associated with a middleware; and e) a data protocol field.

A. In certain embodiments, for example, the middleware may be responsible for the detecting. In certain embodiments, for example, the middleware may be responsible for the moving. In certain embodiments, for example, the middleware may be responsible for the authorizing. In certain embodiments, for example, the middleware may be responsible for the detecting, the moving, and the authorizing.

Certain embodiments may provide, for example, a kernel-based method for authorized network communication, comprising: i) detecting a network packet added to a network stack memory; ii) moving the detected network packet from the network stack memory to a heap space; iii) authorizing the network packet, based at least on: a) a universal identifier for a source of the network packet, comprising an authorized source application identifier and an identifier for an authorized user of the source application; b) a universal identifier for destination of the network packet, comprising an authorized destination application identifier and an identifier for an authorized user of the destination application; c) a port associated with the destination application; d) a different port associated with a middleware; and e) a data protocol field; and iv) removing the authorized network packet from the heap space and replacing the network packet in network stack memory.

Certain embodiments may comprise, for example, a kernel-based method for authorized network communication, comprising: detecting (for example receiving or intercepting) a network packet added to a network stack memory, making the detected network packet accessible to a heap space (for example by moving or copying the network packet from the network stack memory to the heap space), authorizing the network packet, and removing the authorized network packet from the heap space and replacing the network packet in network stack memory. In certain further embodiments, for example, the authorizing may reference: an index defined by a pre-approved application a pre-approved user of the application, a unique 2-tuple consisting of a port number assigned to the application and a port number assigned to an encryption layer, a unique 2-tuple consisting of a port number assigned to a remote application and a port number assigned to a remote encryption layer, and a data protocol field.

Certain embodiments may provide, for example, a method to prevent an attack by malware resident on a node, comprising: a network security agent opening a port in listening mode, the port configured to establish a compromised encrypted connection, receiving a connection request at the port from a malware configured to exploit the compromised encryption protocol, establishing an encrypted tunnel between the network security agent and the malware, the encrypted tunnel having the port as an endpoint, and the network security agent terminating the encrypted tunnel after a fixed number of attempts by the malware to provide an expected identification code for the node, the expected identification code selected by the network security agent based on the port number of the port.

A. In certain embodiments, for example, the network security agent may be present on the node, processor, or computing device. In certain embodiments, for example, the network security agent may be present on a remote node, processor, or computing device. In certain embodiments, for example, the encrypted connection may be compromised due to a compromised private key. In certain embodiments, for example, the encrypted connection may be compromised due to one or more compromised components of a cipher suite. In certain embodiments, for example, the encrypted connection may be compromised due to one or more security holes in a software implementation of an encryption protocol. In certain embodiments, for example, the malware may be present on the node, processor, or computing device. In certain embodiments, for example, the malware may be present on a different node, processor, or computing device. In certain embodiments, for example, the port may be configured according to a secure socket layer protocol. In certain embodiments, for example, the port may be configured according to an IPsec protocol. In certain embodiments, for example, the malware may identify the port based on a port scan. In certain embodiments, for example, the expected node identification code may have a length of at least 2048 bits. In certain embodiments, for example, the sum-of-digits of the expected node identification code may be a prime number. In certain embodiments, for example, a portion of the expected node identification code may be a randomly generated number. In certain embodiments, for example, at least 90% of the digits of the expected node identification code may be a randomly generated number. In certain embodiments, for example, the expected node identification code may be stored in a proprietary binary format configured to be interpreted solely by the network security agent. In certain embodiments, for example, the expected node identification code may be stored on a non-transitory computer-readable storage medium (for example a nonvolatile memory storage medium) in an encrypted, read-only binary file, the binary file comprising a proprietary record structure. In certain embodiments, for example, the binary file may comprise plural records having variable record length. In certain embodiments, for example, the binary file may be readable into random access memory solely by the network security agent. In certain embodiments, for example, the security agent may terminate the encrypted tunnel after no more than 20 attempts to provide the expected identification code.

Certain embodiments may provide, for example, a method to prevent an attack by malware resident on a node, comprising: a network security agent sending a connection request to a spoofed listening port associated with a malware, the network security agent configured to establish a compromised encrypted connection, establishing an encrypted tunnel between the network security agent and the malware, the encrypted tunnel having the malware port as an endpoint, and the network security agent terminating the encrypted tunnel after a fixed number of attempts by the malware to provide an expected identification code for the node, the expected identification code selected by the network security agent based on the port number of the port. In certain embodiments, for example, the network security agent may inadvertently send the connection request to the spoofed listening port. In certain embodiments, for example, the network security agent may be directed (for example by malware) to send the connection request to the spoofed listening port.

Certain embodiments may provide, for example, a method to prevent an attack by malware resident on a node, comprising: the malware attempting to transmit a connection request to a remote destination port, and checking an application code (for example an application code obtained from process status check) and a user code value of the malware against expected values, the expected values selected based on the destination port.

A. In certain embodiments, for example, the method may further comprise dropping the connection request based on the application code and a user code failing to match the expected values. In certain embodiments, for example, the method may further comprise dropping the connection request based on the absence of the destination port in a preconfigured list of allowed destination ports. In certain embodiments, for example, the malware may be introduced to the node via a USB port.

Certain embodiments may provide, for example, a method for communication between a first node and a second node, processor, or computing device. In certain embodiments, for example, the method may comprise establishing an encrypted connection to transfer data exclusively between a first process running on the first node and a second process running on the second node, processor, or computing device. In certain embodiments, for example, the establishing may comprise the second node receiving a node identification packet from the first node and confirming a shared secret node identification code received from the first node, processor, or computing device. In certain embodiments, for example, the method may comprise managing a connection state of the authorized encrypted connection. In certain embodiments, for example, the managing may comprise confirming that network packets received at the second node via the encrypted connection comprise at least a predetermined user identification code, a predetermined process identification code, and/or a predetermined data protocol identification code. In certain embodiments, for example, the node identification packet may comprise a packet type header configured for processing by network security software. In certain embodiments, for example, the network security software may be invoked in a network stack. In certain further embodiments, for example, the packet type header may be located after a layer three header according to the OSI Seven Layer Model. In certain further embodiments, for example, the packet type header may be located after a layer four header according to the OSI Seven Layer Model. In certain further embodiments, for example, the packet type header may be located after an SSL/TLS header. In certain embodiments, for example, a data protocol of the data to be transferred may match an expected data protocol based on the data protocol identification code. In certain embodiments, for example, the predetermined user identification code, the predetermined process identification code, and/or the predetermined data protocol identification code may be metadata present in the network packets. In certain embodiments, for example, the metadata may be configured for processing by network security software. In certain embodiments, for example, the network security software may be invoked in a network stack. In certain further embodiments, for example, the packet type header may be located after a layer three header according to the OSI Seven Layer Model. In certain further embodiments, for example, the metadata may be located after a layer four header according to the OSI Seven Layer Model. In certain further embodiments, for example, the packet type header may be located after an SSL/TLS header.

Certain embodiments may provide, for example, a method for communication between a first node and a second node, processor, or computing device. In certain embodiments, for example, the method may comprise authorizing an encrypted connection to transfer data exclusively between a first process (for example a first user process) running on the first node and a second process (for example a second user process) running on the second node, processor, or computing device. In certain embodiments, for example, the authorizing may comprise transmitting a node identification packet from the first node to the second node, the node identification packet comprising a shared secret node identification code for the first node, processor, or computing device. In certain embodiments, for example, the authorizing may be followed by managing a connection state of the authorized encrypted connection. In certain embodiments, for example, the managing may comprise withdrawing the authorization if at least one network packet received from the authorized encrypted connection is missing one or more of an expected user identification code, process identification code, and data protocol identification code. In certain embodiments, for example, the authorizing may further comprise: transmitting a node identification packet from the second node to the first node, the node identification packet comprising a shared secret node identification code for the second node, processor, or computing device. In certain embodiments, for example, the authorizing may further comprise: transmitting a process identification packet from the first node to the second node, the process identification packet comprising a user identifier for the first process, an application identifier for the first process, a data protocol identifier for the connection, or a combination of two or more of the foregoing identifiers. In certain embodiments, for example, the authorizing may further comprise: executing operating system commands to identify a process requesting the data transfer, followed by verifying that the requesting process is authorized to transfer and/or receive the data. In certain embodiments, for example, the managing may further comprise: executing operating system commands to identify a process requesting the data transfer, followed by verifying that the requesting process is authorized to transfer and/or receive the data. In certain embodiments, for example, the authorizing may comprise consulting configuration files present on the first node and second node to obtain one or more of the shared secret node identification code, user identification code, process identification code, and data protocol identification code. In certain embodiments, for example, the managing may comprise consulting configuration files present on the first node and second node to obtain one or more of the shared secret node identification code, user identification code, process identification code, and data protocol identification code. In certain embodiments, for example, a 3-tuple comprising the user identification code, process identification code, and data protocol identification code may be a shared secret between the first node and the second node, processor, or computing device. In certain embodiments, for example, a 4-tuple comprising the shared secret node identification code, user identification code, process identification code, and data protocol identification code may be a shared secret between the first node and the second node, processor, or computing device. In certain embodiments, for example, the authorizing may comprise mutual exchange from and authorization by the first node and second node of one or more of the shared secret node identification code, user identification code, process identification code, and data protocol identification code.

Certain embodiments may provide, for example, a method for communication between a first node and a second node, processor, or computing device. In certain embodiments, for example, the method may comprise authorizing an encrypted connection to transfer data between a first process running on the first node and a second process running on the second node, processor, or computing device. In certain embodiments, for example, the authorizing may comprise mutual exchange, authentication, and authorization of shared secret first and second node identification codes. In certain embodiments, for example, the authorizing may be followed by managing a connection state of the authorized encrypted connection. In certain embodiments, for example, the managing may comprise dropping the connection if an incoming network packet from the authorized encrypted connection is missing one or more of an expected user identification code, process identification code, and data protocol identification code.

Certain embodiments may provide, for example, a method for communication between a first node and a second node, processor, or computing device. In certain embodiments, for example, the method may comprise authorizing an encrypted connection to transfer data exclusively between a first process running on the first node and a second process running on the second node, processor, or computing device. In certain embodiments, for example, the authorizing may comprise transmitting a node identification packet from the first node to the second node, the node identification packet comprising a shared secret node identification code for the first node, processor, or computing device. In certain embodiments, for example, the authorizing may be followed by managing a connection state of the authorized encrypted connection. In certain embodiments, for example, the managing may comprise withdrawing the authorization if at least one network packet received from the authorized encrypted connection is missing an expected user, process, and/or packet payload data protocol identification code.

Certain embodiments may provide, for example, a method for communication between a first node and a second node, comprising: i) establishing an encrypted connection to transfer data exclusively between a first process running on the first node and a second process running on the second node, comprising: the second node receiving a node identification packet from the first node and confirming a shared secret node identification code received from the first node; and ii) managing a connection state of the authorized encrypted connection, comprising: confirming that network packets received at the second node via the encrypted connection comprise at least an predetermined user identification code, a predetermined process identification code, and/or a predetermined data protocol identification code.

Certain embodiments may provide, for example, a method for communication between a first node and a second node, comprising: i) authorizing an encrypted connection to transfer data exclusively between a first process running on the first node and a second process running on the second node, comprising: transmitting a node identification packet from the first node to the second node, the node identification packet comprising a shared secret node identification code for the first node; followed by ii) managing a connection state of the authorized encrypted connection, comprising: withdrawing the authorization if at least one network packet received from the authorized encrypted connection is missing one or more of an expected user identification code, process identification code, and data protocol identification code.

Certain embodiments may provide, for example, a method for communication between a first node and a second node, comprising: i) authorizing an encrypted connection to transfer data between a first process running on the first node and a second process running on the second node, comprising: mutual exchange, authentication, and authorization of shared secret first and second node identification codes; followed by ii) managing a connection state of the authorized encrypted connection, comprising: dropping the connection if an incoming network packet from the authorized encrypted connection is missing one or more of an expected user identification code, process identification code, and data protocol identification code.

Certain embodiments may provide, for example, a method for communication between a first node and a second node, comprising: i) authorizing an encrypted connection to transfer data exclusively between a first process running on the first node and a second process running on the second node, comprising: transmitting a node identification packet from the first node to the second node, the node identification packet comprising a shared secret node identification code for the first node; followed by ii) managing a connection state of the authorized encrypted connection, comprising: withdrawing the authorization if at least one network packet received from the authorized encrypted connection is missing an expected user, process, and/or packet payload data protocol identification code.

Certain embodiments may provide, for example, a method of securing network communications received by a network node, processor, or computing device. In certain embodiments, for example, the method may comprise confirming network packets received are from a preconfigured, predefined, pre-established and/or preprovisioned source process running on a preconfigured, predefined, pre-established and/or preprovisioned authorized source node and directed to a preconfigured, predefined, pre-established and/or preprovisioned authorized destination process running on a preconfigured, predefined, pre-established and/or preprovisioned authorized destination node, processor, or computing device. In certain embodiments, for example, the method may further comprise passing at least a portion of the payloads from the network packets to the authorized destination process.

A. In certain embodiments, for example, the authorized source process may be preconfigured, predefined, pre-established and/or preprovisioned relative to the network node (for example the network node may contain a file identifying the source process, wherein the file is present on the network node prior to the confirming and passing). In certain embodiments, for example, the authorized source node may be preconfigured, predefined, pre-established and/or preprovisioned relative to the network node (for example the network node may contain a file identifying the source node, wherein the file is present on the network node prior to the confirming and passing). In certain embodiments, for example, the authorized destination process may be preconfigured, predefined, pre-established and/or preprovisioned relative to the network node (for example the network node may contain a file identifying the destination process, wherein the file is present on the network node prior to the confirming and passing). In certain embodiments, for example, the authorized destination node may be preconfigured, predefined, pre-established and/or preprovisioned relative to the network node (for example the network node may contain a file identifying the destination node, wherein the file is present on the network node prior to the confirming and passing). In certain embodiments, for example, the authorized source process may be preconfigured, predefined, pre-established and/or preprovisioned relative to the authorized source node (for example the authorized source node may contain a file identifying the source process, wherein the file is present on the authorized source node prior to the confirming and passing). In certain embodiments, for example, the authorized source node may be preconfigured, predefined, pre-established and/or preprovisioned relative to the authorized source node (for example the authorized source node may contain a file identifying the source node, wherein the file is present on the authorized source node prior to the confirming and passing). In certain embodiments, for example, the authorized destination process may be preconfigured, predefined, pre-established and/or preprovisioned relative to the authorized source node (for example the authorized source node may contain a file identifying the destination process, wherein the file is present on the authorized source node prior to the confirming and passing). In certain embodiments, for example, the authorized destination node may be preconfigured, predefined, pre-established and/or preprovisioned relative to the authorized source node (for example the authorized source node may contain a file identifying the destination node, wherein the file is present on the authorized source node prior to the confirming and passing). In certain embodiments, for example, the authorized source process may be preconfigured, predefined, pre-established and/or preprovisioned relative to the authorized destination node (for example the authorized destination node may contain a file identifying the source process, wherein the file is present on the authorized destination node prior to the confirming and passing). In certain embodiments, for example, the authorized source node may be preconfigured, predefined, pre-established and/or preprovisioned relative to the authorized destination node (for example the authorized destination node may contain a file identifying the source node, wherein the file is present on the authorized destination node prior to the confirming and passing). In certain embodiments, for example, the authorized destination process may be preconfigured, predefined, pre-established and/or preprovisioned relative to the authorized destination node (for example the authorized destination node may contain a file identifying the destination process, wherein the file is present on the authorized destination node prior to the confirming and passing). In certain embodiments, for example, the authorized destination node may be preconfigured, predefined, pre-established and/or preprovisioned relative to the authorized destination node (for example the authorized destination node may contain a file identifying the destination node, wherein the file is present on the authorized destination node prior to the confirming and passing).

B. In certain embodiments, for example, the received packets may be received via an authorized encrypted communication pathway, wherein the authorized encrypted communication pathway may be established, wherein the establishing of the authorized encrypted communication pathway may comprise authorizing a preconfigured, predefined, pre-established and/or preprovisioned source node and a preconfigured, predefined, pre-established and/or preprovisioned destination node, processor, or computing device.

C. In certain embodiments, for example, the authorized destination node may be the network node, processor, or computing device. In certain embodiments, for example, the authorized destination node may perform the confirming and passing.

D. In certain embodiments, for example, the confirming may be transparent to the authorized source process. In certain embodiments, for example, the confirming may be transparent to the authorized destination process. In certain embodiments, for example, the confirming may be transparent to the authorized source process and the authorized destination process. In certain embodiments, for example, the confirming may comprise: comparing destination port numbers of the network packets with a preconfigured, predefined, pre-established and/or preprovisioned port number associated with the authorized destination process. In certain embodiments, for example, the associated port may be assigned to the authorized destination process. In certain embodiments, for example, the associated port may be assigned to network security software in communication with the authorized destination process. In certain embodiments, for example, the confirming may comprise: obtaining destination port numbers and source application codes, source process owners, and/or data type protocol from the network packets; selecting one or plural preconfigured, predefined, pre-established and/or preprovisioned authorization codes assigned to the destination port numbers; and matching the source application codes, source process owners, and/or data type protocol obtained from the network packets to the one or plural authorization codes.

E. In certain embodiments, for example, the passing may comprise transmitting the least a portion of the payloads from the network packets on a dedicated communication pathway for the authorized source process. In certain embodiments, for example, the passing may comprise transmitting the at least a portion of the payloads from the network packets via a loopback interface. In certain embodiments, for example, the passing may comprise passing the at least a portion of the payloads from the network packets via kernel functions (for example read and/or write functions). In certain embodiments, for example, the passing may comprise copying the at least a portion of the payloads from one memory location to another memory location. In certain embodiments, for example, the passing may not comprise copying the at least a portion of the payloads from one memory location to another memory location. In certain embodiments, for example, the passing may comprise adjusting a pointer to a location in kernel memory.

F. In certain embodiments, for example, the method may further comprise:

establishing an authorized connection having the associated port as an endpoint, followed by receiving the network packets received.

Certain embodiments may provide, for example, a method of securing network communications received by a network node, processor, or computing device. In certain embodiments, for example, the method may comprise establishing an authorized encrypted communication pathway, which may comprise authorizing a preconfigured, predefined, pre-established and/or preprovisioned source node and a preconfigured, predefined, pre-established and/or preprovisioned destination node, processor, or computing device. In certain embodiments, for example, the method may comprise confirming network packets received via the encrypted communication pathway are from a preconfigured, predefined, pre-established and/or preprovisioned authorized source process running on the authorized source node and directed to a preconfigured, predefined, pre-established and/or preprovisioned authorized destination process running on the authorized destination node, processor, or computing device. In certain embodiments, for example, the method may comprise passing at least a portion of the payloads from the network packets to the authorized destination process. In certain embodiments, for example, the source node and the destination node may authorize one another based on mutual exchange, authentication, and authorization of shared secret device codes between the source node and the destination node, processor, or computing device. In certain embodiments, for example, the mutual exchange may be made across the encrypted communication pathway prior to its authorization. In certain embodiments, for example, the shared secret device codes may be created independently of any internet protocol. In certain embodiments, for example, the encrypted communication pathway may be formed according to SSL/TLS protocol prior to its authorization. In certain embodiments, for example, the encrypted communication pathway may be formed according to IPsec protocol prior to its authorization. In certain embodiments, for example, the encrypted communication pathway may be formed according to L2TP protocol prior to its authorization.

Certain embodiments may provide, for example, a method of securing network communications received by a network node, comprising: i) confirming network packets received are from a preconfigured, predefined, pre-established and/or preprovisioned authorized source process running on a preconfigured, predefined, pre-established and/or preprovisioned authorized source node and directed to a preconfigured, predefined, pre-established and/or preprovisioned authorized destination process running on a preconfigured, predefined, pre-established and/or preprovisioned authorized destination node; and ii) passing at least a portion of the payloads from the network packets to the authorized destination process.

Certain embodiments may provide, for example, a method of securing network communications received by a network node, comprising: i) establishing an authorized encrypted communication pathway, comprising authorizing a preconfigured, predefined, pre-established and/or preprovisioned source node and a preconfigured, predefined, pre-established and/or preprovisioned destination node; ii) confirming network packets received via the encrypted communication pathway are from a preconfigured, predefined, pre-established and/or preprovisioned authorized source process running on the authorized source node and directed to a preconfigured, predefined, pre-established and/or preprovisioned authorized destination process running on the authorized destination node; and iii) passing at least a portion of the payloads from the network packets to the authorized destination process.

Certain embodiments may provide, for example, a method for communication between a first node and a second node, processor, or computing device. In certain embodiments, for example, the method may comprise pre-loading a first configuration file (for example a preprovisioned first configuration file) on the first node (for example loading the file onto a non-transitory computer-readable storage medium (for example a nonvolatile memory storage medium) of the first node prior to boot-up of the first node, or loading the file into memory of the first node prior to other steps of the method enumerated herein) and a second configuration file (for example a preprovisioned second configuration file) on the second node, processor, or computing device. In certain embodiments, for example, the method may comprise forming an encrypted communication pathway. In certain embodiments, for example, the method may comprise authorizing the encrypted communication pathway to transfer data between a first process running on the first node and a second process running on the second node, processor, or computing device. In certain embodiments, for example, the authorizing may comprise transmitting a first node identification packet from the first node to the second node, the first node identification packet comprising a payload having a first node identifier assigned to the first node, the first node identifier obtained from the pre-loaded first configuration file on the first node, processor, or computing device. In certain embodiments, for example, the authorizing may comprise comparing the first node identifier from the first node identification packet with a further node identifier assigned to the first node, the further node identifier obtained from the pre-loaded second configuration file on the second node, processor, or computing device. In certain embodiments, for example, the data may comprise an executable program, a program command, typed data, a combination of two or more of the foregoing, or a portion of one of the foregoing.

A. In certain embodiments, for example, the method may be transparent to the first process and the second process (for example the first process and the second process may execute first and second compiled code whether or not the method is invoked, or each of the source code for the first process and the source code for the second process may interface with a network stack using standard function syntax of a network application programmer's interface).

B. In certain embodiments, for example, the first node identification packet may be transmitted through the encrypted communication pathway. In certain embodiments, for example, the first node identifier may be nonpublic and a shared secret. In certain embodiments, for example, the first node identifier may be nonpublic. In certain embodiments, for example, the first node identifier may be a shared secret between the first node and the second node, processor, or computing device. In certain embodiments, for example, the first node identifier may not be an IP address. In certain embodiments, for example, the first node identifier may not be a MAC address. In certain embodiments, for example, the first node identifier may not be a parameter used in (or a field present in) a layer 2-5 protocol header according to the OSI model.

C. In certain embodiments, for example, the comparing may be performed by network security software, the network security software invoked in a network stack of the second node, processor, or computing device. In certain embodiments, for example, the network security software may be transparent to the first process and the second process. In certain embodiments, for example, an interface to the network security software may be invoked using standard network API syntax.

D. In certain embodiments, for example, the first configuration file may be pre-loaded on first nonvolatile storage media (for example first physical nonvolatile storage media) and the second configuration file may be pre-loaded on second nonvolatile storage media (for example second physical nonvolatile storage media). In certain embodiments, for example, the pre-loaded second configuration file may comprise at least one record, no more than one of the at least one record comprising an n-tuple consisting of the first node identifier and one or more of a first application code, first process owner code, and first data type code. In certain embodiments, for example, the at least one record may comprise an identifier, the identifier used in forming the encrypted communication pathway. In certain embodiments, for example, the identifier may be a cryptographic primitive (for example a prime number, or for example a private key). In certain embodiments, for example, the at least one record may be a variable length record. In certain embodiments, for example, the second configuration file may be an encrypted binary file.

E. In certain embodiments, for example, the method may further comprise: transmitting a data packet from the first node to the second node, the data packet comprising a payload, the payload comprising: data from the first process; and at least one first process identifier comprising one or more of an application code (i.e., a code or identifier assigned to the application), process owner code, and data type code, the at least one first process identifier assigned to the first node, the at least one first process identifier obtained from the pre-loaded first configuration file on the first node, processor, or computing device. In certain embodiments, for example, the data may conform (for example the formatting of the data may conform) to a data type assigned to the data type code.

F. In certain embodiments, for example, the method may further comprise: comparing the at least one first process identifier with an at least one process identifier assigned to the first process, the at least one process identifier obtained from the pre-loaded second configuration file on the second node, processor, or computing device. In certain embodiments, for example, the method may further comprise: updating an authorized connection list to show an open connection state for the authorized encrypted communication pathway.

G. In certain embodiments, for example, the method may further comprise: transmitting data packets from the first node to the second node, the data packets comprising payloads, each of the payloads comprising: data from the first process; and at least one first process identifier comprising one or more of an application code, process owner code, and data type code, the at least one first process identifier assigned to the first node, the at least one first process identifier obtained from the pre-loaded first configuration file on the first node, processor, or computing device. In certain embodiments, for example, the method may further comprise: checking an authorized connection list resident on the second node to confirm that the encrypted communication pathway is in an open connection state. In certain embodiments, for example, the at least one first process identifier may be positioned in the payload to be processed by network security software. In certain embodiments, for example, the processing may be timed to occur prior to the processing of any application layer protocol header. In certain embodiments, for example, the method may further comprise: comparing the at least one first process identifier contained in each one of the payloads with an at least one process identifier assigned to the first process, the at least one process identifier obtained from the pre-loaded second configuration file on the second node, processor, or computing device. In certain embodiments, for example, the method may further comprise: updating an authorized connection list to change the authorized encrypted communication pathway connection state from open to closed if the at least one first process identifier contained in at least one of the payloads does not match the at least one first process identifier obtained from the pre-loaded first configuration file on the first node, processor, or computing device.

H. In certain embodiments, for example, the authorizing may comprise: transmitting a second node identification packet from the second node to the first node, the second node identification packet comprising a payload having a second node identifier assigned to the second node, the second node identifier obtained from the pre-loaded second configuration file on the second node; and comparing the second node identifier from the second node identification packet with an additional node identifier assigned to the second node, the additional node identifier obtained from the pre-loaded first configuration file on the first node, processor, or computing device.

I. In certain embodiments, for example, the authorizing may comprise: transmitting a first process identification packet from the first node to the second node, the first process identification packet comprising a payload having at least one first process identifier assigned to the first process, the at least one first process identifier comprising one or more of a first application code, first process owner code, and first data type code, the at least one first process identifier assigned to the first node, the first process identifier obtained from the pre-loaded first configuration file on the first node; and comparing the at least one first process identifier from the first process identification packet with a further at least one process identifier assigned to the first node, the further at least one process identifier obtained from the pre-loaded second configuration file on the second node, processor, or computing device.

J. In certain embodiments, for example, the authorizing may comprise: transmitting a second process identification packet from the second node to the first node, the second process identification packet comprising a payload having at least one second process identifier assigned to the second process, the at least one second process identifier comprising one or more of a second application code, second process owner code, and second data type code, the at least one second process identifier assigned to the second node, the second process identifier obtained from the pre-loaded second configuration file on the first node; and comparing the at least one second process identifier from the second process identification packet with an additional at least one process identifier assigned to the second node, the additional at least one process identifier obtained from the pre-loaded first configuration file on the second node, processor, or computing device.

K. In certain embodiments, for example, the method may further comprise: executing operating system commands to identify a process requesting the data transfer, followed by verifying that the requesting process is the first process.

Certain embodiments may provide, for example, a method for communication between a first node and a second node, comprising: i) pre-loading a first configuration file on the first node and a second configuration file on the second node; ii) forming an encrypted communication pathway; and iii) authorizing the encrypted communication pathway to transfer data between a first process running on the first node and a second process running on the second node, comprising: a) transmitting a first node identification packet from the first node to the second node, the first node identification packet comprising a payload having a first node identifier assigned to the first node, the first node identifier obtained from the pre-loaded first configuration file on the first node; and b) comparing the first node identifier from the first node identification packet with a further node identifier assigned to the first node, the further node identifier obtained from the pre-loaded second configuration file on the second node, processor, or computing device.

Certain embodiments may provide, for example, a method for authorized network communication. In certain embodiments, for example, the method may comprise: establishing a communication pathway between a first processor node and a second processor node, processor, or computing device. In certain embodiments, for example, the method may comprise comparing a second node identification code obtained from a second node identification packet against a second node expected value. In certain embodiments, for example, the method may comprise further comparing a first node identification code obtained from a first node identification packet against a first node expected value. In certain embodiments, for example, the method may comprise transmitting, after the comparing and further comparing, application data via the communication pathway.

A. In certain embodiments, for example, the first processor node may execute the comparing. In certain embodiments, for example, the second processor node may execute the further comparing. In certain embodiments, for example, the comparing and further comparing may follow the establishing. In certain embodiments, for example, the transmitting may be executed only after the comparing and further comparing.

B. In certain embodiments, for example, the communication pathway may be encrypted. In certain embodiments, for example, the first node identification code may be encrypted in the first node identification packet with a first single-use encryption key; and/or the second node identification code is encrypted in the second node identification packet with a second single-use encryption key.

C. In certain embodiments, for example, the first node identification code and/or the second node identification code may be nonpublic. In certain embodiments, for example, the first node identification code and/or the second node identification code may be a shared secret. In certain embodiments, for example, the second node expected value may be pre-provisioned on the first processor node; and/or the first node expected value may be pre-provisioned on the second processor node, processor, or computing device.

D. In certain embodiments, for example, the first node identification packet may comprise a higher-than-OSI layer three header, the a higher-than-OSI layer three header comprising a packet type indicator, the packet type indicator interpretable by network security software to alert the network security software to expect the first node identification code. In certain embodiments, for example, the second node identification packet may comprise a higher-than-OSI layer three header, the a higher-than-OSI layer three header comprising a packet type indicator, the packet type indicator interpretable by network security software to alert the network security software to expect the second node identification code.

E. In certain embodiments, for example, the first node identification packet and the second node identification packet may be received via the communication pathway. In certain embodiments, for example, the first node identification packet and the second node identification packet may be received via the network. In certain embodiments, for example, the first node identification packet and the second node identification packet may not be received via the communication pathway.

Certain embodiments may provide, for example, a method for authorized network communication. In certain embodiments, for example, the method may comprise: i) establishing a communication pathway between a first processor node and a second processor node; ii) comparing a second node identification code obtained from a second node identification packet against a second node expected value; iii) further comparing a first node identification code obtained from a first node identification packet against a first node expected value; and iv) transmitting, after the comparing and further comparing, application data via the communication pathway.

Certain embodiments may provide, for example, a product for managing communications of a plurality of networked computing devices. In certain embodiments, for example, the product may comprise a non-transitory computer-readable storage medium having computer-readable program code embodied therein. In certain embodiments, for example, the computer-readable program code may be executable (or program code compilable, linkable, and/or loadable to be executable) by a computing device (for example a computing device executing an operating system (for example a Linux operating system, a Linux-based operating system, a real time operating system, a mini-operating system, an edge device operating system, and/or an open source operating system)) to enable and/or cause the computing device to perform communication management operations. In certain embodiments, for example, the communication management operations may comprise: forming a communication pathway between a source computing device and a destination computing device, comprising: comparing a destination computing device nonpublic identification code obtained from the destination computing device with a destination computing device pre-established value. In certain embodiments, for example, the destination computing device pre-established value may be preprovisioned on the source computing device.

Certain embodiments may provide, for example, a product for managing communications of a plurality of networked computing devices, the product comprising a non-transitory computer-readable storage medium having computer-readable program code embodied therein, the computer-readable program code executable (or compilable, linkable, and/or loadable to be executable) by a computing device (for example a computing device executing an operating system (for example a Linux operating system, a Linux-based operating system, a real time operating system, a mini-operating system, an edge device operating system, and/or an open source operating system)) to enable and/or cause the computing device to perform communication management operations, the communication management operations comprising: forming a communication pathway between a source computing device and a destination computing device, comprising: comparing a destination computing device nonpublic identification code obtained from the destination computing device with a destination computing device pre-established value.

Certain embodiments may provide, for example, a product for managing communications of a plurality of networked computing devices. In certain embodiments, for example, the product may comprise a non-transitory computer-readable storage medium having computer-readable program code embodied therein. In certain embodiments, for example, the computer-readable program code may be executable (or program code compilable, linkable, and/or loadable to be executable) by a computing device (for example a computing device executing an operating system (for example a Linux operating system, a Linux-based operating system, a real time operating system, a mini-operating system, an edge device operating system, and/or an open source operating system)) to enable and/or cause the computing device to perform communication management operations. In certain embodiments, for example, the communication management operations may comprise: forming a communication pathway between a source computing device and a destination computing device. In certain embodiments, for example, the forming a communication pathway may comprise comparing a destination computing device nonpublic identification code obtained from the destination computing device via the network with a destination computing device pre-established value. In certain embodiments, for example, the forming a communication pathway may comprise further comparing a source computing device nonpublic identification code obtained from the source computing device via the network to a source computing device pre-established value.

A. In certain embodiments, for example, the comparing and the further comparing may be performed independently. In certain embodiments, for example, the comparing and the further comparing may be performed sequentially. In certain embodiments, for example, the further comparing may not be performed until after the comparing is performed. In certain embodiments, for example, the comparing may not be performed until after the further comparing is performed. In certain embodiments, for example, the comparing and the further comparing may be performed asynchronously. In certain embodiments, for example, the comparing and the further comparing may be performed in a predetermined sequence.

Certain embodiments may provide, for example, a product for managing communications of a plurality of networked computing devices, the product comprising a non-transitory computer-readable storage medium having computer-readable program code embodied therein, the computer-readable program code executable (or compilable, linkable, and/or loadable to be executable) by a computing device (for example a computing device executing an operating system (for example a Linux operating system, a Linux-based operating system, a real time operating system, a mini-operating system, an edge device operating system, and/or an open source operating system)) to enable and/or cause the computing device to perform communication management operations, the communication management operations comprising: forming a communication pathway between a source computing device and a destination computing device, comprising: a) comparing a destination computing device nonpublic identification code obtained from the destination computing device via the network with a destination computing device pre-established value; and b) comparing a source computing device nonpublic identification code obtained from the source computing device via the network to a source computing device pre-established value.

Certain embodiments may provide, for example, a product for managing communications of a plurality of networked computing devices. In certain embodiments, for example, the product may comprise a non-transitory computer-readable storage medium having computer-readable program code embodied therein. In certain embodiments, for example, the computer-readable program code may be executable (or program code compilable, linkable, and/or loadable to be executable) by a computing device (for example a computing device executing an operating system (for example a Linux operating system, a Linux-based operating system, a real time operating system, a mini-operating system, an edge device operating system, and/or an open source operating system)) to enable and/or cause the computing device to perform communication management operations. In certain embodiments, for example, the communication management operations may comprise: forming a communication pathway between a source computing device and a destination computing device. In certain embodiments, for example, the forming a communication pathway may comprise comparing a destination computing device nonpublic identification code obtained from the destination computing device via the network with a destination computing device pre-established value. In certain embodiments, for example, the forming a communication pathway may comprise further comparing a source computing device nonpublic identification code obtained from the source computing device via the network to a source computing device pre-established value. In certain embodiments, for example, the forming a communication pathway may comprise additionally comparing user-application identifiers and a payload data-type identifiers exchanged between the source and destination computing devices with predefined authorization codes.

A. In certain embodiments, for example, the comparing, further comparing, and additionally comparing may be performed independently. In certain embodiments, for example, the comparing, further comparing, and additionally comparing may be performed sequentially. In certain embodiments, for example, the further comparing may not be performed until after the comparing is performed. In certain embodiments, for example, the comparing may not be performed until after the further comparing is performed, and the additionally comparing may not be performed until after the further comparing is performed. In certain embodiments, for example, the comparing, further comparing, and additionally comparing may be performed asynchronously. In certain embodiments, for example, the comparing, further comparing, and additionally comparing may be performed in a predetermined sequence.

Certain embodiments may provide, for example, a product for managing communications of a plurality of networked computing devices, the product comprising a non-transitory computer-readable storage medium having computer-readable program code embodied therein, the computer-readable program code executable (or compilable, linkable, and/or loadable to be executable) by a computing device (for example a computing device executing an operating system (for example a Linux operating system, a Linux-based operating system, a real time operating system, a mini-operating system, an edge device operating system, and/or an open source operating system)) to enable and/or cause the computing device to perform communication management operations, the communication management operations comprising: forming a communication pathway between a source computing device and a destination computing device, comprising: a) comparing a destination computing device nonpublic identification code obtained from the destination computing device via the network with a destination computing device pre-established value; b) comparing a source computing device nonpublic identification code obtained from the source computing device via the network to a source computing device pre-established value; and c) comparing user-application identifiers and a payload data-type identifiers exchanged between the source and destination computing devices with predefined authorization codes.

Certain embodiments may provide, for example, a product for managing communications of a plurality of networked computing devices. In certain embodiments, for example, the product may comprise a non-transitory computer-readable storage medium having computer-readable program code embodied therein. In certain embodiments, for example, the computer-readable program code may be executable (or program code compilable, linkable, and/or loadable to be executable) by a computing device (for example a computing device executing an operating system (for example a Linux operating system, a Linux-based operating system, a real time operating system, a mini-operating system, an edge device operating system, and/or an open source operating system)) to enable and/or cause the computing device to perform communication management operations. In certain embodiments, for example, the communication management operations may comprise: forming a communication pathway between a source computing device and a destination computing device. In certain embodiments, for example, the forming a communication pathway may comprise comparing, on the source computing device, a destination computing device nonpublic identification code obtained via the network with a destination computing device pre-established value.

A. In certain embodiments, for example, the destination computing device nonpublic identification code may be provided by the destination computing device. In certain embodiments, for example, the destination computing device nonpublic identification code may not be provided by the destination computing device. In certain embodiments, for example, the destination computing device nonpublic identification code may be provided by a node, the node different from the destination computing device.

Certain embodiments may provide, for example, a product for managing communications of a plurality of networked computing devices, the product comprising a non-transitory computer-readable storage medium having computer-readable program code embodied therein, the computer-readable program code executable (or compilable, linkable, and/or loadable to be executable) by a computing device (for example a computing device executing an operating system (for example a Linux operating system, a Linux-based operating system, a real time operating system, a mini-operating system, an edge device operating system, and/or an open source operating system)) to enable and/or cause the computing device to perform communication management operations, the communication management operations comprising: forming a communication pathway between a source computing device and a destination computing device, comprising: comparing, on the source computing device, a destination computing device nonpublic identification code obtained via the network with a destination computing device pre-established value.

Certain embodiments may provide, for example, a product for managing communications of a plurality of networked computing devices. In certain embodiments, for example, the product may comprise a non-transitory computer-readable storage medium having computer-readable program code embodied therein. In certain embodiments, for example, the computer-readable program code may be executable (or program code compilable, linkable, and/or loadable to be executable) by a computing device (for example a computing device executing an operating system (for example a Linux operating system, a Linux-based operating system, a real time operating system, a mini-operating system, an edge device operating system, and/or an open source operating system)) to enable and/or cause the computing device to perform communication management operations. In certain embodiments, for example, the communication management operations may comprise: forming a communication pathway between a source computing device and a destination computing device. In certain embodiments, for example, the forming a communication pathway may comprise comparing, on the source computing device, a destination computing device nonpublic identification code obtained from the destination computing device with a destination computing device pre-established value. In certain embodiments, for example, the forming a communication pathway may comprise comparing, on the destination computing device, a source computing device nonpublic identification code obtained from the source computing device to a source computing device pre-established value.

Certain embodiments may provide, for example, a product for managing communications of a plurality of networked computing devices, the product comprising a non-transitory computer-readable storage medium having computer-readable program code embodied therein, the computer-readable program code executable (or compilable, linkable, and/or loadable to be executable) by a computing device (for example a computing device executing an operating system (for example a Linux operating system, a Linux-based operating system, a real time operating system, a mini-operating system, an edge device operating system, and/or an open source operating system)) to enable and/or cause the computing device to perform communication management operations, the communication management operations comprising: forming a communication pathway between a source computing device and a destination computing device, comprising: a) comparing, on the source computing device, a destination computing device nonpublic identification code obtained from the destination computing device with a destination computing device pre-established value; and b) comparing, on the destination computing device, a source computing device nonpublic identification code obtained from the source computing device to a source computing device pre-established value.

Certain embodiments may provide, for example, a product for managing communications of a plurality of networked computing devices. In certain embodiments, for example, the product may comprise a non-transitory computer-readable storage medium having computer-readable program code embodied therein. In certain embodiments, for example, the computer-readable program code may be executable (or program code compilable, linkable, and/or loadable to be executable) by a computing device (for example a computing device executing an operating system (for example a Linux operating system, a Linux-based operating system, a real time operating system, a mini-operating system, an edge device operating system, and/or an open source operating system)) to enable and/or cause the computing device to perform communication management operations. In certain embodiments, for example, the communication management operations may comprise: forming a communication pathway between a source computing device and a destination computing device. In certain embodiments, for example, the forming a communication pathway may comprise comparing, at the source computing device, a destination computing device nonpublic identification code obtained from a destination node packet with a destination node pre-established value.

Certain embodiments may provide, for example, a product for managing communications of a plurality of networked computing devices, the product comprising a non-transitory computer-readable storage medium having computer-readable program code embodied therein, the computer-readable program code executable (or compilable, linkable, and/or loadable to be executable) by a computing device (for example a computing device executing an operating system (for example a Linux operating system, a Linux-based operating system, a real time operating system, a mini-operating system, an edge device operating system, and/or an open source operating system)) to enable and/or cause the computing device to perform communication management operations, the communication management operations comprising: forming a communication pathway between a source computing device and a destination computing device, comprising: comparing, at the source computing device, a destination computing device nonpublic identification code obtained from a destination node packet with a destination node pre-established value.

Certain embodiments may provide, for example, a product for managing communications of a plurality of networked computing devices. In certain embodiments, for example, the product may comprise a non-transitory computer-readable storage medium having computer-readable program code embodied therein. In certain embodiments, for example, the computer-readable program code may be executable (or program code compilable, linkable, and/or loadable to be executable) by a computing device (for example a computing device executing an operating system (for example a Linux operating system, a Linux-based operating system, a real time operating system, a mini-operating system, an edge device operating system, and/or an open source operating system)) to enable and/or cause the computing device to perform communication management operations. In certain embodiments, for example, the communication management operations may comprise: establishing authorized communication pathways for port-to-port network communications among the plurality of computing devices. In certain embodiments, for example, the establishing authorized communication pathways may comprise intercepting a network connection request from a source port, the request having an associated destination port number. In certain embodiments, for example, the establishing authorized communication pathways may comprise verifying that the source port is authorized to communicate with a destination port having the associated destination port number. In certain embodiments, for example, the establishing authorized communication pathways may comprise authorizing a communication pathway between a source computing device hosting the source port and a destination computing device hosting the destination port prior to any transmission of application data between the source computing device and the destination computing device via the communication pathway. In certain embodiments, for example, the authorizing may comprise comparing, on the source computing device, a destination computing device nonpublic identification code to a destination computing device expected value, the destination computing device nonpublic identification code obtained from a destination computing device identification packet. In certain embodiments, for example, the authorizing may comprise further comparing, on the destination computing device, a source computing device nonpublic identification code to a source computing device expected value, the source computing device nonpublic identification code obtained from a source computing device identification packet.

A. In certain embodiments, for example, the destination computing device identification packet and/or the source computing device identification packet may be received via the network. In certain embodiments, for example, the destination computing device identification packet and/or the source computing device identification packet may be received via the communication pathway.

B. In certain embodiments, for example, the destination computing device expected value may be pre-provisioned on the source computing device. In certain embodiments, for example, the source computing device expected value may be pre-provisioned on the destination computing device.

C. In certain embodiments, for example, the comparing and/or the further comparing may be enabled by a kernel of the computing device. In certain embodiments, for example, the computer-readable program code may be executable (or compilable, linkable, and/or loadable to be executable) by a computing device executing an operating system (for example a Linux operating system, a Linux-based operating system, a real time operating system, a mini-operating system, an edge device operating system, and/or an open source operating system).

D. In certain embodiments, for example, the communication management operations may comprise: inserting the source computing device nonpublic identification code into a higher-than-OSI layer three portion of the source computing device identification packet. In certain embodiments, for example, the communication management operations may comprise: inserting the source computing device nonpublic identification code into a higher-than-OSI layer four portion of the source computing device identification packet. In certain embodiments, for example, the communication management operations may comprise: inserting the source computing device nonpublic identification code into a payload portion of the source computing device identification packet. In certain embodiments, for example, the communication management operations may comprise: inserting the destination computing device nonpublic identification code into a higher-than-OSI layer three portion of the destination computing device identification packet. In certain embodiments, for example, the communication management operations may comprise: inserting the destination computing device nonpublic identification code into a higher-than-OSI layer four portion of the destination computing device identification packet. In certain embodiments, for example, the communication management operations may comprise: inserting the destination computing device nonpublic identification code into a payload portion of the destination computing device identification packet.

E. In certain embodiments, for example, the communication management operations may comprise: encrypting the source computing device nonpublic identification code and inserting the encrypted source computing device nonpublic identification code into the source computing device identification packet. In certain embodiments, for example, the source computing device nonpublic identification code may be encrypted with a single-use cryptographic key. In certain embodiments, for example, the communication management operations may comprise: encrypting the destination computing device nonpublic identification code and inserting the encrypted destination computing device nonpublic identification code into the destination computing device identification packet. In certain embodiments, for example, the destination computing device nonpublic identification code is encrypted with a single-use cryptographic key.

F. In certain embodiments, for example, the communication pathway between the source computing device and the destination computing device may be established prior to the authorizing.

G. In certain embodiments, for example, the communication management operations may comprise: requesting negotiation of the communication pathway, the requesting comprising sending a connection request packet comprising the associated destination port number.

H. In certain embodiments, for example, the communication management operations may comprise: establishing authorized encrypted communication pathways for all port-to-port network communications among the plurality of networked processor nodes.

I. In certain embodiments, for example, the communication management operations may comprise: comparing user-application identifiers and a payload data-type identifiers exchanged between the source and destination computing devices with predefined authorization codes.

J. In certain embodiments, for example, the comparing and the further comparing may be performed independently. In certain embodiments, for example, the comparing and the further comparing may be performed sequentially. In certain embodiments, for example, the further comparing may not be performed until after the comparing is performed. In certain embodiments, for example, the comparing may not be performed until after the further comparing is performed. In certain embodiments, for example, the comparing and the further comparing may be performed asynchronously. In certain embodiments, for example, the comparing and the further comparing may be performed in a predetermined sequence.

Certain embodiments may provide, for example, a product for managing communications of a plurality of networked computing devices, the product comprising a non-transitory computer-readable storage medium having computer-readable program code embodied therein, the computer-readable program code executable (or compilable, linkable, and/or loadable to be executable) by a computing device (for example a computing device executing an operating system (for example a Linux operating system, a Linux-based operating system, a real time operating system, a mini-operating system, an edge device operating system, and/or an open source operating system)) to enable and/or cause the computing device to perform communication management operations, the communication management operations comprising: establishing authorized communication pathways for port-to-port network communications among the plurality of computing devices, comprising: i) intercepting, via a network, a network connection request from a source port, the request having an associated destination port number; ii) verifying that the source port is authorized to communicate with a destination port having the associated destination port number; and iii) authorizing a communication pathway between a source computing device hosting the source port and a destination computing device hosting the destination port prior to any transmission of application data between the source computing device and the destination computing device via the communication pathway, comprising: a) comparing, on the source computing device, a destination computing device nonpublic identification code to a destination computing device expected value, the destination computing device nonpublic identification code obtained from a destination computing device identification packet; and b) further comparing, on the destination computing device, a source computing device nonpublic identification code to a source computing device expected value, the source computing device nonpublic identification code obtained from a source computing device identification packet.

Certain embodiments may provide, for example, a method for secure communication between applications on two nodes. In certain embodiments, for example, the method may comprise intercepting, at a first node, a network connection request from a resident first user-application to send data to a destination port on a second node, processor, or computing device. In certain embodiments, for example, the method may comprise consulting a first local policy on the first node to verify that the first user-application is authorized to send data to the destination port. In certain embodiments, for example, the method may comprise verifying, at the second node, that the connection request is authorized by the first local policy for the destination port.

A. In certain embodiments, for example, the method may further comprise transmitting an encrypted identifier for the first local policy from the first node to the second node, processor, or computing device.

B. In certain embodiments, for example, the verifying may comprise consulting the first local policy and a second local policy, the second local policy consulted to verify that a second user application is authorized to receive the data at the destination port. In certain embodiments, for example, the first local policy may comprise an n-tuple filter. In certain embodiments, for example, the first local policy may comprise a port-to-port mapping of authorized connection between the first node and the second node, processor, or computing device. In certain embodiments, for example, the authorized port-to-port mapping may comprise an authorized first user-application identifier, an identifier for a second user application authorized to receive the data at the destination port authorized, and a data type identifier.

Certain embodiments may provide, for example, a method for secure communication between applications on two nodes, comprising: i) intercepting, at a first node, a network connection request from a resident first user-application to send data to a destination port on a second node; ii) consulting a first local policy on the first node to verify that the first user-application is authorized to send data to the destination port; and iii) verifying, at the second node, that the connection request is authorized by the first local policy for the destination port.

Certain embodiments may provide, for example, a product for managing communications of a plurality of networked computing devices. In certain embodiments, for example, the product may comprise a non-transitory computer-readable storage medium having computer-readable program code embodied therein. In certain embodiments, for example, the computer-readable program code may be executable (or compilable, linkable, and/or loadable to be executable) by a computing device (for example a computing device executing an operating system (for example a Linux operating system, a Linux-based operating system, a real time operating system, a mini-operating system, an edge device operating system, and/or an open source operating system)) to enable and/or cause the computing device to perform communication management operations. In certain embodiments, for example, the communication management operations may comprise performing communication processing functions on all port-to-network communications of the plurality of processor nodes. In certain embodiments, for example, the communication processing functions may comprise receiving data packets from a user-application source port, the data packets having payloads and associated destination port numbers. In certain embodiments, for example, the communication processing functions may comprise assembling packet segments for all received data packets from the user-application, the packet segments comprising one of the payloads, an associated user-application identifier, and a payload data type descriptor.

A. In certain embodiments, for example, the communication processing functions may comprise verifying that the source ports are authorized to communicate with ports having the associated destination port numbers.

B. In certain embodiments, for example, the communication processing functions may comprise requesting transmission of network packets to the network, each one of the network packets comprising a port number of one of the associated destination port numbers and one of the assembled packet segments.

C. In certain embodiments, for example, the communication processing functions may comprise requesting transmission of network packets to the network through encrypted communication pathways.

D. In certain embodiments, for example, each one of the encrypted communication pathways may have a one-to-one correspondence with one of the associated destination port numbers.

E. In certain embodiments, for example, the receiving may occur in a kernel of the computing device.

Certain embodiments may provide, for example, a product for managing communications of a plurality of networked computing devices, the product comprising a non-transitory computer-readable storage medium having computer-readable program code embodied therein, the computer-readable program code executable (or compilable, linkable, and/or loadable to be executable) by a computing device (for example a computing device executing an operating system (for example a Linux operating system, a Linux-based operating system, a real time operating system, a mini-operating system, an edge device operating system, and/or an open source operating system)) to enable and/or cause the computing device to perform communication management operations, the communication management operations comprising: performing communication processing functions on all port-to-network communications of the plurality of processor nodes, the performing communication processing functions comprising: i) receiving data packets from a user-application source port, the data packets having payloads and associated destination port numbers; and ii) assembling packet segments for all received data packets from the user-application, the packet segments comprising one of the payloads, an associated user-application identifier, and a payload data type descriptor.

Certain embodiments may provide, for example, a distributed method to manage communications between plural nodes coupled to a network. In certain embodiments, for example, the distributed method may comprise authorizing port-to-port connections, comprising: obtaining port numbers, node identifiers, user-application identifiers, and payload data type descriptors from pre-provisioned configuration files present on at least two computing devices of the plural computing devices. In certain embodiments, for example, the distributed method may comprise restricting network communications to and from at least one of the at least two computing devices to the authorized port-to-port connections.

Certain embodiments may provide, for example, a distributed method to manage communications between plural nodes coupled to a network, comprising: i) authorizing port-to-port connections, comprising: obtaining port numbers, node identifiers, user-application identifiers, and payload data type descriptors from pre-provisioned configuration files present on at least two computing devices of the plural computing devices; and ii) restricting network communications to and from at least one of the at least two computing devices to the authorized port-to-port connections.

Certain embodiments may provide, for example, a method for secure network communication, comprising: i) selecting, from a preconfigured, exclusive list of authorized data pathways, a dedicated data pathway extending from a source port on a first node to a destination port on a second node, the selected data pathway characterized by a tunnel port number exclusive to the destination port; ii) instantiating a network tunnel extending from the first node to a tunnel port present on the second node, the tunnel port having the selected tunnel port number; iii) prior to transmitting any data from the source port to the destination port: verifying, at the first node, that a first n-tuple received from the network tunnel matches an expected value based on the tunnel port number, the first n-tuple comprising: a nonpublic device code for the second node, a user associated with the destination port, an application associated with the destination port, and a data protocol descriptor; and iv) prior to passing a network packet to the destination port: verifying, at the second node, that an second n-tuple obtained from the network packet matches an expected value based on the tunnel port number, the second n-tuple comprising: a user associated with the source port, an application associated with the source port, and the data protocol descriptor.

Certain embodiments may provide, for example, a method for secure network communication, comprising: i) selecting, from a preconfigured, exclusive list of authorized data pathways, a dedicated data pathway extending from a source port on a first node to a destination port on a second node; ii) instantiating a network tunnel for exclusive use by the dedicated data path, the network tunnel extending from the first node to the second node; iii) prior to transmitting any data through the network tunnel, verifying that the first node, the second node, a user associated with the source port, an application associated with the source port, a user associated with the destination port, an application associated with the destination port, and a data protocol of the data match parameters of the dedicated data path; followed by iv) prior to passing a network packet to the destination port: verifying, at the second node, that the user associated with the source port, the application associated with the source port, and the data protocol descriptor match parameters of the dedicated data pathway.

Certain embodiments may provide, for example, a method of securely transmitting data, comprising: i) prior to transmitting data packets via a dedicated data pathway extending from a source port on a first node to a destination port on a second node, receiving a series of codes at the first node via the dedicated data path; ii) verifying that the received codes include expected codes for the data path, the expected codes associated with the second node, a specified data type, and an owner of the destination port; iii) verifying that the data packets contain expected codes associated with the specified data type and an owner of the source port; followed by iv) passing the data packets to the destination port.

Certain embodiments may provide, for example, a method of securely transmitting data, comprising: i) establishing a dedicated data pathway between a source port on a first node and a destination port on a second node, the destination port associated with an executing user-application configured to receive a specified data type; ii) receiving a series of codes at the first node via the dedicated data path; iii) verifying that the received series of codes include expected codes associated with the second node, the specified data type, and the user-application; followed by iv) transmitting data packets via the dedicated data pathway to the second node; v) further verifying that the transmitted data packets contain expected codes associated with the specified data type and an owner of the source port; followed by vi) passing the transmitted data packets to the destination port. In certain embodiments, for example, the transmitted data packets may be exclusive of the destination port number.

Certain embodiments may provide, for example, a method of securely transmitting data, comprising: i) assembling data packets at a first node, each one of the data packets comprising: a) plural identifiers encoded in metadata; and b) payload obtained from a user-application executing on the source node; ii) passing the assembled data packets to a second node via a dedicated data pathway, the data pathway comprising a source port associated with the user-application; iii) verifying that the metadata identifies a data type and a user-application expected based on a destination port associated with the destination address of the data packets; followed by iv) passing the data packets to the destination port. In certain embodiments, for example, the assembled data packets passed to the second node may be exclusive of the destination port number.

Certain embodiments may provide, for example, a method for secure communication. In certain embodiments, for example, the method may comprise receiving a first network packet from a first user-application, the first network packet comprising a destination port number and a payload. In certain embodiments, for example, the method may comprise forming a second network packet comprising the payload, the second network packet not comprising the destination port number. In certain embodiments, for example, the method may comprise transmitting the second network packet via a machine-to-machine network. In certain embodiments, for example, the method may comprise processing the transmitted second network packet to form a third packet comprising the destination port number and the payload. In certain embodiments, for example, the method may comprise transmitting the payload to a second user-application, the second user-application having a destination port assigned thereto, the destination port number assigned to the destination port.

Certain embodiments may provide, for example, a method for secure communication, comprising: i) receiving a first network packet from a first user-application, the first network packet comprising a destination port number and a payload; ii) forming a second network packet comprising the payload, the second network packet not comprising the destination port number; iii) transmitting the second network packet via a machine-to-machine network; and iv) processing the transmitted second network packet to form a third packet comprising the destination port number and the payload.

Certain embodiments of the presently disclosed methods, systems, products, communication management operations, software, middleware, computing infrastructure and/or apparatus may provide, for example, improvements to existing computing technology for packet-based network communications. Internet protocols allow open access for computer users to remotely access other computers and information stores easily from any access point, resulting in many points of attack for malware. While security layers have been added on top of this core architecture, modern malware exploits gaps in these layers through flaws in software and imperfect trust relationships between communicating devices. The improvements of the present disclosure include the following embodiments.

Certain embodiments may provide, for example, a method for network communication between a first computing device and a second computing device and comprising establishing a communication pathway between a first software port of the first computing device and a second software port of the second computing device according to UDP or TCP, the improvement comprising: i) sending a nonpublic first identification code for the first computing device to the second software port via the established communication pathway; ii) receiving, in response to the sending, a nonpublic second identification code for the second computing device at the first software port; and iii) comparing the nonpublic second identification code with a pre-established value for the second computing device.

Certain embodiments may provide, for example, a method for network communication comprising establishing communication pathways according to UDP or TCP, the improvement comprising: i) intercepting network connection requests having associated destination port numbers; ii) identifying predefined communication port numbers, comprising identifying at least one predefined communication port number for each associated destination port number of the associated destination port numbers; iii) sending UDP or TCP connection request packets comprising the predefined communication port numbers, each one of the communication pathways having a one-to-one correspondence with one of the predefined communication port numbers; and iv) authorizing the communication pathways, comprising comparing computing device identifiers, user-application identifiers, and payload data-type identifiers received the communication pathways with predefined authorization codes.

Certain embodiments may provide, for example, a method for network communication comprising establishing communication pathways according to UDP or TCP, the improvement comprising: i) intercepting network connection requests from source ports, the requests having associated destination port numbers; ii) verifying that the source ports are authorized to communicate with ports having the associated destination port numbers; iii) sending a UDP or TCP connection request packets comprising the associated destination port numbers; and iv) authorizing the communication pathways, comprising comparing computing device identifiers, user-application identifiers, and payload data-type identifiers received from the communication pathways with predefined authorization codes.

Certain embodiments may provide, for example, a method for network communication comprising transmitting UDP or TCP network packets through communication pathways, the improvement comprising: i) receiving data packets having payloads and associated destination port numbers; ii) identifying predefined port numbers, each one of the predefined port numbers having a one-to-one correspondence with one of the associated destination port numbers; iii) assembling packet segments, each one of the packet segments comprising one of the payloads, an associated user-application identifier, and a payload data type descriptor; and iv) requesting transmission of UDP or TCP network packets through the communication pathways, each one of the network packets comprising a port number of one of the predefined port numbers and one of the assembled packet segments, each one of the communication pathways having a one-to-one correspondence with one of the predefined port numbers.

Certain embodiments may provide, for example, a method for network communication comprising receiving UDP or TCP network packets from communication pathways, the improvement comprising: i) obtaining destination port numbers, metadata, and payloads associated with UDP or TCP network packets; ii) identifying predefined authorization codes associated with the destination port numbers, each one of the predefined authorization codes comprising a predefined user-application identifier and a predefined payload data-type identifier associated with one of the destination port numbers; iii) authorizing the network packets, comprising: comparing at least a portion of the metadata with the predefined authorization codes; and iv) requesting transmission of payloads from the authorized network packets to destinations referenced by the destination port numbers.

Certain embodiments may provide, for example, a method for network communication between a first computing device and a second computing device and comprising establishing a communication pathway between a first software port of the first computing device and a second software port of the second computing device according to UDP or TCP, the improvement comprising: one or more of the methods, systems, products, communication management operations, software, middleware, computing infrastructure and/or apparatus of any of the embodiments disclosed herein.

Certain embodiments, for example, may comprise a product for securing communications of a plurality of networked computing devices. In certain embodiments, for example, the product may comprise a non-transitory computer-readable storage medium having computer-readable program code embodied therein. In certain embodiments, for example, the computer-readable program code may be executable (or program code compilable, linkable, and/or loadable to be executable) by a first computing device (for example a computing device executing an operating system (for example a Linux operating system, a Linux-based operating system, a real time operating system, a mini-operating system, an edge device operating system, and/or an open source operating system)) to enable and/or cause the first computing device to perform communication management operations. In certain embodiments, for example, the communications management operations may comprise receiving a first network packet from a first user-application, the first network packet comprising a destination port number and a payload. In certain embodiments, for example, the communications management operations may comprise forming a second network packet comprising the payload, the second network packet not comprising the destination port number. In certain embodiments, for example, the communications management operations may comprise transmitting the second network packet to network security software on a second computing device. In certain embodiments, for example, the communications management operations may comprise confirming that the network security software is preconfigured to transmit the payload to a second user-application on the second computing device, the second user-application having a destination port assigned thereto, the destination port number assigned to the destination port.

A. In certain embodiments, for example, the first user-application may be resident on the first computing device. In certain embodiments, for example, the network security software may obtain the destination port number from a preprovisioned file, the preprovisioned file resident on non-volatile storage media in communication with the second computing device.

Certain embodiments may provide, for example, a product for managing communications of a plurality of networked computing devices, the product comprising a non-transitory computer-readable storage medium having computer-readable program code embodied therein, the computer-readable program code executable (or compilable, linkable, and/or loadable to be executable) by a first computing device executing an operating system (for example a Linux operating system, a Linux-based operating system, a real time operating system, a mini-operating system, an edge device operating system, and/or an open source operating system) to enable and/or cause the first computing device to perform communication management operations, the communication management operations comprising: i) receiving a first network packet from a first user-application, the first network packet comprising a destination port number and a payload; ii) forming a second network packet comprising the payload, the second network packet not comprising the destination port number; iii) transmitting the second network packet to network security software on a second computing device; and iv) confirming that the network security software is preconfigured to transmit the payload to a second user-application on the second computing device, the second user-application having a destination port assigned thereto, the destination port number assigned to the destination port.

A. In any of the products disclosed herein for use on a computing device (for example products for managing communications), the product or a portion thereof may be distributed separately (for example on separate non-transitory computer-readable storage media) from at least a portion (for example all) of an operating system or kernel running (or to be run) on the computing device. In certain embodiments, for example, the product or a portion thereof may be installed separately from at least a portion (for example all) of an operating system or kernel running (or to be run) on the computing device. In certain embodiments, for example, the product or a portion thereof may be compiled separately from at least a portion (for example all) of an operating system or kernel running (or to be run) on the computing device. In certain embodiments, for example, the product or a portion thereof is linked separately from at least a portion (for example all) of an operating system or kernel running on the computing device. In certain embodiments, computer-readable program code executable (or compilable, linkable, and/or loadable to be executable) by a computing device to perform one or more of the communication management operations and/or processing functions disclosed herein (for example one or more of the establishing, performing, intercepting, identifying, requesting, authorizing, verifying, receiving, assembling, requesting transmission, encrypting, decrypting, inserting, translating, comparing, further comparing, additionally comparing, obtaining, negotiating, identifying, or forming operations or functions disclosed herein) are distributed on separate non-transitory computer-readable storage media from computer-readable program code executable (or compilable, linkable, and/or loadable to be executable) by the computing device to perform the other of the communication management operations and/or processing functions. In certain embodiments, for example, the computer-readable program code executable (or compilable, linkable, and/or loadable to be executable) by a computing device to perform the intercepting may be distributed on separate non-transitory computer-readable storage media from the computer-readable program code executable (or compilable, linkable, and/or loadable to be executable) by the computing device to perform other communication management operations and/or processing functions disclosed herein.

B. In certain embodiments, for example, computer-readable program code executable (or compilable, linkable, and/or loadable to be executable) by a computing device to perform the intercepting and/or the receiving operations or functions on a computing device may be distributed separately (for example on separate non-transitory computer-readable storage media) from computer-readable program code executable (or compilable, linkable, and/or loadable to be executable) by the computing device to perform one or more of the identifying, authorizing, verifying, assembling, encrypting, decrypting, inserting, translating, comparing, further comparing, additionally comparing, obtaining, negotiating, identifying, and forming operations or functions. In certain embodiments, for example, computer-readable program code executable (or compilable, linkable, and/or loadable to be executable) by a computing device to perform the intercepting and/or the receiving operations or functions may be installed separately from computer-readable program code executable (or compilable, linkable, and/or loadable to be executable) by the computing device to perform one or more of the identifying, authorizing, verifying, assembling, encrypting, decrypting, inserting, translating, comparing, further comparing, additionally comparing, obtaining, negotiating, identifying, and forming operations or functions. In certain embodiments, for example, computer-readable program code executable (or compilable, linkable, and/or loadable to be executable) by a computing device to perform the intercepting and/or the receiving operations or functions may be compiled separately from computer-readable program code executable (or compilable, linkable, and/or loadable to be executable) by the computing device to perform one or more of the identifying, authorizing, verifying, assembling, encrypting, decrypting, inserting, translating, comparing, further comparing, additionally comparing, obtaining, negotiating, identifying, and forming operations or functions. In certain embodiments, for example, the computer-readable program code executable (or compilable, linkable, and/or loadable to be executable) by a computing device to perform intercepting and/or the receiving operations or function may be linked separately from computer-readable program code executable (or compilable, linkable, and/or loadable to be executable) by the computing device to perform one or more of the identifying, authorizing, verifying, assembling, encrypting, decrypting, inserting, translating, comparing, further comparing, additionally comparing, obtaining, negotiating, identifying, and forming operations or functions.

C. In certain embodiments, for example, the computer-readable program code executable (or compilable, linkable, and/or loadable to be executable) by a computing device to perform one or more of the communication management operations and/or processing functions disclosed herein may be executable (or compilable, linkable, and/or loadable to be executable) in a kernel of the computing device.

D. In certain embodiments, for example, the computer-readable program code executable (or compilable, linkable, and/or loadable to be executable) by a computing device to perform one or more of the communication management operations and/or processing functions disclosed herein may be agnostic as to the operating system or kernel running on the computing device. In certain embodiments, for example, computer-readable program code executable (or compilable, linkable, and/or loadable to be executable) by a computing device to perform one or more of the communication management operations and/or processing functions disclosed herein may contain only a minimum interface functionality required to communicate with an operating system or kernel running on the computing device, and be otherwise agnostic as to the operating system or kernel running. In certain further embodiments, for example, the minimum interface functionality may comprise a kernel header, a definition file, a variable definition, mandatory kernel call, or a combination of two or more of the foregoing. In certain further embodiments, for example, the minimum interface functionality may be limited to one or more kernel headers, one or more definition files, one or more variable definitions, one or more mandatory kernel calls, or a combination of two or more of the foregoing. In certain embodiments, for example, computer-readable program code executable (or compilable, linkable, and/or loadable to be executable) by a computing device to perform one or more of the communication management operations and/or processing functions disclosed herein may be exclusive of any portion of code of a pre-existing operating system or kernel executable (or compilable, linkable, and/or loadable to be executable) on the computing device. In certain embodiments, for example, computer-readable program code executable (or compilable, linkable, and/or loadable to be executable) by a computing device to perform one or more of the communication management operations and/or processing functions disclosed herein may be exclusive of any calls to functions or modules of a pre-existing operating system or kernel executable (or compilable, linkable, and/or loadable to be executable) on the computing device.

E. In certain embodiments, for example, computer-readable program code executable (or compilable, linkable, and/or loadable to be executable) by a computing device to perform one or more of the communication management operations and/or processing functions disclosed herein may receive data from an end-user application program via an operating system or kernel executable (or compilable, linkable, and/or loadable to be executable) on the computing device. In certain embodiments, for example, computer-readable program code executable (or compilable, linkable, and/or loadable to be executable) by a computing device to perform one or more of the communication management operations and/or processing functions disclosed herein may not receive any further data from an operating system or kernel executable (or compilable, linkable, and/or loadable to be executable) on the computing device. In certain embodiments, for example, computer-readable program code executable (or compilable, linkable, and/or loadable to be executable) by a computing device to perform one or more of the communication management operations and/or processing functions disclosed herein may not receive any further data from an operating system or kernel executable (or compilable, linkable, and/or loadable to be executable) on the computing device. In certain embodiments, for example, computer-readable program code executable (or compilable, linkable, and/or loadable to be executable) by a computing device to perform one or more of the communication management operations and/or processing functions disclosed herein (for example all of communication management operations and/or processing functions disclosed herein) may not share any address space (for example kernel address space) with an operating system or kernel executable (or compilable, linkable, and/or loadable to be executable) on the computing device. In certain embodiments, for example, computer-readable program code executable (or compilable, linkable, and/or loadable to be executable) by a computing device to perform one or more of the communication management operations and/or processing functions disclosed herein may not use and/or manipulate any operating system or kernel data structure on the computing device.

F. In certain embodiments, for example, at least a portion of computer-readable program code executable (or compilable, linkable, and/or loadable to be executable) by a computing device to perform one or more of the communication management operations and/or processing functions disclosed herein may not be subject to a copyleft license. In certain embodiments, for example, computer-readable program code executable (or compilable, linkable, and/or loadable to be executable) by a computing device to perform one or more of the communication management operations and/or processing functions disclosed herein may not be subject to a copyleft license. In certain embodiments, for example, computer-readable program code executable (or compilable, linkable, and/or loadable to be executable) by a computing device to perform one or more of the communication management operations and/or processing functions disclosed herein may not be subject to a General Public License (GPL), for example the GPL version 1, the GPL version 2, the GPL version 3, a Lesser GPL, or a modified GPL. In certain embodiments, for example, computer-readable program code executable (or compilable, linkable, and/or loadable to be executable) by a computing device to perform one or more of the communication management operations and/or processing functions disclosed herein may not be subject to a Berkeley Software Distribution (BSD) license, for example a BSD License version 2.0, a Revised BSD License, a New BSD license, a Modified BSD License, or an otherwise modified BSD license.

G. In certain embodiments, for example, at least a portion of the computer-readable program code executable (or compilable, linkable, and/or loadable to be executable) by a computing device (for example a portion of the computer-readable program code executable (or compilable, linkable, and/or loadable to be executable) by a computing device that may not be subject to a copyleft license) may be in communication with (for example may be linked to and/or may exchange data with) software that may be subject to a copyleft license (for example software that may be subject to the GPL version 2). In certain embodiments, for example, the software that may be subject to a copyleft license may be part or all of a kernel or an operating system or kernel. In certain embodiments, for example, the software that may be subject to a copyleft license may be an operating system (for example a Linux operating system, a Linux-based operating system, a real time operating system, a mini-operating system, an edge device operating system, and/or an open source operating system) or kernel. In certain embodiments, for example, the software that may be subject to a copyleft license may be at a boundary (or edge or periphery) of the kernel (for example the software that may be subject to a copyleft license may be an API such as a network API). In certain embodiments, for example, the software that may be subject to a copyleft license may be an interoperability interface (for example an interface for communication between at least a portion of a kernel running on the computing device and an application running on the computing device.

H. In certain embodiments, for example, computer-readable program code executable (or compilable, linkable, and/or loadable to be executable) by a computing device to perform one or more of the communication management operations and/or processing functions disclosed herein may not comprise part of an operating system or kernel executable (or compilable, linkable, and/or loadable to be executable) on the computing device. In certain embodiments, for example, computer-readable program code executable (or compilable, linkable, and/or loadable to be executable) by a computing device to perform one or more of the communication management operations and/or processing functions disclosed herein may be executable (or compilable, linkable, and/or loadable to be executable) in a kernel of the computing device, for example in a privileged processing space, while not comprising part of an operating system or kernel executable (or compilable, linkable, and/or loadable to be executable) on the computing device. In certain embodiments, for example, computer-readable program code executable (or compilable, linkable, and/or loadable to be executable) by a computing device to perform one or more of the communication management operations and/or processing functions disclosed herein may be executable (or compilable, linkable, and/or loadable to be executable) in an application space of the computing device.

I. In certain embodiments, for example, a portion of the computer-readable program code executable (or compilable, linkable, and/or loadable to be executable) by a computing device may be executable (or compilable, linkable, and/or loadable to be executable) in a kernel space of the computing device, and a further portion of the computer-readable program code executable (or compilable, linkable, and/or loadable to be executable) by a computing device may be executable (or compilable, linkable, and/or loadable to be executable) in an application space of the computing device. In certain embodiments, for example, a portion of the computer-readable program code executable (or compilable, linkable, and/or loadable to be executable) by a computing device may be executable (or compilable, linkable, and/or loadable to be executable) in a kernel space of the computing device, and a further portion of the computer-readable program code executable (or compilable, linkable, and/or loadable to be executable) by a computing device may not be executable (or compilable, linkable, and/or loadable to be executable) in the kernel space (for example it may be executable in the application space or other non-privileged or non-priority executable space).

J. In certain embodiments, for example, computer-readable program code executable (or compilable, linkable, and/or loadable to be executable) by a computing device to perform the intercepting and/or the receiving operations or functions may be executable (or compilable, linkable, and/or loadable to be executable) in a kernel space of the computing device, and computer-readable program code executable (or compilable, linkable, and/or loadable to be executable) by a computing device to perform one or more of the assembling, requesting transmission, encrypting, decrypting, inserting, translating, comparing, further comparing, and additionally comparing operations or functions may be executable (or compilable, linkable, and/or loadable to be executable) in an application space of the computing device. In certain embodiments, for example, computer-readable program code executable (or compilable, linkable, and/or loadable to be executable) by a computing device to perform the intercepting and/or the receiving operations or functions may be executable (or compilable, linkable, and/or loadable to be executable) in a kernel space of the computing device, and computer-readable program code executable (or compilable, linkable, and/or loadable to be executable) by a computing device to perform one or more of the assembling, requesting transmission, encrypting, decrypting, inserting, translating, comparing, further comparing, and additionally comparing operations or functions may not be executable (or compilable, linkable, and/or loadable to be executable) in the kernel space.

K. In certain embodiments, for example, computer-readable program code executable (or compilable, linkable, and/or loadable to be executable) by a computing device to perform one or more of the communication management operations and/or processing functions disclosed herein may be a plug-in. In certain embodiments, for example, computer-readable program code executable (or compilable, linkable, and/or loadable to be executable) by a computing device to perform one or more of the communication management operations and/or processing functions disclosed herein may be present in a library (for example in a dynamic-link library). In certain embodiments, for example, computer-readable program code executable (or compilable, linkable, and/or loadable to be executable) by a computing device to perform one or more of the communication management operations and/or processing functions disclosed herein may be a loadable module. In certain embodiments, for example, the loadable module may be loaded by a computing device during bootup of the computing device. In certain embodiments, for example, the loadable module may be loaded by a computing device prior to loading of an operating system (for example may be loaded by an initial runtime environment or loaded by a Basic Input/Output System (BIOS)). In certain embodiments, for example, the loadable module may be loaded by the computing device after bootup of the computing device. In certain embodiments, for example, the loadable module may be loaded by the computing device during runtime. In certain embodiments, for example, computer-readable program code executable (or compilable, linkable, and/or loadable to be executable) by a computing device to perform one or more of the communication management operations and/or processing functions disclosed herein may be a loadable kernel module. In certain embodiments, for example, computer-readable program code executable (or compilable, linkable, and/or loadable to be executable) by a computing device to perform one or more of the communication management operations and/or processing functions disclosed herein may be a loadable application module. In certain embodiments, for example, computer-readable program code executable (or compilable, linkable, and/or loadable to be executable) by a computing device to perform one or more of the communication management operations and/or processing functions disclosed herein may be a driver.

L. In certain embodiments, for example, computer-readable program code executable (or compilable, linkable, and/or loadable to be executable) by a computing device to perform one or more of the communication management operations and/or processing functions disclosed herein may be dynamically linkable (for example may be a dynamically linkable module, such as a dynamically linkable loadable module). In certain embodiments, for example, the computer-readable program code may be dynamically linkable with a kernel (for example with a Linux or Linux-based kernel). In certain embodiments, for example, the computer-readable program code may be dynamically linkable with an operating system or kernel (for example with an operating system (for example a Linux operating system, a Linux-based operating system, a real time operating system, a mini-operating system, an edge device operating system, and/or an open source operating system)). In certain embodiments, for example, references (for example symbol tables, module names, memory offsets, etc.) to the dynamically linkable program code may be stored in a kernel space of the computing device. In certain embodiments, for example, references to the dynamically linkable program may be stored in an application space of the computing device. In certain embodiments, for example, the computer-readable program code may be compiled separately from an operating system or a kernel to form a kernel loadable module. In certain embodiments, for example, the kernel loadable module may be dynamically linked with the kernel during runtime on the computing device.

M. In certain embodiments, for example, computer-readable program code executable (or compilable, linkable, and/or loadable to be executable) by a computing device to perform one or more of the communication management operations and/or processing functions disclosed herein may be linkable (for example dynamically or statically linkable). In certain embodiments, for example, the computer-readable program code may be linkable in a kernel (for example with a Linux or Linux-based kernel). In certain embodiments, for example, the computer-readable program code may be linkable with an operating system (for example with an operating system (for example a Linux operating system, a Linux-based operating system, a real time operating system, a mini-operating system, an edge device operating system, and/or an open source operating system)). In certain embodiments, for example, the computer-readable program code may be linkable (for example dynamically or statically linkable) to an application program. In certain embodiments, for example, the computer-readable program code may be linkable (for example dynamically or statically linkable) to an interface (for example an interoperability interface). In certain embodiments, for example, the computer-readable program code may be linkable (for example dynamically or statically linkable) to an interface between an application space of the computing device and a kernel space of the computing device. In certain embodiments, for example, the computer-readable program code may be linkable (for example dynamically or statically linkable) to an application-to-kernel program interface (for example an interface such as Netlink or Netlinks). In certain embodiments, for example, computer-readable program code may be linkable (for example dynamically or statically linkable) to an application-to-application program interface. In certain embodiments, for example, computer-readable program code may be linkable (for example dynamically or statically linkable) to a kernel-to-kernel program interface.

N. In certain embodiments, for example, computer-readable program code executable (or compilable, linkable, and/or loadable to be executable) by a computing device to perform one or more of the communication management operations and/or processing functions disclosed herein may be a statically linkable module. In certain embodiments, for example, computer-readable program code executable (or compilable, linkable, and/or loadable to be executable) by a computing device to perform one or more of the communication management operations and/or processing functions disclosed herein may be a standalone program.

O. In certain embodiments, for example, computer-readable program code executable (or compilable, linkable, and/or loadable to be executable) by a computing device to perform one or more of the communication management operations and/or processing functions disclosed herein may be an object file. In certain embodiments, for example, computer-readable program code executable (or compilable, linkable, and/or loadable to be executable) by a computing device to perform one or more of the communication management operations and/or processing functions disclosed herein may be compilable ASCII code. In certain embodiments, for example, computer-readable program code executable (or compilable, linkable, and/or loadable to be executable) by a computing device to perform one or more of the communication management operations and/or processing functions disclosed herein may be compiled.

P. In certain embodiments, for example, computer-readable program code executable (or compilable, linkable, and/or loadable to be executable) by a computing device to perform intercepting and/or the receiving operations or functions may be invoked by one or more modified kernel functions (for example by a modified network API function such as bind( ) or connect( )). In certain embodiments, for example, the computer-readable program code executable (or compilable, linkable, and/or loadable to be executable) by a computing device to perform intercepting and/or the receiving operations or functions may be invoked by one or more modified kernel functions, and computer-readable program code executable (or compilable, linkable, and/or loadable to be executable) by a computing device to perform one or more of the identifying, authorizing, verifying, comparing, further comparing, and additionally comparing, may be part or all of a separate executable (or compilable, linkable, and/or loadable to be executable) code that communicates, via an inter-program interface (for example Netlink or Netlinks), with the computer-readable program code executable (or compilable, linkable, and/or loadable to be executable) by a computing device to perform one or more of the assembling, encrypting, decrypting, inserting, and translating operations or functions. In certain embodiments, for example, the one or more modified kernel functions may be licensed under the GPL version 2. In certain further embodiments, the computer-readable program code executable (or compilable, linkable, and/or loadable to be executable) by a computing device to perform one or more of the establishing, performing, intercepting, identifying, requesting, authorizing, verifying, receiving, assembling, requesting transmission, encrypting, decrypting, inserting, translating, comparing, further comparing, additionally comparing, obtaining, negotiating, identifying, forming operations or functions may not be licensed under a GPL or a BSD license. In certain embodiments, for example, the modified kernel function may be statically linked with an operating system executable (or compilable, linkable, and/or loadable to be executable) on the computing device. In certain embodiments, for example, the modified kernel function may be dynamically linked with an operating system running on the processor.

Certain embodiments may provide, for example, a computer program product comprising a computer readable storage medium having a computer readable program stored therein, wherein the computer readable program, when executed on a computing device, enables or causes the computing device to perform one or more of the methods disclosed herein.

Certain embodiments may provide, for example, a computer program product comprising a computer readable storage medium having a computer readable program stored therein, wherein the computer readable program, when executed on a computing device, further enables or causes the computing device to perform one or more of the methods disclosed herein.

Certain embodiments may provide, for example, a computer program product comprising a computer readable storage medium having a computer readable program stored therein, wherein the computer readable program, when executed on a computing device running a Linux operating system, enables or causes the computing device to perform one or more of the methods disclosed herein.

Certain embodiments may provide, for example, a computer program product comprising a computer readable storage medium having a computer readable program stored therein, wherein the computer readable program, when executed on a computing device running an operating system (for example, Linux), further enables or causes the computing device to perform one or more of the methods disclosed herein.

Certain embodiments may provide, for example, an apparatus, comprising: a processor; and a memory coupled to the processor, wherein the memory comprises instructions which, when executed by the processor, enable or cause the processor to perform one or more of the methods disclosed herein.

Certain embodiments may provide, for example, a system, comprising: one or more processors; a memory coupled to said one or more processors, said memory including a computer useable medium tangibly embodying at least one program of instructions executable by at least one of said one or more processors to perform one or more of the methods disclosed herein.

Certain embodiments may provide, for example, a computer program product, comprising: one or more machine-useable storage media; program instructions provided by said one or more media for programming a data processing platform to perform one or more of the methods disclosed herein.

Certain embodiments may provide, for example, an apparatus comprising: a host operating system comprising an active kernel and an active container; and a processor operable with said active kernel to instantiate instances for active Kernel Loadable Modules (KLMs) for servicing said active container, said active KLM's executable to perform one or more of the methods disclosed herein.

Certain embodiments may provide, for example, a system, comprising: one or more processors; an operating system executing on said one or more processors; memory coupled to said one or more processors, said memory including a computer useable medium tangibly embodying at least one program of instructions executable by at least one of said one or more processors to perform operations to perform one or more of the methods disclosed herein.

Certain embodiments may provide, for example, logic encoded on one or more non-transitory computer readable media for execution and when executed operable to perform one or more of the methods disclosed herein.

Certain embodiments may provide, for example, logic encoded on one or more non-transitory computer readable media for execution on one or more processors executing operating system commands, when executed operable to perform one or more of the methods disclosed herein.

Certain embodiments may provide, for example, a readable storage medium having a computer readable program stored therein, wherein the computer readable program, when executed on a computing device, causes the computing device to perform one or more of the methods disclosed herein.

Certain embodiments may provide, for example, a computing device comprising: a memory containing machine readable medium comprising machine executable code having stored thereon instructions to perform one or more of the methods disclosed herein.

Certain embodiments may provide, for example, a computer program product to perform one or more of the methods disclosed herein, the computer program product comprising: one or more computer readable storage media; and program instructions stored on the one or more computer readable storage media to perform the one or more of the methods disclosed herein.

Certain embodiments may provide, for example, a non-transitory machine-readable storage medium comprising instructions to provide enhanced communication security of a system comprising a processor operating with a Linux or Linux-based operating system, the instructions executable by the processor one or more of the methods disclosed herein.

Certain embodiments may provide, for example, a distributed system, comprising: i) a first computing device; ii) a first network security file containing first parameters, the first network security file resident on the first computing device; iii) a first copy of a network security software, at least a portion of the first copy configured to operate in a kernel of the first computing device; iv) a second computing device; v) a second network security file containing second parameters, the second network security file resident on the second computing device; vi) a second copy of the network security software, at least a portion of the second copy configured to operate in a kernel of the second computing device; and vii) a dedicated port-to-port encrypted communication pathway between the first copy and the second copy, the first copy configured to receive first codes from the second copy and to compare the first codes with the first parameters, to verify that the first copy is authorized to send information to and/or receive information from a user-process running on the second computing device via the dedicated port-to-port encrypted communication pathway, and the second copy configured to receive second codes from the first copy and to compare the second codes with the second parameters, to verify that the user-process is authorized to send information to and/or receive information from the first copy via the dedicated port-to-port encrypted communication pathway.

A. In certain embodiments, for example, the first codes, the second codes, the first parameters, and the second parameters are isolated (for example not accessible by and/or isolated in memory) from user-applications on the first computing device and the second computing device. In certain embodiments, for example, the first codes may be obtained (for example obtained by the second copy) from the second network security file. In certain embodiments, for example, the second codes may be obtained (for example obtained by the first copy) from the first network security file.

B. In certain embodiments, for example, all but at most one (or at most two, three, 10%, 20%, or 20-75%) of the first codes may be present in only a single record of the second network security file. In certain embodiments, for example, the first codes may form a unique n-tuple (for example the n-tuple may be an at least a 2-tuple, an at least a 3-tuple, an at least a 5-tuple, an at least a 6-tuple, an at least an 8-tuple, an at least a 10-tuple, or an at least a 12-tuple) in the second network security file.

C. In certain embodiments, for example, all but at most one (or at most two, three, 10%, 20%, or 20-75%) of the second codes may be present in only a single record of the first network security file. In certain embodiments, for example, the second codes may form a unique n-tuple in the first network security file. In certain embodiments, for example, the first network security file may be different from the second network security file. In certain embodiments, for example, the first parameters may be different from the second parameters.

Certain embodiments may provide, for example, a distributed system, comprising: i) N plural computing devices, which N is an integer (for example N may be at least 2, at least 3, at least 4, at least 6, at least 10, at least 15, at least 20, at least 50, at least 100, at least 250, at least 1000, at least 10,000, at least 100,000, or N may be at least 1,000,000); ii) N plural network security files containing plural parameters, each one of the N plural computing devices having a different one of the N plural network security files resident thereon; iii) N copies of a network security software, each of the N plural computing devices having one of the N copies of network security software installed thereon and configured to operating in a kernel thereof; iv) dedicated port-to-port encrypted communication pathways among the N copies of network security software, a first copy of the N copies configured to receive first codes from a second copy of the N copies and to compare first codes with first parameters of the plural parameters, to verify that the first copy is authorized to send information to and/or receive information from a user-process via one of the dedicated port-to-port encrypted communication pathways, a second copy of the N copies configured to receive second codes from the first copy and to compare the second codes with second parameters of the plural parameters, to verify that the user-process is authorized to send information to and/or receive information from the first copy via the one of the dedicated port-to-port encrypted communication pathways, the first codes present on at most two of the N plural computing devices, the second codes present only on the at most two of the N plural computing devices, the first parameters present only on the at most two of the N plural computing devices, and the second parameters present only on the at most two of the N plural computing devices.

Certain embodiments may provide, for example, a distributed system, comprising: i) N plural computing devices, which N is an integer; ii) N plural network security files containing plural parameters, each one of the N plural computing devices having a different one of the N plural network security files resident thereon; iii) a series of N groups of communication management operations, each of the N plural computing devices having one of the N groups installed thereon and configured to operating in a kernel thereof; iv) dedicated port-to-port encrypted communication pathways among the N groups, a first group of the N groups configured to receive first codes from a second group of the N groups and to compare first codes with first parameters of the plural parameters, to verify that the first group is authorized to send information to and/or receive information from a user-process via one of the dedicated port-to-port encrypted communication pathways, a second group of the N groups configured to receive second codes from the first group and to compare the second codes with second parameters of the plural parameters, to verify that the user-process is authorized to send information to and/or receive information from the first group via the one of the dedicated port-to-port encrypted communication pathways, the first codes present on at most two of the N plural computing devices, the second codes present only on the at most two of the N plural computing devices, the first parameters present only on the at most two of the N plural computing devices, and the second parameters present only on the at most two of the N plural computing devices.

BRIEF DESCRIPTION OF THE DRAWINGS

FIG. 24: Schematic view of first node having network configuration first data structure.

FIG. 28: Schematic view of first node having network configuration fifth data structure.

FIG. 30: Schematic view of first node having network configuration seventh data structure.

FIG. 36: Schematic view of second node having network configuration tenth data structure.

DETAILED DESCRIPTION OF THE INVENTION

Figure 1:
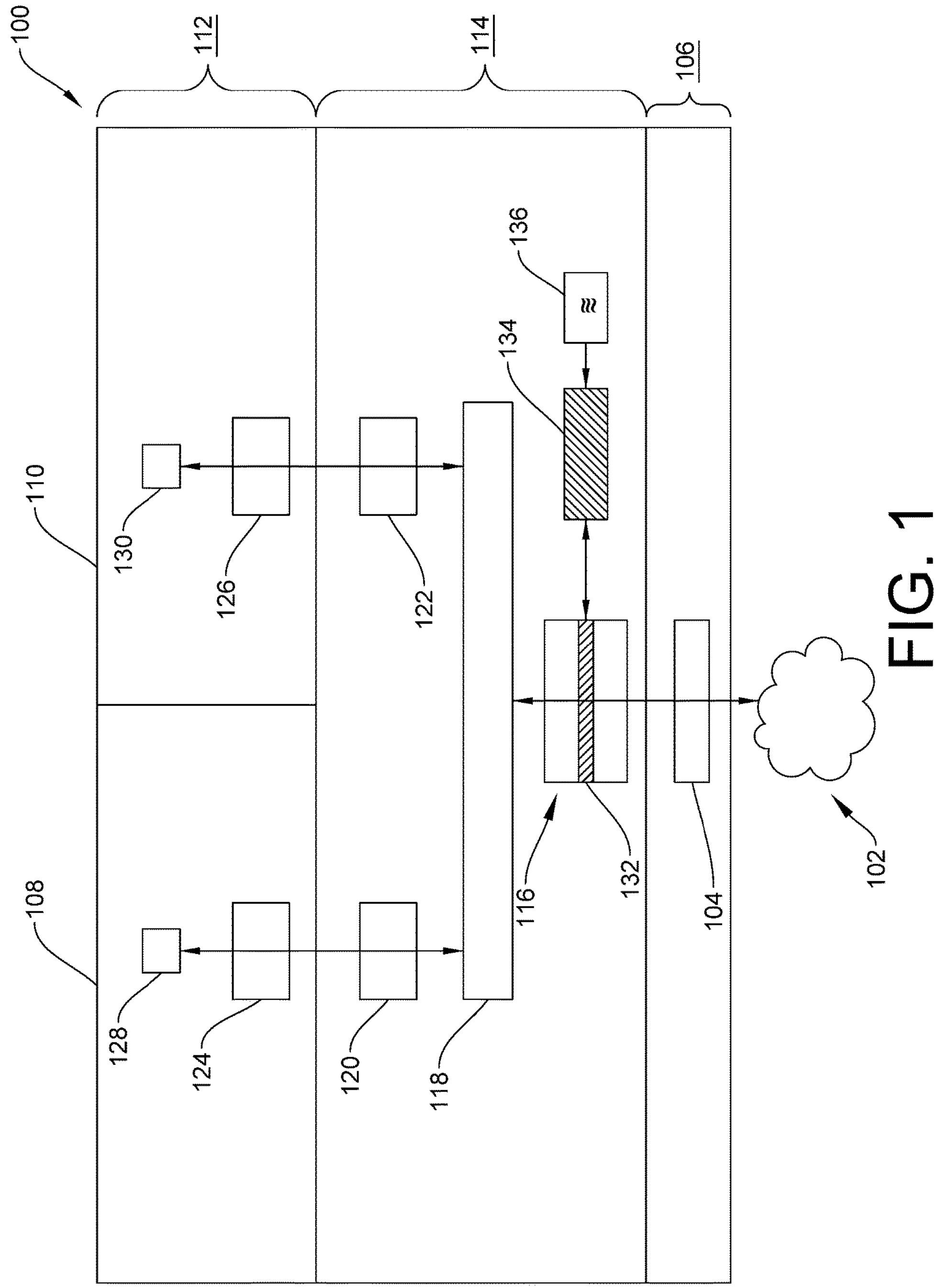
FIG. 1: Schematic view of exemplary node comprising a hypervisor and virtual machines.

Certain embodiments may provide, for example, a method, system, product, software, middleware, computing infrastructure and/or apparatus for securing communications in a host computer coupled to a network, the host computer having a hypervisor running one or plural virtual machines executing therein (for example one or plural virtual machines executing in an execution space of the host computer). In certain embodiments, for example, any of the nodes or devices disclosed in one of the REFERENCE APPLICATIONS may be one or more virtual machines running on the host computer, wherein the hypervisor of the host computer and optionally the one or more virtual machines are running network security software comprising one or more of the methods, systems, products, communication management operations, software, middleware, computing infrastructure and/or apparatus disclosed in one of the REFERENCE APPLICATIONS. In certain embodiments, for example, one of the nodes may comprise a virtual version of one or more of the CPUs, physical storage media, interfaces, etc. disclosed in one of the REFERENCE APPLICATIONS.

In certain embodiments, for example, the host computer may comprise a hardware platform. In certain embodiments, for example, the hardware platform may comprise all physical devices, channels, and adapters of the host computer. In certain embodiments, for example, the hardware platform may comprise a PNIC that enables the host computer to connect to the network. In certain embodiments, for example, the PNIC may implement electronic circuitry to communicate using a specific physical layer and data link layer standard, such as Ethernet, Wi-Fi, or Token Ring. In certain embodiments, for example, the PNIC may use one or more techniques to indicate the availability of packets to transfer. In certain embodiments, for example, the PNIC may operate in a polling mode, whereby a central processing unit of the host computer executes a program to examine the status of the PNIC. In certain embodiments, for example, the PNIC may operate in an interrupt-driven mode, whereby the PNIC alerts the central processing unit (via a generated interrupt) that the PNIC is ready to transfer data. In certain embodiments, for example, the hardware platform may comprise host bus adapters, which enable communication to external storage devices. In certain embodiments, for example, the hardware platform may comprise physical central processing units of the host computer. In certain embodiments, for example, the hardware platform may comprise random access memory (RAM). In certain embodiments, for example, the RAM may store computer programs being executed. In certain embodiments, for example, the RAM may store data required for such computer programs. In certain embodiments, for example, the RAM may store one or plural data structures needed to support network data communication (for example, various data components that comprise a virtual switch (as described herein), virtual ports, routing tables, and the like).

In certain embodiments, for example, at least one of the one or plural virtual machines may be a software implementation of a physical computing device which executes programs like a physical computer. In certain embodiments, for example, the at least one of the one or plural virtual machines may comprise one or plural virtual central processing units. In certain embodiments, for example, the at least one of the one or plural virtual machines may comprise one or plural virtual device drivers (for example one or plural VNIC drivers). In certain embodiments, for example, the at least one of the one or plural virtual machines may run one or plural virtualized applications. In certain embodiments, for example, the at least one of the one or plural virtual machines may implement, in software, a particular computing architecture and platform that supports the execution of software applications under the control of a guest OS. In certain embodiments, for example, the guest operating system may be a commodity operating systems, such as any of the versions of the Windows® operating system from Microsoft Corp., a Linux or Linux-based operating system, the Android® operating system from Google, or the MacOS® X from Apple, Inc. In certain embodiments, for example, the one or plural virtual machines may be plural virtual machines, and a first virtual machine of the plural virtual machines may have a first operating system and a second virtual machine of the plural virtual machines may have a second operating system, wherein the first operating system is a different type of operating system (or a different version of an operating system) from the second operating system.

In certain embodiments, for example, the one or plural virtual machines may communicate with the hypervisor. In certain embodiments, for example, the hypervisor may provide the operating system platform for running processes on the host device. In certain embodiments, for example, the hypervisor may control all hardware devices within the host device and manage all system resources for all applications running therein. In certain embodiments, for example, the hypervisor may provide console services. In certain embodiments, for example, the hypervisor may provide file system services. In certain embodiments, for example, the hypervisor may provide device drivers. In certain embodiments, for example, the hypervisor may provide resource scheduling. In certain embodiments, for example, the hypervisor may provide network data transmission. In certain embodiments, for example, the hypervisor may provide software components that provide for the instantiation of the one or plural virtual machines on the host device.

In certain embodiments, for example, the hypervisor may comprise one or plural virtual machine monitors. In certain embodiments, for example, each virtual machine monitor ("VMM") of the one or plural virtual machine monitors may be assigned to one of the one or plural virtual machines. In certain embodiments, for example, at least one of the one or plural VMMs may be a software layer that provides a virtual hardware platform to a guest OS a corresponding virtual machine, allowing a particular VMM to provide a corresponding virtual machine access to services provided by a kernel component of the hypervisor. In certain embodiments, for example, the kernel component services may comprise memory management. In certain embodiments, for example, the kernel component services may comprise networking and storage stacks. In certain embodiments, for example, the kernel component services may comprise process scheduling. In certain embodiments, for example, the kernel component may serve as a liaison between virtual machines and physical hardware of the host computer. In certain embodiments, for example, the kernel component may be a central operating system component that executes directly on the host computer. In certain embodiments, for example, the kernel component may allocate memory to the one or plural virtual machines. In certain embodiments, for example, the kernel component may schedule access to one or plural physical central processing units. In certain embodiments, for example, the kernel component may manage access to physical hardware devices connected to the host computer.

In certain embodiments, for example, the one or plural virtualized applications running on the one or plural virtual machines may communicate over the network by transmitting network packets to other virtual machines and/or bare metal devices using one or plural VNICs of the one or plural virtual machines. In certain embodiments, for example, a VNIC component of a VMM may be a software emulation of a PNIC, whereby a guest OS may transmit and receive data packets in the same way that an operating system that runs directly on a computer host (i.e., in a non-virtualized manner) transmits and receives data packets using PNICs. In certain embodiments, for example, the hypervisor may perceive a VNIC as a source application from which it receives data packets that are to be transmitted over a network via one or more PNICs of the host computer, or as a destination application for data packets that are received over the network via a PNIC of the host computer. In certain embodiments, for example, the hypervisor may transmit data packets between virtual machines that execute on the host computer without transmitting those data packets over the network (i.e., via any of the PNICs of host computer). In certain embodiments, for example, use of a VNIC for network communication may add to the layers of networking software required for processing data packets.

In certain embodiments, for example, at least one of the one or plural virtual machines running on the host device may transmit network packets from the VNIC to a virtual switch (i.e., a software emulation of a physical network switch that would operate at the data-link layer, the virtual switch executing in the hypervisor), whereafter the virtual switch transmits the network packets to a PNIC of the host computer for further transmission over the network. In certain embodiments, for example, the virtual switch may enable one or plural virtual machines executing on the host computer to communicate with each other using the same protocols as physical switches. In certain embodiments, for example, the virtual switch may emulate a physical network switch by allowing virtual machines to connect to one or more ports (via the corresponding VNIC of the virtual machines), accepting frames of data (for example Ethernet frames) from the VNICs, and forwarding the frames to other VNICs connected to other ports of the virtual switch, or, alternatively, to a PNIC of the host computer. In certain embodiments, for example, the kernel component may implement the virtual switch.

In certain embodiments, for example, a guest OS of at least one of the one or plural virtual machines may comprise a passthrough driver. In certain embodiments, for example, the passthrough driver may connect with a PNIC via a VMM without any intervening connection through a virtual switch, VNIC, or a physical PNIC driver provided by the hypervisor (or, for example, through an operating system of the host computer). In certain embodiments, for example, a PNIC may be configured to support connectivity to a host PNIC device driver as well as the passthrough driver. In certain further embodiments, for example, data packets that are transmitted to and from a first virtual machine may be routed through a virtual switch to a PNIC, while data packets that are transmitted to and from a second virtual machine may be transmitted via a connection between the passthrough driver and the PNIC (or a different PNIC) via a VMM.

In certain embodiments, for example, the hypervisor may be a VMware product. In certain embodiments, for example, the hypervisor may be a Microsoft product. In certain embodiments, for example, the hypervisor may be a Citrix product. In certain embodiments, for example, the hypervisor may be an Oracle product. In certain embodiments, for example, the hypervisor may be a Red Hat product. In certain embodiments, for example, the hypervisor may be a Parallels product. In certain embodiments, for example, the virtual machine may be a system virtual machine. In certain embodiments, for example, the virtual machine may be a process virtual machine. In certain embodiments, for example, the hypervisor may run directly on hardware of the host computer (for example a type 1 hypervisor, bare metal hypervisor, or embedded hypervisor). In certain embodiments, for example, the hypervisor may be provided by VMware (for example VMware ESX or VMware ESXi). In certain embodiments, for example, the hypervisor may be provided by Microsoft (for example Microsoft Hyper-V). In certain embodiments, for example, the hypervisor may be provided by Citrix (for example Citrix XenServer). In certain embodiments, for example, the hypervisor may be provided by Oracle (for example Oracle VM or Oracle VM VirtualBox). In certain embodiments, for example, the hypervisor may run on an operating system of the host computer (for example a type 2 hypervisor). In certain embodiments, for example, the hypervisor may be provided by VMware (for example VMware Workstation or VMware Server). In certain embodiments, for example, the hypervisor may be provided by Microsoft (for example Microsoft Virtual PC). In certain embodiments, for example, the hypervisor may be provided by Oracle (for example Oracle VM VirtualBox). In certain embodiments, for example, the hypervisor may be provided by Red Hat (for example Red Hat Kernel-based Virtual Machine (KVM)). In certain embodiments, for example, the hypervisor may be provided by Parallels (for example Parallels Desktop).

In certain embodiments, for example, the communications may be communications (for example packet-based communications such as one or more datagrams) from the network to a port, for example a port associated with (for example assigned to or opened by) software running on one of the one or plural virtual machines. In certain embodiments, for example, the communications may be communications (for example packet-based communications such as one or more datagrams) from a port to the network, for example a port associated with (for example assigned to or opened by) software (for example application software) running on one of the one or plural virtual machines. In certain embodiments, for example, the communications may comprise transporting a payload to software running on the one of the one or plural virtual machines via a series of packets in the host computer (for example passing the payload from an incoming packet from the network to network security software resident in the hypervisor, followed by passing the payload via a packet to a VNIC associated with the one of the one or plural virtual machines.

In certain embodiments, for example, the network security software may comprise one of the methods, systems, products, communication management operations, software, middleware, computing infrastructure and/or apparatus disclosed in one of the REFERENCE APPLICATIONS. In certain embodiments, for example, the network security software may be cooperatively configured with further network security software present on one or plural remote processor nodes (for example remote computing devices or virtual machines executing on remote computing devices). In certain embodiments, for example, the network security software may be configured to perform any of the communication management operations disclosed in one of the REFERENCE APPLICATIONS on network packets received from remote nodes on which the further network security software is performing further communication management operations any of the communication management operations disclosed in one of the REFERENCE APPLICATIONS. In certain embodiments, for example, the network security software and the further network security software may perform at least a portion of the communication management operations necessary to establish, authorize, manage, and/or monitor any of the encrypted communication pathways and/or network tunnels disclosed in one of the REFERENCE APPLICATIONS.

Certain embodiments may provide, for example, methods, systems, modules, or products for authorized communication, over a network, between plural nodes coupled to the network, wherein one or more of the plural nodes is a virtual machine in communication with a hypervisor.

In certain embodiments, for example, the methods, systems, modules, or products may be implemented in hardware (for example may be implemented partially in hardware or entirely in hardware such as an application-specific integrated circuit) or virtual hardware of a virtual machine. In certain embodiments, for example, the hardware or virtual hardware may comprise programmable hardware (for example a field-programmable gate array). In certain embodiments, for example, the methods, systems, modules, or products may be implemented in software (for example entirely in software such as firmware, software resident on one or more nodes of the plural nodes, micro-code, etc.). In certain embodiments, for example, the software may be a computer-usable program stored in a computer-readable media (for example one or more of the non-transitory computer-readable storage media described below). In certain embodiments, for example, the methods, systems, modules, or products may be implemented in a combination of hardware, virtual hardware, and/or software.

In certain embodiments, for example, the network may comprise all or a portion of one or more of the networks disclosed herein. In certain embodiments, for example, the network may connect one or more of the nodes, routers, and/or switches disclosed herein.

In certain embodiments, for example, the network may be a corporate communication network. In certain embodiments, for example, a portion of the plural nodes may be hosted at a corporate headquarters (for example central corporate databases, an email server, or a file backup storage). In certain embodiments, for example, all incoming traffic from the public Internet to the corporate network may be routed through the corporate headquarters. In certain embodiments, for example, a portion of the plural nodes may reside at one or more branch locations removed from the corporate headquarters. In certain embodiments, for example, the portion of the plural nodes may comprise one or more of a workstation or a sensor. In certain embodiments, for example, the one or more branch locations may communicate with the headquarters by a virtual private connection (for example the network may comprise a VPN). In certain embodiments, for example, the network may provide communication to one or plural mobile corporate assets (for example an automobile such as a rental car or a cargo truck). In certain embodiments, for example, the one or plural corporate assets may comprise one or more of an embedded processor (for example a physical or virtual processor) and a sensor (for example a physical or virtual sensor).

In certain embodiments, for example, the network may provide communication to, from, or within a hospital or a doctor's office. In certain embodiments, for example, the network may connect one or plural resources with databases, computers, devices, and/or sensors located in the hospital or doctor's office. In certain embodiments, for example, the one or plural resources may comprise a data center (for example a local or remote data center). In certain embodiments, for example, the network may comprise a VPN and/or plural LANs (for example a WAN). In certain embodiments, for example, the one or plural resources may comprise a cloud. In certain embodiments, for example, the one or plural resources may be connected to more than one hospital and/or doctor's office. In certain further embodiments, for example, the network may communicate patient records, patient monitoring data (for example real time data for a patient from a heart monitor being transmitted to a nurse's station), telemedicine data, billing and/or reimbursement data, financial data, equipment maintenance data, or a combination of two or more of the foregoing. In certain embodiments, for example, the network may provide communication between one or plural patient rooms and one or plural computing devices (inclusive of one or plural virtual devices) at hospital or a doctor's office location (for example a nurse's station, a doctor's office, a medical supervisor's office, or a smart device (for example a smart phone running an app) used by a healthcare provider), a physical and/or virtual data hub (for example a local data hub or a data hub connected to the hospital by a private connection or the public Internet), a database, a physical and/or virtual smart device (for example a smart phone running an app) and/or the one or plural resources. In certain embodiments, for example, the recipient of the communication may be located within a physical and/or virtual LAN of the hospital or doctor's office. In certain embodiments, for example, the recipient of the communication may be remote from the physical and/or virtual LAN of the hospital or doctor's office. In certain embodiments, for example, the recipient of the communication may comprise a business partner (for example a service provider such as a billing service provider or a laboratory) of the hospital or doctor's office. In certain embodiments, for example, the communication may comprise sensor data from one or plural sensors in one of the one or plural patient rooms (for example the one or plural sensors may be an oxygen monitoring sensor, a heart monitor, a blood pressure sensor, or a medicine delivery sensor), a scanner (for example a scanner used to scan a barcode on a medicine container, such as a scanner used to scan a two-dimensional barcode in a hospital room), an input/ output device (for example a keypad or a smartphone running an app), or a telemedicine device.

In certain embodiments, for example, the network may provide communication with one or plural automobiles (for example the network may provide communication in a smart car ecosystem). In certain embodiments, for example, one or plural physical and/or virtual devices in an automobile may be wirelessly connected to the Internet. In certain embodiments, for example, the network may provide communication between one or plural law enforcement-controlled devices and one or plural devices (for example a speedometer, a geolocator, or a kill switch) in (or on) the automobile. In certain embodiments, for example, the network may provide communication between one or plural equipment manufacturer interfaces (for example an interface to a web server or a cloud) and one or plural devices (for example a device configured to provide equipment diagnostic information) in (or on) the automobile. In certain embodiments, for example, the network may provide communication between one or plural urban planning agencies and one or plural devices (for example a geolocator or an onboard video camera) in (or on) the automobile. In certain embodiments, for example, the network may communicate weather information from a weather provider to a device (for example an onboard computer executing an autonomous operating system) in (or on) the automobile. In certain embodiments, for example, the network may communicate traffic information (for example traffic congestion information or traffic signal information) to a device (for example an onboard computer executing an autonomous operating system or a global positioning system software) in the automobile. In certain embodiments, for example, the network may communicate logistic information (for example cargo content, next requested stop information, destination location, or delivery status information) between a corporate database and a device in (or on) the automobile. In certain embodiments, for example, the network may communicate vehicle maintenance information (for example an oil change reminder) between a maintenance provider and a physical and/or virtual device in (or on) the automobile. In certain embodiments, for example, the network may transmit car payload data, car diagnostic data, business data, and/or infrastructure data between one or plural automobiles and a law enforcement agency, an urban planning agency, a weather provider, a traffic provider, a logistics provider, a car maintenance provider, or a combination of two or more of the foregoing.

In certain embodiments, for example, the network may provide communication among one or plural physical and/or virtual nodes for one or plural dedicated processes (for example one or plural industrial control processes or one or plural IoT applications). In certain further embodiments, for example, the network may provide communication for maintenance of the configuration of communications among the one or plural physical and/or virtual nodes. In certain embodiments, for example, the network may provide communications from one or plural dedicated processes or physical and/or virtual devices to a cloud (for example a storage cloud or an analytics engine).

In certain embodiments, for example, the network may provide communication in a factory. In certain embodiments, for example, the network may provide communication in a power station. In certain embodiments, for example, the network may provide communication in an offshore platform. In certain embodiments, for example, the network may provide communication for Automated Teller Machine (ATM) transactions. In certain embodiments, for example, the network may provide communication for credit card transactions. In certain embodiments, for example, the network may provide communication for monitoring IoT physical and/or virtual devices (for example monitoring IoT devices located in one or plural homes) for a warranty update, a maintenance indication, a service indication, a coupon, a cross-sale advertisement, an up-sale opportunity, or a combination of two or more of the foregoing. In certain embodiment, for example, the network may provide communication for database access (for example communication for access to a credit bureau database). In certain embodiments, for example, the network may provide communication to a physical and/or virtual DNS server.

In certain embodiments, for example, the one or plural nodes may comprise a physical and/or virtual electronic device configured to send, receive, and/or forward information over the network. In certain embodiments, for example, the physical and/or virtual electronic device may be (or may host) a communication endpoint. In certain embodiments, for example, the one or plural nodes may comprise a physical and/or virtual device configured for network packet (for example Ethernet) communication, for example a physical and/or virtual computer, a physical and/or virtual computer system, physical and/or virtual computing device, a physical and/or virtual edge device, part or all of a physical and/or virtual machine, a physical and/or virtual sensor, a physical and/or virtual controller, a physical and/or virtual microcontroller, a physical and/or virtual server, a physical and/or virtual client, a physical and/or virtual workstation, a physical and/or virtual host computer, a physical and/or virtual modem, a physical and/or virtual hub, a physical and/or virtual bridge, a physical and/or virtual switch, or a physical and/or virtual router configured for network packet communication. In certain embodiments, for example, the one or plural nodes may comprise a physical and/or virtual processor node equipped with a physical and/or virtual processor configured to process computer instructions. In certain embodiments, for example, the one or plural nodes may comprise a physical and/or virtual device configured for executing a network stack, for example a physical and/or virtual computer, a physical and/or virtual computer system, a physical and/or virtual computing device, a physical and/or virtual edge device, part or all of a physical and/or virtual machine, a physical and/or virtual sensor, a physical and/or virtual controller, a physical and/or virtual microcontroller, a physical and/or virtual server, a physical and/or virtual client, a physical and/or virtual workstation, a physical and/or virtual host computer, a physical and/or virtual modem, physical and/or virtual hub, a physical and/or virtual bridge, a physical and/or virtual switch, or a physical and/or virtual router executing a network stack.

In certain embodiments, for example, the one or plural nodes may comprise a physical and/or virtual electronic instruction execution system. In certain embodiments, for example, the one or plural nodes may comprise a physical and/or virtual processor (for example a physical and/or virtual central processing unit (CPU)), a physical and/or virtual microprocessor (for example a single-board microprocessor), a physical and/or virtual programmable processor (for example a field-programmable gate array (FPGA), a physical and/or virtual application specific integrated circuit (ASIC), or a virtual machine.

In certain embodiments, for example, the physical and/or virtual CPU may be one of the CPU's and/or CPU architectures disclosed herein.

In certain embodiments, for example, the node may comprise one of the physical and/or virtual Digital Signal Processors (DSPs) disclosed herein (for example the one of the DSPs may be embedded on a physical and/or virtual CPU or may be connected to a physical and/or virtual CPU).

In certain embodiments, for example, the node may comprise one of the physical and/or virtual Graphics Processing Unit (GPUs) disclosed herein.

In certain embodiments, for example, the one or plural nodes may comprise one or more physical and/or virtual processors coupled to one or more other physical and/or virtual components, inclusive of one or more non-transitory memory, one or more user input/output devices (for example a keyboard, a touchscreen, and/or a display), one or more data buses, and one or more physical and/or virtual interfaces to the network. In certain embodiments, for example, the one or more physical and/or virtual interfaces may comprise one or more of the interfaces disclosed herein.

In certain embodiments, for example, the one or plural nodes may comprise physical and/or virtual computer-readable media configured to store information (for example data or computer-readable instructions). In certain embodiments, for example, the computer-readable media may comprise one of the physical and/or virtual non-transitory computer-readable storage media disclosed herein.

In certain embodiments, for example, memory defined by the computer-readable media may comprise a kernel space memory and a user (or application) space memory. In certain embodiments, for example, the kernel space memory may comprise kernel RAM. In certain embodiments, for example, the kernel space memory may be reserved for executing the kernel. In certain embodiments, for example, the user space memory may be reserved for executing all non-kernel user processes (for example application programs or virtual machines) and program modules. In certain embodiments, for example, the user space memory may comprise a portion of physical or virtual RAM.

In certain embodiments, for example, the one or plural nodes may comprise a network stack (also termed a "protocol stack"). In certain embodiments, for example, at least a portion of the network stack may form part of the operating system or part of the kernel of the node. In certain embodiments, for example, the network stack may comprise one or more layers according to the OSI model. In certain embodiments, for example, the network stack may comprise a layer consisting of physical or virtual hardware (for example an Ethernet interface) used to form a data connection.

In certain embodiments, for example, authorized communications comprising transfer of data packets across the network may comprise communications between a first node of the plural nodes and a further node (for example a second node) of the plural nodes. In certain embodiments, for example, establishment and coordination of the authorized communications may be performed by a first network security software cooperatively configured with a second network security software. In certain further embodiments, for example, the first network security software and the second network security software may be different copies of the computer-readable program code (for example copies obtained from different copies of the at least one component).

In certain embodiments, for example, the first network security software may have access to a first pre-configured list, for example a first pre-configured list stored in physical and/or virtual non-transitory storage media present on the same node as the first network security software, or otherwise accessible to the first network security software. In certain embodiments, for example, the second network security software may have access to a second pre-configured list, for example a second pre-configured list stored in physical and/or virtual non-transitory storage media present on the same node as the second network security software, or otherwise accessible to the second network security software. In certain embodiments, for example, the first pre-configured list and the second pre-configured list may be aligned to enable the first network security software and the second security software to cooperatively negotiate connections for authorized communications. In certain embodiments, for example, the first pre-configured list and the second pre-configured list may together exclusively define the authorized communications permitted between a user-application on the first node and a user application on the second node, or may exclusively define the authorized port-to-port communications. In certain embodiments, for example, the first network security software may terminate any attempt by an application resident on the first node to transmit packet data to the second node, or drop any packets received at the first node sent from the second node, that are not in conformance with the first pre-configured list. Similarly, in certain embodiments, for example, the second network security software may terminate any attempt by an application resident on the second node to transmit packet data to the first node, or drop any packets received at the second node sent from the first node, that are not in conformance with the second pre-configured list. In certain further embodiments, for example, the non-conformance may comprise failure of a portion of the destination port numbers and/or the metadata to match expected values, the expectation regarding the expected values based on parameters present in the second pre-configured list.

In certain embodiments, for example, the second node of the plural nodes may be a virtual or physical gateway server to different nodes than the plural nodes. In certain embodiments, for example, the second node of the plural nodes may be a virtual or physical node configured to receive network packet communications by connections which are not negotiated by the second network security software, followed by transmitting at least a portion of the received network packet communications through an authorized encrypted communication pathway that is negotiated by the first network security software and the second network security software. The virtual or physical gateway server may be one of the gateway servers described herein.

Certain embodiments may provide, for example, use of any of the systems, methods, or apparatuses disclosed herein to defeat one or more of the attack vectors disclosed herein, wherein the one or more of the attack vectors traverses a hypervisor.

Certain embodiments may provide, for example, use of any of the systems, methods, or apparatuses disclosed herein to defeat malware dormant or running in a hypervisor, the malware configured to exploit one or more vulnerabilities (for example one or more flaws) in a physical or virtual CPU, such as malware configured to steal and optionally exfiltrate data processed by the CPU. In certain embodiments, for example, the malware may trick a CPU into starting a speculative execution process (for example a process which attempts to guess what function a CPU will carry out next), followed by determining the contents of a portion of data present in a CPU cache and optionally exfiltrating said portion of data (for example data comprising a password, cryptographic key, or sensitive data). In certain embodiments, for example, the malware may exploit a privilege escalation flaw associated with the CPU in order to gain access to protected memory (for example a portion of CPU cache memory and/or kernel memory) and optionally exfiltrating a portion of data from said memory. In certain embodiments, for example, the malware may be SPECTR malware or a variant or derivative thereof. In certain embodiments, for example, the malware may be Meltdown malware or a variant or derivative thereof.

FIG. 1 is an exemplary schematic depiction of a host computer 100 configured to receive packet communications from an external network 102 at a PNIC 104 in a physical layer 106 of the host computer 100. The host computer 100 is further configured to host virtual machines (108 and 110) in an execution space 112 and to provide virtual interfaces to the virtual machines via a hypervisor 114 installed on the host computer 100. The hypervisor directs the flow of packet communications from the external network 102 to the virtual machines (108 and 110) by processing the packets through a network stack 116 and passing the packets or a portion thereof to a virtual switch 118, whereby packets are directed to an appropriate VNIC (120 or 122, as the case may be). Packets are processed by network stacks (124 and 126) of the virtual machines (108 and 110) and packet payloads passed to applications (128 and 130, respectively).

In operation, incoming packets are received by a network security layer 132 of the network stack 116 and inspected by the network security layer 132 and further network security modules 134 in communication with the network security layer 132. A preconfigured list 136 of allowed communications is consulted to determine whether the destination ports of the incoming packets are authorized for the indicated destination addresses. If so, metadata is extracted from the packets and decrypted using cryptographic keys specific to each authorized destination port. Source application, source application user, and data protocol identifiers are obtained from the metadata and compared to authorized values for the destination port contained in the preconfigured list 136. If the identifiers match authorized values, the packets are allowed to undergo further processing by the network stack 116 and passed to the virtual switch 118 as described above.

Figure 2:
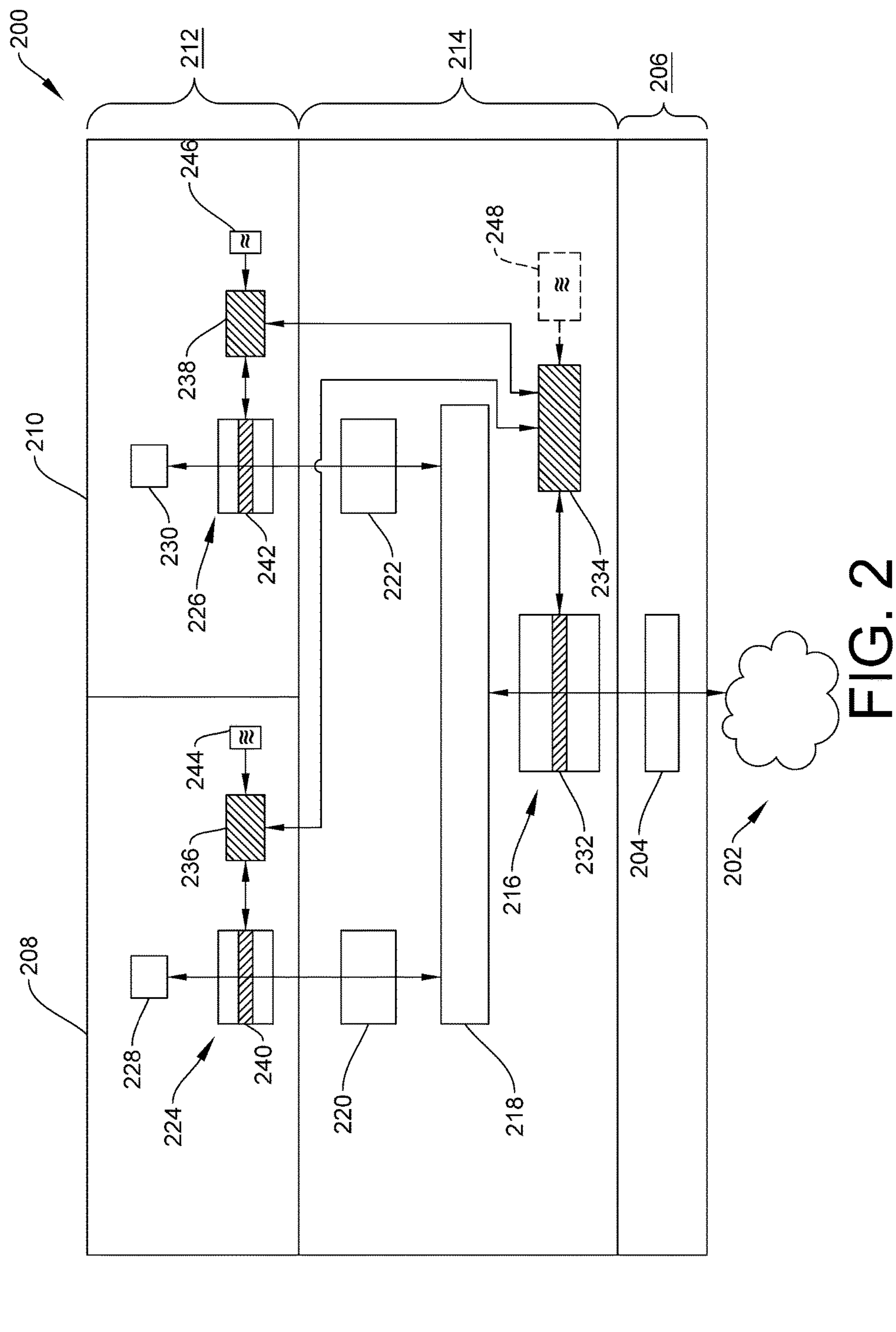
FIG. 2: Schematic view of exemplary node comprising a hypervisor and virtual machines communicating connection status data.

FIG. 2 is an exemplary schematic depiction of a host computer 200 configured to receive packet communications from an external network 202 at a PNIC 204 in a physical layer 206 of the host computer 200, wherein connection related parameters are passed between a hypervisor and virtual machines. The host computer 200 is configured to host virtual machines (208 and 210) in an execution space 212 and to provide virtual interfaces to the virtual machines via a hypervisor 214 installed on the host computer 200. The hypervisor directs the flow of packet communications from the external network 202 to the virtual machines (208 and 210) by processing the packets through a network stack 216 and passing the packets or a portion thereof to a virtual switch 218, whereby packets are directed to an appropriate VNIC (220 or 222, as the case may be). Packets are processed by network stacks (224 and 226) of the virtual machines (208 and 210) and packet payloads are passed to applications (228 and 230, respectively).

In operation, incoming packets are received by a network security layer 232 of the network stack 216 and inspected by the network security layer 232 and further network security modules 234 in communication with the network security layer 232. The network security layer 232 determines whether the destination ports of the incoming packets are authorized for the indicated destination addresses. If so, metadata is extracted from the packets and decrypted using cryptographic keys specific to each authorized destination port. If the identifiers match authorized values, the packets are allowed to undergo further processing by the network stack 216 and passed to the virtual switch 218 as described above. The network security layer 232 and further network security modules 234 receive some of the authorized identifier values from network security modules (236 and 238) resident in the virtual machines (208 and 210, respectively). In particular, the network security modules (236 and 238) obtain authorized destination application port numbers, source application identifiers, source application user identifiers, and data protocol identifiers from preconfigured lists (244 and 246, respectively) and pass the identifiers to the further network security modules 234. The network security modules (236 and 238) also provide updated connection status indicators to the network security layer 232 and further network security modules 234. The further network security modules 234 pass the destination port numbers and the connection status indicators to the network security layer 232 as needed. For example if a communication pathway between an application on a remote node and an application on one of the virtual machines (208 or 210) becomes open or closed to incoming packets, the network security module (236 or 238) on the respective virtual machine (208 or 210) will update the further network security modules 234 which will inform the network security layer 232. Following examination of a packet by the hypervisor 206, the packet is passed to the appropriate virtual machine (208 or 210) where the packet is inspected by the respective network security layer (240 or 242) and network security modules (236 or 238, respectively).

Figure 3:
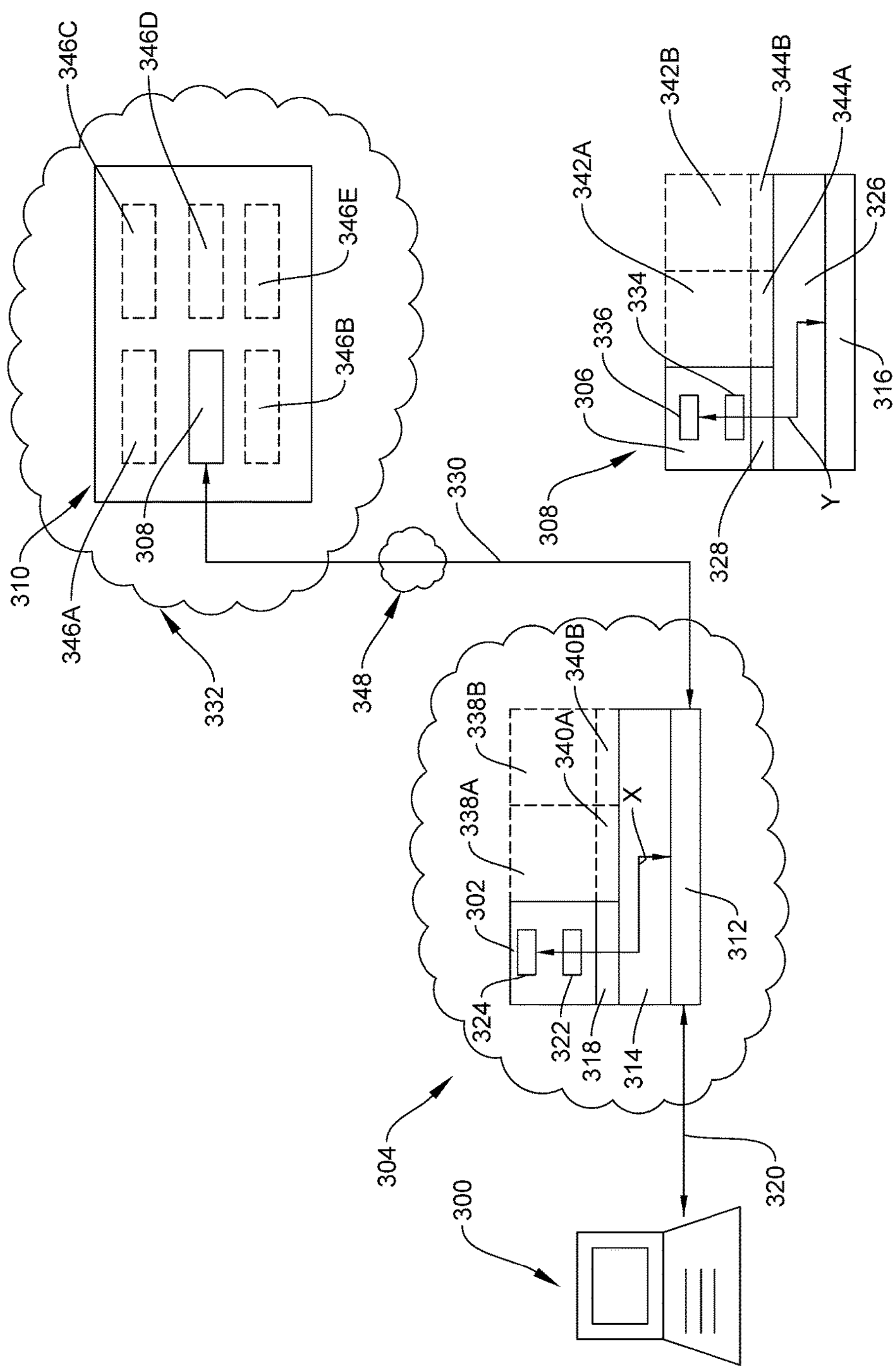
FIG. 3: Schematic view of exemplary network configuration comprising virtualized components.
Figure 4:
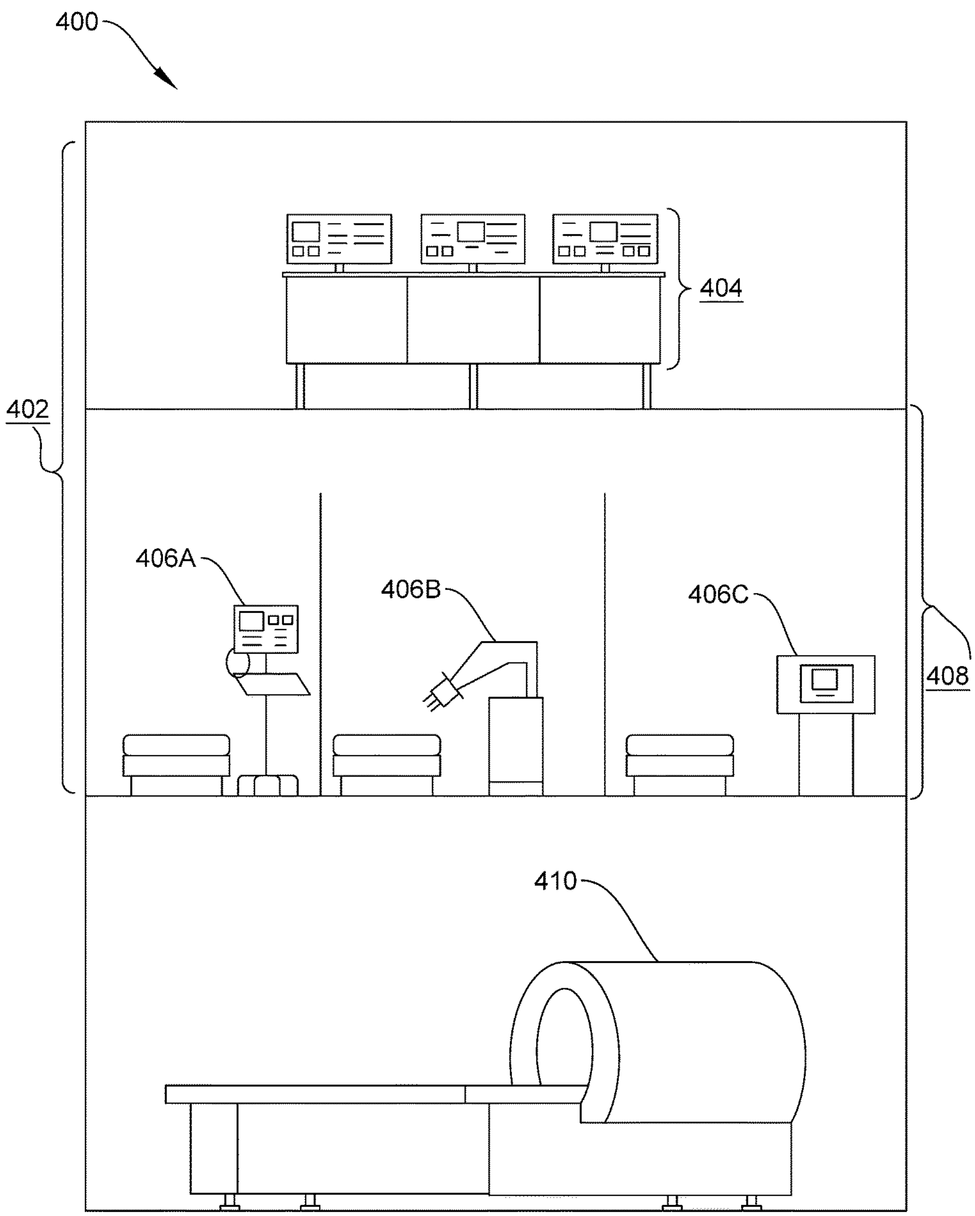
FIG. 4: Simplified schematic of a hospital.
Figure 5:
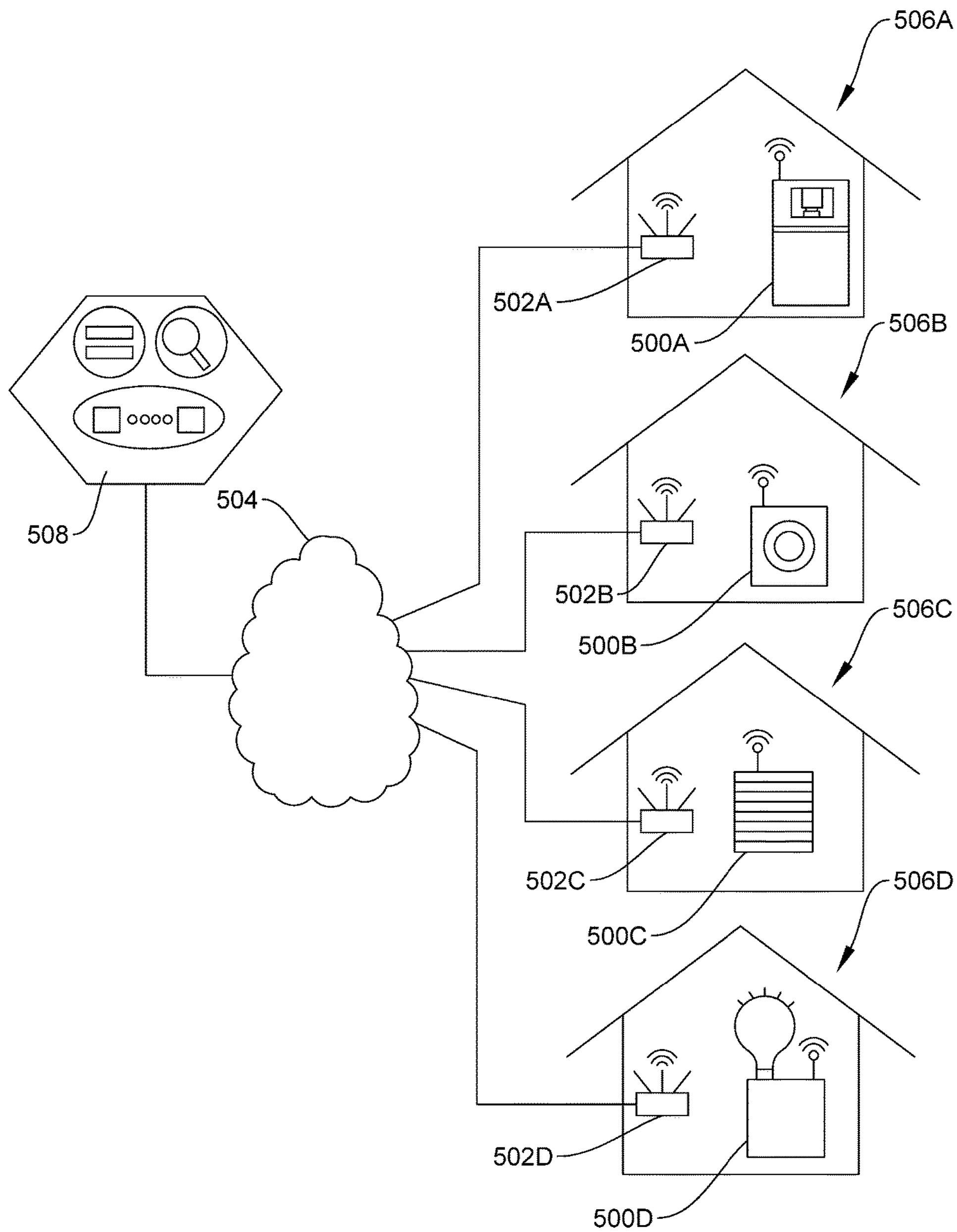
FIG. 5: Simplified schematic of an Internet of Things ecosystem.

In certain embodiments, for example, the methods, systems, products, communication management operations, software, middleware, computing infrastructure and/or apparatus of the present disclosure may be employed to manage network communications (for example, all port-to-network, port-to-port and network-to-port communications) between, as shown in FIG. 3, a client 300, a virtual machine 302 running in a network 304, and a virtual machine 306 resident on a server 308 at a server farm 310 in a cloud computing infrastructure 332. The client 300 transmits network packets to and receives network packets from a PNIC 312 resident in the network 304, which are routed to either a hypervisor 314 in the network 304 or to a PNIC 316 of the server 308. A network packet received by the hypervisor 314 from the PNIC 312 is inspected by the hypervisor 314 to determine whether the destination port and destination VNIC 318 of the incoming packet form an authorized combination, and whether the communication pathway 320 is in a connection state authorized for transmitting network data. In addition, a portion of the packet payload is inspected to determine whether the client 300, inclusive of the client application and the client user identity, is authorized to transmit data to the indicated destination port and VNIC 318 of the network packet. If so authorized, the hypervisor 314 sends the packet to virtual machine 302 via VNIC 318 where the network packet is further inspected by network security software 322 and a data portion of the payload is passed to an application 324. The data path from PNIC 312 to application 324 is shown by arrow X. A network packet received by the PNIC 316 from the PNIC 312 is inspected by the hypervisor 326 to determine whether the destination port and destination VNIC 328 of the incoming packet form an authorized combination, and whether the communication pathway 330 traversing a second network 348 (for example the public internet) is in a connection state authorized for transmitting network data. In addition, a portion of the packet payload is inspected to determine whether the client 300, inclusive of the client application and the client user identity, is authorized to transmit data to the indicated destination port and VNIC 328 of the network packet. If so authorized, the hypervisor 326 sends the packet to virtual machine 306 via VNIC 328 where the network packet is further inspected by network security software 334 and a data portion of the payload is passed to an application 336. The data path from PNIC 316 to application 336 is shown by arrow Y. The hypervisor 314 may be additionally configured to transmit network data to additional virtual machines 338A-B via VNICs 340A-B. The hypervisor 326 may be additionally configured to transmit network data to additional virtual machines 342A-B via VNICs 344A-B. The PNIC 312 may be additionally configured to transmit network data to additional servers 346A-E.

In certain embodiments, for example, one or more nodes selected from the defined groups of networked processor nodes FIGS. 4-36, may comprise a virtual machine(s) running on a host computer, wherein a hypervisor of the host computer and optionally the virtual machine(s) run network security software comprising one or more of the methods, systems, products, communication management operations, software, middleware, computing infrastructure and/or apparatus disclosed herein or in one of the REFERENCE APPLICATIONS.

In certain embodiments of the methods, systems, products, communication management operations, software, middleware, computing infrastructure and/or apparatus of the present disclosure, computing infrastructure may be secured by managing network communications (for example, all port-to-network, port-to-port and network-to-port communications) between networked nodes. Communications from user-applications on the network nodes may be managed, transparent to the user-application, by middleware that prevents the user-application from binding directly to a physical interface (or, for example, a virtual interface of a virtual machine). The middleware may operate on multiple nodes to manage outgoing communications from a node (port-to-network), and incoming communications into a node (network-to-port). The middleware may be present on a plurality of network nodes, including, for example, all of the network nodes of a defined group (such as a preconfigured group or a software defined network) to manage encrypted or partially encrypted communications such as tunnel communications (network port-to-network port, or network-to-network). The encrypted or partially encrypted communications such as tunnel communications may be established co-operatively between middleware on two or more network nodes. Authorized network communication may be transacted via these encrypted or partially encrypted communications such as tunnels, which may be dedicated encrypted or partially encrypted communications such as tunnels for authorized communications between a user-application on one network node and a user-application on another network node, processor, or computing device. In addition, the middleware may manage network communication by verifying most data packets (including all or substantially all data packets) resulting from a user-application for transmission over the network complies with a preconfigured, predefined, pre-established and/or preprovisioned set of authentication code parameters (including, for example, one or more of the following: a source user-application identifier, a payload data type descriptor, and port number). Similarly, the middleware may manage network communication by verifying most data packets (including all or substantially all data packets) received from a transmission over the internet for a user-application complies with a preconfigured, predefined, pre-established and/or preprovisioned set of authentication code parameters (including, for example, one or more of the following: a source user-application identifier, a payload data type descriptor, and port number). In such embodiments, the ability for malware to intrude, interrogate and/or proliferate within or among the network nodes is severely thwarted. In certain further embodiments, network communication security may be complemented by computing hygiene policies including human access monitoring and disabling a portion or all USB interfaces on network-accessible devices.

In certain embodiments, for example, the encrypted or partially encrypted communications may comprise a network tunnel. In certain embodiments, for example, the communications are encapsulated public network transmission units that appear to be data. In certain embodiments, for example, the communications may be partially or fully encrypted and transmitted across a network using a network tunnel, wherein the network tunnel may be defined by one or more encryption keys and one or more decryption keys. In certain embodiments, for example, the network tunnel may be defined by a protocol, for example Internet Protocol Security (IPsec), Transport Layer Security (SSL/TLS), Datagraph Transport Layer Security (DTLS), Microsoft Point-to-Point Encryption (MPPE), Microsoft Secure Socket Tunneling Protocol (SSTP), Point-to-Point Protocol (PPP), Layer 2 Tunneling Protocol (L2TP), Multi Path Virtual Private Network (MPVPN), or Secure Shell (SSH) protocol. In certain embodiments, for example, the protocol may require encapsulating a network packet inside another network packet (for example, adding an additional header). In certain embodiments, for example, a network tunnel may be defined by one or more encryption keys and one or more decryption keys associated with the tunnel, exclusive of any additional protocol header.

In certain embodiments, for example, the methods, systems, products, communication management operations, software, middleware, computing infrastructure and/or apparatus of the present disclosure may be employed to manage network communications (for example, all port-to-network, port-to-port and network-to-port communications) among networked nodes in an institution, for example a hospital, a university, a manufacturing facility, etc. In certain embodiments, for example a hospital such as the hospital 400 schematically depicted in FIG. 4, network security software and configuration data may be employed (for example in an embodiment of the communication management operations) throughout a defined group of networked processor nodes (for example, all or most of the networked processors at a facility, inclusive of remote facilities) to manage networked communications between workstations, databases, smart devices, communication devices, etc. without requiring pre-existing or new application software to be modified to accommodate the network security software. In the inpatient ward 402 of FIG. 4, for example, the security software and configuration data is installed on a nurse's station 404 and smart devices (vital sign monitoring device 406A, a mobile x-ray machine 406B, and an infusion device 406C) in a monitoring zone, which includes private patient suites 408. In addition, a smart MRI machine 410 is connected to monitoring systems in another department of the hospital 400. Each communication pathway between and among nodes may be one of the encrypted communication pathways and/or network tunnels managed by one or more of the communication management operations of the authorized type described herein and/or in one of the REFERENCE APPLICATIONS.

In operation, device software on a smart device generates packet data and requests its transmission to a pre-selected destination port associated with monitoring software at the nurse's station. Rather than sending a data packet directly to the monitoring software, the network security software receives or intercepts the data packet and verifies that the device software is authorized to transmit the data and that the requested destination port of the nurse's station is authorized to receive the payload of the data packet. Next, the network security software repackages the payload of the data packet into a new data packet and assigns the new data packet to an encrypted network tunnel that terminates at a preconfigured port associated with network security software of the nurse's station. This network tunnel is unique to the specific data feed being transmitted by the device, so different data feeds do not share the same tunnel. Prior to forwarding the new data packet to the network, the network security software inserts encrypted metadata into the new data packet defining the device software, the user of the device software, and data type being transmitted.

When the transmitted new data packet is received by the nurse's station, network security software on the nurse's station decrypts and inspects the inserted metadata to verify against a predefined configuration data that the sending device software, user, and data type are authorized for the network tunnel. If so, the network security software extracts the network packet payload and inserts it into a final packet that is forwarded to the destination port of the monitoring software. In each of the foregoing steps, the configuration data provides the necessary translation between the encrypted port and the destination port, as well as identifiers for the authorized device software, user, and data type used by the network security software to perform authentications.

In a billing department of the hospital, the network security software may be installed on a security server to receive (or intercept) and authorize all data packets received from an insurance provider via the public internet. In cases where a data packet is received from a secure remote node that is cooperatively configured with the security server, the aforementioned steps are applied to the received data packet and the data forwarded to its destination. In cases where the data is received from an unsecured remote node, the security server extracts the payload and processes it into a benign, authenticated format (including steps to render any executable payload inoperable), before forming a new packet for transmission to an endpoint in the hospital network.

While application transparency facilitates deployment of the network security software, in certain environments it is desirable to build applications that directly access a portion of the network security software through a security API. Such applications may be particularly useful, for example, to provide faster data processing and to customize security parameters.

In certain embodiments, for example, the methods, systems, products, communication management operations, software, middleware, computing infrastructure and/or apparatus of the present disclosure may be employed (for example in an embodiment of the communication management operations) to manage network communications (for example, all port-to-network, port-to-port and network-to-port communications) among networked nodes in a modern hospital. A modern hospital. For example, may occupy several floors of a multistory building and may include hundreds of private patient suites. Through extensive computerization and network connectivity, the patient suites may be grouped into a series of zones, for example, 25-50 suites per zone, which may be monitored by nursing stations dedicated to each zone. Each nursing station may be required to monitor multiple medical data feeds from smart devices (including life support, infusion, x-ray, MRI, kidney dialysis, etc.) located in or near the patient suites and/or other station throughout the hospital and beyond. To meet changing patient requirements, the devices may frequently be relocated to different suites and/or zones, which may require reconfiguration of device assignments among the nursing stations. Embedded processors and network interfaces in the devices may facilitate frequent reconfiguration. Unless secured, hospital networks may be vulnerable because, for example, unsupervised visitors are in frequent close proximity to the smart devices. A bad actor may compromise the network from the privacy of a patient suite, for example by injecting malware into a smart device from a thumb drive (allowing it to spread to other computers and devices in the hospital), by plugging a computer into the network and spoofing the device, or simply by moving the device to a different suite.

In an embodiment, most of the devices, including all, in the hospital network (or portion of the hospital network) may be configured with network security software (middleware) and configuration data to accept network traffic only from (n-tuple) pre-authorized users, pre-authorized applications, pre-authorized devices, and/or pre-authorized datatypes. In addition, a separate server may update the configuration data across all zones to reflect reconfiguration events. With the security software running on each device on the network, data transmitted from malware on a smart device is rejected (and an alarm may be sounded) when the malware fails to provide a required user identifier and/or application identifier expected by the network security software. In addition, the network security software may prevent a workstation from connecting to any unauthorized device. When the unauthorized device (whether a new device or a device removed from its allotted zone) attempts to connect, the attempt may be rejected when the unauthorized device failed to provide an expected secret identification code.

Each smart device is may also be protected by installed network security software and configuration data, either installed directly (for devices with sufficient processing capability) or through a legacy adapter (containing the network security software and configuration files) disposed between the device and the network. In addition to the intrusion prevention features noted above, the network security software may also prevent malware resident on a smart device from transmitting data to the network. When the malware attempts to transmit data, the data may be received (or intercepted) and dropped when the network security software detects that the malware is not a pre-authorized application for the smart device.

In addition to the risk of unsupervised visitors, malware may also attempt to penetrate a hospital network through the public Internet, for example through casual browsing, email, or communication with service providers. According to an embodiment, all data packets from the public internet may be passed through a security server before transmitting to any network on the hospital. In cases where the data is received from a secure remote node that is cooperatively configured with the security server, the data may be transmitted to a network in the hospital. In cases where the data is received from an unsecured remote node, the security server takes additional steps to convert data packets into a benign, authenticated format (including steps to render any executable payload inoperable).

In certain embodiments, for example, the methods, systems, products, communication management operations, software, middleware, computing infrastructure and/or apparatus of the present disclosure may be employed (for example in an embodiment of the communication management operations) to manage network communications (for example, all port-to-network, port-to-port and network-to-port communications) among networked nodes in an Internet-of-Things application. In an Internet-of-Things application depicted in FIG. 5, for example, a consumer appliance manufacturer equips a suite of processor equipped, wirelessly networked smart products (a refrigerator 500A, a washing machine 500B, window shades 500C, and lighting 500D) with sensors and preconfigured network security software to securely report authenticated, authorized, encrypted operating data, via routers 502A-D connected to the public Internet 504 from homes 506A-D to the manufacturer's cloud based analytics and maintenance engine 508. The cloud engine 508, in turn, utilizes the data to compute performance and/or maintenance parameters, and securely communicates authenticated, authorized control parameter adjustments, maintenance alerts, and/or firmware updates to the smart products 500A-D. Each communication pathway between and among nodes may be one of the encrypted communication pathways and/or network tunnels managed by one or more of the communication management operations of the authorized type described herein and/or in one of the REFERENCE APPLICATIONS.

For example, upon installation of a smart refrigerator, first network security software in the refrigerator utilizes preconfigured private keys to negotiate an exclusive encrypted network tunnel with second network security software in the cloud engine for the purpose of transmitting time series of temperature and/or temperature set point readings from refrigerator control software, across the public Internet, to cloud engine analytic software. Upon receipt, the analytic software will analyze the data and respond to the control software, for example, with seasonal adjustments to parameters that control operation of the refrigerator's compressor.

Prior to transmission of any readings, the cloud engine and refrigerator control software authenticate the refrigerator-to-cloud data path by exchanging device codes, application (refrigerator control software and/or cloud analytic software) identifiers, and/or data-type identifiers across the encrypted tunnel and verifying that the exchanged values correspond to authorized combinations of values.

Following tunnel authorization, for example, a temperature sensor driver executing on the processor may transmit a time series of temperature readings to the control software that, in turn, sends a request via a network API to transmit the readings in a data packet to a preconfigured destination port of the cloud engine. A first module of the first network security software may receive or intercept the request, uses the destination port number to identify a predetermined tunnel destination port number associated with the second network security software, and verifies that the network tunnel is open. A second module of the first network security software may translate the time series into a lightweight format (for example an MQTT format) for transport. A third module of the first network security software may assemble metadata containing an identifier for the control software, an identifier for the control software process owner, and/or a data protocol for the time series. A fourth module of the first network security software may encrypt the translated time series and the metadata. A fifth module of the first network security software may assemble the encrypted metadata and the encrypted, translated time series to form a network packet for transmission to the tunnel port of the second network security software.

Upon receipt of the network packet, a first module of the second network security software verifies that the network tunnel is open. A second module of the second network security software may decrypt the metadata. A third module of the second network security software may verify that the contents of the metadata match preconfigured, expected values based on the destination tunnel port number. A fourth module of the second network security software may decrypt the translated time series. A fifth module of the second network security software further may translate the translated time series into a format readable by the cloud engine analytic software. A sixth module of the second network security software may insert the properly formatted time series into a new network packet and/or may transmit the new network packet to the analytic software. If the network security software and the analytic software execute on the same processor, the transmittal may use a loopback interface. Otherwise, the new packet may contain appropriate authorization metadata and may be transmitted to the first network security software by a separate encrypted network tunnel to an appropriate device in accordance with the methods described above.

The analytic engine may analyze the time series and may compute updated compressor controller parameters. The new controller parameters may be transmitted to a preconfigured destination port of the refrigerator control software (a different port than the source port used for transmitting the time series discussed above), comprising passing a network packet containing the parameters (and appropriate metadata) across an encrypted network tunnel between the second network security software and the first network security software (a different encrypted network tunnel than the tunnel used to transmit the time series). The methods of forming the connection and moving the data may be in accordance with the methods discussed above. Upon receipt of the updated parameters, the refrigerator control software may update a compressor configuration file(s) referenced by the compressor controller, thereby modifying operation of the refrigerator.

In certain embodiments, for example, the methods, systems, products, communication management operations, software, middleware, computing infrastructure and/or apparatus of the present disclosure may be employed (for example in an embodiment of the communication management operations) to manage network communications (for example, all port-to-network, port-to-port and network-to-port communications) among networked nodes in a smart transportation ecosystem, for example, network security software and configuration data may be factory installed at a number of attachment points in vehicles, including, for example, dedicated on-board processors for vehicle routing, vehicle data, vehicle communications (for example mobile routers) and vehicle maintenance. A vehicle routing computer, for example, may execute several instances of network security software (in conjunction with configuration data) to ensure the integrity of multiple real-time data feeds received from remote routing servers over a cellular or satellite network, including, for example, weather data, GPS or cellular triangulation data, traffic data, and logistic parameters (for example cargo content, next requested stop, destination location, or delivery status information).

Figure 6:
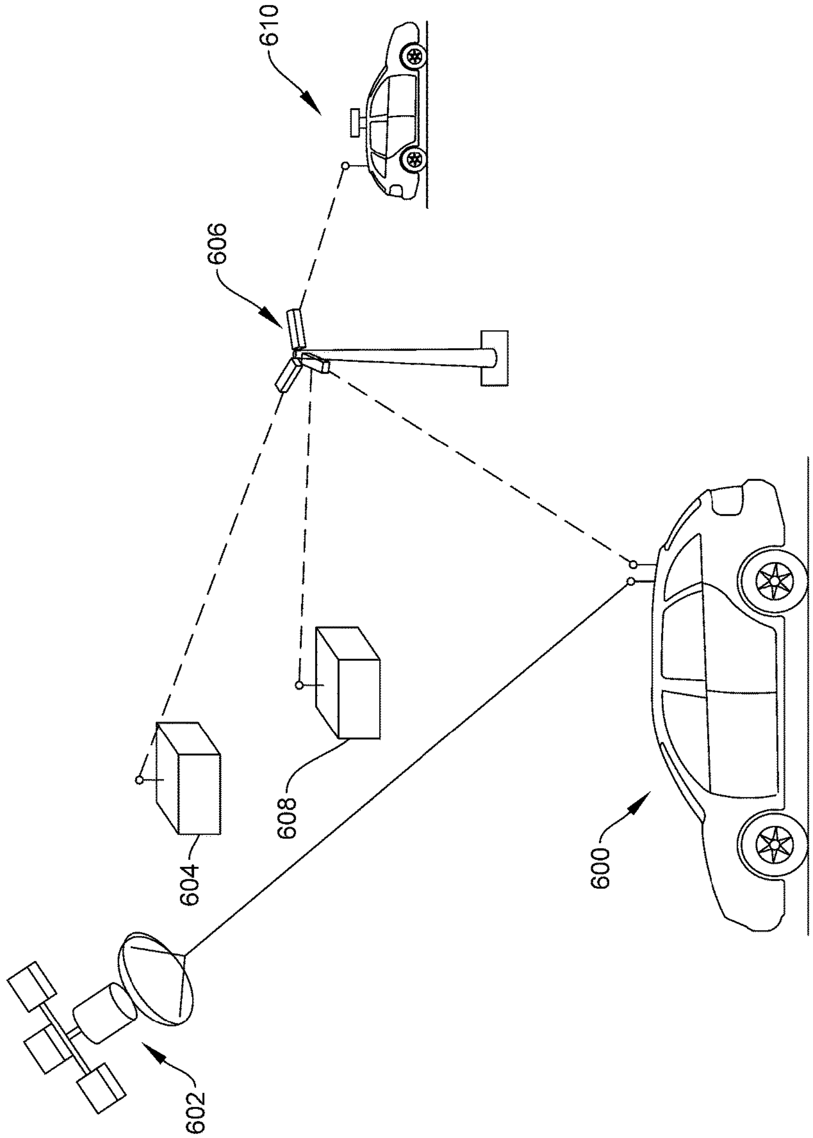
FIG. 6: Simplified schematic of a smart car ecosystem.
Figure 7:
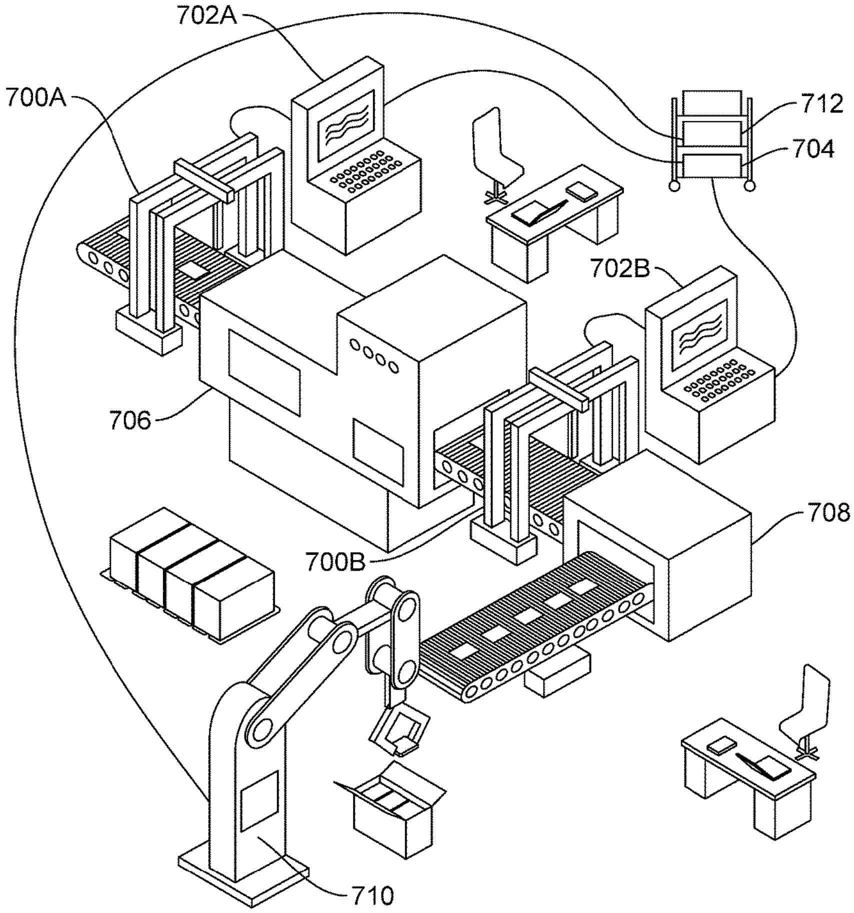
FIG. 7: Simplified schematic of a process-controlled industrial production unit.

In the smart vehicle ecosystem depicted in FIG. 6, a smart car 600 receives satellite geopositioning data from a satellite 602 for processing by an onboard navigation computer equipped with the network security software. A second onboard processor of the smart car 600 equipped with the network security software receives traffic data broadcasts from a weather bureau 604 by a cellular data network through a cellular tower 606. A third onboard processor of the smart car 600 equipped with the network security software communicates transmission data to a manufacturer's maintenance bureau 608 and receives periodic firmware updates from the bureau 608. A fourth onboard processor equipped with the network security software communicates speedometer readings via the cell tower 606 to a law enforcement vehicle 610. Each communication pathway between and among nodes may be one of the encrypted communication pathways and/or network tunnels managed by one or more of the communication management operations of the authorized type described herein and/or in one of the REFERENCE APPLICATIONS.

In operation, the network security software may establish discrete encrypted network tunnels configured for each data feed, including verifying the authority of a sending device, application, and/or application user to provide each particular data feed to, for example, the routing software and user by assigned encrypted tunnel. For example, following establishment of one of the encrypted network tunnels, a network security software (or middleware) may receive or intercept incoming network packets at a port defined by the specific encrypted tunnel and extracts data from the packet payload at a predetermined location where it expects encrypted metadata. Next, the first network security software may attempt to decrypt the metadata, for example, using an expected cryptographic key (a rotated key for example derived from an elliptic curve-based key exchange algorithm) and to match the decrypted metadata against expected identifiers for the sending application, application user, and/or data type. If the match is successful, the first network security software may extract the network packet payload and may insert it into a final packet which may be forwarded to a predetermined destination port (based on the encrypted tunnel port number) of the routing software.

Additional network security software (or middleware) may authenticate speedometer data for transmission, for example, to a law enforcement resource. In this mode, configuration data may include cryptographic keys shared with law enforcement used for establishing an encrypted network tunnels between the additional network security software and network security software utilized by the law enforcement resource. The additional network security software may receive or intercept a speedometer reading (encoded, for example, in a network packet received via a loopback interface) from speedometer software and may execute operating system commands to determine the identity of the speedometer software and the process owner. The additional network security software may then verify that the speedometer software matches the factory-installed version and is being executed by a pre-authorized user. Next, the additional network security may package the reading into a data packet and may assign the data packet to an encrypted network tunnel that terminates at a preconfigured port associated with the network security software installed at the law enforcement resource. Prior to transmitting the data packet through the network tunnel, the network security software inserts encrypted metadata that identifies the speedometer software, the user of the speedometer software, and data type being transmitted. Upon receipt of the data packet, law enforcement may authenticate the origin of the reading and the type of data, for example, by using the methods described herein.

In each of the foregoing steps, configuration data may be resident on most, for example, all of the attachment points to keep track of, for example, the ports, sending user-applications, receiving user-applications, data types, and/or devices assigned to most, for example, all of the encrypted network tunnels.

In certain embodiments, for example, the methods, systems, products, communication management operations, software, middleware, computing infrastructure and/or apparatus of the present disclosure may be employed (for example in an embodiment of the communication management operations) to manage network communications (for example, all port-to-network, port-to-port and network-to-port communications) among networked nodes in an Internet-of-Things process controlled manufacturing line. In the manufacturing line depicted in in FIG. 7, quality control devices 700A and 700B inspect raw materials and intermediate products. The quality control devices 700A and 700B have embedded processors executing network security software, and are in machine-to-machine communication with control systems 702A and 702B, respectively, which also execute network security software. The control systems 702A and 702B are, in turn, in machine-to-machine communication with a quality control server, 704, which records electronic batch data and provides control parameters to the control systems 702A and 702B. Raw materials are passed through a first stage 706 to form intermediate products, which are passed through a second stage 708 to form final products. The final products are loaded into shipping boxes by a robot 710. The robot is in machine-to-machine communication with a logistics server 712, and each of the robot 710 and the logistics server are equipped with network security software. The logistics server 712 obtains product count information and provides loading instructions to the robot 710. Each communication pathway between and among nodes may be one of the encrypted communication pathways and/or network tunnels managed by one or more of the communication management operations of the authorized type described herein and/or in one of the REFERENCE APPLICATIONS.

Figure 8:
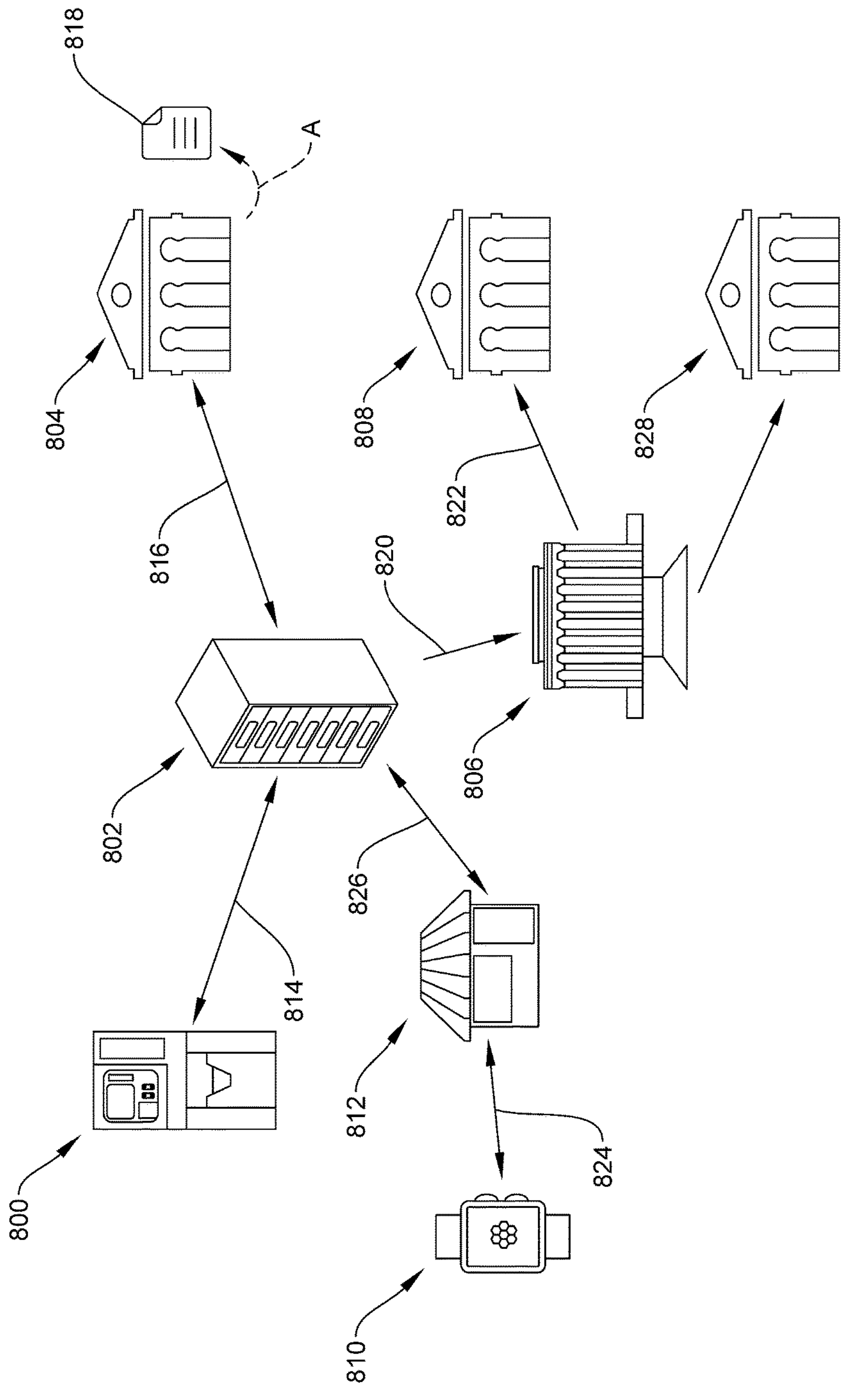
FIG. 8: Simplified schematic of a retail banking system.

In certain embodiments, for example, the methods, systems, products, communication management operations, software, middleware, computing infrastructure and/or apparatus of the present disclosure may be employed (for example in an embodiment of the communication management operations) to manage network communications (for example, all port-to-network, port-to-port and network-to-port communications) for retail banking applications. In certain embodiments, for example retail banking applications such as the private Automated Teller Machine (ATM) network and the wearable payments ecosystem schematically depicted in FIG. 8, configuration data and network security software may be employed (for example in an embodiment of the communication management operations) throughout a defined group of networked processor nodes to manage network communications. In FIG. 8, network security software is installed on an ATM 800, transaction processing engine 802, retail customer's bank server 804, an Automated Clearing House (ACH) server 806, and cash provider's bank server 808. In addition, network security software is installed on a wearable computing device 810 containing an embedded near-field communication chip and on a merchant's payment processing computer 812. Each communication pathway between and among nodes may be one of the encrypted communication pathways and/or network tunnels managed by one or more of the communication management operations of the authorized type described herein and/or in one of the REFERENCE APPLICATIONS.

In operation, a retail banking customer provides card and pin input to the ATM 800 to request a cash withdrawal. Device software resident on the ATM 800 processes the request and generates encrypted packet data containing the customer's transaction information, card number, and pin input and requests its transmission to a pre-selected destination port associated with a remote transaction processing engine 802. Rather than sending a data packet directly to the remote transaction processing engine 802, the network security software receives the data packet and verifies that the device software is authorized to transmit the data and that the requested destination port of the remote transaction processing engine 802 is authorized to receive the payload of the data packet. Next, the network security software repackages the payload of the data packet into a new data packet and assigns the new data packet to a first encrypted network tunnel 814 that terminates at a preconfigured port associated with network security software of the remote transaction processing engine 802. The first encrypted network tunnel 814 is unique to the specific retail transaction being transmitted by the ATM 800, so different transactions (for example different retail customers, or different transactions by the same customer) do not share the same tunnel. Prior to forwarding the new data packet to the network, the network security software inserts encrypted metadata into the new data packet defining the device software, the retail customer, and the data type being transmitted.

When the transmitted new data packet is received by the transaction processing engine 802, network security software resident on the transaction processing engine 802 decrypts and inspects the inserted metadata to verify against predefined configuration data that the sending device software, retail customer, and data type are authorized for the network tunnel. If so, the network security software extracts the network packet payload and inserts it into a new packet that is forwarded to the destination port of the transaction processing engine software. In each of the foregoing steps, the configuration data provides the necessary translation between the encrypted port and the destination port, as well as identifiers for the authorized device software, authorized device software user, and data type used by the network security software to perform authentications.

The transaction processing engine software processes the payload to identify the retail customer's card network and associated financial institution 804, and forms a data packet containing the transaction information for transmission to a destination port of software resident on a server of the associated financial institution 804. Rather than sending the data packet directly to the server of the associated financial institution 804, network security software resident on the transaction processing engine 802 receives the data packet and verifies that the transaction processing engine software is authorized to transmit the data and that the requested destination port of the server of the associated financial institution 804 is authorized to receive the payload of the data packet. Next, the network security software repackages the payload of the data packet into a new data packet and assigns the new data packet to a second encrypted network tunnel 816 that terminates at a preconfigured port associated with network security software of the server of the associated financial institution 804. The second encrypted network tunnel 816 is unique to the port-to-port connection between the transaction processing engine software, the associated financial institution server software, and the data type being transmitted (and optionally the retail customer identity and the specific transaction). Prior to forwarding the new data packet to the network, the network security software inserts encrypted metadata into the new data packet defining the transaction processing engine software, the transaction processing engine software user, and the data type being transmitted.

When the transmitted new data packet is received by the server of the associated financial institution 804, network security software resident on the associated financial institution server decrypts and inspects the inserted metadata to verify against predefined configuration data that the sending transaction processing engine software, transaction processing engine software user, and data type are authorized for the second network tunnel. If so, the network security software extracts the network packet payload and inserts it into a new packet that is forwarded to the destination port of the associated financial institution software. In each of the foregoing steps, the configuration data provides the necessary translation between the encrypted port and the destination port, as well as identifiers for the transaction processing engine software, transaction processing engine software user, and data type used by the network security software to perform authentications.

The associated financial institution software memo debits the retail customer's account in a ledger 818 of the associated financial institution, and forms a data packet containing an authorization for the ATM transaction for transmission though the second encrypted network tunnel 816 to a destination port of transaction processing engine software. Prior to forwarding the data packet in a network packet to the network, the network security software inserts encrypted metadata into the network packet defining the associated financial institution software, the associated financial institution software user, and the data type being transmitted.

When the transmitted data packet is received by the transaction processing engine 802 from the second encrypted network tunnel 816, network security software resident on the transaction processing engine 802 decrypts and inspects the inserted metadata to verify against predefined configuration data that the associated financial institution software, the associated financial institution software user, and data type are authorized for the network tunnel. If so, the network security software extracts the network packet payload and inserts it into a new packet that is forwarded to the destination port of the transaction processing engine software. In each of the foregoing steps, the configuration data provides the necessary translation between the encrypted port and the destination port, as well as identifiers for the transaction processing engine software, transaction processing engine software user, and data type used by the network security software to perform authentications.

The associated financial institution software forms a data packet providing an authorization for the ATM transaction for transmission though the first encrypted network tunnel 814 to a destination port of ATM 800 device software. Prior to forwarding the data packet in a network packet to the network, the network security software inserts encrypted metadata into the network packet defining the transaction processing engine software, the transaction processing engine software user, and the data type being transmitted.

When the transmitted data packet is received by the ATM 800 from the transaction processing engine 802, network security software resident on the ATM 800 decrypts and inspects the inserted metadata to verify against predefined configuration data that the transaction processing engine software, the transaction processing engine software user, and data type are authorized for the first network tunnel. If so, the network security software extracts the network packet payload and inserts it into a new data packet that is forwarded to the destination port of the ATM 800 device software. The ATM 800 device software processes the payload of new data packet authorizing the transaction followed by dispensing cash to the retail customer. In each of the foregoing steps, the configuration data provides the necessary translation between the encrypted port and the destination port, as well as identifiers for the transaction processing engine software, transaction processing engine user, and data type used by the network security software to perform authentications.

In addition to sending transaction authorization data to the ATM 800 device software, the transaction processing engine 802 forms a data packet for transmission to a destination port of ACH server software. Rather than sending the data packet directly to the ACH server 806, network security software resident on the transaction processing engine 802 receives the data packet and verifies that the transaction processing engine software is authorized to transmit the data and that the requested destination port of the ACH server software is authorized to receive the payload of the data packet. Next, the network security software repackages the payload of the data packet into a new data packet and assigns the new data packet to a third encrypted network tunnel 820 that terminates at a preconfigured port associated with network security software of the ACH server 806. The third encrypted network tunnel 820 is unique to the port-to-port connection between the transaction processing engine software, the ACH server software, and the data type being transmitted (and optionally the retail customer identity and the specific transaction). Prior to forwarding the new data packet to the network, the network security software inserts encrypted metadata into the new data packet defining the transaction processing engine software, the transaction processing engine software user, and the data type being transmitted.

When the data packet is received by the ACH server 806, network security software resident on the ACH server 806 decrypts and inspects the inserted metadata to verify against predefined configuration data that the sending transaction processing engine software, transaction processing engine software user, and data type are authorized for the third encrypted network tunnel 820. If so, the network security software extracts the network packet payload and inserts it into a new packet that is forwarded to the destination port of the ACH server software.

The ACH server software processes the payload to identify the cash provider's bank server, and forms a data packet containing the transaction information for transmission to a destination port of software resident on cash provider's bank server 808. Rather than sending the data packet directly to the software resident on cash provider's bank server 808, the network security software resident on the ACH server 806 receives the data packet and verifies that the ACH server software is authorized to transmit the data and that the requested destination port of software resident on cash provider's bank server 808 is authorized to receive the payload of the data packet. Next, the network security software repackages the payload of the data packet into a new data packet and assigns the new data packet to a fourth encrypted network tunnel 822 that terminates at a preconfigured port associated with network security software of the destination port of software resident on cash provider's bank server 808. The fourth encrypted network tunnel 822 is unique to port-to-port connection between the ACH server software, the associated financial institution server software, the cash provider's bank server software, and the data type being transmitted (and optionally the retail customer identity and the specific transaction). Prior to forwarding the new data packet to the network, the network security software inserts encrypted metadata into the new data packet defining the ACH server software, the ACH server software user, and the data type being transmitted.

When the transmitted new data packet is received by the cash provider's bank server 808, network security software resident on the cash provider's bank server 808 decrypts and inspects the inserted metadata to verify against predefined configuration data that the sending ACH server software, ACH server software user, and data type are authorized for the fourth encrypted network tunnel 822. If so, the network security software extracts the network packet payload and inserts it into a new packet that is forwarded to the destination port of the cash provider's bank server software. The associated financial institution software credits the cash provider's bank account. In each of the foregoing steps, the configuration data provides the necessary translation between the encrypted port and the destination port, as well as identifiers for the ACH server software, ACH server software user, and data type used by the network security software to perform authentications.

In addition to dispensing cash at the ATM 800, portions of the ATM network may also be used to process transactions in a wearable payments ecosystem. A merchant customer may use a wearable computing device 810 containing an embedded near-field communication chip to transmit credit payment data to a merchant payment processing computer. Network security software resident on the wearable computing device forms a fifth encrypted network tunnel 824 analogously to the encrypted network tunnels described above and transmits a network packet containing a payment request payload and metadata analogously to the data transmitted through the encrypted tunnels described above. The merchant payment processing computer transmits the payment request data analogously to the ATM 800 through a sixth encrypted network tunnel 826, and the transaction processing engine 802 and the retail customer's bank server function as described above. When the transaction is authorized by the retail customer's bank server 804, encrypted packet data is transmitted through the network to complete the transaction at the merchant's payment processing computer 812. In addition, the software resident on the ACH server 806 transmits instructions to a cash provider's server 828 to credit the cash provider's account.

Figure 9:
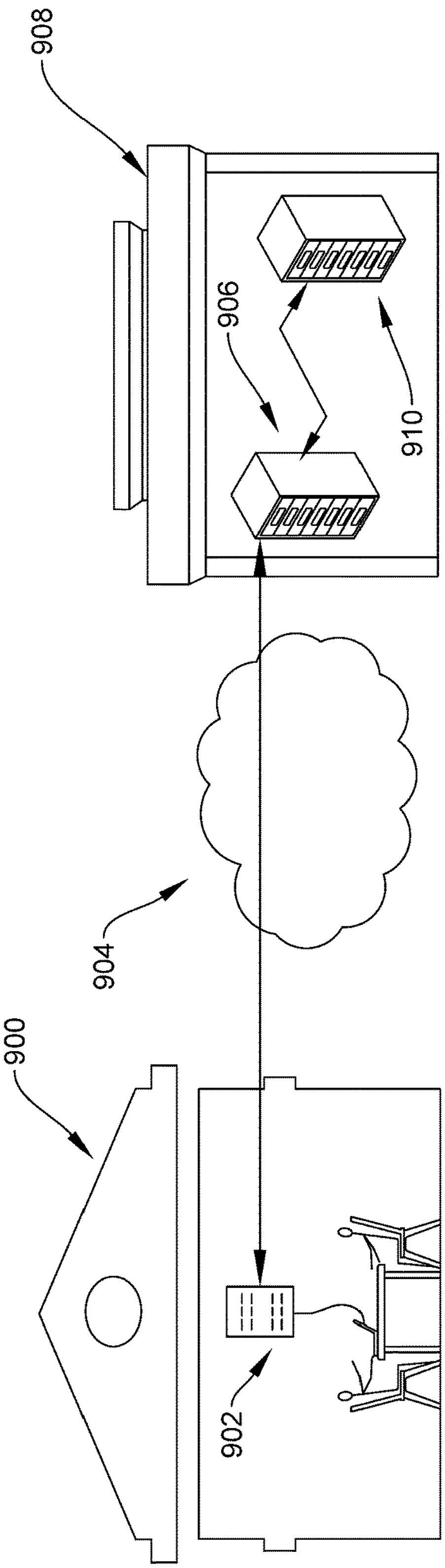
FIG. 9: Simplified schematic for loan application system.

In certain embodiments, for example, the methods, systems, products, communication management operations, software, middleware, computing infrastructure and/or apparatus of the present disclosure may be employed (for example in an embodiment of the communication management operations) to manage network communications (for example, all port-to-network, port-to-port and network-to-port communications) between customers and a service bureau hosting confidential personal data, such as personal identity data (for example social security numbers), financial data, and/or or health data (for example data covered under the Health Insurance Portability and Accountability Act (HIPAA)). In FIG. 9, an applicant for a loan from a bank 900 may provide personal financial information to a bank representative who inputs the data into the bank's electronic loan underwriting software resident on a bank server 902. Each communication pathway between and among nodes may be one of the encrypted communication pathways and/or network tunnels managed by one or more of the communication management operations of the authorized type described herein and/or in one of the REFERENCE APPLICATIONS.

The loan underwriting software resident on a bank server 902 forms a secure connection over the public Internet 904 according to Hyper Text Transfer Protocol Secure (HTTPS)

protocol with a front end server 906 at a credit bureau 908 and transmits a request for the bank applicant's credit history. The front end server 906 is equipped with first network security software which processes the request by extracting network packet payload data and chopping the data to neutralize any embedded malicious executable code. Once the data is chopped, second network security software resident on the front server 906 forms an encrypted connection with third network security software resident on a database server 910 of the credit bureau. The second and third network security software authenticate and authorize one another, the front end server 906 and the database server 910 devices, and the data protocol. The data protocol authorization requires that communications transmitted from the front end server 906 to the database server 910 consist of SQL queries to receive data, and communications transmitted from the database server 910 to the front end server 906 consist of data having a predetermined format. The second network security software creates a request for data based on the chopped payload and, upon receipt, passes the data through the HTTPS connection to the bank underwriting software resident on the bank server 902.

Figure 10:
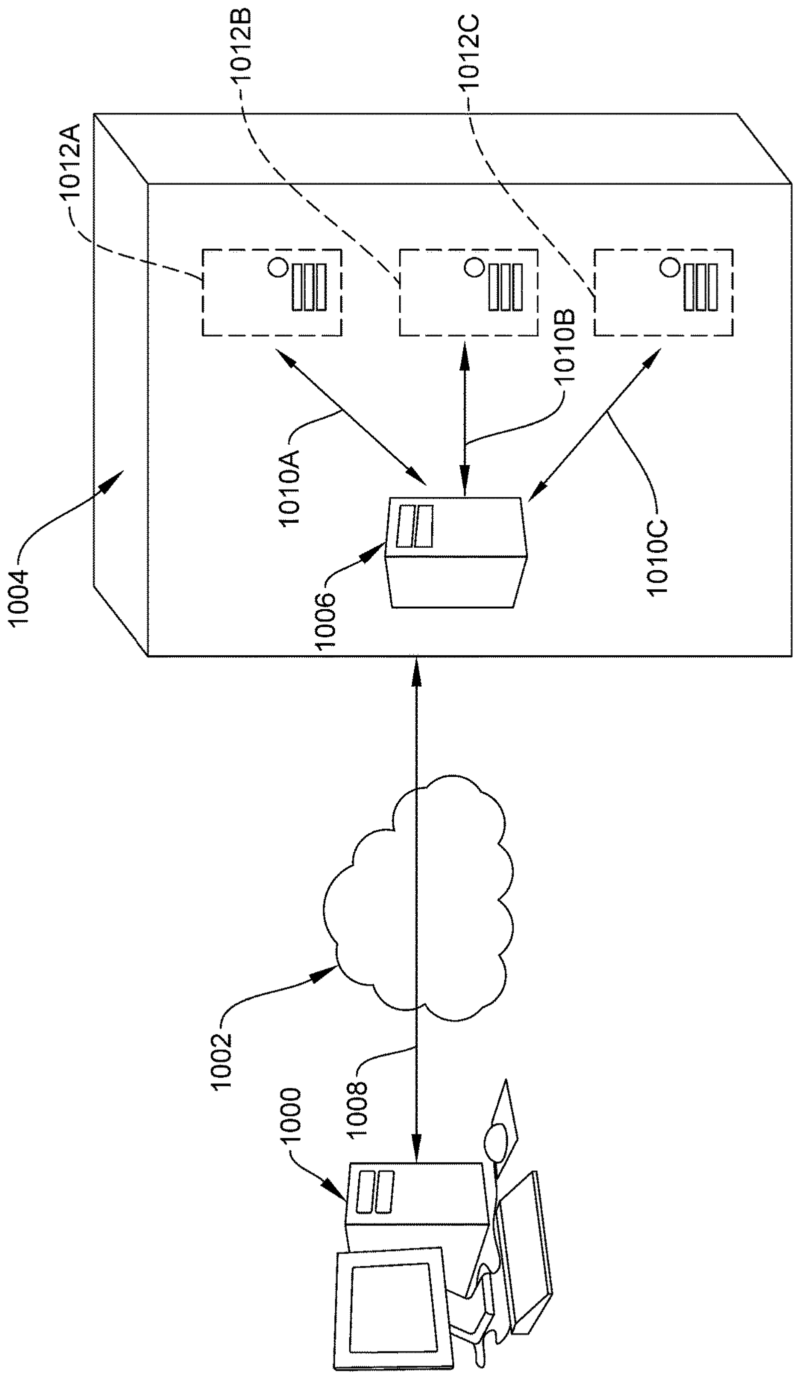
FIG. 10: Simplified schematic for a cloud computing ecosystem.

In certain embodiments, for example, the methods, systems, products, communication management operations, software, middleware, computing infrastructure and/or apparatus of the present disclosure may be employed (for example in an embodiment of the communication management operations) to manage network communications (for example, all port-to-network, port-to-port and network-to-port communications) between, as shown in FIG. 10, a local node 1000 and, via the public Internet, 1002, cloud computing services at a server farm 1004. Each communication pathway between and among nodes may be one of the encrypted communication pathways and/or network tunnels managed by one or more of the communication management operations of the authorized type described herein and/or in one of the REFERENCE APPLICATIONS.

In operation, all communications between the local node 1000 and the cloud computing services are transmitted through a dedicated bare-metal server 1006. The communications are managed by network security middleware present on the local node 1000 and on the dedicated bare-metal server 1006. The network security middleware negotiates an encrypted network tunnel 1008 by mutual authentication of devices based on shared secret device codes, process and process user identifiers on each device, and data protocol for the data being transmitted over the encrypted network tunnels. A different encrypted network tunnel is negotiated for each port-to-port communication, and the sending process, process user, and data protocol are authorized with each packet transmitted.

A communication path 1010 between the dedicated bare-metal server 1006 and virtual machines resident on cloud computing devices 1012 resident in the server farm 1004 are separately secured and are not protected by the above-noted network security middleware.

Certain embodiments may provide, for example, methods, systems, modules, or products for authorized communication, over a network, between plural nodes coupled to the network.

In certain embodiments, for example, the methods, systems, modules, or products may be implemented in hardware (for example may be implemented partially in hardware or entirely in hardware such as an application-specific integrated circuit). In certain embodiments, for example, the hardware may comprise programmable hardware (for example a field-programmable gate array). In certain embodiments, for example, the methods, systems, modules, or products may be implemented in software (for example entirely in software such as firmware, software resident on one or more nodes of the plural nodes, micro-code, etc.). In certain embodiments, for example, the software may be a computer-usable program stored in a computer-readable media (for example one or more of the non-transitory computer-readable storage media described below). In certain embodiments, for example, the methods, systems, modules, or products may be implemented in a combination of hardware and software.

In certain embodiments, for example, the network may comprise all or a portion of the public Internet, a Local Area Network (LAN) (for example a wired LAN, a wireless LAN, of a combination of the two), a Wide Area Network, a Metropolitan Area Network, a Campus Area Network, a Storage Area Network, a Personal Area Network, a System Area Network (or a Cluster Area Network), an Electronic Private Network, a Virtual Private Network (VPN), a Software-Defined Network, a Virtual Network, or a combination (or hybrid) of two or more of the foregoing networks. In certain embodiments, for example, the network may comprise a local area network supporting Ethernet communication over twisted pair cabling interconnected via one or plural switches and one or plural routers. In certain embodiments, for example, the network may comprise a local area network supporting wireless communication (for example wireless communication according to the IEEE 802.11 standard) using one or plural wireless antenna. In certain embodiments, for example, the network may comprise a local area network having an ARCNET, Token Ring, Localtalk, or FDDI configuration. In certain embodiments, for example, the network may comprise a local area network having Internet access. In certain embodiments, for example, the network may be exclusive of Internet access. In certain embodiments, for example, the network may transmit packet data by one or more propagated signals, for example an electrical signal, an optical signal, an acoustical wave, a carrier wave, an infrared signal, a digital signal, or a combination of two or more of the foregoing signals. In certain embodiments, for example, the network may be configured to transmit packet data (for example Ethernet frames) at a rate of at least 25 kilobits per second (Kbps), for example at least 100 Kbps, at least 250 Kbps, at least 500 Kbps, at least 1 million bits per second (Mbps), at least 10 Mbps, at least 25 Mbps, at least 50 Mbps, at least 100 Mbps, at least 250 Mbps, at least 500 Mbps, at least 1 gigabit per second (Gbps), at least 10 Gbps, at least 25 Gbps, at least 50 Gbps, or the network may be configured to transmit packet data at a rate of at least 100 Gbps. In certain embodiments, for example, the network may have a tree topology. In certain embodiments, for example, the network may be a mesh network.

In certain embodiments, for example, the network may connect plural nodes by routers and switches. In certain embodiments, for example, the plural nodes may comprise one or more of a network attached storage, a server (for example a file server, a mail server, a DNS server, a database server, a DHCP server, a VPN server, a VOIP server, an analytics server, or a portion of a cloud), a workstation (for example a desktop computer or a laptop computer), a mobile computing device (for example a smart phone, a smart tablet, or an embedded processor in an automobile), an input/output device (for example a fax machine, a printer, a scanner such as a bar code scanner, or a scanner/copier), a sensor (for example a temperature sensor, a moisture sensor, or a motion sensor), a camera (for example an IP camera), or a geolocation device (for example a Global Positioning System (GPS)-based device or a cellular triangulation device).

In certain embodiments, for example, the network may be a corporate communication network. In certain embodiments, for example, a portion of the plural nodes may be hosted at a corporate headquarters (for example central corporate databases, an email server, or a file backup storage). In certain embodiments, for example, all incoming traffic from the public Internet to the corporate network may be routed through the corporate headquarters. In certain embodiments, for example, a portion of the plural nodes may reside at one or more branch locations removed from the corporate headquarters. In certain embodiments, for example, the portion of the plural nodes may comprise one or more of a workstation or a sensor. In certain embodiments, for example, the one or more branch locations may communicate with the headquarters by a virtual private connection (for example the network may comprise a VPN). In certain embodiments, for example, the network may provide communication to one or plural mobile corporate assets (for example an automobile such as a rental car or a cargo truck). In certain embodiments, for example, the one or plural corporate assets may comprise one or more of an embedded processor and a sensor.

In certain embodiments, for example, the network may provide communication to, from, or within a hospital or a doctor's office. In certain embodiments, for example, the network may connect one or plural resources with databases, computers, devices, and/or sensors located in the hospital or doctor's office. In certain embodiments, for example, the one or plural resources may comprise a data center (for example a local or remote data center). In certain embodiments, for example, the network may comprise a VPN and/or plural LANs (for example a WAN). In certain embodiments, for example, the one or plural resources may comprise a cloud. In certain embodiments, for example, the one or plural resources may be connected to more than one hospital and/or doctor's office. In certain further embodiments, for example, the network may communicate patient records, patient monitoring data (for example real time data for a patient from a heart monitor being transmitted to a nurse's station), telemedicine data, billing and/or reimbursement data, financial data, equipment maintenance data, or a combination of two or more of the foregoing. In certain embodiments, for example, the network may provide communication between one or plural patient rooms and one or plural computing devices at a hospital or a doctor's office location (for example a nurse's station, a doctor's office, a medical supervisor's office, or a smart device (for example a smart phone running an app) used by a healthcare provider), a data hub (for example a local data hub or a data hub connected to the hospital by a private connection or the public Internet), a database, a smart device (for example a smart phone running an app) and/or the one or plural resources. In certain embodiments, for example, the recipient of the communication may be located within a LAN of the hospital or doctor's office. In certain embodiments, for example, the recipient of the communication may be remote from the LAN of the hospital or doctor's office. In certain embodiments, for example, the recipient of the communication may comprise a business partner (for example a service provider such as a billing service provider or a laboratory) of the hospital or doctor's office. In certain embodiments, for example, the communication may comprise sensor data from one or plural sensors in one of the one or plural patient rooms (for example the one or plural sensors may be an oxygen monitoring sensor, a heart monitor, a blood pressure sensor, or a medicine delivery sensor), a scanner (for example a scanner used to scan a barcode on a medicine container, such as a scanner used to scan a two-dimensional barcode in a hospital room), an input/output device (for example a keypad or a smartphone running an app), or a telemedicine device.

In certain embodiments, for example, the network may provide communication with one or plural automobiles (for example the network may provide communication in a smart car ecosystem). In certain embodiments, for example, one or plural devices in an automobile may be wirelessly connected to the Internet. In certain embodiments, for example, the network may provide communication between one or plural law enforcement-controlled devices and one or plural devices (for example a speedometer, a geolocator, or a kill switch) in (or on) the automobile. In certain embodiments, for example, the network may provide communication between one or plural equipment manufacturer interfaces (for example an interface to a web server or a cloud) and one or plural devices (for example a device configured to provide equipment diagnostic information) in (or on) the automobile. In certain embodiments, for example, the network may provide communication between one or plural urban planning agencies and one or plural devices (for example a geolocator or an onboard video camera) in (or on) the automobile. In certain embodiments, for example, the network may communicate weather information from a weather provider to a device (for example an onboard computer executing an autonomous operating system) in (or on) the automobile. In certain embodiments, for example, the network may communicate traffic information (for example traffic congestion information or traffic signal information) to a device (for example an onboard computer executing an autonomous operating system or a global positioning system software) in the automobile. In certain embodiments, for example, the network may communicate logistic information (for example cargo content, next requested stop information, destination location, or delivery status information) between a corporate database and a device in (or on) the automobile. In certain embodiments, for example, the network may communicate vehicle maintenance information (for example an oil change reminder) between a maintenance provider and a device in (or on) the automobile. In certain embodiments, for example, the network may transmit car payload data, car diagnostic data, business data, and/or infrastructure data between one or plural automobiles and a law enforcement agency, an urban planning agency, a weather provider, a traffic provider, a logistics provider, a car maintenance provider, or a combination of two or more of the foregoing.

In certain embodiments, for example, the network may provide communication in a chemical processing facility. In certain further embodiments, for example, the network may provide communication between a Supervisory Control and Data Acquisition (SCADA) system and a plurality of sensors, controllers, logic units, and controllers. In certain embodiments, for example, the network may communicate batch record data generated at one or plural stages of a chemical process.

In certain embodiments, for example, the network may provide communication among one or plural nodes for one or plural dedicated processes (for example one or plural industrial control processes or one or plural IoT applications). In certain further embodiments, for example, the network may provide communication for maintenance of the configuration of communications among the one or plural nodes. In certain embodiments, for example, the network may provide communications from one or plural dedicated processes or devices to a cloud (for example a storage cloud or an analytics engine).

In certain embodiments, for example, the network may provide communication in a factory. In certain embodiments, for example, the network may provide communication in a power station. In certain embodiments, for example, the network may provide communication in an offshore platform. In certain embodiments, for example, the network may provide communication for Automated Teller Machine (ATM) transactions. In certain embodiments, for example, the network may provide communication for credit card transactions. In certain embodiments, for example, the network may provide communication for monitoring IoT devices (for example monitoring IoT devices located in one or plural homes) for a warranty update, a maintenance indication, a service indication, a coupon, a cross-sale advertisement, an up-sale opportunity, or a combination of two or more of the foregoing. In certain embodiment, for example, the network may provide communication for database access (for example communication for access to a credit bureau database). In certain embodiments, for example, the network may provide communication to a DNS server.

In certain embodiments, for example, the network may transmit packets of binary data, signed or unsigned integer data, text (or string) data, or floating point data. In certain embodiments, for example, the network may transmit packets of analog readings (for example readings from an analog sensor). In certain embodiments, for example, the network may transmit packets of digital readings (for example readings from a digital sensor). In certain embodiments, for example, the network may transmit packets of sensor data (such as sensor readings, sensor state data, sensor warranty information, or sensor configuration data). In certain embodiments, for example, the network may transmit packets of voice data. In certain embodiments, for example, the network may transmit packets of image data. In certain embodiments, for example, the network may transmit packets of video data. In certain embodiments, for example, the network may transmit packets containing part or all of a file according to a protocol. In certain embodiments, for example, the file may be an executable file (for example an application program). In certain embodiments, for example, the file may be a parameters file, a data file, or configuration file (for example a file used to configure authorized communications). In certain embodiments, for example, the file may be a binary file (for example a binary file defining authorized communications). In certain embodiments, for example, the protocol may be a File Transfer Protocol (FTP). In certain embodiments, for example, the network may transmit packets of data for a remote control session. In certain embodiments, for example, the network may transmit packets of typed data (for example strongly typed data). In certain embodiments, for example, the network may transmit machine-to-machine communications. In certain embodiments, for example, the network may transmit packets of data objects. In certain embodiments, for example, the data objects may comprise a topic. In certain embodiments, for example, the network may transmit data packets comprising a publication (for example a publication being transmitted from a publisher to one or more subscribers). In certain embodiments, for example, the network may transmit data packets comprising metadata. In certain embodiments, for example, the metadata may comprise a connection state indicator (for example a connection state indicator indicating whether a port-to-port connection is open, closed, or in the process of being established). In certain embodiments, for example, the metadata may comprise a communication authentication parameter (for example a parameter used to authenticate a communicating device, communicating application, or communicating user). In certain embodiments, for example, the metadata may comprise a communication authorization parameter (for example a parameter used to authorize a communicating device, a communicating application, a communicating user, a data type, or a combination of two or more of the foregoing). In certain embodiments, for example, the metadata may comprise a data type or a data protocol parameter.

In certain embodiments, for example, the one or plural nodes may comprise an electronic device configured to send, receive, and/or forward information over the network. In certain embodiments, for example, the electronic device may be (or may host) a communication endpoint. In certain embodiments, for example, the one or plural nodes may comprise a device configured for network packet (for example Ethernet) communication, for example a computer, a computer system, a computing device, an edge device, part or all of a machine, a sensor, a controller, a microcontroller, a server, a client, a workstation, a host computer, a modem, a hub, a bridge, a switch, or a router configured for network packet communication. In certain embodiments, for example, the one or plural nodes may comprise a processor node equipped with a processor configured to process computer instructions. In certain embodiments, for example, the one or plural nodes may comprise a device configured for executing a network stack, for example a computer, a computer system, computing device, an edge device, part or all of a machine, a sensor, a controller, a microcontroller, a server, a client, a workstation, a host computer, a modem, a hub, a bridge, a switch, or a router executing a network stack.

In certain embodiments, for example, the one or plural nodes may comprise an electronic instruction execution system. In certain embodiments, for example, the one or plural nodes may comprise a processor (for example a central processing unit (CPU)), a microprocessor (for example a single-board microprocessor), a programmable processor (for example a field-programmable gate array (FPGA), an application specific integrated circuit (ASIC), or a virtual machine.

In certain embodiments, for example, the CPU may have an x86 architecture. In certain embodiments, for example, the CPU may be a 4-bit processor such as an Intel 4004 processor. In certain embodiments, for example, the CPU may be an 8-bit processor, for example an Intel 8008 processor, an Intel 8080 processor, or an Intel 8085 processor. In certain embodiments, for example, the CPU may be a bit-slice processor, for example a bit-slice processor selected from the Intel 3000 bit-slice processor family. In certain embodiments, for example, the CPU may be a 16-bit processor, for example a processor selected from Intel MCS-86 processor family such as an Intel 8086 processor, an Intel 8088 processor, an Intel 80186 processor, an Intel 80188 processor, or an Intel 80286 processor. In certain embodiments, for example, the CPU may be a 32-bit processor, for example a non-x86 processor such as an iAPX 432 processor, an i960 processor, an i860 processor, or an XScale processor. In certain embodiments, for example, the CPU may be a 32-bit processor, for example an Intel 80386 range processor such as an Intel 80386DX processor, an Intel 80386SX processor, an Intel 80376 processor, an Intel 80386SL processor, or an Intel 80386EX processor. In certain embodiments, for example, the CPU may be a 32-bit processor, for example an Intel 80486 range processor such as an Intel 80486DX processor, an Intel 80486SX processor, an Intel 80486DX2 processor, an Intel 80486SL processor, or an Intel 80486DX4 processor. In certain embodiments, for example, the CPU may be based on a 32-bit Intel P5 microarchitecture, for example an Intel Pentium processor or an Intel Pentium processor with MMX Technology. In certain embodiments, for example, the CPU may be based on a 32-bit P6/Pentium M microarchitecture, for example an Intel Pentium Pro processor, an Intel Pentium II processor, an Intel Celeron processor, an Intel Pentium III processor, an Intel Pentium II Xeon processor, an Intel Pentium III Xeon processor, an Intel Pentium III Coppermine-based Celeron processor, an Intel Pentium III Tualatin-based processor, an Intel Pentium M processor, an Intel Celeron M processor, an Intel Core processor, or an Intel Dual-Core Xeon LV processor. In certain embodiments, for example, the CPU may be based on a 32-bit NetBurst microarchitecture, for example an Intel Pentium 4 processor, an Xeon processor, an Intel Mobile Pentium 4-M processor, an Intel Pentium 4 EE processor, or an Intel Pentium 4E processor. In certain embodiments, for example, the CPU may be 64-bit IA-64 processor, for example an Intel Itanium processor or an Intel Itanium 2 processor. In certain embodiments, for example, the CPU may have a 64-bit NetBurst microarchitecture, for example an Intel Pentium 4F processor, Intel Pentium D processor, Intel Pentium Extreme Edition processor, or an Intel Xeon processor. In certain embodiments, for example, the CPU may have a 64-bit Core microarchitecture, for example an Intel Core 2 processor, an Intel Pentium Dual-Core processor, an Intel Celeron processor, or an Intel Celeron M processor. In certain embodiments, for example, the CPU may have a 64-bit Nehalem microarchitecture, for example an Intel Pentium processor, an Intel Core i3 processor, an Intel Core i5 processor, an Intel Core i7 processor, or an Intel Xeon processor. In certain embodiments, for example, the CPU may have a 64-bit Sandy Bridge/Ivy Bridge microarchitecture, for example an Intel Celeron processor, an Intel Pentium processor, an Intel Core i3 processor, an Intel Core i5 processor, or an Intel Core i7 processor. In certain embodiments, for example, the CPU may have a 64-bit Haswell microarchitecture. In certain embodiments, for example, the CPU may have a Broadwell microarchitecture, for example an Intel Core i3 processor, an Intel Core i5 processor, or an Intel Core i7 processor. In certain embodiments, for example, the CPU may have a Skylake microarchitecture, for example an Intel Core i3 processor, an Intel Core i5 processor, or an Intel Core i7 processor. In certain embodiments, for example, the CPU may have a Kaby Lake microarchitecture. In certain embodiments, for example, the CPU may have a Coffee Lake microarchitecture. In certain embodiments, for example, the CPU may have a Cannonlake microarchitecture. In certain embodiments, for example, the CPU may Intel Tera-Scale processor. In certain embodiments, for example, the node may comprise a microcontroller. In certain embodiments, for example, the microcontroller may be an Intel 8048 microcontroller, an Intel 8051 microcontroller, an Intel 80151 microcontroller, an Intel 80251 microcontroller, or a microcontroller selected from the MCS-96 family of microcontrollers.

In certain embodiments, for example, the CPU may have an ARM architecture. In certain embodiments, for example, the CPU may have an ARMv1 architecture. In certain embodiments, for example, the CPU may have an ARMv2 architecture. In certain embodiments, for example, the CPU may have an ARMv3 architecture. In certain embodiments, for example, the CPU may have an ARMv4 architecture. In certain embodiments, for example, the CPU may have an ARMv4T architecture. In certain embodiments, for example, the CPU may have an ARMv5TE architecture. In certain embodiments, for example, the CPU may have an ARMv6 architecture. In certain embodiments, for example, the CPU may have an ARMv6-M architecture. In certain embodiments, for example, the CPU may have an ARMv7-M architecture. In certain embodiments, for example, the CPU may have an ARMv7E-M architecture. In certain embodiments, for example, the CPU may have an ARMv8-M architecture. In certain embodiments, for example, the CPU may have an ARMv7-R architecture. In certain embodiments, for example, the CPU may have an ARMv8-R architecture. In certain embodiments, for example, the CPU may have an ARMv7-A architecture. In certain embodiments, for example, the CPU may have an ARMv8-A architecture. In certain embodiments, for example, the CPU may have an ARMv8-A architecture. In certain embodiments, for example, the CPU may have an ARMv8.1-A architecture. In certain embodiments, for example, the CPU may have an ARMv8.2-A architecture. In certain embodiments, for example, the CPU may have an ARMv8.3-A architecture.

In certain embodiments, for example, the node may comprise a Digital Signal Processor (DSP) (for example the DSP may be embedded on a CPU or may be connected to a CPU). In certain embodiments, for example, the DSP may be a C6000 series DSP produced by Texas Instruments. In certain embodiments, for example, the CPU may be a TMS320C6474 chip. In certain embodiments, for example, the CPU may comprise a DSP having a StarCore architecture, for example MSC81xx chip produced by Freescale such as a MSC8144 DSP. In certain embodiments, for example, the CPU may comprise a multi-core multi-threaded DSP such as a multi-core multi-threaded processor produced by XMOS. In certain embodiments, for example, the DSP may be a CEVA-TeakLite DSP or a CEVA-XC DSP produced by CEVA, Inc. In certain embodiments, for example, the DSP may be a SHARC-based DSP produced by Analog Devices. In certain embodiments, for example, the DSP may be an embedded DSP, for example a Blackfin DSP. In certain embodiments, for example, the DSP may be based on TriMedia VLIW technology, for example a DSP produced by NXP Semiconductors. In certain embodiments, for example, the DSP may support fixed-point arithmetic. In certain embodiments, for example, the DSP may support floating-point arithmetic.

In certain embodiments, for example, the node may comprise a Graphics Processing Unit (GPU) (for example the GPU may be embedded on a CPU or may be connected to a CPU). In certain embodiments, for example, the GPU may be a gaming GPU such as GeForce GTX produced by nVidia, a Titan X produced by nVidia, a Radeon HD produced by Advanced Micro Devices (AMD), or a Radeon HD produced by Advanced Micro Devices (AMD). In certain embodiments, for example, the GPU may be a cloud gaming GPU such as a Grid produced by nVidia, or a Radeon Sky produced by Advanced Micro Devices (AMD). In certain embodiments, for example, the GPU may be a workstation GPU such as a Quadro produced by nVidia, a FirePro produced by AMD, or a Radeon Pro produced by AMD. In certain embodiments, for example, the GPU may be a cloud workstation such as a Tesla produced by nVidia, or a FireStream produced by AMD. In certain embodiments, for example, the GPU may be an artificial Intelligence cloud GPU such as a Radeon Instinct produced by AMD. In certain embodiments, for example, the GPU may be an automated/driverless car GPU such as a Drive PX produced by nVidia.

In certain embodiments, for example, the CPU may comprise an AMD Am2900 series processor, for example an Am2901 4-bit-slice ALU (1975), an Am2902 Look-Ahead Carry Generator, an Am2903 4-bit-slice ALU, an with hardware multiply, an Am2904 Status and Shift Control Unit, an Am2905 Bus Transceiver, an Am2906 Bus Transceiver with Parity, an Am2907 Bus Transceiver with Parity, an Am2908 Bus Transceiver with Parity, an Am2909 4-bit-slice address sequencer, an Am2910 12-bit address sequencer, an Am2911 4-bit-slice address sequencer, an Am2912 Bus Transceiver, an Am2913 Priority Interrupt Expander, or an Am2914 Priority Interrupt Controller. In certain embodiments, for example, the CPU may comprise an AMD Am29000 series processor, for example, an AMD 29000, an AMD 29027 FPU, an AMD 29030, an AMD 29050 with on-chip FPU, or an AMD 292xx embedded processor. In certain embodiments, for example, the processor may be an AMD Am9080, an AMD Am29X305, or an AMD Opteron A1100 Series.

In certain embodiments, for example, the CPU may be a Motorola 68451, a MC88100, a MC88110, a Motorola 6800 family, a Motorola 6809, a Motorola 88000, a Motorola MC10800, or a Motorola MC14500B processor. In certain embodiments, for example, the CPU may be a Motorola PowerPC processor, for example a PowerPC 600, a PowerPC e200, a PowerPC 7)(x, a PowerPC 5000, a PowerPC G4, or a PowerQUICC processor.

In certain embodiments, for example, the one or plural nodes may comprise one or more processors coupled to one or more other components, inclusive of one or more non-transitory memory, one or more user input/output devices (for example a keyboard, a touchscreen, and/or a display), one or more data buses, and one or more physical interfaces to the network. In certain embodiments, for example, the one or more physical interfaces may comprise an Ethernet interface (for example a copper or fiber interface), a wireless interface (for example a wireless interface according to the IEEE 802.11 standard), a wireless broadband interface (for example a "Wi-Max" interface according to the IEEE 802.16 standard), a wireless interface according to an IEEE 802.15.4-based standard (for example an interface according to the Zigbee specification), a Bluetooth interface (for example a Bluetooth interface according to the IEEE 802.15.1 standard), a modem, or a combination of two or more of the foregoing interfaces. In certain embodiments, for example, the one or more physical interfaces may comprise an FPGA programmed for high speed network processing. In certain embodiments, for example, the one or more physical interfaces (for example an Ethernet interface or one of the aforementioned wireless interfaces) may have a data transfer rate of 10 Mbps, 100 Mbps, 1 Gbps, 10 Gbps, or 100 Gbps. In certain embodiments, for example, the one or more physical interfaces may have a data transfer rate of at least 10 Mbps, for example at least 100 Mbps, at least 1 Gbps, at least 10 Gbps, or the one or more physical interfaces may have a data transfer rate of at least 100 Gbps. In certain embodiments, for example, the one or more physical interfaces may have a data transfer rate of less than 100 Gbps, for example less than 10 Gbps, less than 1 Gbps, less than 100 Mbps, or the one or more physical interfaces may have a data transfer rate of less than 10 Mbps.

In certain embodiments, for example, the one or plural nodes may comprise computer-readable media configured to store information (for example data or computer-readable instructions). In certain embodiments, for example, the computer-readable media may comprise non-transitory computer-readable storage media. In certain embodiments, for example, the non-transitory computer-readable storage media may comprise a magnetic disk, an optical disk, random access memory (RAM), read-only memory, a flash memory device, or phase-change memory. In certain embodiments, for example, the non-transitory computer-readable storage media may be a fixed memory device, such as a hard drive. In certain embodiments, for example, the non-transitory computer-readable storage media may comprise one or plural device drives. In certain embodiments, for example, one or plural device drives may be selective from the group consisting of a parallel IDE drive, a serial EIDE drive, a SCSI based drive (for example Narrow, UW, LVD, etc.), an external USB/Flash drive; an IOMEGA Zip drive, a Jazz drive, a CD/DVD, a CD-R/RW, a DVD-R/RW drive, or a combination of two or more of the foregoing device drives. In certain embodiments, for example, the non-transitory computer-readable storage media may be a removable memory device, such as a diskette or a Universal Serial Bus (USB) flash drive. In certain embodiments, for example, the one or plural nodes (for example all of the plural nodes) may be exclusive of removable computer-readable media.

In certain embodiments, for example, the methods, systems, modules, or products may be implemented in software that is stored in one or more of the aforementioned computer-readable media and, when ready to be utilized, loaded in part or in whole (for example, into RAM) and executed by a CPU.

In certain embodiments, for example, the one or plural nodes may communicate (for example internally, or for example with each of another one or more of the plural nodes over the network) using transitory computer-readable communication media. In certain embodiments, for example, the transitory computer-readable communication media may comprise a propagated signal, for example an electrical signal, an optical signal, an acoustical wave, a carrier wave, an infrared signal, and/or a digital signal.

In certain embodiments, for example, the one or plural nodes may comprise an operating system defining a kernel (for example the one or plural nodes may be plural nodes, wherein a first node of the plural nodes comprises a first operating system and a second node of the plural nodes comprises a second operating system, the first operating system the same or different from the second operating system). In certain embodiments, for example, the operating system may be selected from the group consisting of 2K, 86-DOS, A/UX, Acados, ACP (Airline Control Program), AdaOS, ADMIRAL, Adrenaline, aerolitheOS, Aimos, AIOS, AIX, AIX/370, AIX/ESA, Aleris Operating System, Allegro, AllianceOS, Alpha OS, Alto OS, Amiga OS, Amoeba, Amstrad, AMX RTOS, AneedA, AngelOS, Antarctica, AOS/VS, Aperios, Apollo Domain/OS, ApolloOS, Apostle, Archimedes OS, AROS, ARTOS, Asbestos, Athena, AtheOS, AtomsNet, Atomthreads, AuroraOS, AutoSense OS, B-Free, Bada, BAL, Banyan VINES, Basic Executive System, BelA, BeOS, Beowulf, BKY, BlueEyedOS, BOS, BOS1810, BoxOS, bpmk, BPMK, BRiX, BS600, BS2000, BSDi, BugOS, Calmira, CCP (Computer Control Program), CDOS, Cefarix, C Executive, Chaos, ChibiOS, Chimera, Chippewa OS, Choices, Chorus, Cinder OS, Cisco IOS, Clicker32, CMW+ (SCO), COBRA, Coherent, CONSENSYS, Contiki, ConvexOS, Cos, Cosy, Counterpoise, CP/K, CP/M, CP/NET, CP/Z, CPF (Control Program Facility), Cromix, Cronus, CSOC, CTOS, CTSS, CX/SX, Cygnus, DAC, Darwin, Data General, DC/OSx, DCP, Degenerate OS, Delitalk, DELL UNIX, Deming OS, DEMOS, DesktopBSD, DESKWORK, DG/UX, DIGITAL UNIX, dingOS, DK/DOS, DLD, DNIX, Domain OS, DOS, DOS2, DOS 50, Dosket, drex, DR-DOS, Drops, Drywell OS, DS-OS, DTOS, DVIX, DYNIX Unix (Sequent), ECL-3211, eComStation, eCos, EduOS, EGOS, ekkoBSD, Elate, ELKS, Elysium, EOS, EP/IX, EPOC, ERaMS, ERIKA, EROS, ESER, ESIX, ESKO, Eumel, EuNIX, Exopc, ExOS, Express, Famos, FDOS, Fiasco, Flamethrower, FlashOS, FlexOS, FlingOS, FLP-80 DOS, Flux, Flux-Fluke-Flask, FMS, Forth, FortiOS, FreeBSD, FreeDOS, FreeDOWS, FreeVMS, Frenzy, Fuchsia, FullPliant, FunatixOS, FxOS, GazOS, GCOS, GECOS, GeekOS, Gemini Nucleus, Genera, GEORGE, GEOS, GM OS, GNU Hurd, GNUstep, Go, Goah, Gould OS, Grasshopper, GUIDE, HA-MSP, Hactar, Harmony, Haiku, Helios, HES, Hive, HOPE, HP-87 OS, HP-UX, HT-11, Hurd, Hurricane, HydrixOS, i5/OS, IBM PC-DOS, IBSYS, Icaros Desktop, ICL Unix, Immunix, Inferno, INMOS, INTEGRITY RTOS, Iridium OS, IRIX, iRMX, IRTS, ISC (Interactive), ISIS, ISSL, ITRON, ITS, JAMB, JavaOS, Jbed, JeniOS, Jeo-OS, Jibbed, JOS, JTMOS, JUNOS, JxOS, KAOS, Kaspersky OS, Katix, Kea, Kerberos, KeyKOS, KolibriOS, KOS, KRONOS, KROS, KRUD, Kylin, L4, L13Plus, LainOS, LAN Manager, LDOS, LegOS, leJOS, Linux, Lisa OS, LTSS, LynxOS, Mach, Mac OS 8, Mac OS 9, Mac OS X, MANOS, MaRTE OS, Maruti, Masix, Master, Maverick OS, MBOS, MCP (Master Control Program), MDOS, MenuetOS, Merlin, Micripm, MICRO-DOS, MicroVMS, MidnightBSD, MikeOS, Minima, Minix, Minoca OS, Minux, Miranda, Miray pnOS, MITE 80/10S, MK++, ML, ModulOS, Monitor, MOPS, MorphOS, MOS, MOSIX, MPE/iX, MPE OS, MRT1700, MS-DOS, MSOS, MT809, Multics, Mungi, MUTOS, muVinix, MVS, Möbius, NachOS, NCR Unix, NEC DOS, NECUX, Nemesis, NeOS, NetBSD, Netware, NewDeal, NEWDOS, NewOS, NEWS-OS, Newton OS, NexentaOS, NeXTStep, NextworksOS, Nexus, Nimbus, NintendOS, Node OS, NOS, NOS/BE, NOS/VE, Nova, Novell DOS, NS/GDOS, NSK, NTDIOS, Nucleus, Oaesis, Oasis, Oberon, Objex, Odin, Omega 4, OnCore, On Time RTOS-32, Opal, OpenBeOS, OpenBSD, OpenDarwin, OpenRavenscar, OpenServer, OpenSolaris, OpenVision, OpenVMS, OppcOS, OS-2, OS-9, OS-C, OS/2, OS/2 Warp, OS/9, OS/360, OS/390, OS/400, OS/ES, OS/M, OS4, osCAN, OSE, OSF/1, Osx, OXx16, OZONE, PAKOS, Palm OS, PAPL, Paramecium, ParixOS, Paros, PaulOS, P BASIC, PC-BSD, PC-DOS, PC-MOS/386, PC/M-System, PDOS, PEACE, Pebble, Pegasos, PETROS, Phantom OS, Phos, PikeOS, PIOS, PizziOS, Plan 9, Plex86, PM_SZ_OS, PocketPC 2003, PowerMAX, PowerOS, PowerSX, PowerUX, ProDOS, Prologue, Proolix, ProOSEK, PSOS, pSOSystem, PSU, PTS DOS, PublicOS, PURE, QDOS, QNX, Quadros, RadiOS, RBASIC, RCOS, RCOS-java, RDOS, ReactOS, REAL-32, Realogy Real Time Architekt, REBOL-IOS, Redox, ReWin, REX-80/86, REXX/OS, RHODOS, RISC OS, RMOS, RMS 68k, Roadrunner, Rocket, Rome, ROME, RSTS/E, RSX-11, RT-11, RTEL, RTEMS, RT Mach NTT, rtmk, RTMX, RTOS-32, RTOS-UH, RTS-80, RTX, RTXDOS, RxDOS, S.Ha.R.K, Sanos, SCO OpenServer, SCOPE, ScorchOS, ScottsNewOS, Scout, SCP, SCP (System Control Program), SCP-IBE, Self-R, SeOS, Sequent, SEVMS VAX, Shark, SharpOS, ShawnOS, SIBO, Sinclair, Sinix, SINTRAN III, SkyOS, Slikware, sMultiTA, SOBS, Solaris, Solar OS, Solbourne UNIX, SOS, SP6800, Spice, Spice/MT, SPIN, Spinix, SPDX, Spring, Squeak, SSP (System Support Program), STAR-OS, STARCOS, Starplex II OS, Sting, StreamOS, Subsump, SUMO, SunMOS, SunOS, SunriseOS, SuperDOS, SVM, SVR, Switch OS, Syllable, Symbian OS, SymbOS, Symobi, Symphony OS, Synapse, System 6 (Mac OS), System 7 (Mac OS), System V Release, Tabos, TABOS, TalOS, TAOS, TENEX, THE, Thix, ThreadX, ThrillOS, TI-99 4A, TinyOS, TIS APL, TNIX, TOPS-10, TOPS-20, Topsy, Tornado, Torsion, TOS, TPF (Transaction Processing Facility), TriangleOS, Tripos, TRON, TRS-DOS, Tru64 UNIX, TSX-32, TUD:OS, TUNES, TurboDOS, UberOS, UCSD-p, UDOS, Ultrix, UMDS, UMN, UNI/OS, Unicos, UNICOS/Ic, Uni FLEX, Unisys U5000, Unix System, UnixWare, Ununumium, USIX, UTS, UXP/V, V2 OS, Vapour, Veloce 0S3, VERSAdos, VisiOn, Visopsys, Visual Network OS, VM/ESA, VM/VSE, VME, VMS, VRTX/8002, VRTX/OS, VSE, VSOS, VSTa, VTOS, VxWorks, WEGA, WildMagnolia, Windows 7, Windows 8, Windows 10, Windows 95, Windows 98, Windows 98 SE, Windows 2000, Windows Automotive, Windows CE, Windows ME, Windows NT, Windows Server 2003, Windows Server 2003 R2, Windows Server 2008, Windows Server 2008 R2, Windows Vista, Windows XP, WinMac, WIZRD, x-kernel, XAOS, XDOS, Xenix, Xinu, xMach, XOS, XTS, Yamit, Yaxic, Yoctix, z-VM, z/OS, Z9001-OS, ZealOS, Zephyr, Zeta, Zeus Zilog, zeVenOS, ZMOS, ZotOS, and ZRTS 8000. In certain embodiments, for example, the operating system may be a Linux distribution consisting of the group selected from 3Anoppix, 64 Studio, Absolute Linux, AbulEdu, Adamantix, ADIOS, Adler Linux, Admelix, Admiral Linux, AGNULA, Alcolix, Alinex, aLinux, AliXe, Alpine Linux, ALT Linux, amaroK Live, Amber, andLinux, Android, Android Things, Ankur, Annvix, AnNyung, Anonym.OS, ANTEMIUM, antiX, APODIO, Apricity OS, aquamorph, Arabian, ArcheOS, Archie, Arch Linux, Ark Linux, Armed Linux, ArtistX, Arudius, AsianLinux, Asianux, ASork, ASP Linux, Astaro, AsteriskNOW, Athene, ATMission, Atomix, Augustux, Aurora, Aurox, AUSTRUMI, B2D, BabelDisc, BackTrack, Baltix, Bayanihan, BearOps Linux, BeatrlX Linux, Beehive Linux, BeleniX, Bent Linux, Berry Linux, BestLinux, BIG LINUX, BinToo, BioBrew, Bioknoppix, Black Cat Linux, blackPanther, BLAG, Blin Linux, Bloody Stupid, Blue Cat Linux, BlueLinux, Bluewall, Bodhi Linux, Bonzai Linux, Bootable Cluster CD, Brillo, Buffalo, BugnuX, BU Linux, Burapha, ByzantineOS, Caixa Mágica, Caldera Linux, cAos, Carl.OS, Catix, CCux, CDlinux, Censornet, CentOS, Chakra, Chrome OS, Chromium OS, cl33n, ClarkConnect, ClearOS, cLIeNUX, Clonezilla Live, Clusterix, clusterKNOPPIX, Co-Create, CobaltOS, College, Commodore OS Vision, Condorux, Conectiva Linux, Cool Linux CD, CoreBiz, Coreboot, Corel Linux, CoreOS, Coyote, Craftworks Linux, CrunchBang, CrunchEee, CRUX, Cub Linux, Càtix, Damn Small Linux, Damn Vulnerable Linux, Danix, DARKSTAR, Debian GNU/Linux, Debris Linux, Deep-Water, Deft Linux, DeLi, Delix Linux, Dell Networking OS10, Denix, Devil, Dizinha, DLD, DNA-Linux, Draco Linux, Dragon Linux, Dragora, DRBL live, Dreamlinux, Dualix, Dynabolic, dyne:bolic, Dzongkha, E/OS LX Desktop, Eadem, Eagle, eAR OS, easyLinux, Easy Peasy, easys, Edubuntu, eduKnoppix, EduLinux, Ehad, Eisfair, Elbuntu, ELE, eLearnix, elementary OS, ELF, Elfstone Linux, ELinOS, Elive, ELP, ELX, Embedix, Endian, Endless OS, EnGarde, ERPOSS, ESware, Euronode, EvilEntity Linux, Evinux, EzPlanet One, FAMELIX, FaunOS, Feather, Featherweight, Fedora, Fermi, ffsearch-LiveCD, Finnix, Firefox OS, Fiubbix, Flash, FlightLinux, Flonix, Fluxbuntu, FluxFlux-Eee, Foresight, FoRK, Formilux, FoX Desktop, Freduc, free-EOS, Freedows, Freeduc, FreeNAS, Freepia, FreeSBIE, Freespire, FreevoLive, Freezy, Frugalware, FTOSX, FusionSphere, GalliumOS, GeeXboX, Gelecek, GenieOS, Gentoo, Gentoox, GEOLivre, Gibraltar, Ging, Giotto, Glendix, gNewSense, GNIX, Gnoppix, GNUbie Linux, gnuLinEx, GNUstep, GoblinX, GoboLinux, GoodGoat Linux, gOS (Google OS), GParted, Grafpup, Granular Linux, grml, Guadalinex, Guix, GuLIC-BSD, H3Knix, Haansoft, Hakin9, Halloween Linux, Hancom, Hedinux, Helix, Heretix, Hikarunix, Hiweed, Holon, HOLON Linux, Honeywall, How-Tux, Hubworx, iBox, ICE Linux, Icepack Linux, IDMS, Igelle, Igel Linux, Ignalum, Impi, Independence, IndLinux, Instant WebKiosk, IPCop, JBLinux, JeOS, Jolicloud, JoLinux, Joli OS, Julex, Jurix Linux, Juxlala, K-DEMar, K12LTSP, Kaboot, Kaella, Kaladix Linux, Kalango, Kali Linux, KANOTIX, Karamad, KateOS, Kinneret, Kiwi Linux, Klax, Klikit-Linux, K Linux, km Linux, knoplLS, Knoppel, Knopperdisk, Knoppix, Knoppix 64, KnoppiXMAME, KnoppMyth, KnoSciences, Kodibuntu, Komodo, Kongoni, Korora, KRUD, Kubuntu, Kuki Linux, Kurumin, Kwort, L.A.S., Leetnux, Lerntux, LFS, LG3D, LibraNet Linux, LibreCMC, LIIS, Lin-X, Linare, LindowsOS, Lineox, LinEspa, LinnexOS, Linpus, Linspire, Linux+Live, Linux-EduCD, Linux4One, Linux Antarctica, Linux by LibraNet, LinuxConsole, Linux CentOS (for example Linux CentOS 7), Linux DA OS, LinuxMCE, Linux Mint, LINUXO, LinuxOne, LinuxPPC, LinuxTLE, Linux XP, Litrix, LiveCD Router, LiveKiosk, LiVux, LLGP, LliureX, LNX-BBC, Loco, Lormalinux, I OS, LST Linux, LTSP, LUC3M, Luit, Lunar, LuteLinux, LXDEbian, Lycoris Desktop/LX, mOnOwall, Mageia, Magic, Mandrake, Mandriva, Mangaka, MAX, MaxOS, Mayix, MCNLive, Mediainlinux, Media Lab, MeeGo, MEPIS, MicroOS, MiniKazit, Minislack, Miracle, MirOS, MkLinux, Moblin, Mockup, MoLinux, Momonga, Monoppix, Monte Vista Linux, MoonOS, Morphix, MostlyLinux, MoviX, MSC, Mulimidix, muLinux, Multi Distro, Muriqui, MURIX, Musix, Mutagenix, MX Linux, Myah OS, myLinux, Nasgaia, Natures, Navyn OS, NepaLinux, NetMAX DeskTOP, NetSecL, Netstation Linux, Netwosix, Nexenta, Niigata, NimbleX, Nitix, NoMad Linux, Nonux, Nova, NST, nUbuntu, Nuclinux, NuxOne, O-Net, OcNOS, Ocularis, Ola Dom, Omega, Omoikane, Onebase Linux, OpenArtist, OpenLab, OpenLinux, OpenLX, OpenMamba, OpenMediaVault, OpenNA, Open ProgeX, Openwall, Operator, Oracle Linux, Oralux, Overclockix, Pltux, PAIPIX, paldo, Parabola, ParallelKnoppix, Pardus, Parsix, Parsix GNU/Linux, PC/OS, PCLinuxOS, Peanut Linux, PelicanHPC, Penguin Sleuth, Pentoo, Peppermint, Pequelin, pfSense, Phaeronix, Phantomix, Phat Linux, PHLAK, Pie Box, Pilot, Pingo, Pingwinek, Pioneer Linux, Plamo, PLD, PLoP Linux, Pocket Linux, Poseidon, POSTed, Power Desktop, Pozix Linux, pQui, Privatix, Progeny, ProteanOS, ProTech, PUD, Pulsar Linux, Puppy, Puredyne, QiLinux, Qimo, Qplus, Quantian, Qubes OS, Raidiator, Raspbian, Red Flag, Red Hat, Red Hat Enterprise Linux (for example Red Hat Enterprise Linux version 7), RedHawk Linux, Redmond Linux, redWall Firewall, Remix OS, Repairlix, RIoT, RIP, ROCK, Rock Linux, Rocks Cluster, ROOT, ROSA, ROSLIMS, rPath, RR4 Linux, RTLinux, Rubix, Sabayon, Sabily, Sailfish OS, Salgix, Salix OS, Salvare, SAM, Samhain Linux, Santa Fe, Sauver, SaxenOS, SCI-.Linux, Scientific Linux, SCO Linux, ScrudgeWare, Securepoint, Security-Enhanced Linux ("SELinux"), Sentry Firewall, Shift Linux, Shinux, SimplyMEPIS, Skolelinux, Slack/390, Slackintosh, Slackware, Slamd64, SLAMPP, slax, SliTaz GNU/Linux, SLS, SLYNUX, SME Server, SmoothWall, SnapGear Embedded Linux, SNAPPIX, Snøsfrix, SoL (Server optimized Linux), SONiC, Sorcerer, SOT Linux, Source Mage, Spectra Linux, SphinxOS, Splack, Splashtop, SprezzOS, Stampede, StartCom, STD, Stormix, StreamBOX, StressLinux, STUX, STX, Subgraph OS, Sugar On A Stick, SuliX, Sun Linux, Sun Wah, SuperGamer, SuSE, Symphony OS, System Rescue, T2, TA-Linux, Tablix, Tails (The Amnesic Incognito Live System), Tao Live, Taprobane, TechLinux, Thinstation, Tilix, Tinfoil Hat Linux, Tiny Core Linux, Titan LEV, Tizen, tomsrtbt, Tomukas, Toophpix, Topologilinux, Toutou, Trinity, Trisquel GNU/Linux, Trixbox, Troppix, Trustix, Trustverse, Truva, TumiX, TupiServer, Tuquito, Turbolinux, Turkix, Ubuntu, UbuntuME, Ubuntu Netbook Remix, Ubuntu Privacy Remix, uClinux, Ufficio Zero, UHU-Linux, uL, Ulteo, Ultima, Underground, Unifix Linux, uOS, Urli OS, UserLinux, UTILEX,Ututo, Ututo XS, Vector, Vidalinux, VideoLinux, Vine, VLOS, VNLinux, Voltalinux, Volumio, WarLinux, Wazobia, Webfish Linux, WHAX, White Box, Whitix, WIENUX, Wind River Linux, WinLinux 2001, WinSlack, Wolvix, WOMP!, X-evian, X/OS, Xandros, Xarnoppix, Xenoppix, Xfld, Ximian Desktop, xPud, Xteam, XtreemOS, Xubuntu, Yellow Dog, YES, Yggdrasil Linux, Ylmf OS, Yoper, YunOS, Zebuntu, Zentyal, Zenwalk, Zeroshell, ZoneCD, and Zorin OS.

In certain embodiments, for example, the operating system may be configured to enforce access control policies. In certain embodiments, for example, the access control policies may restrict execution of computer programs (for example user-initiated processes, boot up processes, application programs and/or operating system programs) to a predetermined (for example preconfigured) list. In certain embodiments, for example, the access control policies may restrict access to files and network resources to a predetermined (for example preconfigured) list. In certain embodiments, for example, the access control policies may be mandatory. In certain embodiments, for example, configuration of the access control policies may be non-discretionary. In certain embodiments, for example, the operating system may not provide for a root user or a superuser. In certain embodiments, for example, the operating system may be SELinux (or SE Linux or Linux SE). In certain embodiments, for example, the operating system may comprise a kernel security module, for example the operating system may be a Linux operating system and the security module may be AppArmor.

In certain embodiments, for example, memory defined by the computer-readable media may comprise a kernel space memory and a user (or application) space memory. In certain embodiments, for example, the kernel space memory may comprise kernel RAM. In certain embodiments, for example, the kernel space memory may be reserved for executing the kernel. In certain embodiments, for example, the user space memory may be reserved for executing all non-kernel user processes (for example application programs) and program modules. In certain embodiments, for example, the user space memory may comprise a portion of RAM.

In certain embodiments, for example, the one or plural nodes may comprise a network stack (also termed a "protocol stack"). In certain embodiments, for example, at least a portion of the network stack may form part of the operating system or part of the kernel of the node, processor, or computing device. In certain embodiments, for example, the network stack may comprise one or more layers according to the OSI model. In certain embodiments, for example, the network stack may comprise a physical layer consisting of hardware (for example an Ethernet interface) used to form a data connection. In certain embodiments, for example, the network stack may comprise a data link layer configured to provide data transfer to and from a remote node of the plural nodes. In certain embodiments, for example, the network stack may comprise a network layer configured to transferring variable length data sequences (called datagrams) to and from a remote node of the plural nodes. In certain embodiments, for example, the network stack may comprise a transport layer configured to transfer datagrams from a source to a destination host according to a specified protocol. In certain embodiments, for example, the specified protocol may be Transmission Control Protocol (TCP). In certain embodiments, for example, the specified protocol may be User Datagram Protocol (UDP). In certain embodiments, for example, the network stack may comprise a session layer configured to establish, manage and terminate a connection between an application executing on the node and an application executing on another node of the plural nodes. In certain embodiments, for example, the network stack may comprise a presentation layer configured to map syntax and semantics between applications communicating via the network stack. In certain embodiments, for example, the network stack may comprise an application layer configured to provide a standardized communication interface to an application executing on the node, for example an network application programming interface whereby a user process (for example a self-contained user-application program) in user space may utilize portions of the network stack.

In certain embodiments, for example, the one more of the plural nodes may comprise software. In certain embodiments, for example, the software may be an application program. In certain embodiments, for example, the software may be an end-user application program (for example a program invoked by an end-user such as a non-administrator or non-root user). In certain embodiments, for example, an application executing in an application space of a node may be identified using a user-application identifier, user-application identifier comprising an application identifier (for example a process command) and a user (for example a process owner) of the application. In certain embodiments, for example, the software may be a program not invoked by an operating system, or a program that is not an operating system program. In certain embodiments, for example, the software may be a self-contained executable configured to execute in an application space of a node of the each of one more of the plural nodes. In certain embodiments, for example, the software may be a user mode program. In certain embodiments, for example, the software may be a server. In certain applications, for example, the software may be a client. In certain embodiments, for example, the software may be a publisher. In certain applications, for example, the software may be a subscriber. In certain embodiments, for example, the software may be a publisher and/or a subscriber. In certain embodiments, for example, the software may comprise a component of a Supervisory Control and Data Acquisition (SCADA) system. In certain embodiments, for example, the software may be configured to transmit data (for example sensor data, confidential data, and/or secret data). In certain embodiments, for example, the software may be configured to receive, transmit, create, handle, manipulate, and/or store data. In certain embodiments, for example, the software may be configured to receive, transmit, create, handle, manipulate, and/or store sensitive data (for example confidential data and/or secret data). In certain embodiments, for example, the software may be configured to receive, transmit, create, handle, manipulate, and/or store sensor data. In certain embodiments, for example, the software may be updated (for example updated one time, updated plural times, or periodically updated), for example updated from a remote computer over the network. In certain embodiments, combinations of an identifier for the software and an identifier for an authorized user may be present in a preconfigured list present on the node, processor, or computing device. In certain embodiments, for example, the preconfigured list may further comprise one or plural exclusive allowed network port numbers (and optionally allowed network interface controllers) which may be associated with the software. In certain embodiments, for example, the preconfigured list may further comprise one or plural exclusive allowed network port numbers (and optionally allowed network interface controllers) to which the software may transmit or from which the software may receive data. In certain embodiments, for example, the preconfigured list may further comprise a data type or data protocol descriptor authorized for transmission or receipt by the software. In certain embodiments, for example, the preconfigured list may further comprise one or plural tunnel port numbers for a network security program adapted to communicate with the software. In certain embodiments, for example, the preconfigured list may comprise a private key (or a cryptographic parameter or primitive) configured for establishment of an encrypted network tunnel having a port of the network security program as an endpoint, the port referencing one of the one or plural tunnel port numbers (for example a private key used for cryptographic key exchange). In certain embodiments, for example, the software may be non-secure. In certain embodiments, for example, the software may not be password protected. In certain embodiments, for example, the software may be configured for packet data communication with a remote application present on a remote node but not configured for secure communication (for example not configured for secure communication of packet data by an encrypted communication protocol such as TLS).

In certain embodiments, for example, the software may comprise network security software. In certain embodiments, for example, the network security software may comprise middleware (or the software may comprise middleware which comprises the network security software) configured to execute between an application software and at least a portion of the network (for example all of the network). In certain embodiments, for example, the network security software may be resident on a common node with the application software. In certain embodiments, for example, the network security software may communicate (for example by an encrypted network tunnel between a node on which the network security software is resident and a remote node) with remote network security software present on a remote node, processor, or computing device. In certain further embodiments, for example, the remote network security software may be middleware interposed between a remote application software on the remote node and the network. In certain embodiments, for example, the network security software may be present on a first node of the plural nodes and the application software may be present on a second node of the plural nodes. In certain embodiments, for example, the first node may be a network security broker. In certain embodiments, for example, the first node may be a controller for a software-defined perimeter. In certain embodiments, for example, the first node may be a controller for a black cloud. In certain embodiments, for example, the network security software may be exclusively invoked by a root user. In certain embodiments, for example, the network security software may be first invoked by a kernel. In certain embodiments, for example, at least a portion (for example all) of the network security software may be executed with kernel priority. In certain embodiments, for example, a portion of the network security software may comprise one or plural modules executing in an application space with less than kernel priority. In certain embodiments, for example, at least one of the one or plural modules may be invoked from a shim in a network stack. In certain embodiments, execution of the network security software may comprise a single execution thread. In certain embodiments, for example, execution of the network security software may be distributed. In certain embodiments, for example, execution of the network security software may comprise plural execution threads. In certain embodiments, for example, execution of the network security software may comprise two threads, three threads, or four threads. In certain embodiments, for example, execution of the network security software may comprise at least two execution threads, for example at least three execution threads, at least four execution threads, or execution of the network security software may comprise at least ten execution threads. In certain embodiments, for example, execution of the network security software may comprise less than twenty execution threads, less than ten execution threads, less than eight execution threads, less than four execution threads, or execution of the network security software may comprise less than three execution threads. In certain embodiments, for example a first execution thread of the network security software may communicate data to and/or receive data from a second execution thread of the network security software.

In certain embodiments, for example, the network security software may be embodied in one or more non-transitory computer-readable media for execution by a processor provisioned to manage communications with a camera. In certain embodiments, for example, the network security software may be embodied in one or more non-transitory computer-readable media for execution by a processor provisioned to manage communications with a network camera. In certain embodiments, for example, the network security software may be embodied in one or more non-transitory computer-readable media for execution by a processor provisioned to manage communications with a networked camera. In certain embodiments, for example, the network security software may be embodied in one or more non-transitory computer-readable media for execution by an embedded processor on a camera.

In certain embodiments, for example, the network security software may be embodied in one or more non-transitory computer-readable media for execution by a processor provisioned to manage communications with a video encoder. In certain embodiments, for example, the network security software may be embodied in one or more non-transitory computer-readable media for execution by an embedded processor on a video encoder.

In certain embodiments, for example, the network security software may be embodied in one or more non-transitory computer-readable media for execution by a processor provisioned to manage communications with a video recorder. In certain embodiments, for example, the network security software may be embodied in one or more non-transitory computer-readable media for execution by a processor provisioned to manage communications with a network video recorder. In certain embodiments, for example, the network security software may be embodied in one or more non-transitory computer-readable media for execution by a processor provisioned to manage communications with a networked video recorder. In certain embodiments, for example, the network security software may be embodied in one or more non-transitory computer-readable media for execution by an embedded processor on a video recorder.

In certain embodiments, for example, the network security software may be embodied in one or more non-transitory computer-readable media for execution by a processor provisioned to manage communications with an edge storage device for a video recorder. In certain embodiments, for example, the network security software may be embodied in one or more non-transitory computer-readable media for execution by a processor provisioned to manage communications with an edge storage device for a network video recorder. In certain embodiments, for example, the network security software may be embodied in one or more non-transitory computer-readable media for execution by a processor provisioned to manage communications with an edge storage device for a networked video recorder. In certain embodiments, for example, the network security software may be embodied in one or more non-transitory computer-readable media for execution by an embedded processor on an edge storage device for a video recorder.

In certain embodiments, for example, the network security software may be embodied in one or more non-transitory computer-readable media for execution by a processor provisioned to manage communications with an audio system. In certain embodiments, for example, the network security software may be embodied in one or more non-transitory computer-readable media for execution by an embedded processor on an audio system. In certain embodiments, for example, the network security software may be embodied in one or more non-transitory computer-readable media for execution by a processor provisioned to manage communications with an input/output accessory of an audio system. In certain embodiments, for example, the network security software may be embodied in one or more non-transitory computer-readable media for execution by an embedded processor on an input/output accessory or module of an audio system.

In certain embodiments, for example, the network security software may be embodied in one or more non-transitory computer-readable media for execution by a processor provisioned to manage communications with a system device, for example a network system device or a networked system device. In certain embodiments, for example, the system device may be a surveillance device. In certain embodiments, for example, the system device may be a radar-based detector.

In certain embodiments, for example, the network security software may be embodied in one or more non-transitory computer-readable media for execution by an embedded processor on a system device (for example on a radar-based detector or a surveillance device). In certain embodiments, for example, the network security software may be embodied in one or more non-transitory computer-readable media for execution by a processor provisioned to manage communications with video management software. In certain embodiments, for example, the network security software may be embodied in one or more non-transitory computer-readable media for execution by a processor provisioned to manage communications with surveillance software.

In certain embodiments, for example, the network security software may be embodied in one or more non-transitory computer-readable media for execution by a processor provisioned to manage communications with security analytics. In certain embodiments, for example, the security analytics may comprise people counter software, queue monitor software, store data software, occupancy estimating software, demographic identification software, tailgate detection software, direction detection software, perimeter security software, motion detection and/or monitoring software, cross like detection software, digital autotracking software, or a combination of two or more of the foregoing.

In certain embodiments, for example, the network security software may be embodied in one or more non-transitory computer-readable media for execution by a processor provisioned to manage communications with an access control device. In certain embodiments, for example, the network security software may be embodied in one or more non-transitory computer-readable media for execution by an embedded processor on an access control device. In certain embodiments, for example, the access control device of one or more of the foregoing embodiments may comprise a network door controller, a network door station, a card reader, a network I/O relay module, or a combination of two or more of the foregoing.

In certain embodiments, for example, the network security software may be embodied in one or more non-transitory computer-readable media for execution by a processor provisioned to manage communications with or within a communications kit (for example an executive communications kit). In certain embodiments, for example, the network security software may be embodied in one or more non-transitory computer-readable media for execution by a processor in a communications kit (for example an executive communications kit).

In certain embodiments, for example, the network security software may be embodied in one or more non-transitory computer-readable media for execution by a processor provisioned to manage communications with or within a cellular base station (for example a portable and/or deployable cellular base station). In certain embodiments, for example, the network security software may be embodied in one or more non-transitory computer-readable media for execution by a processor in a cellular base station (for example a portable and/or deployable cellular base station).

In certain embodiments, for example, the network security software may be embodied in one or more non-transitory computer-readable media for execution by a combined router and cellular gateway. In certain embodiments, for example, the network security software may be embodied in one or more non-transitory computer-readable media for execution by a processor provisioned to manage communications with or within a combined router and cellular gateway. In certain embodiments, for example, the router and/or cellular gateway of one or more of the foregoing embodiments may be deployable. In certain embodiments, for example, the router and/or cellular gateway of one or more of the foregoing embodiments may be for use in a rail transportation system. In certain embodiments, for example, the router and/or cellular gateway of one or more of the foregoing embodiments may be mounted in a bulkhead of a rail car.

In certain embodiments, for example, the network security software may be embodied in one or more non-transitory computer-readable media for execution by a processor provisioned to manage communications with or within a flyaway communications system (for example a deployable flyaway communications system). In certain embodiments, for example, the network security software may be embodied in one or more non-transitory computer-readable media for execution by a processor in a flyaway communications system (for example a deployable flyaway communications system).

In certain embodiments, for example, the network security software may be embodied in one or more non-transitory computer-readable media for execution by a processor provisioned to manage communications with an IP recorder (for example a network IP recorder or a networked IP recorder). In certain embodiments, for example, the network security software may be embodied in one or more non-transitory computer-readable media for execution by an embedded processor on an IP recorder.

In certain embodiments, for example, the network security software may be embodied in one or more non-transitory computer-readable media for execution by a processor provisioned to manage communications with a hybrid network video recorder (for example a network hybrid network video recorder or a networked hybrid network video recorder). In certain embodiments, for example, the network security software may be embodied in one or more non-transitory computer-readable media for execution by an embedded processor on a hybrid network video recorder.

In certain embodiments, for example, the network security software may be embodied in one or more non-transitory computer-readable media for execution by a processor provisioned to manage communications with a camera. In certain embodiments, for example, the camera may be networked. In certain embodiments, for example, the camera may be a network camera. In certain embodiments, for example, the camera may be a pan-tilt-zoom camera. In certain embodiments, for example, the camera may be a dome camera. In certain embodiments, for example, the camera may be a 360 degree camera. In certain embodiments, for example, the camera may be a bullet and box camera. In certain embodiments, for example, the camera may be a mobile camera. In certain embodiments, for example, the network security software may be embodied in one or more non-transitory computer-readable media for execution by an embedded processor on a camera.

In certain embodiments, for example, the network security software may be embodied in one or more non-transitory computer-readable media for execution by a processor of an aircraft control system, an aircraft navigation system, an air data system, an automatic direction finding system, or two or more of the foregoing systems. In certain embodiments, for example, the network security software may be embodied in one or more non-transitory computer-readable media for execution by a processor of an avionics system. In certain embodiments, for example, the network security software may be embodied in one or more non-transitory computer-readable media for execution by a processor of a flight management system.

In certain embodiments, for example, the network security software may be embodied in one or more non-transitory computer-readable media for execution by a processor of an airport baggage control system.

In certain embodiments, for example, the network security software may be embodied in one or more non-transitory computer-readable media for execution by a processor of pipeline system (for example a pipeline command and control system). In certain embodiments, for example, the network security software may be embodied in one or more non-transitory computer-readable media for execution by a processor of a mixed reality system. In certain embodiments, for example, the network security software may be embodied in one or more non-transitory computer-readable media for execution by a processor of an identity management system. In certain embodiments, for example, the network security software may be embodied in one or more non-transitory computer-readable media for execution by a processor of an image generation system. In certain embodiments, for example, the network security software may be embodied in one or more non-transitory computer-readable media for execution by a processor of a geopositioning system. In certain embodiments, for example, the network security software may be embodied in one or more non-transitory computer-readable media for execution by a processor of an express check-in system.

In certain embodiments, for example, the network security software may be embodied in one or more non-transitory computer-readable media for execution by a processor of an integrated targeting system. In certain embodiments, for example, the network security software may be embodied in one or more non-transitory computer-readable media for execution by a processor of a helmet mounted system (for example a helmet mounted display system). In certain embodiments, for example, the network security software may be embodied in one or more non-transitory computer-readable media for execution by a processor of a satellite communications transceiver. In certain embodiments, for example, the network security software may be embodied in one or more non-transitory computer-readable media for execution by a processor of an offsite check-in system. In certain embodiments, for example, the network security software may be embodied in one or more non-transitory computer-readable media for execution by a processor of a service kiosk. In certain embodiments, for example, the network security software may be embodied in one or more non-transitory computer-readable media for execution by a processor of a software-defined radio. In certain embodiments, for example, the network security software may be embodied in one or more non-transitory computer-readable media for execution by a processor of an in-flight television system. In certain embodiments, for example, the network security software may be embodied in one or more non-transitory computer-readable media for execution by a processor of a cabin management system.

In certain embodiments, for example, the network security software may be embodied in one or more non-transitory computer-readable media for execution by a processor of a video door station.

In certain embodiments, for example, the network security software may be embodied in one or more non-transitory computer-readable media for execution by a processor of an automotive infotainment system. In certain embodiments, for example, the network security software may be embodied in one or more non-transitory computer-readable media for execution by a processor of a telemedicine system. In certain embodiments, for example, the network security software may be embodied in one or more non-transitory computer-readable media for execution by a processor of a cardiohealth station. In certain embodiments, for example, the network security software may be embodied in one or more non-transitory computer-readable media for execution by a processor of a medical imaging system. In certain embodiments, for example, the network security software may be embodied in one or more non-transitory computer-readable media for execution by a processor of a building automation system (for example at a building automation hub).

In certain embodiments, for example, the network security software may be embodied in one or more non-transitory computer-readable media for execution by a processor provisioned to manage communications with an identity management device. In certain embodiments, for example, the network security software may be embodied in one or more non-transitory computer-readable media for execution by an embedded processor on an identity management device (for example a credentialing, permissioning, and/or provisioning device). In certain embodiments, for example, the network security software may be embodied in one or more non-transitory computer-readable media for execution by a processor provisioned to manage communications with an identity authentication device (for example a credentialing, permissioning, and/or provisioning device). In certain embodiments, for example, the network security software may be embodied in one or more non-transitory computer-readable media for execution by a processor provisioned to manage communications with an identity authentication device (for example a credentialing, permissioning, and/or provisioning device). In certain embodiments, for example, the network security software may be embodied in one or more non-transitory computer-readable media for execution by an embedded processor on an identity authorization device (for example a credentialing, permissioning, and/or provisioning device).

In certain embodiments, for example, the network security software may be embodied in one or more non-transitory computer-readable media for execution by a processor provisioned to manage communications with an access control device (for example a logical or physical access control device). In certain embodiments, for example, the network security software may be embodied in one or more non-transitory computer-readable media for execution by an embedded processor on an access control device (for example a logical or physical access control device).

In certain embodiments, for example, the network security software may be embodied in one or more non-transitory computer-readable media for execution by a processor provisioned to manage communications with a SCADA device. In certain embodiments, for example, the network security software may be embodied in one or more non-transitory computer-readable media for execution by a processor provisioned to manage communications with a logic processor. In certain embodiments, for example, the network security software may be embodied in one or more non-transitory computer-readable media for execution by an embedded processor on a SCADA device. In certain embodiments, for example, the network security software may be embodied in one or more non-transitory computer-readable media for execution by an embedded processor on a logic processor.

In certain embodiments, for example, the network security software may be embodied in one or more non-transitory computer-readable media for execution by a processor used to operate and/or control digital signage.

In certain embodiments, for example, the network security software may be embodied in one or more non-transitory computer-readable media for execution by a processor of an energy management system. In certain embodiments, for example, the network security software may be embodied in one or more non-transitory computer-readable media for execution by a processor of a home energy management system. In certain embodiments, for example, the network security software may be embodied in one or more non-transitory computer-readable media for execution by a processor of a standalone energy management system. In certain embodiments, for example, the network security software may be embodied in one or more non-transitory computer-readable media for execution by a processor of an industrial energy management system. In certain embodiments, for example, the network security software may be embodied in one or more non-transitory computer-readable media for execution by a processor of a commercial energy management system. In certain embodiments, for example, the network security software may be embodied in one or more non-transitory computer-readable media for execution by a processor of a power plant energy management system. In certain embodiments, for example, the network security software may be embodied in one or more non-transitory computer-readable media for execution by a processor of a solar energy management system. In certain embodiments, for example, the network security software may be embodied in one or more non-transitory computer-readable media for execution by a processor of a photovoltaic energy management system.

In certain embodiments, for example, the network security software may be embodied in one or more non-transitory computer-readable media for execution by a processor provisioned to manage communications with a thermostat. In certain embodiments, for example, the network security software may be embodied in one or more non-transitory computer-readable media for execution by a processor provisioned to manage communications with an alarm system. In certain embodiments, for example, the network security software may be embodied in one or more non-transitory computer-readable media for execution by a processor provisioned to manage communications with a smoke alarm. In certain embodiments, for example, the network security software may be embodied in one or more non-transitory computer-readable media for execution by a processor provisioned to manage communications with a carbon monoxide alarm system.

In certain embodiments, for example, the network security software may be embodied in one or more non-transitory computer-readable media for execution by a processor provisioned to manage communications with a remote keyless entry system. In certain embodiments, for example, the network security software may be embodied in one or more non-transitory computer-readable media for execution by an embedded processor on a remote keyless entry system.

In certain embodiments, for example, the network security software may be embodied in one or more non-transitory computer-readable media for execution by a processor provisioned to manage communications. In certain embodiments, for example, the communications may be banking communications. In certain embodiments, for example, the communications may be global payments communications. In certain embodiments, for example, the communications may be financial crime compliance communications. In certain embodiments, for example, the communications may be custodian communications. In certain embodiments, for example, the communications may be fund distribution communications. In certain embodiments, for example, the communications may be transfer agent communications. In certain embodiments, for example, the communications may be supply chain finance communications. In certain embodiments, for example, the communications may be mandate management communications. In certain embodiments, for example, the communications may be securities market communications. In certain embodiments, for example, the communications may be Treasury market communications. In certain embodiments, for example, the communications may be payment market communications. In certain embodiments, for example, the communications may be investment manager communications. In certain embodiments, for example, the communications may be Fed wire communications. In certain embodiments, for example, the communications may be investment client communications. In certain embodiments, for example, the communications may be client reporting communications. In certain embodiments, for example, the communications may be financial reporting communications.

In certain embodiments, for example, the network security software may be embodied in one or more non-transitory computer-readable media for execution by a processor provisioned to manage cable TV communications.

In certain embodiments, for example, the network security software may be embodied in one or more non-transitory computer-readable media for execution by a processor of an elevator control system. In certain embodiments, for example, the network security software may be embodied in one or more non-transitory computer-readable media for execution by a processor of an elevator management system. In certain embodiments, for example, the network security software may be embodied in one or more non-transitory computer-readable media for execution by a processor of an elevator reporting system.

In certain embodiments, for example, the network security software may be embodied in one or more non-transitory computer-readable media for execution by a processor of a voting machine. In certain embodiments, for example, the network security software may be embodied in one or more non-transitory computer-readable media for execution by a processor, the processor in Ethernet communication with a voting machine. In certain embodiments, for example, the voting machine may be at least 10 years old. In certain embodiments, for example, the voting machine may run a Windows XP or a Windows 2000 operating system. In certain embodiments, for example, the network security software may be installed relative to a voting machine to satisfy the requirements of at least part of a state and/or federal certification (for example an Election Assistance Commission certification) process and/or testing program. In certain embodiments, for example, the network security software may be embodied in one or more non-transitory computer-readable media for execution by a processor of a voter registration database.

In certain embodiments, for example, the network security software may be embodied in one or more non-transitory computer-readable media for execution by critical infrastructure, for example critical infrastructure of a city, county, and/or nation.

In certain embodiments, for example, the network security software may be embodied in one or more non-transitory computer-readable media for execution by a processor provisioned to manage communications with a water management and/or control facility (for example a water supply management and/or control facility).

In certain embodiments, for example, the network security software may be embodied in one or more non-transitory computer-readable media for execution by a processor provisioned to manage communications with a waste management and/or control facility (for example a hazardous waste management and/or control facility).

In certain embodiments, for example, the network security software may be embodied in one or more non-transitory computer-readable media for execution by a processor provisioned to manage communications for a law enforcement activity. In certain embodiments, for example, the network security software may be embodied in one or more non-transitory computer-readable media for execution by a processor provisioned to manage communications with a law enforcement database. In certain embodiments, for example, the network security software may be embodied in one or more non-transitory computer-readable media for execution by a processor provisioned to manage communications with a city, county, state, or federal government function.

In certain embodiments, for example, the network security software may be embodied in one or more non-transitory computer-readable media for execution by a processor provisioned to manage communications with an educational facility. In certain embodiments, for example, the network security software may be embodied in one or more non-transitory computer-readable media for execution by a processor provisioned to manage communications with an educational facility. In certain embodiments, for example, the network security software may be embodied in one or more non-transitory computer-readable media for execution by a processor provisioned to manage communications with an information repository (for example a library).

In certain embodiments, for example, the network security software may be embodied in one or more non-transitory computer-readable media for execution by a processor provisioned to manage communications with a utility. In certain embodiments, for example, the network security software may be embodied in one or more non-transitory computer-readable media for execution by a processor provisioned to manage communications with a power generation facility. In certain embodiments, for example, the network security software may be embodied in one or more non-transitory computer-readable media for execution by a processor provisioned to manage communications with a nuclear plant. In certain embodiments, for example, the network security software may be embodied in one or more non-transitory computer-readable media for execution by a processor provisioned to manage communications with a hydroelectric plant.

In certain embodiments, for example, the network security software may be embodied in one or more non-transitory computer-readable media for execution by a processor provisioned to manage communications with a virtual power plant. In certain embodiments, for example, the network security software may be embodied in one or more non-transitory computer-readable media for execution by a processor provisioned to manage communications with an energy arbitrage platform. In certain embodiments, for example, the network security software may be embodied in one or more non-transitory computer-readable media for execution by a processor provisioned to manage communications with a smart grid.

In certain embodiments, for example, the network security software may be embodied in one or more non-transitory computer-readable media for execution by a processor provisioned to manage communications with a smart home. In certain embodiments, for example, the network security software may be embodied in one or more non-transitory computer-readable media for execution by a processor provisioned to manage communications with a building automation device. In certain further embodiments, for example, the building automation device may comprise a temperature management system, ventilation system, air conditioning system, security system, perimeter security system, home appliance, or a combination of two or more of the foregoing.

In certain embodiments, for example, the network security software may be embodied in one or more non-transitory computer-readable media for execution by a processor provisioned to manage communication pathways in a building, the communication pathways configured according to X10, Ethernet, RS-485, 6LoWPAN, Bluetooth LE (BLE), ZigBee, Z-Wave, or two or more of the foregoing protocol.

In certain embodiments, for example, the network security software may be embodied in one or more non-transitory computer-readable media for execution by a processor provisioned to manage packet-based communications with or within an automobile.

In certain embodiments, for example, the network security software may be embodied in one or more non-transitory computer-readable media for execution by a processor provisioned to manage communications with a perimeter security system.

In certain embodiments, for example, the network security software may be embodied in one or more non-transitory computer-readable media for execution by a processor provisioned to manage communications with an access control component of a security system (for example a perimeter security system). In certain embodiments, for example, the access control component may be a surveillance appliance. In certain embodiments, for example, the access control component may be a video camera. In certain embodiments, for example, the access control component may be an alarm. In certain embodiments, for example, the access control component may be a notification system.

In certain embodiments, for example, the authorized communication may comprise transmission of data. During at least a portion of the transmission, for example, the data or a portion thereof may be present in a data packet. Unless further specified, the term "data packet" may refer to a packaged unit of data, wherein the particular packaging may vary depending on the location of the unit of data during its transmission. Transmission of a data packet may refer to end-to-end (for example application-to-application) communication of data by one or more port-to-port connections through one or plural network stacks and optionally over a network, wherein the data packet may include a variety of protocol headers at different stages of the transmission. In certain embodiments, for example, the term "data packet" may refer to a network packet present in the network and the network packet may comprise a frame, a network protocol header (for example an IP header), a transport layer header (for example a TCP or UDP header), and a payload. In certain embodiments, for example, the term "data packet" may refer to a unit of data present in a transport layer of the network stack, the data packet comprising a transport layer header and a payload, but exclusive of a frame header and a network protocol header. In certain embodiments, for example, the data packet may comprise a unit of data ready for consumption by an application, the data packet exclusive of a transport layer header.

In certain embodiments, for example, authorized communication may comprise communication between an application program on a first node of the plural nodes and an application program on a second node of the plural nodes. In certain embodiments, for example, the first node and the second node may be different nodes. In certain embodiments, for example, the first node and the second node may be the same node, processor, or computing device. In certain embodiments, for example, the first node and the second node may be virtual nodes (for example the first node may be a first virtual node on a machine and the second node may be a second virtual node on the machine or a different machine).

In certain embodiments, for example, authorized communication may comprise communication between a first application and a second application wherein the communication passes through one or plural network security software. In certain embodiments, for example, the software may be a middleware. In certain embodiments, for example, the authorized communication may pass through one network security software. In certain embodiments, for example, the authorized communication may pass through plural network security software (for example, two network security software, three network security software, or four network security software), wherein at least two (for example two, or for example each) of the plural network security software are cooperatively configured to authorize the authorized communication. In certain embodiments, for example, a first network security software may be execute in a kernel of a node and a second network security software may execute in a virtual machine on the node, processor, or computing device.

In certain embodiments, for example, at least one of the one or plural network security software may be middleware positioned between the first application and the second application. In certain embodiments, for example, the authorized communication may comprise a first communication from the first application to first network security software on the first node, a second communication from the first network security software to second network security software on the second node, and a third communication from the second network security software to the second application.

In certain embodiments, for example, the first communication may comprise communication from a port of the first application program to a port of the first network security software by a loopback interface in a network stack of the first node, processor, or computing device. In certain embodiments, for example, the first communication may comprise communication from the first application to the first network security software by a procedure call. In certain embodiments, for example, the first communication may comprise a kernel function call (for example a kernel read and/or a kernel write call). In certain embodiments, for example, the second communication may comprise communication over a network tunnel having a port of the first network security software and a port of the second network security software as endpoints. In certain embodiments, for example, at least a portion of the second communication may be encrypted. In certain embodiments, for example, a metadata portion of the second communication may be encrypted. In certain embodiments, for example, the metadata portion may be encrypted by the first network security software and decrypted by the second network security software. In certain embodiments, for example, the payload portion of the communication may be encrypted. In certain embodiments, for example, the payload portion may be encrypted by the first network security software and decrypted by the second network security software. In certain embodiments, for example, contiguous metadata and payload data may be encrypted to form a contiguous segment of encrypted information. In certain embodiments, for example, the contiguous segment may be encrypted by the first network security software and decrypted by the second network security software. In certain embodiments, for example, a metadata portion of the communication may be encrypted by the first network security software and decrypted by the second network security software while a payload portion of the communication may be encrypted by a third software present on the first node and decrypted by a fourth software present on the second node, processor, or computing device. In certain embodiments, for example, the third software may be the first application and/or the fourth software may be the second application. In certain embodiments, for example, the third software may be a security layer software present on the first node (for example SSL, TLS or IPsec software) and/or the fourth software may be a security layer software present on the second application. In certain embodiments, for example, the third communication may comprise communication from a port of the second network security software to a port of the second application program by a loopback interface of the second node, processor, or computing device. In certain embodiments, for example, the first communication may comprise communication from the second network security software to the second application program by a procedure call. In certain embodiments, for example, the second communication may be transparent to the first application and the second application. In certain embodiments, for example, the first application and the second application may not be aware of the second communication. In certain embodiments, for example, the first communication may be unencrypted. In certain embodiments, for example, the second communication may be unencrypted. In certain embodiments, for example, the first communication and/or the second communication may be unencrypted. In certain embodiments, for example, the first communication may be encrypted. In certain embodiments, for example, the second communication may be encrypted. In certain embodiments, for example, the first communication and/or the second communication may be encrypted. In certain embodiments, for example, the first communication may result from an attempt by the first application to establish a direct port-to-port connection with the second application. In certain embodiments, for example, the second communication may result from an attempt by the second application to bind a port to a physical interface of the second node, processor, or computing device. In certain embodiments, for example, the second communication may result from an attempt by the second application to establish a listening port (for example a listening port bound to a physical interface) on the second node, processor, or computing device. In certain embodiments, for example, the authorized communication may comprise communication to or from one or more ports having a pre-selected port number. In certain embodiments, for example, the authorized communication may comprise communication to or from one or more ephemeral ports. In certain embodiments, for example, port endpoints for the first communication may be ephemeral. In certain embodiments, for example, a source port for the second communication may be ephemeral and destination port for the second communication may be pre-selected (for example a fixed port number specified to network security software responsible for establishing the second connection). In certain embodiments, for example, a source port of the third communication may be ephemeral and a destination port of the third communication may be pre-selected. In certain embodiments, for example, the source and destination ports of each of the first communication, second communication, and third communication may be pre-selected.

In certain embodiments, for example, the first connection may be a connection according to TCP protocol. In certain embodiments, for example, the first connection may be a connection according to UDP. In certain embodiments, for example, the first connection may be a connection according to a mid-weight UDP protocol.

In certain embodiments, for example, the second connection may be a connection according to TCP protocol. In certain embodiments, for example, the second connection may be a connection according to UDP protocol. In certain embodiments, for example, the second connection may be a connection according to a mid-weight UDP protocol.

In certain embodiments, for example, the third connection may be a connection according to TCP protocol. In certain embodiments, for example, the third connection may be a connection according to UDP protocol. In certain embodiments, for example, the third connection may be a connection according to a mid-weight UDP protocol.

In certain embodiments, for example, each of the first connection, the second connection, and the third connection may be a connection according to TCP protocol. In certain embodiments, for example, each of the first connection, the second connection, and the third connection may be a connection according to UDP protocol. In certain embodiments, for example, each of the first connection, the second connection, and the third connection may be a connection according to a mid-weight UDP protocol. In certain embodiments, for example, each of the first connection, the second connection, and the third connection may be according to the same connection protocol. In certain embodiments, for example, each of the first connection and the second connection may be according to the same connection protocol and the third connection may be according to a different communication protocol. In certain embodiments, for example, each of the first connection, the second connection, and the third connection may be according to different communication protocol.

In certain embodiments, for example, the authorized communication may comprise communication over an encrypted tunnel having, as endpoints, a port of the first application and a port of the second application. In certain embodiments, for example, the first application and the second application may each comprise one or plural network security modules for authorized communication between the applications. In certain embodiments, for example, the encrypted tunnel may be authorized based on communication between the first node and a third node, the third node hosting network security middleware, and further based on communication between the second node and a fourth node, the fourth node hosting network security middleware. In certain embodiments, for example, the third node and the fourth node may be the same node (wherein the respective network security middleware may be the same or different). In certain embodiments, for example, the third node and the fourth node may be different nodes. In certain embodiments, for example, the third node and the first node may be the same node while the fourth node and the second node may be different nodes. In certain embodiments, for example, the first node, third node, and fourth node may be the same node, processor, or computing device. In certain embodiments, for example, the second node, third node, and fourth node may be the same node, processor, or computing device.

In certain embodiments, for example, the authorized communication may pass through a third node hosting network security software, the third node disposed, for purposes of the communication, between the first node and the second node, processor, or computing device. In certain embodiments, for example, the authorized communication may comprise a network tunnel between the first node and the third node (for example a network tunnel such as an encrypted network tunnel having the first application (or a shim in the network stack application programming interface) and network security software present on the third node as endpoints and a different network tunnel between the third node and the second node, processor, or computing device.

In certain embodiments, for example, a first node of the plural nodes and a second node of the plural nodes may form a secure connection. In certain embodiments, for example, the secure connection may comprise a network tunnel. In certain embodiments, for example, the network tunnel may be a packet network tunnel. In certain embodiments, for example, the network tunnel may be formed according to an encrypted communication protocol, whereby each data packet transmitted through the network tunnel may be encrypted at a first endpoint of the network tunnel present on the first node, passed through the network tunnel, and then decrypted at a second endpoint of the network tunnel present on the second node, processor, or computing device. In certain embodiments, for example, the encrypted communication protocol may be implemented in the OSI transport layer. In certain further embodiments, for example, the transport layer encrypted communication protocol may be selected from the group consisting of Secure Socket Layer (SSL) protocol, Transport Layer Security (TLS), Secure Shell (SSH) protocol, and a combination of two or more of the foregoing protocols. In certain embodiments, for example, the encrypted communication protocol may be implemented in the OSI network layer or data link layer. In certain further embodiments, for example, the encrypted communication protocol may be selected from the group consisting of IPsec, Layer 2 Tunneling Protocol (L2TP) over IPsec, or Ethernet over IPsec.

In certain embodiments, for example, encryption and decryption may use an encryption key wherein the key is established by executing a key exchange algorithm between software executing on the first node and software executing on the second node, processor, or computing device. In certain embodiments, for example, the key exchange algorithm may be selected from the group consisting of Rivest, Shamir, Adleman (RSA), Diffie-Hellman (DH), Diffie-Hellman Ephemeral (DHE), Elliptic-Curve Diffie-Hellman (ECDH), Kerberos (KRB5), Secure Remote Password Protocol (SRP), Pre-shared key (PSK), Digital Signature Algorithm (DSA), Elliptic Curve Digital Signature Algorithm (ECDSA), and Digital Signature Standard (DSS).

In certain embodiments, for example, the encryption and decryption may be performed using a symmetric encryption algorithm. In certain embodiments, for example, the symmetric encryption algorithm may be selected from the group consisting of Triple Data Encryption Algorithm (3DES), Advanced Encryption Standard (AES), Camelia (Block cipher developed by Mitsubishi and NTT), Data Encryption Standard (DES), Fortezza (Security token based cipher), GOST (Block cipher developed in USSR), International Data Encryption Algorithm (IDEA), Rivest Cipher 2 (RC2), Rivest Cipher 4 (RC4), and SEED (Block cipher developed by Korean Information Security Agency).

In certain embodiments, for example, each data packet passed through the network tunnel may contain a message authentication code, comprising a hashed value for a portion of the data packet. In certain embodiments, for example, the hashed value may be obtained by passing the portion of the data packet through a hashing algorithm. In certain embodiments, for example, the hashing algorithm may be selected from the group consisting of BLAKE-256, BLAKE-512, BLAKE2s, BLAKE2b, Elliptic Curve Only Hash (ECOH), the Fast Syndrome-based (FSB) hash, GOST, Grøstl, HAS-160, HAVAL, JH, the Message Digent-2 (MD2) algorithm, MD4, MD5, MD6, RadioGatún, the RACE Integrity Primitives Evaluation Message Digest (RIPEMD), RIPEMD-128, RIPEMD-160, RIPEMD-320, the Secure Hash Algorithm-1 (SHA-1), SHA-2, SHA-224, SHA-256, SHA-384, SHA-512, SHA-3, Skein, Snefru, Spectral Hash, Streebog, SWIFFT, Tiger, Whirlpool-0, Whirlpool-T, and Whirlpool.

In certain embodiments, for example, authorized communication may comprise transmission of metadata-containing data packets over a network tunnel. In certain embodiments, for example, the metadata-containing packets may conform to Internet Protocol version 4 (IPv4). In certain embodiments, for example, the metadata-containing packets may conform to Internet Protocol version 6 (IPv6). In certain embodiments, for example, the metadata may be positioned at a predetermined location (for example start at a predetermined location) in a data packet. In certain embodiments, for example, the metadata may be positioned after (for example immediately after, after a predetermined buffer, or at a predetermined offset from) a transport layer header of the data packet. In certain embodiments, for example, the metadata may be positioned between the transport layer header and payload data of the network packet.

In certain embodiments, for example, the metadata may be encrypted according to an encryption scheme of the network tunnel (for example one of the encryption schemes described herein). In certain embodiments, for example, the metadata may be encrypted with data packet payload data to form single ciphertext. In certain embodiments, for example, the metadata be encrypted separately from data packet payload data (or the metadata may be encrypted and payload data may not be encrypted). In certain embodiments, for example, the metadata be encrypted by a first network security software and data packet payload data may be encrypted by a second network security software.

In certain embodiments, for example, the metadata may be built and inserted into a data packet by a first network security software present on a first node of the plural nodes. In certain embodiments, for example, the first node may coincide with a source node (or node-of-origin) for the data packet (for example the first node may be a node containing first application software transmitting data contained in a payload of the data packet such as from program memory of the first application software). In certain embodiments, for example, the first node may be a waypoint node (or intermediate node) disposed between a source node for the data packet and a final destination node for the data packet. In certain embodiments, for example, the first node may be directly connected by an Ethernet connection to a source node for the data packet. In certain embodiments, for example, the second node may be directly connected by an Ethernet connection to a final destination node for the data packet.

In certain embodiments, for example, the metadata may be encrypted by software present in an encryption layer (for example TLS, SSL, or IPsec). In certain embodiments, for example, the metadata may be encrypted by an encryption module, subroutine, function, or the like. In certain embodiments, for example, the metadata may be encrypted using a single-use cryptographic key (for example an ECDH-derived key which is rotated with each packet transmission through the network tunnel), whereby the same metadata would appear different in different data packets due to use of a different cryptographic key in each instance. In certain embodiments, for example, the first network security software may comprise the encryption layer software. In certain embodiments, for example, the first network security software may invoke (for example call) the encryption layer software. In certain embodiments, for example, the first network security software may invoke the encryption module, subroutine, or function. In certain embodiments, for example, the encryption layer software or encryption module may be present in an OSI application layer of the first node, processor, or computing device. In certain embodiments, for example, the encryption layer software or encryption module may be present in a kernel layer (for example a kernel portion of a network stack) of the first node, processor, or computing device.

In certain embodiments, for example, the metadata may be extracted and parsed from a data packet by a second network security software present on a second node of the plural nodes. In certain embodiments, for example, the second node may coincide with a final destination node for the data packet (for example a final destination node comprising a second application configured to receive payload data present in the data packet such as in program memory of the second application). In certain embodiments, for example, the second node may be a waypoint node (or intermediate node) disposed between a source node for the data packet and a final destination node for the data packet. In certain embodiments, for example, the second node may be directly connected by an Ethernet connection to the source node for the data packet. In certain embodiments, for example, the second node may be directly connected by an Ethernet connection to the final destination node for the data packet.

In certain embodiments, for example, the metadata extracted from the data packet may be encrypted (as discussed herein). In certain embodiments, for example, the metadata may be decrypted by encryption layer software (for example TLS, SSL, or IPsec). In certain embodiments, for example, the metadata may be decrypted by an encryption module, subroutine, function, or the like (collectively referred to as "module" for purposes herein). In certain embodiments, for example, the decrypting may be performed prior to the parsing. In certain embodiments, for example, the decrypting may be performed subsequent to the parsing. In certain embodiments, for example, the second network security software may comprise the encryption layer software. In certain embodiments, for example, the second network security software may invoke (for example call) the encryption layer software. In certain embodiments, for example, the second network security software may invoke the encryption module. In certain embodiments, for example, the encryption layer software or encryption module may be present in an OSI application layer of the second node, processor, or computing device. In certain embodiments, for example, the encryption layer software or encryption module may be present in a kernel layer (for example a kernel portion of a network stack) of the second node, processor, or computing device.

In certain embodiments, for example, the metadata may comprise one or plural parameters. In certain embodiments, for example, the one or plural parameters may comprise a packet type identification code. In certain embodiments, for example, the packet type identification code may be interpreted by network security software to indicate the data packet is configured to be used for negotiation (for example authentication and/or authorization) of a network tunnel. In certain embodiments, for example, the packet type identification code may be interpreted by network security software to indicate the data packet is configured to be transmitted through an existing network tunnel (for example an authenticated and/or authorized network tunnel). In certain embodiments, for example, the packet type identification code may be interpreted by network security software to indicate the data packet contains application payload data. In certain embodiments, for example, the packet type identification code may be interpreted by network security software to determine a connection state for a network tunnel. In certain embodiments, for example, the packet type identification code may be positioned at a predetermined location (for example start at a predetermined location) in the data packet. In certain embodiments, for example, the packet type identification code may be positioned after (for example immediately after, after a predetermined buffer, or at a predetermined offset from) a transport layer header of the data packet. In certain embodiments, for example, the packet type identification code may occupy a predetermined location of the metadata. In certain embodiments, for example, the packet type identification code may be positioned at one end (for example at the beginning or the end closest to a transport layer header of the data packet) of the metadata. In certain embodiments, for example, the packet type identification code (prior to encryption) may be an integer in the range of 0-$2^{32}$ (i.e., 0-4,294,967,295).

In certain embodiments, for example, the one or plural parameters may comprise one or plural node descriptors. In certain embodiments, for example, the one or plural parameters may be a node descriptor for a source node of the data packet. In certain embodiments, for example, the one or plural parameters may be a node descriptor for a source node of payload data (for example payload data that will be transmitted in a subsequent data packet by an application resident on the source node identified by the node descriptor). In certain embodiments, for example, the one or plural parameters may be a node descriptor for a destination node of payload data (for example payload data that will be transmitted in a subsequent data packet to an application resident on the destination node identified by the node descriptor). In certain embodiments, for example, the one or plural node descriptors may be nonpublic. In certain embodiments, for example, the one or plural node descriptors may be a shared secret among at least two of the plural nodes. In certain embodiments, for example, the one or plural node descriptors may be a shared secret among less than all of the plural nodes. In certain embodiments, for example, the one or plural node descriptors may have a size of at least 64 bits, for example at least 128 bits, at least 256 bits, at least 512 bits, at least 1024 bits, at least 2048 bits, at least 4096 bits, at least 8192 bits, at least 16384 bits, at least 32768 bits, or the one or plural node descriptors may have a size of at least 65536 bits. In certain embodiments, for example, the one or plural node descriptors may have a size of 64 bits, 128 bits, 256 bits, 512 bits, 1024 bits, 2048 bits, 4096 bits, 8192 bits, 16384 bits, 32768 bits, or the one or plural node descriptors may have a size of 65536 bits. In certain embodiments, for example, the one or plural node descriptors may have a size of less than 8192 bits, for example less than 4096 bits, less than 2048 bits, less than 1024 bits, or the one or plural node descriptors may have a size of less than 256 bits. In certain embodiments, for example, a portion of the one or plural node descriptors may comprise a company identifier. In certain embodiments, for example, a portion of the one or plural node descriptors may comprise a device-type identifier. In certain embodiments for example, a portion of the one or plural node descriptors may comprise a random number produced by a random number generator. In certain embodiments, for example, the random number may comprise at least 90% of the bits of the one or plural node descriptors, for example at least 95%, at least 96%, at least 97%, at least 98%, at least 98.5%, at least 99%, at least 99.5%, at least 99.9% or the random number may comprise at least 99.9% of the bits of the one or plural node descriptors. In certain embodiments, for example, the random number may comprise less than 99% of the bits of the one or plural node descriptors, for example less than 98%, or the random number may comprise less than 95% of the bits of the one or plural node descriptors. In certain embodiments, for example, the random number may comprise in the range of 95-99.9% of the bits of the one or plural node descriptors, for example in the range of 98-99% of the bits of the one or plural node descriptors. In certain embodiments, for example, the sum of digits of the one or plural node descriptors may be a prime number. In certain embodiments, for example, the one or plural node descriptors may accompany an application data payload in the data packet. In certain embodiments, for example, the one or plural node descriptors may be present in a data packet that does not contain an application data payload (for example a data packet used for negotiation of a network tunnel prior to the transmission of application data). In certain embodiments, for example, the metadata may comprise a packet type identification code and the one or plural node descriptors. In certain embodiments, for example, the one or plural node descriptors may be positioned at a predetermined location (for example start at a predetermined location) in the data packet. In certain embodiments, for example, the one or plural node descriptors may be positioned after (for example immediately after, after a predetermined buffer, or at a predetermined offset from) a transport layer header of the data packet. In certain embodiments, for example, the one or plural node descriptors may occupy a predetermined location of the metadata. In certain embodiments, for example, the one or plural node descriptors may be positioned after a packet type identification code at one end (for example at the beginning or the end closest to a transport layer header of the data packet) of the metadata.

In certain embodiments, for example, the one or plural parameters may comprise one or plural parameters for payload data. In certain embodiments, for example, the one or plural payload data parameters may comprise an application identification code. In certain embodiments, for example, the application identification code may have a length of at least 8 bits, for example at least 16 bits, at least 32 bits, or at least 64 bits. In certain embodiments, for example, the application identification code may have a length of no more than 64 bits, for example no more than 32 bits, no more than 16 bits, or no more than 8 bits. In certain embodiments, for example, the application identification code may have a length in the range of 8-64 bits, for example in the range of 8-32 bits, or in the range of 8-16 bits. In certain embodiments, for example, the one or plural payload data parameters may comprise an application user identification code. In certain embodiments, for example, the application user identification code may have a length of at least 8 bits, for example at least 16 bits, at least 32 bits, or at least 64 bits. In certain embodiments, for example, the application user identification code may have a length of no more than 64 bits, for example no more than 32 bits, no more than 16 bits, or no more than 8 bits. In certain embodiments, for example, the application user identification code may have a length in the range of 8-64 bits, for example in the range of 8-32 bits, or in the range of 8-16 bits. In certain embodiments, for example, the application identification code may be shorter than the application user identification code. In certain embodiments, for example, the application user identification code may be at least twice as long as the application identification code. In certain embodiments, for example, the one or plural payload data parameters may comprise an application identification code for a source application for the payload data. In certain embodiments, for example, the one or plural payload data parameters may comprise an application user identification code for a user of the source application for the payload data. In certain embodiments, for example, the one or plural payload data parameters may comprise an application identification code for a destination application for the payload data. In certain embodiments, for example, the combined length of the application identification code and the application user identification code may be least 8 bits, for example at least 16 bits, at least 32 bits, or at least 64 bits. In certain embodiments, for example, the combined length of the application identification code and the application user identification code may be no more than 128 bits, for example no more than 64 bits, no more than 48 bits, no more than 32 bits, no more than 16 bits, or no more than 8 bits. In certain embodiments, for example, the combined length of the application identification code and the application user identification code may have a length in the range of 8-64 bits, for example in the range of 24-64 bits, or in the range of 36-64 bits. In certain embodiments, for example, the one or plural payload data parameters may comprise an application user identification code for a user of the destination application for the payload data. In certain embodiments, for example, the one or plural payload data parameters may comprise a data type descriptor. In certain embodiments, for example, the data type descriptor may comprise a data type protocol. In certain embodiments, for example, the data type descriptor may comprise a data topic. In certain embodiments, for example, the data type descriptor may comprise a file size (for example a total size of a file being transmitted by one or more payload data). In certain embodiments, for example, the data type descriptor may comprise a maximum file size (for example a maximum size of a file being transmitted by one or more payload data). In certain embodiments, for example, the data type descriptor may comprise a file name. In certain embodiments, for example, the data type descriptor may comprise a command type. In certain embodiments, for example, the command type may be selected from the group consisting of SQLread, SQLwrite, AND/OR, ALTER TABLE, AS (alias), BETWEEN, CREATE DATABASE, CREATE TABLE, CREATE INDEX, CREATE VIEW, DELETE, DROP DATABASE, DROP INDEX, DROP TABLE, EXISTS, GROUP BY, HAVING, IN, INSERT INTO, INNER JOIN, LEFT JOIN, RIGHT JOIN, FULL JOIN, LIKE, ORDER BY, SELECT, SELECT *, SELECT DISTINCT, SELECT INTO, SELECT TOP, TRUNCATE TABLE, UNION, UNION ALL, UPDATE, WHERE, and a combination of two or more of the foregoing command types. In certain embodiments, for example, the data type descriptor may comprise a date/time (for example a transmission date/time or a deadline). In certain embodiments, for example, the data type descriptor may comprise a time-to-live of the payload data. In certain embodiments, for example, the data type descriptor may have a size of at least 64 bits, for example at least 128 bits, at least 256 bits, at least 512 bits, at least 1024 bits, at least 2048 bits, at least 4096 bits, at least 8192 bits, at least 16384 bits, at least 32768 bits, or the data type descriptor may have a size of at least 65536 bits. In certain embodiments, for example, the data type descriptor may have a size of less than 8192 bits, for example less than 4096 bits, less than 2048 bits, less than 1024 bits, or the data type descriptor may have a size of less than 256 bits.

In certain embodiments, for example, the metadata may comprise a packet type identification code and the one or plural payload data parameters. In certain embodiments, for example, the one or plural payload data parameters may be positioned in a data packet at a location where a packet type identification code would be present (for example, the data packet may contain the one or plural payload data parameters instead of the packet type identification code). In certain embodiments, for example, the one or plural payload data parameters may be positioned at a predetermined location (for example start at a predetermined location) in the data packet. In certain embodiments, for example, the one or plural payload data parameters may be positioned after (for example immediately after, after a predetermined buffer, or at a predetermined offset from) a transport layer header of the data packet. In certain embodiments, for example, the one or plural payload data parameters may occupy a predetermined location of the metadata. In certain embodiments, for example, the one or plural payload data parameters may be positioned after a packet type identification code at one end (for example at the beginning or the end closest to a transport layer header of the data packet) of the metadata.

In certain embodiments, for example, the authorized communication may comprise transmission of a network tunnel connection request packet (for example a request packet arising from a client connection request such as a request transmitted by a network security software), the request packet comprising encrypted metadata containing a packet type identification code, the packet type identification code a connection request identification code. In certain embodiments, for example, the connection request packet may conform to a protocol. In certain further embodiments, for example, the protocol may be UDP or TCP.

In certain embodiments, for example, the authorized communication may comprise transmission of a network tunnel connection request reply packet (for example a request packet from a server such as a reply from a network security software responding to a client connection request such as a request transmitted by a different network security software), the request reply packet comprising encrypted metadata containing a packet type identification code, the packet type identification code comprising a connection request reply identification code (for example a code having a different value from the connection request identification code). In certain embodiments, for example, the connection request reply packet may conform to a protocol. In certain further embodiments, for example, the protocol may be UDP or TCP.

In certain embodiments, for example, the authorized communication may comprise transmission of a node authentication and authorization packet. In certain embodiments, for example, the node authentication and authorization packet may comprise encrypted metadata containing a node validation packet type indicator and a node descriptor. In certain embodiments, for example, establishing authorized payload data communication may comprise: (a) transmitting a first node authentication and authorization packet from a first node network security software resident on a first node to second network security software present on a second node, followed by (b) transmitting a second node authentication and authorization packet from the second network security software to the first network security software.

In certain embodiments, for example, the authorized communication may comprise transmission of a payload data authorization and authentication packet. In certain embodiments, for example, the payload data authentication and authorization packet may comprise encrypted metadata containing a payload data validation packet type indicator and a payload data parameter. In certain embodiments, for example, the payload data parameter may comprise an application identification code for an application resident on a node transmitting the payload data authorization and authentication packet, an application user identification code for a user of the resident application, and a data type or data protocol for payload data to be transmitted by a network tunnel configured according to the payload data authorization and authentication packet. In certain embodiments, for example, establishing authorized payload data communication may comprise: (a) transmitting a first payload data authentication and authorization packet from a first node network security software resident on a first node to second network security software present on a second node, followed by (b) transmitting a second payload data authentication and authorization packet from the second network security software to the first network security software.

In certain embodiments, for example, authorized communication may comprise transmission of a payload data packet. In certain embodiments, for example, the payload data packet may comprise encrypted payload data authentication and authorization metadata and payload data. In certain embodiments, for example, the metadata may be exclusive of a packet type identification code.

In certain embodiments, for example, authorized communications comprising transfer of data packets across the network may comprise communications between a first node of the plural nodes and a further node (for example a second node) of the plural nodes. In certain embodiments, for example, establishment and coordination of the authorized communications may be performed by a first network security software cooperatively configured with a second network security software (for example a first network security software resident on the first node and a second network security software resident on the second node). In certain further embodiments, for example, the first network security software and the second network security software may be different copies of the computer-readable program code (for example copies obtained from different copies of the at least one component).

In certain embodiments, for example, the first network security software may have access to a first preconfigured list, for example a first preconfigured list stored in non-transitory storage media present on the same node as the first network security software, or otherwise accessible to the first network security software. In certain embodiments, for example, the second network security software may have access to a second preconfigured list, for example a second preconfigured list stored in non-transitory storage media present on the same node as the second network security software, or otherwise accessible to the second network security software. In certain embodiments, for example, the first preconfigured list and the second preconfigured list may be aligned to enable the first network security software and the second security software to cooperatively negotiate connections for authorized communications. In certain embodiments, for example, the first preconfigured list and the second preconfigured list may together exclusively define the authorized communications permitted between an application (for example a user-application) on the first node and an application (for example a user-application) on the second node, or may exclusively define the authorized port-to-port communications. In certain embodiments, for example, the first network security software may terminate any attempt by an application resident on the first node to transmit packet data to the second node, or may drop (or quarantine) any packets received at the first node sent from the second node, that are not in conformance with the first preconfigured list. Similarly, in certain embodiments, for example, the second network security software may terminate any attempt by an application resident on the second node to transmit packet data to the first node, or may drop any packets received at the second node sent from the first node, that are not in conformance with the second preconfigured list. In certain further embodiments, for example, the non-conformance may comprise failure of a portion of the destination port numbers and/or the metadata to match expected values, the expectation regarding the expected values based on parameters present in the second preconfigured list.

In certain embodiments, for example, each of the first preconfigured list and/or a further (or second) preconfigured list may comprise a series of records, each record in the form of an n-tuple. In certain embodiments, for example, the record length may be not fixed, i.e., it may vary from record to record. In certain embodiments, for example, each of the first preconfigured list and/or the second preconfigured list may be a binary file. In certain embodiments, for example, each of the first preconfigured list and/or the second preconfigured list may be encrypted. In certain embodiments, for example, each of the first preconfigured list and/or the second preconfigured list may be read-only. In certain embodiments, for example, the first preconfigured list may be read only by a single first network security software module of the first network security software having access (for example having sole access) to a first preconfigured list decryption key. In certain embodiments, for example, the first preconfigured list decryption key may be stored in a memory location (for example a volatile memory location) known only to the first network security software module. In certain embodiments, for example, the memory location may be specific, unique to, and/or set during compilation of the first network security software module (i.e., recompilation of the first network security software module would result in a different memory location). In certain embodiments, for example, the first preconfigured list decryption key may be specific to the compilation of the first network security software module. In certain embodiments, for example, the second preconfigured list may be read only by a single second network security software module of the second network security software having access (for example having sole access) to a second preconfigured list decryption key. In certain embodiments, for example, the second preconfigured list decryption key may be stored in a memory location (for example a volatile memory location) known only to the second network security software module. In certain embodiments, for example, the memory location may be specific, unique to, and/or set during compilation of the second network security software module (i.e., recompilation of the second network security software module would result in a different memory location). In certain embodiments, for example, the second preconfigured list decryption key may be specific, unique to, and/or set during compilation of the second network security software module.

In certain embodiments, for example, each record of the each of the first preconfigured list and a further (for example, the second) preconfigured list may be interpretable by the first network security software and the second network security software, respectively, to form an authorized connection for authorized communication. In certain embodiments, for example, the first preconfigured list may contain a first record interpretable by the first network security software and the second preconfigured list may contain a second record interpretable by the second network security software for forming an authorized connection for authorized communication between the first node and the second node, processor, or computing device.

In certain embodiments, for example, each of the first record and a further record (for example, the second record) may contain a node identifier or a node identification code for the source node (the source node may be the first node or the second node) from which packet data will be transmitted in the authorized communication. In certain embodiments, for example, each of the first record and the second record may contain a node identification code for the destination node (the destination node may be the first node or the second node different from the source node) to which packet data will be transmitted in the authorized communication. In certain embodiments, for example, the first network security software and the second network security software may each exchange with one another the node identification code that corresponds to their status (source or destination). In certain further embodiments, for example, the mutual exchange may occur over an encrypted tunnel having the first network security software and the second network security software as endpoints. In certain further embodiments, for example, the exchanged node identification codes may be validated by the receiving network security software by reference to the respective first record or second record. In certain embodiments, for example, the mutual validating may be used to partially authorize the aforementioned encrypted tunnel. In certain embodiments, for example, each of the node identification codes may have a size of at least 64 bits, for example at least 128 bits, at least 256 bits, at least 512 bits, at least 1024 bits, at least 2048 bits, at least 4096 bits, at least 8192 bits, at least 16384 bits, at least 32768 bits, or each of the node identification codes may have a size of at least 65536 bits. In certain embodiments, for example, each of the node identification codes may have a size of 64 bits, 128 bits, 256 bits, 512 bits, 1024 bits, 2048 bits, 4096 bits, 8192 bits, 16384 bits, 32768 bits, or each of the node identification codes may have a size of 65536 bits. In certain embodiments, for example, each of the node identification codes may have a size of less than 8192 bits, for example less than 4096 bits, less than 2048 bits, less than 1024 bits, or each of the node identification codes may have a size of less than 256 bits. In certain embodiments, for example, a portion of each of the node identification codes may comprise a company identifier. In certain embodiments, for example, a portion of each of the node identification codes may comprise a device-type identifier. In certain embodiments for example, a portion of each of the node identification codes may comprise a random number produced by a random number generator. In certain embodiments, for example, the random number may comprise at least 90% of the bits of each of the node identification codes, for example at least 95%, at least 96%, at least 97%, at least 98%, at least 98.5%, at least 99%, at least 99.5%, at least 99.9% or the random number may comprise at least 99.9% of the bits of each of the node identification codes. In certain embodiments, for example, the random number may comprise less than 99% of the bits of each of the node identification codes, for example less than 98%, or the random number may comprise less than 95% of the bits of each of the node identification codes. In certain embodiments, for example, the random number may comprise in the range of 95-99.9% of the bits of each of the node identification codes, for example in the range of 98-99% of the bits of each of the node identification codes. In certain embodiments, for example, the sum of digits of each of the node identification codes may be a prime number.

In certain embodiments, for example, each of the first record and the second record may contain a source universal application identifier for the source application program (corresponding to the first application or the second application) generating the packet data in an authorized communication. In certain embodiments, for example, the application identifier and the user for the application may correspond to or be based on values obtained by a process status check command. Similarly, in certain embodiments, for example, each of the first record and the second record may contain a destination universal application identifier for the destination application program (corresponding to the first application or the second application) receiving the packet data in an authorized communication. In certain embodiments, for example, the source universal application identifier may comprise an application identifier and a user for the application. In certain embodiments, for example, the first network security software and the second network security software may each exchange with one another the universal application identifier that corresponds to their status (source or destination). In certain further embodiments, for example, the mutual exchange may occur over an encrypted tunnel having the first network security software and the second network security software as endpoints. In certain further embodiments, for example, the exchanged universal application identifiers may be validated by the receiving network security software by reference to the respective first record or second record. In certain embodiments, for example, the mutual validating may be used to partially authorize the aforementioned encrypted tunnel. In certain embodiments, for example, a source universal application identifier may be included in a data packet and validated against the respective record (the first record or the second record) of the destination node in order to authenticate and authorize the data packet. In certain embodiments, for example, each of the source and destination application identifiers may have a length of at least 8 bits, for example at least 16 bits, at least 32 bits, or at least 64 bits. In certain embodiments, for example, the application identifier may have a length of no more than 64 bits, for example no more than 32 bits, no more than 16 bits, or no more than 8 bits. In certain embodiments, for example, the application identifier may have a length in the range of 8-64 bits, for example in the range of 8-32 bits, or in the range of 8-16 bits. In certain embodiments, for example, the application user may have a length of at least 8 bits, for example at least 16 bits, at least 32 bits, or at least 64 bits. In certain embodiments, for example, the each of the source and destination application user may have a length of no more than 64 bits, for example no more than 32 bits, no more than 16 bits, or no more than 8 bits. In certain embodiments, for example, the application user may have a length in the range of 8-64 bits, for example in the range of 8-32 bits, or in the range of 8-16 bits. In certain embodiments, for example, the universal application identifier may be least 8 bits, for example at least 16 bits, at least 32 bits, or at least 64 bits. In certain embodiments, for example, the each of the source and destination universal application identifier may be no more than 128 bits, for example no more than 64 bits, no more than 48 bits, no more than 32 bits, no more than 16 bits, or no more than 8 bits. In certain embodiments, for example, the universal application identifier may have a length in the range of 8-64 bits, for example in the range of 24-64 bits, or in the range of 36-64 bits.

In certain embodiments, for example, each of the first record and the second record may contain a code for a network interface controller of the source node (the source node may be the first node or the second node) from which packet data will be transmitted in the authorized communication. In certain embodiments, for example, each of the first record and the second record may contain a code for the network interface controller for the destination node (the destination node may be the first node or the second node different from the source node) to which packet data will be transmitted in the authorized communication. In certain embodiments, for example, each of the codes may be processed to obtain corresponding network addresses (for example IP addresses). In certain embodiments, for example, the corresponding network addresses may define an authorized source network address and an authorized destination network address in one or plural packet headers. In certain embodiments, for example, each of the network interface controller codes may have a size of at least 64 bits, for example at least 128 bits, at least 256 bits, at least 512 bits, at least 1024 bits, at least 2048 bits, at least 4096 bits, at least 8192 bits, at least 16384 bits, at least 32768 bits, or each of the network interface controller codes may have a size of at least 65536 bits. In certain embodiments, for example, each of the network interface controller codes may have a size of 64 bits, 128 bits, 256 bits, 512 bits, 1024 bits, 2048 bits, 4096 bits, 8192 bits, 16384 bits, 32768 bits, or each of the network interface controller codes may have a size of 65536 bits. In certain embodiments, for example, each of the network interface controller codes may have a size of less than 8192 bits, for example less than 4096 bits, less than 2048 bits, less than 1024 bits, or each of the network interface controller codes may have a size of less than 256 bits.

In certain embodiments, for example, each of the first record and the second record may contain a destination port number associated with the destination application (the first application or the second application). In certain embodiments, for example, the destination port number associated with the destination application may be used to direct packet data from the network security software resident on the destination node (the destination node may be the first node or the second node and the network security software may be the first network security software or the second network security software) to the destination application. In certain embodiments, for example, the destination port number associated with the destination application may be used as an index by the network security software resident on the source node (the source node may be the first node or the second node different from the destination node and the network security software may be the first network security software or the second network security software) to identify the appropriate record in the corresponding first preconfigured list.

In certain embodiments, for example, each of the first record and the second record may contain a destination port number (or an identifier associated with the destination port number) associated with the network security software resident on the destination node (the destination node may be the first node or the second node and the network security software may be the first network security software or the second network security software). In certain embodiments, for example, the destination port number associated with the network security software resident on the destination node may be used by the network security software resident on the source node as a destination address for a network packet. In certain embodiments, for example, the destination port number associated with the network security software resident on the destination node may be used as an endpoint for an encrypted communication pathway (for example an encrypted network tunnel) between the first network security software and the second network security software.

In certain embodiments, for example, each of the first record and the second record may comprise one or plural data description fields (or data description values or data description identifiers). In certain embodiments, for example, one or plural data description fields may designate or be an identifier for a data protocol. In certain embodiments, for example, the data protocol may be a machine-to-machine protocol. In certain embodiments, for example, the data protocol may be an IoT protocol. In certain embodiments, for example, the data protocol may comprise an MQ Telemetry Transport (MQTT) protocol. In certain embodiments, for example, the data protocol may comprise an Advanced Message Queuing Protocol (AMQP). In certain embodiments, for example, the data protocol may comprise a Simple/Streaming Text Oriented Messaging Protocol (STOMP). In certain embodiments, for example, the data protocol may comprise a Data Distribution Service DDS. In certain embodiments, for example, the data protocol may comprise a Constrained Application Protocol (CoAP). In certain embodiments, for example, the data protocol may comprise an Open Platform Communications Unified Architecture (OPC UA) protocol. In certain embodiments, for example, the data protocol may comprise a Java Message Service (JMS) protocol. In certain embodiments, for example, the data protocol may comprise an eXtensible Messaging and Presence Protocol (XMPP). In certain embodiments, for example, the data protocol may comprise a Representational State Transfer (REST) protocol. In certain embodiments, for example, the data protocol may comprise an Open Mobile Alliance Light Weight Machine-to-Machine (OMA LWM2M) protocol. In certain embodiments, for example, the data protocol may comprise a JavaScript Object Notation (JSON) protocol. In certain embodiments, for example, the data protocol may comprise a Simple Network Management Protocol (SNMP). In certain embodiments, for example, the data protocol may comprise a protocol conforming to Technical Report 069: CPE WAN Management Protocol (TR-069-CWMP). In certain embodiments, for example, the data protocol may comprise Hypertext Transfer Protocol (HTTP). In certain embodiments, for example, the data protocol may conform to the Alljoyn framework. In certain embodiments, for example, the data protocol may comprise Modbus protocol (for example Modbus over TCP and UDP). In certain embodiments, for example, the data protocol may conform to VITA 49 radio transport packet specification. In certain embodiments, for example, the data protocol may conform to Edgent protocol. In certain embodiments, for example, the data protocol may comprise a file transfer protocol. In certain embodiments, for example, the data protocol may comprise a domain name server protocol. In certain embodiments, for example, the data protocol may comprise an Internet Control Message Protocol (ICMP). In certain embodiments, for example, the data protocol may comprise a structured query language protocol. In certain embodiments, for example, the data protocol may comprise a publish-subscribe messaging pattern protocol. In certain embodiments, for example, the data protocol may comprise a data distribution service protocol. In certain embodiments, for example, the data protocol may comprise a data structure identifier. In certain embodiments, for example, the data protocol may comprise a data topic. In certain embodiments, for example, the data protocol may comprise a data type (for example "string", "integer", "unsigned integer", "Boolean", "floating point", "double precision", etc.). In certain embodiments, for example, the data protocol may indicate an allowed range (for example a continuous range or a list of allowed values) of values for a data payload. In certain embodiments, for example, the data protocol may comprise a data definition identifier.

In certain embodiments, for example, the one or plural data description fields may comprise a file size or file size identifier (for example a total size of a file being transmitted by one or more payload data). In certain embodiments, for example, the one or plural data description fields may comprise a maximum file size (for example a maximum size of a file being transmitted by one or more payload data). In certain embodiments, for example, the one or plural data description fields may comprise a file name or file name identifier. In certain embodiments, for example, the one or plural data description fields may comprise a command syntax, command type, and/or command type identifier. In certain embodiments, for example, the command type may comprise a SQL command and/or statement, for example the command type may comprise SQLread, SQLwrite, AND/OR, ALTER TABLE, AS (alias), BETWEEN, CREATE DATABASE, CREATE TABLE, CREATE INDEX, CREATE VIEW, DELETE, DROP DATABASE, DROP INDEX, DROP TABLE, EXISTS, GROUP BY, HAVING, IN, INSERT INTO, INNER JOIN, LEFT JOIN, RIGHT JOIN, FULL JOIN, LIKE, ORDER BY, SELECT, SELECT *, SELECT DISTINCT, SELECT INTO, SELECT TOP, TRUNCATE TABLE, UNION, UNION ALL, UPDATE, WHERE, or a combination of two or more of the foregoing commands. In certain embodiments, for example, the command type may comprise a DNS command, for example the command type may comprise IPCONFIG, TRACE ROUTE, NETSTAT, ARP, ROUTE, HOSTNAME, CONTROL NETCONNECTIONS, or a combination of two or more of the foregoing commands. In certain embodiments, for example, the command type may comprise an FTP command, for example the command type may comprise !, $, ?, ACCOUNT, APPEND, ASCII, BEEP, BINARY, BYE, CASE, CD, CDUP, CHMOD, CLOSE, CR, DEBUG, DELETE, DIR, DISCONNECT, EXIT, FORM, GET, GLOB, HASH, HELP, IDLE, IMAGE, IPANY, IPV4, IPV6, LCD, LS, MACDEF, MDELETE, MDIR, MGET, MKDIR, MLS, MODE, MODTIME, MPUT, NEWER, NLIST, NMAP, NTRANS, OPEN, PASSIVE, PROMPT, PROXY, PUT, PWD, QC, QUIT, QUOTE, RECV, REGET, RENAME, RESET, RESTART, RHELP, RMDIR, RSTATUS, RUNIQUE, SEND, SENDPORT, SITE, SIZE, STATUS, STRUCT, SUNIQUE, SYSTEM, TENEX, TICK, TRACE, TYPE, UMASK, USER, VERBOSE, or a combination of two or more of the foregoing commands. In certain embodiments, for example, the command type may comprise a Telnet, an Rlogin, an Rsh, or a Secure Shell command. In certain embodiments, for example, the command type may comprise an ICMP command, for example the command type may comprise PING, TRACEROUTE, ICMP PERMIT, ICMP DENY, or a combination of two or more of the foregoing commands. In certain embodiments, for example, the command type may comprise an MQTT command. In certain embodiments, for example, the one or plural data description fields may comprise a date/time (for example a transmission date/time or a deadline). In certain embodiments, for example, the one or plural data description fields may comprise a time-to-live of the payload data. In certain embodiments, for example, the one or plural data description fields may have a size of at least 64 bits, for example at least 128 bits, at least 256 bits, at least 512 bits, at least 1024 bits, at least 2048 bits, at least 4096 bits, at least 8192 bits, at least 16384 bits, at least 32768 bits, or the one or plural data description fields may have a size of at least 65536 bits. In certain embodiments, for example, the one or plural data description fields may have a size of less than 8192 bits, for example less than 4096 bits, less than 2048 bits, less than 1024 bits, or the one or plural data description fields may have a size of less than 256 bits. In certain embodiments, for example, one or plural data type descriptors present in a data packet may be compared with the one or plural data fields to at least partially determine whether the destination application is authorized to receive data from the data packet.

In certain embodiments, for example, each of the first record and the second record may comprise a private key (or a cryptographic parameter or primitive) for establishing the encrypted communication pathway (for example an encrypted network tunnel), for example by cryptographic key exchange as described herein.

In certain embodiments, for example, a first application being used by a first user and executing on the first node may attempt to establish a listening first port on the first node (for example the first application may open a port and attempt to bind the port to a physical or virtual interface). In certain embodiments, for example, the attempt to establish the listening port may conform to a UDP or a TCP connection protocol. In certain embodiments, for example, the attempt to establish the listening port may conform to a network security protocol, for example an SSL or TLS protocol for a UDP or TCP connection. In certain embodiments, for example, the first network security software (or middleware) may detect the attempt and, in response, the first network security software may form a first network security software listening first port. In certain embodiments, for example, the first network security software listening first port may form a connection with a remote host to become a secure connection endpoint, and data to or from the first application may be transmitted through the secure connection endpoint. In certain embodiments, for example, the first network security software may detect the attempt and allow the first application to establish the listening port, followed by the first network security software forming a connection between a port of the first network security software and the listening port. In certain embodiments, for example, the first network security software may be present on the first node, processor, or computing device. In certain embodiments, for example, the first network security software may comprise a network stack application programming interface function called by the first application. In certain embodiments, for example, the network stack application programming interface function may be, for example, a bind function. In certain embodiments, for example, the network stack application programming interface function may be a listen function. In certain embodiments, for example, the first network security software may be present on the second node, processor, or computing device. In certain embodiments, for example, the first network security software may be present on a third node of the plural nodes. In certain embodiments, for example, the first network security software may detect the attempt and prevent the first port from binding to the physical interface. In certain embodiments, for example, the first network security software may redirect the first application to establish a listening port on the loopback interface, followed by the first network security software forming a connection by the loopback interface with the first application. In certain embodiments, for example, the first network security software may prevent the first application from binding the first port to any interface. In certain embodiments, for example, the first network security software may form a connection (for example a direct connection) with the first application without using the loopback interface. In certain embodiments, for example, the first network security software may form a connection (for example a direct connection) with the first application only after at least one other connection is established (for example a connection between the first network security software and the second network security software, such as a connection between the first network security software and the second network security software dedicated to transmitting data having a specified protocol between the first application and the second application).

In certain embodiments, for example, prior to forming the connection with the first application software or opening the dedicated listening port, the first network security middleware may inspect the first application and the first user making the request to open a listening port. In certain embodiments, for example, the first network security software may obtain one or plural parameters (for example process parameters) for inspection and validate the one or plural parameters against a first preconfigured list (for example a list having the format of a preconfigured list as described herein) prior to allowing the combination of the first user and the first application to transmit or receive data (for example to transmit or to receive data according to a network protocol). In certain embodiments, for example, the one or plural parameters may comprise identifiers for the first user and the first application, and these parameters may be compared with a list of allowed 2-tuple values present in the first preconfigured list (for example in a record of the first preconfigured list). If the 2-tuple is not present in the first preconfigured list, for example, the first network security software may prevent the combination of the first application and the first user from receiving or transmitting data. In certain embodiments, for example, the one or plural parameters may comprise identifiers for the first user, the first application, and the requested port number (i.e., the port number associated with the listening port), and these parameters may be compared with a list of allowed 3-tuple values present in the first preconfigured list. In certain embodiments, for example, the identifiers for the first user, the first application, and the requested port number may correspond to a user of a destination application, the destination application, and a destination port number in a record of the first preconfigured list. If the 3-tuple is not present in the first preconfigured list, for example, the first network security software may prevent the combination of the first application and the first user from receiving or transmitting data.

In certain embodiments, for example, a second application being used by a second user and executing on the second node may attempt to form a connection with the combination of the first application and the first user over the listening first port (for example by attempting to send a connection request through a network stack of the second node). In certain embodiments, for example, the attempt to establish the connection may conform to a UDP or a TCP connection protocol. In certain embodiments, for example, the attempt to establish the connection may conform to a network security protocol, for example an SSL or TLS protocol for a UDP or TCP connection. In certain embodiments, for example, in response to detecting the attempt to establish a connection, a second network security software may form a connection with the first network security software listening first port for the purpose of transmitting data to and/or from the second application from and/or to the first application via the first network security program. In certain embodiments, for example, the second network security software may detect the second application attempt and allow the second application to connect to the second network security software, followed by the second network security software forming a connection with the first network security software. In certain embodiments, for example, the second network security software may be present on the second node, processor, or computing device. In certain embodiments, for example, the second network security software may comprise a network stack application programming interface function called by the second application. In certain embodiments, for example, the network stack application programming interface function may be a bind function (for example bind( )). In certain embodiments, for example, the network stack application programming interface function may be, for example, a connect function (for example connect( )). In certain embodiments, for example, the network stack application programming interface function may be, for example, a function which puts a software port into a listening state (for example listen( )). In certain embodiments, for example, the network stack application programming interface function may be, for example, a close function (for example close( )). In certain embodiments, for example, the second network security software may be present on the first node, processor, or computing device. In certain embodiments, for example, the second network security software may be present on a third node of the plural nodes. In certain embodiments, for example, the second network security software may be the same software as the first network security software (for example the first network security software and the second network security software may be different copies of the computer-readable program code (for example copies obtained from different copies of the at least one component)). In certain embodiments, for example, the second network security software may detect the second application attempt and prevent a port associated with the combination of the second application and the second user (the "second port") from binding or connecting to a physical interface. In certain embodiments, for example, the second network security software may redirect the second application to connect with the second network security software via a loopback interface. In certain embodiments, for example, the second network security software may prevent the second application from binding or connecting the second port to any physical interface. In certain embodiments, for example, the second network security software may form a connection (for example a direct connection) with the second application without use of a loopback interface. In certain embodiments, for example, the second network security software may communicate with the second application by kernel read and/or write commands. In certain embodiments, for example, the first network security software may form a connection (for example a direct connection) with the first application only after at least one other connection is established (for example a connection between the first network security software and the second network security software, such as a connection between the first network security software and the second network security software dedicated to transmitting data having a specified protocol between the first application and the second application).

In certain embodiments, for example, prior to forming the connection with the second application or forming a connection with the first network security software, the second network security software may inspect a combination of the second application and the second user. In certain embodiments, for example, the second network security software may obtain one or plural parameters for the inspection and validate the one or plural parameters against a second preconfigured list prior to allowing the combination of the second user and the second application to transmit or receive data. In certain embodiments, for example, the one or plural parameters may comprise identifiers for the second user and the second application, and these parameters may be compared with a list of allowed 2-tuple values present in the second preconfigured list. If the 2-tuple is not present in the second preconfigured list, for example, the second network security software may prevent the combination of the second application and the second user from receiving or transmitting data. In certain embodiments, for example, the one or plural parameters may comprise identifiers for the second user, the second application, and a destination port number for the requested connection (for example a destination port number associated with the first application), and these parameters may be compared with a list of allowed 3-tuple values present in the second preconfigured list. In certain embodiments, for example, the second user, the second application, and a destination port number for the requested connection may correspond to a user of a source application, the source application, and a port number associated with the destination application present in a record of the second preconfigured list. If the 3-tuple is not present in the second preconfigured list, for example, the second network security software may prevent the combination of the second application and the second user from receiving or transmitting data.

In certain embodiments, for example, the second network security software may use at least the aforementioned destination port number or a destination port identifier (and also optionally an identifier for the source application, an identifier for a user of the source application, or a combination of the identifier for the source application and the identifier for the user of the source application) to identify a different destination port number corresponding to a listening port of the first network security software. In certain embodiments, for example, the second network security software may use at least the aforementioned destination port number or destination port identifier (and also optionally an identifier for the source application, an identifier for a user of the source application, or a combination of the identifier for the source application and the identifier for the user of the source application) for the requested connection as an index into the second preconfigured list to identify a record containing the port number for the listening port of the first network security software. In certain embodiments, for example, said port number for the listening port may be stored in the second preconfigured list.

In certain embodiments, for example, the second network security software may construct or assemble, as described herein, a connection request packet comprising a packet header and metadata. In certain embodiments, for example, the packet header may comprise a destination network address specified by the connection request of the second application. In certain embodiments, for example, the packet header may comprise a destination network address obtainable from (for example specified by or computable from) the second configuration file (for example the destination network address may be specified by or computable from the record identified by at least the destination port number associated with the first application). In certain embodiments, for example, the packet header may comprise destination port number corresponding to the listening port established by the first network security software. In certain embodiments, for example, the packet header may comprise a source network address specified by the connection request of the second application. In certain embodiments, for example, the packet header may comprise a source network address obtainable from (for example specified by or computable from) the second configuration file (for example specified by or computable from the record identified by at least the destination port number associated with the first application). In certain embodiments, for example, the packet header may comprise a source port number associated with the second network security software that has been dynamically assigned (for example by a kernel of the second node). In certain embodiments, for example, the packet header may comprise a non-ephemeral source port number associated with the second network security software, wherein the non-ephemeral source port number is obtained from the second preconfigured list (for example the non-ephemeral source port number is specified in the record identified by at least the destination port number associated with the first application). In certain embodiments, for example, the metadata may comprise a packet type indicator. In certain embodiments, for example, the connection request packet may comprise cipher suite parameters according to a security protocol (for example security protocol such as SSL or TLS).

In certain embodiments, for example, first network security software may drop (or quarantine) the connection request packet if the packet type indicator does not correspond to an expected connection request packet type indicator. In certain embodiments, for example, in response to a threshold number of dropped or rejected connection requests (for example in response to a threshold number of dropped or rejected connection request packets received) from a node (for example connection requests from the second node or another of the plural nodes or a node not present in the plural nodes) the first network security software may add the node to a blacklist. In certain embodiments, for example, the threshold number may be less than 30 connection requests, for example less than 20, less than 15, less than 10, less than 5, less than 4, less than 3, or the threshold number may be less than 2 dropped or rejected connection requests. In certain embodiments, for example, the threshold number may be in the range of 2-10 connection requests, for example in the range of 2-8, in the range of 2-5, or the threshold number may be in the range of 2-4 connection requests. In certain embodiments, for example, the first network security software may drop (for example without attempting to verify) any further connection requests from the sending port of the blacklisted node, processor, or computing device. In certain embodiments, for example, the first network security software may drop (for example without attempting to verify) any further connection requests from any port of the blacklisted node, processor, or computing device. In certain embodiments, for example, the first network security software may terminate all connections (for example inclusive of network tunnels) with the blacklisted node, processor, or computing device. In certain embodiments, for example, the first network security software may drop (for example without attempting to verify) any further connection requests from the sending port after 2 dropped or rejected connection requests, and the network security software may terminate all connections (for example inclusive of network tunnels) after 10 dropped or rejected connection requests.

In certain embodiments, for example, the first network security software and the second network security software may negotiate an encrypted communication pathway (for example an encrypted network tunnel) according to an agreed-to cipher suite, the negotiating based at least on a first private key present in the first preconfigured list and a second private key present in a second preconfigured list. In certain embodiments, for example, the agreed-to choice of cipher suite may be preconfigured. In certain embodiments, for example, the agreed-to choice of cipher suite may be mandatory (i.e., the first node may not select an alternative cipher suite in a connection request reply packet). In certain embodiments, for example, the first private key and the second private key may be different. In certain embodiments, for example, the first private key and the second private key may be the same. In certain embodiments, for example, the first network security software and the second network security software may each execute a key exchange algorithm to generate a symmetric encryption key for encryption of metadata and optionally for encryption of payload data present in network packets transmitted through the negotiated encrypted communication pathway. In certain embodiments, for example, rather than negotiating an encrypted communication pathway, metadata may be protected by passing the metadata through a hash function to form hashed metadata for inclusion in a network packet for transmission over a communication pathway extending between the first network security software and the second network security software. In certain further embodiments, for example, the metadata may be combined with a random number and passed through a hash function to form a salted hashed metadata prior to insertion by the second network security software into a network packet. In certain embodiments, for example, the first network security software may know the hash function used (and, if used, the random number) in order to verify the contents of the metadata.

In certain embodiments, for example, following negotiation of the encrypted communication pathway, the first network security software may construct a first node authentication and authorization packet having the structure of a node authentication and authorization packet as described herein, and transmit the first node authentication and authorization packet to the second node, processor, or computing device. In certain embodiments, for example, the first network security software may obtain a first node authentication code for inclusion in metadata of the first node authentication and authorization packet from a first record of the first configuration file, the first record identified at least based the destination port number of the first network security software. In certain embodiments, for example, upon receipt of the first node authentication and authorization packet, the second network security software may decrypt (or, if applicable, check the hash value of) the first node authentication code and compare the value of the first node authentication code with a value obtained from a second record of the second preconfigured list, the second record identified at least based on the destination port number of the first network security software. In certain embodiments, for example, the constructing (inclusive of encrypting or forming a hash value for the metadata) and the obtaining may be performed by a portion of the first network security software executing in an application space (for example in an application space of the first node). In certain embodiments, for example, the decrypting and comparing may be performed by a portion of the second network security software executing in an application space (for example in an application space of the second node). In certain embodiments, for example, the constructing (inclusive of encrypting or forming a hash value for the metadata) and the obtaining may be performed by a portion of the first network security software executing in kernel space (for example in a kernel space of the first node). In certain embodiments, for example, the decrypting and comparing may be performed by a portion of the second network security software executing in a kernel space (for example in a kernel space of the second node).

In certain embodiments, for example, network security software resident on one of the plural nodes may drop (or quarantine) a received node authentication and authorization packet if the value of a node authentication code extracted from the received packet does not match an expected value. In certain embodiments, for example, in response to a threshold number of dropped or rejected node authentication and authorization packets from a different node (for example another one of the plural nodes or a node not one of the plural nodes), the network security software may add the node to a blacklist. In certain embodiments, for example, the threshold number may be less than 30 node authentication and authorization packets, for example less than 20, less than 15, less than 10, less than 5, less than 4, less than 3, or the threshold number may be less than 2 dropped or rejected node authentication and authorization packets. In certain embodiments, for example, the threshold number may be in the range of 2-10 node authentication and authorization packets, for example in the range of 2-8, in the range of 2-5, or the threshold number may be in the range of 2-4 node authentication and authorization packets. In certain embodiments, for example, the network security software may drop (for example without attempting to verify) any further node authentication and authorization packets from the sending port of the blacklisted node, processor, or computing device. In certain embodiments, for example, the network security software may drop (for example without attempting to verify) any further node authentication and authorization packets from any port of the blacklisted node, processor, or computing device. In certain embodiments, for example, the network security software may terminate all connections (for example inclusive of encrypted communication pathways) with the blacklisted node, processor, or computing device. In certain embodiments, for example, the first network security software may drop (for example without attempting to verify) any further node authentication and authorization packets from the sending port after 2 dropped or rejected node authentication and authorization packets, and the network security software may terminate all connections (for example inclusive of encrypted communication pathways) after 10 dropped or rejected node authentication and authorization packets.

In certain embodiments, for example, following negotiation of the encrypted communication pathway the second network security software may construct a second node authentication and authorization packet having the structure of a node authentication and authorization packet as described herein, and transmit the second node authentication and authorization packet to the first node, processor, or computing device. In certain embodiments, for example, the second node authentication and authorization packet may be transmitted prior to the transmission of the first node authentication and authorization packet. In certain embodiments, for example, the second node authentication and authorization packet may be transmitted after the transmission of the first node authentication and authorization packet. In certain embodiments, for example, the second node authentication and authorization packet may be transmitted after the decrypting and comparing the first node authentication and authorization packet. In certain embodiments, for example, the first node authentication and authorization packet may be transmitted after the decrypting and comparing the second node authentication and authorization packet. In certain embodiments, for example, the second node authentication and authorization packet may not be transmitted if the first node authentication and authorization packet is dropped (or quarantined). In certain embodiments, for example, the first node authentication and authorization packet may not be transmitted if the second node authentication and authorization packet is dropped. In certain embodiments, for example, the second network security software may obtain a second node authentication code for inclusion in metadata of the second node authentication and authorization packet from a second record of the second configuration file, the second record identified at least based the destination port number of the second network security software. In certain embodiments, for example, upon receipt of the second node authentication and authorization packet, the first network security software may decrypt (or, if applicable, check the hash value of) the second node authentication code and compare the value of the second node authentication code with a value obtained from a first record of the first preconfigured list, the first record identified at least based on the destination port number of the second network security software. In certain embodiments, for example, the constructing (inclusive of encrypting or forming a hash value for the metadata) and the obtaining may be performed by a portion of the second network security software executing in an application space (for example in an application space of the second node). In certain embodiments, for example, the decrypting and comparing may be performed by a portion of the first network security software executing in an application space (for example in an application space of the first node). In certain embodiments, for example, the constructing (inclusive of encrypting or forming a hash value for the metadata) and the obtaining may be performed by a portion of the second network security software executing in kernel space (for example in a kernel space of the second node). In certain embodiments, for example, the decrypting and comparing may be performed by a portion of the first network security software executing in a kernel space (for example in a kernel space of the first node).

In certain embodiments, for example, following negotiation of the encrypted communication pathway the first network security software may construct a first payload data authorization and authentication packet having the structure of a payload data authorization and authentication packet as described herein, and transmit the first payload data authorization and authentication packet to the second node, processor, or computing device. In certain embodiments, for example, the first payload data authorization and authentication packet may be constructed and transmitted following construction and transmission of the first node authentication and authorization packet. In certain embodiments, for example, the first network security software may obtain payload data authorization and authentication parameters for inclusion in metadata of the first payload data authorization and authentication packet from the first record of the first configuration file. In certain embodiments, for example, upon receipt of the first payload data authorization and authentication packet, the second network security software may decrypt (or, if applicable, check the hash value of) the payload data authorization and authentication parameters and compare the values with values obtained from the second record of the second preconfigured list. In certain embodiments, for example, the constructing (inclusive of encrypting or forming a hash value for the metadata) and the obtaining may be performed by a portion of the first network security software executing in an application space (for example in an application space of the first node). In certain embodiments, for example, the decrypting and comparing may be performed by a portion of the second network security software executing in an application space (for example in an application space of the second node). In certain embodiments, for example, the constructing (inclusive of encrypting or forming a hash value for the metadata) and the obtaining may be performed by a portion of the first network security software executing in kernel space (for example in a kernel space of the first node). In certain embodiments, for example, the decrypting and comparing may be performed by a portion of the second network security software executing in a kernel space (for example in a kernel space of the second node).

In certain embodiments, for example, network security software resident on one of the plural nodes may drop a received payload data authorization and authentication packet if the value of payload data authorization and authentication parameters extracted from the received packet do not match an expected value. In certain embodiments, for example, in response to a threshold number of dropped or rejected payload data authorization and authentication packets from a different node (for example another one of the plural nodes or a node not one of the plural nodes), the network security software may add the node to a blacklist. In certain embodiments, for example, the threshold number may be less than 30 payload data authorization and authentication packets, for example less than 20, less than 15, less than 10, less than 5, less than 4, less than 3, or the threshold number may be less than 2 dropped or rejected payload data authorization and authentication packets. In certain embodiments, for example, the threshold number may be in the range of 2-10 payload data authorization and authentication packets, for example in the range of 2-8, in the range of 2-5, or the threshold number may be in the range of 2-4 payload data authorization and authentication packets. In certain embodiments, for example, the network security software may drop (for example without attempting to verify) any further payload data authorization and authentication packets from the sending port of the blacklisted node, processor, or computing device. In certain embodiments, for example, the network security software may drop (for example without attempting to verify) any further payload data authorization and authentication packets from any port of the blacklisted node, processor, or computing device. In certain embodiments, for example, the network security software may terminate all connections (for example inclusive of encrypted communication pathways) with the blacklisted node, processor, or computing device. In certain embodiments, for example, the first network security software may drop (for example without attempting to verify) any further node payload data authorization and authentication packets from the sending port after 2 dropped or rejected payload data authorization and authentication packets, and the network security software may terminate all connections (for example inclusive of encrypted communication pathways) after 10 dropped or rejected payload data authorization and authentication packets.

In certain embodiments, for example, following negotiation of the encrypted communication pathway the second network security software may construct a second payload data authorization and authentication packet having the structure of a payload data authorization and authentication packet as described herein, and transmit the second payload data authorization and authentication packet to the first node, processor, or computing device. In certain embodiments, for example, the second payload data authorization and authentication packet may be transmitted prior to transmission of the first payload data authorization and authentication packet. In certain embodiments, for example, the second payload data authorization and authentication packet may be transmitted after transmission of the first payload data authorization and authentication packet. In certain embodiments, for example, the second payload data authorization and authentication packet may be constructed and transmitted following construction and transmission of the second node authentication and authorization packet. In certain embodiments, for example, the second payload data authorization and authentication packet may be transmitted after the decrypting and comparing the first payload data authorization and authentication packet. In certain embodiments, for example, the first payload data authorization and authentication packet may be transmitted after the decrypting and comparing the second payload data authorization and authentication packet. In certain embodiments, for example, the second payload data authorization and authentication packet may not be transmitted if the first payload data authorization and authentication packet is dropped. In certain embodiments, for example, the first payload data authorization and authentication packet may not be transmitted if the second payload data authorization and authentication packet is dropped. In certain embodiments, for example, the second network security software may obtain payload data authorization and authentication parameters for inclusion in metadata of the second payload data authorization and authentication packet from the second record of the second configuration file. In certain embodiments, for example, upon receipt of the second payload data authorization and authentication packet, the first network security software may decrypt (or, if applicable, check the hash value of) the payload data authorization and authentication parameters and compare the values with values obtained from the first record of the first preconfigured list. In certain embodiments, for example, the constructing (inclusive of encrypting or forming a hash value for the metadata) and the obtaining may be performed by a portion of the second network security software, said portion executing in an application space (for example in an application space of the second node). In certain embodiments, for example, the decrypting and comparing may be performed by a portion of the first network security software, said portion executing in an application space (for example in an application space of the first node). In certain embodiments, for example, the constructing (inclusive of encrypting or forming a hash value for the metadata) and the obtaining may be performed by a portion of the second network security software, said portion executing in kernel space (for example in a kernel space of the second node). In certain embodiments, for example, the decrypting and comparing may be performed by a portion of the first network security software, said portion executing in a kernel space (for example in a kernel space of the first node).

In certain embodiments, for example, if the first node authentication and authorization packet, second node authentication and authorization packet, first payload data authorization and authentication packet, and second payload data authorization and authentication packet are successfully validated, the first application and the second application may transmit payload data packets that the first network security software and the second network security software will allow to be transported across the encrypted communication pathway. In certain embodiments, for example, the destination port number of the first network security software may be recorded in a list of authorized open connections on the first node upon successful validation of the first node authentication and authorization packet, second node authentication and authorization packet, first payload data authorization and authentication packet, and second payload data authorization and authentication packet. In certain embodiments, for example, if any one of the first node authentication and authorization packet, second node authentication and authorization packet, first payload data authorization and authentication packet, and second payload data authorization and authentication packet are not successfully validated, whichever of the first network security software and the second network security software detect the unsuccessful validation may terminate the encrypted communication pathway (and optionally remove the terminated encrypted communication pathway from a list of authorized open connections and/or change the connection status of the encrypted communication pathway). In certain embodiments, for example, terminating the encrypted communication pathway may comprise releasing the destination port. In certain embodiments, for example, in addition to terminating the encrypted communication pathway, the first network security software may terminate the connection formed between the first network security software and the first application. In certain embodiments, for example, in addition to terminating the encrypted communication pathway, the second network security software may terminate the connection formed between the second network security software and the second application.

In certain embodiments, for example, the source port number of the second network security software may be recorded in a list of authorized open connections on the second node upon successful validation of the first node authentication and authorization packet, second node authentication and authorization packet, first payload data authorization and authentication packet, and second payload data authorization and authentication packet. In certain embodiments, for example, a source port number of the second network security software of each payload packet may be compared to the authorized list of open connections on the second node prior to transmitting the payload packet to the first network security software. In certain embodiments, for example, a payload packet may be dropped if said source port does not appear on the authorized list of open connections on the second node, processor, or computing device.

In certain embodiments, for example, a destination port number of each payload packet received by the first network security software may be compared to the authorized list of open connections on the first node, processor, or computing device. In certain embodiments, for example, a payload packet may be dropped if the destination port does not appear in the authorized list of open connections. In certain embodiments, for example, each payload packet received by the first network security software from the network tunnel may be checked to verify that the metadata contains the required second payload data authorization and authentication parameters. In certain embodiments, for example, if said verification fails then the payload packet may be dropped. In certain embodiments, for example, if more than a threshold number of payload packets received by the first network security software from the encrypted communication pathway fail to be verified, then the encrypted communication pathway may be terminated. In certain embodiments, for example, if more than 1 payload packet received by the first network security software from the encrypted communication pathway fails to be verified, for example more than 5, more than 10, more than 15, more than 30, more than 50, or if more than 100 payload packets received by the first network security software from the encrypted communication pathway fail to be verified, then the encrypted communication pathway may be terminated. In certain embodiments, for example, if more than a threshold number of payload packets received by the first network security software in a continuous sequence from the encrypted communication pathway fail to be verified, then the encrypted communication pathway may be terminated. In certain embodiments, for example, if more than 2 payload packets received in a continuous sequence by the first network security software from the encrypted communication pathway fail to be verified, for example more than 4, more than 8, more than 12, more than 18, more than 24, or if more than 48 payload packets received by the first network security software in a continuous sequence from the encrypted communication pathway fail to be verified, then the encrypted communication pathway may be terminated. In certain embodiments, for example, if a rolling counter defined as (a) a multiplier times (b) the number of payload packets received by the first network security software from the encrypted communication pathway failing to be verified, minus (c) another multiplier times (d) the number of payload packets received by the first network security software from the encrypted communication pathway successfully verified exceeds a threshold number, then the encrypted communication pathway may be terminated. In certain embodiments, for example, the multiplier may be 1 and the another multiplier may be 1. In certain embodiments, for example, the multiplier may be larger than the another multiplier. In certain embodiments, for example, the multiplier may be less than the another multiplier. In certain embodiments, for example, the another multiplier may be 1 and the multiplier may be greater than 1, for example the multiplier may be at least 1.25 (for example 1.25), at least 1.5 (for example 1.5), at least 2 (for example 2), at least 2.5 (for example 2.5), or the multiplier may be at least 3 (for example 3). In certain embodiments, for example, the threshold number may be less than 2, for example less than 4, less than 8, less than 10, less than 20, less than 30, less than 50, or the threshold number may be less than 100. In certain embodiments, for example, the threshold number may be in the range of 10-50, for example in the range of 20-40, or the threshold number may be in the range of 25-35. In certain embodiments, for example, the multiplier may be 1, the another multiplier may be 1, and the threshold number may be less than 30, for example less than 20, or less than 10. In certain embodiments, for example, the multiplier may be 3, the another multiplier may be 1, and the threshold number may be less than 60, for example less than 40, less than 30, less than 20, or less than 10.

In certain embodiments, for example, each payload packet received by the second network security software from the encrypted communication pathway may be checked to verify that the metadata contains the required first payload data authorization and authentication parameters. In certain embodiments, for example, if said verification fails then the payload packet may be dropped. If more than a threshold number of payload packets received by the second network security software from the encrypted communication pathway fail to be verified, then the encrypted communication pathway may be terminated. In certain embodiments, for example, if more than 1 payload packet received by the first network security software from the encrypted communication pathway fails to be verified, for example more than 5, more than 10, more than 15, more than 30, more than 50, or if more than 100 payload packets received by the first network security software from the encrypted communication pathway fail to be verified, then the encrypted communication pathway may be terminated. In certain embodiments, for example, if more than a threshold number of payload packets received by the second network security software in a continuous sequence from the encrypted communication pathway fail to be verified, then the encrypted communication pathway may be terminated. In certain embodiments, for example, if more than 2 payload packets received in a continuous sequence by the first network security software from the encrypted communication pathway fail to be verified, for example more than 4, more than 8, more than 12, more than 18, more than 24, or if more than 48 payload packets received by the first network security software in a continuous sequence from the encrypted communication pathway fail to be verified, then the encrypted communication pathway may be terminated. In certain embodiments, for example, if a rolling counter defined as (a) a multiplier times (b) the number of payload packets received by the first network security software from the encrypted communication pathway failing to be verified, minus (c) another multiplier times (d) the number of payload packets received by the first network security software from the encrypted communication pathway successfully verified exceeds a threshold number, then the encrypted communication pathway may be terminated. In certain embodiments, for example, the multiplier may be 1 and the another multiplier may be 1. In certain embodiments, for example, the multiplier may be larger than the another multiplier. In certain embodiments, for example, the multiplier may be less than the another multiplier. In certain embodiments, for example, the another multiplier may be 1 and the multiplier may be greater than 1, for example the multiplier may be at least 1.25 (for example 1.25), at least 1.5 (for example 1.5), at least 2 (for example 2), at least 2.5 (for example 2.5), or the multiplier may be at least 3 (for example 3). In certain embodiments, for example, the threshold number may be less than 2, for example less than 4, less than 8, less than 10, less than 20, less than 30, less than 50, or the threshold number may be less than 100. In certain embodiments, for example, the threshold number may be in the range of 10-50, for example in the range of 20-40, or the threshold number may be in the range of 25-35. In certain embodiments, for example, the multiplier may be 1, the another multiplier may be 1, and the threshold number may be less than 30, for example less than 20, or less than 10. In certain embodiments, for example, the multiplier may be 3, the another multiplier may be 1, and the threshold number may be less than 60, for example less than 40, less than 30, less than 20, or less than 10.

In certain embodiments, for example, the each of the plural nodes may comprise network security software, wherein the network security software may treat any network packet received by a port of the network security software as a malicious packet unless it is a connection request packet, a verified node authentication and authorization packet, a verified payload data authorization and authentication packet, or a verified payload packet as described herein.

In certain embodiments, for example, prior to transmission of a network packet by a first execution thread of the first network security software, a second execution thread (for example of the first network security software) may verify that the user of the first execution thread is an authorized user (for example by determining the user is the root user of a node on which the first execution thread is executing). In certain embodiments, for example, prior to transmission of a network packet by a first execution thread of the second network security, a second execution thread of the second network security software may verify that the user of the first execution thread is an authorized user, for example the root user of a node on which the first execution thread is executing.

In certain embodiments, for example, payload data may be translated by network security software from a native format (for example a native format associated with an application) into a common format prior to insertion in the payload data packet. In certain embodiments, for example, the common format may conform to a machine-to-machine protocol. In certain embodiments, for example, the format may conform to an IoT protocol. In certain embodiments, for example, the common format may conform to an MQ Telemetry Transport (MQTT) protocol. In certain embodiments, for example, the common format may conform to an Advanced Message Queuing Protocol (AMQP). In certain embodiments, for example, the common format may conform to a Simple/Streaming Text Oriented Messaging Protocol (STOMP). In certain embodiments, for example, the common format may conform to a Data Distribution Service DDS. In certain embodiments, for example, the common format may conform to a Constrained Application Protocol (CoAP). In certain embodiments, for example, the common format may conform to a Java Message Service (JMS). In certain embodiments, for example, the common format may conform to an eXtensible Messaging and Presence Protocol (XMPP). In certain embodiments, for example, the common format may conform to a Representational State Transfer (REST) protocol. In certain embodiments, for example, the common format may conform to an Open Mobile Alliance Light Weight Machine-to-Machine (OMA LWM2M) protocol. In certain embodiments, for example, the common format may conform to an Open Platform Communications Unified Architecture (OPC UA) protocol. In certain embodiments, for example, the common format may conform to a JavaScript Object Notation (JSON) protocol. In certain embodiments, for example, the common format may conform to an instant messaging protocol. In certain embodiments, for example, the common format may be a proprietary format (for example may conform to a proprietary protocol). In certain embodiments, for example, the translation may be performed in an application space of node where the network security software is resident. In certain embodiments, for example, network security software may translate received payload data from a common format to a native format according to a receiving application.

In certain embodiments, for example, first network security software resident on a first node may translate data (or a portion thereof) from a first native format to a common format, followed by inclusion of the translated data in a network packet. In certain embodiments, for example, the network packet may be transmitted from the first node to a second node, processor, or computing device. In certain embodiments, for example, second network software resident on the second node may translate the translated data (or translated portion thereof) from the common format into a second native format. In certain embodiments, for example, the data in the second native format may be transmitted to an application resident on the second node, processor, or computing device.

In certain embodiments, for example, prior to the second network security software performing said translating, the second network security software may treat incoming data as translated data and inspect the incoming data based on a predetermined policy (for example a policy based on a data type of the translated data). In certain further embodiments, for example, the inspecting may comprise determining the size(s) (or length(s)) of a portion, portions, or all the incoming data (for example checking using a command such as a rangeCheck command( )), and comparing the determined size(s) with minimum and/or maximum allowed size(s). In certain embodiments, for example, the minimum and/or maximum allowed size(s) may be obtained from the predetermined policy. In certain embodiments, for example, the inspecting may be followed by discarding the incoming data if the data does not conform to the predetermined policy. In certain embodiments, for example, the discarding may be effective to defeat a return-oriented programming exploit. In certain embodiments, for example, the discarding may prevent an attacker from gaining control of a program call stack running on the second node, processor, or computing device.

In certain embodiments, for example, the first native format and the second native format may be the same. In certain embodiments, for example, the first native format and the second native format may be different. In certain embodiments, for example, the translation of the data (or a portion thereof) from the first native format to the common format may chop malware contained in the data (or a portion thereof) into two or more discontiguous segments. In certain embodiments, for example, the translation of the data (or a portion thereof) from the first native format to the common format may render malware contained in the data (or a portion thereof) inoperable. In certain embodiments, for example, the translation of the data (or a portion thereof) from the common format to the second native format may chop (or shred) malware contained in the data (or a portion thereof) into two or more discontiguous segments. In certain embodiments, for example, the translation of the data (or a portion thereof) from the common format to the second native format may not reassemble malware originally contained in the data (or a portion thereof) in its first native format into a contiguous executable code (for example the first native format may be different from the second native format). In certain embodiments, for example, the translation of the data (or a portion thereof) from the common format to the second native format may render malware contained in the data (or a portion thereof) inoperable.

In certain embodiments, for example, the second node of the plural nodes may be a gateway server to different nodes than the plural nodes. In certain embodiments, for example, the second node of the plural nodes may be configured to receive network packet communications by connections which are not negotiated by the second network security software, followed by transmitting at least a portion of the received network packet communications through an authorized encrypted communication pathway that is negotiated by the first network security software and the second network security software. In certain embodiments, for example, the at least a portion of the received network packet communications may be passed through a trusted application to form trusted at least a portion of the received network packet communications, followed by passing the trusted at least a portion of the received network packet communications through the authorized encrypted communication pathway. In certain embodiments, for example, the at least a portion of the received network packet communications may be modified to render any executable computer code present in the received network packet communications nonexecutable. In certain embodiments, for example, the at least a portion of the received network packet communications may be modified, chopped, or shredded to render any executable code present in the received network packet communications nonexecutable. In certain embodiments, for example, the at least a portion of the received network packet communications may be padded to render any executable code present in the received network packet communications nonexecutable. In certain embodiments, for example, the at least a portion of the received network packet communications may be converted to a nonexecutable format. In certain embodiments, for example, the at least a portion of the received network packet communications may be converted to an ASCII text format. In certain embodiments, for example, the at least a portion of the received network packet communications may be passed through a function (for example a bitwise function or a cryptographic function) to render it nonexecutable. In certain embodiments, for example, the ratio of the different nodes to the plural nodes may be less than 1:1, for example less than 1:2, less than 1:3, less than 1:4, less than 1:5, less than 1:8, less than 1:9, less than 1:10, less than 1:20, or the ratio of the different nodes to the plural nodes may be less than 1:50.

Certain embodiments may provide, for example, use of any of the foregoing systems, methods, or apparatuses to defeat an attack over a network (for example an attack by malware resident on the node or on a remote node). In certain embodiments, for example, the attack may comprise a port scan attack whereby the malware detects an open port (for example a port in listening mode) on the node, processor, or computing device.

In certain embodiments, for example, malware may use a compromised password (for example a weak administrator password that has been compromised) to gain access to one or plural nodes, followed by transmitting data from the one or plural nodes.

In certain embodiments, for example, spyware present on a node may transmit keystrokes from a keyboard to a remote machine in order to obtain confidential information (for example a password for the machine or one or plural applications.

In certain embodiments, for example, the attack may comprise the malware spoofing a second node with which the first node is authorized to communicate. In certain embodiments, for example, the malware may monitor network traffic between the node and the further node to determine, for example, a node address, a node port number, a communication session ID, and a network packet sequence number associated with a communication session. In certain further embodiments, for example, the malware may modify Address Resolution Protocol (ARP) caches present on the node and on a router, causing network packets to be routed through the malware. Alternatively, in certain embodiments, for example, the malware may trigger a connection reset between the node and the router. In certain further embodiments, for example, the malware may spoof the node by registering with the router using the determined address and port number, and highjack the communication session with the further node, processor, or computing device. In certain further embodiments, for example, the node may redirect the node traffic to pass through the malware when the node reconnects with the router.

In certain embodiments, for example, the attack may comprise negotiating an encrypted tunnel with a network security agent resident on the node (and, in the case of a man-in-the-middle attack, negotiating a further encrypted tunnel with a second node). In certain embodiments, for example, the malware may obtain one or plural private keys from the node, enabling key exchange between the malware and the node, decryption of encrypted network packets, network packet payloads, and/or network packet metadata. In certain embodiments, for example, the malware may obtain the one or plural private keys based on a flaw in security software. By way of example, certain versions of OpenSSL (publicly available secured socket layer encryption software) contain a bug (the so-called "Heartbleed" bug) that has been exploited malware to read node memory. According to the Heartbleed bug, a malware client may send a "heartbeat" network packet to a server node, the packet containing a payload size parameter. Exploiting the fact that the OpenSSL versions require the server node respond to the heartbeat network packet in kind with the same heartbeat request, the malware may submit a payload size parameter much larger than the actual payload, which may cause the server to send random data from its memory to meet the length requirements of specified by the payload size parameter. By inspecting the random bits of data, in certain instances the malware may be able to identify sufficient cryptographic data to compromise a security protocol.

In certain embodiments, for example, the network attack may comprise a side-channel attack. In certain embodiments, for example, the network attack may comprise a challenge ACK side channel attack. In certain embodiments, for example, the side channel attack may be rendered ineffective by requiring, according to the methods described herein, the exchange and authorization of encrypted device, application, user, and/or data protocol parameters across an encrypted communication pathway prior to authorizing port-to-port communication (or higher than OSI layer three communication) across the encrypted communication pathway and, once port-to-port communication is authorized, further requiring, according to the methods described herein, that each payload passed to an application port is obtained from a network packet containing an expected application, user, and/or data protocol identifier.

In certain embodiments, for example, the network attack may comprise a denial-of-service attack, whereby one or plural remote nodes attempt to temporarily or indefinitely render node resources unavailable to its intended users. In certain embodiments, for example, the denial-of-service attack may comprise a distributed denial of service attack, whereby incoming network packets from plural sources flood the node, processor, or computing device. In certain embodiments, for example, the denial-of-service attack may comprise an OSI application layer attack whereby network packet data may flood application layer memory. In certain further embodiments, for example, the OSI application layer attack may trigger buffer overflow on the node, processor, or computing device. Buffer overflow may result in consumption of all available CPU memory (or in the introduction of malware into an executable region of node memory). In certain embodiments, for example, the denial-of-service attack may comprise a so-called "banana attack" whereby outgoing network packets are redirected to the client, thereby impairing incoming network traffic from reaching the node (and potentially flooding node memory with the redirected network packets). In certain embodiments, for example, the denial-of-service attack may be a so-called "Smurf" attack, whereby malware may spoof the source address of the node in network packets and exploit one or plural misconfigured network devices to cause the network packets to be broadcast to each member of a network. The resulting network traffic may use up the network's bandwidth. In certain embodiments, for example, the denial-of-service attack may comprise the so-called "ping flood", whereby the node may receive an overwhelming number of ping packets over the network. In the so-called "Ping of death" attack, for example, the malware may provide a malformed ping packet that may consume node resources. In the so-called "BlackNurse attack", for example, malware may transmit packets indicating that a destination port is unreachable. In certain embodiments, for example, the denial-of-service attack may comprise the so-called "shrew attack", whereby short synchronized bursts of traffic may disrupt TCP connections on the same link, by exploiting a weakness in TCPs retransmission timeout mechanism. In certain embodiments, for example, the denial-of-service attack may comprise the so-called "Slow Read" attack whereby malware sends properly formed application layer requests but reads responses very slowly, thus trying to exhaust the nodes connection pool. In certain embodiments, for example, the denial-of-service attack may comprise the so-called "teardrop attack", whereby malformed network fragments with overlapping, oversized payloads are transmitted to the node, processor, or computing device. In certain embodiments, for example, the teardrop attack may compromise certain kernels (for example Windows 3.1x, Windows 95 and Windows NT operating systems, as well as versions of Linux prior to versions 2.0.32 and 2.1.63) due to a bug in their TCP/IP fragmentation re-assembly code. In certain embodiments, for example, the network attack may comprise a malicious file list object (for example a compromised file) configured to be executed by software that is ostensibly not malicious (for example an authorized application software program or an operating system program).

Figure 11:
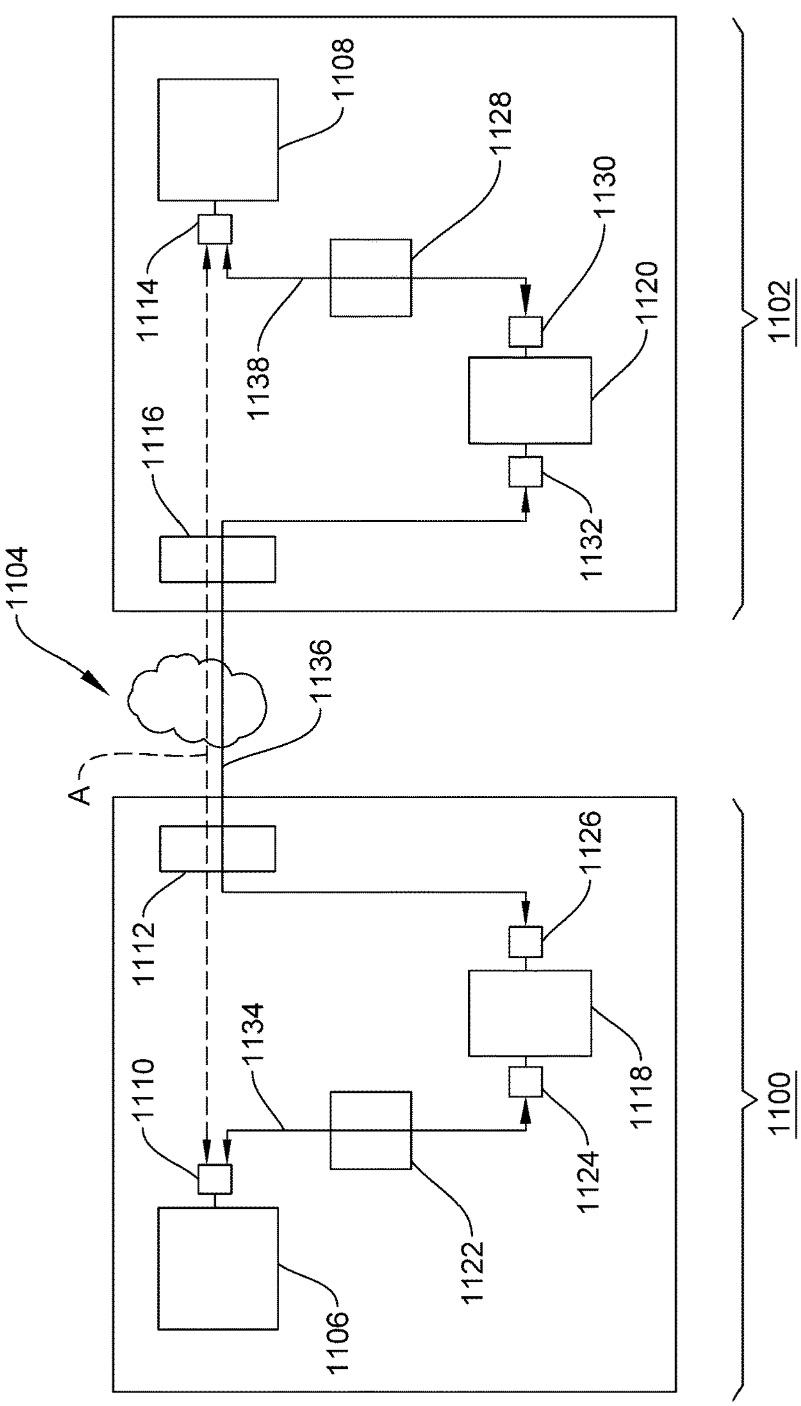
FIG. 11: Schematic view of exemplary data flow between nodes coupled to a network.

A schematic view of an exemplary data flow for data transmission between a first node 1100 and a second node 1102 across a network 1104 is illustrated in FIG. 11. According to this embodiment, a first application 1106 executing on the first node 1100 and a second application 1108 executing on the second node 1102 attempt to form a communication pathway (or channel) A (the communication pathway (or channel) is shown by the identifier A only for reference, and it is not part of the exemplary data flow managed by network security agent as described below), comprising attempting to associate a first port 1110 of the first application 1106 with a first physical interface 1112 of the first node 1100 and attempting to associate a second port 1114 of the second application 1108 with a second physical interface 1116 of the second node 1102. Of note, the first port 1110 and/or the second port 1114 may have predefined port numbers or may have ephemeral port numbers that are assigned at some point before, during, or subsequent to the attempt to form the communication pathway (or channel) A. According to this embodiment, a first network security agent 1118 and a second network security agent 1120 are cooperatively configured to prevent the attempted communication pathway (or channel) A from being formed. The first network security agent 1118 intercepts the attempt to associate the first port 1110 with the first physical interface 1112 and redirects the first port 1110 to associate with a first loopback interface 1122 of the first node 1100. Furthermore, the first network security agent 1118 causes a third port 1124 of the first network security agent 1118 to associate with the first loopback interface 1122 and a fourth port 1126 of the first network security agent to associate with the first physical interface 1112. The second network security agent 1120 intercepts the attempt to associate the second port 1114 with the second physical interface 1116 and redirects the second port 1114 to associate with a second loopback interface 1128 of the second node 1102. Furthermore, the second network security agent 1120 causes a fifth port 1130 of the second network security agent 1120 to associate with the second loopback interface 1128 and a sixth port 1132 of the second network security agent to associate with the second physical interface 1116. The first application 1106 and the first network security agent 1118 negotiate a first communication pathway (or channel) 1134, the first network security agent 1118 and the second network security agent 1120 negotiate a second communication pathway (or channel) 1136, and the second network security agent 1120 and the second application 1108 negotiate a third communication pathway (or channel) 1138, whereby data may be transmitted by a data path comprising the first communication pathway (or channel) 1134, the second communication pathway (or channel) 1136, and the third communication pathway (or channel) 1138.

Figure 12:
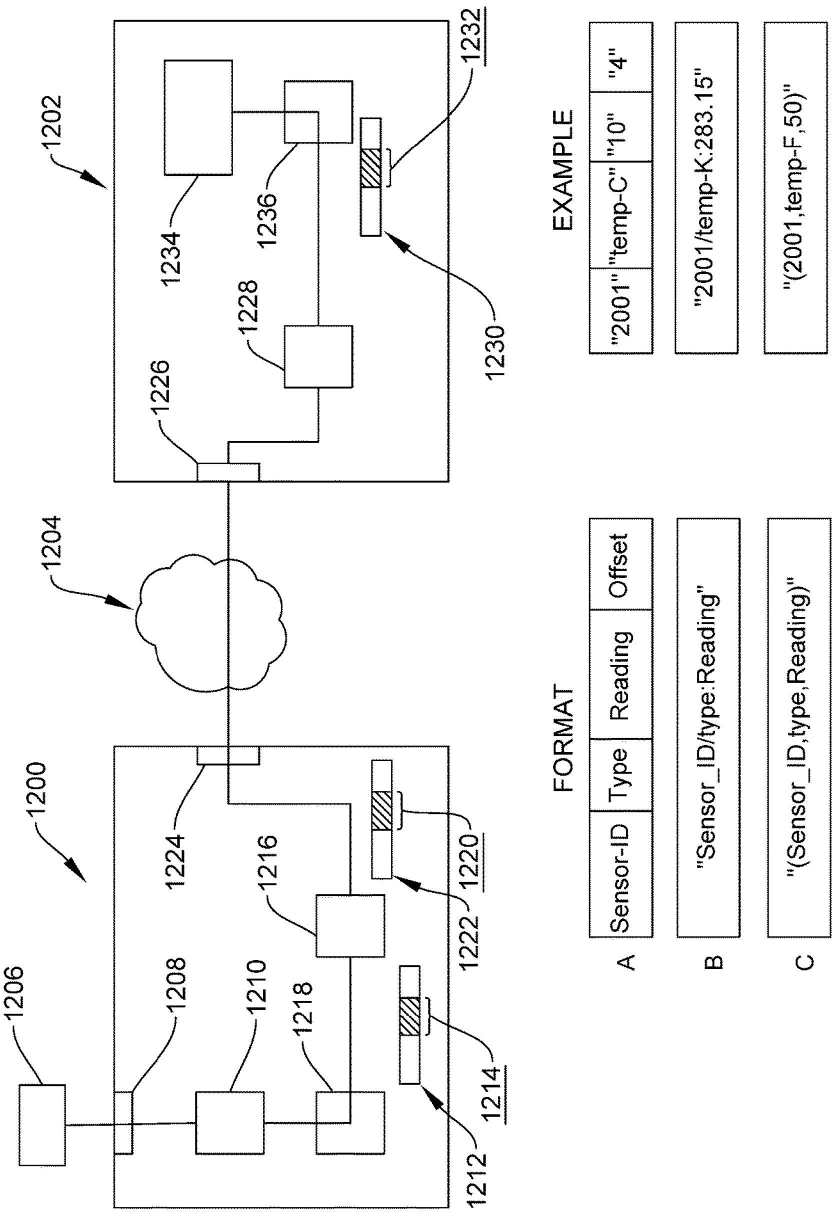
FIG. 12: Schematic view of an exemplary translated data flow between nodes coupled to a network.

A schematic view of an exemplary translated data flow between a first node 1200 and a second node 1202 across a network 1204 is illustrated in FIG. 12. According to this embodiment, a sensor 1206 transmits a sensor reading across a physical interface 1208 of the first node 1200 to sensor software 1210, which may include a driver for the sensor 1206. The sensor software 1210 transmits a first packet 1212 containing the sensor reading in a payload 1214 of the first packet 1212 to a first network security software 1216 via a loopback interface 1218 of the first node 1200 (i.e., the first packet 1212 is passed through a network stack via the loopback interface 1218 and the payload 1214 passed to the first network security software 1216). The first packet payload 1214 has a first native data format A, the first native data format A including an offset, the sensor reading, a fixed-width sensor identifier, and a fixed-width data type identifier. The offset provides an index to the start of the fixed-width sensor identifier in the payload. The sensor reading in the first native data format may be provided in first native units (for example a temperature value may be provided in degrees Celsius, as shown) or may be unitless. The first network security software 1216 includes a translator, the translator configured to convert the sensor data payload 1214 from the first native data format A to a translated format B (to form a translated sensor data payload 1220), the translated format B consisting of the sensor identifier, the data type, and a translated sensor reading, wherein a forward slash ("/") delimits the sensor identifier and the data type, and a colon (":") delimits the data type and the translated sensor data value. The translated sensor reading may be provided in translated units (for example a translated temperature value may be provided in degrees Kelvin, as shown) or may be unitless.

The first network security software transmits a second data packet 1222 containing the translated sensor data payload 1220 via a physical interface 1224 across the network 1204 to the second node 1202 via a physical interface 1226 where the second data packet 1222 is received by second network security software 1228. The second network security software 1228 includes a translator, the translator configured to convert the sensor data payload 1220 from the translated format B to a second native data format C expected by a database application, the second native data format C consisting of the sensor identifier, the data type, and a sensor reading in comma delimited format and enclosed in parenthesis. The sensor reading, following conversion from the translated format C by the second network security software 1228, may be provided according to second native units (for example a temperature value may be provided in degrees Fahrenheit, as shown) or may be unitless. The second network security software 1228 transmits a third packet 1230 containing the sensor data payload 1232 having the second native data format C to a database application 1234 via a loopback interface 1236 of the second node 1202.

The network security software (1216 and 1228) may perform additional communication management operations. In addition to translating the payload 1214, the network security software 1216 may be configured to evaluate the payload 1214 prior to the translating to determine whether the payload 1214 conforms to the first native data format A by checking whether the fixed-width sensor identifier is an integer falling within a pre-established valid range, whether the fixed-width data type identifier is one of a pre-established allowed type of data (for example "temp-C"), and whether the sensor reading is an integer or floating point number falling within a pre-established range. If the payload 1214 fails to conform to the first native data format A, the network security software 1216 may discard the payload 1214 without translating it. In addition to translating the payload 1220, the network security software 1228 may be configured to evaluate the payload 1220 prior to the translating to determine whether the payload 1220 conforms to the translated format B by checking whether the sensor identifier is an integer falling within a valid range, whether the data type identifier is one of a pre-established allowed type of data (for example "temp-K"), and whether the sensor reading is an integer or floating point number falling within a pre-established range. If the payload 1220 fails to conform to the translated format B, the network security software 1216 may discard the payload 1220 without translating it.

Figure 13:
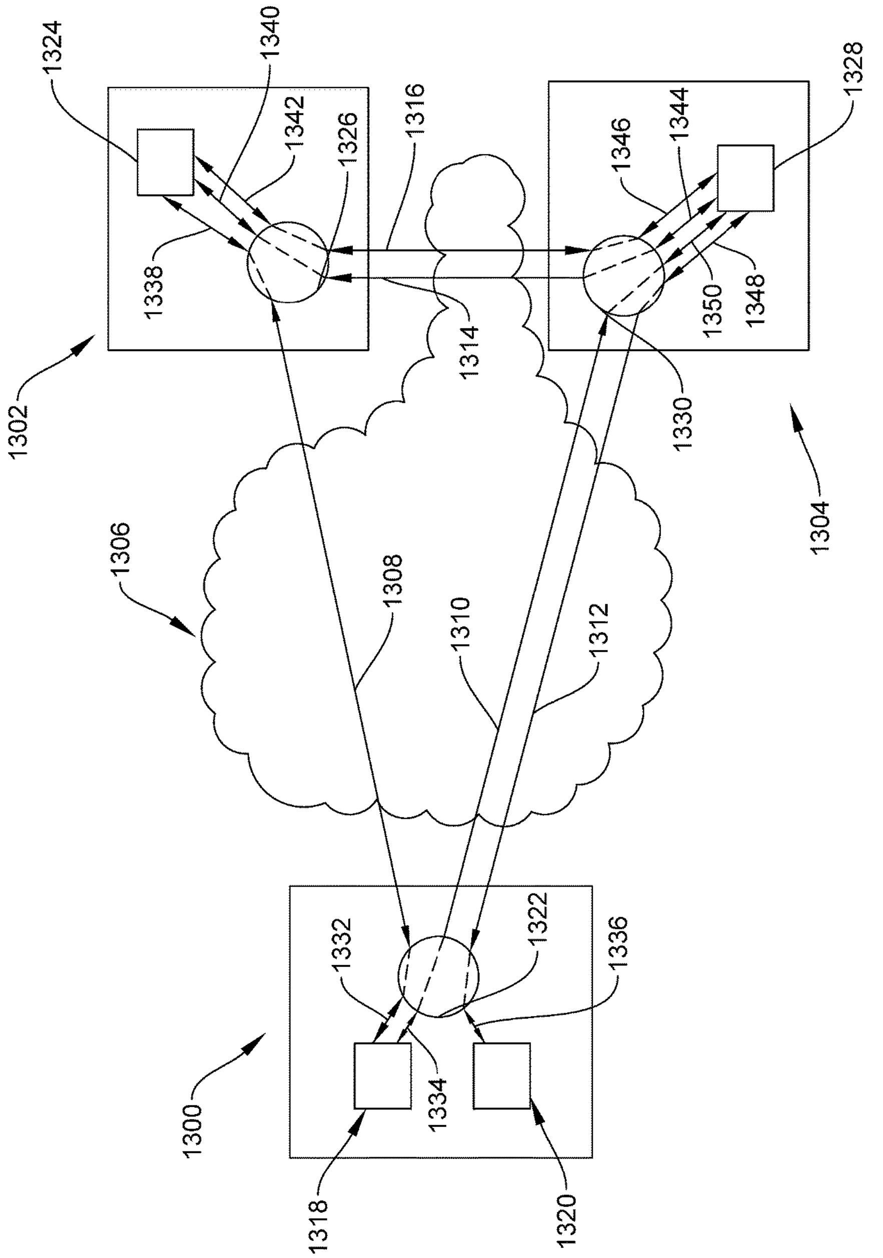
FIG. 13: Schematic view of exemplary network configuration.

A schematic view of an exemplary network configuration is illustrated in FIG. 13. The network comprises a first node 1300, a second node 1302, and a third node 1304 exchanging data over network 1306 through a first encrypted bidirectional connection (for example network tunnel) 1308, a second encrypted unidirectional connection (for example network tunnel) 1310, a third encrypted unidirectional connection (for example network tunnel) 1312, a fourth encrypted unidirectional connection (for example network tunnel) 1314, and a fifth encrypted bidirectional connection (for example network tunnel) 1316. The first node 1300 comprises a first application program 1318, a second application program 1320, and a first network security software 1322. The second node 1302 comprises a third application program 1324 and a second network security software 1326. The third node 1304 comprises a fourth application program 1328 and a third network security software 1330. Each of the application programs (1318, 1320, 1324, and 1328) communicate data to and from their respective network security software (1322, 1326, or 1330) by bidirectional connections 1332, 1334, 1336, 1338, 1340, 1342, 1344, 1346, 1348, 1350 as indicated. The first network security software 1322 is configured to (a) transmit data conforming exclusively to a first data protocol received from the first application program 1318 by bidirectional connection 1332 to the first encrypted bidirectional connection (for example network tunnel) 1308; and (b) transmit data conforming exclusively to the first data protocol received from the first encrypted bidirectional connection (for example network tunnel) 1308 to the first application program 1318 by bidirectional connection 1332. The first network security software 1322 is also configured to transmit data conforming exclusively to a second data protocol received from the first application program 1318 by bidirectional connection 1334 to the second encrypted unidirectional connection (for example network tunnel) 1310. The first network security software 1322 is further configured to transmit data conforming exclusively to a third data protocol received from the third encrypted unidirectional connection (for example network tunnel) 1312 to the second application program 1320 by bidirectional connection 1336. The second network security software 1326 is configured to (a) transmit data conforming exclusively to the first data protocol received from the third application program 1324 by bidirectional connection 1338 to the first encrypted bidirectional connection (for example network tunnel) 1308; and (b) transmit data conforming exclusively to the first data protocol received from the first encrypted bidirectional connection (for example network tunnel) 1308 to the third application program 1324 by bidirectional connection 1338. The second network security software 1326 is also configured to transmit data conforming exclusively to a fourth data protocol received from the fourth encrypted unidirectional connection (for example network tunnel) 1314 to the third application program 1324 by bidirectional connection 1340. The second network security software 1326 is further configured to (a) transmit data conforming exclusively to a fifth data protocol received from the third application program 1324 by bidirectional connection 1342 to the fifth encrypted bidirectional connection (for example network tunnel) 1316; and (b) transmit data conforming exclusively to the fifth data protocol received from the fifth encrypted bidirectional connection (for example network tunnel) 1316 to the third application program 1324 by bidirectional connection 1342. The third network security software 1330 is configured to transmit data conforming exclusively to the second data protocol received from the second encrypted unidirectional connection (for example network tunnel) 1310 to the fourth application program 1328 by bidirectional connection 1348. The third network security software 1330 is also configured to transmit data conforming exclusively to the third data protocol received from the fourth application program 1328 by bidirectional connection 1350 to the third encrypted unidirectional connection (for example network tunnel) 1312. The third network security software 1330 is further configured to transmit data conforming exclusively to the fourth data protocol received from the fourth application program 1328 by bidirectional connection 1344 to the fourth encrypted unidirectional connection (for example network tunnel) 1314. The third network security software 1330 is additionally configured to (a) transmit data conforming exclusively to a fifth data protocol received from the fourth application program 1328 by bidirectional connection 1346 to the fifth encrypted bidirectional connection (for example network tunnel) 1316; and (b) transmit data conforming exclusively to the fifth data protocol received from the fifth encrypted bidirectional connection (for example network tunnel) 1316 to the fourth application program 1328 by bidirectional connection 1346.

Figure 14:
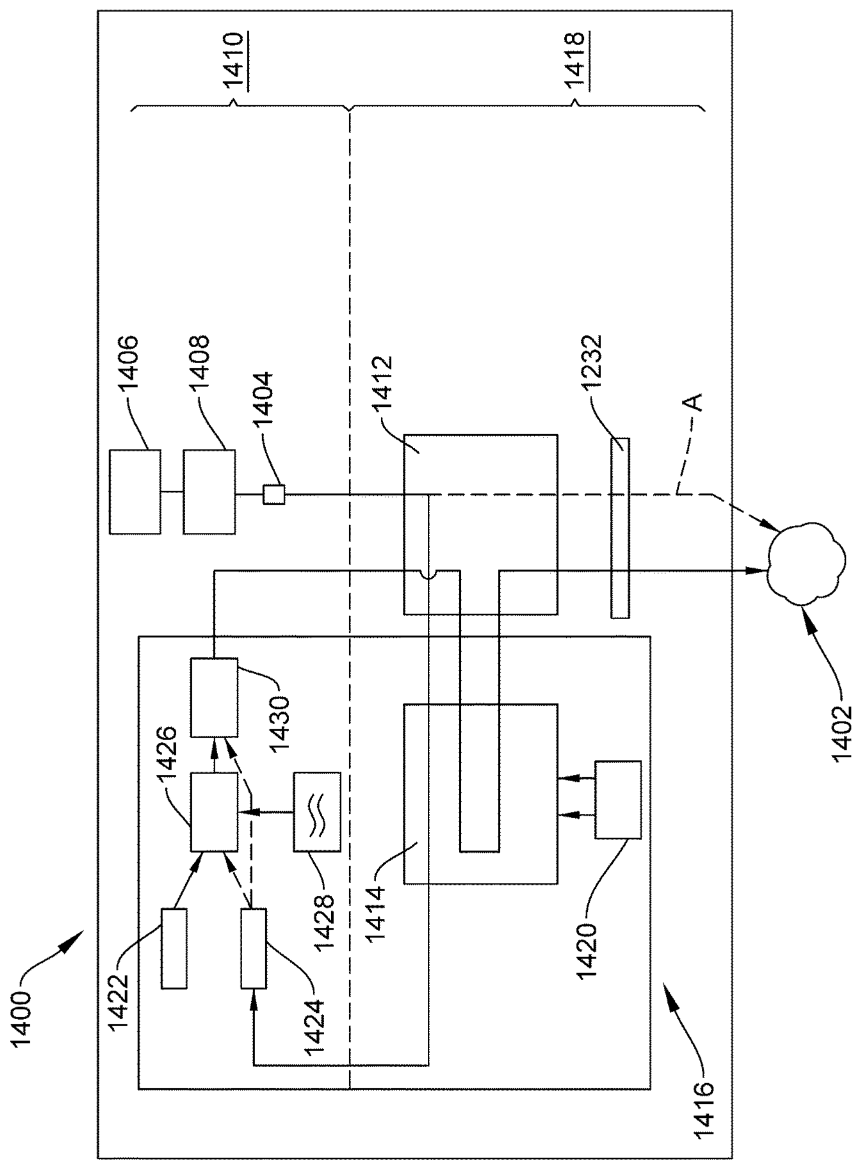
FIG. 14: Schematic view of exemplary node transmitting data to a network.

A schematic view of an exemplary node 1400 transmitting data to a network 1402 is illustrated in FIG. 14. A data packet sent from a program port 1404 by a user 1406 of a program 1408 executing in an application space 1410 to a network stack 1412 is routed to a first driver (or module, for example a kernel loadable module) 1414 of a network security layer 1416 in a kernel space 1418. Based on a list 1420 of allowed network connections (which list is stored in kernel space memory as shown or alternatively stored in application space memory, and at least a portion of the contents of the list may optionally be loaded from an kernel-only readable file or from an application space readable file and optionally passed via an interface to the kernel space 1410), the first driver (or module, for example a kernel loadable module) 1414 verifies that the user 1406 and the program 1408 are permissible, and obtains a network tunnel port number and data protocol for the data packet. The first driver (or module, for example a kernel loadable module) 1414 further verifies that the network tunnel port number is associated with a network tunnel that is in a valid state for transmitting data (for example having an open connection status). A builder module 1422 is invoked to assemble descriptors for the user 1406, the program 1408, and the data protocol into packet metadata. A data portion of the data packet is passed to a translator module 1424 to encode the data into translated data for transmission across the network tunnel. The packet metadata and optionally the translated data are encrypted by an encryption module 1426 using cryptographic keys specific to the network tunnel obtained from a file 1428 and an encrypted result is passed to an assembler module 1430 to form a modified data packet. If the translated data is not encrypted, it may bypass the encryption module 1428 and instead be passed directly to the assembler module 1430 as shown. The modified data packet is communicated to the network stack 1412 and a frame containing the modified data packet transmitted to the network tunnel by a physical interface 1432. Prior to communicating the modified data packet to the network tunnel, the first driver (or module, for example a kernel loadable module) 1414 verifies that the network tunnel is in a valid state for transmitting data. For illustrative purposes only, and not as part of the embodiment, path A shows that data packet sent from the program port 1404 would pass through the network stack 1412 and the physical interface 1432 to the network 1402 were the first driver (or module, for example a kernel loadable module) 1414 not present.

Figure 15:
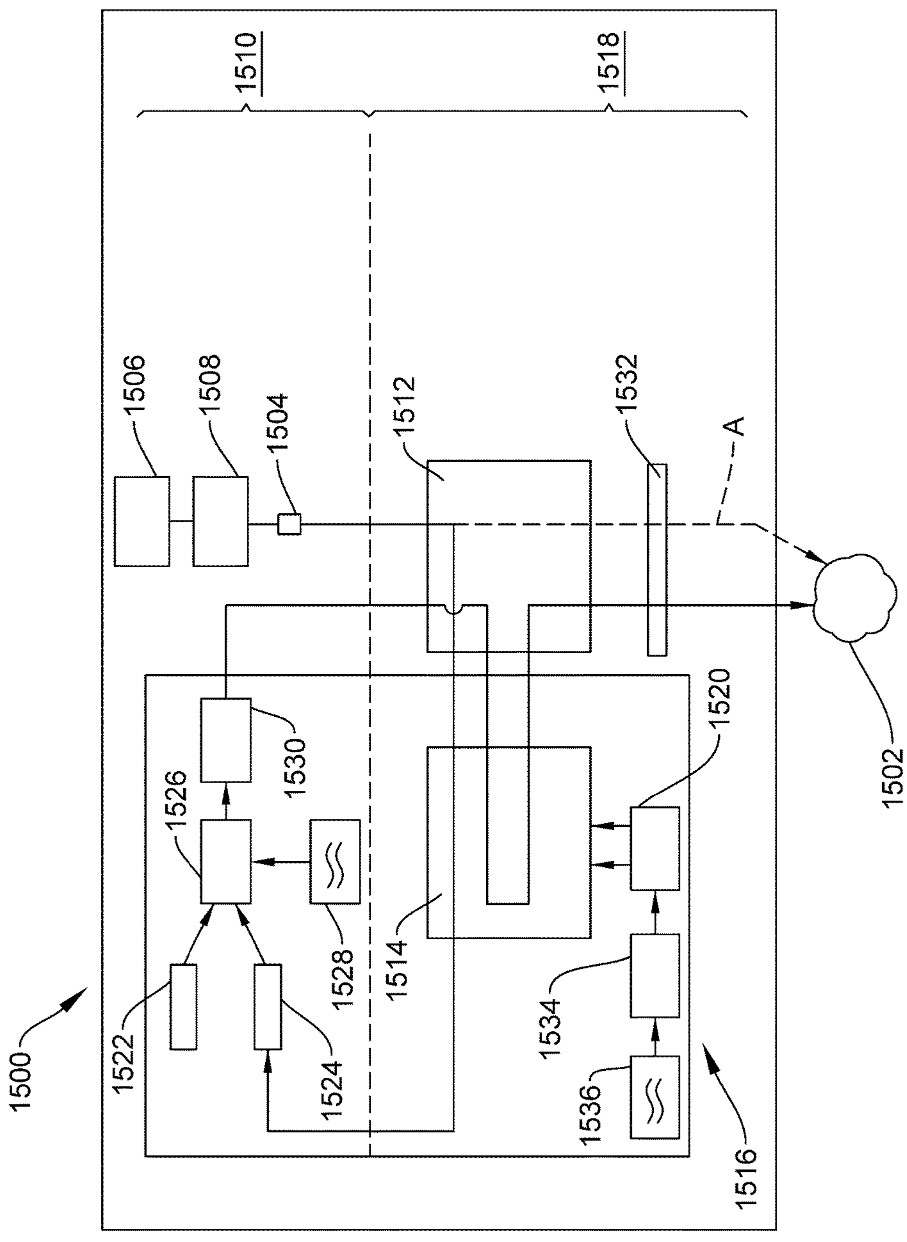
FIG. 15: Schematic view of exemplary node comprising a read-only file.

A schematic view of an exemplary node 1500 transmitting data to a network 1502 is illustrated in FIG. 15. A data packet sent from a program port 1504 by a user 1506 of a program 1508 in an application space 1510 to a network stack 1512 is routed to a first driver (or module, for example a kernel loadable module) 1514 of a network security layer 1516 in a kernel space 1518. Based on a list 1520 of allowed network connections (which list is stored in kernel space memory as shown or alternatively stored in application space memory, and at least a portion of the contents of the list may optionally be loaded from an kernel-only readable file or from an application space readable file and optionally passed via an interface to the kernel space 1510), the first driver (or module, for example a kernel loadable module) 1514 verifies that the port 1504 corresponds to a valid port for the user 1506 and the program 1508, and obtains a network tunnel port number and data protocol for the data packet. The first driver (or module, for example a kernel loadable module) 1514 further verifies that the network tunnel port number is associated with a usable network tunnel. A builder module 1522 is invoked to assemble descriptors for the user 1506, the program 1508, and the data protocol into packet metadata. A data portion of the data packet is passed to a translator module 1524 to encode the data into translated data for transmission across the network tunnel. The packet metadata and translated data are encrypted by an encryption module 1526 using cryptographic keys specific to the network tunnel obtained from a file 1528 and an encrypted result is passed to an assembler module 1530 to form a modified data packet. The modified data packet is communicated to the network stack 1512 and a frame containing the modified data packet transmitted to the network tunnel by a physical interface 1532. Prior to communicating the modified data packet to the network tunnel, the first driver (or module, for example a kernel loadable module) 1514 verifies that the network tunnel is in a valid state for transmitting data. The list 1520 of allowed network connections is loaded into kernel access memory by a second driver (or module, for example a kernel loadable module) 1534 having sole permission to read a cryptographically signed, read-only, kernel access-only file 1536 (in an alternative embodiment, the file 1536 may be an application space file and the second driver (or module, for example a kernel loadable module) 1534 may be an application space program). For illustrative purposes only, and not as part of the embodiment, path A shows that data packet sent from the program port 1504 would pass through the network stack 1512 and the physical interface 1532 to the network 1502 were the first driver (or module, for example a kernel loadable module) 1514 not present.

Figure 16:
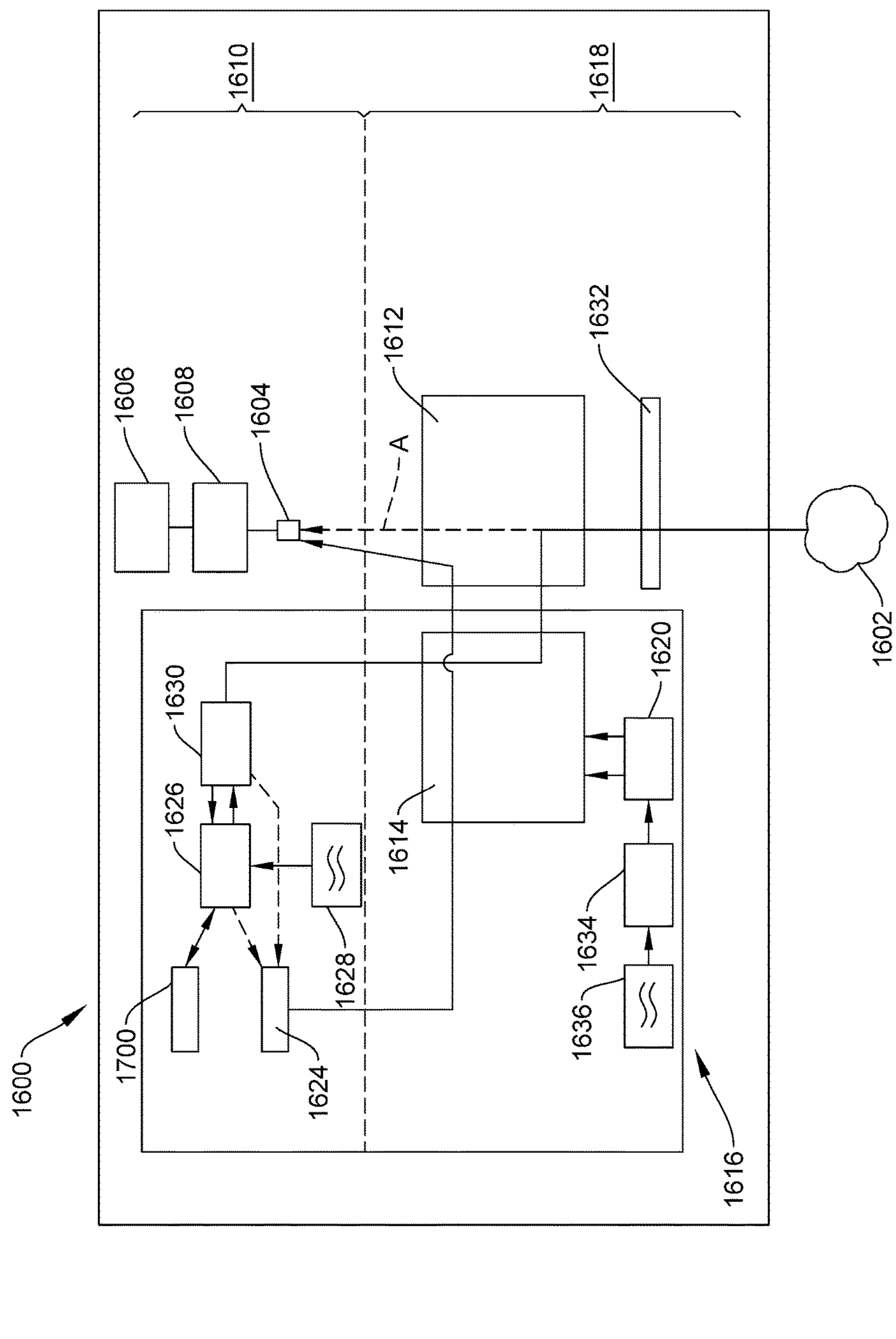
FIG. 16: Schematic view of exemplary node receiving data from a network.

A schematic view of an exemplary node 1500 receiving data from a network 1502 is illustrated in FIG. 16. A data packet containing translated data received from a network tunnel over the network 1502 and sent from a remote program port by a remote user passes through a physical interface 1532 and a network stack 1512. The data packet is received (or intercepted) by a first driver (or module, for example a kernel loadable module) 1514 of a network security layer 1516 in kernel space 1518 and directed to assembler 1530, where it is disassembled into encrypted metadata and the translated data (if the translated data is encrypted the encrypted translated data is passed with the encrypted metadata to an encryption module 1526, otherwise the unencrypted translated data is routed directly to a translation module 1524). Decrypted metadata obtained by passing the encrypted metadata through the encryption module 1526 is inspected by a validation module 1600 to verify that a descriptor comprising a remote application code, a remote user code, and a data protocol code match an expected value for the network tunnel. If the match is verified, the translated data is decrypted (if necessary) by encryption module 1526 and in any event the unencrypted/decrypted translated data is passed to a translator module 1524 for conversion into native format data and transmitted via a loopback interface to a local port 1504 associated with a resident program 1508.

Figure 17:
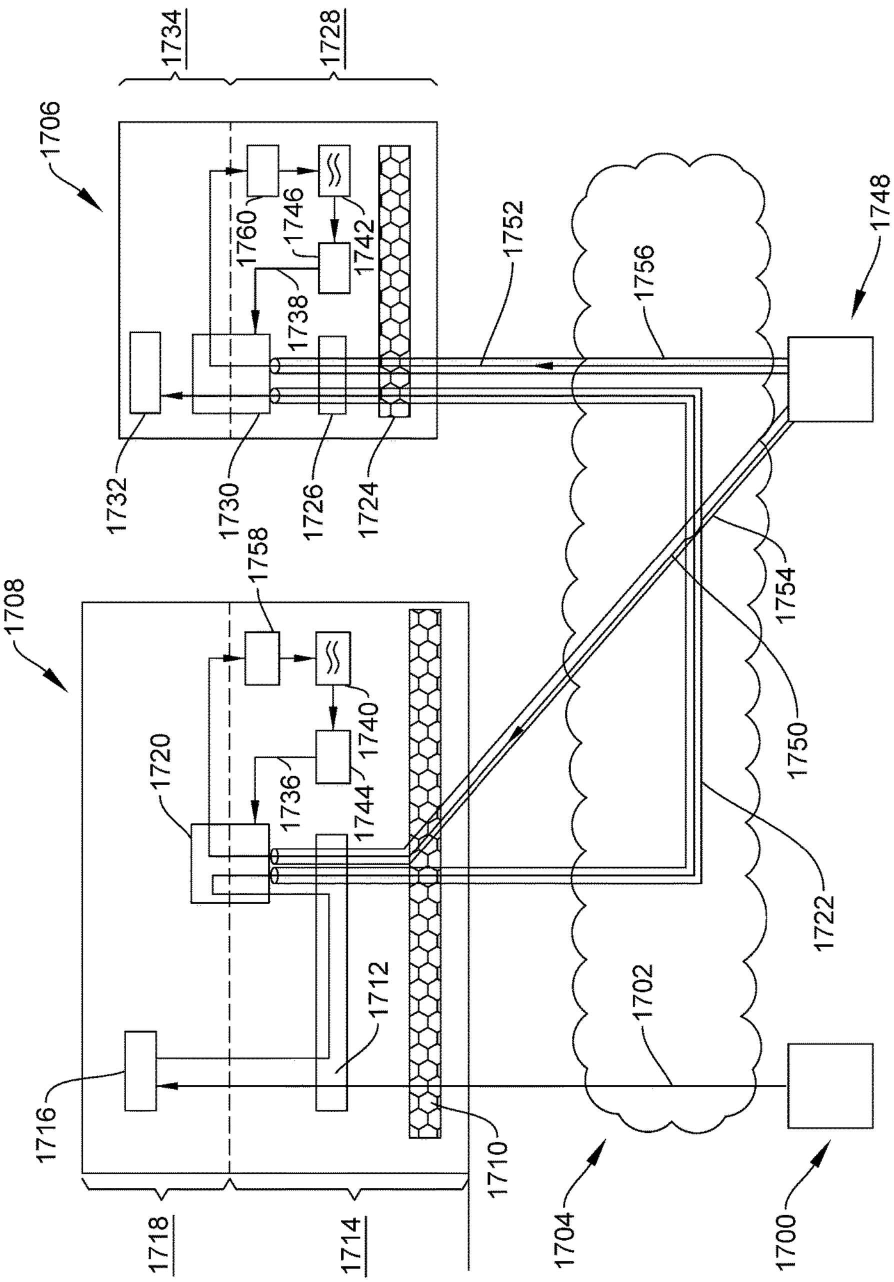
FIG. 17: Schematic view of gateway server.

A schematic view of an unsecure node 1700 transmitting data 1702 over a network 1704 to an exemplary secure node 1706 via an exemplary gateway server 1708 is illustrated in FIG. 17. The transmitted data 1702 passes through a physical interface 1710 into a network stack 1712 in a kernel space 1714 of the gateway server 1708 and to a trusted application 1716 in an application space 1718 of the gateway server. Trusted data is transmitted from trusted application 1716 through a loopback interface of the network stack 1712 to a network security software 1720, a portion of which executes in the kernel space 1714 and a portion in a second application space 1718. The network security software 1720 routes the trusted data across the network 1704 through a pre-authorized encrypted network tunnel 1722 to a physical interface 1724 of the secure node 1706. Once in the secure node 1706, the trusted data is passed through a network stack 1726 in a kernel space 1728 of the secure node 1706 and network security software 1730 and directed to a recipient application 1732 in an application space 1734 of the secure node 1706. The network security software 1720 and the network security software 1730 manage data traffic through the encrypted network tunnel 1722 based on parameters (1736 and 1738, respectively) loaded from encrypted, read-only files (1740 and 1742, respectively) by computer programs (1744 and 1746, respectively). The parameters include, inter alia, shared secret node identification codes for the secure node 1706 and the gateway server 1708, a port number of the network security software 1730, a port number of the recipient application 1732, a process identification code and a process owner code associated with the recipient application 1732, and a data protocol associated with the transmitted data 1702. The encrypted, read-only files (1740 and 1742, respectively) are maintained by security configuration server 1748, which transmits updated encrypted configuration data (1750 and 1752, respectively) through encrypted network tunnels (1754 and 1756, respectively) to file update programs (1758 and 1760, respectively) as shown. In another embodiment, the computer programs (1744 and 1746, respectively) responsible for loading the encrypted, read-only files (1740 and 1742, respectively) may be positioned in the application spaces (1718 and 1734, respectively) rather than the kernel spaces (1714 and 1728, respectively).

Figure 18:
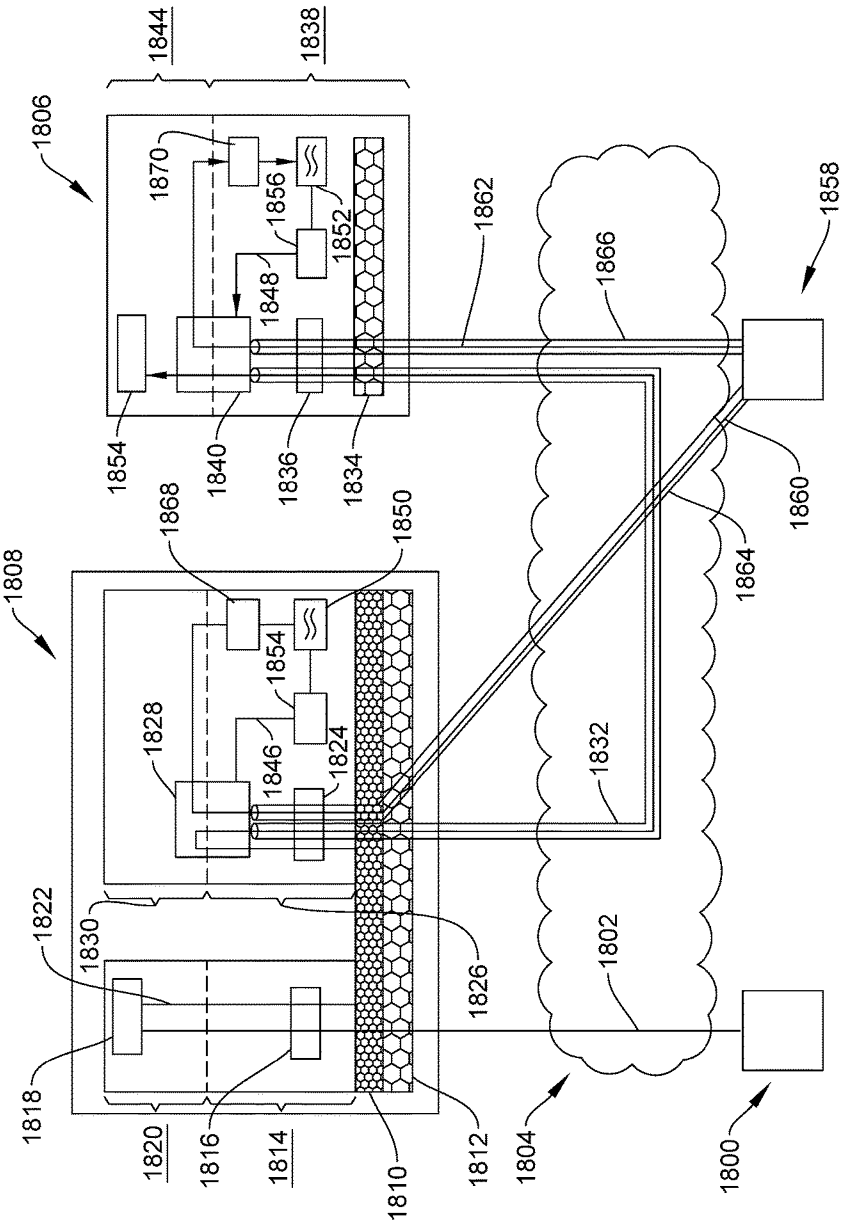
FIG. 18: Schematic view of gateway server comprising separation kernel.
Figure 19A:
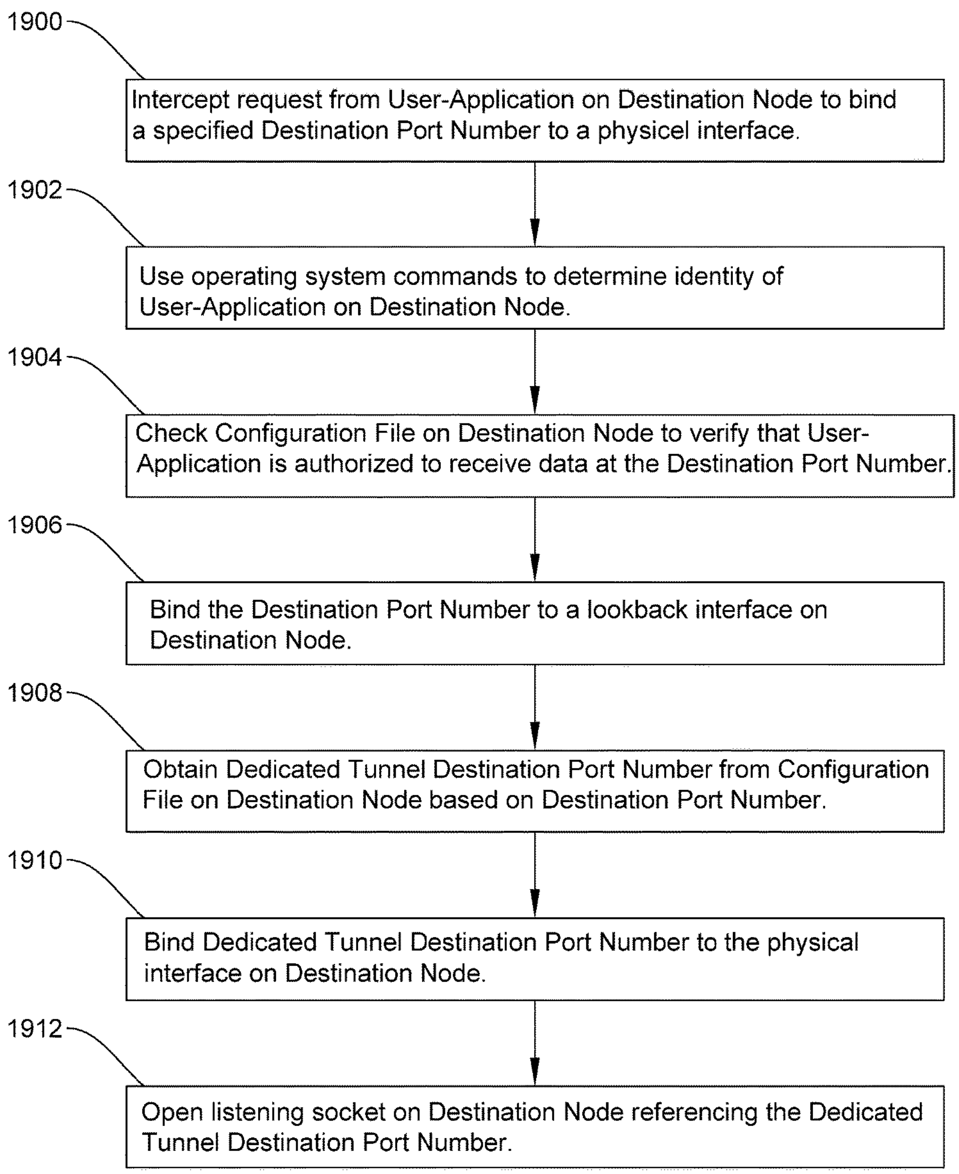
FIGS. 19(A-D): A flow chart illustrating exemplary communication management operations that may be associated with a network system in accordance with certain embodiments disclosed herein.
Figure 19B:
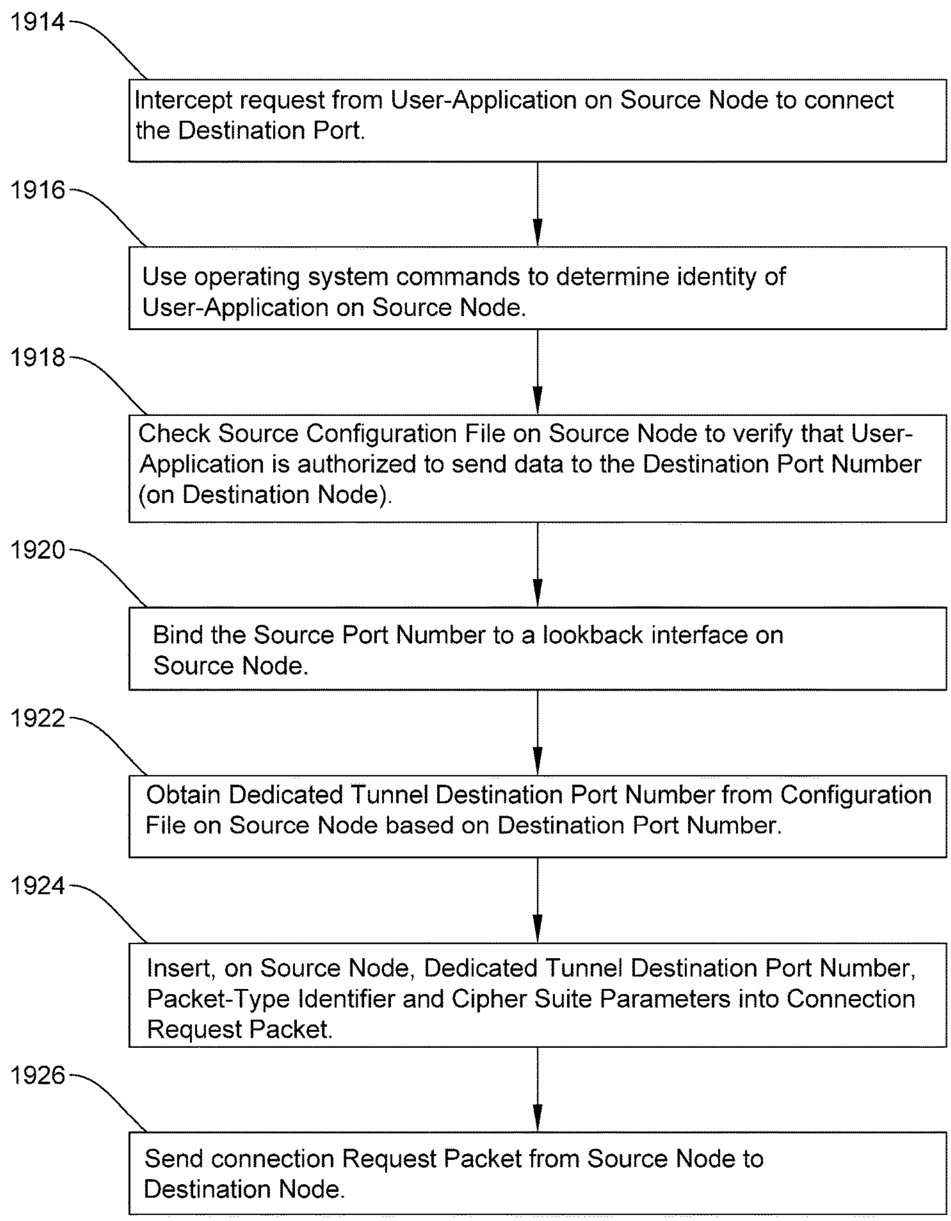
Figure 19C:
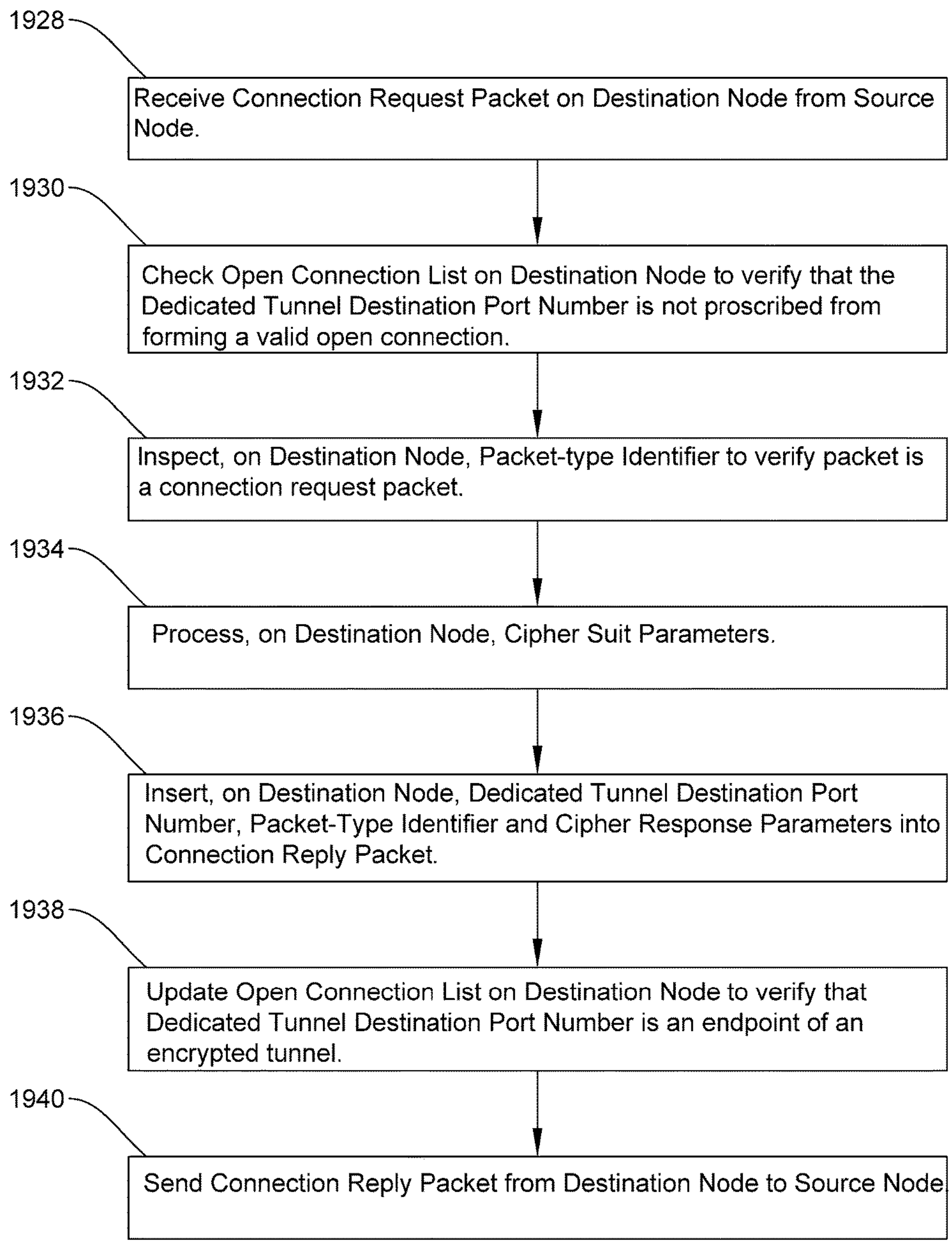
Figure 19D:
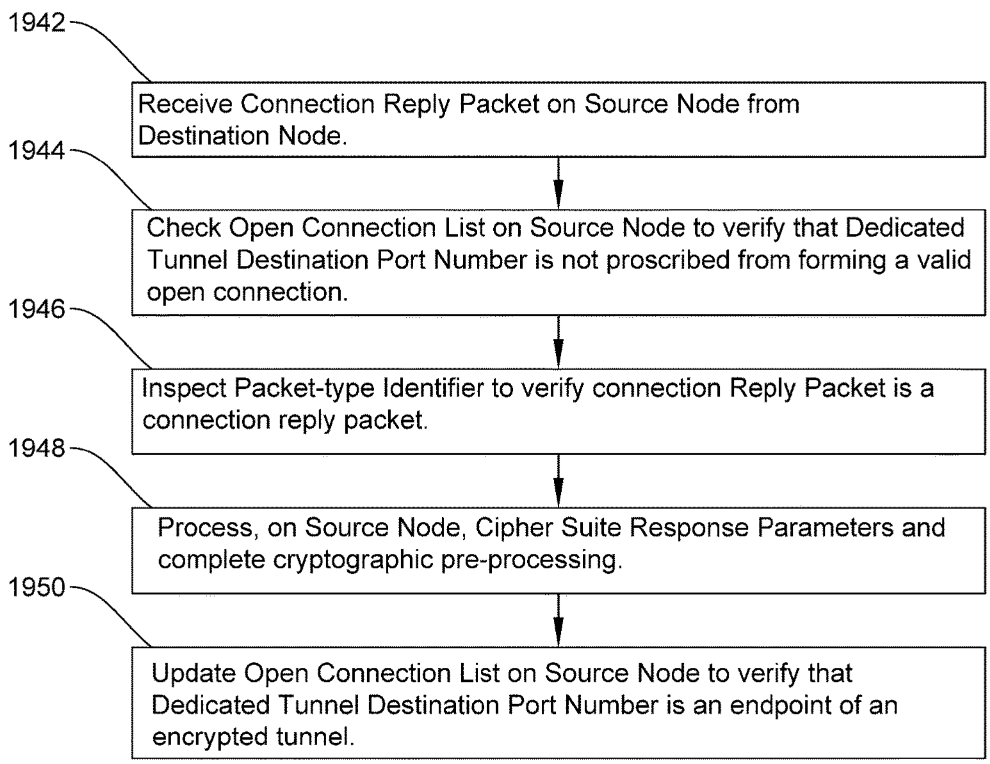
Figure 20A:
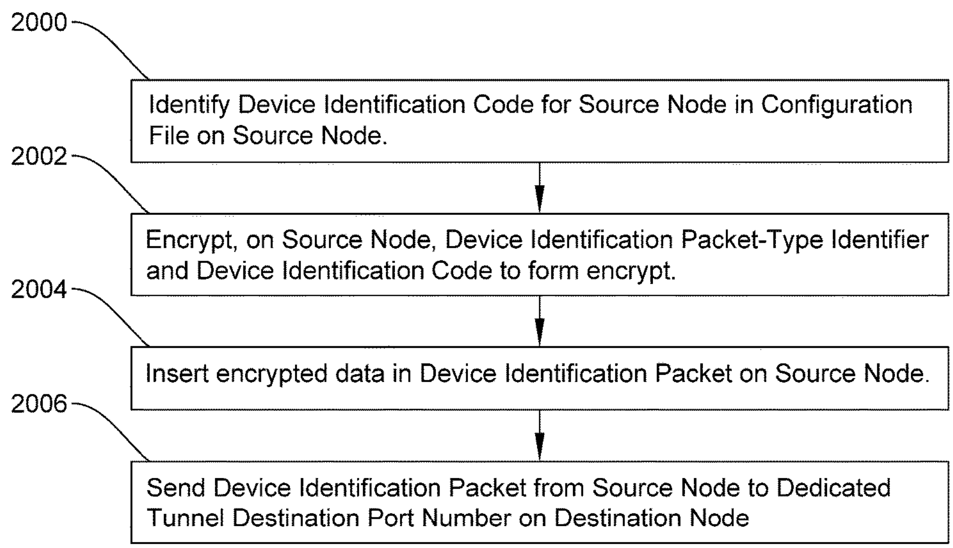
FIGS. 20(A-C): A flow chart illustrating exemplary communication management operations that may be associated with a network system in accordance with certain embodiments disclosed herein.
Figure 20B:
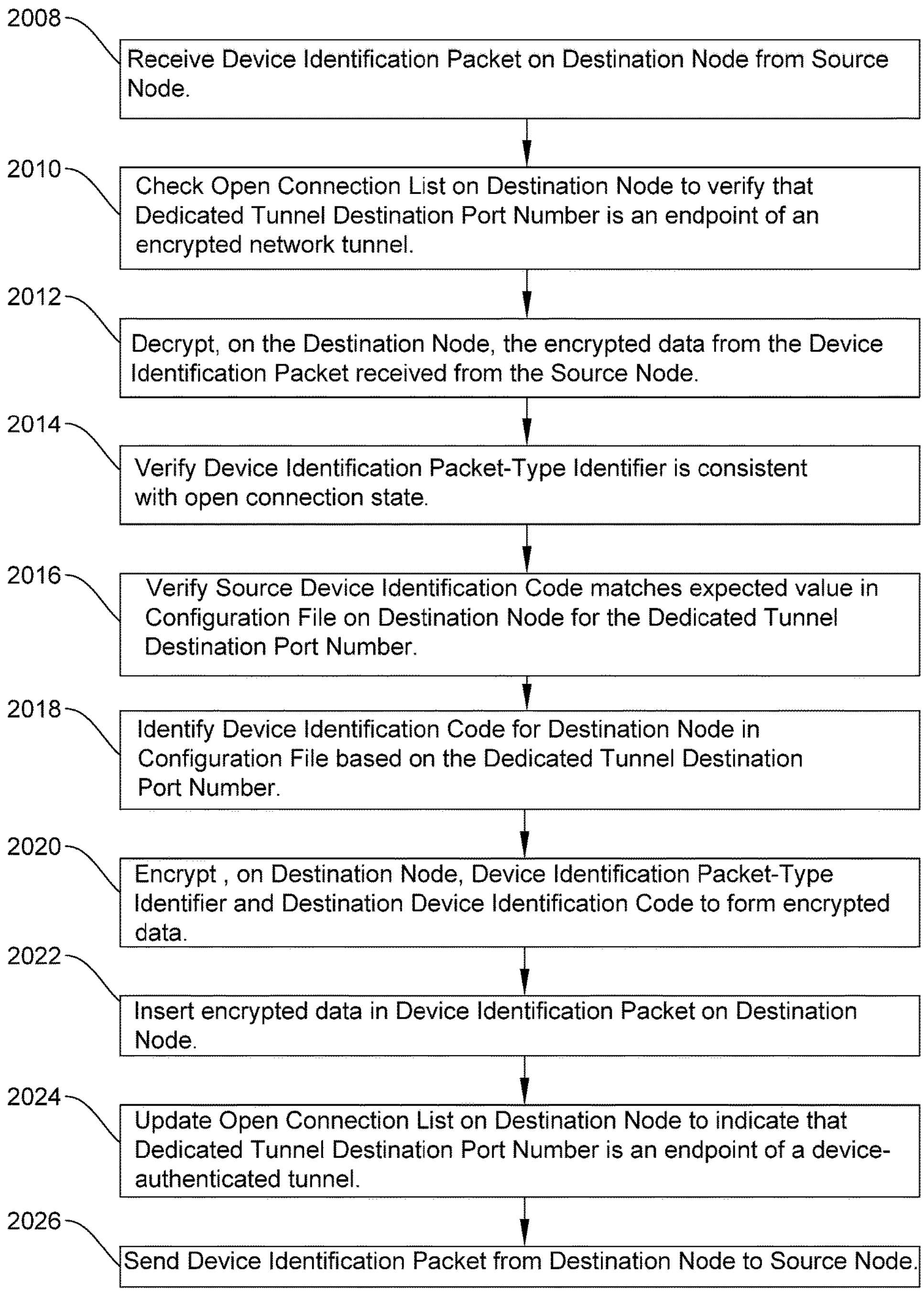
Figure 20C:
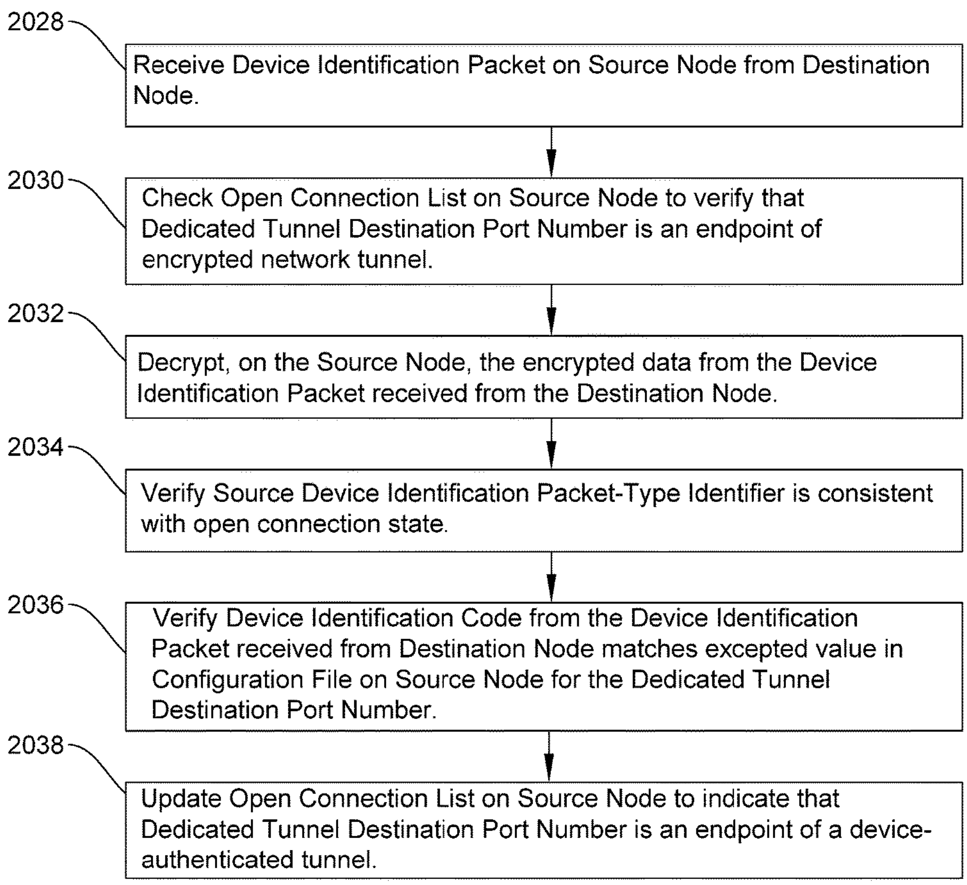
Figure 21A:
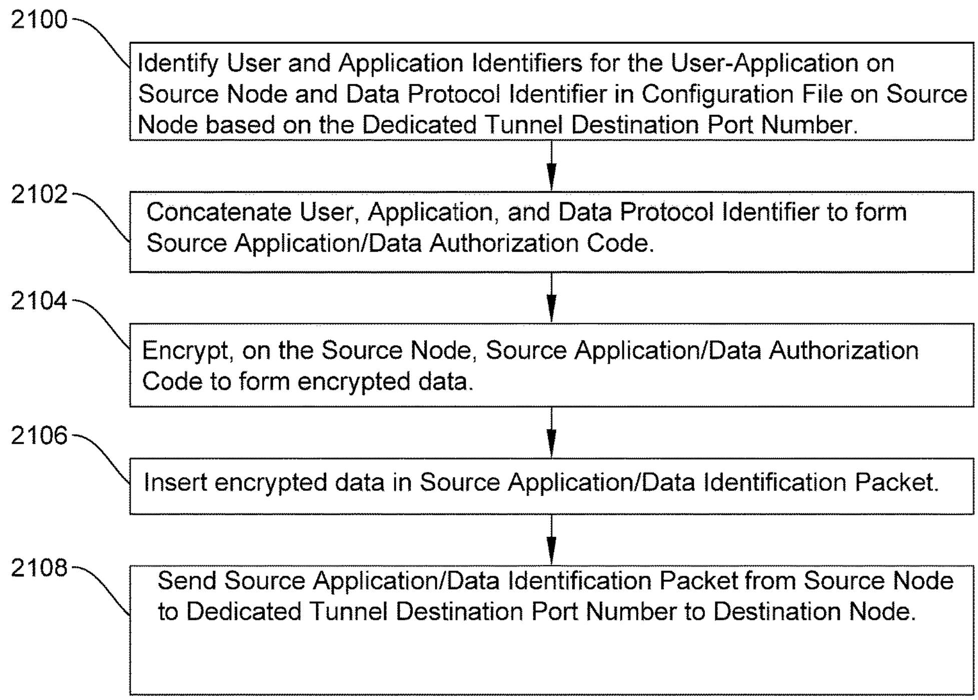
FIGS. 21(A-C): A flow chart illustrating exemplary communication management operations that may be associated with a network system in accordance with certain embodiments disclosed herein.
Figure 21B:
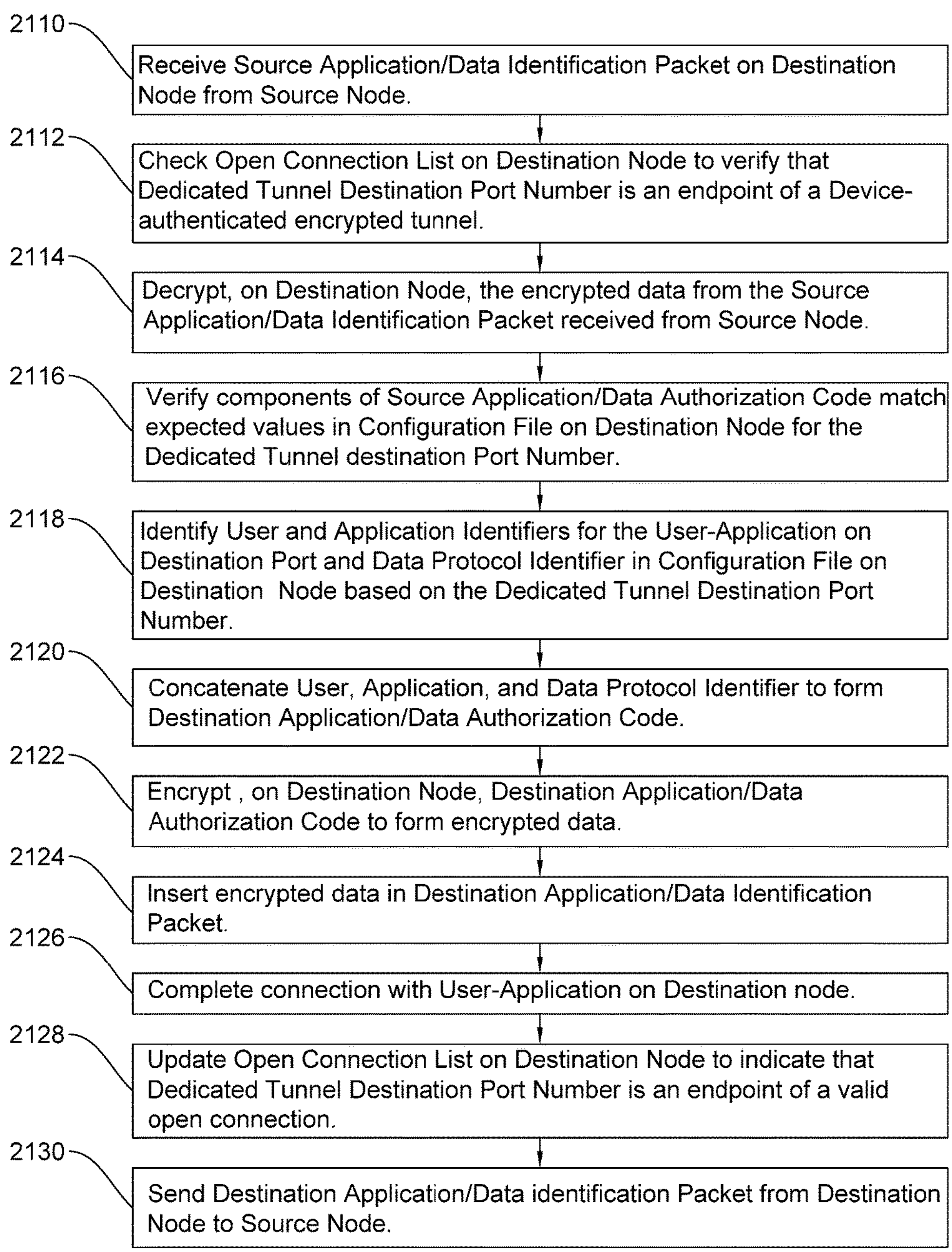
Figure 21C:
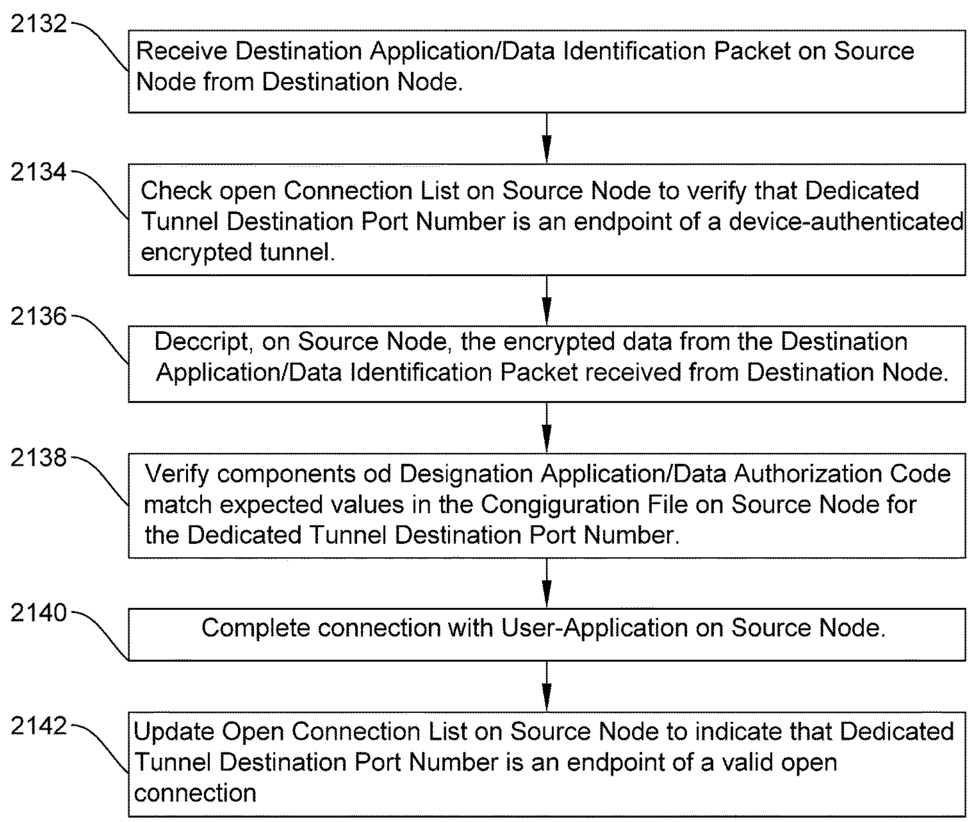
Figure 22A:
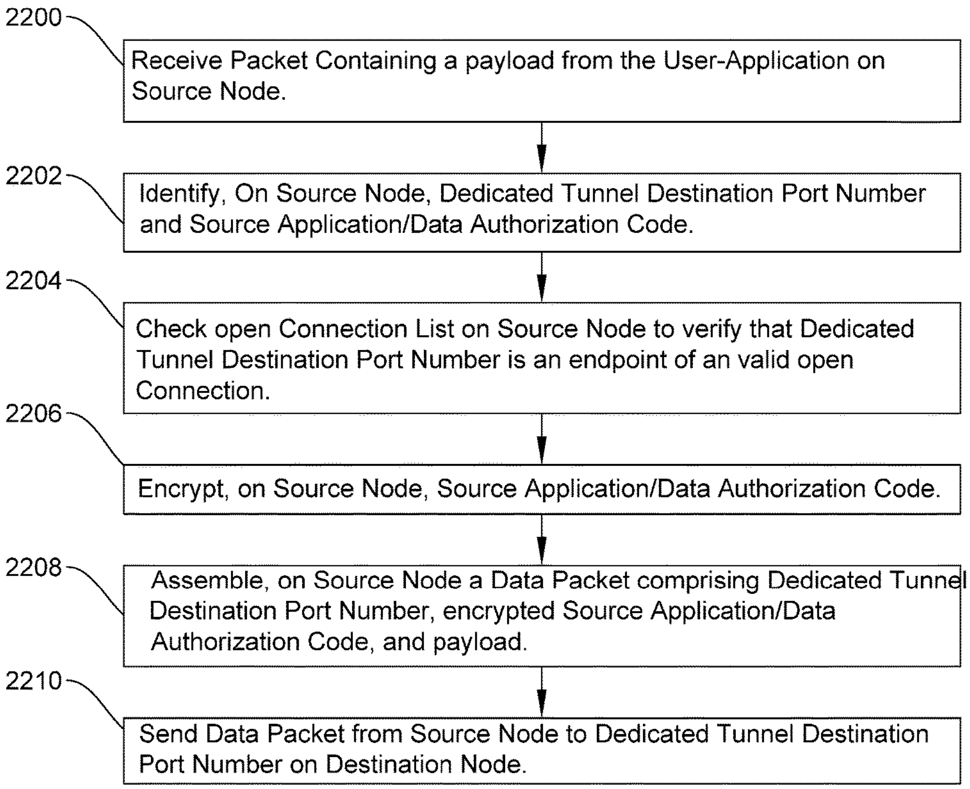
FIGS. 22(A-B): A flow chart illustrating exemplary communication management operations that may be associated with a network system in accordance with certain embodiments disclosed herein.
Figure 22B:
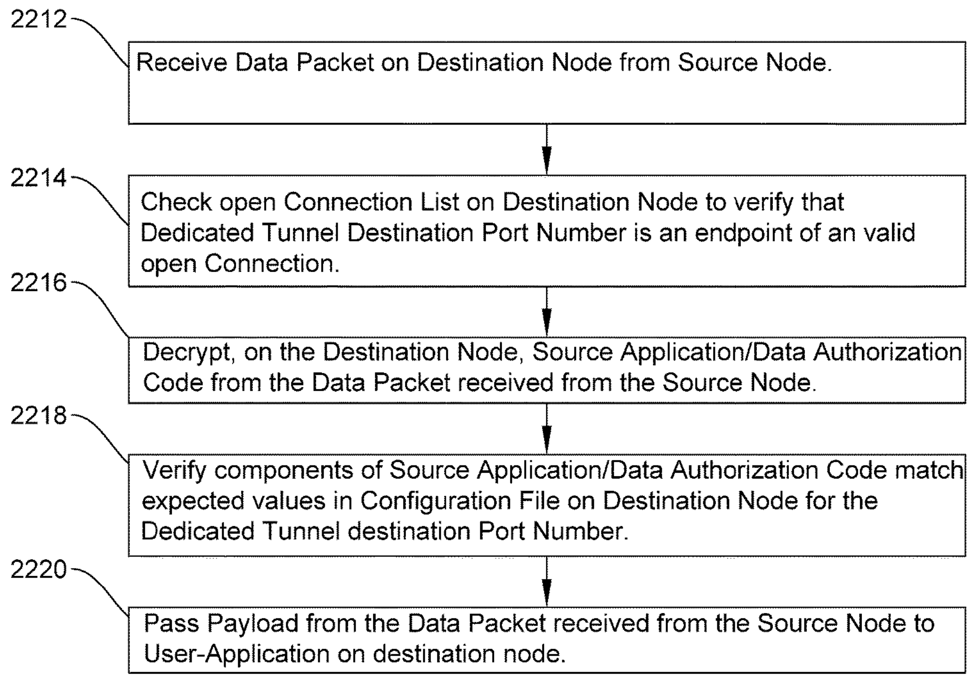

A schematic view of an unsecure node 1800 transmitting data 1802 over a network 1804 to an exemplary secure node 1806 via an exemplary gateway server 1808 executing a separation kernel 1810 is illustrated in FIG. 18. The transmitted data 1802 passes through a physical interface 1812 into a first network stack 1816 of a first kernel space 1814 and to a trusted application 1818 in a first application space 1820. Trusted data 1822 is transmitted from trusted application 1818 through the separation kernel 1810 to a second network stack 1824 in a second kernel space 1826 and network security software 1828, a portion of which executes in the second kernel space 1826 and a portion in a second application space 1830. The network security software 1828 routes the trusted data 1822 across the network 1804 through a pre-authorized encrypted network tunnel 1832 to a physical interface 1834 of the secure node 1806. Once in the secure node 1806, the trusted data 1822 is passed through a network stack 1836 in a kernel space 1838 of the secure node 1806 and network security software 1840 and directed to a recipient application 1842 in an application space 1844 of the secure node 1806. Network security software 1828 and network security software 1840 manage data traffic through the encrypted network tunnel 1832 based on parameters (1846 and 1848, respectively) loaded from encrypted, read-only files (1850 and 1852, respectively) by kernel mode programs (1854 and 1856, respectively). The encrypted, read-only files (1850 and 1852, respectively) are maintained by security configuration server 1858, which transmits updated encrypted configuration data (1860 and 1862, respectively) through encrypted network tunnels (1864 and 1866, respectively) to file update programs (1868 and 1870, respectively) as shown.

Figure 23:
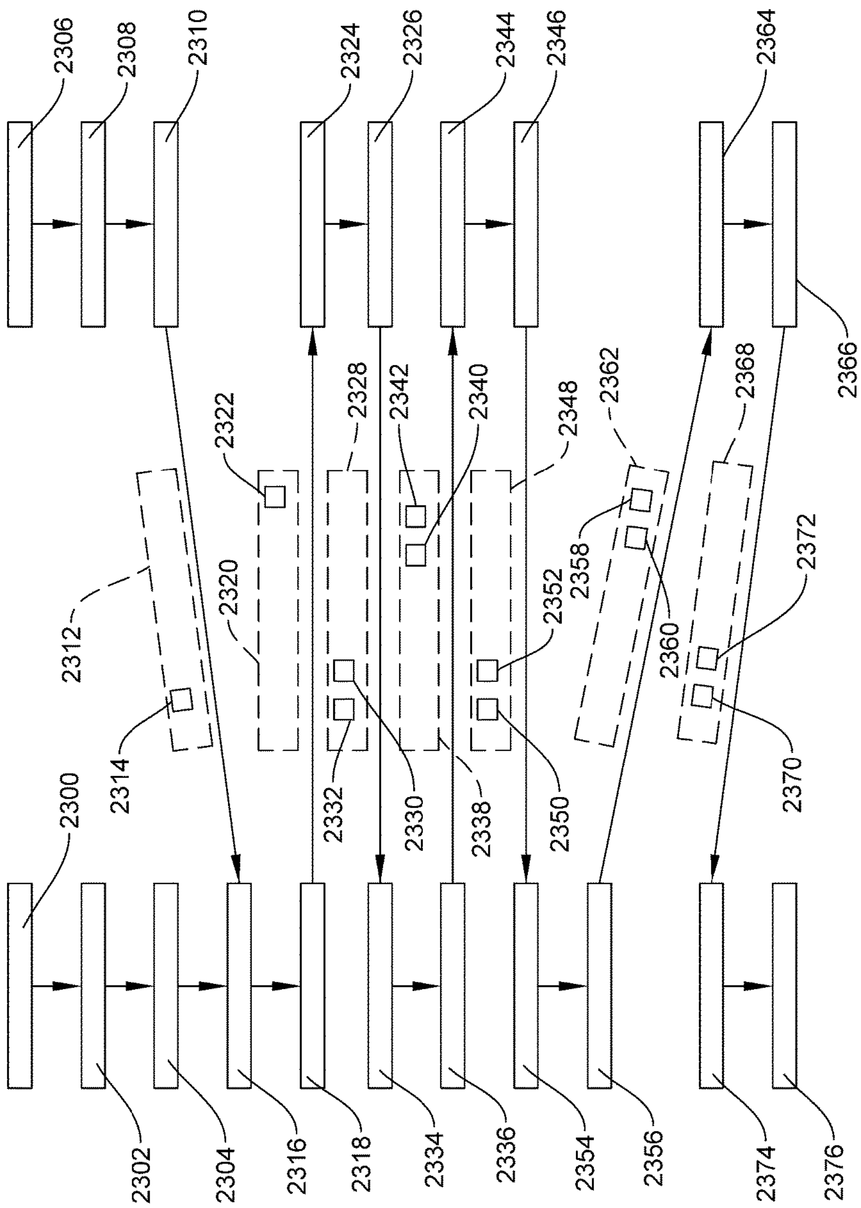
FIG. 23: Flow diagram of secure communication protocol.

FIG. 23 depicts data processing steps according to an exemplary secure communication protocol. A server security middleware detects 2300 a server bind request by a server application to open a port of the server (the "server port") and accesses a server lookup table to validate 2302 the authority of the server to open a port having the port number (the "server port number") assigned to the server port. Following successful validation 2302, the server port is opened and enters 2304 listening mode. A client security middleware detects 2306 a connection request from a client application and accesses a client lookup table to validate 2308 the authority of the client to form a data pathway to the server port. Following successful validation 2308, the client security middleware opens a client port and constructs and transmits 2310 an encrypted tunnel connection request packet 2312, comprising forming client authentication metadata 2314 and inserting the client authentication metadata into the packet 2312, the client authentication metadata comprising a connection state code. The connection state code is configured to be interpreted by the server security middleware that formation of an encrypted tunnel between the client security middleware and the server security middleware is in process. The destination port of the connection request packet 2312 is obtained from the client lookup table based on the server port number, and may be the same or different from the server port number. Upon receipt of the connection request packet 2312 at the server port, the server security middleware inspects 2316 the metadata 2314 and confirms 2316 the connection state. Following the inspecting and confirming 2316, the server security middleware constructs and transmits 2318 an encrypted tunnel reply packet 2320, comprising forming server authentication metadata 2322 and inserting the server authentication metadata into the packet 2320, the server authentication metadata comprising a connection state code. Upon receipt of the reply packet 2320, the client security middleware inspects 2324 the metadata 2322 and confirms 2324 that the connection state code matches an expected connection state (i.e., that formation of an encrypted tunnel between the client security middleware and the server security middleware is in process). Further steps are taken to complete formation of the encrypted tunnel between the client security middleware and the server security middleware, and upon completion both the client security middleware and the server security middleware note that the encrypted tunnel has been formed. Following the comparing and confirming 2324 and formation of the encrypted tunnel, the client security middleware constructs and transmits 2326 a client node identification packet 2328, comprising obtaining a client node identification code from the client lookup table, encrypting the client node identification code and a connection state code, and inserting the encrypted client node identification code 2330 and the encrypted connection state code 2332 (the connection state code indicating that the client and server are authenticating and authorizing one another following establishment of the encrypted network tunnel) into the client node identification packet 2328. Upon receipt of the client node identification packet 2328 at the server, the server security middleware verifies 2334 that the client node identification code is uniquely assigned to the data pathway, comprising successfully decrypting the encrypted client node identification code 2330 and the connection state code 2332 and verifying that the decrypted client node identification code matches an expected value in the server lookup table for the destination port number of the packet. Following the verification 2334, the server security middleware constructs and transmits 2336 a server node identification packet 2338, comprising obtaining a server node identification code from the server lookup table, encrypting the server node identification code and a connection state code (the connection state code indicating that the client and server are authenticating and authorizing data protocol transmitted over the data pathway as well as users and applications that are parties to the data pathway following establishment of the encrypted network tunnel), and inserting the encrypted server node identification code 2340 and the encrypted connection state code 2342 into the server node identification packet 2338. Upon receipt of the server node identification packet 2338 at the client, the client security middleware verifies 2344 that the server node identification code is uniquely assigned to the data pathway, comprising successfully decrypting the encrypted server node identification code 2340 and the connection state code 2342 and verifying that the decrypted server node identification code matches an expected value in the client lookup table. Following the verification 2344, the client security middleware constructs and transmits 2346 a client authorization packet 2348, comprising obtaining client authentication metadata from the client lookup table, encrypting the client authentication metadata and a connection state code, and inserting the encrypted client authentication metadata 2350 and the connection state code 2352 into the client authorization packet 2348, the client authentication metadata comprising a client identifier, a user identifier, and a data protocol descriptor obtained from the client lookup table. Upon receipt of the client authorization packet 2348 at the server, the server security middleware verifies 2354 that the server application is authorized to form a data pathway to receive data from the client application, comprising decrypting the encrypted client authentication metadata 2350 and verifying that the decrypted client authentication metadata matches an expected value in the server lookup table for the data pathway as determined from the server lookup table based on the destination port number of the packet. Following the verification 2354, the server security middleware constructs and transmits 2356 a server authorization packet 2362, comprising obtaining server authentication metadata from the server lookup table, encrypting the server authentication metadata and a connection state code, and inserting the connection state code 2358 and the encrypted server authentication metadata 2360 into the server authorization packet 2362, the server authentication metadata comprising a server identifier, a user identifier, and a data protocol descriptor obtained from the client lookup table. Upon receipt of the server authorization packet 2362 at the client security middleware, the client security middleware verifies 2364 that the client port is authorized to form a data pathway with the server port, comprising decrypting the encrypted server authentication metadata 2360 and verifying that the decrypted server authentication metadata matches an expected value in the server lookup table. Following the verification 2364, the server and the client note that an open connection state exists for transfer of data between the client security middleware and the server security middleware, and the client application transmits data to the client security middleware, and the client security middleware constructs and transmits 2366 a client data packet 2368 to the server, comprising encrypting client authentication metadata and data, and inserting the encrypted client authentication metadata 2370 and encrypted data 2372 into the client data packet 2368. Following receipt of the client data packet 2368 at the server, the server security middleware verifies 2374 that the data is authorized to be received by the server application, comprising successfully decrypting the encrypted client authentication metadata 2370 and verifying that the decrypted client authentication metadata matches an expected value in the server lookup table based on the server port number. Upon verification 2374, the server security middleware transmits 2376 unencrypted data to the server port.

Figure 25:
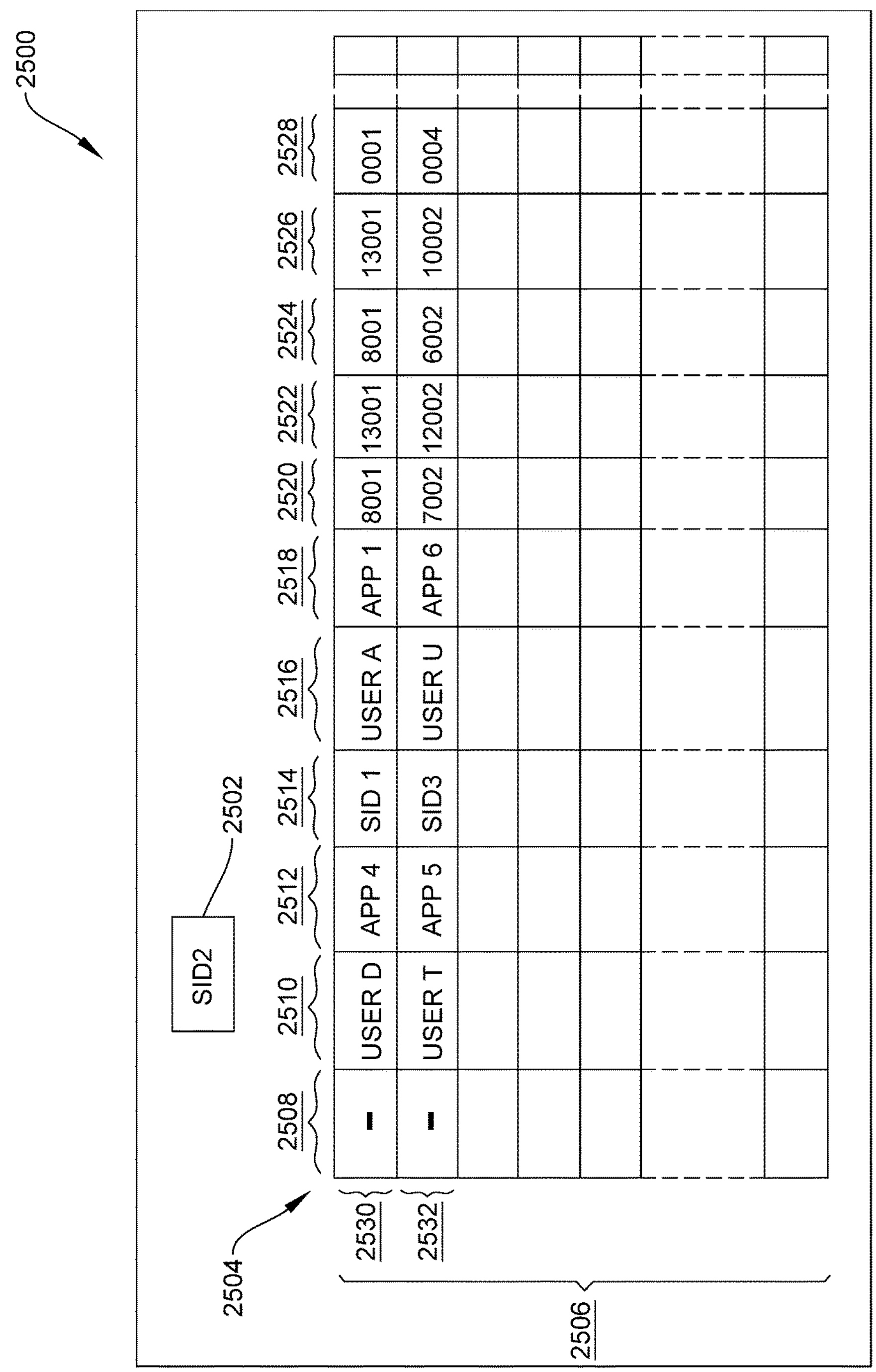
FIG. 25: Schematic view of second node having network configuration second data structure.

A schematic view of a network configuration first node identifier 2402 and first data structure 2404 stored in a non-transitory computer-readable storage medium (for example a nonvolatile memory) on a first node 2400 is depicted and a network configuration second node identifier 2502 and second data structure 2504 stored in a non-transitory computer-readable storage medium (for example a nonvolatile memory) on a second node 2500 is depicted in FIGS. 24 & 25. The data structures comprise records 2406 and 2506, each record composed of several fields that are interpreted by network security middleware to define authorized network connections. Optional first fields 2408 and 2508 contain identifiers for a network interface controller(s) of the first node and the second node, respectively. Second fields 2410 and 2510 contain identifiers for application process owners of the first node and the second node, respectively. Third fields 2412 and 2512 contain identifiers for application processes (corresponding to the respective application process owner identifiers) of the first node and the second node, respectively. Fourth fields 2414 and 2514 contain remote node identifiers (for example field 2414 might contain the second node identifier). Fifth fields 2416 and 2516 contain identifiers for remote application process owners. Sixth fields 2418 and 2518 contain identifiers for remote application processes (for example 2416 and 2418 might contain a process owner identifier and an application process identifier for a process on the second node). Optional seventh fields 2420 and 2520 contain port number identifiers for corresponding application processes of the first node and the second node, respectively. As shown, the field may be blank, for example if a local port is dynamically assigned following a connection request. Optional eighth fields 2422 and 2522 contain tunnel port number identifiers for network security software of the first node and network security software of the second node, respectively. As shown, the field may be blank, for example if a local port is dynamically assigned following a connection request. Ninth fields 2424 and 2524 contain port number identifiers for a server application process. The server application process port number identifier may correspond, as the case may be, to either the local application process specified in fields 2410 and 2412 (or 2510 and 2512) on the first node or second node, respectively, or may correspond to a remote application process to which a connection may be formed. Tenth fields 2426 and 2526 contain tunnel port number identifiers for network security software in communication with (and on the same node as) the server application process. The first node 2400 is a source or a destination node for communication of packet data and/or a data stream (and hosts a client or a server) in each of the records present in data structure 2404 (likewise, the second node is a source or a destination node for communication of packet data and/or a data stream in each of the records present in data structure 2504). The first record 2430 of the first node 2400, for example, is used by first network security software on the first node 2400 to configure a connection from the first node (having a node identifier 2402 "SID 1") to transmit data having data type "0001" from client application process "APP 1" having process owner "USER A" via port "7001" to port "8001" associated with server application process "APP 4" having process owner "USER D" on the second node (having node identifier 2502 "SID2"). Once a connection is formed, the client application process port "7001" is in communication via a loopback interface to first network security software present on the first node 2500, and said first network security software having opened a port "12001" which is bound to interface "NIC 001". The first network security software has a further connection to port 13001 associated with second network security software on the second node 2500 (having second node identifier 2502 "SID2"). The second network security software at port "12001" is in communication via a loopback interface to process application "APP 4" at port "8001" on the second node 2500. On the second node 2500, the first record 2530 corresponds to the first record 2430 of the first node 2400 because the local process and process owner identifiers (2512 and 2510) match the remote process and process owner identifiers (2418 and 2416) on the first node 2400 and because the destination port fields match (2424 and 2426 match 2524 and 2526, respectively). Records 2432 and 2434 illustrate a scenario in which a common application "APP 2" can be used by two processes (the two processes owned by "USER A" and "USER B", respectively) on the first node 2400, which are configured to form connections to communicate data with remote processes (application "APP 4" having owner "USER D" on the second node 2500 and "APP 5" having owner "USER F" on a third node (not shown) having an identifier "SID3"). The second record 2532 of the second node 2500 illustrates a scenario in which a process running application "APP 5" having a process owner "USER T" on the second node 2500 is configured to forms a connection to communicate data with a process running application "APP 6" having process owner "USER U" on the third node (not shown).

In addition to the fields 2408-2428 and the fields 2508-2528, in certain embodiments, for example, the data structures 2404 and/or 2504 may contain additional fields. In certain embodiments, for example, the data structure 2404 may be divided among two or more files (for example two files, three files, or four files). In certain embodiments, for example, the data structure 2504 may be divided among two or more files (for example two files, three files, or four files). The ordering of fields 2408-2428 and the ordering of fields 2508-2528 is a non-limiting example comprising certain embodiments of the present disclosure. Certain embodiments may comprise, for example, any of the other orderings which may be generated by permuting the orderings of fields 2408-2428 and/or the orderings of fields 2508-2528, or a subset or all of the orderings which may be generated by permuting the orderings of fields 2408-2428 and/or the orderings of fields 2508-2528.

Figure 26:
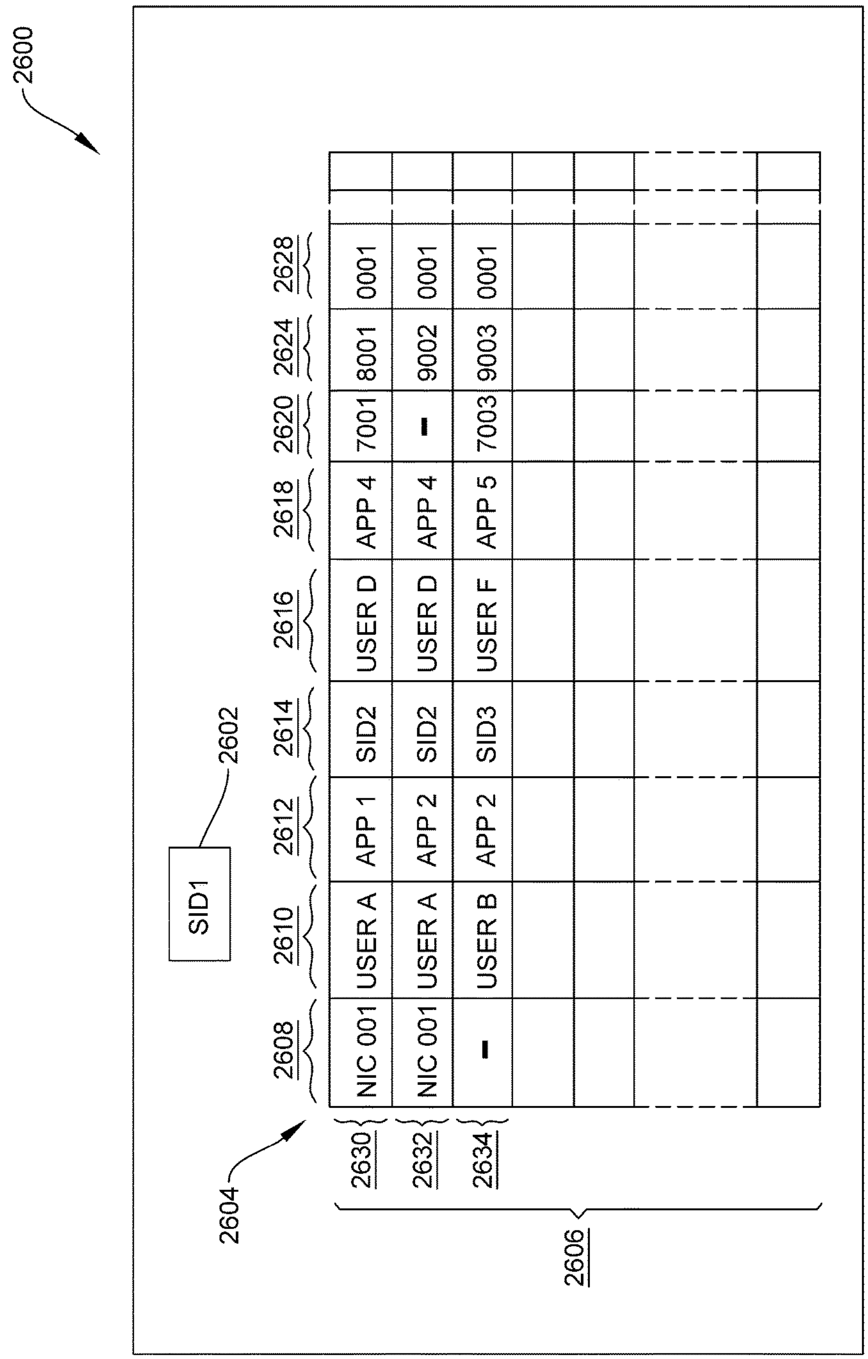
FIG. 26: Schematic view of first node having network configuration third data structure.
Figure 27:
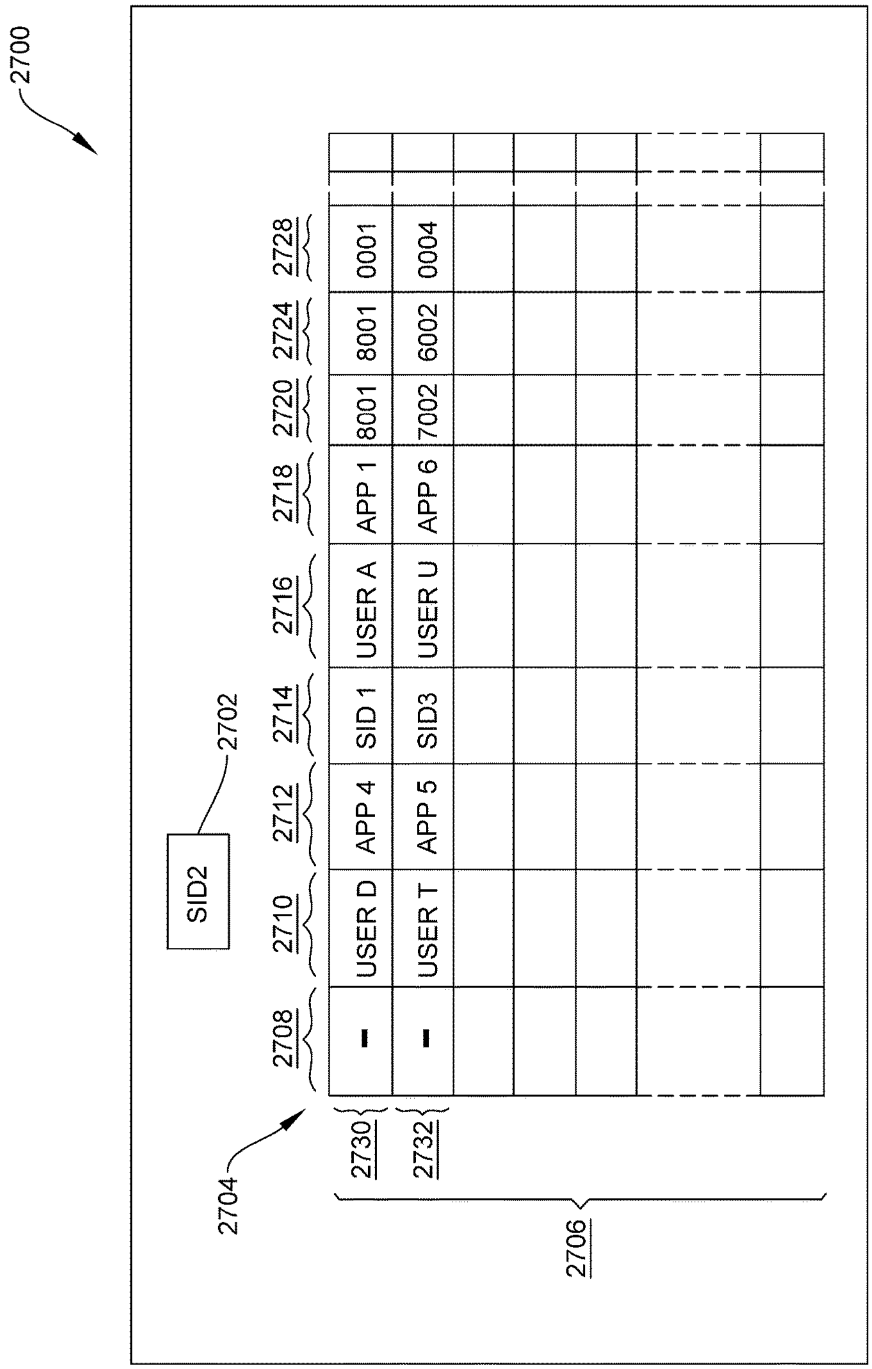
FIG. 27: Schematic view of second node having network configuration fourth data structure.
Figure 29:
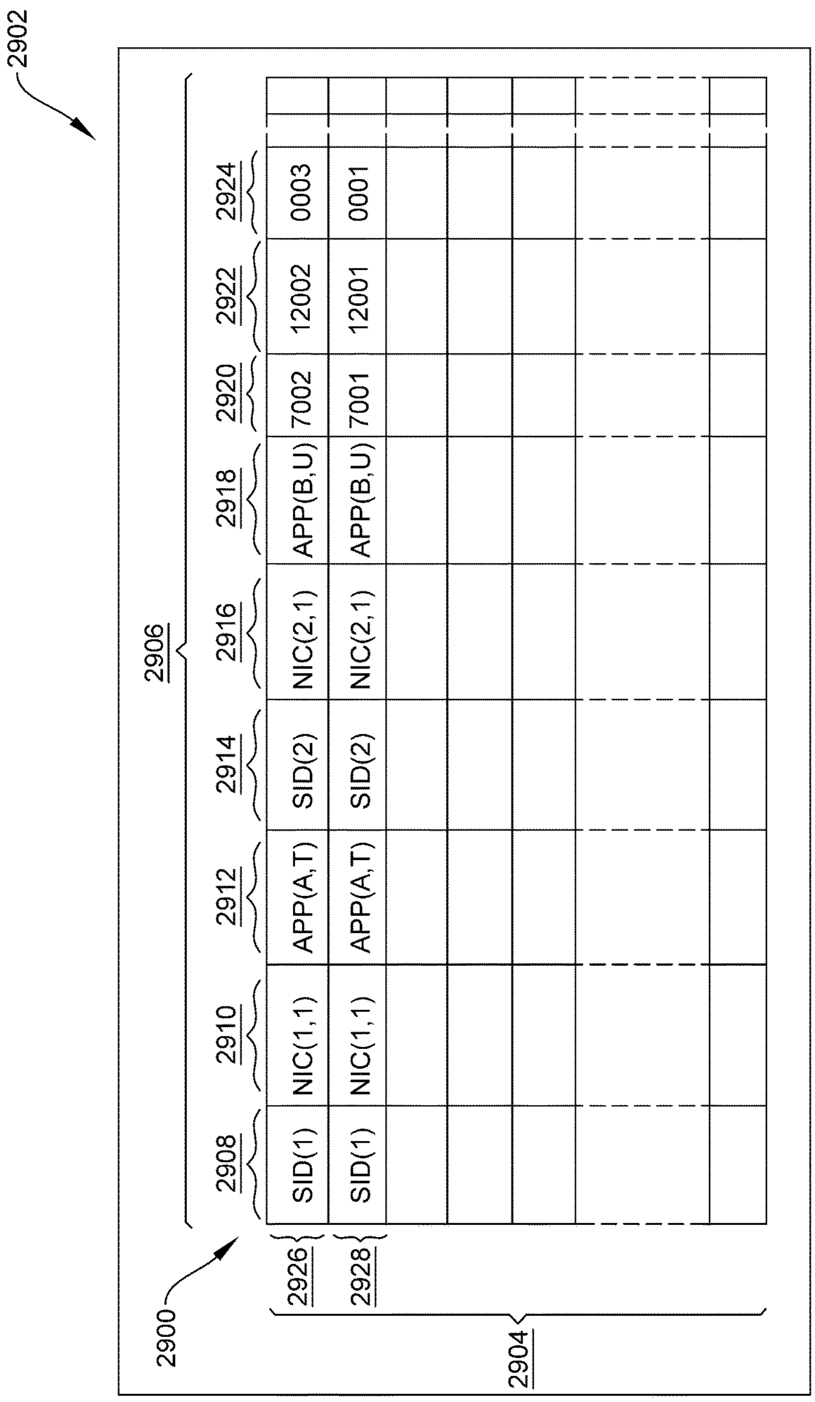
FIG. 29: Schematic view of second node having network configuration sixth data structure.

A schematic view of a network configuration first node identifier 2602 and third data structure 2604 stored in a non-transitory computer-readable storage medium (for example a nonvolatile memory) on a first node 2600 is depicted and a network configuration second node identifier 2702 and fourth data structure 2704 stored in a non-transitory computer-readable storage medium (for example a nonvolatile memory) on a second node 2700 is depicted in FIGS. 26 & 27. The data structures comprise records 2606 and 2706, each record composed of several fields that are interpreted by network security middleware to define authorized network connections. Optional first fields 2608 and 2708 contain identifiers for a network interface controller(s) of the first node and the second node, respectively. Second fields 2610 and 2710 contain identifiers for application process owners of the first node and the second node, respectively. Third fields 2612 and 2712 contain identifiers for application processes (corresponding to the respective application process owner identifiers) of the first node and the second node, respectively. Fourth fields 2614 and 2714 contain remote node identifiers (for example field 2614 might contain the second node identifier). Fifth fields 2616 and 2716 contain identifiers for remote application process owners. Sixth fields 2618 and 2718 contain identifiers for remote application processes (for example 2616 and 2618 might contain a process owner identifier and an application process identifier for a process on the second node). Optional seventh fields 2620 and 2720 contain port number identifiers for corresponding application processes of the first node and the second node, respectively. As shown, the field may be blank, for example if a local port is dynamically assigned following a connection request. Eighth fields 2624 and 2724 contain port number identifiers for a server application process. The server application process port number identifier may correspond, as the case may be, to either the local application process specified in fields 2610 and 2612 (or 2710 and 2712) on the first node or second node, respectively, or may correspond to a remote application process to which a connection may be formed. The first node 2600 is a source or a destination node for communication of packet data and/or a data stream (and hosts a client or a server) in each of the records present in data structure 2604 (likewise, the second node is a source or a destination node for communication of packet data and/or a data stream in each of the records present in data structure 2704). The first record 2630 of the first node 2600, for example, is used by first network security software on the first node 2600 to configure a connection from the first node (having a node identifier 2602 "SID 1") to transmit data having data type "0001" from client application process "APP 1" having process owner "USER A" via port "7001" (bound to "NIC 001") to port "8001" associated with server application process "APP 4" having process owner "USER D" on the second node (having node identifier 2702 "SID2"). Once a connection is formed, packet data from the client application process port "7001" is received by first network security software present on the first node 2700, which performs first network security functions followed by releasing the packet data for transmission to the second node 2700 where it is received by second network security software. The second network security software performs second network security functions and releases the packet to its destination of port "8001" associated with a process running application "APP 4" having process owner "USER D". On the second node 2700, the first record 2730 corresponds to the first record 2630 of the first node 2600 because the local process and process owner identifiers (2712 and 2710) match the remote process and process owner identifiers (2618 and 2616) on the first node 2600 and because the destination port fields match (2624 matches 2724). Records 2632 and 2634 illustrate a scenario in which a common application "APP 2" can be used by two processes (the two processes owned by "USER A" and "USER B", respectively) on the first node 2600, which are configured to form connections to communicate data with remote processes (application "APP 4" having owner "USER D" on the second node 2700 and "APP 5" having owner "USER F" on a third node (not shown) having an identifier "SID3"). The second record 2732 of the second node 2700 illustrates a scenario in which a process running application "APP 5" having a process owner "USER T" on the second node 2700 is configured to forms a connection to communicate data with a process running application "APP 6" having process owner "USER U" on the third node (not shown). In addition to the fields 2608-2628 and the fields 2708-2728, in certain embodiments, for example, the data structures 2604 and 2704 may contain additional fields. In certain embodiments, for example, the data structure 2604 may be divided among two or more files (for example two files, three files, or four files). In certain embodiments, for example, the data structure 2704 may be divided among two or more files (for example two files, three files, or four files). The ordering of fields 2608-2628 and the ordering of fields 2708-2728 is a non-limiting example comprising certain embodiments of the present disclosure. Certain embodiments may comprise, for example, any of the other orderings which may be generated by permuting the orderings of fields 2608-2628 and/or the orderings of fields 2708-2728, or a subset or all of the orderings which may be generated by permuting the orderings of fields 2608-2628 and/or the orderings of fields 2708-2728.

A schematic view of a network configuration fifth data structure 2800 stored in a non-transitory computer-readable storage medium (for example a nonvolatile memory) on a first node 2802 is depicted and a network configuration sixth data structure 2900 stored in a non-transitory computer-readable storage medium (for example a nonvolatile memory) on a second node 2802 is depicted in FIGS. 28 &

29. The data structures comprise records 2804 and 2904, each record composed of several fields 2806 and 2906 that are interpreted by network security middleware to define authorized network connections. First fields 2808 and 2908 contain node identification codes for a source node (i.e., a node having a resident application that is configured to send data to a different application that is resident on a destination node via a network). Second fields 2810 and 2910 contain codes for a network interface controller of the source node, processor, or computing device. Third fields 2812 and 2912 contain unique identifiers for the application configured to send data, the unique identifiers comprising an application code and a user code (for example an application code and a user code obtained from a process status check). Fourth fields 2814 and 2914 contain node identification codes for destination nodes (i.e., nodes having a resident application configured to receive data from an application resident on a source node via a network). Fifth fields 2816 and 2916 contain codes for network interface controllers of the destination node, processor, or computing device. Sixth fields 2818 and 2918 contain unique identifiers for applications configured to receive data, each unique identifier comprising an application code and a user code (for example an application code and a user code obtained from a process status check). Seventh fields 2820 and 2920 contain destination port numbers for the applications configured to receive data. Eighth fields 2822 and 2922 contain port numbers for network security software present on the destination nodes. Ninth fields 2824 and 2924 contain descriptors for authorized data protocol for the connection. The first node is a source or a destination node in each of the records present in data structure 2800 (likewise, the second node is a source or a destination node in each of the records present in data structure 2900). For example, in a first record 2826, the source node identification code is the node identification for the first node (designated "SID(1)"), the source network interface controller code is a code for an interface "2" on the source node (designated "NIC(1,2)"), and the source application identifier names an application "A" resident on the first node and user "T" (designated "APP(A,T)"). The first record 2826 defines a connection for transmitting data having an authorized data protocol descriptor "0001" from application "A" having user "T" on the first node to a destination at the second node, specifically a destination application "B" having a user "U" and a destination port having a port number "7001" via a network tunnel having a port number "12001" (i.e., network security middleware present on the second node will be associated with a port having a port number "12001", the port forming a destination endpoint of the network tunnel). In order for the connection to form between the first node and the second node, the data structure 2900 must contain an identical entry 2926—otherwise network security middleware present on the first node and/or the second node will prevent formation of the connection. In addition, the source application identifier of each data packet is verified by network security middleware present on the source node and included as metadata in each network packet transmitted over the network tunnel to the destination node, processor, or computing device. Any network packet containing inconsistent application and/or user information will be dropped by network security middleware resident on the destination node before being transmitted to the destination application. In addition, the network security middleware resident on the destination node will terminate the connection if more than a threshold number erroneous packets is detected. A second record 2828 of the first data structure illustrates a case where an application "D" and user "T" resident on the first node are configured to receive data having a protocol descriptor "0002" at an associated port having a port number "8001" via a tunnel port having a port number "13001" (i.e., port number "13001" is associated with or assigned to security middleware resident on the first node) from an application "C" and user "V" resident on a third node (not shown). It is noted that each tunnel port and each destination port are dedicated to a single connection—i.e., the same ports may not be used for different connections even if data is being transmitted between the same applications/users. For example, a third record 2830 (and a matching record 2928 present in the second data structure) differs from the first record only due to a difference in the protocol of the data transmitted, requiring different port numbers as shown.

In addition to the fields 2808-2824 and the fields 2908-2924, in certain embodiments, for example, the data structures 2804 and 2904 may contain additional fields. In certain embodiments, for example, the data structure 2804 may be divided among two or more files (for example two files, three files, or four files). In certain embodiments, for example, the data structure 2904 may be divided among two or more files (for example two files, three files, or four files). The ordering of fields 2808-2824 and the ordering of fields 2908-2924 is a non-limiting example comprising certain embodiments of the present disclosure. Certain embodiments may comprise, for example, any of the other orderings which may be generated by permuting the orderings of fields 2808-2824 and/or the orderings of fields 2908-2924, or a subset or all of the orderings which may be generated by permuting the orderings of fields 2808-2824 and/or the orderings of fields 2908-2924.

Figure 31:
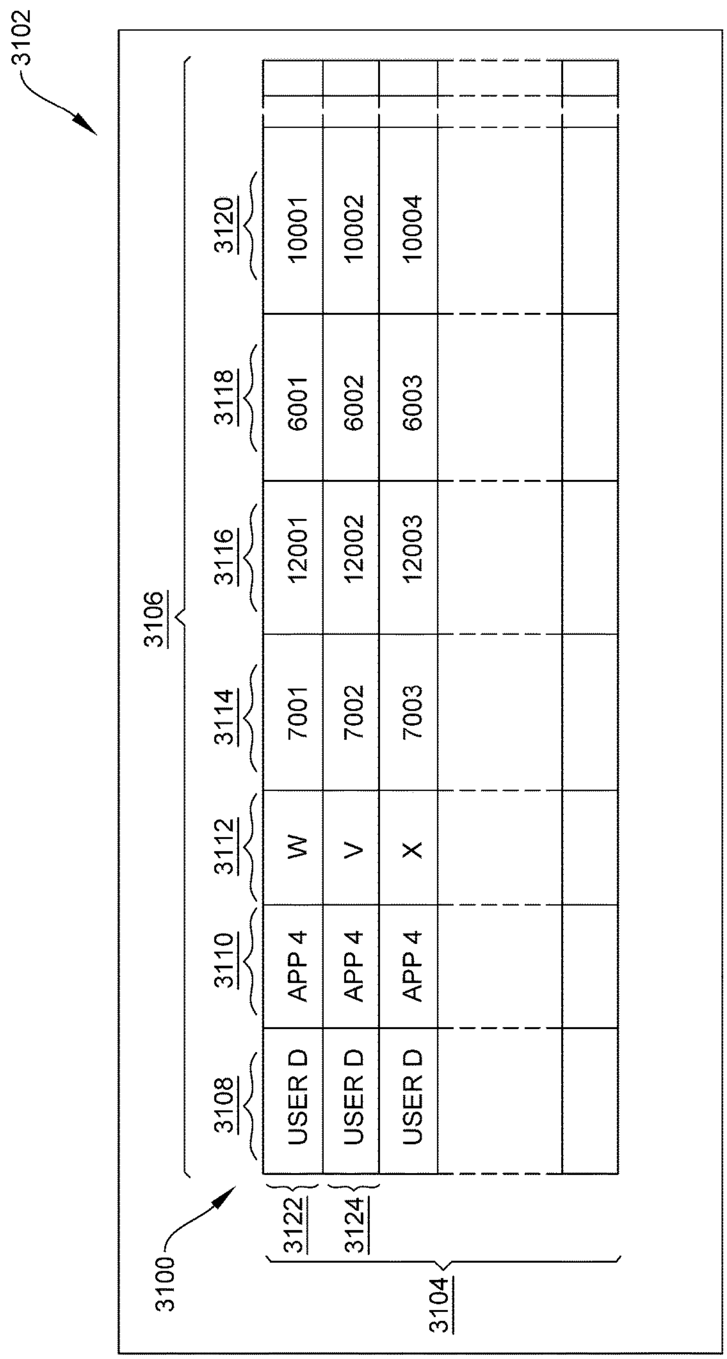
FIG. 31: Schematic view of second node having network configuration eighth data structure.

A schematic view of a network configuration seventh data structure 3000 stored in a non-transitory computer-readable storage medium (for example a nonvolatile memory) on a first node 3002 is depicted and a network configuration eighth data structure 3100 stored in a non-transitory computer-readable storage medium (for example a nonvolatile memory) on a second node 3102 is depicted in FIGS. 30 & 31. The data structures comprise records 3004 and 3104, each record composed of several fields 3006 and 3106 that are interpreted by network security middleware to define authorized network connections. First fields 3008 and 3108 contain an identifier for a user of an application. Second fields 3010 and 3110 contains an identifier for the application. Third fields 3012 and 3112 contain a descriptor for an authorized data protocol for the connection. Fourth fields 3014 and 3114 contain a port number for a local application. Fifth fields 3016 and 3116 contain a port number for local network security middleware. Sixth fields 3018 and 3118 contain a port number for a remote application. Seventh fields 3020 and 3120 contain a port number for remote network security middleware. Each record in the seventh data structure 3000 is a unique n-tuple and likewise in the eighth data structure 3100. Furthermore, the fourth field 3014 and the fifth field 3016 of each record in the seventh data structure 3000 form a unique 2-tuple, and likewise in the eighth data structure 3100. In addition, the sixth field 3018 and the seventh field 3018 of each record in the seventh data structure 3000 form a unique 2-tuple, and likewise in the eighth data structure 3100. The first node 3002 and the second node 3102 are constrained by their respective network security middleware to form only those network connections with port numbers and data protocol according to the seventh data structure 3000 and the eighth data structure 3100. For instance, based on the first record 3022 of the seventh data structure 3000 and the first record 3122 of the eighth data structure 3100, "USER A" of "APP 1" may communicate data with "USER D" of "APP 4" between port 6001 associated with "APP 1" and port "11001" associated with "APP 4" because, inter alia, the local application port number 3014 of the first record 3022 of the seventh data structure 3000 matches the remote application port number 3118 of the first record 3122 of the eighth data structure 3100, and vice versa; and because the data protocol descriptor 3012 of the first record 3022 of the seventh data structure 3000 matches the data protocol descriptor 3112 of the first record 3122 of the eighth data structure 3100. However, a "USER B" running application "APP 1" on the first node 3002 would not be able to form a connection based on local port "6002" with "USER D" running "APP 4" at least because the data protocol descriptor 3112 according to second record 3124 of the eighth data structure 3100 (i.e., "V") differs from the data protocol descriptor 3012 of the second record 3024 of the seventh data structure 3000 (i.e., "W"). Of further note, communication with the same user running the same application but with a different data protocol require different sets of local and remote ports (compare, for example, a third record 3026 and a fourth record 3028 of the seventh data structure 3000). In addition to the fields 3008-3020 and the fields 3108-3120, in certain embodiments, for example, the data structures 3004 and 3104 may contain additional fields. In certain embodiments, for example, the data structure 3004 may be divided among two or more files (for example two files, three files, or four files). In certain embodiments, for example, the data structure 3104 may be divided among two or more files (for example two files, three files, or four files). The ordering of fields 3008-3020 and the ordering of fields 3108-3120 is a non-limiting example comprising certain embodiments of the present disclosure. Certain embodiments may comprise, for example, any of the other orderings which may be generated by permuting the orderings of fields 3008-3020 and/or the orderings of fields 3108-3120, or a subset or all of the orderings which may be generated by permuting the orderings of fields 3008-3020 and/or the orderings of fields 3108-3120.

Figure 32:
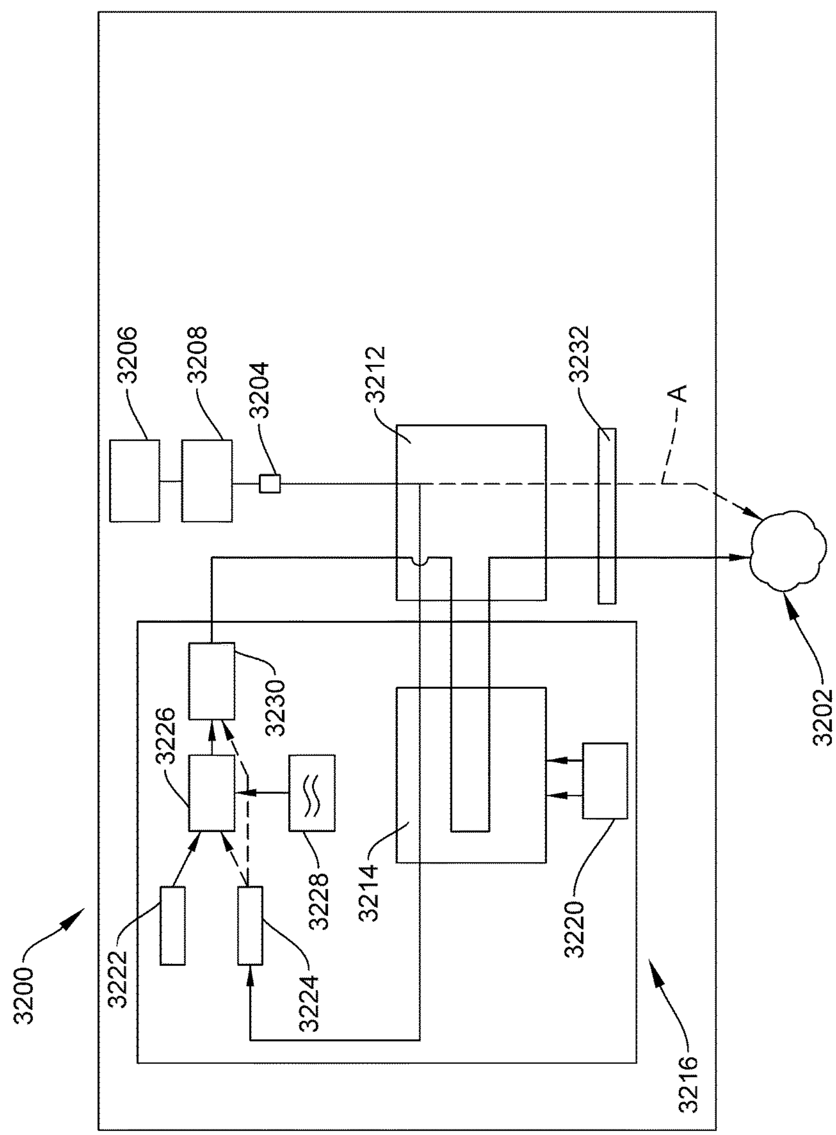
FIG. 32: Schematic view of exemplary node transmitting data to a network.

A schematic view of an exemplary node 3200 transmitting data to a network 3202 is illustrated in FIG. 32. A data packet sent from a program port 3204 by a user 3206 of a program 3208 to a network stack 3212 is routed to a first driver (or module, for example a kernel loadable module) 3214 of a network security layer 3216 (which security layer may operate in a kernel space, an application space, or a combination thereof). Based on a list 3220 of allowed network connections, the first driver (or module, for example a kernel loadable module) 3214 verifies that the user 3206 and the program 3208 are permissible, and obtains a network tunnel port number and data protocol for the data packet. The first driver (or module, for example a kernel loadable module) 3214 further verifies that the network tunnel port number is associated with a network tunnel that is in a valid state for transmitting data (for example having an open connection status). A builder module 3222 is invoked to assemble descriptors for the user 3206, the program 3208, and the data protocol into packet metadata. A data portion of the data packet is passed to a translator module 3224 to encode the data into translated data for transmission across the network tunnel. The packet metadata and optionally the translated data are encrypted by an encryption module 3226 using cryptographic keys specific to the network tunnel obtained from a file 3228 and an encrypted result is passed to an assembler module 3230 to form a modified data packet. If the translated data is not encrypted, it may bypass the encryption module 3228 and instead be passed directly to the assembler module 3230 as shown. The modified data packet is communicated to the network stack 3212 and a frame containing the modified data packet transmitted to the network tunnel by a physical interface 3232. Prior to communicating the modified data packet to the network tunnel, the first driver (or module, for example a kernel loadable module) 3214 verifies that the network tunnel is in a valid state for transmitting data. For illustrative purposes only, and not as part of the embodiment, path A shows that data packet sent from the program port 3204 would pass through the network stack 3212 and the physical interface 3232 to the network 3202 were the first driver (or module, for example a kernel loadable module) 3214 not present.

Figure 33:
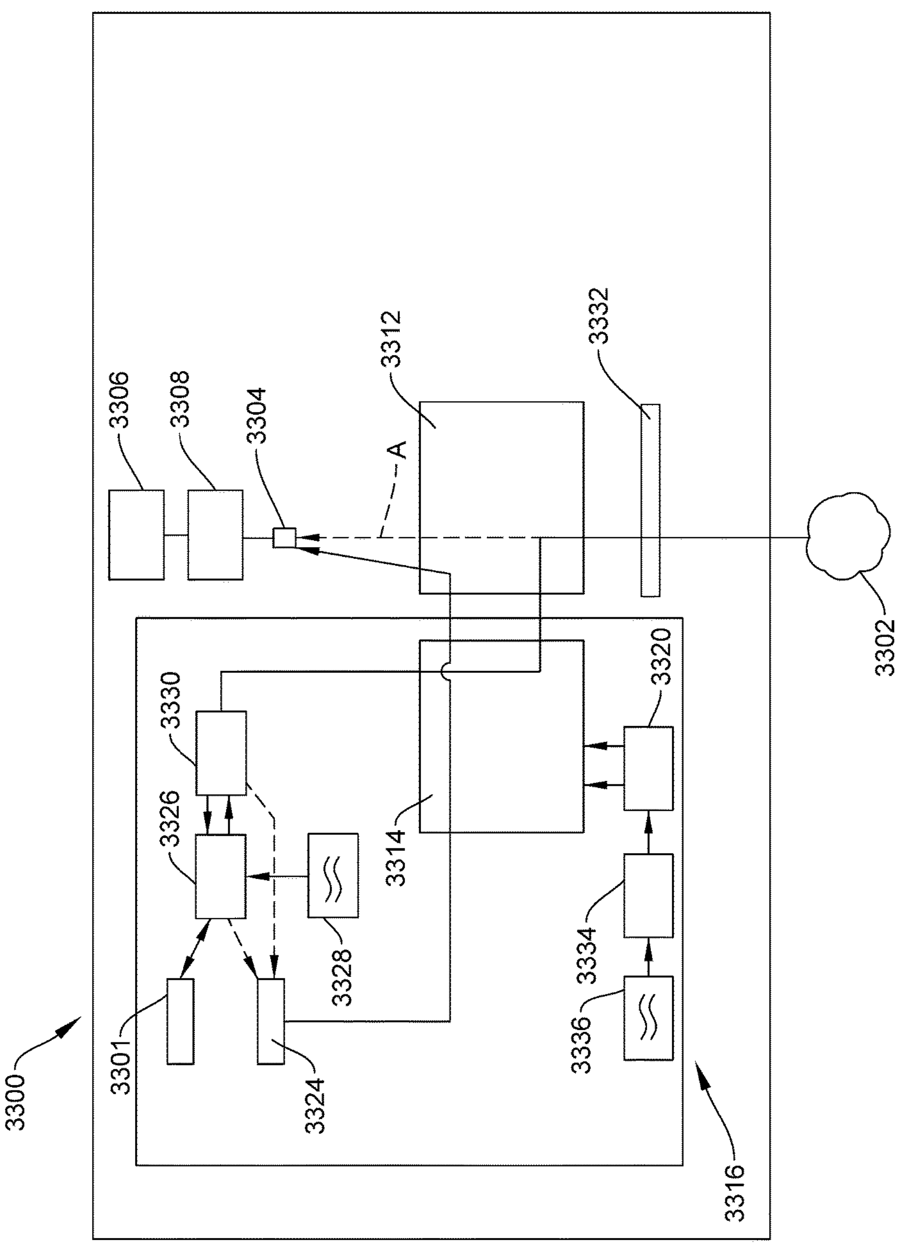
FIG. 33: Schematic view of exemplary node receiving data from a network.

A schematic view of an exemplary node 3300 receiving data from a network 3302 is illustrated in FIG. 33. A data packet containing translated data received from a network tunnel over the network 3302 and sent from a remote program port by a remote user passes through a physical interface 3332 and a network stack 3312. The data packet is received (or intercepted) by a first driver (or module, for example a kernel loadable module) 3314 (which may optionally be in a kernel space (for example a network API) or an application space) of a network security layer 3316 and directed to assembler 3330, where it is disassembled into encrypted metadata and the translated data (if the translated data is encrypted the encrypted translated data is passed with the encrypted metadata to an encryption module 3326, otherwise the unencrypted translated data is routed directly to a translation module 3324). Decrypted metadata obtained by passing the encrypted metadata through the encryption module 3326 is inspected by a validation module 3301 to verify that a descriptor comprising a remote application code, a remote user code, and a data protocol code match an expected value for the network tunnel. If the match is verified, the translated data is decrypted (if necessary) by encryption module 3326 and in any event the unencrypted/decrypted translated data is passed to a translator module 3324 for conversion into native format data and transmitted via a loopback interface to a local port 3304 associated with a resident program 3308.

Figure 34:
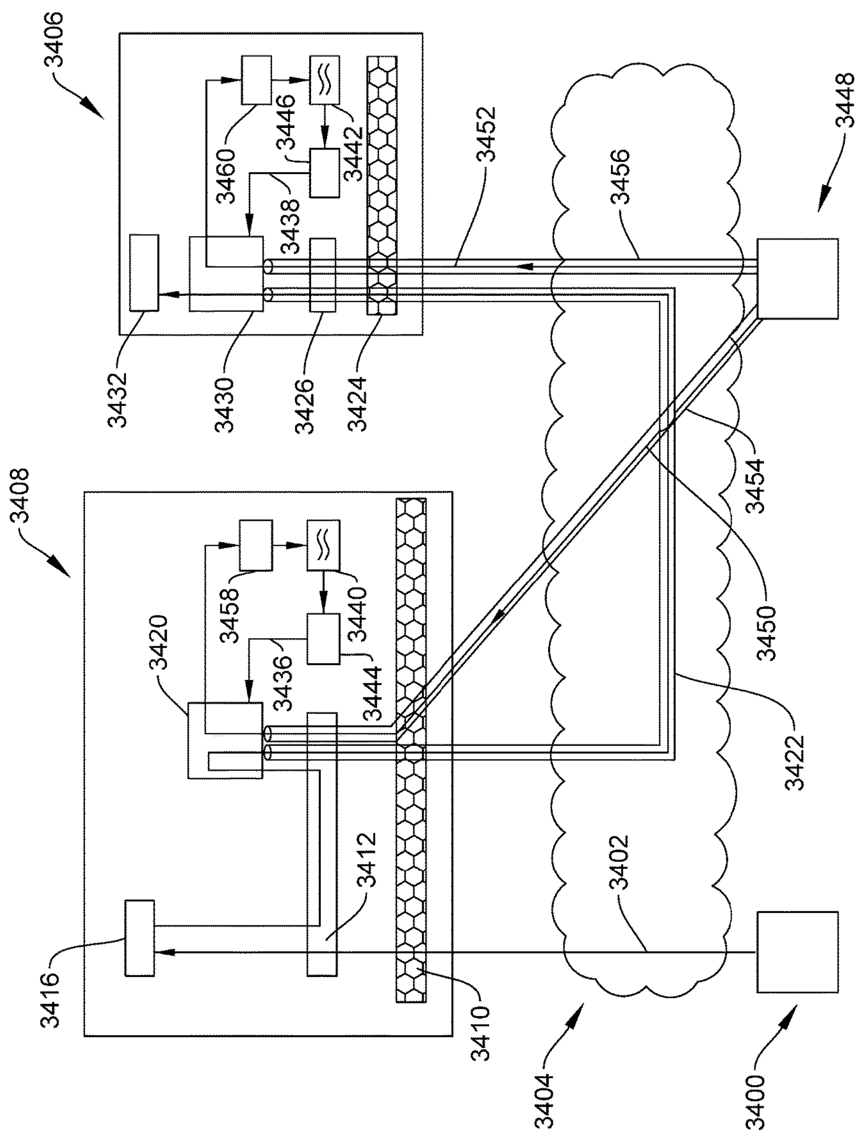
FIG. 34: Schematic view of gateway server.

A schematic view of an unsecure node 3400 transmitting data 3402 over a network 3404 to an exemplary secure node 3406 via an exemplary gateway server 3408 is illustrated in FIG. 34. The transmitted data 3402 passes through a physical interface 3410 into a network stack 3412 of the gateway server 3408 and to a trusted application 3416 of the gateway server (for example a trusted application running in an application space of the gateway server). Trusted data is transmitted from trusted application 3416 through a loopback interface of the network stack 3412 to a network security software 3420, (in certain embodiments, for example, a portion of the network security software may execute in kernel space and a further portion may execute in application space, or, in certain other embodiments, the network security software may execute only in kernel space or application space). The network security software 3420 routes the trusted data across the network 3404 through a pre-authorized encrypted network tunnel 3422 to a physical interface 3424 of the secure node 3406. Once in the secure node 3406, the trusted data is passed through a network stack 3426 of the secure node 3406 and network security software 3430 and directed to a recipient application 3432 of the secure node 3406. The network security software 3420 and the network security software 3430 manage data traffic through the encrypted network tunnel 3422 based on parameters (3436 and 3438, respectively) loaded from encrypted, read-only files (3440 and 3442, respectively) by computer programs (3444 and 3446, respectively). The parameters include, inter alia, shared secret node identification codes for the secure node 3406 and the gateway server 3408, a port number of the network security software 3430, a port number of the recipient application 3432, a process identification code and a process owner code associated with the recipient application 3432, and a data protocol associated with the transmitted data 3402. The encrypted, read-only files (3440 and 3442, respectively) are maintained by security configuration server 3448, which transmits updated encrypted configuration data (3450 and 3452, respectively) through encrypted network tunnels (3454 and 3456, respectively) to file update programs (3458 and 3460, respectively) as shown. In certain embodiments, for example, the computer programs (3444 and 3446, respectively) responsible for loading the encrypted, read-only files (3440 and 3442, respectively) may be positioned in application spaces. In certain embodiments, for example, the computer programs (3444 and 3446, respectively) responsible for loading the encrypted, read-only files (3440 and 3442, respectively) may be positioned in kernel spaces. In certain embodiments, for example, one the computer programs (3444 or 3446, respectively) responsible for loading the encrypted, read-only files (3440 and 3442, respectively) may be positioned in an application space and the other of the computer programs may be positioned in a kernel space.

Figure 35:
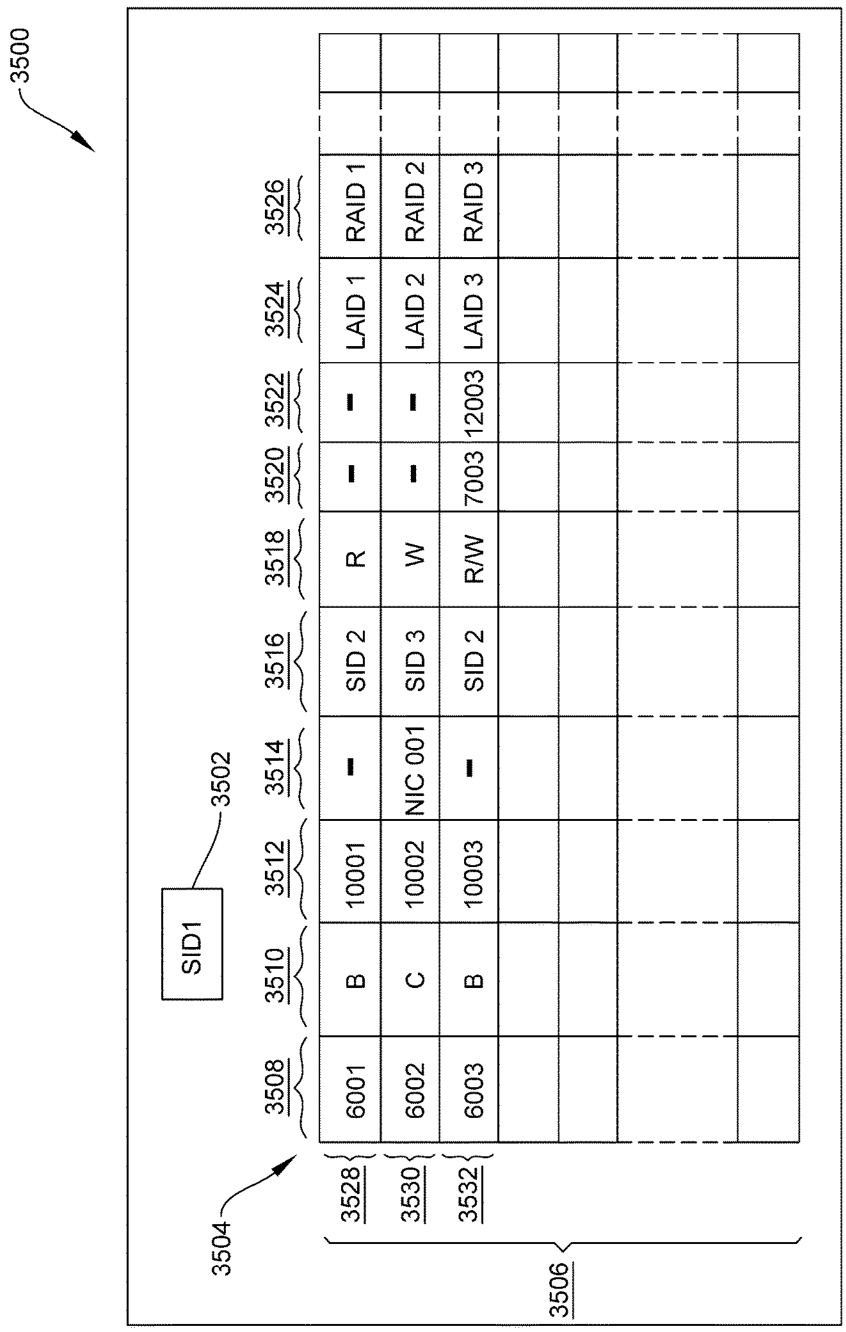
FIG. 35: Schematic view of first node having network configuration ninth data structure.

A schematic view of a network configuration first node identifier 3502 and ninth data structure 3504 stored in a non-transitory computer-readable storage medium (for example a nonvolatile memory) on a first node 3500 is depicted and a network configuration second node identifier 3602 and tenth data structure 3604 stored in a non-transitory computer-readable storage medium (for example a nonvolatile memory) on a second node 3600 is depicted in FIGS. 35 & 36. The data structures comprise records 3506 and 3606, each record composed of several fields that are interpreted by network security middleware to define authorized network connections. First fields 3508 and 3608 contain bind-side port numbers (i.e., numbers for listening ports or ports on server side of a connection) for network connections formed by the first node 3500 and the second node 3600, respectively. Second fields 3510 and 3610 provide a flag, the flag indicating whether an application program will bind ("B") the port to a loopback interface or form a connection ("C") with the listening port. Third fields 3512 and 3612 contain port numbers for network security software resident on the first node 3500 and second node 3600, respectively. Fourth fields 3514 and 3614 contain network interface controller identifiers (for example IP addresses, DHCP names, or a proprietary identifiers). Of note, in certain embodiments a network interface controller identifier need not necessarily be specified when the bind/connect flag is set to "B" whereas it must usually be set when the bind/connect flat is set to "C" (i.e., in order for a connect command to have access to a required destination address). Fifth fields 3516 and 3616 contain remote node identifiers. Sixth fields 3518 and 3618 contain a read ("R"), write ("W") or Read-Write ("R/W") flag to determine the allowed directionality of data flow. Optional seventh and eighth fields 3520 and 3620 and 3522 and 3622 contain static connection-side application and network security software port numbers (these fields are populated if static port numbers are used on the connect side of a connection, otherwise the optional seventh fields 3520 and 3620 and 3522 and 3622 may be blank and the connect-side ports set ephemerally). Eighth fields 3524 and 3624 contain application information (for example, application identifier and process owner information and a data protocol type) for a local application on the first node 3500 and second node 3600, respectively. Ninth fields 3526 and 3626 contain application information (for example, application identifier and process owner information and a data protocol type) for a remote application.

As shown, a bind-side port number may be associated with either a local application or a remote application. For example, in record 3528, the port number "6001" is associated with an application having the application information specified in column 3524 because the bind/connect flag 3510 is set to "B". The first node 3500 is a source or a destination node for communication of packet data and/or a data stream (and hosts a client or a server) in each of the records present in data structure 3504 (likewise, the second node is a source or a destination node for communication of packet data and/or a data stream in each of the records present in data structure 3604). The first record 3528 of the first node 3500, for example, is used by network security software on the first node 3500 to do its part to establish a connection from the first node (having a node identifier 3502 "SID 1") to receive ("R") data from an application (having an application identifier "RAID 1") at a local application (having an application identifier "LAID 1"). Once the connection is formed, the application process port "6001" is in communication via a loopback interface to network security software present on the first node 3500, said network security software having opened a port "10001" which is bound to interface "NIC 002" (see record 3628). As record 3530 shows, the network security software on the first node 3500 has a further connection to port "10002" associated with network security software on a third node identified by "SID 3". Records 3532 and 3632 illustrate a scenario in which the second node 3600 initiates a read-write ("R/W") connection with the first node 3500 via a network interface controller "NIC 002" on the first node, processor, or computing device. Of note, "LAID 3" in the record 3532 has the same value as "RAID 3" in the record 3632, and "RAID 3" in the record 3532 has the value as "LAID 3" in the record 3632. Of further note, "LAID 3" in the record 3532 refers to a different value than the value "LAID 3" in the record 3632. In addition to the fields 3508-3526 and the fields 3608-3626, in certain embodiments, for example, the data structures 3504 and 3604 may contain additional fields. In certain embodiments, for example, the data structure 3504 may be divided among two or more files (for example two files, three files, or four files). In certain embodiments, for example, the data structure 3604 may be divided among two or more files (for example two files, three files, or four files). The ordering of fields 3508-3526 and the ordering of fields 3608-3626 is a non-limiting example comprising certain embodiments of the present disclosure. Certain embodiments may comprise, for example, any of the other orderings which may be generated by permuting the orderings of fields 3508-3526 and/or the orderings of fields 3608-3626, or a subset or all of the orderings which may be generated by permuting the orderings of fields 3508-3526 and/or the orderings of fields 3608-3626.

EXAMPLES

Prophetic Example 1

In the following Examples, maximum packet processing rates at several processor loads would be determined for network security middleware consisting of a port filter and metadata processing engine. The port filter would be configured to read the destination port number of each packet and compare said port number to a list of 500 port numbers stored in kernel random access memory. The metadata processing engine would be configured to extract 30 bytes of metadata from a predetermined portion of each packet, optionally decrypt the metadata using a decryption utility executing in application space, and compare said metadata to a list of 500 30-byte data segments stored in kernel random access memory. Each 30 byte metadata would comprise a fixed 10-byte user code, a 10-byte application code, and a 10-byte data protocol code. Results are presented in Table 1.

TABLE 1

Network Security Middleware Performance

| Example | Processor Load[1] | Packet Size (bytes) | Encrypted[2] | Packet Processing Rate ($sec^{-1}$) (% wire speed[3]) Middleware | No Middleware |
|---|---|---|---|---|---|
| 1 | 2.5 | 100 | No | 52,500<br>70% | 56,250<br>75% |
| 2 | 2.5 | 1500 | No | 60,000<br>80% | 63,750<br>85% |
| 3 | 2.5 | 100 | RC4 | 45,000<br>60% | — |
| 4 | 2.5 | 1500 | RC4 | 52,500<br>70% | — |
| 5 | 5 | 100 | No | 63,750<br>85% | 67,500<br>90% |
| 6 | 5 | 1500 | No | 67,500<br>90% | 69,000<br>92% |
| 7 | 5 | 100 | RC4 | 60,000<br>80% | — |
| 8 | 5 | 1500 | RC4 | 63,750<br>85% | — |
| 9 | 10 | 100 | No | 69,000<br>92% | 69,000<br>92% |
| 10 | 10 | 1500 | No | 71,250<br>95% | 73,500<br>98% |
| 11 | 10 | 100 | RC4 | 67,500<br>90% | — |
| 12 | 10 | 1500 | RC4 | 69,000<br>92% | — |

[1] 1 GHz ARM9 processor running Microlinux
[2] Secure Hash Algorithm 3
[3] 1 Gb Ethernet interface having 10% packet processing overhead All publications and patent applications mentioned in this specification are herein incorporated by reference to the same extent as if each individual publication or patent application was specifically and individually indicated to be incorporated by reference.

While preferred embodiments of the present invention have been shown and described herein, it will be obvious to those skilled in the art that such embodiments are provided by way of example only. It is intended that the following claims define the scope of the invention and that methods and structures within the scope of these claims and their equivalents be covered thereby.

What is claimed is:

1. A product for authorizing network communications in a hypervisor, the product comprising a non-transitory computer-readable storage medium having computer-readable program code embodied therein, the computer-readable program code executable in a hypervisor to perform communication management operations, the communication management operations comprising:

i) intercepting a first network packet in the hypervisor, the first network packet comprising a first higher-than-OSI layer three portion;

ii) decrypting, with a single-use cryptographic key, at least a portion of the first higher-than-OSI layer three portion to obtain one or more first packet parameters;

iii) authorizing the first network packet in the hypervisor, comprising: comparing the one or more first packet parameters with one or more first expected values; and iv) passing the authorized first network packet to a virtual device.

2. The product of claim 1, wherein the communication management operations further comprise:

i) detecting negotiation of a secure communication pathway between a first remote node and the virtual device, the negotiation comprising a series of network packet communications between the first remote node and the virtual device;

ii) aligning a series of cryptographic keys utilized in the hypervisor with a series of cryptographic keys utilized in the virtual device;

iii) monitoring the series of network packet communications; and iv) confirming success of the negotiation prior to the passing the authorized first network packet.

3. The product of claim 2, wherein the monitoring comprises:

a) detecting a nonpublic first identification code sent from the virtual device to a software port on the first remote node via a pre-established communication pathway; followed by b) further detecting a nonpublic second identification code sent from the remote node; and c) comparing the nonpublic second identification code with a pre-established value for the first remote node.

4. The product of claim 3, wherein the communication management operations comprise: determining the pre-established value for the first remote node from a software port number assigned to the software port.

5. The product of claim 3, wherein the monitoring comprises:

a) detecting a first application identification code for a first user-application sent from the virtual device to the first remote node via the pre-established communication pathway; followed by b) detecting a second application identification code for a second user-application sent from the first remote node; and c) comparing the second application identification code with a pre-established value for the second user-application.

6. The product of claim 5, wherein the communication management operations comprise: determining the pre-established value for the first remote node from the software port number.

7. The product of claim 1, wherein the communication management operations comprise: determining the one or more first expected values from a one-to-one correspondence with an n-tuple comprising the one or more first expected values, a destination port number of the first network packet, and a destination network address of the first network packet.

8. The product of claim 7, wherein the one or more first packet parameters comprise a source application identification code, the source application identification code referencing a source application program for the first network packet.

9. The product of claim 8, wherein the one or more first packet parameters comprise a data model identification code.

10. The product of claim 9, wherein the communication management operations comprise: confirming at least a portion of a payload of the first network packet conforms to a data range, the data range determined from the data model identification code.

11. The product of claim 9, wherein the communication management operations comprise: confirming at least a portion of the payload of the first network packet conforms to a command type restriction, the command type restriction determined from the data model identification code.

12. The product of claim 9, wherein the communication management operations comprise: translating a first payload of the first network packet from a first pre-established format to a second pre-established format, the first pre-established format and the second pre-established format determined from the data model identification code and/or the destination port number.

13. The product of claim 7, wherein the communication management operations comprise: obtaining the one-to-one correspondence from an encrypted file loaded into memory of the hypervisor.

14. The product of claim 7, wherein the communication management operations comprise: obtaining the one-to-one correspondence from the virtual device via at least one encrypted communication pathway.

15. The product of claim 1, wherein the communication management operations further comprise:

i) intercepting a second network packet in the hypervisor, the second network packet ingressed from the virtual device, the second network packet comprising a second higher-than-OSI layer three portion;

ii) decrypting, with a single-use cryptographic key, at least a portion of the second higher-than-OSI layer three portion to obtain at least one packet parameter;

iii) authorizing the second network packet in the hypervisor, comprising: comparing the one or more second packet parameters with one or more second expected values; and iv) passing the authorized second network packet to a remote second node.

16. The product of claim 1, wherein the virtual device is a virtual machine.

17. The product of claim 1, wherein the virtual device is a container.

18. The product of claim 1, wherein the communication management operations comprise: obtaining the at least one packet parameter from a payload of the first network packet.

19. The product of claim 1, wherein the first remote node is a bare metal device.

20. The product of claim 1, wherein the first remote node is a further virtual device.

21. The product of claim 1, wherein the hypervisor provides at least one virtual interface to the virtual device.

22. The product of claim 1, wherein the communication management operations are configured for a Type 1 hypervisor.

23. The product of claim 1, wherein the communication management operations are configured for a Type 2 hypervisor.

24. The product of claim 1, wherein the communication management operations are transparent to the virtual device and all computer programs running on the virtual device.

* * * * *